(12) United States Patent
Sandford et al.

(10) Patent No.: US 10,561,135 B2
(45) Date of Patent: Feb. 18, 2020

(54) INSECT TRAP DEVICE AND METHOD OF USING

(71) Applicant: The Procter & Gamble Company, Cincinnati, OH (US)

(72) Inventors: Andrew F Sandford, Marlborough, MA (US); Daniel B Lazarchik, South Boston, MA (US); Jill M Shurtleff, South Boston, MA (US)

(73) Assignee: The Procter & Gamble Company, Cincinnati, OH (US)

( * ) Notice: Subject to any disclaimer, the term of this patent is extended or adjusted under 35 U.S.C. 154(b) by 240 days.

(21) Appl. No.: 15/646,128

(22) Filed: Jul. 11, 2017

(65) Prior Publication Data

US 2017/0303523 A1    Oct. 26, 2017

Related U.S. Application Data

(63) Continuation of application No. PCT/US2016/013007, filed on Jan. 12, 2016.

(60) Provisional application No. 62/102,583, filed on Jan. 12, 2015.

(51) Int. Cl.
| | |
|---|---|
| *A01M 1/14* | (2006.01) |
| *A01M 1/20* | (2006.01) |
| *A01M 1/02* | (2006.01) |
| *F21S 8/00* | (2006.01) |

(52) U.S. Cl.
CPC ............ *A01M 1/145* (2013.01); *A01M 1/023* (2013.01); *A01M 1/2077* (2013.01); *F21S 8/035* (2013.01)

(58) Field of Classification Search
CPC ........ A01M 1/023; A01M 1/106; A01M 1/24; A01M 1/145; A01M 1/2094; A01M 1/2061
See application file for complete search history.

(56) References Cited

U.S. PATENT DOCUMENTS

| | | | |
|---|---|---|---|
| 2,307,163 | A | 1/1943 | Shea |
| 3,023,539 | A | 3/1962 | Emerson, Jr. |
| 3,348,332 | A | 10/1967 | Oconnell |
| 3,729,858 | A | 5/1973 | Bradshaw |
| 4,212,129 | A | 7/1980 | Shumate |

(Continued)

FOREIGN PATENT DOCUMENTS

| | | | |
|---|---|---|---|
| AT | 513518 B1 | 5/2014 | |
| AU | 2009208773 B2 | 9/2014 | |

(Continued)

OTHER PUBLICATIONS

International Search Report and Written Opinion, dated Feb. 25, 2016, Application No. PCT/US2016/013007, 19 pgs.

(Continued)

*Primary Examiner* — Magdalena Topolski
*Assistant Examiner* — Morgan T Barlow
(74) *Attorney, Agent, or Firm* — Melissa G. Krasovec

(57) ABSTRACT

In an embodiment, as insect trap is disclosed including: a trap portion including a frame and a membrane having an adhesive surface, wherein the membrane is at least partially contained within the frame and is configured to adhere to an insect; and a base portion including a lighting element and a housing portion, wherein the housing portion is configured to receive and retain the trap portion when engaged therewith.

16 Claims, 110 Drawing Sheets

(56) References Cited

U.S. PATENT DOCUMENTS

| | | |
|---|---|---|
| D282,390 S | 1/1986 | Ford et al. |
| 4,654,998 A | 4/1987 | Clay |
| 4,709,502 A | 12/1987 | Bierman |
| 4,709,503 A | 12/1987 | McQueen |
| 4,815,231 A | 3/1989 | McQueen |
| 4,899,485 A | 2/1990 | Schneidmiller |
| 4,953,320 A | 9/1990 | Nelson |
| D323,014 S | 1/1992 | Demarest et al. |
| 5,099,598 A | 3/1992 | Carter |
| D326,702 S | 6/1992 | Demarest |
| 5,142,815 A | 9/1992 | Birdsong |
| 5,311,697 A | 5/1994 | Cavanaugh et al. |
| 5,365,690 A | 11/1994 | Nelson et al. |
| D357,725 S | 4/1995 | Biasetti |
| 5,425,197 A | 6/1995 | Smith |
| 5,477,636 A | 12/1995 | Musket |
| 5,505,017 A | 4/1996 | Nelson et al. |
| 5,513,465 A | 5/1996 | Demarest et al. |
| 5,556,192 A | 9/1996 | Wang |
| 5,572,825 A | 11/1996 | Gehret |
| 5,588,250 A | 12/1996 | Chiba et al. |
| 5,595,018 A | 1/1997 | Wilbanks |
| 5,608,987 A | 3/1997 | Meyer |
| 5,651,211 A | 7/1997 | Regan et al. |
| 5,657,576 A | 8/1997 | Nicosia |
| 5,759,561 A | 6/1998 | Angst et al. |
| 5,799,436 A | 9/1998 | Nolen et al. |
| 5,915,948 A | 6/1999 | Kunze et al. |
| 5,950,355 A | 9/1999 | Gilbert |
| D415,242 S | 10/1999 | Ohmura |
| 5,974,727 A | 11/1999 | Gilbert |
| D418,575 S | 1/2000 | Ohmura |
| 6,055,766 A | 5/2000 | Nolen et al. |
| 6,108,965 A | 8/2000 | Burrows et al. |
| 6,361,752 B1 | 3/2002 | Demarest et al. |
| 6,375,943 B1 | 4/2002 | Raw et al. |
| D457,591 S | 5/2002 | Christianson et al. |
| 6,392,549 B1 | 5/2002 | Wu |
| 6,393,759 B1 | 5/2002 | Brown et al. |
| 6,397,515 B1 | 6/2002 | Brown et al. |
| D467,295 S | 12/2002 | Andrews et al. |
| 6,560,919 B2 | 5/2003 | Burrows et al. |
| 6,594,946 B2 | 7/2003 | Nolen et al. |
| 6,655,078 B2 | 12/2003 | Winner et al. |
| 6,718,687 B2 | 4/2004 | Robison et al. |
| 6,860,061 B2 | 3/2005 | Nosse et al. |
| 6,871,443 B2 | 3/2005 | Lambert et al. |
| 6,886,292 B2 | 5/2005 | Studer et al. |
| 6,910,298 B2 | 6/2005 | Schneidmiller |
| 6,959,510 B1 | 11/2005 | Nelson et al. |
| D521,102 S | 5/2006 | Hoyes |
| 7,036,268 B2 | 5/2006 | Taylor et al. |
| 7,096,621 B2 | 8/2006 | Nelson et al. |
| D533,930 S | 12/2006 | Keller, Jr. et al. |
| 7,143,542 B2 | 12/2006 | Taylor et al. |
| 7,191,560 B2 | 3/2007 | Harris |
| 7,383,660 B2 | 6/2008 | Greening |
| 7,401,436 B2 | 7/2008 | Chyun |
| 7,412,797 B1 | 8/2008 | Hoscox |
| 7,503,675 B2 | 3/2009 | Demaret et al. |
| 7,591,099 B2 | 9/2009 | Lang et al. |
| 7,607,255 B2 | 10/2009 | Hu |
| 7,614,180 B2 | 11/2009 | Dirand et al. |
| D612,039 S | 3/2010 | Ko et al. |
| D612,446 S | 3/2010 | Dalili |
| D614,278 S | 4/2010 | Schwartz et al. |
| 7,788,845 B2 | 9/2010 | Nelson et al. |
| 7,832,140 B2 | 11/2010 | Wilbanks |
| D629,500 S | 12/2010 | Koenig et al. |
| 7,856,752 B1 | 12/2010 | Eilerson |
| 7,937,887 B2 | 5/2011 | Child |
| 8,016,207 B2 | 9/2011 | Kvietok et al. |
| 8,099,900 B2 | 1/2012 | Rivera |
| 8,104,223 B1 | 1/2012 | Rodriguez |
| 8,109,036 B1 | 2/2012 | Wilbanks |
| 8,210,448 B2 | 7/2012 | Kvietok et al. |
| 8,211,419 B2 | 7/2012 | Siljander et al. |
| D669,151 S | 10/2012 | Frisch |
| 8,281,514 B2 | 10/2012 | Fleming |
| 8,291,638 B2 | 10/2012 | Larsen |
| 8,316,578 B2 | 11/2012 | Faham et al. |
| 8,375,625 B2 | 2/2013 | Larsen |
| 8,387,306 B2 | 3/2013 | Cink |
| 8,402,691 B2 | 3/2013 | Coventry |
| 8,572,890 B1 | 11/2013 | Lark et al. |
| 8,707,614 B2 | 4/2014 | Larsen |
| 8,740,110 B2 | 6/2014 | Gruenbacher et al. |
| 8,793,928 B2 | 8/2014 | Larsen |
| 8,852,501 B2 | 10/2014 | Hedman |
| 9,089,121 B2 | 7/2015 | Diclaro et al. |
| D736,341 S | 8/2015 | Lieberwirth et al. |
| D780,284 S | 2/2017 | Lieberwirth et al. |
| D780,285 S | 2/2017 | Lieberwirth et al. |
| 2001/0042337 A1 | 11/2001 | Lambert et al. |
| 2002/0032980 A1 | 3/2002 | Nelson et al. |
| 2002/0139040 A1 | 10/2002 | Burrows et al. |
| 2003/0041506 A1 | 3/2003 | Coventry |
| 2003/0051391 A1 | 3/2003 | Jablin |
| 2003/0217503 A1 | 11/2003 | Robison |
| 2004/0025412 A1 | 2/2004 | Simchoni et al. |
| 2004/0139648 A1 | 7/2004 | Durand et al. |
| 2004/0200129 A1 | 10/2004 | Studer et al. |
| 2004/0218380 A1 | 11/2004 | Taylor et al. |
| 2004/0237381 A1 | 12/2004 | Durand et al. |
| 2004/0237382 A1 | 12/2004 | Durand et al. |
| 2005/0066570 A1 | 3/2005 | Mosher et al. |
| 2005/0210735 A1 | 9/2005 | Harmer et al. |
| 2006/0080888 A1 | 4/2006 | Greening |
| 2006/0150472 A1 | 7/2006 | Harris |
| 2006/0218851 A1 | 10/2006 | Weiss et al. |
| 2006/0283075 A1 | 12/2006 | Feldhege et al. |
| 2007/0011940 A1 | 1/2007 | Chen et al. |
| 2007/0056208 A1 | 3/2007 | Chen et al. |
| 2007/0124987 A1* | 6/2007 | Brown .................. A01M 1/023 43/113 |
| 2008/0001551 A1 | 1/2008 | Abbondanzio et al. |
| 2008/0236028 A1 | 2/2008 | McBride et al. |
| 2008/0141578 A1 | 6/2008 | Chen et al. |
| 2008/0196296 A1 | 8/2008 | Studer et al. |
| 2008/0229652 A1 | 9/2008 | Willcox et al. |
| 2009/0100743 A1 | 4/2009 | Prater |
| 2009/0145019 A1 | 6/2009 | Nolen et al. |
| 2009/0223115 A1 | 9/2009 | Lang et al. |
| 2010/0024278 A1 | 2/2010 | Simchoni-Barak et al. |
| 2010/0071254 A1 | 3/2010 | Calkins et al. |
| 2010/0229459 A1 | 9/2010 | Simchoni-Barak et al. |
| 2010/0263260 A1 | 10/2010 | Engelbrecht et al. |
| 2010/0287816 A1 | 11/2010 | Abelbeck |
| 2011/0030267 A1 | 2/2011 | Nolen et al. |
| 2011/0041385 A1 | 2/2011 | Faham et al. |
| 2011/0138678 A1 | 6/2011 | Smith |
| 2012/0124890 A1 | 5/2012 | Hainze |
| 2012/0167450 A1 | 7/2012 | Frisch |
| 2013/0145680 A1 | 6/2013 | Soltis et al. |
| 2013/0180161 A1 | 7/2013 | Vasudeva et al. |
| 2013/0312314 A1 | 8/2013 | Greening et al. |
| 2016/0000060 A1 | 1/2016 | Sandford et al. |
| 2016/0262367 A1 | 9/2016 | Sandford et al. |
| 2017/0035039 A1 | 2/2017 | Sandford et al. |

FOREIGN PATENT DOCUMENTS

| | | |
|---|---|---|
| CA | 2447854 A1 | 11/2001 |
| CN | 2790173 | 6/2006 |
| CN | 201067044 | 6/2008 |
| CN | 201093261 Y | 7/2008 |
| CN | 201107985 | 9/2008 |
| CN | 201107993 | 9/2008 |
| CN | 2011/63944 | 12/2008 |
| CN | 201234518 | 5/2009 |
| CN | 101743943 A | 6/2010 |
| CN | 201577439 U | 9/2010 |
| CN | 202285958 U | 7/2012 |
| CN | 202551965 U | 11/2012 |

(56) References Cited

FOREIGN PATENT DOCUMENTS

| | | |
|---|---|---|
| CN | 103168765 | 6/2013 |
| CN | 203072705 U | 7/2013 |
| CN | 203952202 | 11/2014 |
| DE | 3225412 | 1/1984 |
| EP | 0947134 A2 | 10/1999 |
| EP | 0976323 A2 | 2/2000 |
| EP | 1161865 A2 | 12/2001 |
| EP | 1213958 B1 | 11/2003 |
| EP | 1827092 | 12/2010 |
| EP | 2807921 A1 | 12/2014 |
| FR | 2900793 | 3/2011 |
| GB | 191201297 A | 8/1912 |
| GB | 12373705 | 10/2002 |
| GB | 2381181 | 4/2003 |
| GB | 2457103 A | 8/2015 |
| IN | 2011CH01965 A | 11/1965 |
| JP | 55-170987 | 5/1979 |
| JP | U1995007457 | 2/1995 |
| JP | H10229801 | 9/1998 |
| JP | 11146751 A | 6/1999 |
| JP | 11-289951 | 10/1999 |
| JP | 2000/253793 | 9/2000 |
| JP | 2000/287600 | 10/2000 |
| JP | 2000270749 A | 10/2000 |
| JP | 2000333582 A | 12/2000 |
| JP | 2001299179 A | 10/2001 |
| JP | 2002084958 A | 3/2002 |
| JP | 2002125560 A | 5/2002 |
| JP | 2002253101 A | 9/2002 |
| JP | 2003009744 | 1/2003 |
| JP | 2004159626 | 6/2004 |
| JP | 2005046100 A | 2/2005 |
| JP | 2005065630 | 3/2005 |
| JP | 2005095149 | 4/2005 |
| JP | 2005/245312 | 9/2005 |
| JP | 03746430 B2 | 2/2006 |
| JP | 2007074908 | 3/2007 |
| JP | 2008154500 | 7/2008 |
| JP | 04166358 B2 | 10/2008 |
| JP | 4549722 | 9/2010 |
| JP | 2012/045004 | 3/2012 |
| JP | 05149183 B2 | 2/2013 |
| JP | 2014195466 | 10/2014 |
| KR | 2008100721 A | 11/2008 |
| KR | 2010/0033336 | 3/2010 |
| KR | 1020110050769 | 12/2012 |
| RU | 2360413 C2 | 7/2009 |
| WO | WO1990/12501 | 11/1990 |
| WO | WO 1992017060 A1 | 10/1992 |
| WO | WO1999/34671 | 7/1999 |
| WO | WO 2000/003588 A1 | 1/2000 |
| WO | WO2001/22813 | 4/2001 |
| WO | WO2001/68154 | 9/2001 |
| WO | WO 2002012127 | 2/2002 |
| WO | WO 2001/089295 B1 | 9/2002 |
| WO | WO 2003/032722 A1 | 4/2003 |
| WO | WO 2004/068944 A2 | 8/2004 |
| WO | WO2004/071935 | 8/2004 |
| WO | WO2005/053389 | 6/2005 |
| WO | WO 2009/075839 A1 | 6/2009 |
| WO | WO 2011/094219 A1 | 8/2011 |
| WO | WO 2014/134371 A1 | 9/2014 |
| WO | WO 2015/081033 | 6/2015 |
| WO | WO 2015/164849 | 10/2015 |
| WO | WO 2015/164849 A1 | 10/2015 |

OTHER PUBLICATIONS

International Search Report and Written Opinion dated Feb. 6, 2015, Appl. No. PCT/US2014/067196, 14 pgs.
International Search Report and Written Opinion dated Feb. 6, 2015, Appl. No. PCT/US2014/019175, 22 pgs.
International Search Report and Written Opinion dated Feb. 6, 2015, Appl. No. PCT/US2015/027684, 15 pgs.
Plug-in Stiky Fly Trap, Olson Products Inc., PO Box 1043, Medina OH 44258, www.olsonproducts.com.
Enforcer® Over Nite Flea and Insect Trap, website: http://www.enforcer.com/products/flea-tick/over-nite-flea-insect-trap/.
On-line article in the Atlanta Journal Constitution, Jul. 9, 1993 by Leigh Ann Miller describing a new product, the Enforcer® Over Nite Flea and Insect Trap, 1 page.
Fly Web USA, Silent fly control, website http://flywebua.com/.

* cited by examiner

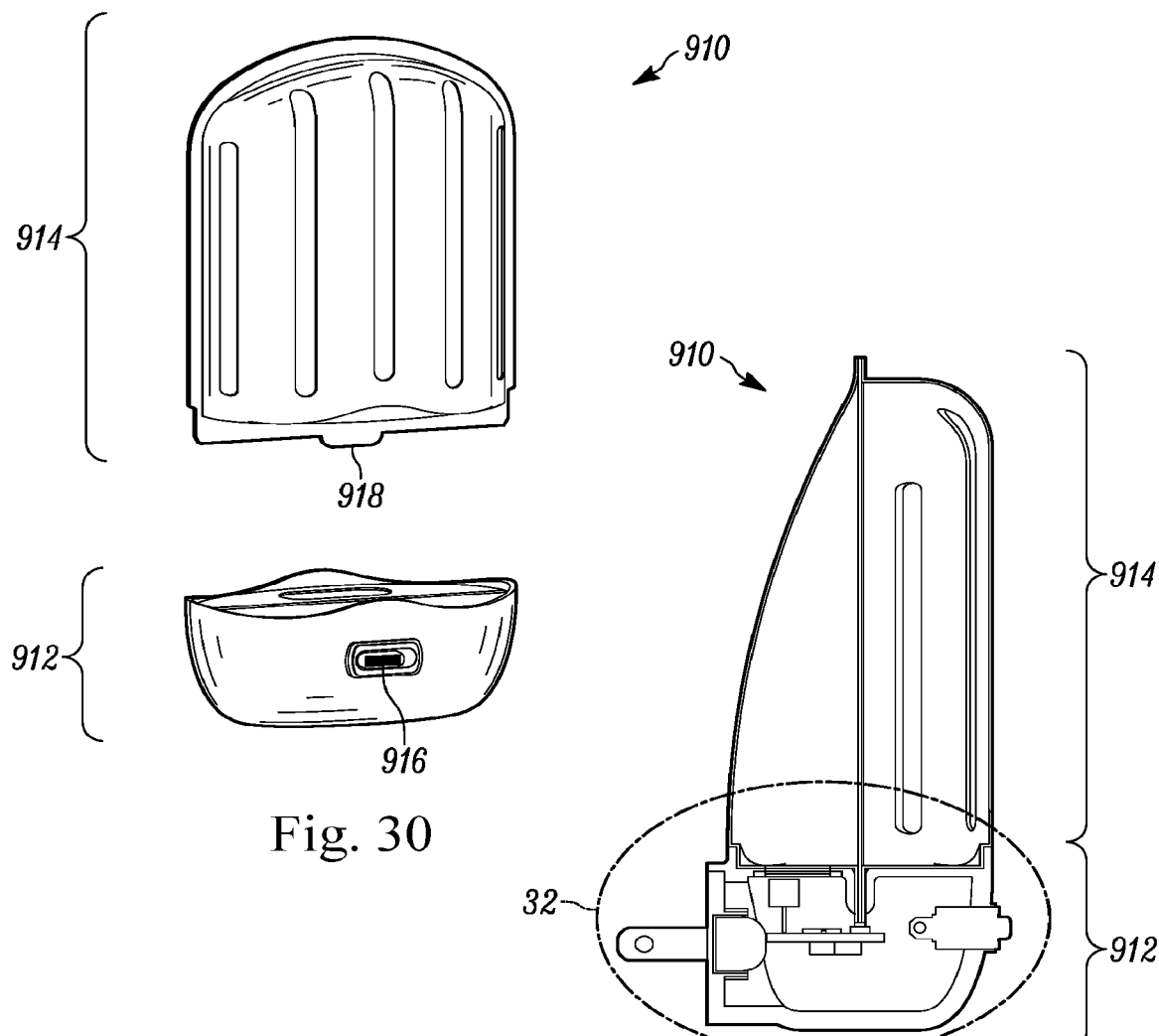
Fig. 30
Fig. 31
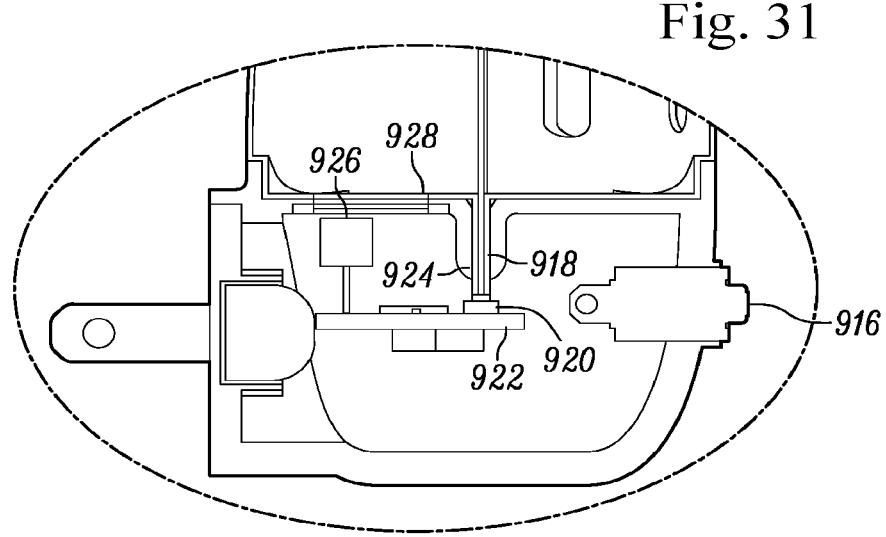
Fig. 32

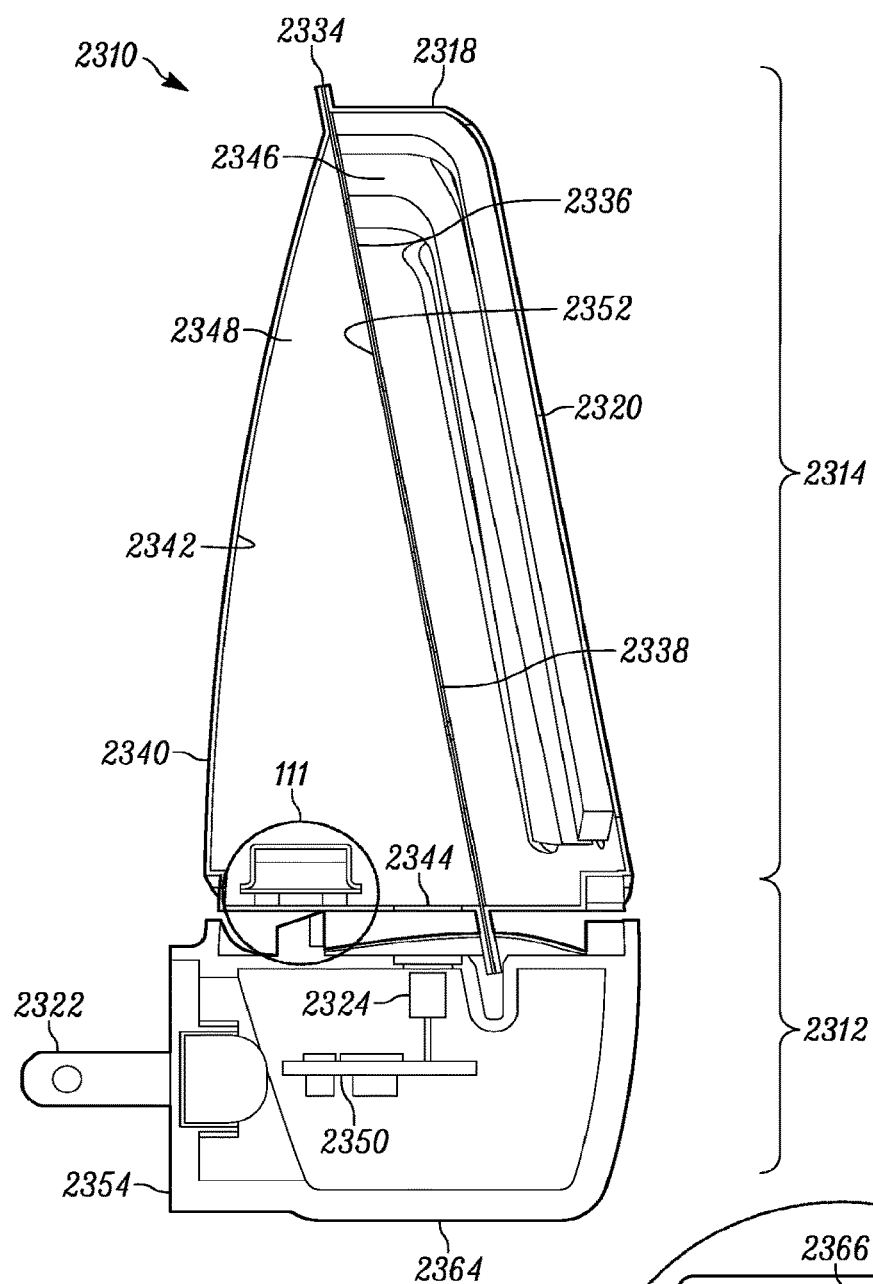
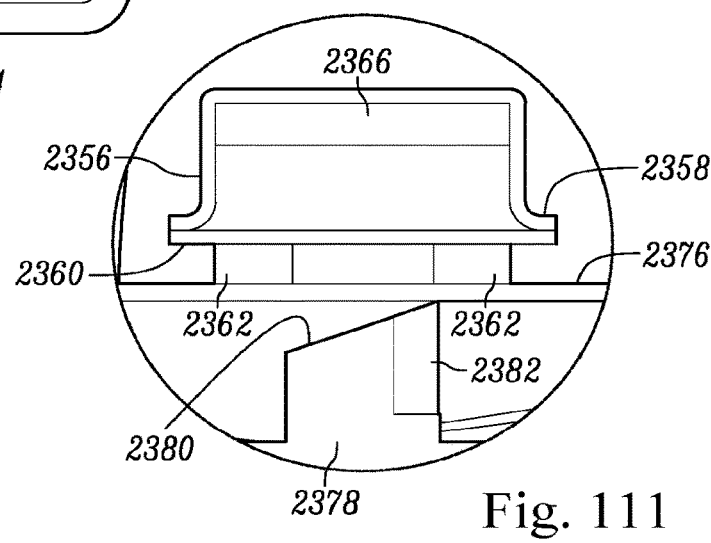
Fig. 110
Fig. 111

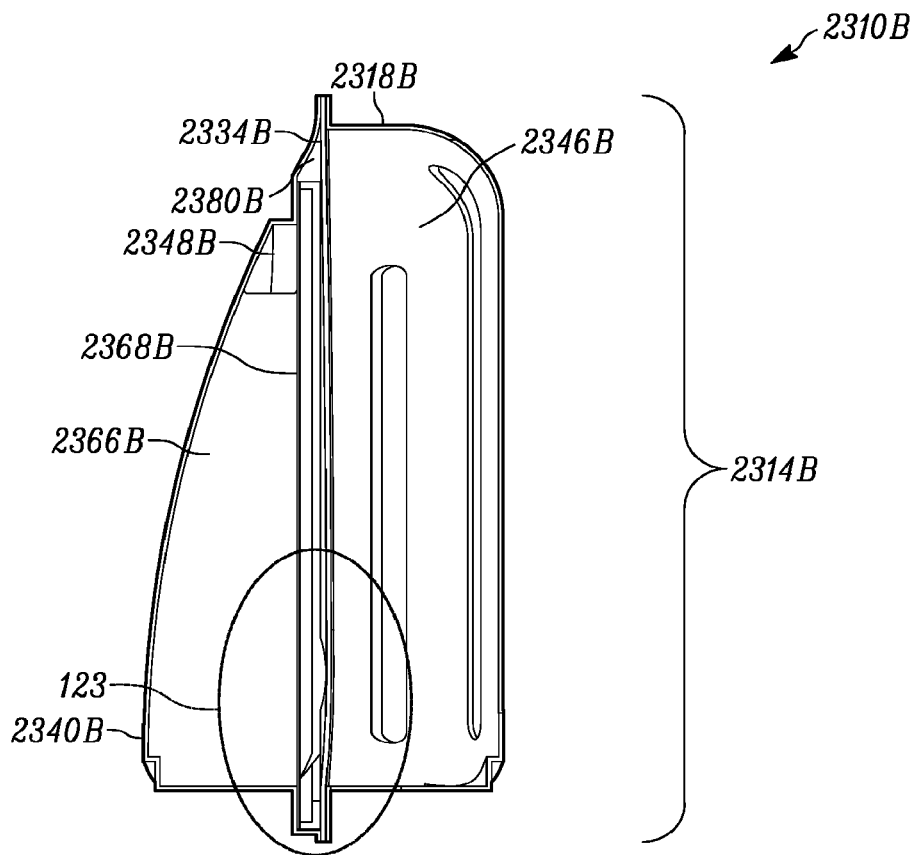
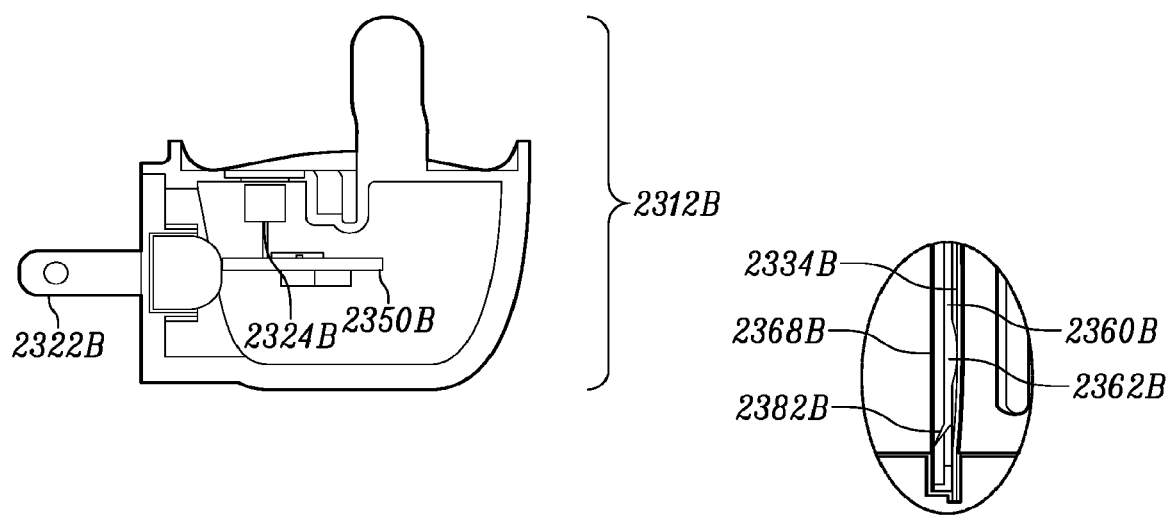
Fig. 122
Fig. 123

INSECT TRAP DEVICE AND METHOD OF USING

TECHNICAL FIELD

The present disclosure is related generally to an insect trap, more particularly, to a removable insect trap having a minimal footprint and an aesthetically pleasing design.

BACKGROUND

Flying insect pests have long been a nuisance and a health hazard. Since ancient times, insect traps have been used to eliminate flying insects, and hundreds of different traps have been proposed and developed over the centuries. There has always been a need to eliminate flies and mosquitos that inevitably find their way into homes. Recent US outbreaks of Eastern Equine Encephalitis, West Nile virus and harmful *E. Coli* infections, public health threats that can be spread by flying insects, have only increased this need. Because insects may see and be attracted to a combination of ultraviolet (UV) and visible light, an indoor insect trap may have its own UV and visible light sources. Insect traps commonly have a fluorescent tube that emits both UV and visible light to attract insects and a glue board to trap them. However, insect traps incorporating fluorescent tubes and the transformers that power them may be too large to fit wherever they're needed and too expensive to afford one for every room in the house. In addition, insects may contact the fluorescent tube and over time it may accumulate dust and insect debris, blocking the light and reducing the trap's effectiveness. Furthermore, the glue board may be difficult to remove and replace without touching trapped insects and adhesive.

SUMMARY

An insect trap device and methods of using the device are described herein. The insect trap may effectively attract and trap insects indoors and may be manufactured and sold at a lower cost than commercially available traps. The insect trap device may be smaller than competing indoor insect traps, and may be conveniently movable from one location to another. The insect trap device may be easier to clean and maintain without contacting trapped insects.

In a first aspect, an insect trap is disclosed including: a trap portion including a frame and a membrane having an adhesive surface, wherein the membrane is at least partially contained within the frame and is configured to adhere to an insect; and a base portion including a lighting element and a housing portion, wherein the housing portion is configured to receive and retain the trap portion when engaged therewith. In an embodiment of the first aspect, the housing portion of the base portion includes one or more alignment guides for receiving the trap portion. In an embodiment of the first aspect, the alignment guides include side channels, slots, flanges, or recesses. In an embodiment of the first aspect, the frame of the trap portion includes a border that substantially surrounds the periphery of the membrane. In an embodiment of the first aspect, the border of the trap portion surrounds one, two, or three sides of the membrane. In an embodiment of the first aspect, the border of the trap portion includes side flanges and is configured to be received into one or more alignment guides on the housing portion of the base portion. In an embodiment of the first aspect, the frame further includes a tab that is configured to allow a user to insert and remove the trap portion from base portion. In an embodiment of the first aspect, the trap portion is configured to removably engage with the base portion via the tab. In an embodiment of the first aspect, the base portion further includes an enclosure, the enclosure at least partially surrounding the trap portion and including a first opening that configured to allow an insect to enter into the enclosure. In an embodiment of the first aspect, the lighting element is located in front of the trap portion. In an embodiment of the first aspect, the enclosure includes a second opening configured to allow light to emit from the enclosure. In an embodiment of the first aspect, the enclosure is configured to distribute the light in a predetermined pattern. In an embodiment of the first aspect, the base portion further includes a mounting portion configured to communicate with and receive power from a power source. In an embodiment of the first aspect, the trap portion further includes a cover configured to cover at least a portion of the membrane of the trap portion when the trap portion is not engaged with the base portion. In an embodiment of the first aspect, the trap portion further includes a hinge, the hinge configured to allow the cover to swing into an open position and a closed position. In an embodiment of the first aspect, when the cover is in an open position, the cover is located behind the membrane, thereby exposing the adhesive surface. In an embodiment of the first aspect, when the cover is in a closed position, the cover is located in front of the membrane, thereby covering at least a portion of the adhesive surface. In an embodiment of the first aspect, the cover includes one or more engagement features for securing the cover to the frame. In an embodiment of the first aspect, the frame includes one or more receiving features for securing the cover to the frame. In an embodiment of the first aspect, the engagement features include: ribs, bumps, lips, protrusions, and recesses. In an embodiment of the first aspect, the receiving features include: ribs, bumps, lips, protrusions, and recesses. In an embodiment of the first aspect, the cover includes: a tambour, a roller blind, a solid plate, a shutter, or one or more slats. In an embodiment of the first aspect, the cover is configured to automatically cover at least a portion of the membrane of the trap portion upon removal of the trap portion from the base portion. In an embodiment of the first aspect, the cover is configured to automatically uncover the membrane of the trap portion upon engagement of the trap portion with the base portion. In an embodiment of the first aspect, the lighting element includes a light emitting diode (LED). In an embodiment of the first aspect, the lighting element includes an ultraviolet (UV) LED and a blue LED. In an embodiment of the first aspect, the trap portion includes an insect attractant. In an embodiment of the first aspect, the insect attractant is selected from the group consisting of: sorbitol, coleopteran attractants, dipteran attractants, homopteran attractants, lepidopteran, straight chain lepidopteran pheromones, eugenol, methyl eugenol, and siglure. In an embodiment of the first aspect, the trap portion further includes a reflective surface. In an embodiment of the first aspect, the membrane includes a reflective surface.

In a second aspect, an insect trap is disclosed including: a trap portion including: an enclosure having an adhesive surface and a first opening, wherein the adhesive surface is at least partially contained within the enclosure and is configured to adhere to an insect, the enclosure further including a visual indicator integral to the enclosure, the visual indicator providing an indication of trap life remaining; and one or more insect-attracting substances, and a base portion configured to removably engage the trap portion. In an embodiment of the second aspect, the trap portion further including a removable tab covering the one or more insect-attracting substances, wherein upon removal of the tab, the one or more insect-attracting substances is released from the trap. In an embodiment of the second aspect, the visual indicator includes a visible level of the one or more insect-attracting substances in the trap portion. In an embodiment of the second aspect, the one or more insect-attracting substances includes an insect attractant and a carrier material. In an embodiment of the second aspect, the carrier material is configured to change color when the insect attractant is depleted. In an embodiment of the second aspect, the base portion further includes: a mounting portion configured to communicate with and receive power from a power source; and a heating element configured to receive power from the power source and heat the one or more insect-attracting substances in the trap portion. In an embodiment of the second aspect, the base portion further includes: a circuit board having a programmable processor for executing commands related to the operating settings of the insect trap, wherein the circuit board is in communication with the heating element and is configured to monitor an electrical property of the one or more insect-attracting substances. In an embodiment of the second aspect, the circuit board is configured to provide the visual indicator when an electrical property of the one or more insect-attracting substances exceeds or drops below a threshold value. In an embodiment of the second aspect, the trap further includes a lighting element in communication with the circuit board, the circuit board configured to cause the lighting element to flash or change color as the visual indicator when the one or more insect-attracting substances is depleted. In an embodiment of the second aspect, the trap further includes a speaker in communication with the circuit board, the circuit board configured to cause the speaker to make an audible noise when the one or more insect-attracting substances is depleted. In an embodiment of the second aspect, the heating element includes: an electrical contact, an electrical resistance coil, one or more resistors, one or more infrared LEDs, one or more Peltier or Thompson effect devices, a metal-oxide film, or a printed conductive ink. In an embodiment of the second aspect, the processor is configured to receive commands wirelessly from a user and execute said commands related to the operating settings of the insect trap. In an embodiment of the second aspect, the commands from the user can be sent via a mobile device. In an embodiment of the second aspect, the base portion further includes: a mounting portion configured to communicate with and receive power from a power source; and a sensor configured to receive power from the power source and monitor an electrical property of the one or more insect-attracting substances. In an embodiment of the second aspect, the base portion further includes: a circuit board having a programmable processor for executing commands related to the operating settings of the insect trap; wherein the circuit board is in communication with the sensor. In an embodiment of the second aspect, the circuit board is configured to provide the visual indicator when an electrical property of the one or more insect-attracting substances exceeds or drops below a threshold value. In an embodiment of the second aspect, the trap further includes a lighting element in communication with the circuit board, the circuit board configured to cause the lighting element to flash or change color as the visual indicator when the one or more insect-attracting substances is depleted. In an embodiment of the second aspect, the trap further includes a speaker in communication with the circuit board, the circuit board configured to cause the speaker to make an audible noise when the one or more insect-attracting substances is depleted. In an embodiment of the second aspect, the sensor includes: a voltage detector, a current detector, an impedance detector, a pH sensor, or a moisture detector.

In a third aspect, an insect trap is disclosed including: a trap portion including an enclosure having an adhesive surface and a first opening, wherein the adhesive surface is at least partially contained within the enclosure and is configured to adhere to an insect; a base portion configured to removably engage the trap portion; and a removable insect attractant cartridge configured to be received in the trap portion or base portion. In an embodiment of the third aspect, the base portion includes an opening configured to receive the insect attractant cartridge. In an embodiment of the third aspect, the trap further includes a heating element in communication with the removable insect attractant cartridge, the heating element configured to increase the rate at which the insect attractant is released. In an embodiment of the third aspect, the insect attractant cartridge includes: a scent cartridge, a double scent cartridge, a single chamber container, or a double chamber container. In an embodiment of the third aspect, the insect attractant cartridge includes a single or double chamber container and wick, the insect attractant including an evaporable liquid attractant. In an embodiment of the third aspect, the single or double chamber is transparent or translucent, allowing a user to view the level of the evaporable liquid attractant. In an embodiment of the third aspect, the evaporable liquid attractant includes a colored or dyed liquid. In an embodiment of the third aspect, the single or double chamber includes a visual indicator, wherein the visual indicator provides one or more level lines indicative of the volume of liquid attractant in the chamber. In an embodiment of the third aspect, the insect attractant cartridge further includes an attachment portion configured to attach to the insect trap. In an embodiment of the third aspect, the insect trap further includes a heating element in communication with the wick, wherein the heating element heats the insect attractant by radiation, conduction, or convection. In an embodiment of the third aspect, the insect attractant cartridge includes a double chamber container and wicks, and wherein the double chamber is configured to hold two different insect attractants, one part each of a two-part insect attractant, or an insect attractant and neutralizer. In an embodiment of the third aspect, the double chamber releases a first insect attractant at a first time and a second insect attractant at a second time. In an embodiment of the third aspect, the first and second insect attractants are released at intermittent time intervals. In an embodiment of the third aspect, the base portion further includes: a protrusion configured to puncture the removable insect attractant cartridge.

In a fourth aspect, an insect trap is disclosed including: a trap portion including an enclosure having an adhesive surface and a first opening, wherein the adhesive surface is at least partially contained within the enclosure and is configured to adhere to an insect; and a base portion configured to removably engage the trap portion with a plurality of engagement features. In an embodiment of the fourth aspect, the engagement features include a snap and a hook located on the base portion of the trap. In an embodiment of the fourth aspect, the engagement features further include a snap recess and a hook recess located on the trap portion of the trap. In an embodiment of the fourth aspect, the trap further includes grip features on the trap portion and/or base portion. In an embodiment of the fourth aspect, the grip features include: side recesses for fingers, grooves, ribs, bumps, or waves. In an embodiment of the fourth aspect, the base portion further includes: a mounting portion configured to communicate with and receive power from a power source, wherein the base portion includes a recessed area proximate to the mounting portion, which allows the insect trap to be flush with a wall when mounted thereto. In an embodiment of the fourth aspect, the enclosure further includes a second opening, the first opening located on a front surface of the enclosure and the second opening located on a side surface of the enclosure.

In a fifth aspect, an insect trap is disclosed including: a trap portion including an enclosure having an adhesive surface and a first opening, wherein the adhesive surface is at least partially contained within the enclosure and is configured to adhere to an insect and wherein the enclosure includes: a front housing portion; a rear housing portion; and a divider portion disposed at least partially between the front housing portion and rear housing portion, wherein the divider portion divides the enclosure into a front enclosure portion and a rear enclosure portion; a base portion configured to removably engage the trap portion; and an evaporable insect attractant located in the enclosure. In an embodiment of the fifth aspect, the evaporable attractant includes a solid, a liquid, a gel, or a suspension. In an embodiment of the fifth aspect, the evaporable insect attractant is located in the rear enclosure portion of the trap portion. In an embodiment of the fifth aspect, trap portion further includes a protective cap over the rear enclosure portion to prevent the evaporable insect attractant from escaping the trap when not engaged. In an embodiment of the fifth aspect, the rear enclosure portion further includes a wick for evaporating the evaporable insect attractant. In an embodiment of the fifth aspect, the base portion further includes: a heating element in communication with the wick, the heating element heats the insect attractant by radiation, conduction, or convection. In an embodiment of the fifth aspect, the base portion further includes: a mounting portion configured to communicate with and receive power from a power source, wherein the heating element is configured to receive power from the power source and heat at least a portion of the wick. In an embodiment of the fifth aspect, the front enclosure portion of the trap portion includes a plurality of openings in communication with the base portion, the openings configured to allow for evaporated insect attractant to move from the base portion into the trap portion. In an embodiment of the fifth aspect, the evaporated insect attractant is emitted from the first opening in the trap portion. In an embodiment of the fifth aspect, the divider portion includes a visual indicator, wherein the visual indicator provides one or more level lines indicative of the volume of insect attractant in the trap. In an embodiment of the fifth aspect, the insect attractant includes a colored or dyed liquid. In an embodiment of the fifth aspect, the divider portion includes a first membrane and a protrusion configured to puncture the first membrane. In an embodiment of the fifth aspect, the divider portion includes a second membrane. In an embodiment of the fifth aspect, the first membrane includes a barrier membrane and wherein the second membrane includes an absorbable membrane. In an embodiment of the fifth aspect, the absorbable membrane is proximate to the rear enclosure portion and wherein the rear enclosure portion holds the evaporable insect attractant. In an embodiment of the fifth aspect, the absorbable membrane is configured to absorb the evaporable insect attractant when the protrusion punctures the barrier membrane. In an embodiment of the fifth aspect, the divider portion includes a visual indicator, wherein the visual indicator provides one or more level lines indicative of the volume of insect attractant in the trap. In an embodiment of the fifth aspect, the base portion includes a lighting element configured to provide light to the enclosure and wherein the lighting element is configured to communicate with and receive power from a power source.

In a sixth aspect, an insect trap is disclosed including: a trap portion including an enclosure having an adhesive surface and a first opening, wherein the adhesive surface is at least partially contained within the enclosure and is configured to adhere to an insect; a base portion configured to removably engage the trap portion; a reservoir assembly configured to be received in the trap portion or base portion; and a punch configured to puncture reservoir assembly and activate the contents of reservoir assembly. In an embodiment of the sixth aspect, the reservoir assembly is located within the trap portion and the punch is located on the base portion. In an embodiment of the sixth aspect, the punch has a plurality of grooves that extend a portion of the length of the punch. In an embodiment of the sixth aspect, the punch is configured to act as a seal against the reservoir assembly when the reservoir assembly is punctured. In an embodiment of the sixth aspect, the reservoir assembly includes a first chamber and a second chamber. In an embodiment of the sixth aspect, the first chamber includes a water and sugar solution and the second chamber includes a yeast culture. In an embodiment of the sixth aspect, the punch is configured to puncture a passageway from the first chamber into the second chamber. In an embodiment of the sixth aspect, the activated contents of the reservoir assembly produce carbon dioxide. In an embodiment of the sixth aspect, the carbon dioxide is emitted from the first opening in the trap portion.

In a seventh aspect, an insect trap is disclosed including: a trap portion including a housing having an adhesive surface, wherein the adhesive surface is at least partially contained within the housing and is configured to adhere to an insect; and a base portion including: a mounting portion configured to communicate with and receive power from a power source, and a heating element configured to receive power from the power source and heat the adhesive surface of the trap portion, wherein the base portion is configured to removably engage the trap portion. In an embodiment of the seventh aspect, the heating element includes one or more heating wires configured to provide the adhesive surface with a predetermined heating profile. In an embodiment of the seventh aspect, the one or more heating wires are arranged in a pattern including a concentric pattern, a vertical pattern, a horizontal pattern, or a labyrinthine pattern. In an embodiment of the seventh aspect, the predetermined heating profile includes a uniform pattern or non-uniform pattern. In an embodiment of the seventh aspect, the one or more heating wires are constructed from conductive polymers, self correcting conductive polymers, metals, or metal oxides. In an embodiment of the seventh aspect, the heating wires are configured to maintain a temperature of the adhesive surface at approximately 30° C. to approximately 45° C. In an embodiment of the seventh aspect, the heating wires are configured to maintain a temperature of the adhesive surface at approximately 33° C. to approximately 42° C. In an embodiment of the seventh aspect, the base portion further includes a lighting element configured to illuminate the adhesive surface of the trap portion.

In an eighth aspect, an insect trap is disclosed including: a trap portion including: a housing having an adhesive surface, wherein the adhesive surface is at least partially contained within the housing and is configured to adhere to an insect, a heating element configured to heat the adhesive surface; and a base portion including a mounting portion configured to receive power from a power source and configured to provide the power to the heating element, wherein the base portion is configured to removably engage the trap portion. In an embodiment of the eighth aspect, the heating element includes one or more heating wires configured to provide the adhesive surface with a predetermined heating profile. In an embodiment of the eighth aspect, the one or more heating wires are arranged in a pattern including a concentric pattern, a vertical pattern, a horizontal pattern, or a labyrinthine pattern. In an embodiment of the eighth aspect, the predetermined heating profile includes a uniform pattern or non-uniform pattern. In an embodiment of the eighth aspect, the one or more heating wires are constructed from conductive polymers, self correcting conductive polymers, metals, or metal oxides. In an embodiment of the eighth aspect, the heating wires are configured to maintain a temperature of the adhesive surface at approximately 30° C. to approximately 45° C. In an embodiment of the eighth aspect, the heating wires are configured to maintain a temperature of the adhesive surface at approximately 33° C. to approximately 42° C. In an embodiment of the eighth aspect, the base portion further includes a lighting element configured to illuminate the adhesive surface of the trap portion.

Further objects, features, and advantages of the disclosure will be apparent from the following detailed description when taken in conjunction with the following drawings.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 30 is a front perspective view of a ninth embodiment of an insect trap in accordance with principles of the disclosure;

FIG. 31 is a cross sectional view of the insect trap of FIG. 30;

FIG. 32 is an enlarged view of a portion of FIG. 31;

FIG. 110 is a cross-sectional view of the insect trap of FIG. 108;

FIG. 111 is an enlarged view of a portion of FIG. 110;

FIG. 119 is an enlarged view of a portion of FIG. 118;

FIG. 120 is a front perspective view of an example of the twenty-third embodiment of an insect trap in accordance with the principles of the disclosure;

FIG. 121 is an exploded view of a trap portion of the insect trap of FIG. 120:

FIG. 122 is a cross-sectional view of the insect trap of FIG. 120;

FIG. 123 is an enlarged view of a portion of FIG. 122;

FIG. 124 is a cross-sectional view of the insect trap of FIG. 120;

FIG. 125 is an enlarged view of a portion of FIG. 124;

FIG. 126 is a front perspective view of an example of the twenty-third embodiment of an insect trap in accordance with the principles of the disclosure;

FIG. 127 is a cross-sectional view of the insect trap of FIG. 126;

FIG. 128 is an enlarged view of a portion of FIG. 127;

FIG. 129 is a front perspective view of a twenty-fourth embodiment of an insect trap in accordance with principles of the disclosure;

FIG. 130 is a front perspective view of the insect trap of FIG. 129;

Figure 129:
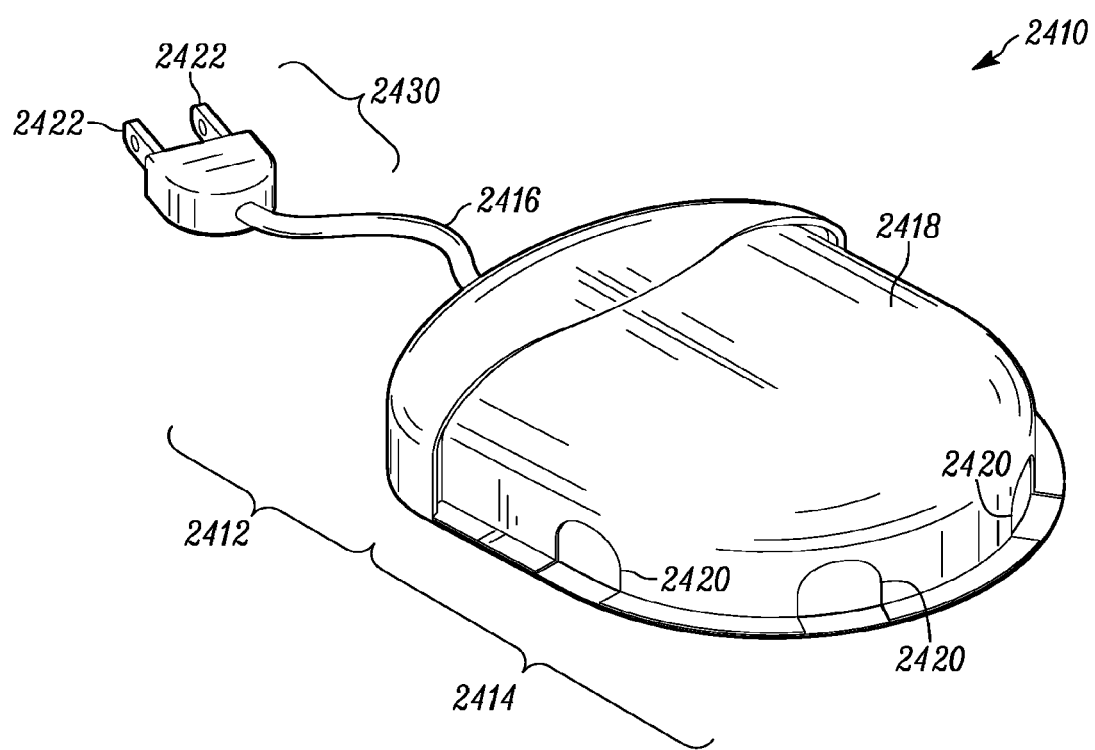
Figure 131:
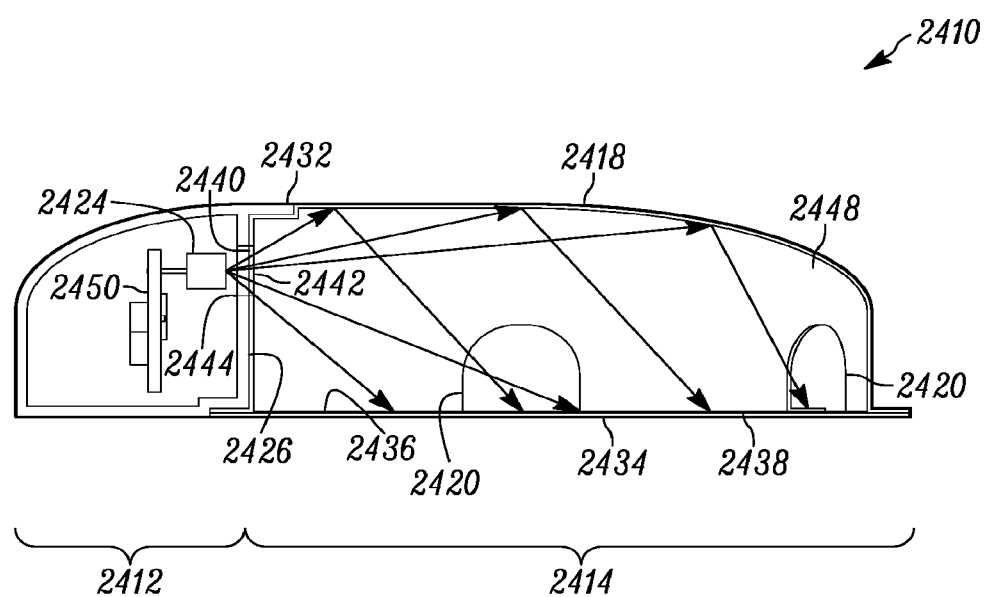
Figure 132:
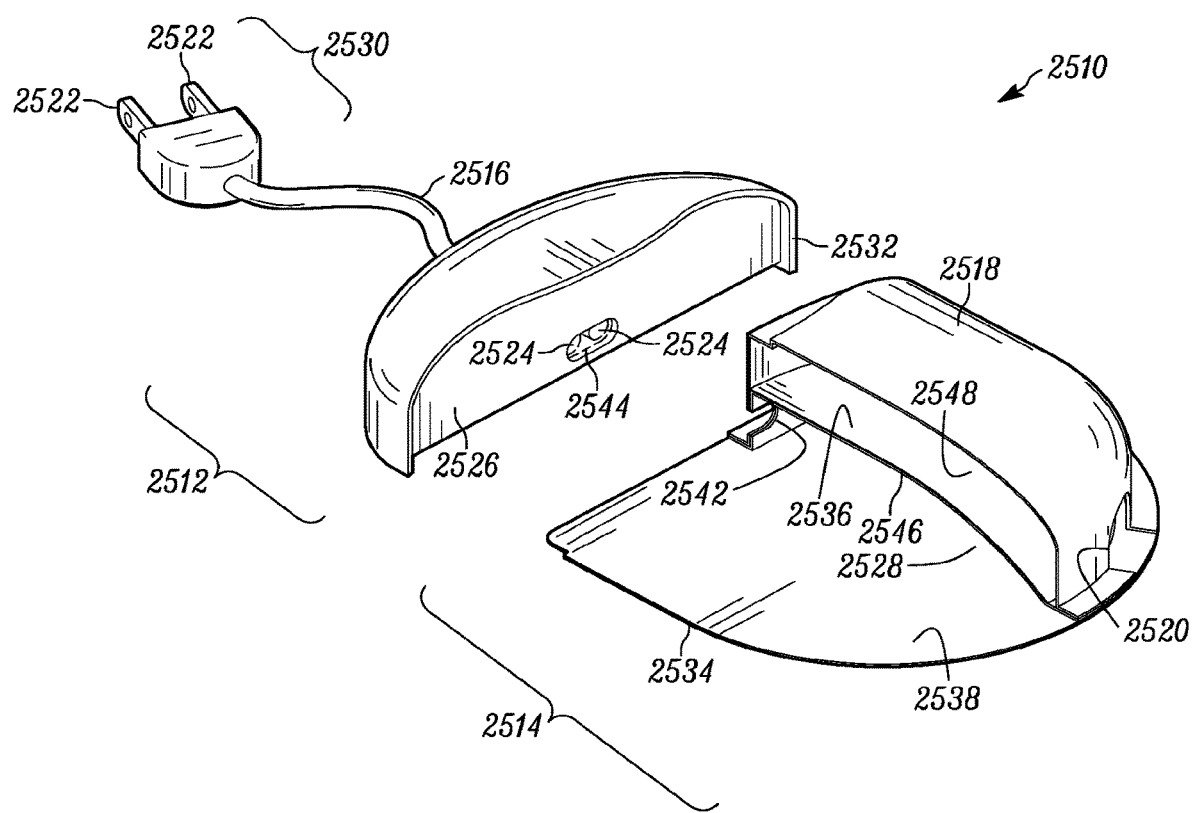
Figure 133:
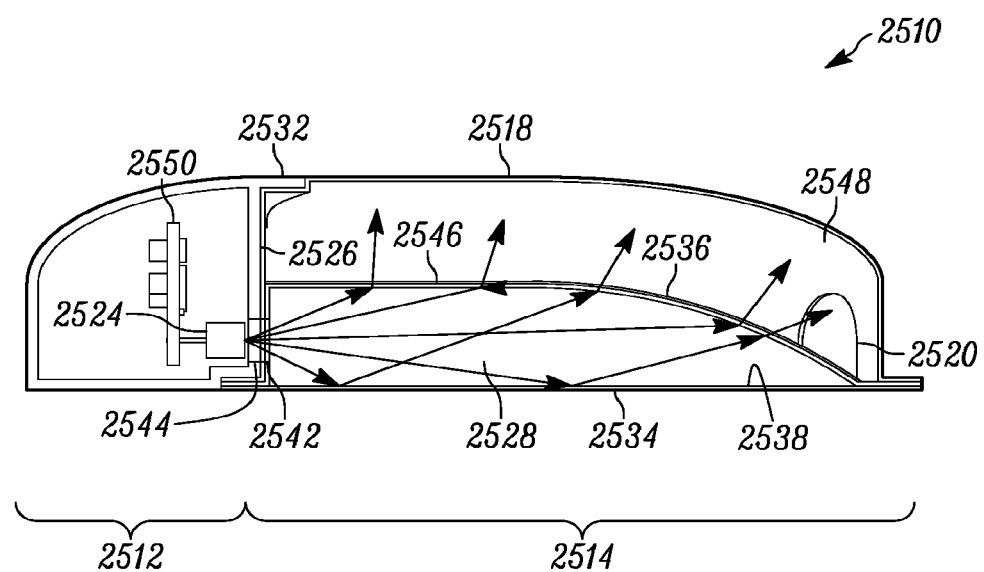
Figure 134:
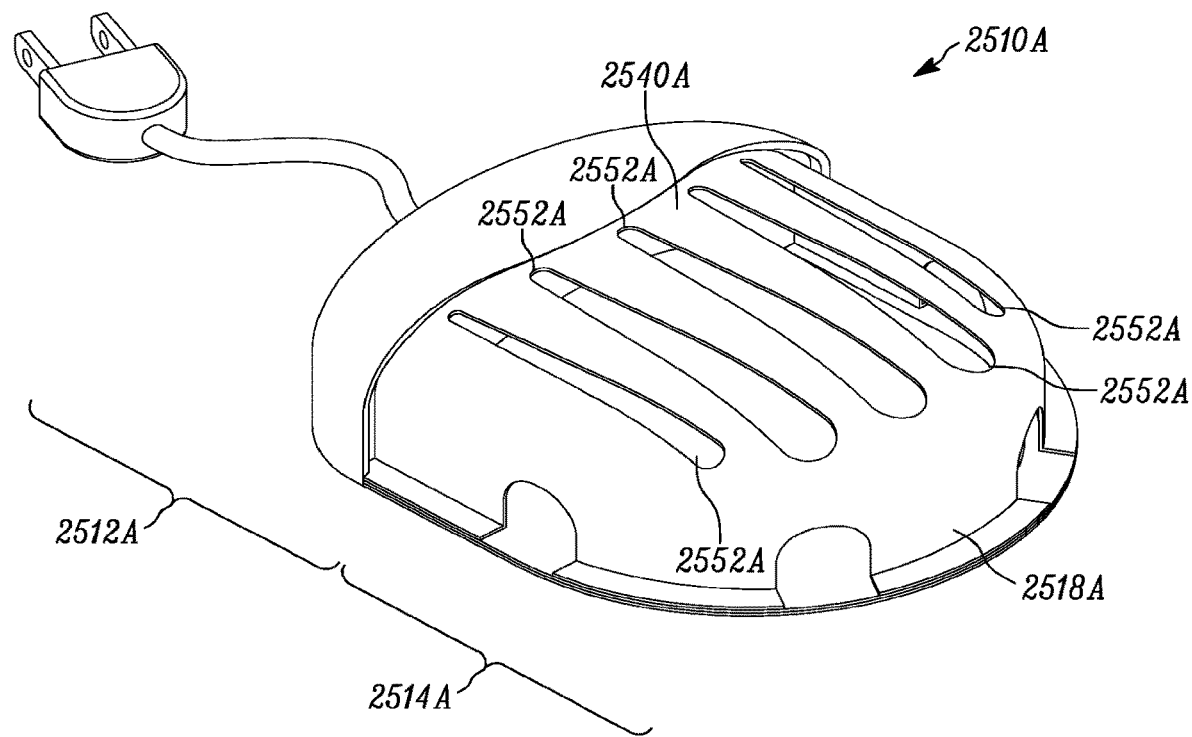
Figure 135:
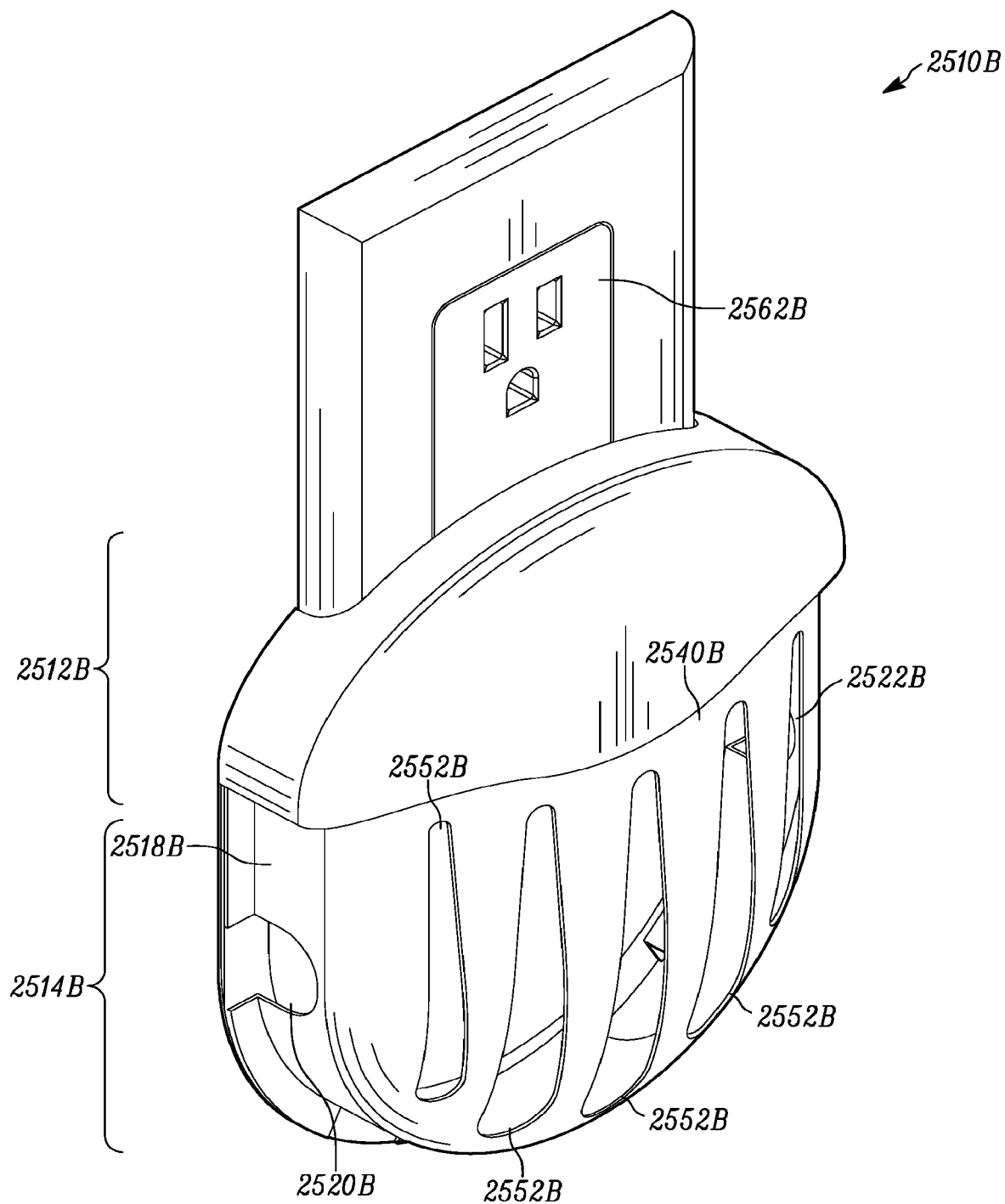
Figure 136:
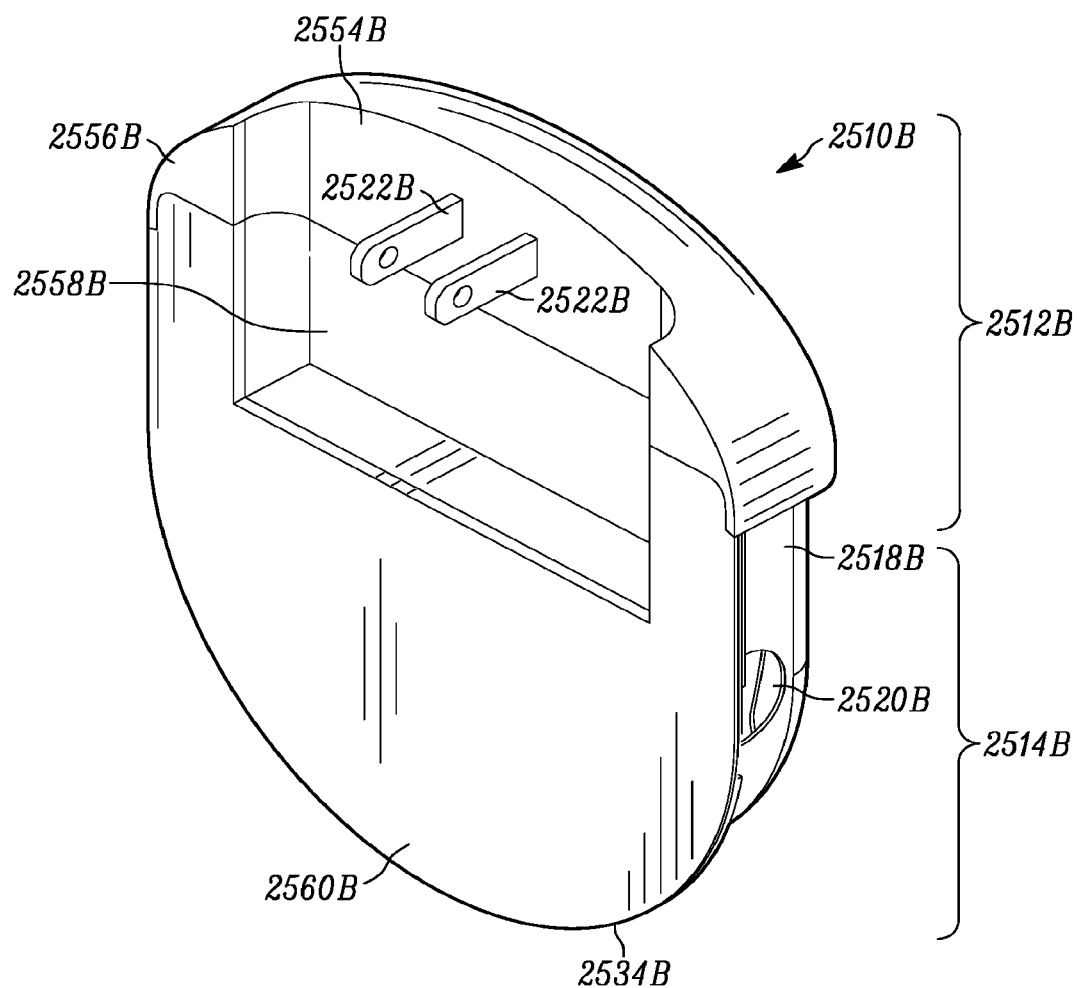
Figure 137:
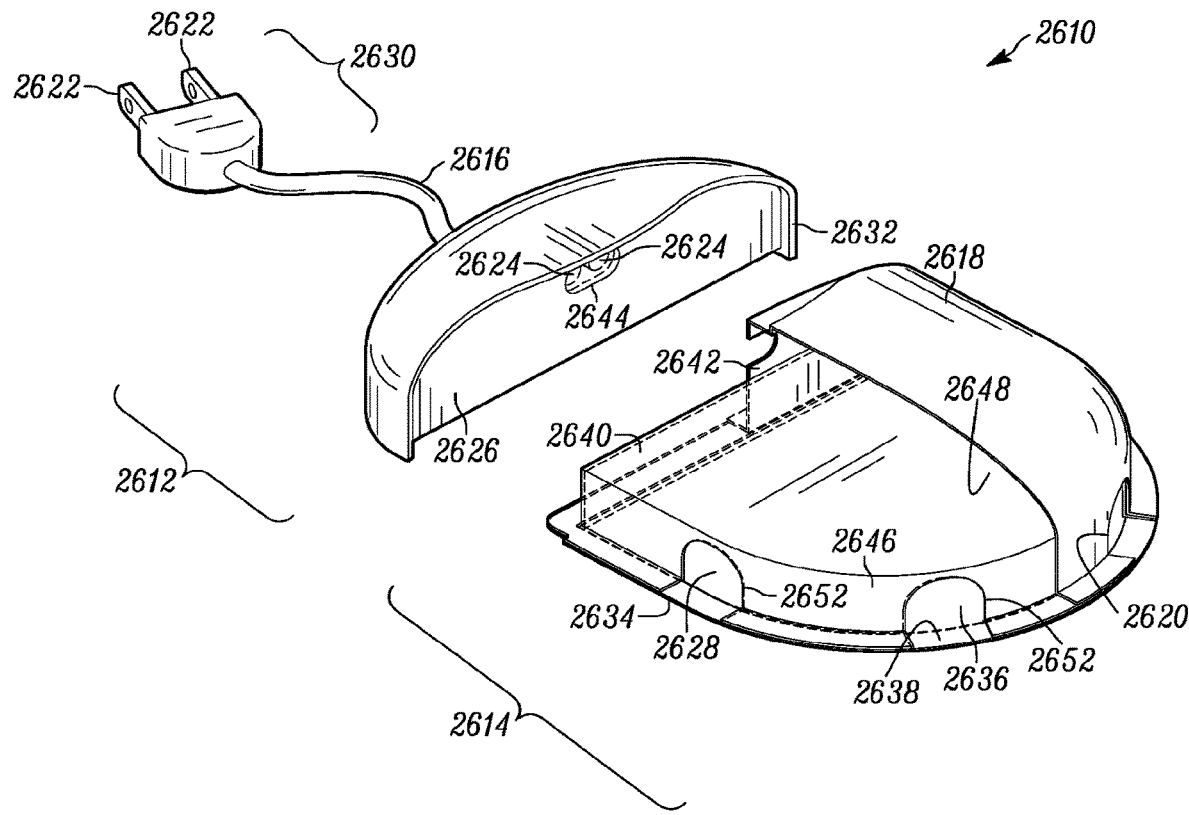
Figure 138:
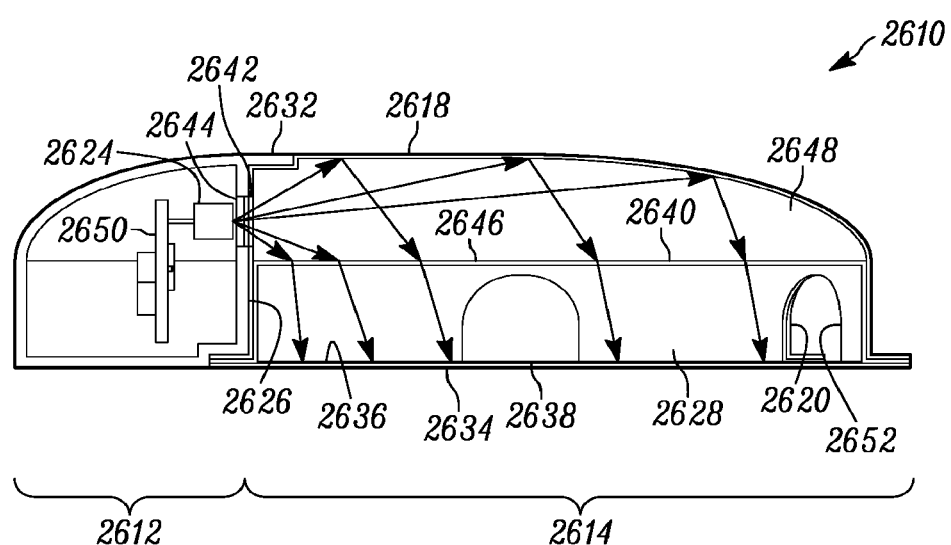
Figure 139:
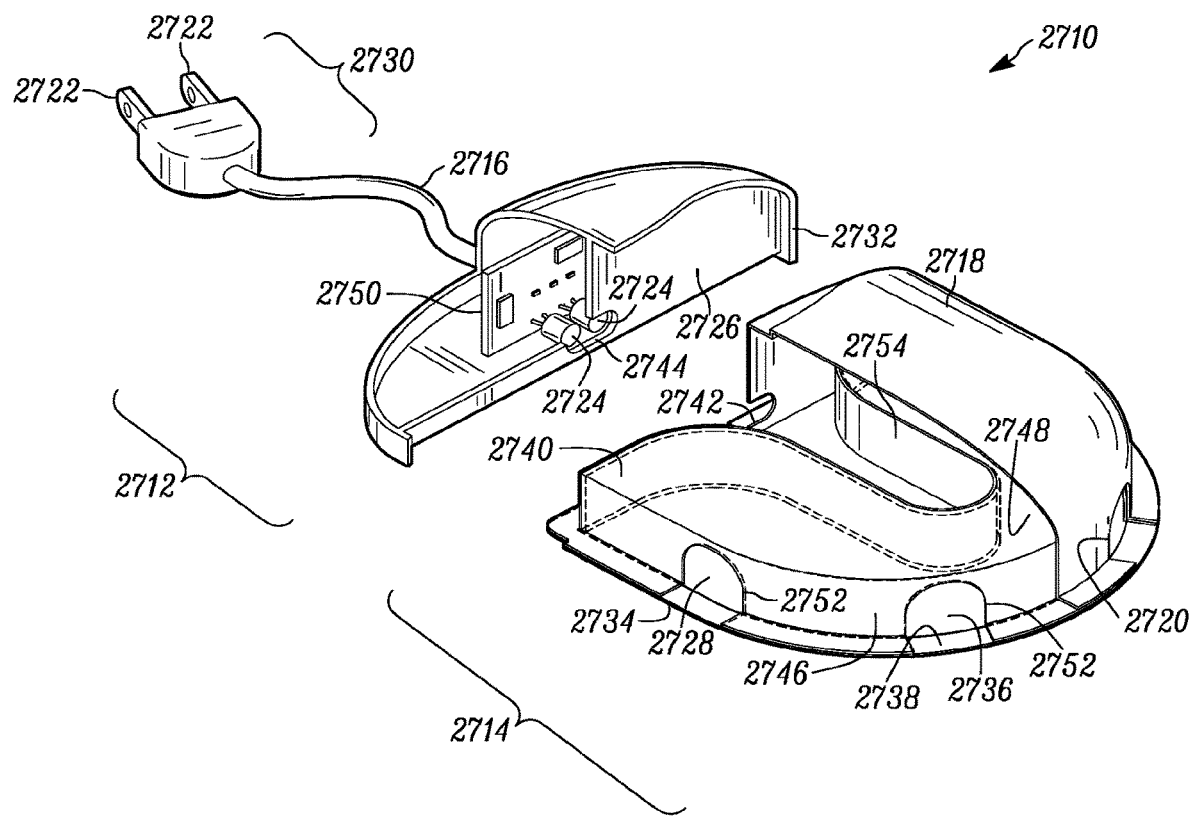
Figure 140:
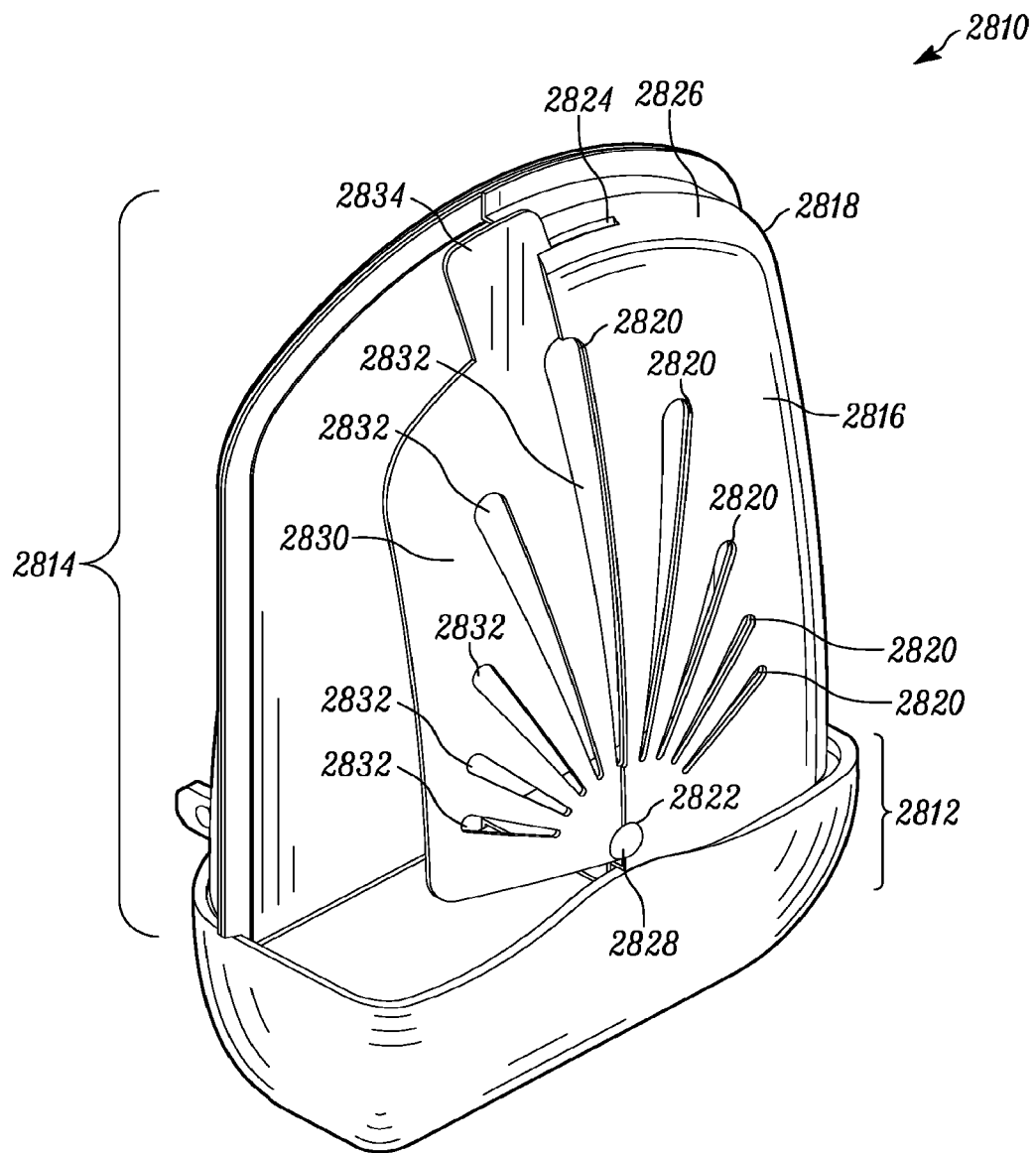
Figure 141:
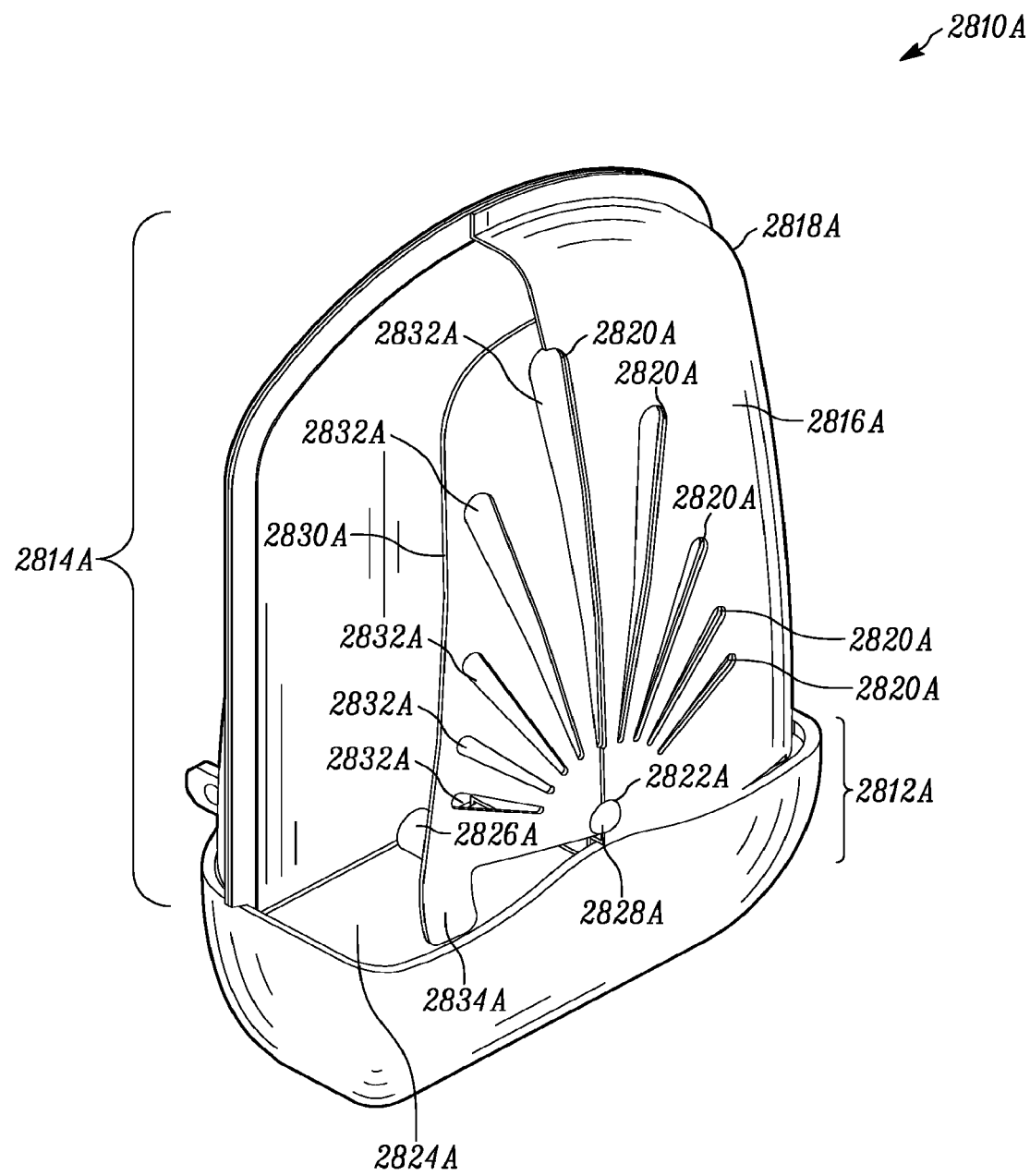

FIG. 131 is a cross-sectional view of the insect trap of FIG. 129;

FIG. 132 is a front perspective view of a twenty-fifth embodiment of an insect trap in accordance with principles of the disclosure;

FIG. 133 is a cross-sectional view of the insect trap of FIG. 132;

FIG. 134 is a front perspective view of an example of the twenty-fifth embodiment of an insect trap in accordance with the principles of the disclosure;

FIG. 135 is a front perspective view of an example of the twenty-fifth embodiment of an insect trap in accordance with the principles of the disclosure;

FIG. 136 is a rear perspective view of the insect trap of FIG. 135;

FIG. 137 is a front perspective view of a twenty-sixth embodiment of an insect trap in accordance with principles of the disclosure;

FIG. 138 is a cross-sectional view of the insect trap of FIG. 137;

FIG. 139 is a front perspective view of a twenty-seventh embodiment of an insect trap in accordance with principles of the disclosure;

FIG. 140 is a front perspective view of a twenty-eighth embodiment of an insect trap in accordance with the principles of the disclosure; and FIG. 141 is a front perspective view of an example of the twenty-eighth embodiment of an insect trap in accordance with the principles of the disclosure.

DETAILED DESCRIPTION

Figure 1:
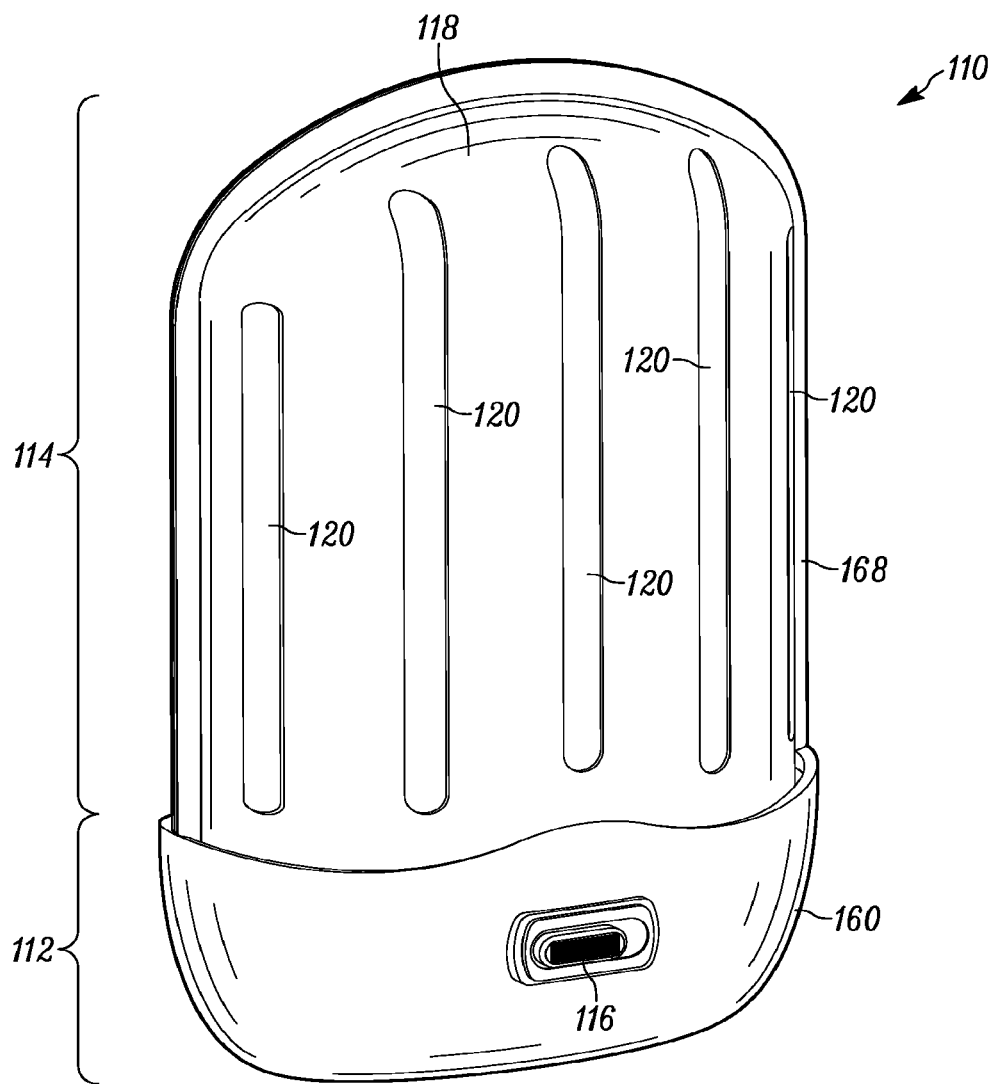
FIG. 1 is a front perspective view of a first embodiment of an insect trap in accordance with principles of the disclosure.

With reference to the drawings, FIG. 1 is a front perspective view of an embodiment of an insect trap, indicated generally at 110. Insect trap 110 includes a base portion 112 and a removable trap portion 114. Insect trap 110 may have an overall length, an overall width and an overall depth, and may be configured such that when insect trap 110 is mounted to a wall, its overall depth, defined by the overall distance insect trap 110 protrudes from the wall, is the smallest of the three overall dimensions. A front surface 160 of base portion 112 may include a switch 116, configurable to enable insect trap 110 to be turned on or off by closing or opening switch 116 as desired by the user. Alternatively, switch 116 may be configured to control other features such as light intensity, combinations of light wavelengths, different modes or frequencies of flickering light, an automatic setting that turns on when the room gets dark, or a remote control setting, for example. Switch 116 may be manually operated, although switch 116 may also be operated electrically, optically, electro-mechanically, electro-optically, or by any other method or combination of methods for opening or closing switch 116. Trap portion 114 includes a front housing 118 with at least one opening 120 in a front surface 168. Opening 120 in front housing 118 may be configured to admit a wide variety of insects into insect trap 110, or alternatively it may be configured to admit one or more specific insect species. In some embodiments, opening 120 is configured to prevent the user's fingers from penetrating opening 120 and inadvertently touching trapped insects or adhesive when removing and replacing trap portion 114. In some embodiments, opening 120 has a size and shape such that a sphere 25 mm in diameter cannot pass through opening 120, and has a size and shape such that a sphere 1 mm in diameter can pass through any portion of opening 120. Opening 120 may be of uniform or of varying width, shape and orientation, and if trap portion 114 has more than one opening 120, they may be of identical or of differing widths, shapes and orientations. Opening 120 may be configured to attract one or more individual insect species or a variety of insect species.

Figure 2:
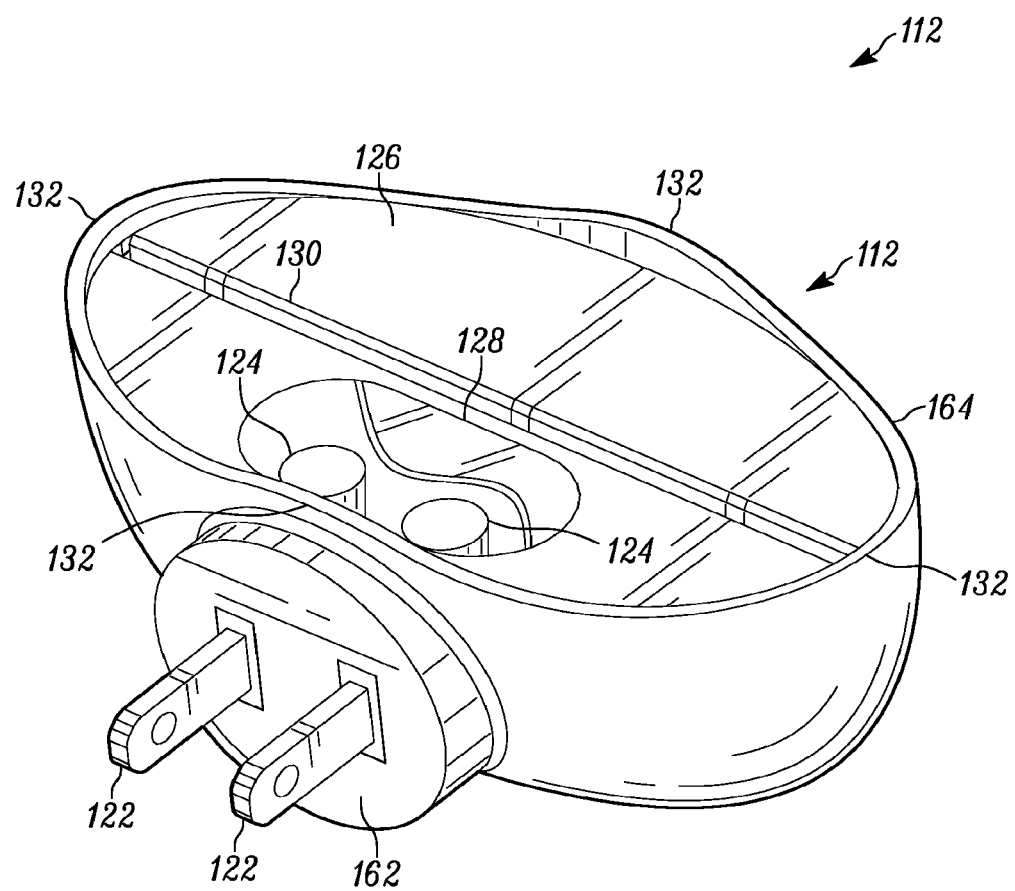
FIG. 2 is a rear perspective view of a base portion of the insect trap of FIG. 1.

FIG. 2 is a rear perspective view of base portion 112 of insect trap 110 with trap portion 114 removed. Protruding from a rear surface 162 of base portion 112 are a plurality of electrically conductive prongs 122, adapted to mount insect trap 110 to a wall and provide power to insect trap 110 by inserting conductive prongs 122 into a standard household electrical wall socket. Alternatively, conductive prongs 122 may be adapted to swivel to allow insect trap 110 to remain upright when conductive prongs 122 are inserted into a horizontally-oriented household electrical wall socket. Alternatively, base portion 112 may be configured to sit or hang wherever desired and receive power from batteries (not shown) mounted in base portion 112. While an electrical socket and batteries have been described as providing power to insect trap 110, any suitable power source may be used.

Base portion 112 includes a lighting element such as one or more light emitting diodes (LEDs) 124. In some embodiments, LEDs 124 include at least one that emits ultraviolet (UV) light and at least one that emits visible light. In some embodiments, LEDs 124 include at least one that emits UV light and at least one that emits blue light, to better attract a wide variety of insect species. In some embodiments, the lighting element emits a combination of wavelengths to mimic sunlight. In some embodiments, LEDs 124 include at least one that emits infrared (IR) light, to better attract certain species of insects such as mosquitos. Mounted in a top surface 126 of base portion 112 may be a transparent or translucent window 128, shown partially cut away to reveal LEDs 124. Window 128 protects LEDs 124 from dust and insect debris, and allows base portion 112 to be easily cleaned. In top surface 126 may be a slot 130, and on the perimeter 164 of top surface 126 is a rim or upwardly directed protrusions 132.

Figure 3:
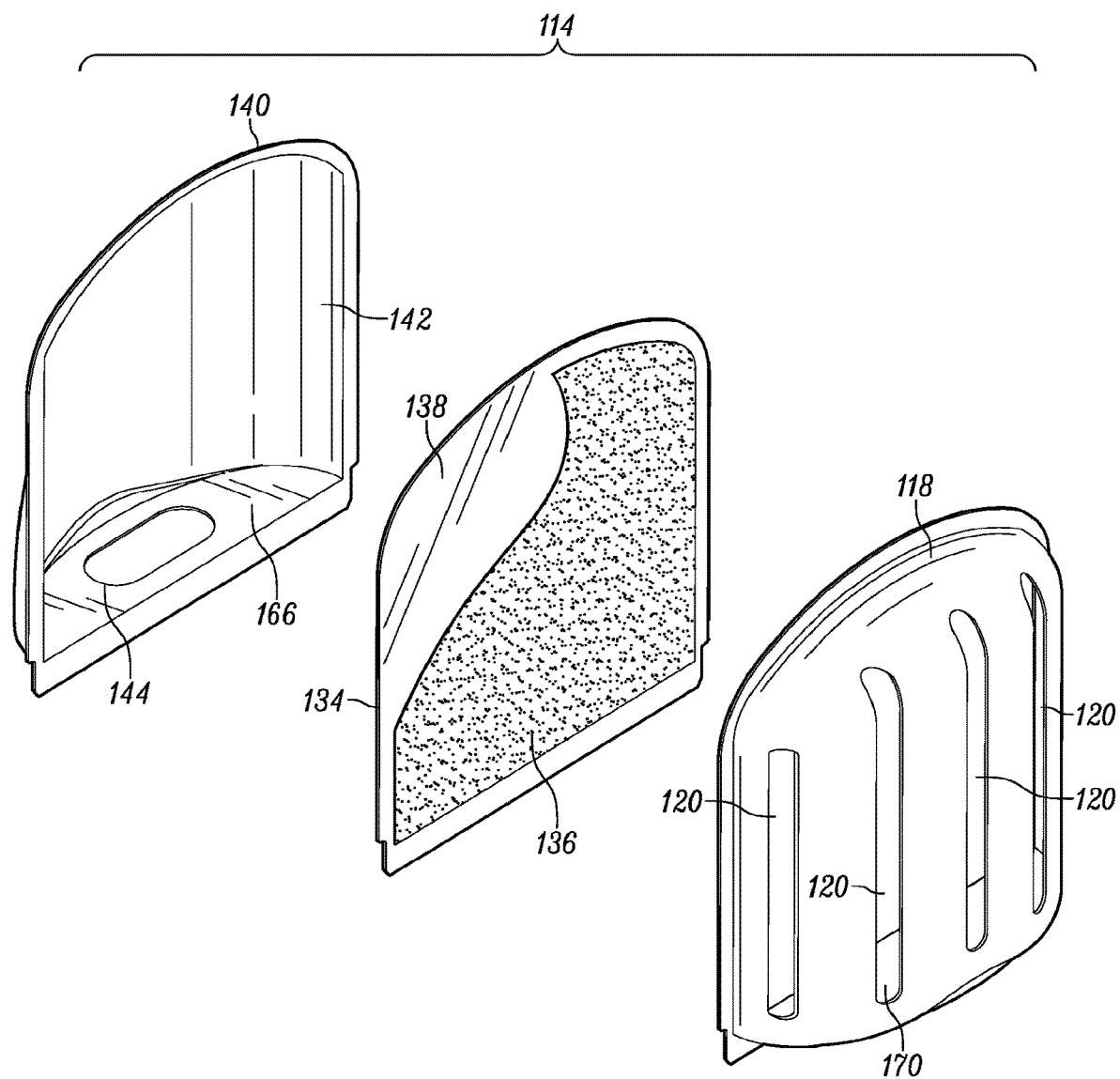
FIG. 3 is an exploded view of a trap portion of the insect trap of FIG. 1.

FIG. 3 is an exploded view of trap portion 114 of insect trap 110. Trap portion 114 may have an overall length, an overall width and an overall depth, and may be configured such that when trap portion 114 is mounted in insect trap 110, and insect trap 110 is mounted to a wall, the overall depth of trap portion 114, which is measured in the direction perpendicular to the wall, is the smallest of the three overall dimensions of trap portion 114. Trap portion 114 includes a divider 134 which may have a front surface 138, and a rear housing 140. In some embodiments, divider 134 is constructed from or includes a transparent or translucent material and may be coated with a transparent or translucent adhesive 136 on front surface 138. Adhesive 136 is shown partly cut away in this view. In some embodiments, divider 134 is configured to polarize light transmitted through it in an orientation similar to that of daylight to further attract flying insects, a wide variety of which are known to detect polarized light. In some embodiments, the material and thickness of divider 134 and the material and thickness of adhesive 136 are selected to transmit a substantial proportion of the UV and/or visible and/or IR light, for example greater than 60% of the light is transmitted through divider 134 and adhesive 136. In some embodiments, rear housing 140 includes a reflective-coated inside surface 142. Alternatively, the material and surface finish of rear housing 140 may be configured to reflect and disperse UV and/or visible and/or IR light without a reflective coating. Rear housing 140 may include at least one opening 144 on its bottom surface 166, or alternatively opening 144 may be replaced by a transparent or translucent window (not shown).

In some embodiments, front housing 118 and rear housing 140 are thermoformed from opaque sheet plastic. Alternatively, other opaque, transparent or translucent materials such as paper, paperboard, cardboard or paper pulp may also be used. In some embodiments, front housing 118 and rear housing 140 are constructed by injection molding, casting or by other suitable manufacturing techniques. As shown, divider 134 is substantially planar, although it may be formed into a convex, concave or saddle-shaped contour, or a combination of contours to optimize the even distribution of light. Alternatively, divider 134 may have ribs or other features that increase adhesive surface area and create regions of light/dark contrast, which are highly visible to a wide variety of insects and may be more attractive to them.

In some embodiments, front housing 118 may be coated with transparent, translucent or opaque adhesive on an inside surface 170 to provide additional insect trapping efficiency and capacity. In addition, front housing 118 may also have a reflective coating (not shown) underneath the adhesive coating on inside surface 170 to enhance its attraction to insects and further improve the insect trapping efficiency and effectiveness.

In some embodiments, front housing 118, divider 134 and rear housing 140 are joined together at their perimeters with adhesive, although they may also be joined by other commonly used packaging assembly techniques such as ultrasonic welding or RF sealing, or any other suitable assembly method. The materials of trap portion 114 may also include one or more insect attractants. For example, trap portion 114 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of insect trap 110. In such embodiments, the insect attractant is integral to trap portion 114. Alternatively, the insect attractants may be embedded or contained in a separate piece (not shown) that mounts on inside surface 170 or an outside surface of front housing 118 or through opening 120 in front housing 118 or on front surface 138 of divider 134. Alternatively, water may be embedded or contained in the separate part in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate part in addition to, or in place of, the one or more insect-attracting substances. It is desirable for such attractants to be detectable by an insect for approximately a 2 meter radius from insect trap 110.

Figure 4:
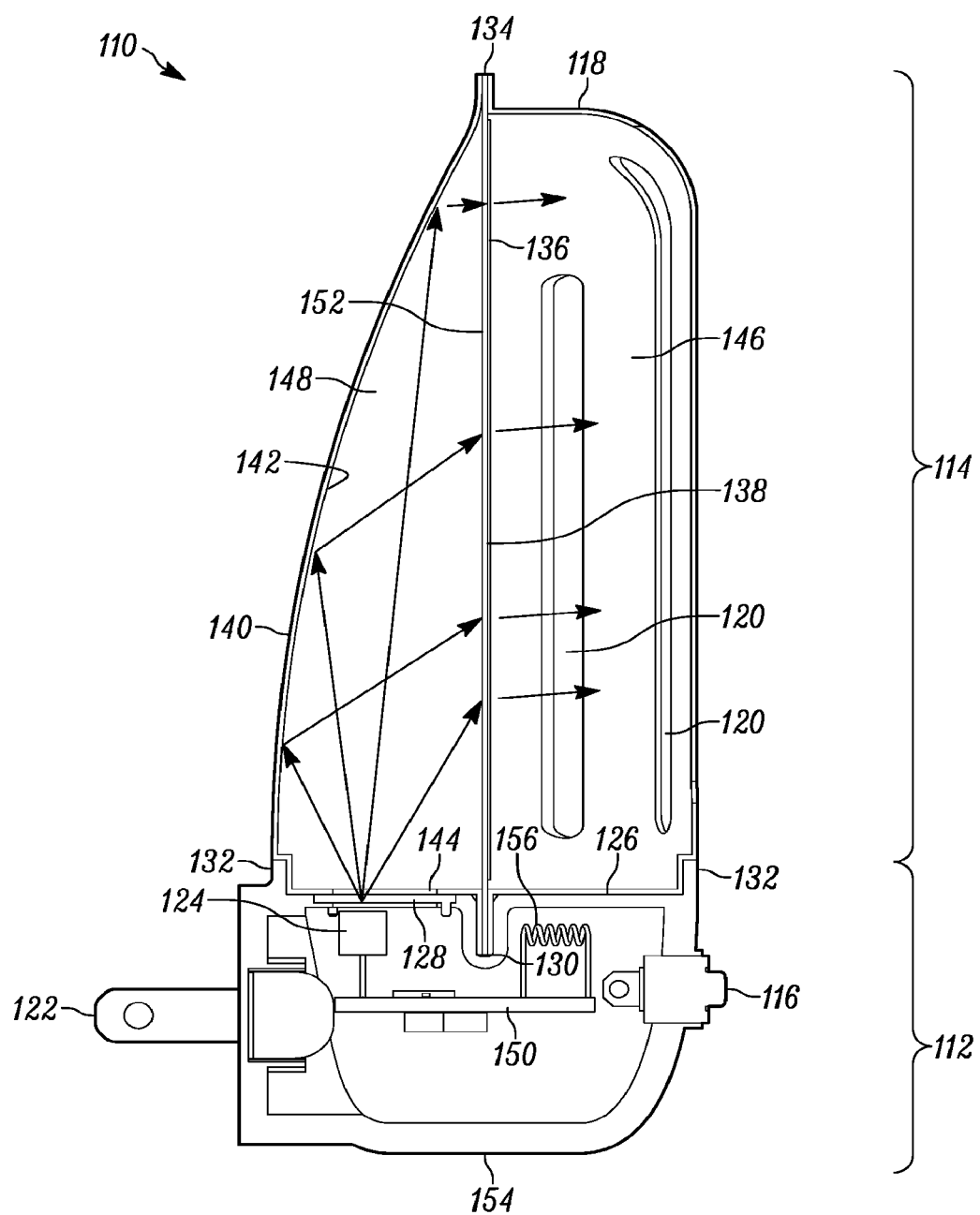
FIG. 4 is a cross-sectional view of the insect trap of FIG. 1.

FIG. 4 is a cross-sectional view of insect trap 110. As shown, divider 134 separates trap portion 114 into a front enclosure 146 and a rear enclosure 148. In some embodiments, base portion 112 includes a circuit board 150 having a programmable processor or chip (not shown) for executing commands, electrically connected to conductive prongs 122, only one of which is shown, switch 116 and LEDs 124, only one of which is shown. For clarity, however, not all of the electrical connections are shown. Circuit board 150 may include electronic circuitry to receive ordinary household current from conductive prongs 122, respond to the position of switch 116 and provide power to illuminate LEDs 124. Circuit board 150 may include an energy stabilizer such as a full wave rectifier circuit or any other circuit that provides steady voltage to LEDs 124 when switch 116 is in the closed position, although it may also provide a varying voltage to LEDs 124 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 150 may provide power to LEDs 124 to provide UV and/or visible and/or IR light, although it may be configured to provide power to only UV LEDs 124 or to only visible light LEDs 124 or to only IR light LEDS 124, or to provide variable power to produce combinations of flickering UV and/or visible and/or IR light. Circuit board 150 may also be configured to drive a transmitter or transceiver such as a piezoelectric speaker (not shown) or other device that may be mounted in the base portion 112 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 110. It is desirable for such insect-attracting sound to be undetectable by a human beyond approximately a 1-meter distance from insect trap 110. Circuit board 150 may also include one or more electrical heating elements 156 such as one or more resistance heating coils, or one or more resistors, or one or more heat exchanging elements (e.g., elements using the Peltier effect and/or the Thomson effect to move heat to a specific region), or a combination of electrical elements that generate and/or move heat, which may transmit through base portion 112 and into trap portion 114, to attract some insect species, including fleas and mosquitoes. Alternatively, one or more of LEDs 124 may generate heat, to replace or augment the heat generated by the one or more electrical elements. Alternatively, one or more of LEDs 124 may be replaced or augmented by one or more incandescent light bulbs to generate both heat and light. In general, the heat generated may increase and maintain the temperature of at least a portion of trap portion 114 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, slot 130 in top surface 126 of base portion 112 and protrusions 132 on top surface 126 of base portion 112 engage with trap portion 114 to secure it in place during use, although any other form of attachment may be substituted that allows trap portion 114 to be securely but removably mounted to base portion 112. A bottom surface 154 of base portion 112 may be substantially flat or concave to allow insect trap 110 to sit upright on a floor, desk, table or shelf when insect trap 110 is unplugged. Alternatively, bottom surface 154 of base portion 112 may have two or more protrusions or legs (not shown) that allow insect trap 110 to sit upright when insect trap 110 is unplugged.

In the operation of insect trap 110, conductive prongs 122 are inserted into a wall electrical socket, and switch 116 is moved to a closed position. LEDs 124 emit light, represented by arrows, preferably UV and visible light, which is transmitted through window 128 in base portion 112, through opening 144 in bottom surface 166 of rear housing 140 of trap portion 114, into rear enclosure 148, and directly onto inside surface 142 of rear housing 140 and a rear surface 152 of divider 134. Because light from LEDs 124 enters rear enclosure 148 through opening 144 in bottom surface 166 of rear housing 140 of trap portion 114 (e.g., in a face that is substantially parallel to the overall depth of trap portion 114), the light from LEDs 124 can travel the entire length of rear enclosure 148 and can diverge over the entire length of rear enclosure 148, and therefore can be more evenly distributed throughout rear enclosure 148. In some embodiments, light is not manipulated in base portion 112 and is emitted directly into trap portion 114. Inside surface 142 of rear housing 140 may include a concave shape and may be configured to reflect and disperse the light from LEDs 124 to distribute the light evenly onto rear surface 152 of divider 134, although inside surface 142 of rear housing 140 may have a convex or a saddle shape or a combination of shapes, or may also have ribs or other features to more evenly distribute the light. Alternatively, an optical enhancer such as an anamorphic lens (not shown) or any other lens or combination of lenses configured to distribute the light (e.g., evenly, according to specific patterns, at a focal point, etc.) onto rear surface 152 of divider 134, may be mounted to rear housing 140 at or near opening 144 or mounted to base portion 112 at or near window 128, and may replace or augment the role of inside surface 142 of rear housing 140. In some embodiments, the light from LEDs 124 directly strikes rear surface 152 of divider 134 at an oblique angle (e.g., an acute angle from approximately 0° to 90°) and spreads across divider 134, and replaces or augments the role of inside surface 142 of rear housing 140 or of the lens or lenses mounted to rear housing 140.

Thereafter, light transmits through divider 134 and adhesive 136 on front surface 138, and into front enclosure 146. Light may be further evenly distributed by the light-diffusing properties of divider 134, adhesive 136 on front surface 138, or both. A portion of the light entering front enclosure 146 continues through opening 120 in front housing 118 and is emitted into the surrounding area where the insect trap 110 is installed. Insects are attracted to the light emitted through adhesive coating 136 and through opening 120 in front housing 118, and fly or crawl into opening 120 and onto adhesive 136, where they become trapped in the adhesive (e.g., from adhesive 136). A user may observe trapped insects by looking through opening 120 in front housing 118. When a sufficient number of insects have been trapped, the user may easily remove and discard the entire used trap portion 114 without touching the trapped insects, insect debris or adhesive, which remain out of reach inside trap portion 114, and replace it with a new trap portion 114. New trap portion 114 has fresh adhesive-coated surfaces and light-directing surfaces, ensuring that insect trap 110 will continue to efficiently and effectively attract and trap insects.

In some embodiments, because trap portion 114 mounts on top of, and not in front of, base portion 112, insect trap 110 protrudes minimally from the wall when plugged into an ordinary household wall socket, and therefore intrudes minimally into the home environment. In some embodiments, insect trap 110 is configured such that when insect trap 110 is mounted to a wall, its overall depth, defined by the overall distance insect trap 110 protrudes from the wall, is smaller than its overall height and its overall width.

It should be appreciated that a benefit of insect trap 110 is the manipulation of light within trap portion 114. In some embodiments, light manipulation occurs solely within trap portion 114. Light manipulation may include reflection, refraction, polarization, dispersion and/or diffusion and is achieved by engaging with a manipulative element or surface (e.g., inside surface 142, divider 134 and adhesive 136). In some embodiments, light manipulation produces an even distribution of light on adhesive 136. In some embodiments, light is manipulated to produce a predetermined pattern on the adhesive 136 or within trap portion 114, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 110 of this configuration may accommodate a variety of different trap portions 114 that may be removably mounted to base portion 112, each trap portion 114 being uniquely configured to attract and trap a specific species or multiple species of flying insect. For example, the overall size and shape of trap portion 114, and the size, shape, location and orientation of opening 120 in front housing 118 of trap portion 114, may be uniquely configured to attract and trap a specific species or multiple species of flying insect. For example, in some embodiments, trap portion 114 is approximately 20 mm to 600 mm wide, 20 mm to 600 mm high and 5 mm to 150 mm deep. In some embodiments, trap portion 114 is approximately 20 mm to 200 mm wide, 20 mm to 200 mm high and 5 mm to 80 mm deep. In some embodiments, trap portion 114 is approximately 20 mm to 130 mm wide, 20 mm to 130 mm high and 5 mm to 50 mm deep.

In some embodiments, base portion 112 is approximately 20 mm to 600 mm wide, 10 mm to 150 mm high and 10 mm to 150 mm deep. In some embodiments, base portion 112 is 20 mm to 200 mm wide, 10 mm to 100 mm high and 10 mm to 80 mm deep. In some embodiments, base portion 112 is 20 mm to 130 mm wide, 10 mm to 50 mm high and 10 mm to 50 mm deep.

As provided herein, opening 120 may be a variety of shapes and/or sizes. For example, opening 120 may be circular, square, rectangular, polygonal and/or elliptical in shape. Alternatively, opening 120 may be slot shaped having a straight, curved or undulating shape or pattern. When opening 120 is circular, opening 120 may be approximately 0.5 mm to 30 mm in diameter. In some embodiments, circular opening 120 is approximately 0.5 mm to 20 mm in diameter. In some embodiments, circular opening 120 is approximately 0.5 mm to 15 mm in diameter. When opening 120 is slot shaped, opening 120 may be approximately 2 mm to 30 mm wide and 5 mm to 500 mm long. In some embodiments, slot shaped opening 120 is approximately 2 mm to 20 mm wide and 5 mm to 200 mm long. In some embodiments, slot shaped opening 120 is approximately 2 mm to 15 mm wide and 5 mm to 100 mm long.

In some embodiments, opening 120 covers all or a portion of front housing 118. For example, opening 120 may cover a range of approximately 1% to 75% of the surface area of front housing 118. In some embodiments, opening 120 covers approximately 5% to 50% of the surface area of front housing 118. In some embodiments, opening 120 covers approximately 10% to 30% of the surface area of front housing 118.

Figure 5:
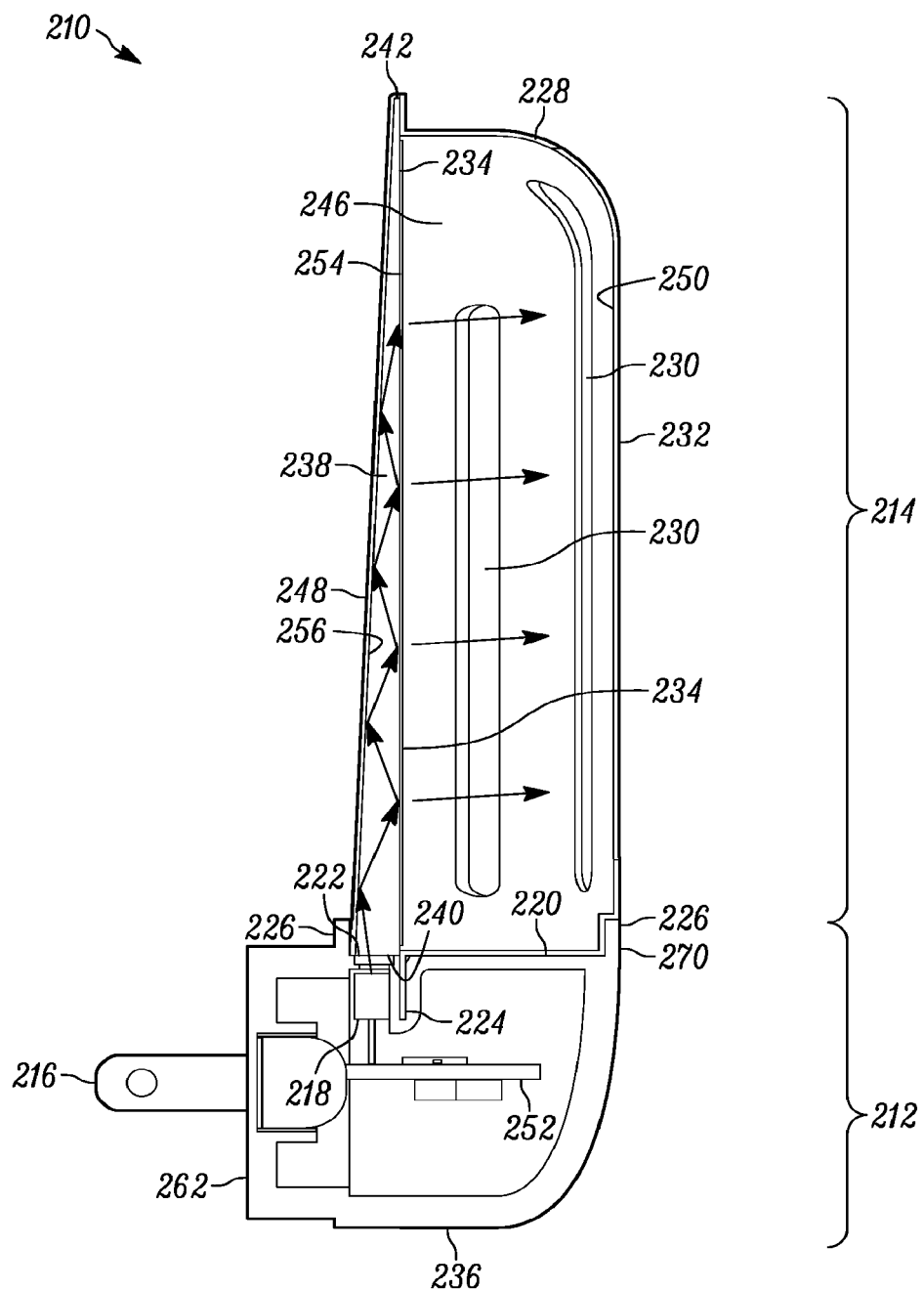
FIG. 5 is a cross-sectional view of a second embodiment of an insect trap in accordance with principles of the disclosure.

FIG. 5 is a cross-sectional view of a second embodiment of an insect trap, indicated generally at 210. Insect trap 210 includes a base portion 212 and a removable trap portion 214. Insect trap 210 may have an overall length, an overall width and an overall depth, and may be configured such that when insect trap 210 is mounted to a wall, its overall depth, defined by the overall distance insect trap 210 protrudes from the wall, is the smallest of the three overall dimensions. Protruding from a back surface 262 of base portion 212 are a plurality of electrically conductive prongs 216, only one of which is shown, adapted to mount insect trap 210 to a wall and provide power to insect trap 210 by inserting conductive prongs 216 into a standard household electrical wall socket. Alternatively, conductive prongs 216 may be adapted to swivel to allow insect trap 210 to remain upright when conductive prongs 216 are inserted into a horizontally-oriented household electrical wall socket. Alternatively, base portion 212 may be configured to sit or hang wherever desired and receive power from batteries (not shown) mounted in base portion 212. While an electrical socket and batteries have been described as providing power to insect trap 210, any suitable power source may be used. Base portion 212 includes a lighting element such as one or more LEDs 218, only one of which is shown. In some embodiments, LEDs 218 include at least one that emits ultraviolet (UV) light and at least one that emits visible light. In some embodiments, LEDs 218 include at least one that emits UV light and at least one that emits blue light to better attract a wide variety of insect species. In some embodiments, the lighting element emits a combination of wavelengths to mimic sunlight. In some embodiments, LEDs 218 include at least one that emits infrared (IR) light, to better attract certain species of insects such as mosquitos and fleas.

In some embodiments, mounted in a top surface 220 of base portion 212 is a transparent or translucent window 222. Window 222 protects LEDs 218 from dust and insect debris, and allows base portion 212 to be easily cleaned. Top surface 220 of base portion 212 may include a slot 224, and on perimeter 270 of top surface 220 are upwardly directed protrusions 226. Trap portion 214 includes a front housing 228 with at least one opening 230 and a light-conducting body 238. Opening 230 in front housing 228 may be configured to admit a wide variety of insects into insect trap 210, or alternatively it may be configured to admit one or more specific insect species. In some embodiments, opening 230 is configured to prevent user's fingers from penetrating opening 230 and inadvertently touching trapped insects or adhesive when removing and replacing trap portion 214. In some embodiments, opening 230 has a size and shape such that a sphere 25 mm in diameter cannot pass through opening 230, and has a size and shape such that a sphere 1 mm in diameter may pass through any portion of opening 230. Opening 230 may be of uniform or of varying width, shape and orientation, and if trap portion 214 has more than one opening 230, they may be of identical or of differing widths, shapes and orientations. Opening 230 may be configured to attract one or more individual insect species or a variety of insect species. In some embodiments, light-conducting body 238 includes a front surface 254, an adhesive coating or an adhesive layer 234 on front surface 254, and a rear cover 248. In some embodiments, the material and thickness of adhesive layer 234 are selected to transmit a substantial proportion of the UV and/or visible and/or IR light, for example greater than 60% of the light is transmitted through adhesive layer 234. Light-conducting body may be tapered and configured to receive light through a bottom surface 240 from LEDs 218 and deflect and evenly distribute the light (e.g., through front surface 254 and adhesive layer 234). Rear cover 248 may be configured to prevent light from escaping through a top surface 242, a back surface 256 and side surfaces (not shown) of light-conducting body 238. As provided herein, any suitable light-conducting body may be used.

In some embodiments, front housing 228 is thermoformed from opaque plastic sheet, although other opaque, transparent or translucent materials such as paper, paperboard, cardboard or paper pulp may also be used. In some embodiments, front housing 228 is constructed by injection molding, casting or by other suitable manufacturing techniques. Front housing 228 may also be coated with transparent, translucent or opaque adhesive on an inside surface 250 to provide additional insect trapping efficiency and capacity. In addition, front housing 228 may also have a reflective coating (not shown) underneath the adhesive coating on inside surface 250 to enhance its attraction to insects and further improve the insect trapping efficiency and effectiveness. Front housing 228 and light-conducting body 238 may be joined together where they intersect or engage by ultrasonic welding or high frequency (HF) welding, although they may also be permanently or removably joined by adhesive or by other commonly used packaging assembly techniques or by any other suitable assembly method.

As shown, front housing 228 and light-conducting body 238 together form a front enclosure 246. Light-conducting body 238 may be tapered (e.g., thicker at bottom surface 240 and thinner at top surface 242), and may be constructed from any transparent material that conducts UV and/or IR and/or visible light, such as acrylic or polycarbonate plastic. The inside surfaces (not shown) of rear cover 248 may have a reflective coating to reflect light back into light-conducting body 238 and through front surface 254, thereby increasing its light-transmitting efficiency. Light-conducting body 238 may also have facets or other light-directing features of varying size, depth, and density on front surface 254 to enhance its light-transmitting efficiency. Alternatively, in some embodiments, light-conducting body 238 has facets or other light-directing features on front surface 254 and not be tapered. Light-conducting body 238 with microscopic facets or other features on front surface 254 is commonly referred to as a Light Guide Plate, although the facets or other features may also be larger and still function effectively.

Alternatively, in some embodiments, light-conducting body 238 may not have an adhesive coating, and light conducting body 238 and rear cover 248 may be part of base portion 212. In such embodiments, trap portion 214 may include a transparent or translucent back plate (not shown) with an adhesive coating on its front surface, attached at its perimeter to front housing 228.

The materials of the trap portion 214 may also include one or more insect attractants. For example, trap portion 214 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of insect trap 210. In such embodiments, the insect attractant is integral to trap portion 214. Alternatively, the insect attractants may be embedded or contained in a separate piece (not shown) that mounts on inside surface 250 or on an outside surface of front housing 228 or through opening 230 in front housing 228 or on front surface 254 of light-conducting body 238. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 210.

In some embodiments, base portion 212 includes a circuit board 252 having a programmable processor or chip (not shown) for executing commands, electrically connected to conductive prongs 216 and LEDs 218. For clarity, however, not all of the electrical connections are shown. Circuit board 252 may include electronic circuitry to receive ordinary household current from conductive prongs 216 and provide power to illuminate LEDs 218. Circuit board 252 may include an energy stabilizer such as a full wave rectifier circuit or any other circuit that provides steady voltage to LEDs 218, although it may also provide a varying voltage to LEDs 218 to provide a flickering light, which may mimic movement that some species of insects, including mosquitoes, may find attractive. For example, light flickering frequencies in the approximate range from 0.05 Hz (e.g., to mimic the breathing rate of large mammals), to 270 Hz (e.g., the highest flicker frequency to attract male houseflies), may be desirable and the lighting element may be configured to flicker within this range. Circuit board 252 may provide power to LEDs 218 to provide UV and/or visible and/or IR light although it may be configured to provide power to only UV LEDs 218, or to only visible light LEDs 218, or to only IR LEDs 218, or to provide variable power to produce combinations of flickering UV and/or visible and/or IR light. In some embodiments, circuit board 252 may also be configured to drive a transmitter or transceiver such as a piezoelectric speaker or other device that may be mounted in base portion 212 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 210. It is desirable for such insect-attracting sound to be undetectable by a human beyond approximately a 1 meter distance from insect trap 210. Circuit board 252 may also include one or more electrical heating elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 212 and into trap portion 214, to attract some insect species, including fleas and mosquitoes. Alternatively, one or more of LEDs 218 may generate heat, to replace or augment the heat generated by the one or more electrical elements. Alternatively, one or more of LEDs 218 may be replaced or augmented by one or more incandescent light bulbs to generate both heat and light. In general, the heat generated may increase and maintain the temperature of at least a portion of trap portion 214 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, slot 224 in top surface 220 of base portion 212 and protrusions 226 on top surface 220 of base portion 212 engage with trap portion 214 to secure it in place during use, although any other form of attachment may be substituted that allows trap portion 214 to be securely but removably mounted on base portion 212. A bottom surface 236 of base portion 212 may be substantially flat or concave to allow insect trap 210 to sit upright on a floor, desk, table or shelf when insect trap 210 is unplugged. Alternatively, bottom surface 236 of base portion 212 may have two or more protrusions (not shown) or legs that allow insect trap 210 to sit upright when insect trap 210 is unplugged.

In the operation of the insect trap 210, conductive prongs 216 are inserted into a wall electrical socket, and LEDs 218 emit light, represented by arrows, preferably UV and visible light. The light from LEDs 218 transmit through window 222, enter bottom surface 240 of light-conducting body 238 and repeatedly reflect off of front surface 254 and back surface 256. In some embodiments, light is not manipulated in base portion 212 and is emitted directly into trap portion 214. A portion of the reflected light transmits through front surface 254 of light-conducting body 238 to provide an evenly-distributed light onto and through adhesive layer 234 and into front enclosure 246. The light may be further evenly distributed by refractive and light-diffusing properties of adhesive layer 234 on front surface 254 of light-conducting body 238. A portion of the light entering front enclosure 246 continues through opening 230 in front housing 228 and is emitted into the surrounding area where insect trap 210 is installed. Insects are attracted to the light transmitted through adhesive layer 234 and through opening 230 in front housing 228, and fly or crawl through opening 230 and onto adhesive layer 234, where they become trapped in the adhesive. The user may observe trapped insects by looking through opening 230 in front housing 228. When a sufficient number of insects have been trapped, the user may easily remove and discard the entire used trap portion 214 without touching the trapped insects, insect debris or adhesive, which remain out of reach inside trap portion 214, and replace it with a new trap portion 214. New trap portion 214 has fresh adhesive-coated surfaces and light-directing surfaces, ensuring that insect trap 210 will continue to efficiently and effectively attract and trap insects.

In some embodiments, because trap portion 214 mounts on top of, and not in front of, base portion 212, insect trap 210 protrudes minimally from the wall when plugged into an ordinary household wall socket, and therefore intrudes minimally into the home environment. In some embodiments, insect trap 210 is configured such that when insect trap 210 is mounted to a wall, its overall depth, defined by the overall distance insect trap 210 protrudes from the wall, is smaller than its overall height and its overall width.

It should be appreciated that a benefit of insect trap 210 is the manipulation of light within trap portion 214. In some embodiments, light manipulation occurs solely within trap portion 214. Light manipulation may include reflection, refraction, polarization and/or diffusion and is achieved by engaging with a manipulative element or surface (e.g., light-conducting body 238, front surface 254, back surface 256, and adhesive layer 234). In some embodiments, light manipulation produces an even distribution of light on adhesive layer 234. In some embodiments, light is manipulated to produce a predetermined pattern on adhesive layer 234 or within trap portion 214, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 210 of this configuration may accommodate a variety of different trap portions 214 that may be removably mounted to base portion 212, each trap portion 214 being uniquely configured to attract and trap a specific species or multiple species of insects. For example, the overall size and shape of trap portion 214, and the size, shape, location and orientation of opening 230 in front housing 228 of trap portion 214, may be uniquely configured to attract and trap a specific species or multiple species of insects. For example, in some embodiments, trap portion 214 is approximately 20 mm to 600 mm wide, 20 mm to 600 mm high and 5 mm to 150 mm deep. In some embodiments, trap portion 214 is approximately 20 mm to 200 mm wide, 20 mm to 200 mm high and 5 mm to 80 mm deep. In some embodiments, trap portion 214 is approximately 20 mm to 130 mm wide, 20 mm to 130 mm high and 5 mm to 50 mm deep.

In some embodiments, base portion 212 is approximately 20 mm to 600 mm wide, 10 mm to 150 mm high and 10 mm to 150 mm deep. In some embodiments, base portion 212 is 20 mm to 200 mm wide, 10 mm to 100 mm high and 10 mm to 80 mm deep. In some embodiments, base portion 212 is 20 mm to 130 mm wide, 10 mm to 50 mm high and 10 mm to 50 mm deep.

As provided herein, opening 230 may be a variety of shapes and/or sizes. For example, opening 230 may be circular, square, rectangular, polygonal and/or elliptical in shape. Alternatively, opening 230 may be slot shaped having a straight, curved or undulating shape or pattern. When opening 230 is circular, opening 230 may be approximately 0.5 mm to 30 mm in diameter. In some embodiments, circular opening 230 is approximately 0.5 mm to 20 mm in diameter. In some embodiments, circular opening 230 is approximately 0.5 mm to 15 mm in diameter. When opening 230 is slot shaped, opening 230 may be approximately 2 mm to 30 mm wide and 5 mm to 500 mm long. In some embodiments, slot shaped opening 230 is approximately 2 mm to 20 mm wide and 5 mm to 200 mm long. In some embodiments, slot shaped opening 230 is approximately 2 mm to 15 mm wide and 5 mm to 100 mm long.

In some embodiments, opening 230 covers all or a portion of front housing 228. For example, opening 230 may cover a range of approximately 1% to 75% of the surface area of front housing 228. In some embodiments, opening 230 covers approximately 5% to 50% of the surface area of front housing 228. In some embodiments, opening 230 covers approximately 10% to 30% of the surface area of front housing 228.

Figure 6:
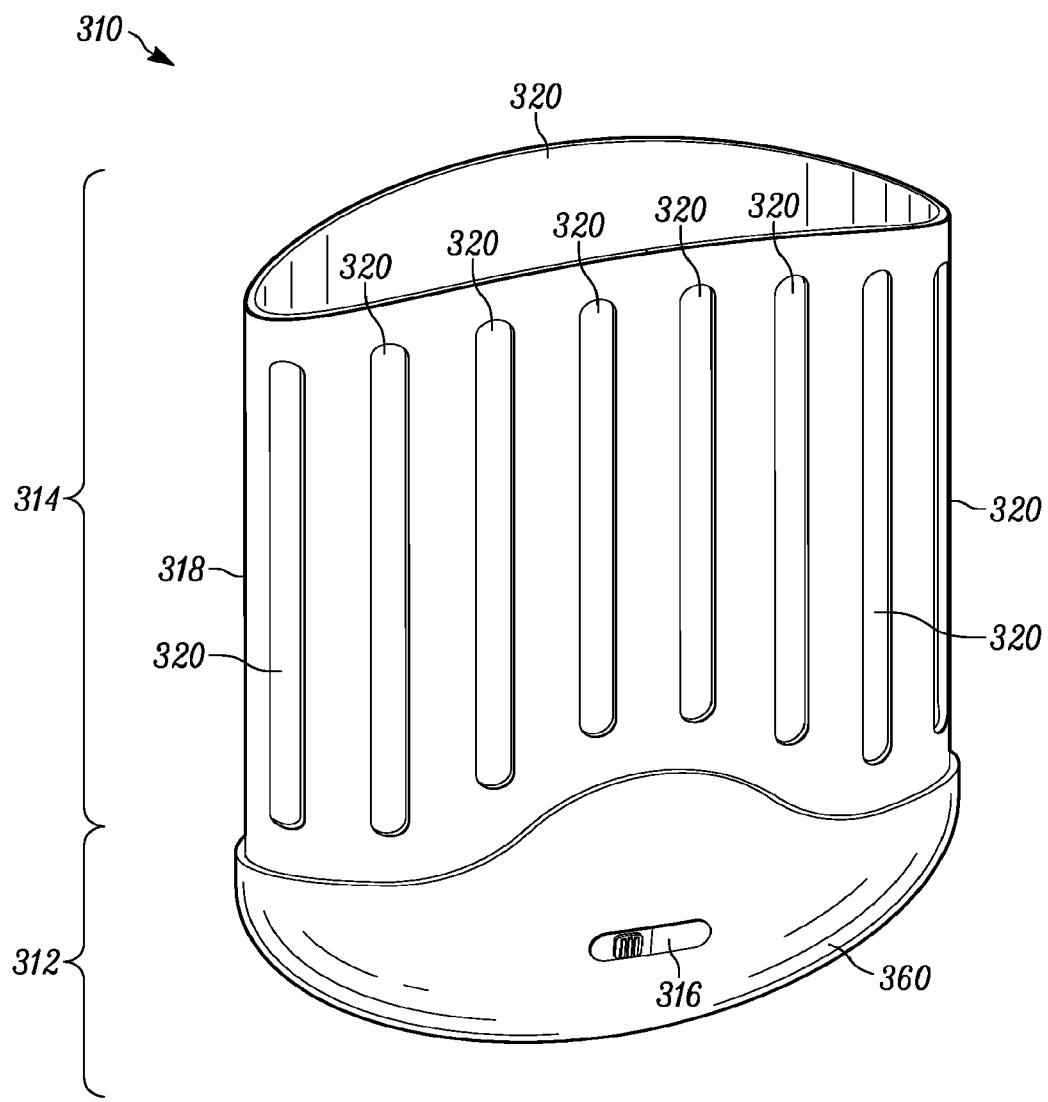
FIG. 6 is a front perspective view of a third embodiment of an insect trap in accordance with principles of the disclosure.

FIG. 6 is a front perspective view of a third embodiment of an insect trap, indicated generally at 310. Insect trap 310 may include a base portion 312 and a removable trap portion 314. Insect trap 310 may have an overall length, an overall width and an overall depth, and may be configured such that when insect trap 310 is mounted to a wall, its overall depth, defined by the overall distance insect trap 310 protrudes from the wall, is the smallest of the three overall dimensions. In some embodiments, front surface 360 of base portion 312 includes a switch 316, configurable to enable insect trap 310 to be turned on or off by closing or opening switch 316 as desired by the user. Alternatively, switch 316 may be configured to control other features such as light intensity, combinations of light wavelengths, different flickering frequencies or modes, an automatic setting that turns on when the room gets dark, or a remote control setting, for example. Switch 316 may be manually operated, although switch 316 may also be operated electrically, optically, electro-mechanically, electro-optically, or by any method for opening or closing switch 316. Trap portion 314 may include a housing 318 with at least one opening 320. Opening 320 in housing 318 may be configured to admit a wide variety of insects into insect trap 310, or alternatively it may be configured to admit one or more specific insect species. Opening 320 may preferably be configured to prevent user's fingers from penetrating opening 320 and inadvertently touching trapped insects or adhesive when removing and replacing trap portion 314. Opening 320 may preferably have a size and shape such that a sphere 25 mm in diameter cannot pass through opening 320, and opening 320 may preferably have a size and shape such that a sphere 1 mm in diameter may pass through any portion of opening 320. Opening 320 may be of uniform or of varying width, shape and orientation, and if trap portion 314 has more than one opening 320, they may be of identical or of differing widths, shapes and orientations.

Figure 7:
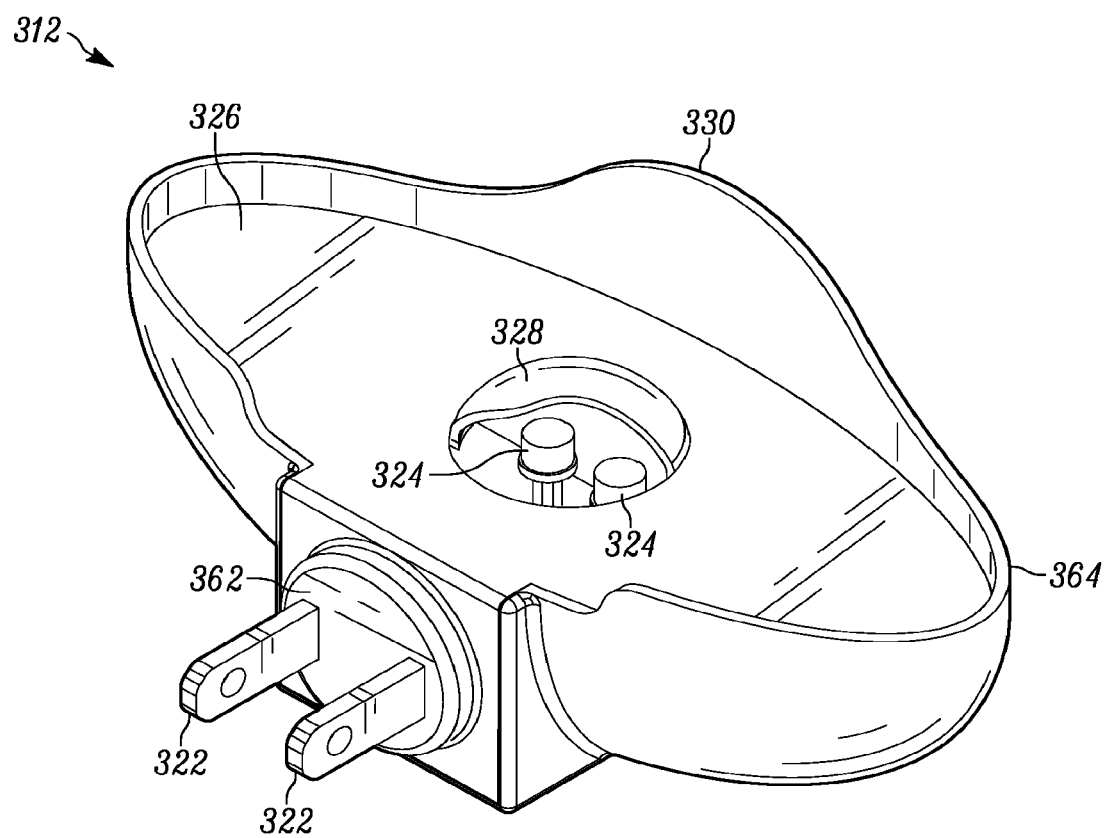
FIG. 7 is a rear perspective view of a base portion of the insect trap of FIG. 6.

FIG. 7 is a rear perspective view of base portion 312 of insect trap 310. Protruding from a rear surface 362 of base portion 312 are a plurality of electrically conductive prongs 322, adapted to mount insect trap 310 to a wall and provide power to insect trap 310 by inserting into a standard household electrical wall socket. Alternatively, conductive prongs 322 may be adapted to swivel to allow insect trap 310 to remain upright when conductive prongs 322 are inserted into a horizontally-oriented household electrical wall socket. Alternatively, base portion 312 may be configured to sit or hang wherever desired and receive power from batteries (not shown) mounted in base portion 312. While an electrical socket and batteries have been described as providing power to insect trap 310, any suitable power source may be used. Base portion 312 includes a lighting element such as one or more LEDs 324. In some embodiments, LEDs 324 include one that emits ultraviolet (UV) light and one that emits visible light. In some embodiments, LEDs 324 include at least one that emits UV light and at least one that emits blue light to better attract a wide variety of insect species. In some embodiments, the lighting element emits a combination of wavelengths to mimic sunlight. In some embodiments, LEDs 324 include at least one that emits infrared (IR) light to better attract certain species of insects such as mosquitos and fleas. Mounted in a top surface 326 of base portion 312 may be a transparent or translucent window 328, shown partially cut away to reveal LEDs 324. Window 328 protects LEDs 324 from dust and insect debris, and allows base portion 312 to be easily cleaned. Upwardly directed protrusions or a rim 330 protruding from the perimeter 364 of top surface 326 of base portion 312 may serve to secure trap portion 314 in place during use, although any other form of attachment may be substituted that allows trap portion 314 to be securely but removably mounted to base portion 312.

Figure 8:
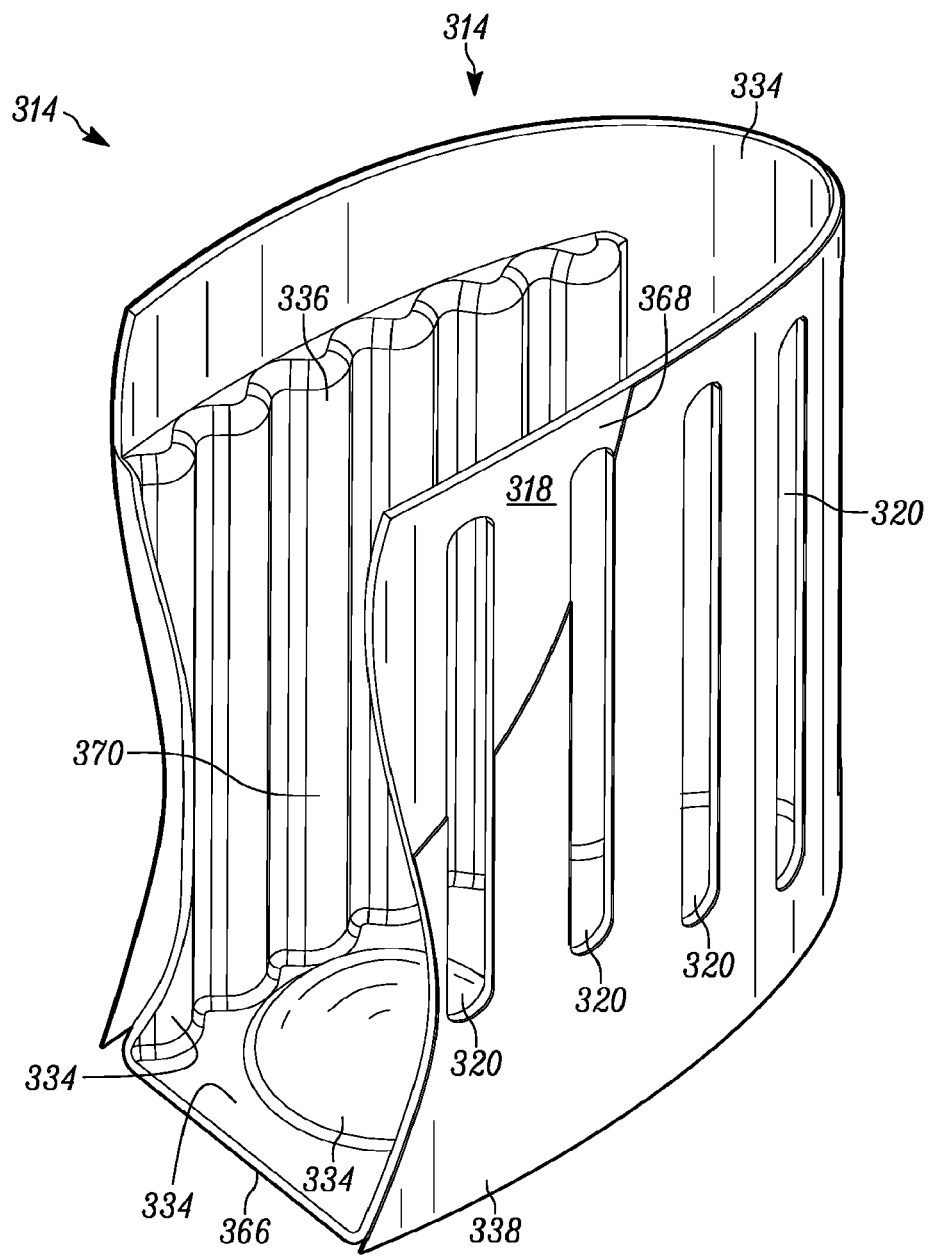
FIG. 8 is a front perspective view of a trap portion of the insect trap of FIG. 6.

FIG. 8 is a front perspective view of trap portion 314 of insect trap 310. Trap portion 314 includes housing 318, which forms an enclosure, and a transparent or translucent adhesive coating applied to one or more inside surfaces 334. In some embodiments, the material and thickness of housing 318 and the material and thickness of the adhesive coating are selected to transmit a substantial proportion of the UV and/or visible and/or IR light, for example greater than 60% of the light is transmitted through housing 318 and the adhesive coating. In some embodiments, housing 318 is thermoformed from opaque plastic sheet, although other opaque, transparent or translucent materials such as paper, paperboard, cardboard or paper pulp may also be used. In some embodiments, housing 318 is constructed by injection molding or by other suitable manufacturing techniques.

As shown, housing 318 includes ribs 336 or other features that increase the adhesive-coated surface area, produce alternating light/dark regions that some insect species find attractive, and enhance the transmission of insect-attracting light into an interior 370 of trap portion 314. A sleeve 338, configured to reduce the amount of light emitted by an outside surface 368 of housing 318, covers outside surface 368 of housing 318 except for a bottom surface 366 and at opening 320. In some embodiments, sleeve 338 is thermoformed from opaque sheet plastic, although other opaque, transparent or translucent materials such as paper, paperboard, cardboard or paper pulp may also be used. In some embodiments, sleeve 338 includes a reflective coating on one or more of its inside surfaces (not shown), allowing sleeve 338 to direct more light through inside surfaces 334 of housing 318 and further enhance the insect attracting and trapping efficiency and effectiveness. In some embodiments, sleeve 338 is replaced by a coating configured to reduce the amount of light emitted by outside surface 368 of housing 318, or by the coating applied over a reflective coating, applied to outside surface 368 of housing 318, except for bottom surface 366.

The materials of the trap portion 314 may also include one or more insect attractants. For example, trap portion 314 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of insect trap 310. In such embodiments, the insect attractant is integral to trap portion 314. Alternatively, the insect attractants may be embedded or contained in a separate piece (not shown) that mounts on inside surfaces 334 of housing 318 or through opening 320 in housing 318. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 310.

Figure 9:
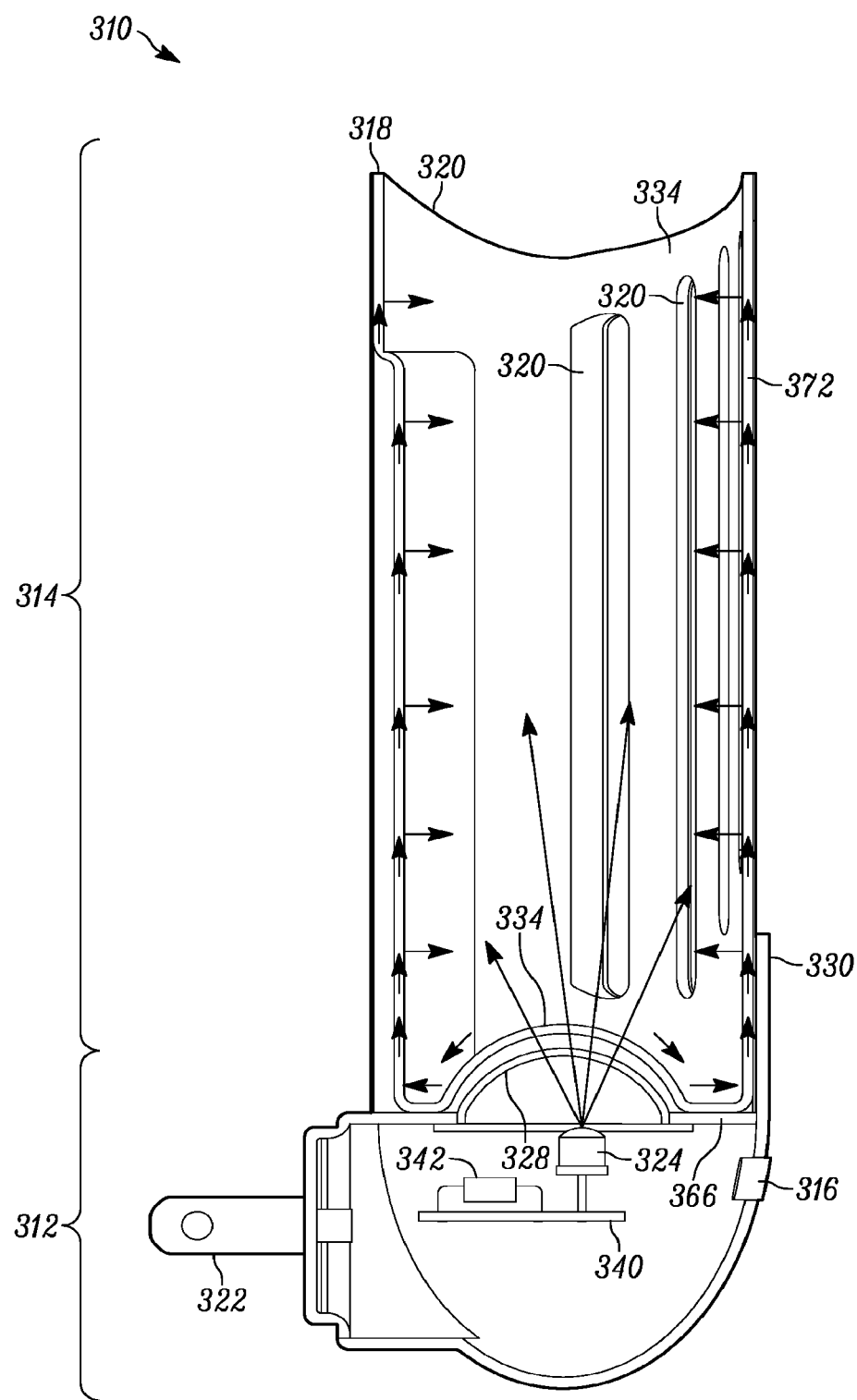
FIG. 9 is a cross-sectional view of the insect trap of FIG. 6.

FIG. 9 is a cross-sectional view of insect trap 310. In some embodiments, base portion 312 includes a circuit board 340 having a programmable processor or chip (not shown) for executing commands, electrically connected to conductive prongs 322, only one of which is shown, switch 316 and LEDs 324, only one of which is shown. For clarity, however, not all of the electrical connections are shown. Circuit board 340 may include electronic circuitry to receive ordinary household current from conductive prongs 322, respond to the position of switch 316 and provide power to illuminate LEDs 324. Circuit board 340 may include an energy stabilizer such as a full wave rectifier filter circuit or any other circuit that provides steady voltage to LEDs 324 when switch 316 is in a closed position, although it may also provide a varying voltage to LEDs 324 to provide a flickering light, which may mimic movement that some insect species, including mosquitoes, may find attractive. For example, light flickering frequencies in the approximate range of 0.05 Hz (e.g., to mimic the breathing rate of mammals) to 250 Hz (e.g., the highest flicker frequency attracting male houseflies), may be desirable and the lighting element may be configured to flicker within this range. Circuit board 340 may provide power to LEDs 324 to provide both UV and/or visible and/or IR light, although it could be configured to provide power to only the UV LEDs 324 or to only the visible light LEDs 324 or to only the IR LEDs 324, or to provide variable power to produce combinations of flickering UV and/or visible and/or IR light. In some embodiments, circuit board 340 may also be configured to drive a transmitter or transceiver such as a piezoelectric speaker or other device that may be mounted in base portion 312 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from trap 310. It is desirable for such insect-attracting sound to be undetectable by a human beyond approximately a 1-meter distance from insect trap 310. Circuit board 340 may also include one or more electrical heating elements 342 such as one or more resistors or resistance heating elements, or one or more heat exchanging elements (e.g., elements using the Peltier effect and/or the Thomson effect to move heat to a specific region), or a combination of electrical elements that generate and/or move heat, which may transmit through base portion 312 and into trap portion 314, to attract some insect species, including fleas and mosquitoes. Alternatively, one or more of LEDs 324 may generate heat, to replace or augment the heat generated by the one or more electrical elements. Alternatively, one or more of LEDs 324 may be replaced or augmented by one or more incandescent light bulbs to generate both heat and light. In general, the heat generated may increase and maintain the temperature of at least a portion of trap portion 314 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

In the operation of insect trap 310, conductive prongs 322 are inserted into a wall electrical socket and switch 316 is moved to a closed position. LEDs 324 emit light, represented by arrows, which transmits through window 328 in base portion 312 and through bottom surface 366 of housing 318. In some embodiments, light is not manipulated in base portion 312 and is emitted directly into trap portion 314. A portion of the light continues within the enclosure, up one or more sides 372 of housing 318, and out through inside surfaces 334. Another portion of the light continues through bottom surface 366 of housing 318 and into the enclosure, where it illuminates inside surfaces 334. A portion of the light entering housing 318 continues through opening 320 and is emitted into the surrounding area where the trap is installed. Insects in the area are attracted to the light transmitted through opening 320 and fly or crawl into opening 320 and onto inside surfaces 334, where they become stuck in the adhesive and are trapped. The user may observe trapped insects by looking through opening 320. When a sufficient number of insects have been trapped, the user may easily remove and discard the entire used trap portion 314 without touching trapped insects, insect debris or adhesive, which remain out of reach inside trap portion 314, and replace it with a new trap portion 314. New trap portion 314 has fresh adhesive-coated inside surfaces 334, housing 318 has a clean bottom surface 366 through which the light is transmitted into trap portion 314, and the transparent or translucent material of trap portion 314 has not been degraded by prolonged exposure to UV light from LEDs 324, thereby ensuring that insect trap 310 will continue to efficiently and effectively attract and trap insects.

In some embodiments, because trap portion 314 mounts on top of, and not in front of, base portion 312, insect trap 310 protrudes minimally from the wall when plugged into an ordinary household wall socket, and therefore intrudes minimally into the home environment. In some embodiments, insect trap 310 is configured such that when insect trap 310 is mounted to a wall, its overall depth, defined by the overall distance insect trap 310 protrudes from the wall, is smaller than its overall height and its overall width.

It should be appreciated that a benefit of insect trap 310 is the manipulation of light within trap portion 314. In some embodiments, light manipulation occurs solely within trap portion 314. Light manipulation may include reflection, refraction, polarization, dispersion and/or diffusion and is achieved by engaging with a manipulative element or surface (e.g., housing 318 and inside surfaces 334). In some embodiments, light manipulation produces an even distribution of light on an adhesive surface or adhesive coating. In some embodiments, light is manipulated to produce a predetermined pattern on the adhesive coating or within trap portion 314, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 310 of this configuration may accommodate a variety of different trap portions 314 that may be removably mounted to base portion 312, each trap portion 314 being uniquely configured to attract and trap a specific species or multiple species of insects. For example, the overall size and shape of trap portion 314, and the size, shape, location and orientation of opening 320 in housing 318 of trap portion 314, may be uniquely configured to attract and trap a specific species or multiple species of insects. For example, in some embodiments, trap portion 314 is approximately 20 mm to 600 mm wide, 20 mm to 600 mm high and 5 mm to 150 mm deep. In some embodiments, trap portion 314 is approximately 20 mm to 200 mm wide, 20 mm to 200 mm high and 5 mm to 80 mm deep. In some embodiments, trap portion 314 is approximately 20 mm to 130 mm wide, 20 mm to 130 mm high and 5 mm to 50 mm deep.

In some embodiments, base portion 312 is approximately 20 mm to 600 mm wide, 10 mm to 150 mm high and 10 mm to 150 mm deep. In some embodiments, base portion 312 is 20 mm to 200 mm wide, 10 mm to 100 mm high and 10 mm to 80 mm deep. In some embodiments, base portion 312 is 20 mm to 130 mm wide, 10 mm to 50 mm high and 10 mm to 50 mm deep.

As provided herein, opening 320 may be a variety of shapes and/or sizes. For example, opening 320 may be circular, square, rectangular, polygonal and/or elliptical in shape. Alternatively, opening 320 may be slot shaped having a straight, curved or undulating shape or pattern. When opening 320 is circular, opening 320 may be approximately 0.5 mm to 30 mm in diameter. In some embodiments, circular opening 320 is approximately 0.5 mm to 20 mm in diameter. In some embodiments, circular opening 320 is approximately 0.5 mm to 15 mm in diameter. When opening 320 is slot shaped, opening 320 may be approximately 2 mm to 30 mm wide and 5 mm to 500 mm long. In some embodiments, slot shaped opening 320 is approximately 2 mm to 20 mm wide and 5 mm to 200 mm long. In some embodiments, slot shaped opening 320 is approximately 2 mm to 15 mm wide and 5 mm to 100 mm long.

In some embodiments, opening 320 covers all or a portion of trap portion 314. For example, opening 320 may cover a range of approximately 1% to 75% of the surface area of trap portion 314. In some embodiments, opening 320 covers approximately 5% to 50% of the surface area of trap portion 314. In some embodiments, opening 320 covers approximately 10% to 30% of the surface area of trap portion 314.

Although as shown in the embodiments of FIGS. 1-9, the trap portion mounts on a top surface of the base portion, other configurations are also contemplated. For example, FIGS. 10 and 11 show a fourth embodiment of an insect trap, where the trap portion mounts to the front of the base portion.

Figure 10:
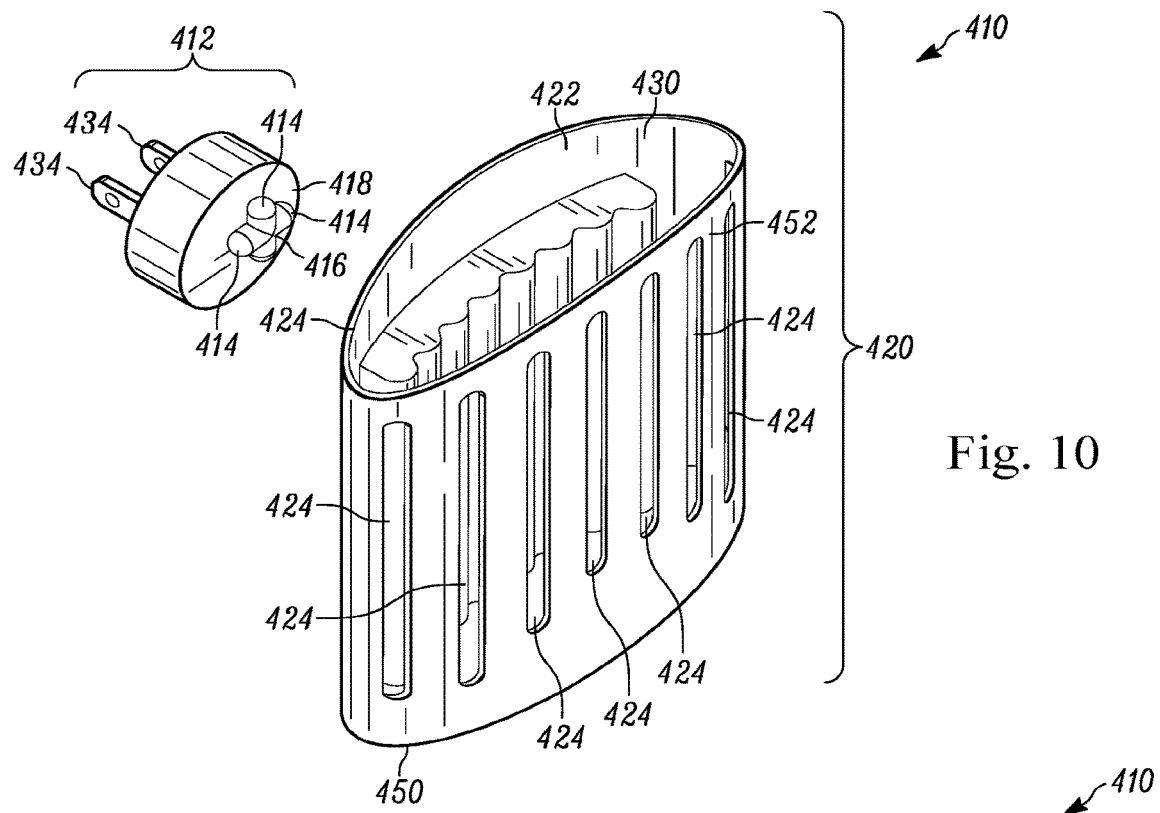
FIG. 10 is a front perspective view of a fourth embodiment of an insect trap in accordance with principles of the disclosure.
Figure 11:
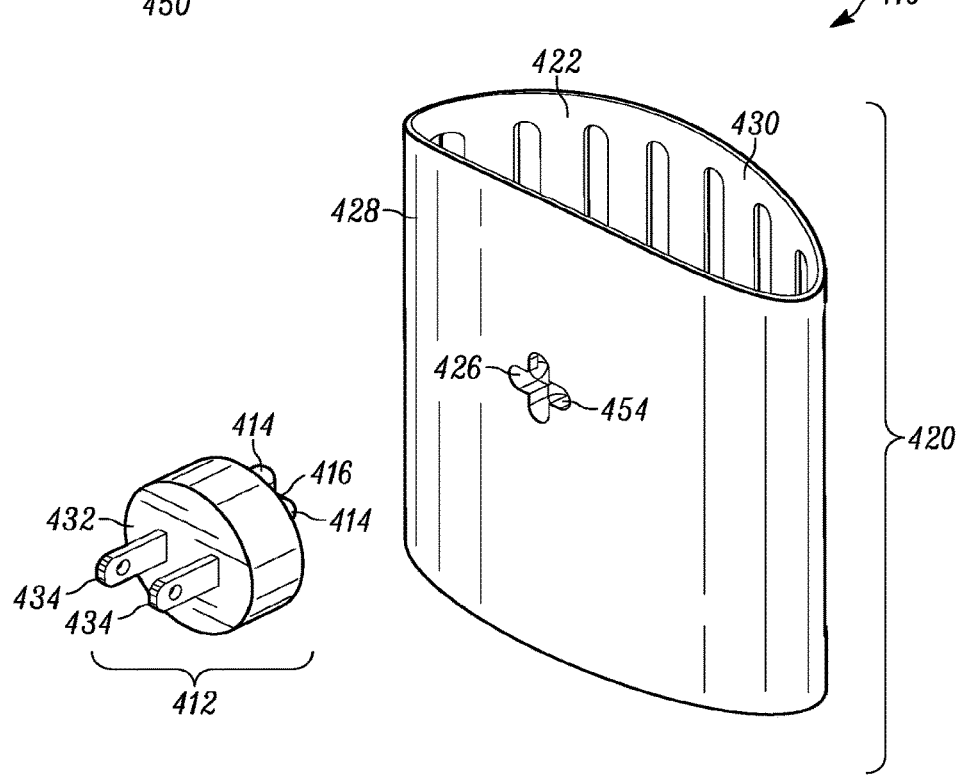
FIG. 11 is a rear perspective view of the insect trap of FIG. 10.

FIG. 10 is a front perspective view and FIG. 11 is a rear perspective view, both showing a fourth embodiment of an insect trap, indicated generally at 410. Insect trap 410 includes a base portion 412 and a removable trap portion 420. Trap portion 420 is shown removed from base portion 412 in both views. Protruding from a rear surface 432 of base portion 412 are a plurality of electrically conductive prongs 434, adapted to mount insect trap 410 to a wall and provide power to insect trap 410 by inserting into a standard household electrical wall socket. Alternatively, base portion 412 may be configured to sit or hang wherever desired and receive power from batteries (not shown) mounted in base portion 412. While an electrical socket and batteries have been described as providing power to insect trap 410, any suitable power source may be used. A lighting element such as one or more LEDs 414 may be mounted on a cross-shaped protrusion 416 protruding from a front surface 418 of base portion 412. Alternatively, LEDs 414 may form a protrusion themselves. While shown as a cross-shaped protrusion, the mounting surface and/or configuration of LEDs 414 may be any desired shape. In some embodiments, base portion 412 includes a circuit board (not shown) having a programmable processor or chip (not shown) for executing commands, electrically connected to conductive prongs 434 and LEDs 414. Trap portion 420 includes a housing 450 of translucent or transparent material with one or more adhesive-coated inside surfaces 422 and at least one opening 424. In some embodiments, the material and thickness of housing 450 and the material and thickness of the adhesive are selected to transmit a substantial proportion of the light, for example greater than 60% of the light is transmitted through housing 450 and the adhesive coating. Opening 424 may be configured to admit a wide variety of insects into insect trap 410, or alternatively it may be configured to admit one or more specific insect species. Opening 424 may be configured to prevent user's fingers from penetrating opening 424 and inadvertently touching trapped insects or adhesive when removing and replacing trap portion 420. Opening 424 may preferably have a size and shape such that a sphere 25 mm in diameter cannot pass through the at least one opening 424, and opening 424 may preferably have a size and shape such that a sphere 1 mm in diameter may pass through any portion of opening 424. Opening 424 may be of uniform or of varying width, shape and orientation, and if trap portion 420 has more than one opening 424, they may be of identical or of differing widths, shapes and orientations. Trap portion 420 may include a coating (not shown) configured to reduce the amount of light emitted by its outside surfaces 452, on outside surfaces 452 except for at opening 424 and at a cross-shaped blind cavity 426 in its rear surface 428. As shown, blind cavity 426 is cross-shaped 454, but may be any desired shape. For example, cross-shaped protrusion 416 on front surface 418 of base portion 412 may engage with a recess in cross-shaped cavity 454 in rear surface 428 of trap portion 420 to removably attach trap portion 420 to base portion 412. In this configuration, therefore, trap portion 420 mounts in front of base portion 412.

In the operation of insect trap 410, base portion 412 is plugged into an electrical wall socket and trap portion 420 is mounted in front of base portion 412. Light from LEDs 414 transmit into cross-shaped cavity 454 in rear surface 428 of trap portion 420. In some embodiments, light is not manipulated in base portion 412 and is emitted directly into trap portion 420. A portion of the light continues within the translucent or transparent walls of trap portion 420, diffusing the light and spreading it evenly within trap portion 420 and through inside surfaces 422. Another portion of the light continues through the rear wall of trap portion 420 and into the interior 430 of trap portion 420, where it illuminates inside surfaces 422. A portion of the light entering trap portion 420 continues through opening 424 and into the room where insect trap 410 is installed. Insects in the room are attracted to the light transmitted through opening 424, and fly or crawl into opening 424 and onto inside surfaces 422, where they become stuck in the adhesive and are trapped. The user may observe trapped insects by looking through opening 424. When a sufficient number of insects have been trapped, the user may easily remove and discard the entire used trap portion 420 without touching the trapped insects, insect debris or adhesive, which remain out of reach inside trap portion 420, and replace it with a new trap portion 420. The new trap portion 420 has fresh adhesive-coated inside surfaces 422, a clean cross-shaped cavity 426 in rear surface 428 through which the light is transmitted into trap portion 420, and the transparent or translucent material of trap portion 420 has not been degraded by prolonged exposure to UV light from LEDs 414, thereby ensuring that insect trap 410 will continue to efficiently and effectively attract and trap insects.

It should be appreciated that a benefit of insect trap 410 is the manipulation of light within trap portion 420. In some embodiments, light manipulation occurs solely within trap portion 420. Light manipulation may include reflection, refraction, polarization, dispersion and/or diffusion and is achieved by engaging with a manipulative element or surface (e.g., trap portion 420 and inside surfaces 422). In some embodiments, light manipulation produces an even distribution of light on an adhesive surface or adhesive coating. In some embodiments, light is manipulated to produce a predetermined pattern on the adhesive coating or within trap portion 420, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 410 of this configuration may accommodate a variety of different trap portions 420 that may be removably mounted to base portion 412, each trap portion 420 being uniquely configured to attract and trap a specific species or multiple species of insects. For example, the overall size and shape of trap portion 420, and the size, shape, location and orientation of opening 424 in trap portion 420, may be uniquely configured to attract and trap a specific species or multiple species of insects. For example, in some embodiments, trap portion 420 is approximately 20 mm to 600 mm wide, 20 mm to 600 mm high and 5 mm to 150 mm deep. In some embodiments, trap portion 420 is approximately 20 mm to 200 mm wide, 20 mm to 200 mm high and 5 mm to 80 mm deep. In some embodiments, trap portion 420 is approximately 20 mm to 130 mm wide, 20 mm to 130 mm high and 5 mm to 50 mm deep.

In some embodiments, base portion 412 is approximately 10 mm to 600 mm wide, 10 mm to 150 mm high and 10 mm to 150 mm deep. In some embodiments, base portion 412 is 10 mm to 200 mm wide, 10 mm to 100 mm high and 10 mm to 80 mm deep. In some embodiments, base portion 412 is 10 mm to 130 mm wide, 10 mm to 50 mm high and 10 mm to 50 mm deep.

As provided herein, opening 424 may be a variety of shapes and/or sizes. For example, opening 424 may be circular, square, rectangular, polygonal and/or elliptical in shape. Alternatively, opening 424 may be slot shaped having a straight, curved or undulating shape or pattern. When opening 424 is circular, opening 424 may be approximately 0.5 mm to 30 mm in diameter. In some embodiments, circular opening 424 is approximately 0.5 mm to 20 mm in diameter. In some embodiments, circular opening 424 is approximately 0.5 mm to 15 mm in diameter. When opening 424 is slot shaped, opening 424 may be approximately 2 mm to 30 mm wide and 5 mm to 500 mm long. In some embodiments, slot shaped opening 424 is approximately 2 mm to 20 mm wide and 5 mm to 200 mm long. In some embodiments, slot shaped opening 424 is approximately 2 mm to 15 mm wide and 5 mm to 100 mm long.

In some embodiments, opening 424 covers all or a portion of trap portion 420. For example, opening 424 may cover a range of approximately 1% to 75% of the surface area of trap portion 420. In some embodiments, opening 424 covers approximately 5% to 50% of the surface area of trap portion 420. In some embodiments, opening 424 covers approximately 10% to 30% of the surface area of trap portion 420.

Figure 12:
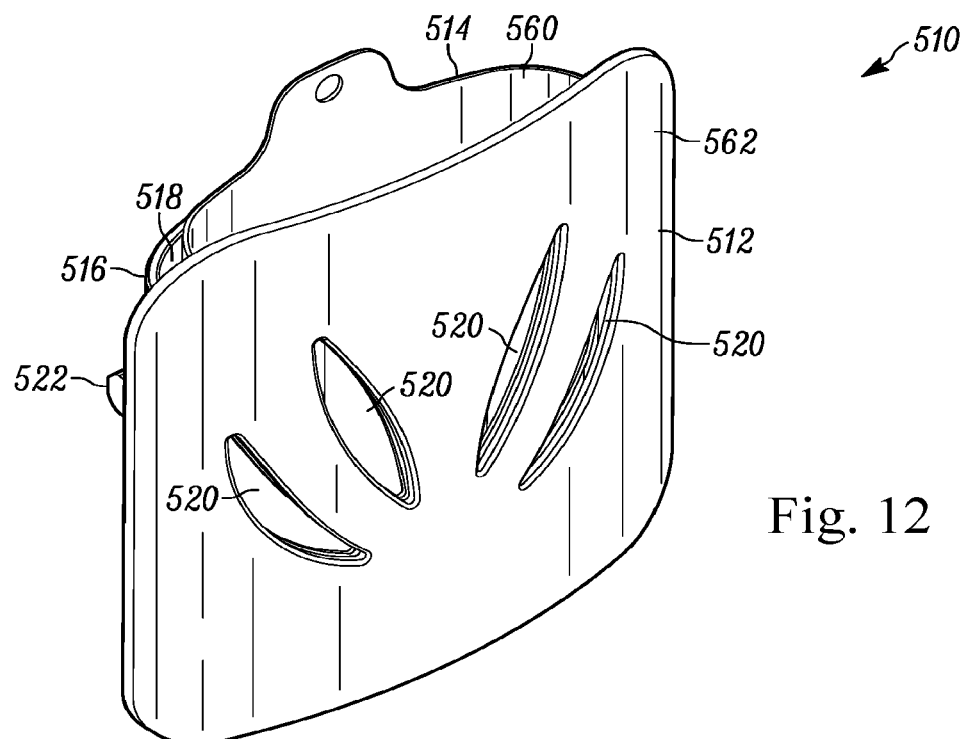
FIG. 12 is a front perspective view of a fifth embodiment of an insect trap in accordance with principles of the disclosure.
Figure 13:
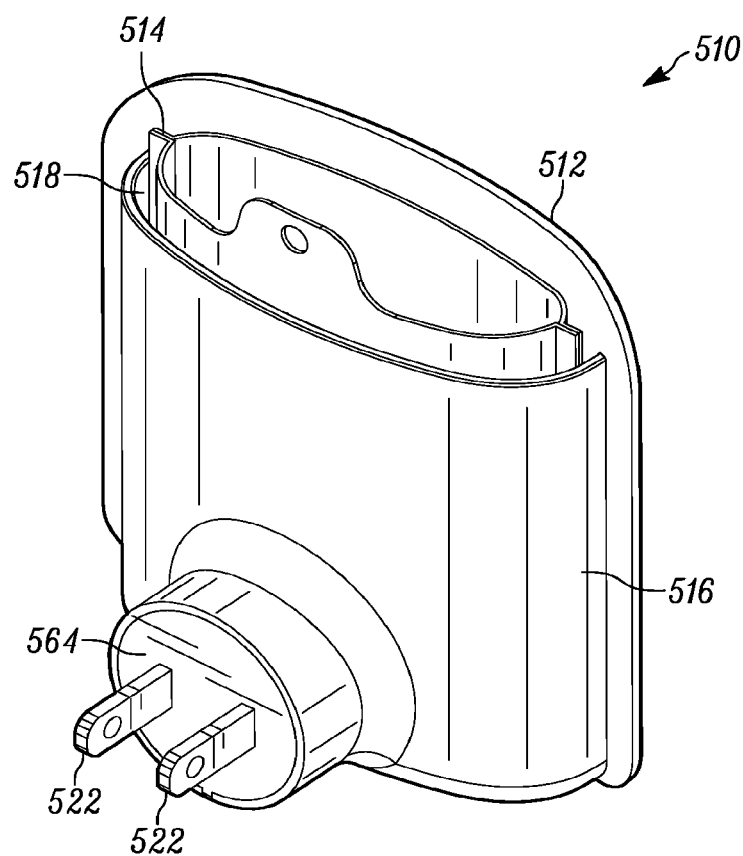
FIG. 13 is a rear perspective view of the insect trap of FIG. 12.

FIG. 12 is a front perspective view and FIG. 13 is a rear perspective view showing a fifth embodiment of an insect trap, indicated generally at 510. Insect trap 510 includes a base portion 512 and a removable trap portion 514. Insect trap 510 may have an overall length, an overall width and an overall depth, and may be configured such that when insect trap 510 is mounted to a wall, its overall depth, defined by the overall distance insect trap 510 protrudes from the wall, is the smallest of the three overall dimensions. Base portion 512 includes a housing 516 with a top opening 518 on its top surface 560 to receive trap portion 514, at least one front opening 520 on its front surface 562, and a plurality of electrically conductive prongs 522 on its rear surface 564, adapted to mount insect trap 510 to a wall and provide power to insect trap 510 by inserting into a standard household electrical wall socket. Alternatively, conductive prongs 522 may be adapted to swivel to allow insect trap 510 to remain upright when conductive prongs 522 are inserted into a horizontally oriented electrical wall socket. Alternatively, base portion 512 may be configured to sit or hang wherever desired and receive power from batteries (not shown) mounted in base portion 512. While an electrical socket has been described as providing power to insect trap 510, any suitable power source may be used. Front opening 520 may be configured to admit a wide variety of insects into insect trap 510, or alternatively it may be configured to admit one or more specific insect species. Front opening 520 may be configured to prevent user's fingers from penetrating front opening 520 and inadvertently touching trapped insects or adhesive when removing and replacing trap portion 514. Front opening 520 may preferably have a size and shape such that a sphere 25 mm in diameter cannot pass through front opening 520, and front opening 520 may preferably have a size and shape such that a sphere 1 mm in diameter may pass through any portion of front opening 520. Front opening 520 may be of uniform or of varying width, shape and orientation, and if trap portion 514 has more than one front opening 520, they may be of identical or of differing widths, shapes and orientations. In some embodiments, base portion 512 is injection molded of opaque plastic, although other materials and construction techniques could also be used.

Figure 14:
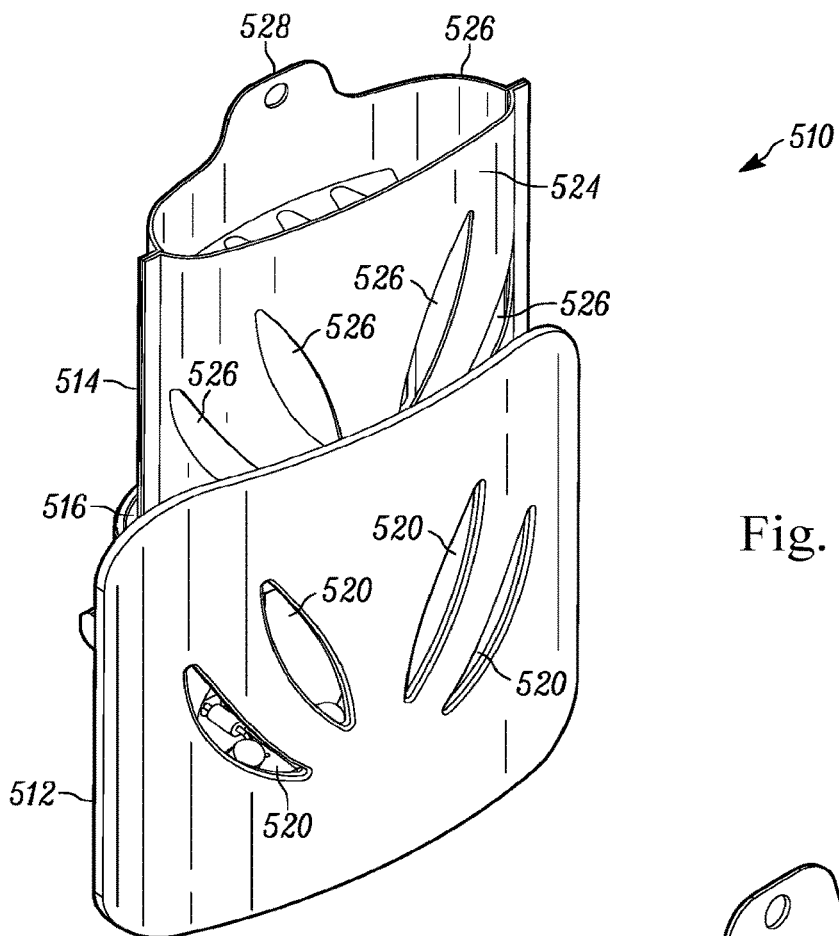
FIG. 14 is a front perspective view of the insect trap of FIG. 12.

FIG. 14 is a front perspective view of insect trap 510. Trap portion 514 is shown partially removed from base portion 512 in this view. Trap portion 514 may include a housing 524 with at least one opening 526 and a tab 528 adapted for removing and replacing trap portion 514. Trap portion 514 may be removed by grasping tab 528 and lifting trap portion 514 out of housing 516 of base portion 512. Opening 526 in trap portion 514 may correspond to front opening 520 in base portion 512 with respect to size, shape, orientation and location, so that they may align when trap portion 514 is mounted into base portion 512. In such embodiments, trap portion 514 may be viewed as an inner sleeve or pocket and base portion 512 may be viewed as an outer sleeve, where the inner sleeve can be dropped or inserted into the outer sleeve by a user.

Figure 15:
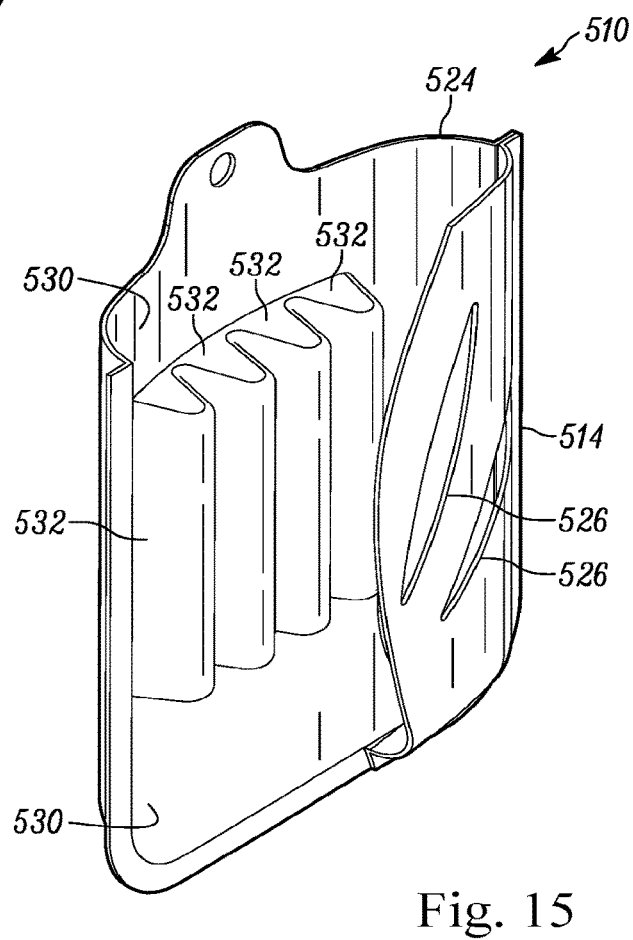
FIG. 15 is a front perspective view of a trap portion of the insect trap of FIG. 12.

FIG. 15 is a front perspective view of trap portion 514. Trap portion 514 is shown partially cut away in this view. Housing 524 may include inside surfaces 530 coated with translucent or transparent adhesive. As shown, housing 524 includes ribs 532 or other features that increase the adhesive-coated surface area, produce alternating light/dark regions that some insect species find attractive, and enhance the transmission of insect-attracting light into the interior of trap portion 514. In some embodiments, trap portion 514 is thermoformed of translucent or transparent sheet plastic, in two separate pieces, or in a 'clamshell' configuration, in which the two sides are joined at one side and folded together, although trap portion 514 could also be injection molded of translucent or transparent plastic or constructed of translucent paper or of other materials. In some embodiments, the material and thickness of trap portion 514 and the material and thickness of the adhesive are selected to transmit a substantial proportion of light, for example greater than 60% of light is transmitted through trap portion 514 and the adhesive coating. The materials of trap portion 514 may also include one or more insect attractants. For example, trap portion 514 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of insect trap 510. In such embodiments, the insect attractant is integral to trap portion 514. Alternatively, the insect attractants may be embedded or contained in a separate piece (not shown) that mounts on inside surfaces 530 of housing 524 or through opening 526 in housing 524. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 510.

Figure 16:
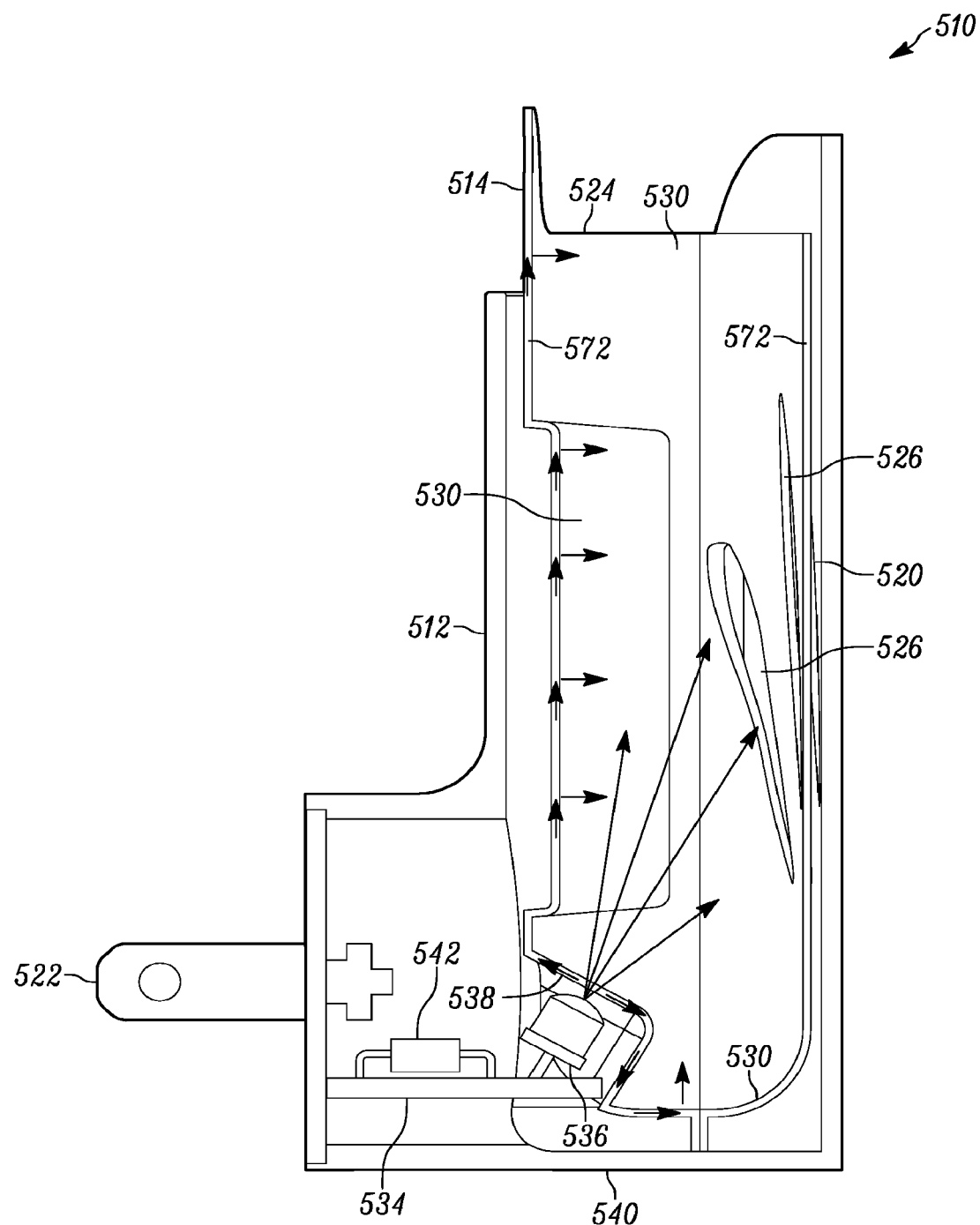
FIG. 16 is a cross-sectional view of the insect trap of FIG. 12.

FIG. 16 is a cross-sectional view of insect trap 510. In some embodiments, base portion 512 includes a circuit board 534 having a programmable processor or chip (not shown) for executing commands, electrically connected to conductive prongs 522, only one of which is shown, and a lighting element such as one or more LEDs 536, only one of which is shown. In some embodiments, LEDs 536 include one that emits ultraviolet (UV) light and one that emits visible light. In some embodiments, LEDs 536 include at least one that emits UV light and at least one that emits blue light to better attract a wide variety of insect species. In some embodiments, the lighting element emits a combination of wavelengths to mimic sunlight. In some embodiments, LEDs 536 include at least one that emits infrared (IR) light to better attract certain species of insects such as mosquitos and fleas. For clarity, not all of the electrical connections are shown. Circuit board 534 may include electronic circuitry to receive any household current from conductive prongs 522 and provide power to LEDs 536. Alternatively, circuit board 534 may be configured to receive power from batteries (not shown) mounted in base portion 512. While an electrical socket and batteries have been described as providing power to insect trap 510, any suitable power source may be used. Circuit board 534 may include a full wave rectifier circuit or any other circuit to provide steady voltage to LEDs 536, although it could also provide a varying voltage to LEDs 536 to provide a flickering light, which mimics movement that some insect species, including mosquitoes, may find attractive. For example, light flickering frequencies in the approximate range of 0.05 Hz (e.g., to mimic the breathing rate of mammals) to 270 Hz (e.g., the highest flicker frequency known to attract male houseflies), may be desirable and the lighting element may be configured to flicker within this range. Circuit board 534 may provide power to LEDs 536 to provide UV and/or visible and/or IR light, although it could be configured to provide power to only the UV LEDs 536 or to only the visible light LEDs 536, or to provide variable power to produce combinations of flickering UV and/or visible and/or IR light. In some embodiments, circuit board 534 may also be configured to drive a transmitter or transceiver such as a piezoelectric speaker or other device that may be mounted in base portion 512 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 510. It is desirable for such insect-attracting sound to be undetectable by a human beyond approximately a 1 meter distance from insect trap 510. Circuit board 534 may also include one or more electrical heating elements 542 such as one or more resistor or one or more resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 512 and into trap portion 514, to attract some insect species, including fleas and mosquitoes. Alternatively, one or more of LEDs 536 may generate heat, to replace or augment the heat generated by the one or more electrical elements. Alternatively, one or more of LEDs 536 may be replaced or augmented by one or more incandescent light bulbs to generate both heat and light. In general, the heat generated may increase and maintain the temperature of at least a portion of trap portion 514 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

Bottom surface 540 of base portion 512 may be substantially flat or concave to allow insect trap 510 to sit upright on a floor, desk, table or shelf when insect trap 510 is unplugged. Alternatively, bottom surface 540 of base portion 512 may have two or more protrusions (not shown) or legs that allow insect trap 510 to sit upright when insect trap 510 is unplugged.

In the operation of insect trap 510, conductive prongs 522 are inserted into a wall electrical socket. LEDs 536 emit light, represented by arrows, preferably UV and visible light, which transmit though a rear surface 538 of housing 524 of trap portion 514. In some embodiments, light is not manipulated in base portion 512 and is emitted directly into trap portion 514. A portion of the light continues within the enclosure, up one or more sides 572 of housing 524, and out through inside surfaces 530. Another portion of the light continues through wall of housing 524 and into the enclosure, where it illuminates inside surfaces 530. A portion of the light entering the enclosure continues through opening 526 in trap portion 514 and corresponding front opening 520 in base portion and is emitted into the area where insect trap 510 is installed. Insects in the area are attracted to the light transmitted through opening 526 in trap portion 514 and front opening 520 in base portion 512, and fly or crawl into front opening 520 and onto the inside surfaces 530 of trap portion 514, where they become stuck in the adhesive and are trapped. The user may observe trapped insects by looking through front opening 520 and opening 526. When a sufficient number of insects have been trapped, the user may easily remove and discard the entire used trap portion 514 without touching trapped insects, insect debris or adhesive, which remain out of reach inside trap portion 514, and replace it with a new trap portion 514. New trap portion 514 has fresh adhesive coating inside surfaces 530, housing 524 has a clean rear surface 538, through which the light is transmitted into trap portion 514, and the transparent or translucent material of trap portion 514 has not been degraded by prolonged exposure to UV light from LEDs 536, thereby ensuring that insect trap 510 will continue to efficiently and effectively attract and trap insects.

In some embodiments, because trap portion 514 mounts on top of, and not in front of, base portion 512, insect trap 510 protrudes minimally from the wall when plugged into an ordinary household wall socket, and therefore intrudes minimally into the home environment. In some embodiments, insect trap 510 is configured such that when insect trap 510 is mounted to a wall, its overall depth, defined by the overall distance insect trap 510 protrudes from the wall, is smaller than its overall height and its overall width.

It should be appreciated that a benefit of insect trap 510 is the manipulation of light within trap portion 514. In some embodiments, light manipulation occurs solely within trap portion 514. Light manipulation may include reflection, refraction, polarization, dispersion and/or diffusion and is achieved by engaging with a manipulative element or surface (e.g., housing 516 and inside surfaces 530). In some embodiments, light manipulation produces an even distribution of light on an adhesive surface or adhesive coating. In some embodiments, light is manipulated to produce a predetermined pattern on the adhesive coating or within trap portion 514, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers are used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

In some embodiments, trap portion 514 is approximately 20 mm to 600 mm wide, 20 mm to 600 mm high and 5 mm to 150 mm deep. In some embodiments, trap portion 514 is approximately 20 mm to 200 mm wide, 20 mm to 200 mm high and 5 mm to 80 mm deep. In some embodiments, trap portion 514 is approximately 20 mm to 130 mm wide, 20 mm to 130 mm high and 5 mm to 50 mm deep.

In some embodiments, base portion 512 is approximately 20 mm to 600 mm wide, 10 mm to 150 mm high and 10 mm to 150 mm deep. In some embodiments, base portion 512 is 20 mm to 200 mm wide, 10 mm to 100 mm high and 10 mm to 80 mm deep. In some embodiments, base portion 512 is 20 mm to 130 mm wide, 10 mm to 50 mm high and 10 mm to 50 mm deep.

As provided herein, opening 526 and front opening 520 may be a variety of shapes and/or sizes. For example, opening 526 and front opening 520 may be circular, square, rectangular, polygonal and/or elliptical in shape. Alternatively, opening 526 and front opening 520 may be slots having straight, curved or undulating shapes or patterns. When opening 526 and front opening 520 are circular, opening 526 and front opening 520 may be approximately 0.5 mm to 30 mm in diameter. In some embodiments, circular opening 526 and circular front opening 520 are approximately 0.5 mm to 20 mm in diameter. In some embodiments, circular opening 526 and circular front opening 520 are approximately 0.5 mm to 15 mm in diameter. When opening 526 and front opening 520 are slot shaped, opening 526 and front opening 526 may be approximately 2 mm to 30 mm wide and 5 mm to 500 mm long. In some embodiments, slot shaped opening 526 and slot shaped front opening 520 are approximately 2 mm to 20 mm wide and 5 mm to 200 mm long. In some embodiments, slot shaped opening 526 and slot shaped front opening 520 are approximately 2 mm to 15 mm wide and 5 mm to 100 mm long.

In some embodiments, opening 526 covers all or a portion of front surface 562 of housing 516. For example, opening 526 may cover a range of approximately 1% to 75% of the surface area of front surface 562 of housing 516. In some embodiments, opening 526 covers approximately 5% to 50% of the surface area of front surface 562 of housing 516. In some embodiments, opening 526 covers approximately 10% to 30% of the surface area of front surface 562 of housing 516.

Figure 17:
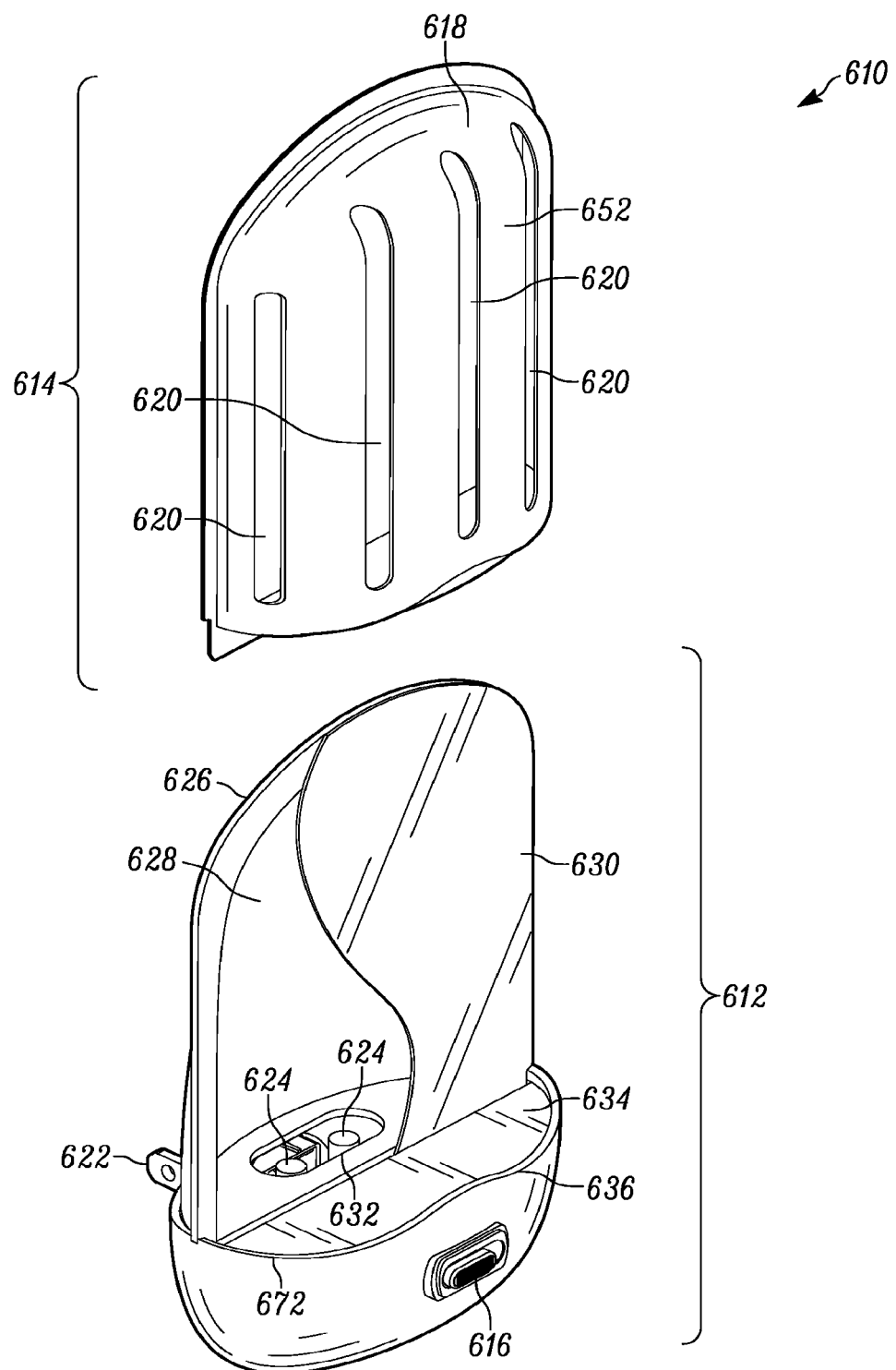
FIG. 17 is a front perspective view of a sixth embodiment of an insect trap in accordance with principles of the disclosure.

FIG. 17 is a front perspective view of a sixth embodiment of an insect trap, indicated generally at 610. Insect trap 610 may have an overall length, an overall width and an overall depth, and may be configured such that when insect trap 610 is mounted to a wall, its overall depth, defined by the overall distance insect trap 610 protrudes from the wall, is the smallest of the three overall dimensions. Insect trap 610 includes a base portion 612 and a removable trap portion 614. Trap portion 614 is shown removed from base portion 612 in this view. In some embodiments, base portion 612 includes a switch 616, configurable to enable insect trap 610 to be turned on or off by closing or opening switch 616, as desired by the user. Alternatively, switch 616 may be configured to control other features such as light intensity, combinations of light wavelengths, different modes or frequencies of flickering light, an automatic setting that turns on when the room gets dark, or a remote control setting, for example. In some embodiments, switch 616 may be manually operated, although switch 616 may also be operated electrically, optically, electro-mechanically, electro-optically, or by any method for opening or closing switch 616. Trap portion 614 includes a front housing 618 with at least one opening 620 in a front surface 652. Opening 620 may be configured to admit a wide variety of insects into insect trap 610, or alternatively it may be configured to admit one or more specific insect species. Opening 620 may preferably be configured to prevent user's fingers from penetrating opening 620 and inadvertently touching trapped insects or adhesive when removing and replacing trap portion 614. Opening 620 may preferably have a size and shape such that a sphere 25 mm in diameter cannot pass through opening 620, and opening 620 may preferably have a size and shape such that a sphere 1 mm in diameter may pass through any portion of opening 620. Opening 620 may be of uniform or of varying width, shape and orientation, and if trap portion 614 has more than one opening 620, they may be of identical or of differing widths, shapes and orientations. Opening 620 may be configured to attract one or more individual insect species or a variety of insect species. Protruding from a rear surface 670 (shown in FIG. 18) of base portion 612 are a plurality of electrically conductive prongs 622, only one of which is shown, adapted to mount insect trap 610 to a wall and provide power to insect trap 610 by inserting conductive prongs 622 into a standard household electrical wall socket. Alternatively, conductive prongs 622 may be adapted to swivel to allow insect trap 610 to remain upright when conductive prongs 622 are inserted into a horizontal outlet. Alternatively, base portion 612 may be configured to sit or hang wherever desired and receive power from batteries (not shown) mounted in base portion 612. While an electrical socket and batteries have been described as providing power to insect trap 610, any suitable power source may be used. Base portion 612 includes a lighting element such as one or more LEDs 624 and a rear housing 626, which includes a reflective-coated inside surface 628. In some embodiments, LEDs 624 include one that emits ultraviolet (UV) light and one that emits visible light. In some embodiments, LEDs 624 include at least one that emits UV light and at least one that emits blue light to better attract a wide variety of insect species. In some embodiments, the lighting element emits a combination of wavelengths to mimic sunlight. In some embodiments, LEDs 624 include at least one that emits infrared (IR) light to better attract certain species of insects such as mosquitos and fleas. In some embodiments, the material and surface finish of rear housing 626 may be configured to reflect and disperse UV and/or visible and/or IR light without a reflective coating. As shown, base portion 612 includes a transparent or translucent window 630, shown partially cut away to reveal LEDs 624. Window 630 protects inside surface 628 of rear housing 626 and LEDs 624 from dust and insect debris and allows base portion 612 to be easily cleaned. Window 630 may also be configured to polarize light transmitted through it in an orientation similar to that of daylight to further attract flying insects, a wide variety of which are known to detect polarized light. Window 630 may be attached at its perimeter (not shown) to rear housing 626 by any suitable manufacturing technique such as gluing or ultrasonic welding. In some embodiments, window 630 is removably attached to rear housing 626. Base portion 612 includes at least one opening 632. In some embodiments, on a perimeter 672 of a top surface 634 of base portion 612 is an upwardly directed rim or protrusions 636.

Figure 18:
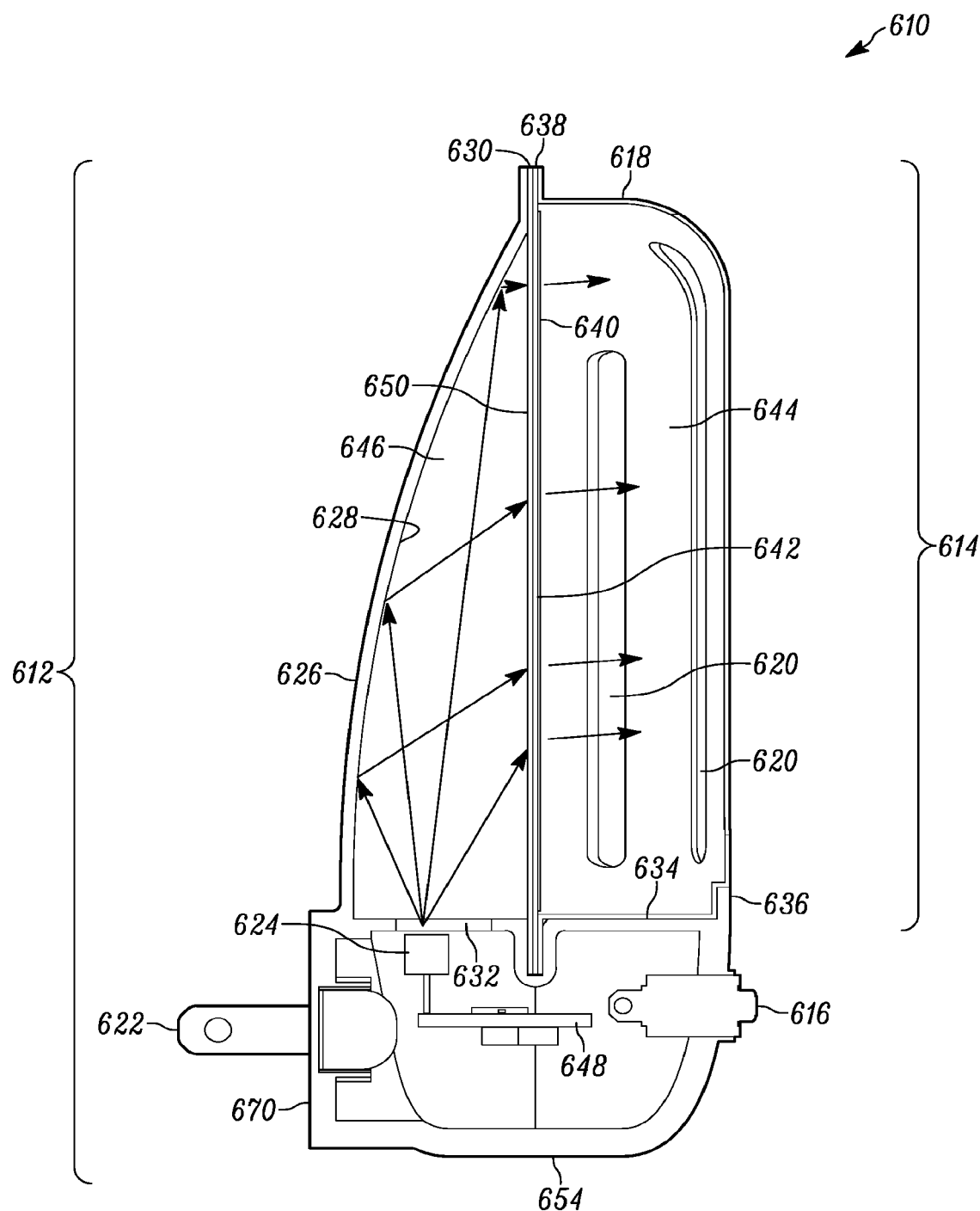
FIG. 18 is a cross-sectional view of the insect trap of FIG. 17.

FIG. 18 is a cross-sectional view of insect trap 610. Trap portion 614 includes front housing 618 with opening 620 and a back plate 638, which may be constructed of transparent or translucent material and coated with a transparent or translucent adhesive 640 on a front surface 642. In some embodiments, the material and thickness of back plate 638 and the material and thickness of adhesive 640 are selected to transmit a substantial proportion of the UV and/or visible and/or IR light, for example greater than 60% of the light is transmitted through back plate 638 and adhesive 640. In some embodiments, front housing 618 of trap portion 614 and rear housing 626 of base portion 612 are thermoformed from opaque plastic sheet, although other opaque, transparent or translucent materials such as paper, paperboard, cardboard or paper pulp may also be used. In some embodiments, front housing 618 and rear housing 626 are constructed by injection molding or by other suitable manufacturing techniques. Back plate 638 may also be configured to polarize light transmitted through it in an orientation similar to that of daylight to further attract flying insects, a wide variety of which are known to detect polarized light. Back plate 638 may have a rear surface (not shown), and may be substantially planar, although it may be formed into a convex, concave or saddle-shaped contour, or a combination of contours to optimize the even distribution of light. Alternatively, back plate 638 may have ribs or other features that increase the adhesive-coated surface area, produce alternating light/dark regions that some insect species find attractive, and enhance the transmission of insect-attracting light into trap portion 614. In some embodiments, front housing 618 is coated with transparent, translucent or opaque adhesive on an inside surface to provide additional insect trapping efficiency and capacity. In addition, front housing 618 may also have a reflective coating (not shown) underneath the adhesive coating on its inside surface to enhance its attraction to insects and further improve the insect trapping efficiency and effectiveness. Front housing 618 and back plate 638 may be joined together where they engage with adhesive, although they may also be joined by other commonly used packaging assembly techniques such as ultrasonic welding or RF sealing, or any other suitable assembly method. The materials of trap portion 614 may also include one or more insect attractants. For example, trap portion 614 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of insect trap 610. In such embodiments, the insect attractant is integral to trap portion 610. Alternatively, the insect attractants may be embedded or contained in a separate piece (not shown) that mounts on an inside surface or on an outside surface of front housing 618 or through opening 620 in front housing 618 or on front surface 642 of back plate 638. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 610.

As shown, front housing 618 and back plate 638 form a front enclosure 644 in trap portion 614, and rear housing 626 and window 630 form a rear enclosure 646 in base portion 612. In some embodiments, base portion 612 includes a circuit board 648 having a programmable processor or chip (not shown) for executing commands, electrically connected to conductive prongs 622, switch 616 and LEDs 624, only one of which is shown. For clarity, however, not all of the electrical connections are shown. Circuit board 648 may include electronic circuitry to receive ordinary household current from conductive prongs 622, only one of which is shown, respond to the position of switch 616 and provide power to illuminate LEDs 624. Circuit board 648 may include a full wave rectifier circuit or any other circuit to provide steady voltage to LEDs 624, although it could also provide a varying voltage to LEDs 624 to provide a flickering light, which mimics movement that some insect species, including mosquitoes, may find attractive. For example, light flickering frequencies in the approximate range of 0.05 Hz (e.g., to mimic the breathing rate of mammals) to 270 Hz (e.g., the highest flicker frequency to attract male houseflies), may be desirable and the lighting element may be configured to flicker within this range. Circuit board 648 may provide power to LEDs 624 to provide both UV and visible light, although it could be configured to provide power to only UV LEDs 624 or to only visible light LEDs 624, or to only IR light LEDs 624, or to provide variable power to produce combinations of flickering UV and/or visible and/or IR light. In some embodiments, circuit board 648 may also be configured to drive a transmitter or transceiver such as a piezoelectric speaker or other device that may be mounted in base portion 612 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 610. It is desirable for such insect-attracting sound to be undetectable by a human beyond approximately a 1-meter distance from insect trap 610.

Circuit board 648 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 612 and into trap portion 614, to attract some insect species, including fleas and mosquitoes. Alternatively, one or more of LEDs 624 may generate heat, to replace or augment the heat generated by the one or more electrical elements. Alternatively, one or more of LEDs 624 may be replaced or augmented by one or more incandescent light bulbs to generate both heat and light. In general, the heat generated may increase and maintain the temperature of at least a portion of trap portion 614 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, rim or protrusions 636 on top surface 634 of base portion 612 engage with trap portion 614 to secure it in place during use, although any other form of attachment may be substituted that allows trap portion 614 to be securely but removably mounted to base portion 612. A bottom surface 654 of base portion 612 may be substantially flat or concave to allow insect trap 610 to sit upright on a floor, desk, table or shelf when insect trap 610 is unplugged. Alternatively, bottom surface 654 of base portion 612 may have two or more protrusions (not shown) or legs that allow insect trap 610 to sit upright when insect trap 610 is unplugged.

In the operation of insect trap 610, conductive prongs 622 are inserted into a wall electrical socket, and switch 616 is moved to a closed position. LEDs 624 emit light, preferably UV and visible light, represented by arrows, which transmit through opening 632 in base portion 612, into rear enclosure 646, and onto inside surface 628 of rear housing 626 and rear surface 650 of window 630. In some embodiments, light is not manipulated in base portion 612 and is emitted directly into trap portion 614. Inside surface 628 of rear housing 626 may include a concave shape and may be configured to reflect and disperse the light from LEDs 624 to distribute the light evenly onto rear surface 650 of window 630, although inside surface 628 of rear housing 626 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute light (e.g., evenly, according to specific patterns, at a focal point, etc.) onto rear surface 650 of window 630, may be mounted to base portion 612 at or near opening 632 in base portion 612, and may replace or augment the role of inside surface 628 of rear housing 626. Alternatively, the light from LEDs 624 may directly strike rear surface 650 of window 630 at an oblique angle (e.g., an acute angle from approximately 0° to 90°) and be spread across and through window 630 of base portion 612 and onto back plate 638 of trap portion 614, and may replace or augment the role of inside surface 628 of rear housing 626 or of the lens or lenses mounted to base portion 612. The light transmits through back plate 638 and adhesive 640 on front surface 642, and into front enclosure 644. The light may be further evenly distributed by light-diffusing properties of window 630 of base portion 612, back plate 638 of trap portion 614, adhesive 640 on front surface 642 of back plate 638, or any combination of window 630, back plate 638 and adhesive 640. A portion of the light entering front enclosure 644 continues through opening 620 in front housing 618 and is emitted into the area where insect trap 610 is installed. Insects are attracted to the light transmitted through adhesive 640 and through opening 620 in front housing 618, and fly or crawl through opening 620 and onto adhesive 640, where they become trapped. The user may observe trapped insects by looking through opening 620 in front housing 618. When a sufficient number of insects have been trapped, the user may easily remove and discard the entire used trap portion 614 without touching trapped insects, insect debris or adhesive, which remain out of reach inside trap portion 614, and replace it with a new trap portion 614. The new trap portion 614 has fresh adhesive-coated surfaces, ensuring that insect trap 610 will continue to efficiently and effectively attract and trap insects.

In some embodiments, because trap portion 614 mounts on top of, and not in front of, base portion 612, insect trap 610 protrudes minimally from the wall when plugged into an ordinary household wall socket, and therefore intrudes minimally into the home environment. In some embodiments, insect trap 610 is configured such that when insect trap 610 is mounted to a wall, its overall depth, defined by the overall distance insect trap 610 protrudes from the wall, is smaller than its overall height and its overall width.

It should be appreciated that a benefit of insect trap 610 is the manipulation of light within trap portion 614. In some embodiments, light manipulation occurs solely within trap portion 614. Light manipulation may include reflection, refraction, polarization, dispersion and/or diffusion and is achieved by engaging with a manipulative element or surface (e.g., inside surface 628, window 630, back plate 638 and adhesive 640). In some embodiments, light manipulation produces an even distribution of light on adhesive 640. In some embodiments, light is manipulated to produce a predetermined pattern on adhesive 640 or within trap portion 614, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 610 of this configuration may accommodate a variety of different trap portions 614 that may be removably mounted to base portion 612, each trap portion 614 being uniquely configured to attract and trap a specific species or multiple species of insects. For example, the overall size and shape of trap portion 614, and the size, shape, location and orientation of opening 620 in front housing 618 of trap portion 614, may be uniquely configured to attract and trap a specific species or multiple species of insects. For example, in some embodiments, trap portion 614 is approximately 20 mm to 600 mm wide, 20 mm to 600 mm high and 5 mm to 150 mm deep. In some embodiments, trap portion 614 is approximately 20 mm to 200 mm wide, 20 mm to 200 mm high and 5 mm to 80 mm deep. In some embodiments, trap portion 614 is approximately 20 mm to 130 mm wide, 20 mm to 130 mm high and 5 mm to 50 mm deep.

In some embodiments, base portion 612 is approximately 20 mm to 600 mm wide, 10 mm to 150 mm high and 10 mm to 150 mm deep. In some embodiments, base portion 612 is 20 mm to 200 mm wide, 10 mm to 100 mm high and 10 mm to 80 mm deep. In some embodiments, base portion 612 is 20 mm to 130 mm wide, 10 mm to 50 mm high and 10 mm to 50 mm deep.

As provided herein, opening 620 may be a variety of shapes and/or sizes. For example, opening 620 may be circular, square, rectangular, polygonal and/or elliptical in shape. Alternatively, opening 620 may be a slot having straight, curved or undulating shapes or patterns. When opening 620 is circular, opening 620 may be approximately 0.5 mm to 30 mm in diameter. In some embodiments, circular opening 620 is approximately 0.5 mm to 20 mm in diameter. In some embodiments, circular opening 620 is approximately 0.5 mm to 15 mm in diameter. When opening 620 is slot shaped, opening 620 may be approximately 2 mm to 30 mm wide and 5 mm to 500 mm long. In some embodiments, slot shaped opening 620 is approximately 2 mm to 20 mm wide and 5 mm to 200 mm long. In some embodiments, slot shaped opening 620 is approximately 2 mm to 15 mm wide and 5 mm to 100 mm long.

In some embodiments, opening 620 covers all or a portion of front housing 618. For example, opening 620 may cover a range of approximately 1% to 75% of the surface area of front housing 618. In some embodiments, opening 620 covers approximately 5% to 50% of the surface area of front housing 618. In some embodiments, opening 620 covers approximately 10% to 30% of the surface area of front housing 618.

Figure 19:
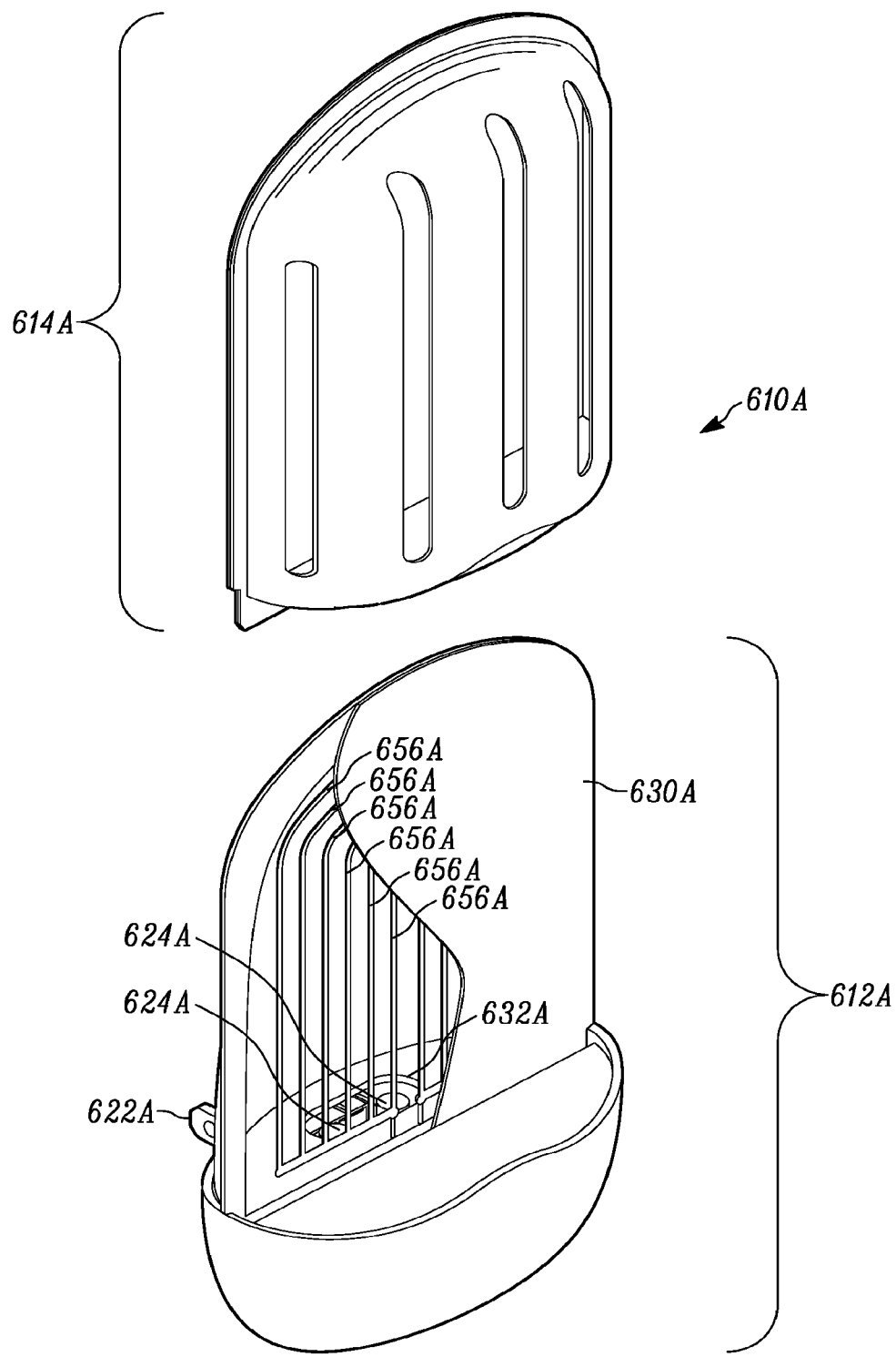
FIG. 19 is a front perspective view of an example of the sixth embodiment of an insect trap in accordance with principles of the disclosure.

Heat may attract a variety of flying insect species, including mosquitos. Accordingly, it may be beneficial for an insect trap to heat its insect-trapping adhesive so that the adhesive itself becomes attractive to insects. It may be particularly beneficial for an insect trap using both heat and light attractants to heat the adhesive to a uniform temperature while allowing the maximum amount of insect-attracting light to project through the adhesive. The insect trap of 610 may be adapted to uniformly heat the adhesive without significantly obstructing the insect attracting light projecting through the adhesive. FIG. 19 is a front perspective view of an example of the sixth embodiment of an insect trap, indicated generally at 610A. Insect trap 610A includes a base portion 612A and a removable trap portion 614A. Trap portion 614A is shown removed from base portion 612A in this view. Trap portion 614A may be identical in configuration to trap portion 614 of insect trap 610. Base portion 612A may be similar in configuration to base portion 612 of insect trap 610, and may include conductive prongs 622A (only one of which is shown), a lighting element such as one or more LEDs 624A, a window 630A, and an opening 632A. Base portion 612A of insect trap 610A also includes a heating element such as one or more heating wires 656A mounted on the rear surface (not shown) of window 630A. Heating wires 656A may be configured in a uniform pattern to produce a uniform heat distribution in response to electric power.

Figure 20:
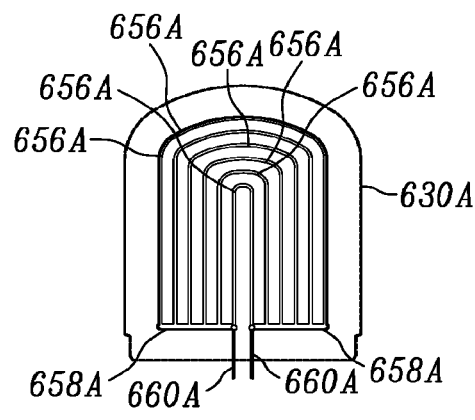
FIG. 20 is a rear view of a membrane heating configuration of the insect trap of FIG. 19.
Figure 21:
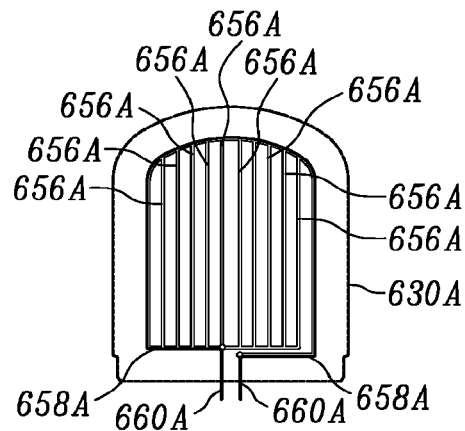
FIG. 21 is a rear view of a membrane heating configuration of the insect trap of FIG. 19.
Figure 22:
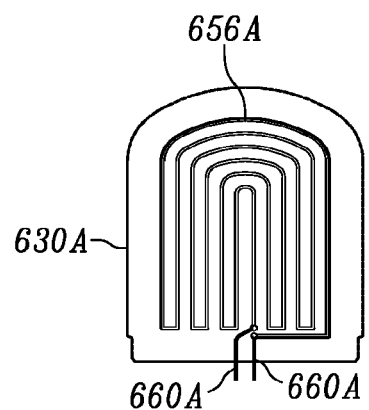
FIG. 22 is a rear view of a membrane heating configuration of the insect trap of FIG. 19.

FIG. 20, FIG. 21 and FIG. 22 are rear views of window 630A and various configurations of heating wires 656A. The outline of window 630A is shown as dashed lines in these views. FIG. 20 shows a uniform concentric pattern of heating wires 656A following the outline of window 630A and connected in parallel to a plurality of busses 658A, which, in turn, are electrically connected to a corresponding plurality of connecting wires 660A. In some embodiments, connecting wires 660A are electrically connected to busses 658A with solder. FIG. 21 shows a uniform pattern of vertical heating wires 656A connected in parallel to busses 658A, which, in turn, are electrically connected to connecting wires 660A. Alternatively, heating wires 656A may be oriented horizontally or at an oblique angle across window 630A. FIG. 22 shows a uniform labyrinthine pattern of a single heating wire 656A following the outline of window 630A. As there is only one heating wire 656A in this view, there is no need for busses (not shown in this view), and heating wire 656A is electrically connected directly to connecting wires 660A. In some embodiments, heating wires 656A may be configured in a non-uniform pattern to increase or decrease the temperature of some regions and improve temperature uniformity across window 630A. In some embodiments, heating wires 656A may be made of resistance wires glued or otherwise affixed to the rear surface of window 630A in a uniformly-spaced pattern and configured to produce heat in response to electric current. In some embodiments, heating wires 656A may be of conductive polymer or other conductive material applied directly to the rear surface of window 630A. In some embodiments, heating wires 656A may be of a self-correcting conductive polymer or other self-correcting conductive material that increases its internal resistance at higher temperatures and transfers electrical power from warmer regions to cooler ones, thereby improving temperature uniformity across heating wires 656A and window 630A. In some embodiments busses 658A may be made of highly conductive metal such as copper. In some embodiments, heating wires 656A and busses 658A both may be made of conductive polymer. In some embodiments, heating wires 656A may be of a transparent or translucent material. In some embodiments, heating wires 656A are replaced by a thin, transparent layer of metal oxide (not shown) on the rear surface of window 630A that is electrically connected at opposite sides of the rear surface of window 630A and produces heat in response to electric current. In general, the heat generated may increase and maintain the temperature of at least a portion of adhesive to between approximately 30 degrees C. and 45 degrees C., and to preferably between approximately 33 degrees C. and 42 degrees C., in order to mimic the skin and body temperatures of mammals.

Figure 23:
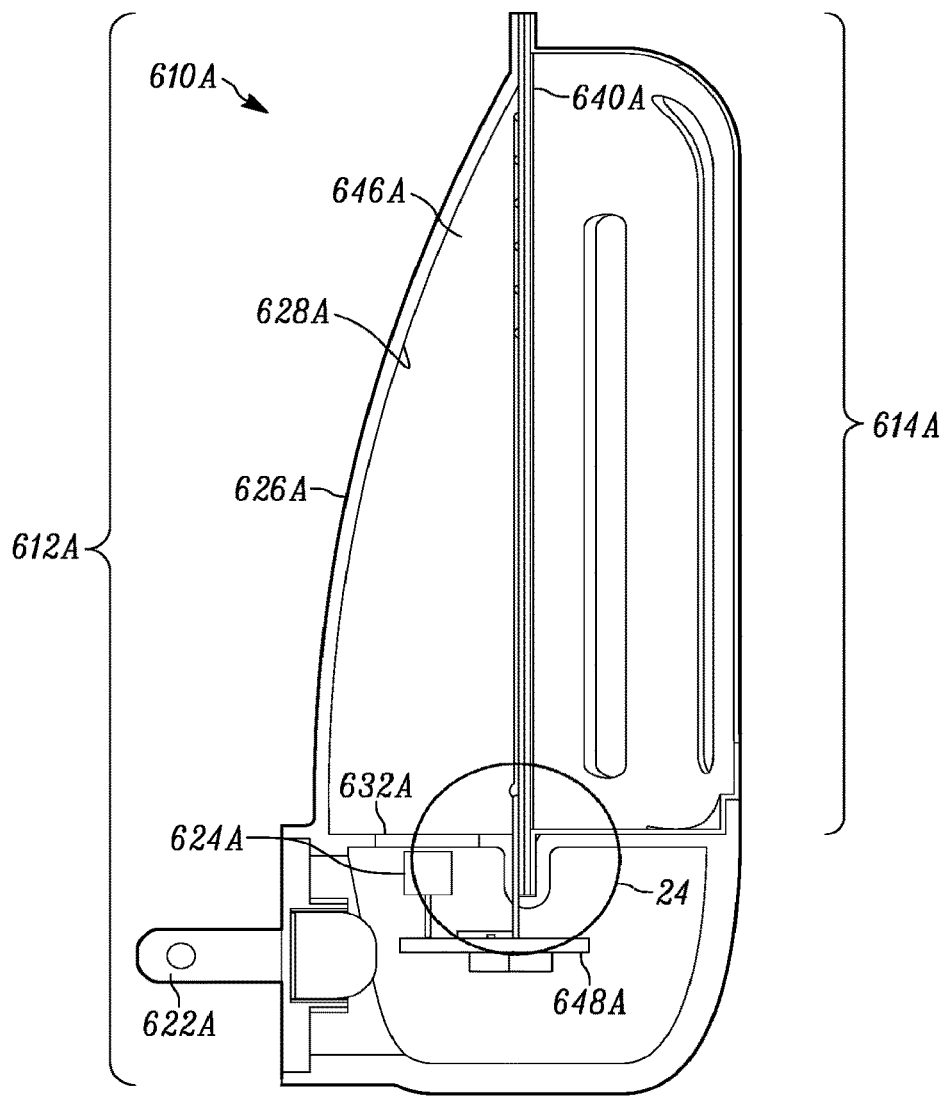
FIG. 23 is a cross-sectional view of the insect trap of FIG. 19.
Figure 24:
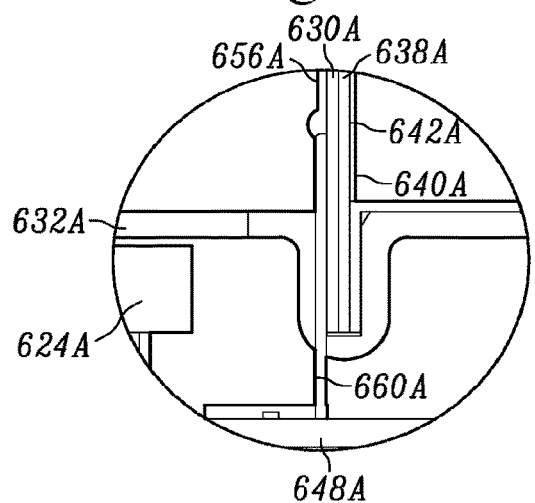
FIG. 24 is an enlarged view of a portion of FIG. 23.

FIG. 23 is a cross-sectional view of insect trap 610A, and FIG. 24 is an enlarged view of a portion of FIG. 23. Trap portion 614A includes back plate 638A with a coating of insect-attracting adhesive 640A on its front surface 642A. Base portion 612A includes a rear housing 626A with an inside surface 628A. Rear housing 626A and window 630A form a rear enclosure 646A. Base portion 612A also includes a circuit board 648A electrically connected to conductive prongs 622A (only one of which is shown), LEDs 624A (only one of which is shown), and connecting wires 660A (only one of which is shown). For clarity, not all electrical connections are shown. Circuit board 648A is configured to receive ordinary household current from conductive prongs 622A, provide power to illuminate LEDs 624A, and provide power to connecting wires 660A, which, in turn, provide power to buses 658A (not shown in this view), which, in turn, provide power to heating wires 656A, which generate heat and warm window 630A, which, in turn, warms back plate 638A, which warms adhesive 640A to a uniform temperature. In some embodiments, circuit board is configured to monitor the current through connecting wires 660A and respond to temperature-related changes in resistance through heating wires 656A by increasing or decreasing voltage through heating wires 656A, thereby warming adhesive 640A to a steady, uniform temperature. Light from LEDs 624A transmits through opening 632A in base 612A and into rear enclosure 646A. A portion of light from LEDs 624A directly illuminates window 630A and a portion of light reflects off inside surface 628A of rear housing 626A and illuminates window 630A. Light transmits through window 630A, back plate 638A, and adhesive 640A. Heating wires 656A are sufficiently thin to obstruct only a small fraction of the light transmitting through adhesive 640A. Accordingly, insect trap 610A may warm adhesive 640A to a uniform temperature without significantly obstructing the insect-attracting light projecting through adhesive 640A. In some embodiments, heat alone is used as an attractant, and light sources are not used in insect trap 610A.

Figures 25, 26:
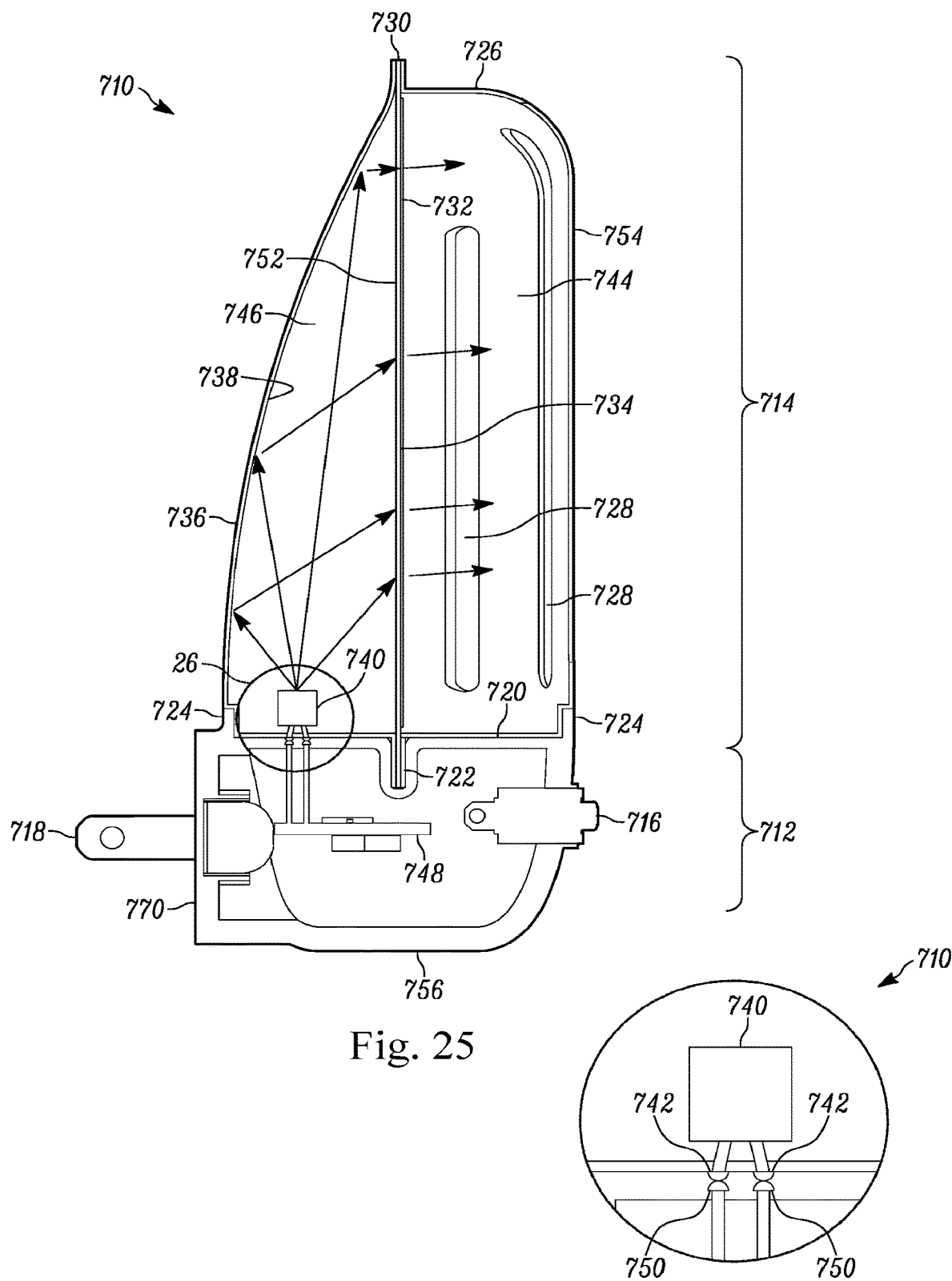
FIG. 25 is a cross-sectional view of a seventh embodiment of an insect trap in accordance with principles of the disclosure.
FIG. 26 is an enlarged view of a portion of FIG. 25.

FIG. 25 is a cross-sectional view of a seventh embodiment of an insect trap, indicated generally at 710, and FIG. 26 is an enlarged view of a portion of FIG. 25. Insect trap 710 includes a base portion 712 and a removable trap portion 714. Insect trap 710 may have an overall length, an overall width and an overall depth, and may be configured such that when insect trap 710 is mounted to a wall, its overall depth, defined by the overall distance insect trap 710 protrudes from the wall, is the smallest of the three overall dimensions. As shown, base portion 712 includes a switch 716, configurable to enable insect trap 710 to be turned on or off by closing or opening switch 716, as desired by the user. Alternatively, switch 716 may be configured to control other features such as light intensity, combinations of light wavelengths, different modes or frequencies of flickering light, an automatic setting that turns on when the room gets dark, or a remote control setting, for example. Switch 716 may be manually operated, although switch 716 may also be operated electrically, optically, electro-mechanically, electro-optically, or by any method for opening or closing switch 716. Protruding from a rear surface 770 of base portion 712 are a plurality of electrically conductive prongs 718 (only one of which is shown in this view) adapted to mount insect trap 710 to a wall and provide power to insect trap 710 by inserting conductive prongs 718 into a standard household electrical wall socket. Alternatively, conductive prongs 718 may be adapted to swivel to allow insect trap 710 to remain upright when conductive prongs 718 are inserted into a horizontally oriented electrical wall socket. Alternatively, base portion 712 may be configured to sit or hang wherever desired and receive power from batteries (not shown) mounted in base portion 712. While an electrical socket and batteries have been described as providing power to insect trap 710, any suitable power source may be used. In some embodiments, a slot 722 is located in a top surface 720 of base portion 712, and an upwardly directed rim or protrusions 724 are located on a perimeter of top surface 720.

Trap portion 714 includes a front housing 726 with at least one opening 728 in a front surface 754, a divider 730, a rear housing 736, a lighting element such as one or more LEDs 740 (only one of which is shown), and electrical trap contacts 742. Opening 728 in front housing 726 may be configured to admit a wide variety of insects into insect trap 710, or alternatively it may be configured to admit one or more specific insect species. Opening 728 may preferably be configured to prevent user's fingers from penetrating opening 728 and inadvertently touching trapped insects or adhesive when removing and replacing trap portion 714. Opening 728 may preferably have a size and shape such that a sphere 25 mm in diameter cannot pass through opening 728. Opening 728 may preferably have a size and shape such that a sphere 1 mm in diameter may pass through any portion of opening 728. Opening 728 may be of uniform or of varying width, shape and orientation, and if trap portion 714 has more than one opening 728, they may be of identical or of differing widths, shapes and orientations. Opening 728 may be configured to attract one or more individual species or a variety of insect species. In some embodiments, divider 730 is constructed from transparent or translucent material and is coated with a transparent or translucent adhesive 732 on a front surface 734. In some embodiments, the material and thickness of divider 730 and the material and thickness of adhesive 732 are selected to transmit a substantial proportion of light, for example greater than 60% of the light is transmitted through divider 730 and adhesive 732. Divider 730 may also be configured to polarize light transmitted through it in an orientation similar to that of daylight to further attract flying insects, a wide variety of which are known to detect polarized light. In some embodiments, LEDs 740 include one that emits ultraviolet (UV) light and one that emits visible light. In some embodiments, LEDs 740 include at least one that emits UV light and at least one that emits blue light to better attract a wide variety of insect species. In some embodiments, the lighting element emits a combination of wavelengths to mimic sunlight. In some embodiments, LEDs 740 include at least one that emits infrared (IR) light to better attract certain species of insects such as mosquitos and fleas. As shown, there are two trap contacts 742 for each of LEDs 740. Thus, trap contacts 742 are electrically connected to their respective LEDs 740. While two trap contacts 742 are shown for each of LEDs 740, any suitable number may be used.

In some embodiments, rear housing 736 includes a reflective-coated inside surface 738. The material and surface finish of rear housing 736 may alternatively be configured to reflect and disperse UV and/or visible and/or IR light without a reflective coating. In some embodiments, front housing 726 and rear housing 736 are thermoformed from opaque sheet plastic, although other opaque, transparent or translucent materials such as paper, paperboard, cardboard or paper pulp may also be used. In some embodiments, front housing 726 and rear housing 736 are constructed by injection molding or by other suitable manufacturing techniques.

As shown, divider 730 may be substantially planar, and may be configured to be parallel to, or at an angle to the primary direction of the light produced by LEDs 740, although divider 730 may be formed into a convex, concave or saddle-shaped contour, or a combination of contours to optimize the even distribution of light. Alternatively, divider 730 may include ribs or other features that increase the adhesive-coated surface area, produce alternating light/dark regions that some insect species find attractive, and enhance the transmission of insect-attracting light into interior of trap portion 714. In some embodiments, front housing 726 is coated with transparent, translucent or opaque adhesive on an inside surface to provide additional insect trapping efficiency and capacity. In addition, front housing 726 may include a reflective coating underneath the adhesive coating on an inside surface to enhance its attraction to insects and further improve the insect trapping efficiency and effectiveness. Front housing 726, divider 730 and rear housing 736 may be joined together where they intersect or engage with adhesive, although they may also be joined by other commonly used packaging assembly techniques such as ultrasonic welding or RF sealing, or any other suitable assembly method. The materials of trap portion 714 may also include one or more insect attractants. For example, trap portion 714 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of insect trap 710. In such embodiments, the insect attractant is integral to trap portion 714. Alternatively, the insect attractants may be embedded or contained in a separate piece (not shown) that mounts on an inside surface of front housing 726 or through opening 728 in front housing 726 or on front surface 754 of front housing 726 or on front surface 734 of divider 730. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 710. As shown, divider 730 has a rear surface 752, and separates trap portion 714 into a front enclosure 744 and a rear enclosure 746.

In some embodiments, base portion 712 includes electrical base contacts 750 and a circuit board 748 having a programmable processor or chip (not shown) for executing commands, electrically connected to conductive prongs 718, switch 716, and base contacts 750. For clarity, however, not all of the electrical connections are shown. While two base contacts 750 are shown in base portion 712 for each of LEDs 740 in trap portion 714, any suitable number may be used. Base contacts 750 may be configured to provide an electrical connection with trap contacts 742 when trap portion 714 is removably mounted to base portion 712. Circuit board 748 may include electronic circuitry to receive ordinary household current from conductive prongs 718, respond to the position of switch 716 and provide power to base contacts 750, which, in turn, provide power to trap contacts 742 and illuminate LEDs 740 in trap portion 714 when trap portion 714 is mounted to base portion 712. In some embodiments, circuit board 748 includes an energy stabilizer such as a full wave rectifier circuit or any other circuit to provide steady voltage to LEDs 740, although it could also provide a varying voltage to LEDs 740 to provide a flickering light, which mimics movement that some insect species, including mosquitoes, may find attractive. For example, light flickering frequencies in the approximate range of 0.05 Hz (e.g., to mimic the breathing rate of mammals) to 270 Hz (e.g., the highest flicker frequency to attract male houseflies), may be desirable and the lighting element may be configured to flicker within this range. Circuit board 748 may provide power to LEDs 740 to provide UV and/or visible and/or IR light, although it could be configured to provide power to only UV LEDs 740 or to only visible light LEDs 740 or to only IR LEDs 740, or to provide variable power to produce combinations of flickering UV and/or visible and/or IR light. In some embodiments, circuit board 748 may also be configured to drive a transmitter or transceiver such as a piezoelectric speaker or other device that may be mounted in base portion 712 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 710. It is desirable for such insect-attracting sound to be undetectable by a human beyond approximately a 1-meter distance from insect trap710. Circuit board 748 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 712 and into trap portion 714, to attract some insect species, including fleas and mosquitoes. Alternatively, one or more of LEDs 740 may generate heat, to replace or augment the heat generated by the one or more electrical elements. Alternatively, one or more of LEDs 740 may be replaced or augmented by one or more incandescent light bulbs to generate both heat and light. In general, the heat generated may increase and maintain the temperature of at least a portion of trap portion 714 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

Slot 722 and protrusions 724 in top surface 720 of base portion 712 are configured to engage with trap portion 714 to secure it in place during use, although any other form of attachment may be substituted that allows trap portion 714 to be securely but removably mounted to base portion 712. A bottom surface 756 of base portion 712 may be substantially flat or concave to allow insect trap 710 to sit upright on a floor, desk, table or shelf when insect trap 710 is unplugged. Alternatively, bottom surface 756 of base portion 712 may have two or more protrusions (not shown) or legs that allow insect trap 710 to sit upright when insect trap 710 is unplugged.

In the operation of insect trap 710, conductive prongs 718 are inserted into a wall electrical socket, switch 716 is moved to a closed position, and trap portion 714 is mounted to base portion 712. LEDs 740 emit light, represented by arrows, which transmit light into rear enclosure 746, and onto inside surface 738 of rear housing 736 and rear surface 752 of divider 730. In some embodiments, light is not manipulated in base portion 712 and is emitted directly into trap portion 714. Inside surface 738 of rear housing 736 may be a concave shape and configured to reflect and disperse light from LEDs 740 to distribute the light evenly onto rear surface 752 of divider 730, although the shape of inside surface 738 of rear housing 736 may have a convex shape or a saddle shape or a combination of shapes, or may also have ribs (not shown) or other features to more evenly distribute the light. Alternatively, an optical enhancer such as an anamorphic lens (not shown) or any other lens or combination of lenses configured to distribute light (e.g., evenly, according to specific patterns, at a focal point, etc.) onto rear surface 752 of divider 730, may be mounted to rear housing 736 proximate to or above LEDs 740 or may be mounted to LEDs 740, and may replace or augment the role of inside surface 738 of rear housing 736. Alternatively, the light from LEDs 740 may directly strike rear surface 752 of divider 730 at an oblique angle (e.g., an acute angle from approximately 0° to 90°) and may be spread across divider 730, and may replace or augment the role of inside surface 738 of rear housing 736, or of the lens or lenses mounted to rear housing 736 or to LEDs 740. The light may transmit through divider 730 and adhesive 732 on front surface 734, and into front enclosure 744. The light may be further evenly distributed by the light-diffusing properties of divider 730, adhesive 732 on front surface 734, or both. A portion of the light entering front enclosure 744 continues through opening 728 in front housing 726 and is emitted into the area where insect trap 710 is installed. Insects are attracted to the light transmitted through adhesive 732 and through opening 728 in front housing 726, and fly or crawl into opening 728 and onto adhesive 732, where they become trapped. The user may observe trapped insects by looking through opening 728 in front housing 726. When a sufficient number of insects have been trapped, the user may easily remove and discard the entire used trap portion 714 without touching trapped insects, insect debris or adhesive, which remain out of reach inside trap portion 714, and replace it with a new trap portion 714. The new trap portion 714 has fresh adhesive-coated surfaces and light-directing surfaces, ensuring that insect trap 710 will continue to efficiently and effectively attract and trap insects.

In some embodiments, because trap portion 714 mounts on top of, and not in front of, base portion 712, insect trap 710 protrudes minimally from the wall when plugged into an ordinary household wall socket, and therefore intrudes minimally into the home environment. In some embodiments, insect trap 710 is configured such that when insect trap 710 is mounted to a wall, its overall depth, defined by the overall distance insect trap 710 protrudes from the wall, is smaller than its overall height and its overall width.

It should be appreciated that a benefit of insect trap 710 is the manipulation of light within trap portion 714. In some embodiments, light manipulation occurs solely within trap portion 714. Light manipulation may include reflection, refraction, polarization, dispersion and/or diffusion and is achieved by engaging with a manipulative element or surface (e.g., inside surface 738, divider 730 and adhesive 732). In some embodiments, light manipulation produces an even distribution of light on an adhesive surface or adhesive coating. In some embodiments, light is manipulated to produce a predetermined pattern on the adhesive coating or within trap portion 714, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 710 of this configuration may accommodate a variety of different trap portions 714 that may be removably mounted to base portion 712, each trap portion 714 being uniquely configured to attract and trap a specific species or multiple species of insects. For example, the overall size and shape of trap portion 714, the size, shape, location and orientation of opening 728 in front housing 726 of trap portion 714, and the wavelength and intensity of LEDs 740 may be uniquely configured to attract and trap a specific species or multiple species of insects. For example, in some embodiments, trap portion 714 is approximately 20 mm to 600 mm wide, 20 mm to 600 mm high and 5 mm to 150 mm deep. In some embodiments, trap portion 714 is approximately 20 mm to 200 mm wide, 20 mm to 200 mm high and 5 mm to 80 mm deep. In some embodiments, trap portion 714 is approximately 20 mm to 130 mm wide, 20 mm to 130 mm high and 5 mm to 50 mm deep.

In some embodiments, base portion 712 is approximately 20 mm to 600 mm wide, 10 mm to 150 mm high and 10 mm to 150 mm deep. In some embodiments, base portion 712 is 20 mm to 200 mm wide, 10 mm to 100 mm high and 10 mm to 80 mm deep. In some embodiments, base portion 712 is 20 mm to 130 mm wide, 10 mm to 50 mm high and 10 mm to 50 mm deep.

As provided herein, opening 728 may be a variety of shapes and/or sizes. For example, opening 728 may be circular, square, rectangular, polygonal and/or elliptical in shape. Alternatively, opening 728 may be slot shaped having straight, curved or undulating shapes or patterns. When opening 728 is circular, opening 728 may be approximately 0.5 mm to 30 mm in diameter. In some embodiments, circular opening 728 is approximately 0.5 mm to 20 mm in diameter. In some embodiments, circular opening 728 is approximately 0.5 mm to 15 mm in diameter. When opening 728 is slot shaped, opening 728 may be approximately 2 mm to 30 mm wide and 5 mm to 500 mm long. In some embodiments, slot shaped opening 728 is approximately 2 mm to 20 mm wide and 5 mm to 200 mm long. In some embodiments, slot shaped opening 728 is approximately 2 mm to 15 mm wide and 5 mm to 100 mm long.

In some embodiments, opening 728 covers all or a portion of front housing 726. For example, opening 728 may cover a range of approximately 1% to 75% of the surface area of front housing 726. In some embodiments, opening 728 covers approximately 5% to 50% of the surface area of front housing 726. In some embodiments, opening 728 covers approximately 10% to 30% of the surface area of front housing 726.

Figure 27:
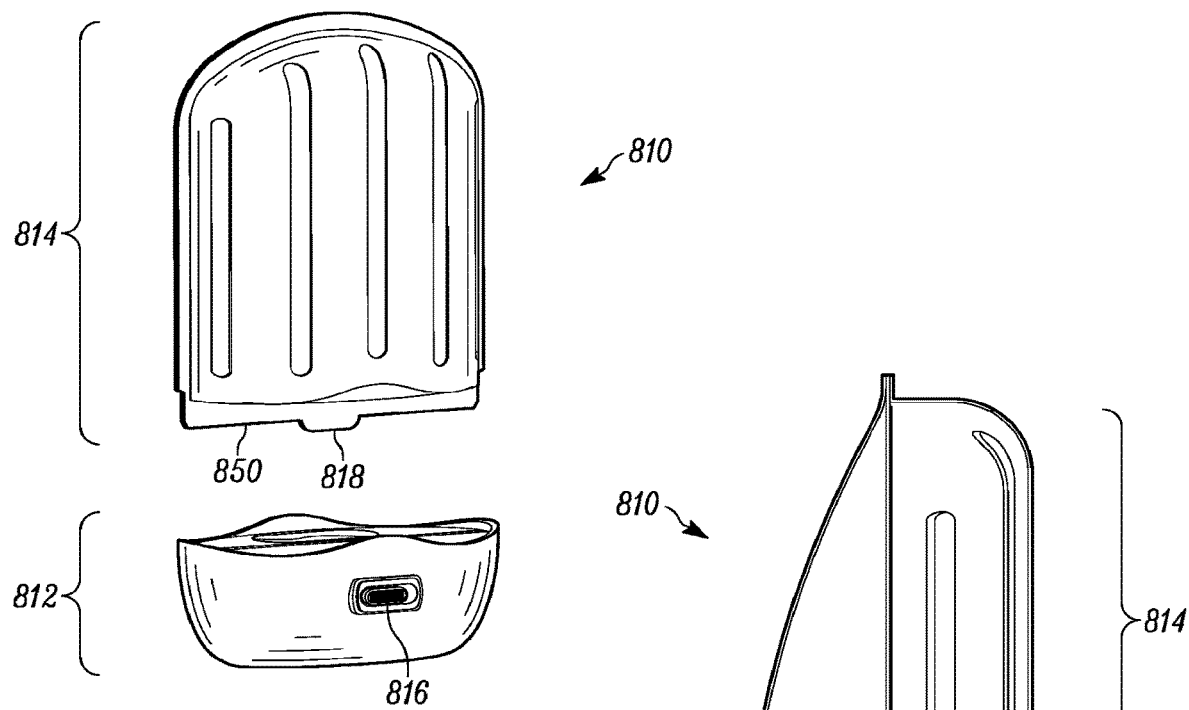
FIG. 27 is a front perspective view of an eighth embodiment of an insect trap in accordance with principles of the disclosure.

FIG. 27 is a front perspective view of an eighth embodiment of an insect trap, indicated generally at 810. Insect trap 810 includes a trap portion 814 and a base portion 812. Trap portion 814 is shown removed from base portion 812 in this view. In some embodiments, trap portion 814 includes an engageable portion 818 protruding downward from a bottom surface 850. However, engageable portion 818 does not need to protrude from trap portion 814. Engageable portion 818 may be a non-protruding portion of a flush bottom surface of trap portion 814 that engages at least partially with base portion 812. Base portion 812 may have a corresponding opening 824 (shown in FIG. 29) to receive engageable portion 818 when trap portion 814 is mounted to base portion 812. Opening 824 may preferably be configured such that the user's finger cannot pass through opening 824. Opening 824 may preferably be configured such that a sphere 10 mm in diameter cannot pass through opening 824. As shown, base portion 812 includes a switch 816.

Figure 28:
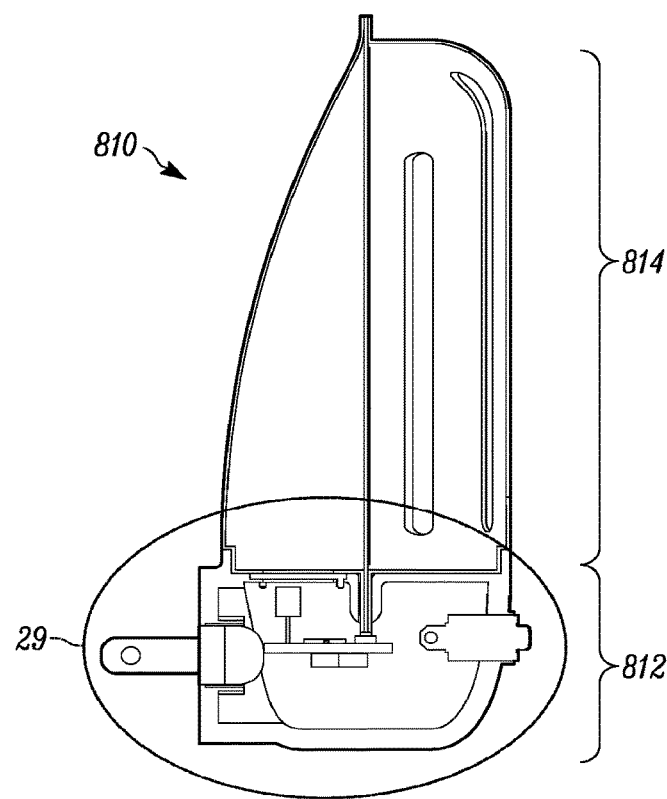
FIG. 28 is a cross sectional view of the insect trap of FIG. 27.
Figure 29:
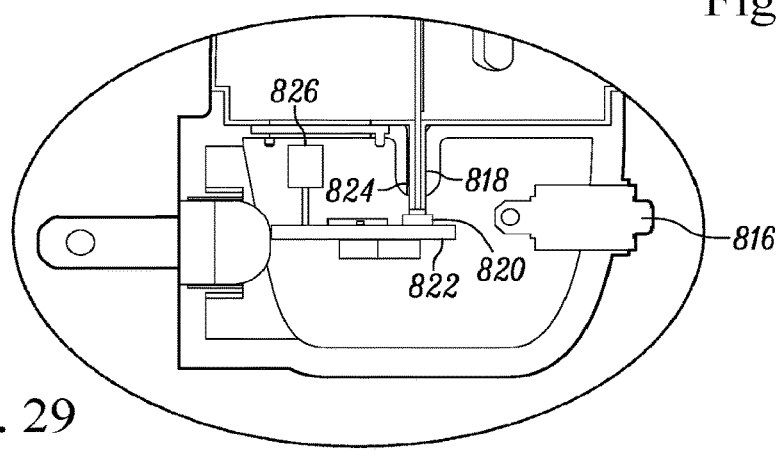
FIG. 29 is an enlarged view of a portion of FIG. 28.

FIG. 28 is a cross sectional view of insect trap 810 and FIG. 29 is an enlarged view of a portion of FIG. 28. Base portion 812 may include a circuit board 822, a docking switch 820, and one or more LEDs 826, only one of which is shown. Although docking switch 820 is shown mounted on circuit board 822, docking switch 820 may also be mounted directly to base portion 812. In some embodiments, LEDs 826 may include one or more that emits ultraviolet (UV) light and one or more that emits visible light to better attract a wide variety of insect species. In some embodiments, the lighting element emits a combination of wavelengths to mimic sunlight. In some embodiments, one or more of LEDs 826 may emit infrared (IR) light to better attract certain types of insects such as mosquitos and fleas. In some embodiments, circuit board 822 has a programmable processor or chip (not shown) for executing commands, and is configured to provide power and instructions to desired components (e.g., switch 816, LEDs 826, etc.). For clarity, however, not all of the electrical connections are shown. In some embodiments, circuit board 822 includes a docking switch 820 mounted thereon.

Engageable portion 818 of trap portion 814 engages docking switch 820 when trap portion 814 is mounted to base portion 812. Docking switch 820 may be configured to close when engageable portion 818 of trap portion 814 engages with it, as when trap portion 814 is mounted to base portion 812, and may be configured to open when engageable portion 818 of trap portion 814 is lifted from docking switch 820, as when trap portion 814 is removed from base portion 812. Docking switch 820 may be configured to activate in response to force or pressure from engageable portion 818 on trap portion 814. Alternatively, docking switch 820 may be configured to activate in response to displacement by engageable portion 818 on trap portion 814. Alternatively, docking switch 820 may be configured as an optical switch to close when a light beam is broken by the engageable portion 818 of trap portion 814, or may be configured as a Hall effect sensor to close when in proximity to a magnet on trap portion 814, or may be configured as any other switch or sensor that opens or closes when trap portion 814 is mounted or removed from base portion 812. Docking switch 820 may be electrically connected to circuit board 822 and/or switch 816 to deactivate UV and/or visible light and/or IR LEDs 826 when trap portion 814 is removed from base portion 812, thereby preventing the user from looking directly at the UV and/or visible and/or IR light from LEDs 826 as well as reducing energy consumption. Alternatively, docking switch 820 may be electrically connected to circuit board 822 and/or switch 816 to deactivate only UV LEDs 826 and/or IR LEDs 826 and/or visible light LEDs 826 when trap portion 814 is removed from base portion 812.

FIG. 30 is a front perspective view of a ninth embodiment of an insect trap, indicated generally at 910. Insect trap 910 includes a trap portion 914 and a base portion 912. Trap portion 914 is shown removed from base portion 912 in this view. In some embodiments, trap portion 914 includes an engageable portion 918 protruding downward from a bottom surface (not shown). However, engageable portion 918 does not need to protrude from trap portion 914. Engageable portion 918 may be a non-protruding portion of a flush bottom surface of trap portion 914 that engages at least partially with base portion 912. Base portion 912 may have a corresponding opening 924 (shown in FIG. 32), to receive engageable portion 918 when trap portion 914 is mounted to base portion 912. Opening 924 may preferably be configured such that a user's finger cannot pass through opening 924. Opening 924 may preferably be configured such that a sphere 10 mm in diameter cannot pass through opening 924. As shown, base portion 912 may also have a switch 916.

FIG. 31 is a cross sectional view of insect trap 910 and FIG. 32 is an enlarged view of a portion of FIG. 31. Base portion 912 may include a circuit board 922, a docking switch 920, and one or more LEDs 926, only one of which is shown. Although docking switch 920 is shown mounted on circuit board 922, docking switch 920 may also be mounted directly to base portion 912. In some embodiments, LEDs 926 may include one or more that emits ultraviolet (UV) light and one or more that emits visible light, preferably blue light to better attract a wide variety of insect species. In some embodiments, the lighting element emits a combination of wavelengths to mimic sunlight. In some embodiments, one or more of LEDs 926 may emit infrared (IR) light to better attract certain types of insects such as mosquitos and fleas. In some embodiments, circuit board 922 has a programmable processor or chip (not shown) for executing commands, and is configured to provide power and instructions to desired components (e.g., switch 916, LEDs 926, etc.). For clarity, however, not all of the electrical connections are shown. Base portion 912 may include a screen 928. Engageable portion 918 on trap portion 914 engages docking switch 920 when trap portion 914 is mounted to base portion 912. Docking switch 920 may be configured to close when engageable portion 918 on trap portion 914 engages with it, as when trap portion 914 is mounted to base portion 912, and may be configured to open when engageable portion 918 of trap portion 914 is lifted from docking switch 920, as when trap portion 914 is removed from base portion 912. Docking switch 920 may be configured to activate in response to force or pressure from engageable portion 918 on trap portion 914. Alternatively, docking switch 920 may be configured to activate in response to displacement by engageable portion 918 on trap portion 914. Alternatively, docking switch 920 may be configured as an optical switch to close when a light beam is broken by engageable portion 918 of trap portion 914, or may be configured as a Hall effect sensor to close when in proximity to a magnet on trap portion 914, or may be configured as any other switch or sensor that opens or closes when trap portion 914 is mounted or removed from base portion 912. Docking switch 920 may be electrically connected to circuit board 922 and/or switch 916. Circuit board 922 may be electrically connected to one or more UV and/or visible light and/or IR LEDs 926, only one of which is shown, and may also be electrically connected to screen 928, and may activate screen 928 when docking switch 920 is closed. In some embodiments, screen 928 may use liquid crystal (LC) technology and be configured to block all or a portion of the light from UV and/or visible and/or IR light LEDs 926 when screen 928 is activated, thereby preventing the user from looking directly at the UV and/or visible and/or IR light from LEDs 926 as well as reducing energy consumption. In some embodiments, when activated, screen 928 may be configured to block all or a portion of the light from only UV LEDs 926, or all or a portion of the light from only visible light LEDs 926, or all or a portion of the light from only IR LEDs 926, or any combination of UV, visible light, and IR LEDs 926. In some embodiments, screen 928 may use an electric motor, or a solenoid, or a magnetostrictive actuator, or a piezoelectric actuator, or one or more of a variety of electromechanical methods to close a shutter and block all or a portion of the light from UV LEDs 926, or the light from visible light LEDs 926, or the light from IR LEDs 926, or the light from any combination of UV, visible light, and IR LEDs 926. Alternatively, screen 928 may be configured to be actuated mechanically by engageable portion 918 of trap portion 914 to close a shutter in screen 928 and block all or a portion of the light from UV and/or visible light and/or IR LEDs 926 when trap portion 914 is removed from base portion 912.

Figure 33:
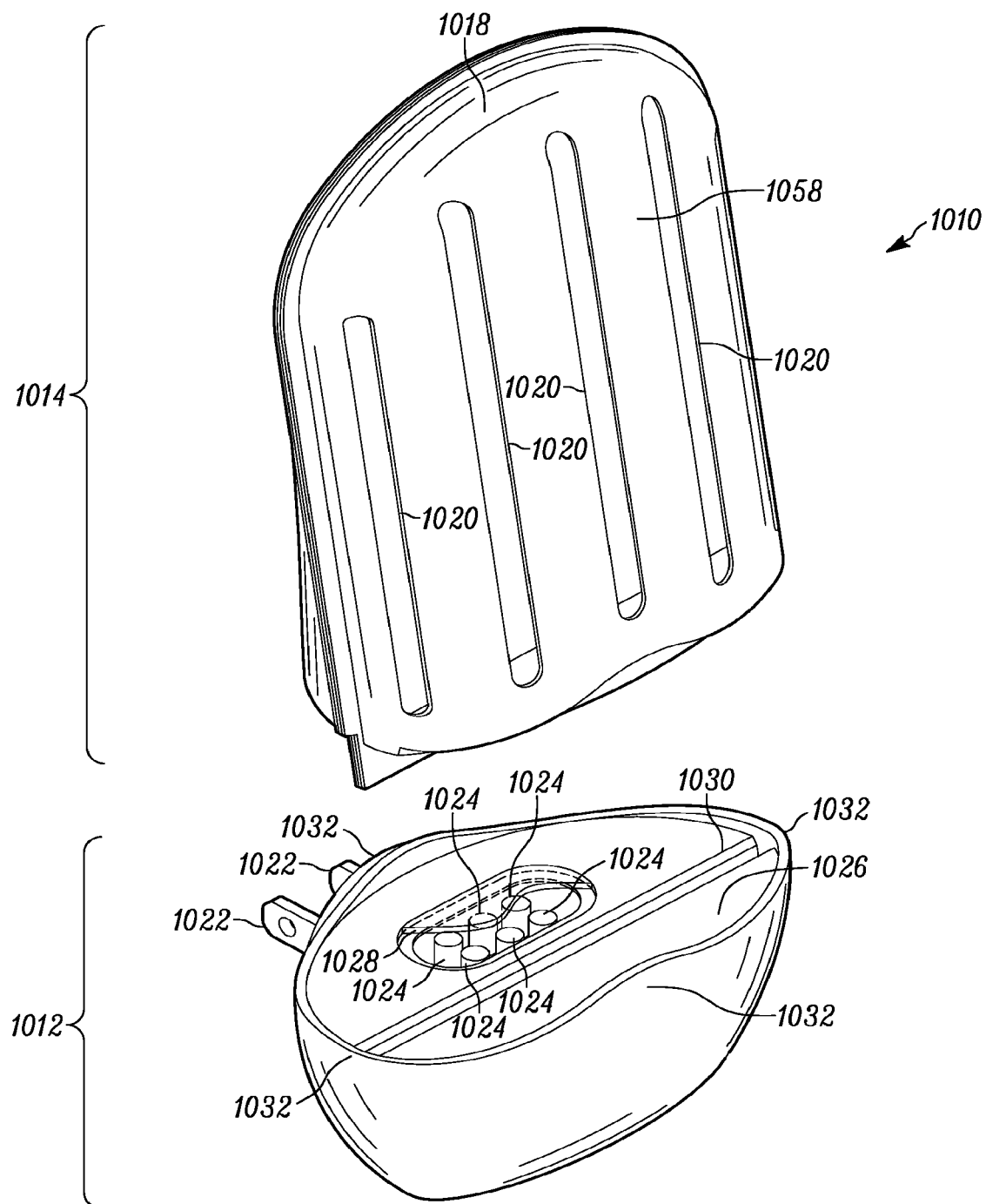
FIG. 33 is a front perspective view of a tenth embodiment of an insect trap in accordance with principles of the disclosure.

FIG. 33 is a front perspective view of a tenth embodiment of an insect trap, indicated generally at 1010. Insect trap 1010 includes a base portion 1012 and a removable trap portion 1014. Trap portion 1014 is shown removed from base portion 1012 in this view. Insect trap 1010 may have an overall length, an overall width and an overall depth, and may be configured such that when insect trap 1010 is mounted to a wall, its overall depth, defined by the overall distance insect trap 1010 protrudes from the wall, is the smallest of the three overall dimensions. Trap portion 1014 includes a front housing 1018 with at least one opening 1020 in a front surface 1058. Opening 1020 in front housing 1018 may be configured to admit a wide variety of insects into insect trap 1010, or alternatively it may be configured to admit one or more specific insect species. In some embodiments, opening 1020 is configured to prevent the user's fingers from penetrating opening 1020 and inadvertently touching trapped insects or adhesive when removing and replacing trap portion 1014. In some embodiments, opening 1020 has a size and shape such that a sphere 25 mm in diameter cannot pass through opening 1020, and has a size and shape such that a sphere 1 mm in diameter can pass through any portion of opening 1020. Opening 1020 may be of uniform or of varying width, shape and orientation, and if trap portion 1014 has more than one opening 1020, they may be of identical or of differing widths, shapes and orientations. Opening 1020 may be configured to attract one or more individual insect species or a variety of insect species. Trap portion 1014 may have an overall length, an overall width and an overall depth, and may be configured such that when trap portion 1014 is mounted in insect trap 1010, and insect trap 1010 is mounted to a wall, the overall depth of trap portion 1014, which is measured in the direction perpendicular to the wall, is the smallest of the three overall dimensions of trap portion 1014.

Protruding from a rear surface 1060 (shown in FIG. 34) of base portion 1012 are a plurality of electrically conductive prongs 1022, adapted to mount insect trap 1010 to a wall and provide power to insect trap 1010 by inserting conductive prongs 1022 into a standard household electrical wall socket. Alternatively, conductive prongs 1022 may be adapted to swivel to allow insect trap 1010 to remain upright when conductive prongs 1022 are inserted into a horizontally oriented electrical wall socket. Alternatively, base portion 1012 may be configured to sit or hang wherever desired and receive power from batteries (not shown) mounted in base portion 1012. While an electrical socket and batteries have been described as providing power to insect trap 1010, any suitable power source may be used. Base portion 1012 includes a lighting element such as one or more LEDs 1024. In some embodiments, base portion 1012 includes an array of LEDs 1024. As shown, LEDs 1024 are configured in a 2 by 3 array of blue and UV LEDS 1024, although different array configurations with different numbers and arrangements (e.g., a 3 by 2 array or a 4 by 3 array or a 1 by 2 array, for example) of LEDs 1024, LEDs 1024 emitting different wavelengths of light, and different combinations of LEDs 1024 emitting different wavelengths of light, could also be used. In some embodiments, LEDs 1024 include at least one that emits UV light and at least one that emits visible light. In some embodiments, LEDs 1024 include at least one that emits UV light and at least one that emits blue light to better attract a wide variety of insect species. In some embodiments, the lighting element emits a combination of wavelengths to mimic sunlight. In some embodiments, LEDs 1024 include at least one that emits infrared (IR) light to better attract certain species of insects including mosquitos. Mounted in a top surface 1026 of base portion 1012 may be a transparent or translucent window 1028, shown partially cut away to reveal LEDs 1024. Window 1028 protects LEDs 1024 from dust and insect debris, and allows base portion 1012 to be easily cleaned. In top surface 1026 may be a slot 1030, and on the perimeter of top surface 1026 is a rim or upwardly directed protrusions 1032.

Figure 34:
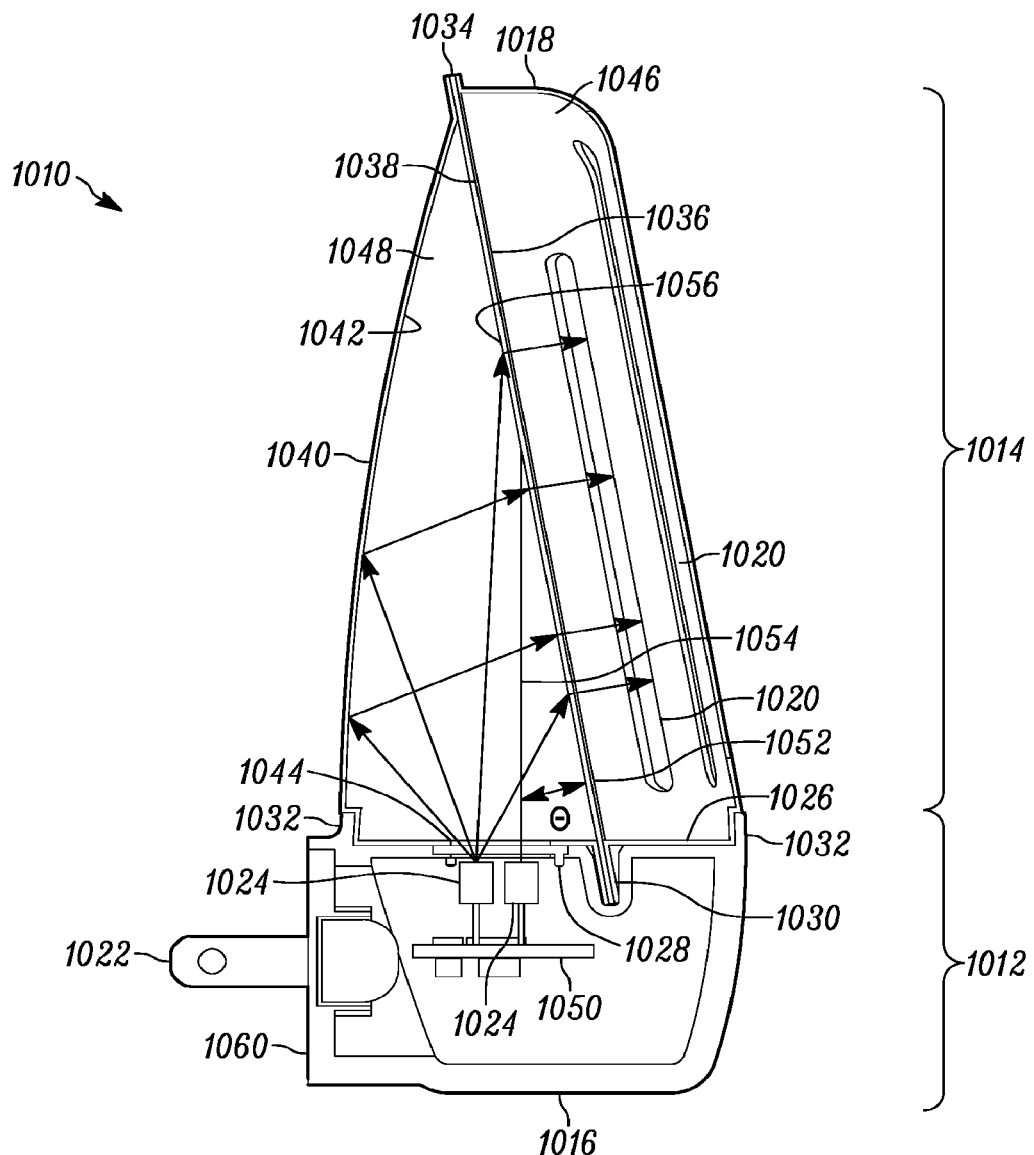
FIG. 34 is a cross-sectional view of the insect trap of FIG. 33.

FIG. 34 is a cross-sectional view of insect trap 1010. In some embodiments, the light emitted from each of LEDs 1024 has a primary direction 1054. Trap portion 1014 includes a divider 1034 with a front surface 1038, and a rear housing 1040. In some embodiments, divider 1034 is constructed from or includes a transparent or translucent material and may be coated with a transparent or translucent adhesive 1036 on front surface 1038. In some embodiments, divider 1034 is configured to polarize light transmitted through it in an orientation similar to that of daylight to further attract flying insects, a wide variety of which are known to detect polarized light. In some embodiments, the material and thickness of divider 1034 and the material and thickness of adhesive 1036 are selected to transmit a substantial proportion of the UV and/or visible and/or IR light, for example greater than 60% of the light is transmitted through divider 1034 and adhesive 1036. In some embodiments, rear housing 1040 includes a reflective-coated inside surface 1042. Alternatively, the material and surface finish of rear housing 1040 may be configured to reflect and disperse UV and/or visible and/or IR light without a reflective coating. Rear housing 1040 may include an opening 1044 on its bottom surface, or alternatively opening 1044 may be replaced by a transparent or translucent window (not shown).

In some embodiments, front housing 1018 and rear housing 1040 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1018 and rear housing 1040 are constructed by injection molding, casting or by other suitable manufacturing techniques. As shown, divider 1034 is substantially planar, and may be configured to be parallel to, or at an angle 1052 to the primary direction 1054 of the light produced by one or more of LEDs 1024. Angle 1052 may be an acute angle, and may preferably be from 0° to 45° such that when insect trap 1010 is mounted to a wall, the top end or distal end of divider 1034 (e.g., the end farther from base portion 1012) is closer to the wall than its bottom or proximal end. In some embodiments, divider 1034 may be formed into a convex, concave or saddle-shaped contour, or a combination of contours to optimize the even distribution of light. In some embodiments, divider 1034 may have ribs or other features that increase adhesive surface area and create regions of light/dark contrast, which are highly visible to a wide variety of insects and may be more attractive to them.

In some embodiments, front housing 1018 may be coated with transparent, translucent or opaque adhesive on its inside surface to provide additional insect trapping efficiency and capacity. In addition, front housing 1018 may also have a reflective coating (not shown) underneath the adhesive coating on its inside surface to enhance its attraction to insects and further improve the insect trapping efficiency and effectiveness.

In some embodiments, front housing 1018, divider 1034 and rear housing 1040 are joined together at where they intersect or engage by ultrasonic welding or high frequency (HF) welding, although they may also be permanently or removably joined together by gluing or by any other suitable assembly method. The materials of trap portion 1014 may also include one or more insect attractants. For example, trap portion 1014 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of insect trap 1010. In such embodiments, the insect attractant is integral to trap portion 1014. Alternatively, the insect attractants may be embedded or contained in a separate piece (not shown) that mounts on an inside surface of front housing 1018 or through opening 1020 in front housing 1018 or on front surface 1058 of front housing 1018 or on front surface 1038 of divider 1034. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 1010. Divider 1034 separates trap portion 1014 into a front enclosure 1046 and a rear enclosure 1048. In some embodiments, base portion 1012 includes a circuit board 1050 having a programmable processor or chip (not shown) for executing commands, electrically connected to conductive prongs 1022, only one of which is shown, and LEDs 1024, only one of which is shown. For clarity, however, not all of the electrical connections are shown. Circuit board 1050 may include electronic circuitry to receive ordinary household current from conductive prongs 1022 and provide power to illuminate LEDs 1024. Circuit board 1050 may include an energy stabilizer such as a full wave rectifier circuit or any other circuit that provides steady voltage to LEDs 1024, although it may also provide a varying voltage to LEDs 1024 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1050 may provide power to LEDs 1024 to provide UV and/or visible and/or IR light, although it may be configured to provide power to only UV LEDs 1024 or to only visible light LEDs 1024 or to only IR LEDs 1024, or to provide variable power to produce combinations of flickering UV and/or visible and/or IR light. Circuit board 1050 may also be configured to drive a transmitter or transceiver such as a piezoelectric speaker (not shown) or other device that may be mounted in base portion 1012 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1010. It is desirable for such insect-attracting sound to be undetectable by a human beyond approximately a 1-meter distance from insect trap 1010. Circuit board 1050 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1012 and into trap portion 1014, to attract some insect species, including fleas and mosquitoes. Alternatively, one or more of LEDs 1024 may generate heat, to replace or augment the heat generated by the one or more electrical elements. Alternatively, one or more of LEDs 1024 may be replaced or augmented by one or more incandescent light bulbs to generate both heat and light. In general, the heat generated may increase and maintain the temperature of at least a portion of trap portion 1014 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, slot 1030 in top surface 1026 of base portion 1012 and protrusions 1032 on top surface 1026 of base portion 1012 engage with trap portion 1014 to secure it in place during use, although any other form of attachment may be substituted that allows trap portion 1014 to be securely but removably mounted to base portion 1012. Bottom surface 1016 of base portion 1012 may be substantially flat or concave to allow insect trap 1010 to sit upright on a floor, desk, table or shelf when insect trap 1010 is unplugged. Alternatively, bottom surface 1016 of base portion 1012 may have two or more protrusions (not shown) or legs that allow insect trap 1010 to sit upright when insect trap 1010 is unplugged.

In the operation of insect trap 1010, conductive prongs 1022 are inserted into a wall electrical socket. LEDs 1024 emit light, represented by arrows, preferably UV and visible light, which is transmitted through window 1028 in base portion 1012, through opening 1044 in rear housing 1040 of trap portion 1014, into rear enclosure 1048, and directly onto inside surface 1042 of rear housing 1040 and a rear surface 1056 of divider 1034. For clarity, arrows representing the light are only shown emitted from one of LEDs 1024. Because the light from LEDS 1024 enters rear enclosure 1048 through opening 1044 in a bottom face of rear housing 1040 of trap portion 1014 (e.g., in a face that is substantially parallel to the overall depth of trap portion 1014), the light can travel the entire length of rear enclosure 1048 and can diverge over the entire length of rear enclosure 1048, and therefore can be more evenly distributed throughout rear enclosure 1048. In some embodiments, light is not manipulated in base portion 1012 and is emitted directly into trap portion 1014. Inside surface 1042 of rear housing 1040 may include a concave shape and may be configured to reflect and disperse the light from LEDs 1024 to distribute the light evenly onto rear surface 1056 of divider 1034, although inside surface 1042 of rear housing 1040 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute the light (e.g., evenly, according to specific patterns, at a focal point, etc.) onto rear surface 1056 of divider 1034, may be mounted to rear housing 1040 at or near opening 1044 or to base portion 1012 at or near window 1028, and may replace or augment the role of inside surface 1042 of rear housing 1040. In some embodiments, the light from LEDs 1024 may directly strike rear surface 1056 of divider 1034 at an oblique angle (e.g., an acute angle from approximately 0° to 90°) and be spread across divider 1034, and may replace or augment the role of inside surface 1042 of rear housing 1040 or of the lens or lenses mounted to rear housing 1040.

Thereafter, light transmits through divider 1034 and adhesive 1036 on front surface 1038, and into front enclosure 1046. Light may be further evenly distributed by the light-diffusing properties of divider 1034, adhesive 1036 on front surface 1038, or both. A portion of the light entering front enclosure 1046 continues through opening 1020 in front housing 1018 and is emitted into the surrounding area where insect trap 1010 is installed. Insects are attracted to the light emitted through adhesive 1036 and through opening 1020 in front housing 1018, and fly or crawl into opening 1020 and onto adhesive 1036, where they become trapped. A user may observe trapped insects by looking through opening 1020 in front housing 1018. When a sufficient number of insects have been trapped, the user may easily remove and discard the entire used trap portion 1014 without touching the trapped insects, insect debris or adhesive, which remain out of reach inside trap portion 1014, and replace it with a new trap portion 1014. New trap portion 1014 has fresh adhesive-coated surfaces and light-directing surfaces, ensuring that insect trap 1010 will continue to efficiently and effectively attract and trap insects.

In some embodiments, because trap portion 1014 mounts on top of, and not in front of, base portion 1012, insect trap 1010 protrudes minimally from the wall when plugged into an ordinary household wall socket, and therefore intrudes minimally into the home environment. In some embodiments, insect trap 1010 is configured such that when insect trap 1010 is mounted to a wall, its overall depth, defined by the overall distance insect trap 1010 protrudes from the wall, is smaller than its overall height and its overall width.

It should be appreciated that a benefit of insect trap 1010 is the manipulation of light within trap portion 1014. In some embodiments, light manipulation occurs solely within trap portion 1014. Light manipulation may include reflection, refraction, polarization, dispersion and/or diffusion and is achieved by engaging with a manipulative element or surface (e.g., inside surface 1042, divider 1034 and adhesive 1036). In some embodiments, light manipulation produces an even distribution of light on adhesive 1036. In some embodiments, light is manipulated to produce a predetermined pattern on adhesive 1036 or within trap portion 1014, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1010 of this configuration may accommodate a variety of different trap portions 1014 that may be removably mounted to base portion 1012, each trap portion 1014 being uniquely configured to attract and trap a specific species or multiple species of flying or non-flying insect. For example, the overall size and shape of trap portion 1014, and the size, shape, location and orientation of opening 1020 in front housing 1018 of trap portion 1014, may be uniquely configured to attract and trap a specific species or multiple species of flying insect.

For example, in some embodiments, trap portion 1014 is approximately 20 mm to 600 mm wide, 20 mm to 600 mm high and 5 mm to 150 mm deep. In some embodiments, trap portion 1014 is approximately 20 mm to 200 mm wide, 20 mm to 200 mm high and 5 mm to 80 mm deep. In some embodiments, trap portion 1014 is approximately 20 mm to 130 mm wide, 20 mm to 130 mm high and 5 mm to 50 mm deep.

In some embodiments, base portion 1012 is approximately 20 mm to 600 mm wide, 10 mm to 150 mm high and 10 mm to 150 mm deep. In some embodiments, base portion 1012 is 20 mm to 200 mm wide, 10 mm to 100 mm high and 10 mm to 80 mm deep. In some embodiments, base portion 1012 is 20 mm to 130 mm wide, 10 mm to 50 mm high and 10 mm to 50 mm deep.

As provided herein, opening 1020 may be a variety of shapes and/or sizes. For example, opening 1020 may be circular, square, rectangular, polygonal and/or elliptical in shape. Alternatively, opening 1020 may be slot shaped having a straight, curved or undulating shape or pattern. When opening 1020 is circular, opening 1020 may be approximately 0.5 mm to 30 mm in diameter. In some embodiments, circular opening 1020 is approximately 0.5 mm to 20 mm in diameter. In some embodiments, circular opening 1020 is approximately 0.5 mm to 15 mm in diameter. When opening 1020 is slot shaped, opening 1020 may be approximately 2 mm to 30 mm wide and 5 mm to 500 mm long. In some embodiments, slot shaped opening 1020 is approximately 2 mm to 20 mm wide and 5 mm to 200 mm long. In some embodiments, slot shaped opening 1020 is approximately 2 mm to 15 mm wide and 5 mm to 100 mm long.

In some embodiments, opening 1020 covers all or a portion of front housing 1018. For example, opening 1020 may cover a range of approximately 1% to 75% of the surface area of front housing 1018. In some embodiments, opening 1020 covers approximately 5% to 50% of the surface area of front housing 1018. In some embodiments, opening 1020 covers approximately 10% to 30% of the surface area of front housing 1018.

Figure 35:
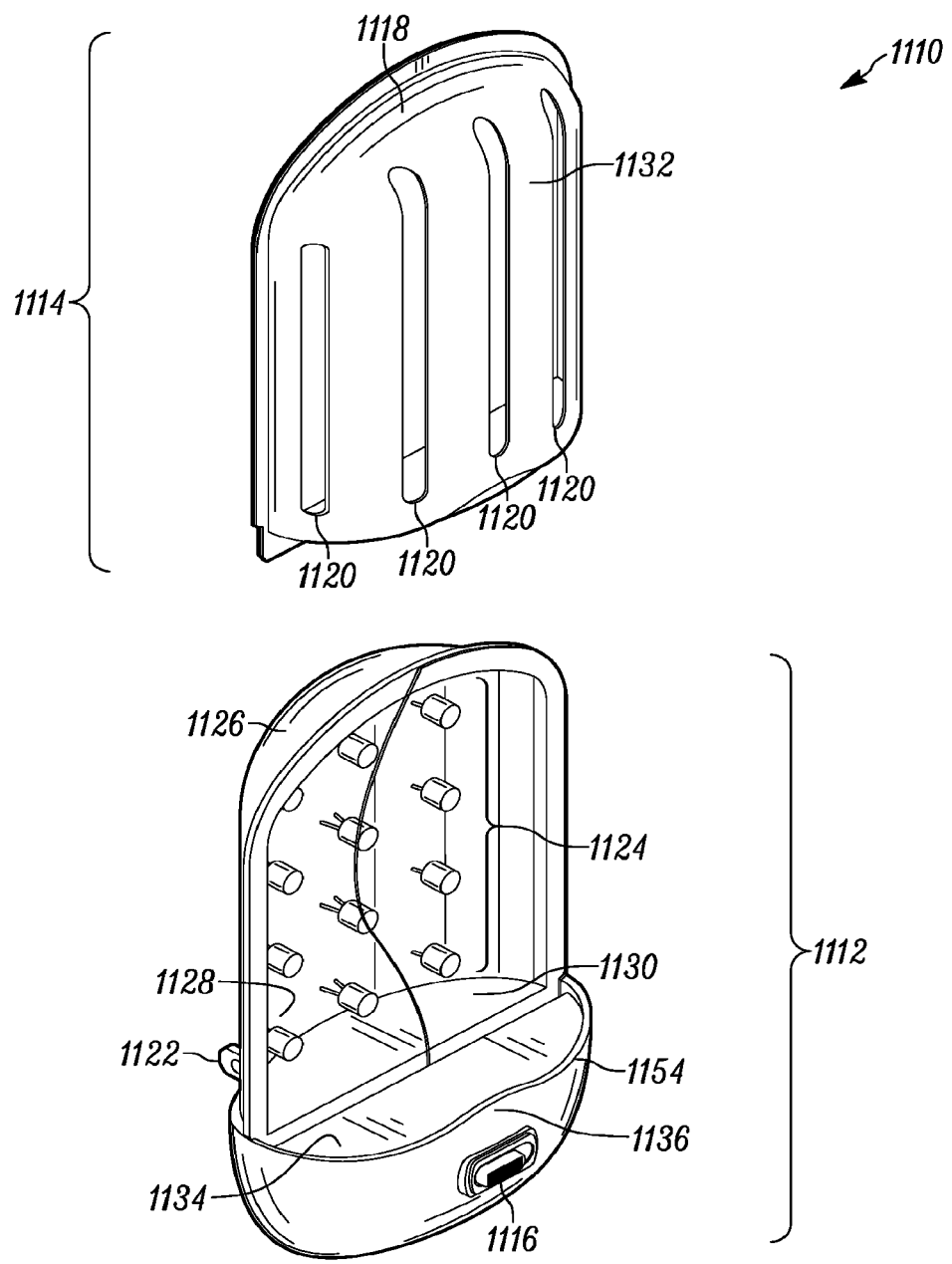
FIG. 35 is a front perspective view of an eleventh embodiment of an insect trap in accordance with principles of the disclosure.

FIG. 35 is a front perspective view of an eleventh embodiment of an insect trap, indicated generally at 1110. Insect trap 1110 includes a base portion 1112 and a removable trap portion 1114. Insect trap 1110 may have an overall length, an overall width and an overall depth, and may be configured such that when insect trap 1110 is mounted to a wall, its overall depth, defined by the overall distance insect trap 1110 protrudes from the wall, is the smallest of the three overall dimensions. Trap portion 1114 is shown removed from base portion 1112 in this view. In some embodiments, base portion 1112 includes a switch 1116, configurable to enable insect trap 1110 to be turned on or off by closing or opening switch 1116 as desired by the user. Alternatively, switch 1116 may be configured to control other features such as light intensity, combinations of light wavelengths, different modes or frequencies of flickering light, an automatic setting that turns on insect trap 1110 when the room gets dark, or a remote control setting, for example. In some embodiments, switch 1116 may be manually operated, although switch 1116 may also be operated electrically, optically, electro-mechanically, electro-optically, or by any method for opening or closing switch 1116. Trap portion 1114 may include a front housing 1118 with at least one opening 1120 in a front surface 1132. Opening 1120 may be configured to admit a wide variety of insects into insect trap 1110, or alternatively it may be configured to admit one or more specific insect species. Opening 1120 may preferably be configured to prevent user's fingers from penetrating opening 1120 and inadvertently touching trapped insects or adhesive when removing and replacing trap portion 1114. Opening 1120 may preferably have a size and shape such that a sphere 25 mm in diameter cannot pass through opening 1120, and opening 1120 may preferably have a size and shape such that a sphere 1 mm in diameter can pass through any portion of opening 1120. Opening 1120 may be of uniform or of varying width, shape and orientation, and if trap portion 1114 has more than one opening 1120, they may be of identical or of differing widths, shapes and orientations. Opening 1120 may be configured to attract one or more individual insect species or a variety of insect species. Protruding from a rear surface 1152 (shown in FIG. 36) of base portion 1112 are a plurality of electrically conductive prongs 1122, only one of which is shown, adapted to mount insect trap 1110 to a wall and provide power to insect trap 1110 by inserting conductive prongs 1122 into a standard household electrical wall socket. Alternatively, conductive prongs 1122 may be adapted to swivel to allow insect trap 1110 to remain upright when conductive prongs 1122 are inserted into a horizontal outlet. Alternatively, base portion 1112 may be configured to sit or hang wherever desired and receive power from batteries (not shown) mounted in base portion 1112. While an electrical socket and batteries have been described as providing power to insect trap 1110, any suitable power source may be used. Base portion 1112 includes a top surface 1134, and a rear housing 1126, which includes a reflective-coated inside surface 1128. In some embodiments, the material and surface finish of rear housing 1126 may be configured to reflect and disperse UV and/or visible light without a reflective coating. Mounted in rear housing 1126 of base portion 1112 is a lighting element such as one or more LEDs 1124. In some embodiments, the lighting element includes an array of LEDs 1124, including at least one that emits UV light and at least one that emits visible light. In some embodiments, LEDs 1124 include at least one that emits UV light and at least one that emits blue light to better attract a wide variety of insect species. In some embodiments, the lighting element emits a combination of wavelengths to mimic sunlight. In some embodiments, LEDs 1124 include at least one that emits infrared (IR) light to better attract certain species of insects such as mosquitos and fleas.

As shown, base portion 1112 includes a transparent or translucent window 1130, shown partially cut away to reveal LEDs 1124. Window 1130 has a rear surface 1150 (shown in FIG. 36), and protects inside surface 1128 of rear housing 1126 and LEDs 1124 from dust and insect debris and may allow base portion 1112 to be easily cleaned. Window 1130 may also be configured to polarize light transmitted through it in an orientation similar to that of daylight to further attract flying insects, a wide variety of which are known to detect polarized light. Window 1130 may be attached at its perimeter to rear housing 1126 by any suitable manufacturing technique such as gluing or ultrasonic welding. In some embodiments, window 1130 is removably attached to rear housing 1126. In some embodiments, on a perimeter 1154 of top surface 1134 of base portion 1112 is an upwardly directed rim or protrusions 1136.

Figure 36:
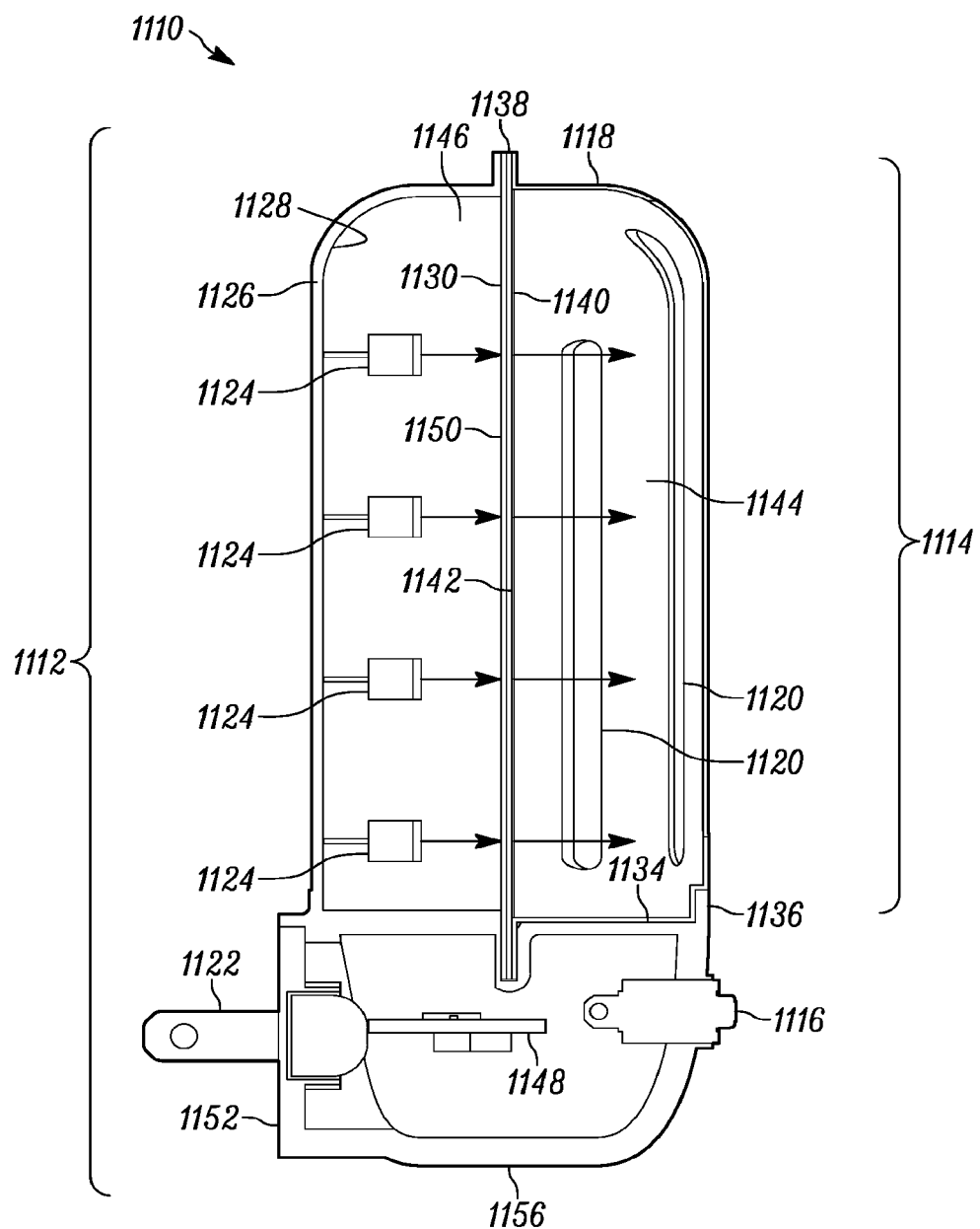
FIG. 36 is a cross-sectional view of the insect trap of FIG. 35.

FIG. 36 is a cross-sectional view of insect trap 1110. Trap portion 1114 includes a back plate 1138 with a front surface 1142. Back plate 1138 may be constructed of transparent or translucent material and coated with a transparent or translucent adhesive 1140 on front surface 1142. Back plate 1138 may also be configured to polarize light transmitted through it in an orientation similar to that of daylight to further attract flying insects. In some embodiments, the material and thickness of back plate 1138 and the material and thickness of adhesive 1140 are selected to transmit a substantial proportion of the UV and/or visible and/or IR light, for example greater than 60% of the light is transmitted through back plate 1138 and adhesive 1140. In some embodiments, front housing 1118 of trap portion 1114 and rear housing 1126 of base portion 1112 are thermoformed from opaque sheet plastic, although other opaque, transparent or translucent materials such as paper, paperboard, cardboard or paper pulp may also be used. In some embodiments, front housing 1118 and rear housing 1126 are constructed by injection molding or by other suitable manufacturing techniques. Back plate 1138 may be substantially planar, although it may be formed into a convex, concave or saddle-shaped contour, or a combination of contours to optimize the even distribution of light. Alternatively, back plate 1138 may have ribs or other features that increase the adhesive-coated surface area, produce alternating light/dark regions that some insect species find attractive, and enhance the transmission of insect-attracting light into trap portion 1114. In some embodiments, front housing 1118 is coated with transparent, translucent or opaque adhesive on an inside surface to provide additional insect trapping efficiency and capacity. In addition, front housing 1118 may also have a reflective coating (not shown) underneath the adhesive coating on its inside surface to enhance its attraction to insects and further improve the insect trapping efficiency and effectiveness. Front housing 1118 and back plate 1138 may be joined together where they engage with adhesive, although they may also be joined by other commonly used packaging assembly techniques such as ultrasonic welding or RF sealing, or any other suitable assembly method. The materials of trap portion 1114 may also include one or more insect attractants. For example, trap portion 1114 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1110. In such embodiments, the insect attractant is integral to trap portion 1114. Alternatively, the insect attractants may be embedded or contained in a separate piece (not shown) that mounts on an inside surface of front housing 1118 or through opening 1120 in front housing 1118 or on front surface 1132 of front housing 1118 or on front surface 1142 of back plate 1138. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 1110.

As shown, front housing 1118 and back plate 1138 form a front enclosure 1144 in trap portion 1114, and rear housing 1126 and window 1130 form a rear enclosure 1146 in base portion 1112. In some embodiments, base portion 1112 includes a circuit board 1148, having a programmable processor or chip (not shown) for executing commands, electrically connected to conductive prongs 1122, switch 1116 and LEDs 1124 (only one of which is shown). For clarity, however, not all of the electrical connections are shown. Circuit board 1148 may include electronic circuitry to receive ordinary household current from conductive prongs 1122, only one of which is shown, respond to the position of switch 1116 and provide power to illuminate LEDs 1124. Circuit board 1148 may include an energy stabilizer such as a full wave rectifier circuit or any other circuit to provide steady voltage to LEDs 1124 when switch 1116 is in the closed position, although it could also provide a varying voltage to LEDs 1124 to provide a flickering light which mimics movement that some insect species, including mosquitoes, may find attractive. For example, light flickering frequencies in the approximate range of 0.05 Hz (e.g., to mimic the breathing rate of mammals) to 270 Hz (e.g., the highest flicker frequency to attract male houseflies), may be desirable and the lighting element may be configured to flicker within this range. Circuit board 1148 may provide power to LEDs 1124 to provide both UV and visible light, although it could be configured to provide power only UV LEDs 1124 or to only visible light LEDs 1124 or to only IR LEDs 1124, or to provide variable power to produce combinations of flickering UV and/or visible and/or IR light. In some embodiments, circuit board 1148 may also be configured to drive a transmitter or transceiver such as a piezoelectric speaker (not shown) or other device that may be mounted in base portion 1112 to emit an insect-attracting sound. In some embodiments, the transmitter or transceiver may emit recorded and/or generated insect sounds or vibrations to better attract insects, and may include one or more of mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1110. It is desirable for such insect-attracting sound to be undetectable by a human beyond approximately a 1-meter distance from insect trap 1110. Circuit board 1148 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1112 and into trap portion 1114, to attract some insect species, including fleas and mosquitoes. Alternatively, one or more of LEDs 1124 may generate heat, to replace or augment the heat generated by the one or more electrical elements. Alternatively, one or more of LEDs 1124 may be replaced or augmented by one or more incandescent light bulbs to generate both heat and light. In general, the heat generated may increase and maintain the temperature of at least a portion of trap portion 1114 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, rim or protrusions 1136 on top surface 1134 of base portion 1112 and window 1130 engage with trap portion 1114 to secure it in place during use, although any other form of attachment may be substituted that may allow trap portion 1114 to be securely but removably mounted on base portion 1112. Bottom surface 1156 of the base portion 1112 may be substantially flat or concave to allow insect trap 1110 to sit upright on a floor, desk, table or shelf when insect trap 1110 is unplugged. Alternatively, bottom surface 1156 of base portion 1112 may have two or more protrusions (not shown) or legs that allow insect trap 1110 to sit upright when insect trap 1110 is unplugged.

In the operation of insect trap 1110, conductive prongs 1122 are inserted into a wall electrical socket, and switch 1116 is moved to a closed position. LEDs 1124 emit light, represented by arrows, which transmits directly onto rear surface 1150 of window 1130. In some embodiments, light is not manipulated in base portion 1112 and is emitted directly into trap portion 1114. Inside surface 1128 of rear housing 1126 may include a concave shape and may be configured to reflect and disperse the UV and visible light from LEDs 1124 to distribute the light evenly onto rear surface 1150 of window 1130, although inside surface 1128 of rear housing 1126 may have a convex shape or a saddle shape or a combination of shapes, or may also have ribs or other features to more evenly distribute the light. In some embodiments, LEDs 1124 are substantially perpendicular (e.g., configured so that their primary direction of light is substantially perpendicular) to window 1130. The light transmits through back plate 1138 and adhesive 1140 on front surface 1142, and into front enclosure 1144. The light may be further evenly distributed by the light-diffusing properties of window 1130 of base portion 1112, back plate 1138 of trap portion 1114, adhesive 1140 on front surface 1142 of back plate 1138, or any combination of window 1130, back plate 1138 and adhesive 1140. In some embodiments, a portion of the light entering front enclosure 1144 continues through opening 1120 in front housing 1118 and is emitted into the area where insect trap 1110 is installed. Insects are attracted to the UV and/or visible light transmitted through adhesive 1140 and through opening 1120 in front housing 1118, and fly or crawl through opening 1120 and onto adhesive 1140, where they become trapped. The user may observe trapped insects by looking through opening 1120 in front housing 1118. When a sufficient number of insects have been trapped, the user may easily remove and discard the entire used trap portion 1114 without touching the trapped insects, insect debris or adhesive, which remain out of reach inside trap portion 1114, and replace it with a new trap portion 1114. New trap portion 1114 has fresh adhesive-coated surfaces, ensuring that insect trap 1110 will continue to efficiently and effectively attract and trap insects.

In some embodiments, because trap portion 1114 mounts on top of, and not in front of, base portion 1112, insect trap 1110 protrudes minimally from the wall when plugged into an ordinary household wall socket, and therefore intrudes minimally into the home environment. In some embodiments, insect trap 1110 is configured such that when insect trap 1110 is mounted to a wall, its overall depth, defined by the overall distance insect trap 1110 protrudes from the wall, is smaller than its overall height and overall width.

It should be appreciated that a benefit of insect trap 1110 is the manipulation of light within trap portion 1114. In some embodiments, light manipulation occurs solely within trap portion 1114. Light manipulation may include reflection, refraction, polarization, dispersion and/or diffusion and is achieved by engaging with a manipulative element or surface (e.g., inside surface 1128, window 1130, back plate 1138 and adhesive 1140). In some embodiments, light manipulation produces an even distribution of light on adhesive 1140. In some embodiments, light is manipulated to produce a predetermined pattern on adhesive 1140 or within trap portion 1114, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1110 of this configuration may accommodate a variety of different trap portions 1114 that may be removably mounted to base portion 1112, each trap portion 1114 being uniquely configured to attract and trap a specific species or multiple species of insects. For example, the overall size and shape of trap portion 1114, and the size, shape, location and orientation of opening 1120 in front housing 1118 of trap portion 1114, may be uniquely configured to attract and trap a specific species or multiple species of insects. For example, in some embodiments, trap portion 1114 is approximately 20 mm to 600 mm wide, 20 mm to 600 mm high and 5 mm to 150 mm deep. In some embodiments, trap portion 1114 is approximately 20 mm to 200 mm wide, 20 mm to 200 mm high and 5 mm to 80 mm deep. In some embodiments, trap portion 1114 is approximately 20 mm to 130 mm wide, 20 mm to 130 mm high and 5 mm to 50 mm deep.

In some embodiments, base portion 1112 is approximately 20 mm to 600 mm wide, 10 mm to 150 mm high and 10 mm to 150 mm deep. In some embodiments, base portion 1112 is 20 mm to 200 mm wide, 10 mm to 100 mm high and 10 mm to 80 mm deep. In some embodiments, base portion 1112 is 20 mm to 130 mm wide, 10 mm to 50 mm high and 10 mm to 50 mm deep.

As provided herein, opening 1120 may be a variety of shapes and/or sizes. For example, opening 1120 may be circular, square, rectangular, polygonal and/or elliptical in shape. Alternatively, opening 1120 may be a slot having straight, curved or undulating shapes or patterns. When opening 1120 is circular, opening 1120 may be approximately 0.5 mm to 30 mm in diameter. In some embodiments, circular opening 1120 is approximately 0.5 mm to 20 mm in diameter. In some embodiments, circular opening 1120 is approximately 0.5 mm to 15 mm in diameter. When opening 1120 is slot shaped, opening 1120 may be approximately 2 mm to 30 mm wide and 5 mm to 500 mm long. In some embodiments, slot shaped opening 1120 is approximately 2 mm to 20 mm wide and 5 mm to 200 mm long. In some embodiments, slot shaped opening 1120 is approximately 2 mm to 15 mm wide and 5 mm to 100 mm long.

In some embodiments, opening 1120 covers all or a portion of front housing 1118. For example, opening 1120 may cover a range of approximately 1% to 75% of the surface area of front housing 1118. In some embodiments, opening 1120 covers approximately 5% to 50% of the surface area of front housing 1118. In some embodiments, opening 1120 covers approximately 10% to 30% of the surface area of front housing 1118.

Figure 37:
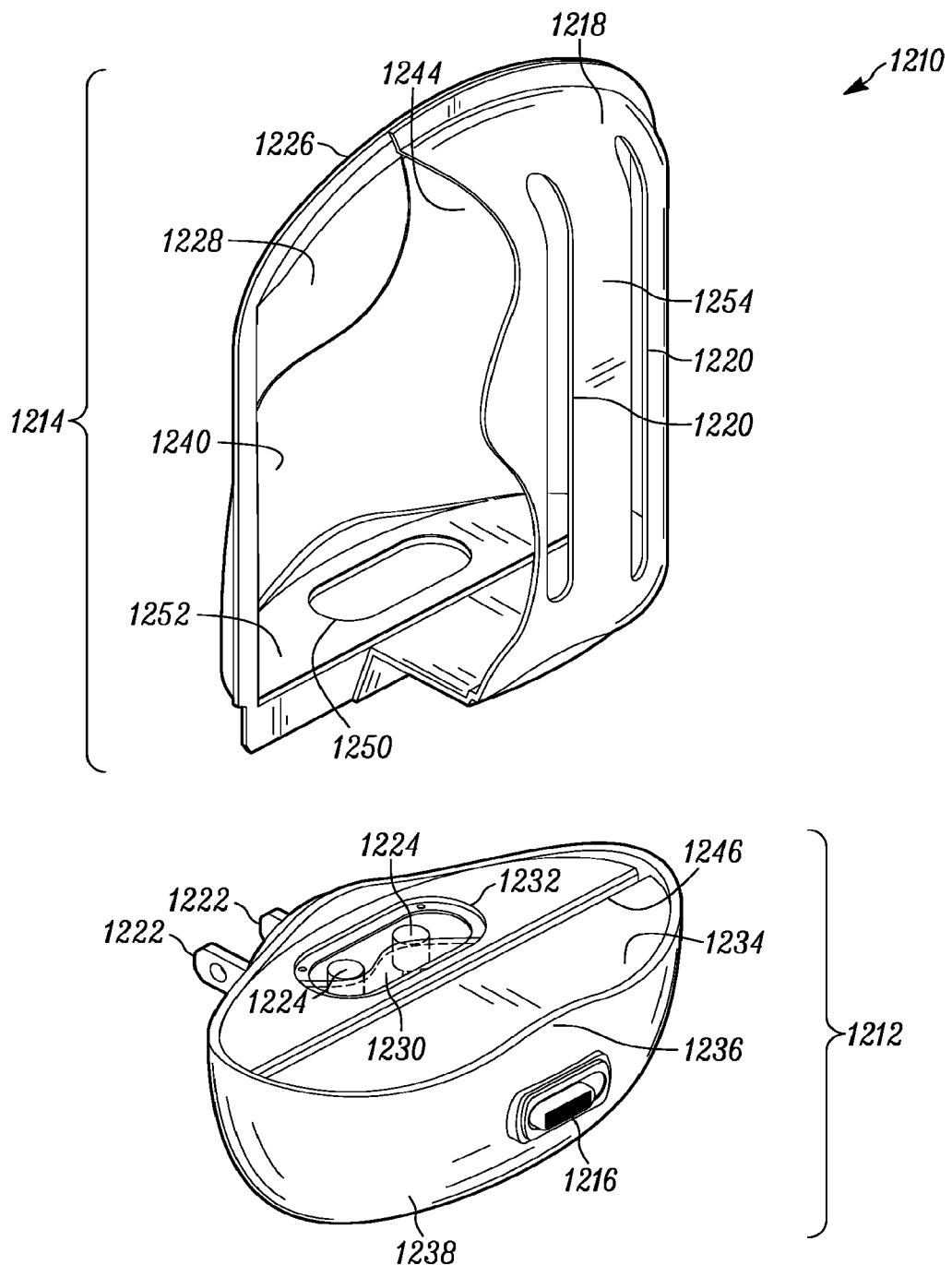
FIG. 37 is a front perspective view of a twelfth embodiment of an insect trap in accordance with principles of the disclosure.

FIG. 37 is a front perspective view of a twelfth embodiment of an insect trap, indicated generally at 1210. Insect trap 1210 includes a base portion 1212 and a removable trap portion 1214. Trap portion 1214 is shown partially cut away and removed from base portion 1212 in this view. Insect trap 1210 may have an overall length, an overall width and an overall depth, and may be configured such that when insect trap 1210 is mounted to a wall, its overall depth, defined by the overall distance insect trap 1210 protrudes from the wall, is the smallest of the three overall dimensions. A front surface 1238 of base portion 1212 may include a switch 1216, configurable to enable insect trap 1210 to be turned on or off by closing or opening switch 1216 as desired by the user. Alternatively, switch 1216 may be configured to control other features such as light intensity, combinations of light wavelengths, different modes or frequencies of flickering light, an automatic setting that turns on insect trap 1210 when the room gets dark, or a remote control setting, for example. Switch 1216 may preferably be manually operated, although switch 1216 may also be operated electrically, optically, electro-mechanically, electro-optically, or by any method for opening or closing switch 1216. Protruding from a rear surface 1242 (shown in FIG. 38) of base portion 1212 are a plurality of electrically conductive prongs 1222, adapted to mount insect trap 1210 to a wall and provide power to insect trap 1210 by inserting conductive prongs 1222 into a standard household electrical wall socket. Alternatively, conductive prongs 1222 may be adapted to swivel to allow insect trap 1210 to remain upright when conductive prongs 1222 are inserted into a horizontally oriented electrical wall socket. Alternatively, base portion 1212 may be configured to sit or hang wherever desired and receive power from batteries (not shown) mounted in base portion 1212. While an electrical socket and batteries have been described as providing power to insect trap 1210, any suitable power source may be used. Base portion 1212 includes a lighting element such as one or more LEDs 1224. In some embodiments, LEDs 1224 include at least one that emits UV light and at least one that emits visible light. In some embodiments, LEDs 1224 include at least one that emits UV light and at least one that emits blue light to better attract a wide variety of insect species. In some embodiments, the lighting element emits a combination of wavelengths to mimic sunlight. In some embodiments, LEDs 1224 include at least one that emits IR light to better attract certain species of insects including mosquitos and fleas. In a top surface 1234 of base portion 1212 may be at least one opening 1232, and mounted in opening 1232 may be a transparent or translucent window 1230, shown partially cut away to reveal LEDs 1224. Window 1230 protects LEDs 1224 from dust and insect debris and allows base portion 1212 to be easily cleaned. Also in top surface 1234 may be a slot 1246, and on the perimeter of top surface 1234 may be an upwardly directed rim or protrusions 1236. Trap portion 1214 may have an overall length, an overall width and an overall depth, and may be configured such that when trap portion 1214 is mounted in insect trap 1210, and insect trap 1210 is mounted to a wall, the overall depth of the portion 1214, which is measured in the direction perpendicular to the wall, is the smallest of the three overall dimensions of trap portion 1214. Trap portion 1214 includes a front housing 1218 with at least one opening 1220 in a front surface 1254, and a rear housing 1226. Opening 1220 in front housing 1218 may be configured to admit a wide variety of insects into insect trap 1210, or alternatively it may be configured to admit one or more specific insect species. In some embodiments, opening 1220 is configured to prevent a user's fingers from penetrating opening 1220 and inadvertently touching trapped insects or adhesive when removing and replacing trap portion 1214. In some embodiments, opening 1220 has a size and shape such that a sphere 25 mm in diameter cannot pass through opening 1220, and has a size and shape such that a sphere 1 mm in diameter can pass through any portion of opening 1220. Opening 1220 may be of uniform or of varying width, shape and orientation, and if trap portion 1214 has more than one opening 1220, they may be of identical or of differing widths, shapes and orientations. Opening 1220 may be configured to attract one or more individual insect species or a variety of insect species. Front housing 1218 and rear housing 1226 of trap portion 1214 form an enclosure 1244. Rear housing 1226 includes an inside surface 1228 that may be coated with a transparent, translucent or opaque adhesive 1240. In some embodiments, inside surface 1228 of rear housing 1226 also has a reflective coating (not shown) under adhesive 1240. Alternatively, the material and surface finish of rear housing 1226 may be configured to reflect and disperse UV and/or visible and/or IR light without a reflective coating. Alternatively, adhesive 1240 may also be configured to reflect UV and/or visible and/or IR light. Inside surface 1228 of rear housing 1226 may also be configured of material that may polarize light reflecting from it in an orientation similar to that of daylight to further attract flying insects, a wide variety of which are known to detect polarized light. Rear housing 1226 may include an opening 1250 on its bottom surface 1252, or alternatively opening 1250 may be replaced by a transparent or translucent window (not shown). In some embodiments, front housing 1218 may be coated with transparent, translucent or opaque adhesive on its inside surface (not shown) to provide additional insect trapping efficiency and capacity. Front housing 1218 may also have a reflective coating (not shown) underneath the adhesive coating on its inside surface to enhance its attraction to insects and further improve the insect trapping efficiency and effectiveness. In some embodiments, front housing 1218 and rear housing 1226 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1218 and rear housing 1226 are constructed by injection molding or by other suitable manufacturing techniques. In some embodiments, front housing 1218 and rear housing 1226 are joined together where they intersect or engage with an adhesive, although they may also be joined by other commonly used packaging assembly techniques such as ultrasonic welding or RF sealing, or any other suitable assembly method. The materials of trap portion 1214 may also include one or more insect attractants. For example, trap portion 1214 may be impregnated sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1210. In such embodiments, the insect attractant is integral to trap portion 1214. Alternatively, the insect attractants may be embedded or contained in a separate piece (not shown) that may mount on an inside surface of enclosure 1244 or through an opening in front housing 1218 or rear housing 1226 or on front surface 1254 of front housing 1218. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 1210.

Figure 38:
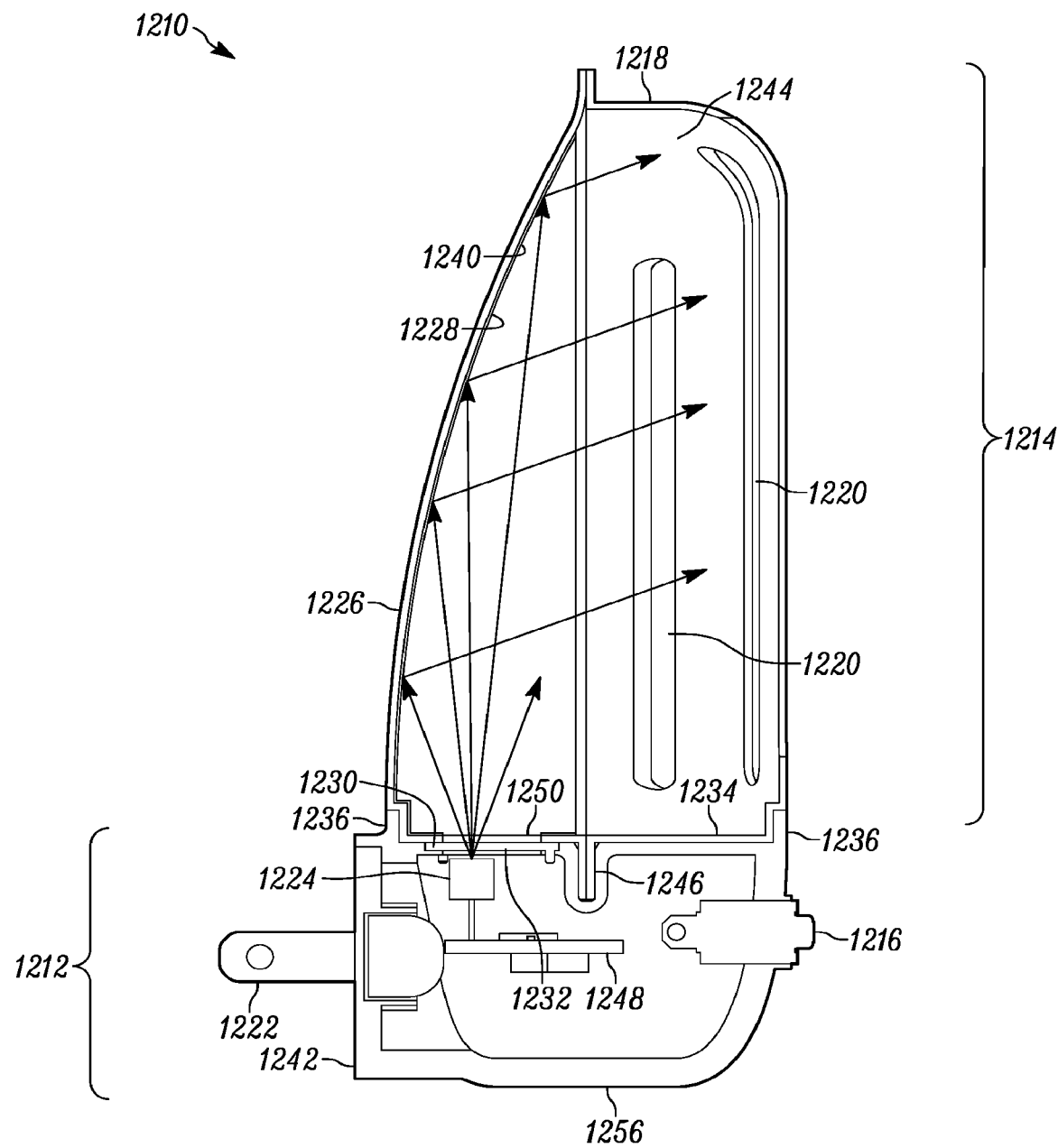
FIG. 38 is a cross-sectional view of the insect trap of FIG. 37.

FIG. 38 is a cross-sectional view of insect trap 1210. In some embodiments, base portion 1212 includes a circuit board 1248 having a programmable processor or chip (not shown) for executing commands, electrically connected to conductive prongs 1222 (only one of which is shown), switch 1216 and LEDs 1224 (only one of which is shown). For clarity, however, not all of the electrical connections are shown. Circuit board 1248 may include electronic circuitry to receive ordinary household current from conductive prongs 1222, respond to the position of switch 1216 and provide power to illuminate LEDs 1224. Circuit board 1248 may include an energy stabilizer such as a full wave rectifier circuit or any other circuit that may provide steady voltage to LEDs 1224 when switch 1216 is in the closed position, although it may also provide a varying voltage to LEDs 1224 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1248 may provide power to LEDs 1224 to provide both UV and/or visible and/or IR light, although it may be configured to provide power to only UV LEDs 1224 or to only visible light LEDs 1224 or to only IR LEDs 1224, or to provide variable power to produce combinations of flickering UV and/or visible and/or IR light. Circuit board 1248 may also be configured to drive a transmitter or transceiver such as a piezoelectric speaker (not shown) or other device that may be mounted in base portion 1212 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 1210. It is desirable for such insect-attracting sound to be undetectable by a human beyond approximately a 1-meter distance from insect trap 1210. Circuit board 1248 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1212 and into trap portion 1214, to attract some insect species, including fleas and mosquitoes. Alternatively, one or more of LEDs 1224 may generate heat, to replace or augment the heat generated by the one or more electrical elements. Alternatively, one or more of LEDs 1224 may be replaced or augmented by one or more incandescent light bulbs to generate both heat and light. In general, the heat generated may increase and maintain the temperature of at least a portion of trap portion 1214 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, slot 1246 in top surface 1234 of base portion 1212 and rim or protrusions 1236 on top surface 1234 engage with trap portion 1214 to secure it in place during use, although any other form of attachment may be substituted that allows trap portion 1214 to be securely but removably mounted on base portion 1212. A bottom surface 1256 of base portion 1212 may be substantially flat or concave to allow insect trap 1210 to sit upright on a floor, desk, table or shelf when insect trap 1210 is unplugged. Alternatively, bottom surface 1256 of the base portion 1212 may have two or more protrusions (not shown) or legs that allow insect trap 1210 to sit upright when insect trap 1210 is unplugged.

In the operation of insect trap 1210, conductive prongs 1222 are inserted into a wall electrical socket, and switch 1216 may be moved to the closed position. LEDs 1224 emit light, represented by arrows, which transmits through opening 1232 in base portion 1212 and into enclosure 1244, and directly onto adhesive 1240 coating inside surface 1228 of rear housing 1226. In some embodiments, light is not manipulated in base portion 1212 and is emitted directly into trap portion 1214. Because the light from LEDs 1224 enters enclosure 1244 through opening 1238 in the bottom surface 1252 of rear housing 1226 of trap portion 1214 (e.g., a face that is substantially parallel to the overall depth of trap portion 1214), the light can travel the entire length of enclosure 1244 and can diverge over the entire length of rear enclosure 1244, and therefore can be more evenly distributed throughout enclosure 1244.

Inside surface 1228 of rear housing 1226 may include a concave shape and may be configured to reflect light from LEDs 1224 to distribute the light evenly through enclosure 1244, although inside surface 1228 of rear housing 1226 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute the light (e.g., evenly, according to specific patterns, at a focal point, etc.) onto inside surface 1228 of rear housing 1226, may be mounted to base portion 1212 at or near opening 1232 or to trap portion 1214 at or near opening 1250, and may replace or augment the light-distributing role of inside surface 1228 of rear housing 1226. In some embodiments, the light from LEDs 1224 may directly strike inside surface 1228 of rear housing 1226 at an oblique angle (e.g., an acute angle from approximately 0° to 90°) and be spread across inside surface 1228, and may replace or augment the light-distributing role of inside surface 1228 the lens or lenses mounted to trap portion 1214 or to base portion 1212. Light may be further evenly distributed by the light-diffusing properties of window 1230 in base portion 1212, by adhesive 1240 on inside surface 1228 of rear housing 1226, or by a combination of the two.

Thereafter, a portion of the light continues through opening 1220 in front housing 1218 and into the surrounding area where the trap is installed. Insects are attracted to the UV and/or visible light transmitted through opening 1220, and fly or crawl into opening 1220 and onto adhesive 1240, where they become trapped. A user may observe trapped insects by looking through opening 1220 in front housing 1218. When a sufficient number of insects have been trapped, the user may easily remove and discard the entire used trap portion 1214 without touching the trapped insects, insect debris or adhesive, which remain out of reach inside trap portion 1214, and replace it with a new trap portion 1214. New trap portion 1214 has fresh adhesive-coated surfaces, ensuring that insect trap 1210 will continue to efficiently and effectively attract and trap insects.

In some embodiments, because trap portion 1214 mounts on top of, and not in front of, base portion 1212, insect trap 1210 protrudes minimally from the wall when plugged into an ordinary household wall socket, and therefore intrudes minimally into the home environment. In some embodiments, insect trap 1210 is configured such that when insect trap 1210 is mounted to a wall, its overall depth, defined by the overall distance insect trap 1210 protrudes from the wall, is smaller than its overall height and its overall width.

It should be appreciated that a benefit of insect trap 1210 is the manipulation of light within trap portion 1214. In some embodiments, light manipulation occurs solely within trap portion 1214. Light manipulation may include reflection, refraction, polarization, dispersion and/or diffusion and is achieved by engaging with a manipulative element or surface (e.g., inside surface 1228 and adhesive 1240). In some embodiments, light manipulation produces an even distribution of light on adhesive 1240. In some embodiments, light is manipulated to produce a predetermined pattern on adhesive 1240 or within trap portion 1214, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1210 of this configuration may accommodate a variety of different trap portions 1214 that may be removably mounted to base portion 1212, each trap portion 1214 being uniquely configured to attract and trap a specific species or multiple species of insects. For example, the overall size and shape of trap portion 1214, and the size, shape, location and orientation of opening 1220 in front housing 1218 of trap portion 1214, may be uniquely configured to attract and trap a specific species or multiple species of flying insect. For example, in some embodiments, trap portion 1214 is approximately 20 mm to 600 mm wide, 20 mm to 600 mm high and 5 mm to 150 mm deep. In some embodiments, trap portion 1214 is approximately 20 mm to 200 mm wide, 20 mm to 200 mm high and 5 mm to 80 mm deep. In some embodiments, trap portion 1214 is approximately 20 mm to 130 mm wide, 20 mm to 130 mm high and 5 mm to 50 mm deep.

In some embodiments, base portion 1212 is approximately 20 mm to 600 mm wide, 10 mm to 150 mm high and 10 mm to 150 mm deep. In some embodiments, base portion 1212 is 20 mm to 200 mm wide, 10 mm to 100 mm high and 10 mm to 80 mm deep. In some embodiments, base portion 1212 is 20 mm to 130 mm wide, 10 mm to 50 mm high and 10 mm to 50 mm deep.

As provided herein, opening 1220 may be a variety of shapes and/or sizes. For example, opening 1220 may be circular, square, rectangular, polygonal and/or elliptical in shape. Alternatively, opening 1220 may be slot shaped having a straight, curved or undulating shape or pattern. When opening 1220 is circular, opening 1220 may be approximately 0.5 mm to 30 mm in diameter. In some embodiments, circular opening 1220 is approximately 0.5 mm to 20 mm in diameter. In some embodiments, circular opening 1220 is approximately 0.5 mm to 15 mm in diameter. When opening 1220 is slot shaped, opening 1220 may be approximately 2 mm to 30 mm wide and 5 mm to 500 mm long. In some embodiments, slot shaped opening 1220 is approximately 2 mm to 20 mm wide and 5 mm to 200 mm long. In some embodiments, slot shaped opening 1220 is approximately 2 mm to 15 mm wide and 5 mm to 100 mm long.

In some embodiments, opening 1220 covers all or a portion of front housing 1218. For example, opening 1220 may cover a range of approximately 1% to 75% of the surface area of front housing 1218. In some embodiments, opening 1220 covers approximately 5% to 50% of the surface area of front housing 1218. In some embodiments, opening 1220 covers approximately 10% to 30% of the surface area of front housing 1218.

Figure 39:
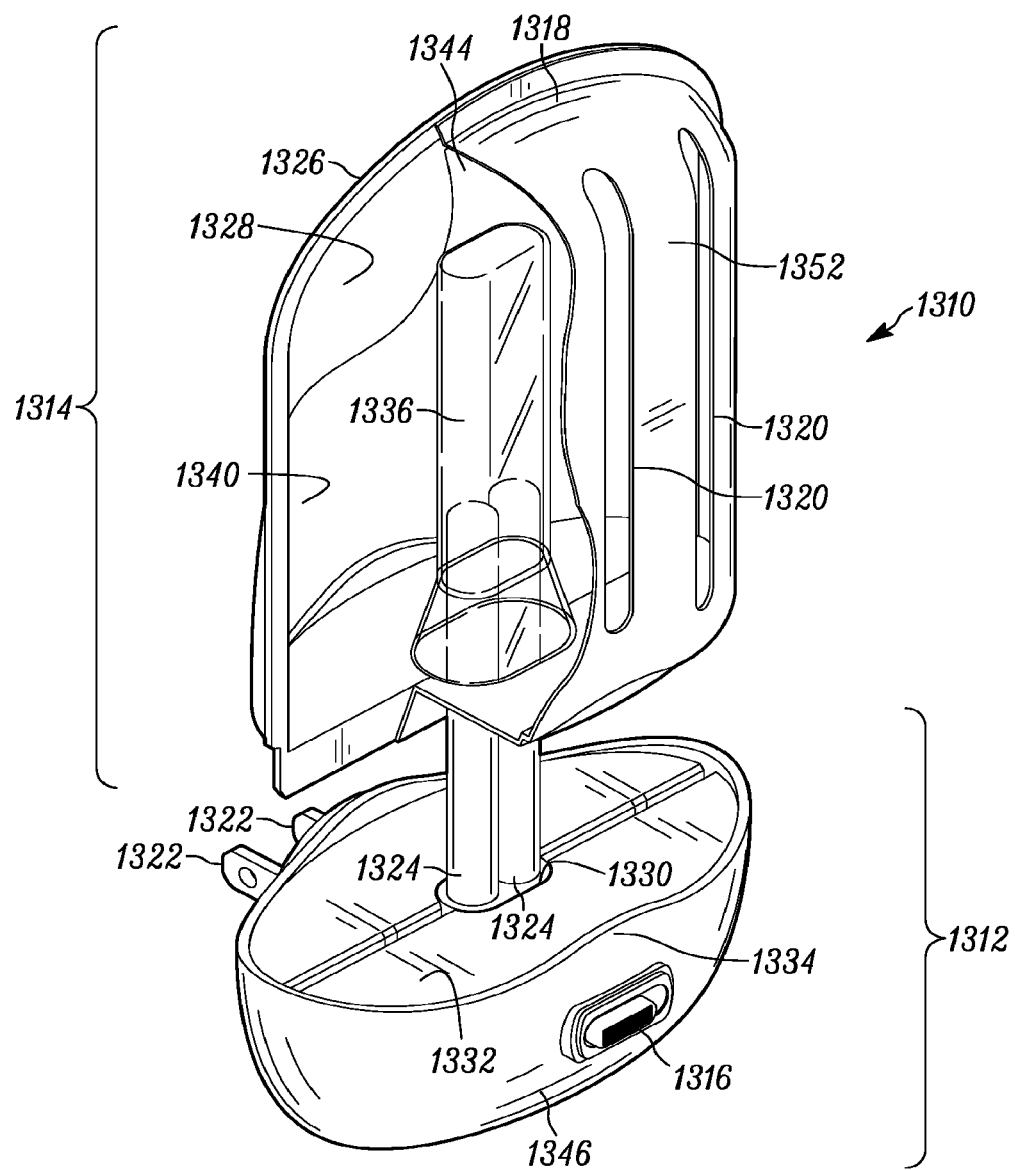
FIG. 39 is a front perspective view of a thirteenth embodiment of an insect trap in accordance with principles of the disclosure.

FIG. 39 is a front perspective view of a thirteenth embodiment of an insect trap, indicated generally at 1310. Insect trap 1310 includes a base portion 1312 and a removable trap portion 1314. Trap portion 1314 is shown partly cut away and partially removed from base portion 1312 in this view. Insect trap 1310 may have an overall length, an overall width and an overall depth, and may be configured such that when insect trap 1310 is mounted to a wall, its overall depth, defined by the overall distance insect trap 1310 protrudes from the wall, is the smallest of the three overall dimensions. A front surface 1346 of base portion 1312 may include a switch 1316, configurable to enable insect trap 1310 to be turned on or off by closing or opening switch 1316 as desired by the user. Alternatively, switch 1316 may be configured to control other features such as light intensity, combinations of light wavelengths, different modes or frequencies of flickering light, an automatic setting that turns on insect trap 1310 when the room gets dark, or a remote control setting for example. Switch 1316 may be manually operated, although switch 1316 may also be operated electrically, optically, electro-mechanically, electro-optically, or by any method for opening or closing switch 1316. Protruding from a rear surface 1350 (shown in FIG. 40) of base portion 1312 are a plurality of electrically conductive prongs 1322, adapted to mount insect trap 1310 to a wall and provide power to insect trap 1310 by inserting conductive prongs 1322 into a standard household electrical wall socket. Alternatively, conductive prongs 1322 may be adapted to swivel to allow insect trap 1310 to remain upright when conductive prongs 1322 are inserted into a horizontally oriented electrical wall socket. Alternatively, base portion 1312 may be configured to sit or hang wherever desired and receive power from batteries (not shown) mounted in base portion 1312. While an electrical socket and batteries have been described as providing power to insect trap 1310, any suitable power source may be used. Base portion 1312 includes a top surface 1332 and one or more light sources 1324. Light sources 1324 may use fluorescent, incandescent, LED, or any other lighting technology or combination of lighting technologies. In some embodiments, light sources 1324 emit both UV and visible light. In some embodiments, one or more of light sources 1324 emit UV light and one or more of light sources 1324 emit blue light to better attract a wide variety of insect species. In some embodiments, light sources 1324 emit a combination of wavelengths to mimic sunlight. In some embodiments, one or more of light sources 1324 may emit infrared (IR) light to better attract certain species of insects including mosquitos and fleas. In some embodiments, light sources 1324 may at least partially protrude from top surface 1332 of base portion 1312. In top surface 1332 of base portion 1312 may be at least one opening 1330, which may receive light sources 1324. On the perimeter of top surface 1332 may be an upwardly directed rim or protrusions 1334. Trap portion 1314 includes a front housing 1318 with at least one opening 1320 in a front surface 1352, and a rear housing 1326 with an inside surface 1328. Opening 1320 in front housing 1318 may be configured to admit a wide variety of insects into insect trap 1310, or alternatively it may be configured to admit one or more specific insect species. In some embodiments, opening 1320 is configured to prevent a user's fingers from penetrating opening 1320 and inadvertently touching trapped insects or adhesive when removing and replacing trap portion 1314. In some embodiments, opening 1320 has a size and shape such that a sphere 25 mm in diameter cannot pass through opening 1320, and has a size and shape such that a sphere 1 mm in diameter can pass through any portion of opening 1320. Opening 1320 may be of uniform or of varying width, shape and orientation, and if trap portion 1314 has more than one opening 1320, they may be of identical or of differing widths, shapes and orientations. Opening 1320 may be configured to attract one or more individual insect species or a variety of insect species. Front housing 1318 and rear housing 1326 of trap portion 1314 form an enclosure 1344. Inside surface 1328 of rear housing 1326 may be coated with a transparent, translucent or opaque adhesive. In some embodiments, inside surface 1328 of rear housing 1326 also has a reflective coating (not shown) under adhesive 1340. Alternatively, the material and surface finish of rear housing 1326 may be configured to reflect and disperse UV and/or visible and/or IR light without a reflective coating. Alternatively, adhesive 1340 may also be configured to reflect and disperse UV and/or visible and/or IR light. Inside surface 1328 of rear housing 1326 may also be configured of material that may polarize light reflecting from it in an orientation similar to that of daylight to further attract flying insects, a wide variety of which are known to detect polarized light. In some embodiments, front housing 1318 may be coated with transparent, translucent or opaque adhesive on its inside surface (not shown) to provide additional insect trapping efficiency and capacity. Front housing 1318 may also have a reflective coating (not shown) underneath the adhesive coating on its inside surface to enhance its attraction to insects and may further improve the insect trapping efficiency and effectiveness. In some embodiments, front housing 1318 and rear housing 1326 of trap portion 1314 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1318 and rear housing 1326 are constructed by injection molding or by other suitable manufacturing techniques. In some embodiments, front housing 1318 and rear housing 1326 are joined together where they intersect or engage with an adhesive, although they may also be joined by other commonly used packaging assembly techniques such as ultrasonic welding or RF sealing, or any other suitable assembly method. The materials of trap portion 1314 may also include one or more insect attractants. For example, trap portion 1314 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cuelure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1310. In such embodiments, the insect attractant is integral to trap portion 1314. Alternatively, the insect attractants may be embedded or contained in a separate piece (not shown) that mounts on an inside surface of enclosure 1344 or through an opening in front housing 1318 or rear housing 1326 or on front surface 1352 of front housing 1318. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 1310. In some embodiments, trap portion 1314 also includes at least one transparent or translucent sleeve 1336 that receive and protect light sources 1324 when trap portion 1314 is mounted on base portion 1312. In some embodiments, the material and thickness of sleeve 1336 is selected to transmit a substantial proportion of the UV and/or visible and/or IR light, for example greater than 60% of the light is transmitted through sleeve 1336.

Figure 40:
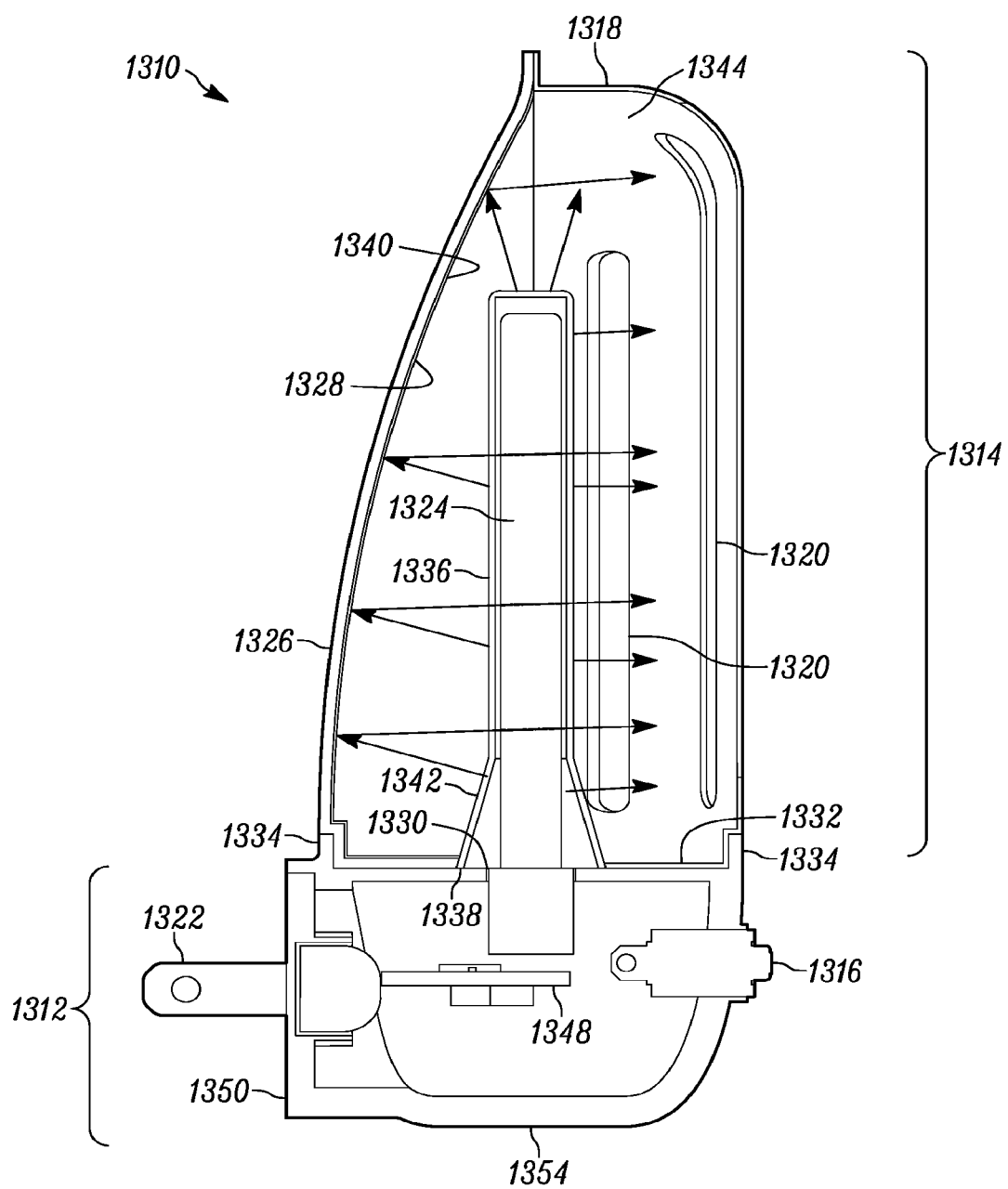
FIG. 40 is a cross-sectional view of the insect trap of FIG. 39.

FIG. 40 is a cross-sectional view of insect trap 1310. In some embodiments, base portion 1312 includes a circuit board 1348 having a programmable processor or chip (not shown) for executing commands, electrically connected to conductive prongs 1322 (only one of which is shown), switch 1316 and light sources 1324 (only one of which is shown). For clarity, however, not all of the electrical connections are shown. Circuit board 1348 may include electronic circuitry to receive ordinary household current from conductive prongs 1322, respond to the position of switch 1316 and provide power to illuminate light sources 1324. Circuit board 1348 may include an energy stabilizer such as a full wave rectifier circuit or any other circuit that provides steady voltage to light sources 1324 when switch 1316 is in the closed position, although it may also provide a varying voltage to light sources 1324 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1348 may provide power to light sources 1324 to provide UV and/or visible and/or IR light, although it may be configured to provide power to only light sources 1324 that produce UV light or to only light sources 1324 that produce visible light or to only light sources 1324 that produce IR light, or to provide variable power to produce combinations of flickering UV and/or visible and/or IR light. Circuit board 1348 may also be configured to drive a transmitter or transceiver such as a piezoelectric speaker (not shown) or other device that may be mounted in base portion 1312 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 1310. It is desirable for such insect-attracting sound to be undetectable by a human beyond approximately a 1-meter distance from insect trap 1310. Circuit board 1348 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1312 and into trap portion 1314, to attract some insect species, including fleas and mosquitoes. Alternatively, one or more of light sources 1324 may generate heat, to replace or augment the heat generated by the one or more electrical elements. In general, the heat generated may increase and maintain the temperature of at least a portion of trap portion 1314 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

Trap portion 1314 may have at least one opening 1338. Sleeve 1336 of trap portion 1314 may be mounted with its open end adjacent to opening 1338 and may include a tapered section 1342 adjacent to opening 1338 configured to guide light sources 1324 into sleeve 1336 when trap portion 1314 is mounted to base portion 1312. Alternatively, sleeve 1336 of trap portion 1314 may be made of an opaque material and include one or more openings (not shown) to allow light from light sources 1324 to transmit into enclosure 1344. Alternatively, sleeve 1336 may have an opaque coating (not shown) on its outside surface adjacent to front housing 1318 of trap portion 1314 to prevent light from transmitting directly from light sources 1324 through enclosure 1344 and out through opening 1320 of front housing 1318. Alternatively, sleeve 1336 may be configured of plastic or metal wire mesh (not shown) or any configuration that guides light sources 1324 into trap portion 1314, protects light sources 1324 from touching adhesive 1340, and allows light from light sources 1324 to enter enclosure 1344.

As shown, rim or protrusions 1334 on top surface 1332 of base portion 1312 engage with trap portion 1314 to secure it in place during use, although any other form of attachment may be substituted that allows trap portion 1314 to be securely but removably mounted on base portion 1312. Bottom surface 1354 of the base portion 1312 may be substantially flat or concave to allow the insect trap 1310 to sit upright on a floor, desk, table or shelf when the insect trap 1310 is unplugged. Alternatively, the bottom surface 1354 of the base portion 1312 may have two or more protrusions (not shown) or legs that allow the insect trap 1310 to sit upright when the insect trap 1310 is unplugged.

In the operation of insect trap 1310, conductive prongs 1322 are inserted into a wall electrical socket, and switch 1316 is moved to the closed position. Light sources 1324 emit light, represented by arrows, which transmits through sleeve 1336 in trap portion 1314, into enclosure 1344, and directly onto adhesive 1340 coating inside surface 1328 of rear housing 1326. In some embodiments, light is not manipulated in base portion 1312 and is emitted directly into trap portion 1314.

Inside surface 1328 of rear housing 1326 may include a concave shape and may be configured to reflect and disperse light from light sources 1324 to project the light evenly through enclosure 1344 and out through openings 1320 of front housing 1318, although inside surface 1328 of rear housing 1326 may have a convex shape or a saddle shape or a combination of shapes, or may also have ribs or other features to more evenly distribute the light. The light may be further evenly distributed by the light-diffusing properties of sleeve 1336, by adhesive 1340 on inside surface 1328 of rear housing 1326, or by a combination of the two.

Thereafter, a portion of the light entering enclosure 1344 continues through opening 1320 in front housing 1318 and into the surrounding area where insect trap 1310 is installed. Insects are attracted to the light transmitted through opening 1320 in front housing 1318, and fly or crawl into opening 1320 and onto adhesive 1340, where they become trapped. A user may observe trapped insects by looking through openings 1320 in front housing 1318. When a sufficient number of insects have been trapped, the user may easily remove and discard the entire trap portion 1314 without touching trapped insects, insect debris or adhesive, which remain out of reach inside trap portion 1314, and replace it with a new trap portion 1314. New trap portion 1314 has fresh adhesive-coated surfaces, ensuring that insect trap 1310 will continue to efficiently and effectively attract and trap insects. Because sleeve 1336 protects light sources 1324 from contacting insects, insect debris and adhesive 1340, light sources 1324 remain clean and maintain their light-producing efficiency.

In some embodiments, because trap portion 1314 mounts on top of, and not in front of, base portion 1312, insect trap 1310 protrudes minimally from the wall when plugged into an ordinary household wall socket, and therefore intrudes minimally into the home environment. In some embodiments, insect trap 1310 is configured such that when insect trap 1310 is mounted to a wall, its overall depth, defined by the overall distance insect trap 1310 protrudes from the wall, is smaller than its overall height and its overall width.

It should be appreciated that a benefit of insect trap 1310 is the manipulation of light within trap portion 1314. In some embodiments, light manipulation occurs solely within trap portion 1314. Light manipulation may include reflection, refraction, polarization, dispersion and/or diffusion and is achieved by engaging with a manipulative element or surface (e.g., inside surface 1328 and adhesive 1340). In some embodiments, light manipulation produces an even distribution of light on adhesive 1340. In some embodiments, light is manipulated to produce a predetermined pattern on adhesive 1340 or within trap portion 1314, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1310 of this configuration may accommodate a variety of different trap portions 1314 that may be removably mounted to base portion 1312, each trap portion 1314 being uniquely configured to attract and trap a specific species or multiple species of insects. For example, the overall size and shape of trap portion 1314, and the size, shape, location and orientation of opening 1320 in front housing 1318 of trap portion 1314, may be uniquely configured to attract and trap a specific species or multiple species of flying insect. For example, in some embodiments, trap portion 1314 is approximately 20 mm to 600 mm wide, 20 mm to 600 mm high and 5 mm to 150 mm deep. In some embodiments, trap portion 1314 is approximately 20 mm to 200 mm wide, 20 mm to 200 mm high and 5 mm to 80 mm deep. In some embodiments, trap portion 1314 is approximately 20 mm to 130 mm wide, 20 mm to 130 mm high and 5 mm to 50 mm deep.

In some embodiments, base portion 1312 is approximately 20 mm to 600 mm wide, 10 mm to 150 mm high and 10 mm to 150 mm deep. In some embodiments, base portion 1312 is 20 mm to 200 mm wide, 10 mm to 100 mm high and 10 mm to 80 mm deep. In some embodiments, base portion 1312 is 20 mm to 130 mm wide, 10 mm to 50 mm high and 10 mm to 50 mm deep.

As provided herein, opening 1320 may be a variety of shapes and/or sizes. For example, opening 1320 may be circular, square, rectangular, polygonal and/or elliptical in shape. Alternatively, opening 1320 may be slot shaped having a straight, curved or undulating shape or pattern. When opening 1320 is circular, opening 1320 may be approximately 0.5 mm to 30 mm in diameter. In some embodiments, circular opening 1320 is approximately 0.5 mm to 20 mm in diameter. In some embodiments, circular opening 1320 is approximately 0.5 mm to 15 mm in diameter. When opening 1320 is slot shaped, opening 1320 may be approximately 2 mm to 30 mm wide and 5 mm to 500 mm long. In some embodiments, slot shaped opening 1320 is approximately 2 mm to 20 mm wide and 5 mm to 200 mm long. In some embodiments, slot shaped opening 1320 is approximately 2 mm to 15 mm wide and 5 mm to 100 mm long.

In some embodiments, opening 1320 covers all or a portion of front housing 1318. For example, opening 1320 may cover a range of approximately 1% to 75% of the surface area of front housing 1318. In some embodiments, opening 1320 covers approximately 5% to 50% of the surface area of front housing 1318. In some embodiments, opening 1320 covers approximately 10% to 30% of the surface area of front housing 1318.

Figure 41:
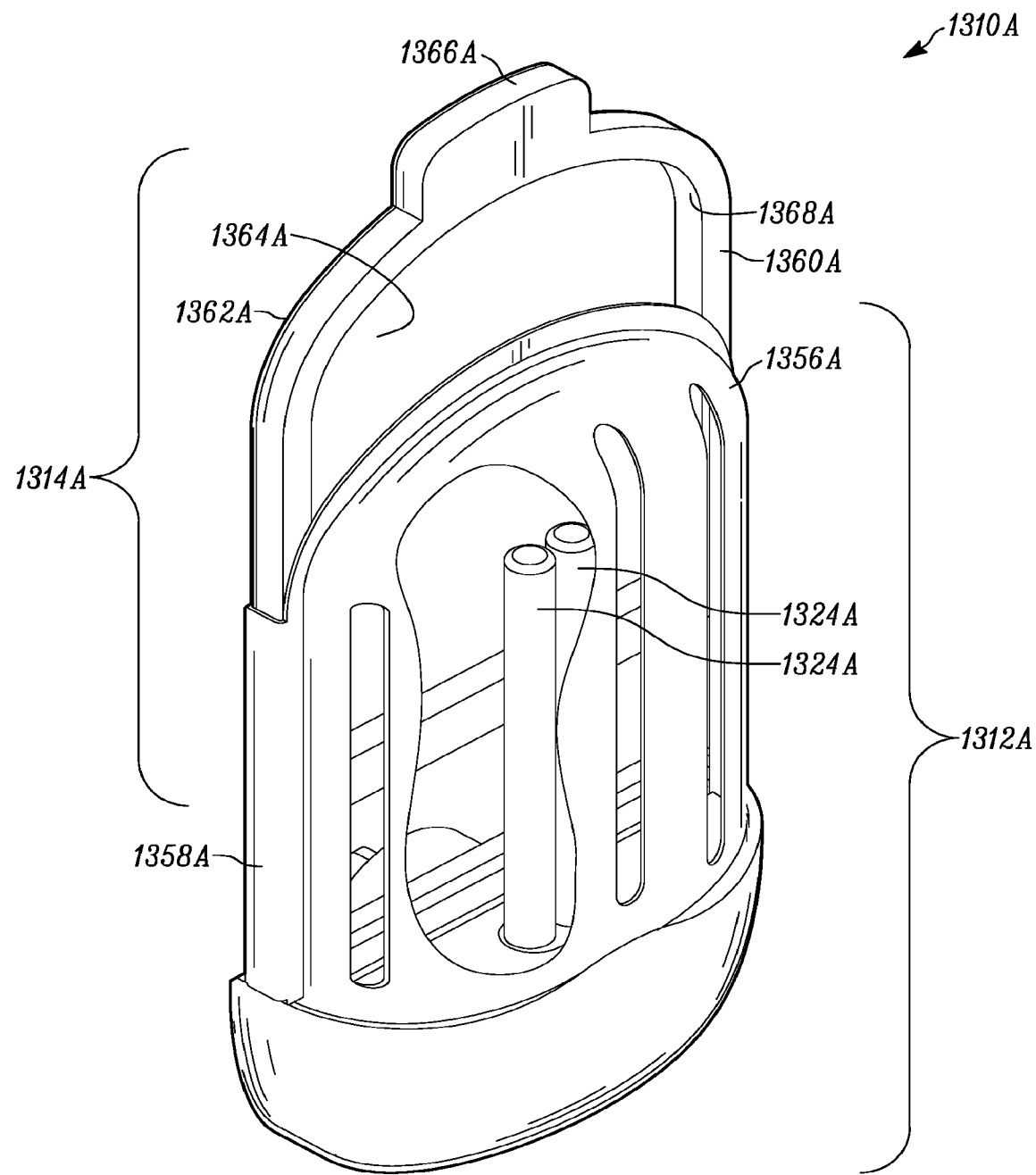
FIG. 41 is a front perspective view of an example of the thirteenth embodiment of an insect trap in accordance with the principles of the disclosure.
Figure 42:
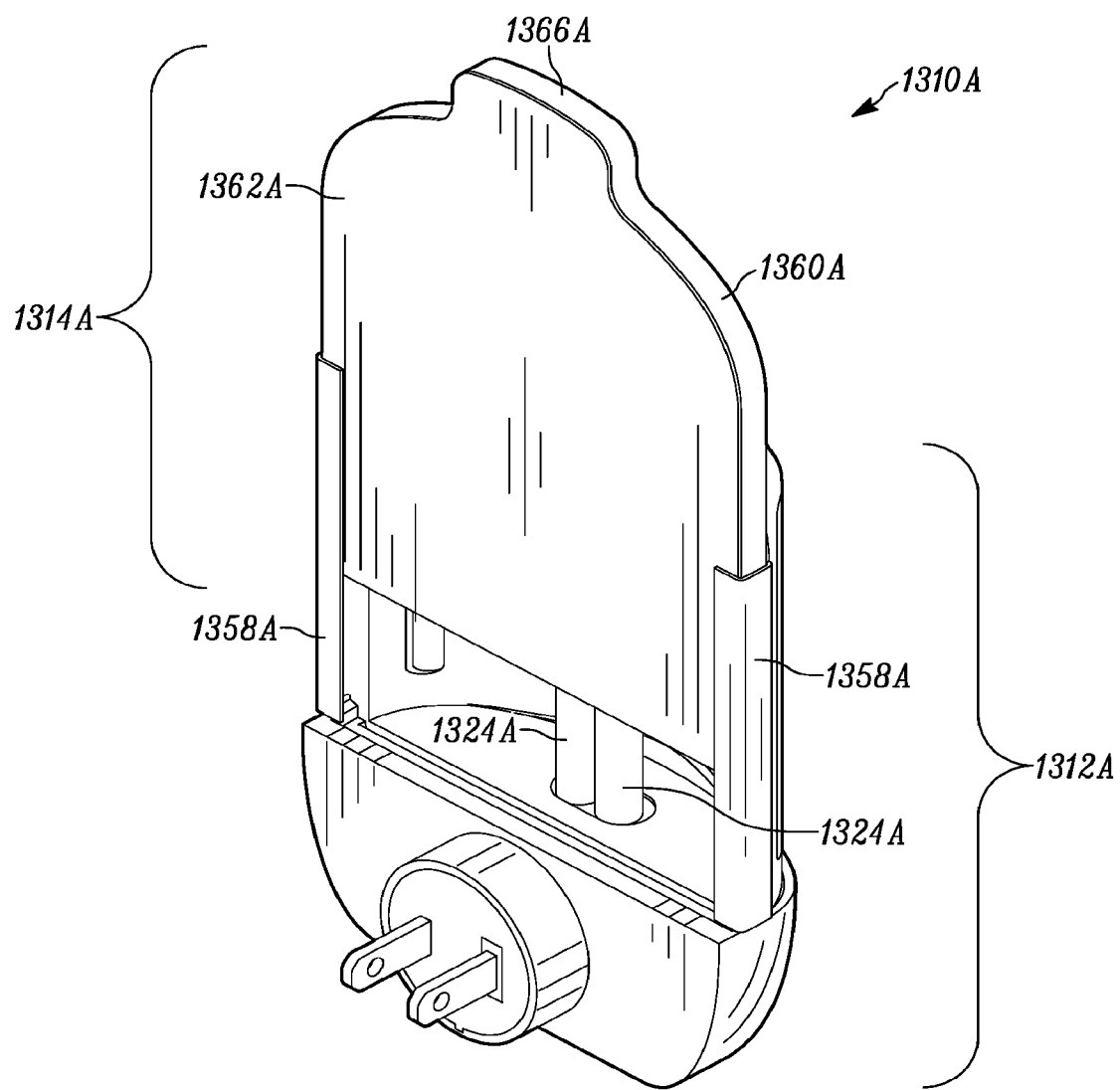
FIG. 42 is a rear perspective view of the insect trap of FIG. 41.

FIG. 41 is a front perspective view and FIG. 42 is a rear perspective view of an example of the thirteenth embodiment of an insect trap, indicated generally at 1310A. Insect trap 1310A includes a base portion 1312A and a removable trap portion 1314A. Base portion 1312A is shown partially cut away in FIG. 41. Trap portion 1314A is shown partially removed from base portion 1312A in FIG. 41 and FIG. 42. Base portion 1312A includes one or more light sources 1324A and a housing 1356A with one or more side channels 1358A adapted to receive trap portion 1314A and guide it into place when trap portion 1314A is mounted in base portion 1312A. Trap portion 1314A includes a frame 1360A and a membrane 1362A with a coating of insect-trapping adhesive on its front surface 1364A. Frame 1360A includes a tab 1366A and at least one opening 1368A. Tab 1366A is configured to protrude above housing 1356A when trap portion 1314A is mounted in base portion 1312A. Membrane 1362A is mounted to frame 1360A such that front surface 1364A of membrane 1362A is recessed within frame 1360A and the coating of adhesive is exposed through opening 1368A in frame 1360A. As shown, frame 1360A surrounds the entire periphery of membrane 1362A, although frame 1360A may surround only a portion (e.g., one, two or three sides) of the periphery of membrane 1362A. Membrane 1362A may be constructed from opaque or translucent materials such as paper, paperboard or plastic. Frame 1360A may be of varying thickness and may be made of a variety of sheet materials including corrugated cardboard, polystyrene foam and paperboard, as well as from molded or thermoformed plastic. Trap portion 1314A may be removed from base portion 1312A by grasping and lifting tab 1366A. Trap portion 1314A is mounted in base portion 1312A by grasping tab 1366A, inserting trap portion 1314A into side channels 1358A and lowering trap portion 1314A into place. Frame 1360A and membrane 1362A are configured to allow users to remove and replace trap portion without contacting adhesive or dead insects.

Figure 43:
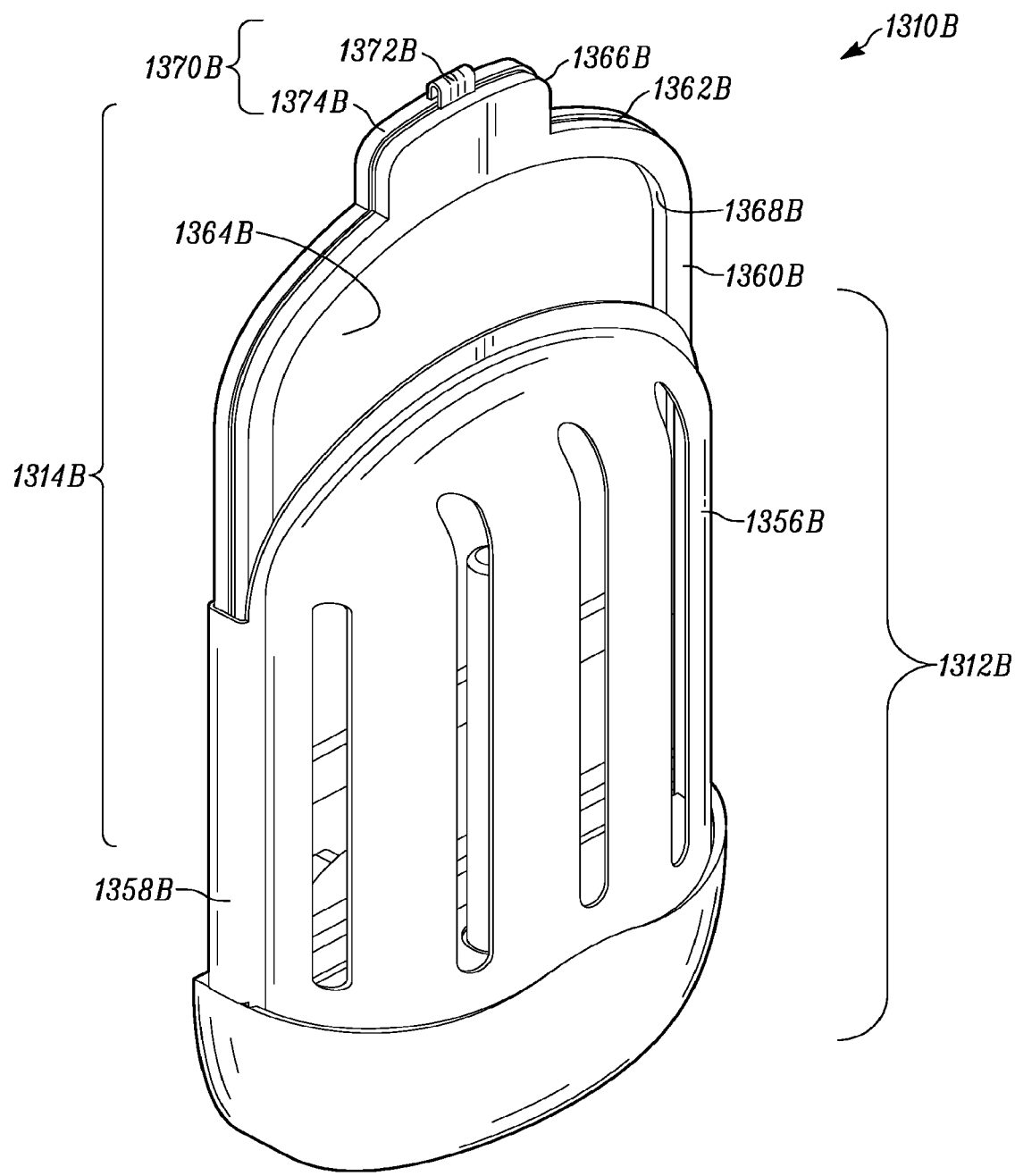
FIG. 43 is a front perspective view of an example of the thirteenth embodiment of an insect trap in accordance with the principles of the disclosure.
Figure 44:
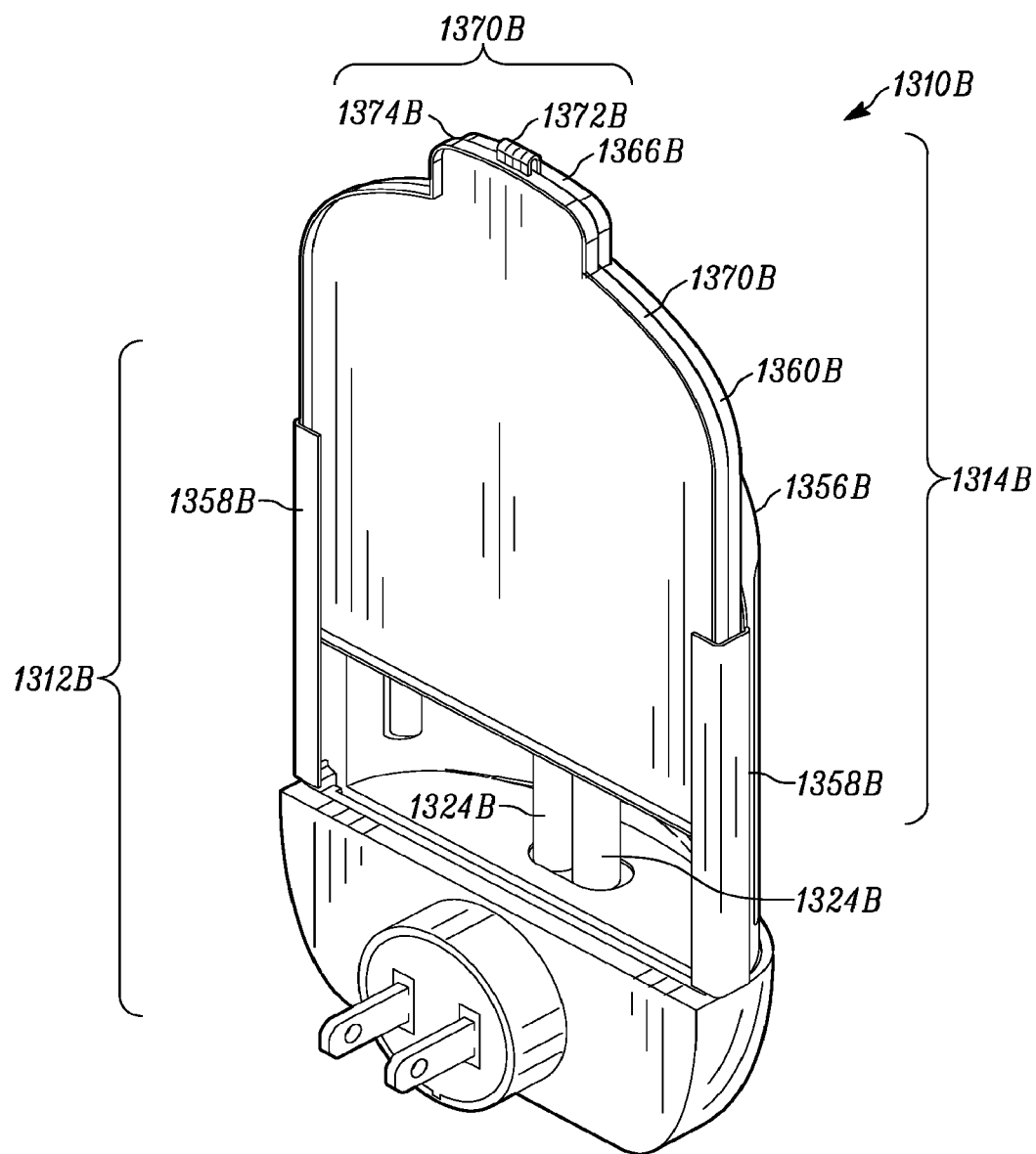
FIG. 44 is a rear perspective view of the insect trap of FIG. 43.

A variety of configurations are contemplated to protect the user from touching adhesive and from seeing and touching dead insects. FIG. 43 is a front perspective view and FIG. 44 is a rear perspective view of an example of the thirteenth embodiment of an insect trap, indicated generally at 1310B. Insect trap 1310B includes a base portion 1312B and a removable trap portion 1314B. Trap portion 1314B is shown partially removed from base portion 1312B in this view. Base portion 1312B includes a housing 1356B with one or more side channels 1358B. Trap portion 1314B includes a frame 1360B, a membrane 1362B with a coating of insect-trapping adhesive on its front surface 1364B, and a cover 1370B with a flexible web 1372B and a cover portion 1374B. Frame 1360B includes a tab 1366B and at least one opening 1368B. Membrane 1362B is mounted to frame 1360B such that front surface 1364B of membrane 1362B is recessed within frame 1360B and the coating of adhesive is exposed through opening 1368B in frame 1360B. As shown, frame 1360B surrounds the entire periphery of membrane 1362B, although frame 1360B may surround only a portion (e.g., one, two or three sides) of the periphery of membrane 1362B. Web 1372B of cover 1370B attaches to tab 1366B of frame 1360B, and is configured to act as a hinge, thereby allowing cover portion 1374B to fold behind frame 1360B and membrane 1362B when cover 1370B is in the open position (as shown) and allowing cover portion 1374B to fold over frame 1360B when cover 1370B is in the closed position. Although web 1372B is shown attached to tab 1366B at the top of frame 1360B, and cover portion 1374B opens from the bottom of trap portion 1314B (e.g., the opposite end from where web 1372B is attached), web 1372B may attach anywhere on its periphery of frame 1360B, and cover portion 1374B may open from anywhere on the periphery of frame 1360B. Cover portion 1374B is shown folded behind frame 1360B (e.g., in the open position) in FIG. 43 and in FIG. 44. Side channels 1358B may be adapted to receive trap portion 1314B with cover portion 1374B folded behind frame 1360B and membrane 1362B (e.g., in the open position) and guide trap portion 1314B into place as trap portion 1314B is mounted in base portion 1312B. Membrane 1362B may be made of opaque or translucent materials such as paper, paperboard or plastic. Frame 1360B may be made of a variety of sheet materials including corrugated cardboard, polystyrene foam and paperboard, as well as from molded or thermoformed plastic. Cover portion 1374B may be made of a variety of materials and processes including thermoformed sheet plastic, molded plastic, formed paperboard or formed paper pulp.

Figure 45:
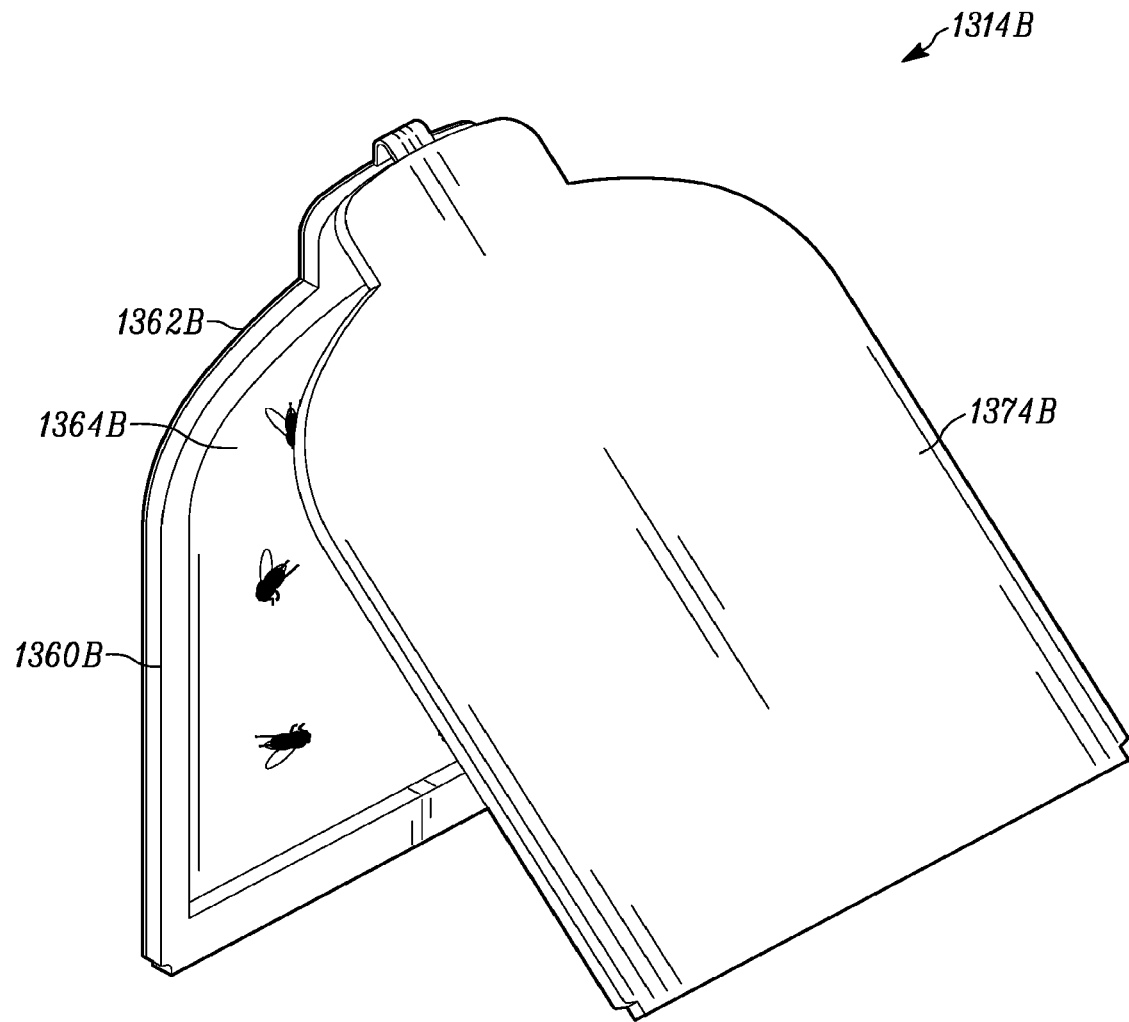
FIG. 45 is a front perspective view of the trap portion of the insect trap of FIG. 43.

FIG. 45 is a front perspective view of trap portion 1314B. As shown, trap portion 1314B has several trapped insects stuck on the adhesive coating on front surface 1364B of membrane 1362B and has been removed from base portion 1312B, with cover portion 1374B shown in the partially closed position. In some embodiments, cover portion 1374B may include one or more features such as ribs, bumps or lips (not shown) to engage with the periphery of frame 1360B, which may have corresponding features such as recesses (not shown), to firmly but removably secure cover portion 1374B to frame 1360B when cover portion 1374B is in the closed position, and to firmly but removably secure cover portion 1374B to frame 1360B and/or membrane 1362B when cover portion 1374B is folded back in the open position. In some embodiments, cover portion 1374B and frame 1360B may also include one or more features such as tabs or recesses (not shown) that allow cover portion 1374B to be easily opened and closed.

Figure 46:
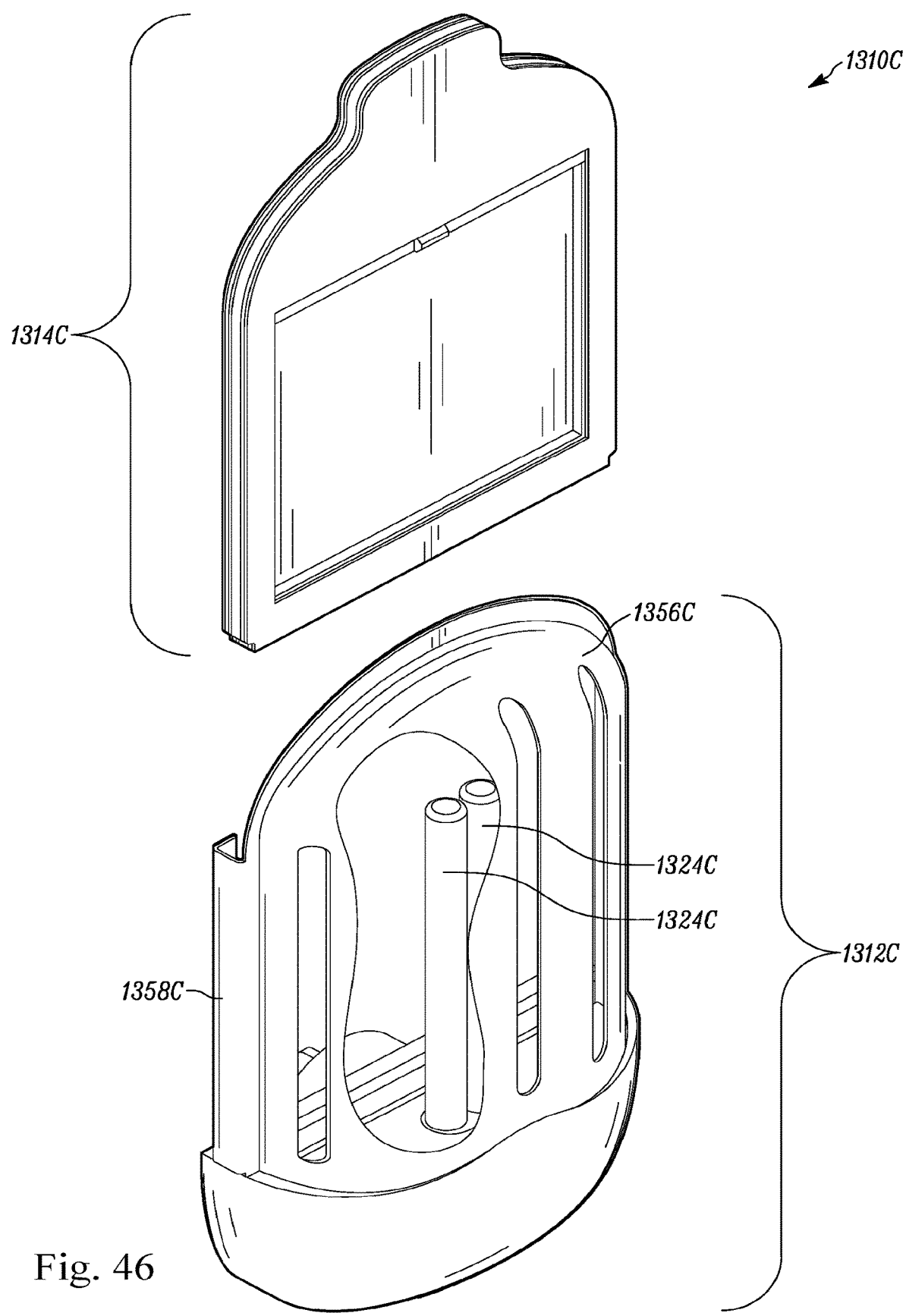
FIG. 46 is a front perspective view of an example of the thirteenth embodiment of an insect trap in accordance with the principles of the disclosure.

Returning to FIG. 43 and FIG. 44, trap portion 1314B may be removed from base portion 1312B by grasping and lifting tab 1366B. Cover portion 1374B may then be folded into the closed position over frame 1360B, thereby covering frame 1360B and front surface 1364B of membrane 1362B and protecting user from seeing or contacting dead insects during disposal of trap portion 1314B. To install new trap portion 1314B, cover portion 1374B is folded into the open position and trap portion 1314B is mounted in base portion 1312B by grasping tab 1366B, inserting trap portion 1314B into side channels 1358B and lowering trap portion 1314B into place. It may be desirable to further protect the user from touching adhesive and from seeing and touching dead insects when removing and replacing the removable and trap portion. FIG. 46 is a front perspective view of an example of the thirteenth embodiment of an insect trap, indicated generally at 1310C. Insect trap 1310C includes a base portion 1312C and a removable trap portion 1314C. Base portion is shown partly cut away and trap portion 1314C is shown removed from base portion 1312C. Base portion 1312C includes one or more light sources 1324C and a housing 1356C with one or more side channels 1358C (only one of which is shown) adapted to receive trap portion 1314C and guide it into place when trap portion 1314C is mounted to base portion 1312C.

Figure 47:
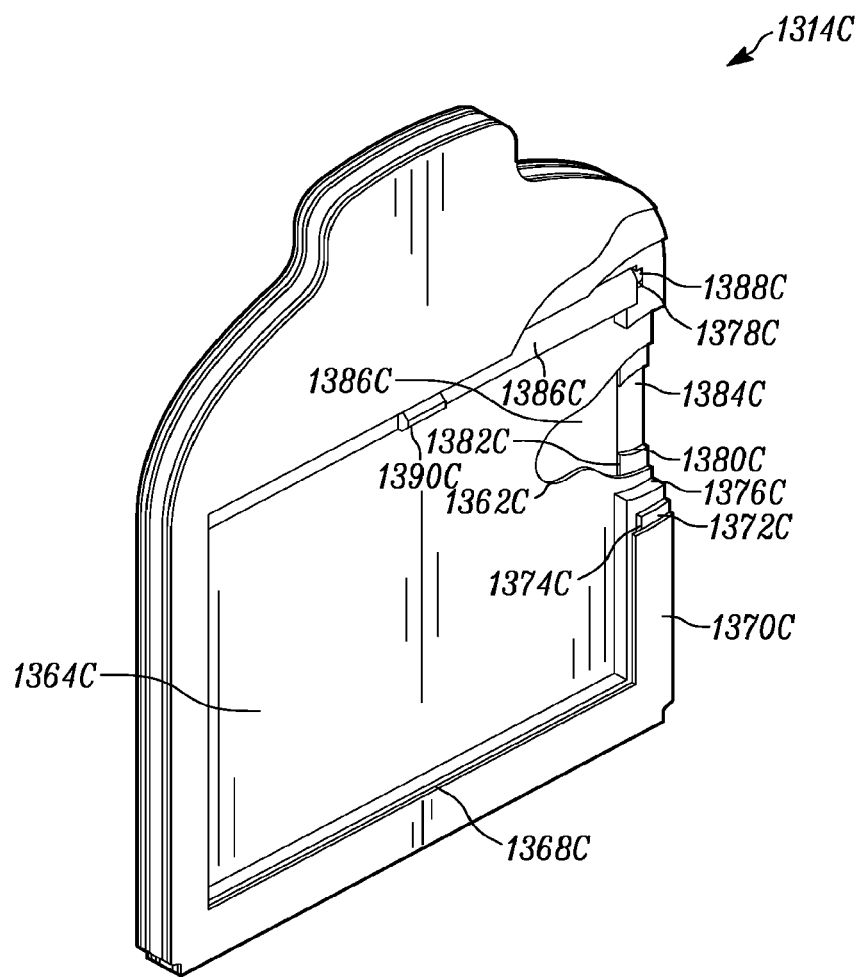
FIG. 47 is a front perspective view of the trap portion of the insect trap of FIG. 46.

FIG. 47 is a front perspective view of trap portion 1314C. Trap portion 1314C is shown partially cut away in this view. Trap portion 1314C includes a front plate 1370C with an opening 1368C, a front spacer 1372C with an opening 1374C, a core 1376C with recesses 1378C (only one of which is shown), a membrane 1362C with a coating of insect-trapping adhesive on its front surface 1364C, a back spacer 1380C with an opening 1382C, a back plate 1384C, a shade 1386C and a cylindrical pin 1388C. Shade 1386C is configured to move freely over pin 1388C, in the space bounded by front plate 1370C, core 1376C and opening 1374C of front spacer 1372C, and in the space bounded by membrane 1362C, back plate 1384C and opening 1382C of back spacer 1380C. Recesses 1378C in core 1376C hold pin 1388C in place and allow it to turn freely. Shade 1386C includes a knob 1390C configured to engage with housing 1356C (not shown in this view) and to raise shade 1386C, thereby exposing the insect-trapping adhesive on front surface 1364C of membrane 1362C when trap portion 1314C is mounted to base portion 1312C, and to lower shade 1386C, thereby covering the adhesive when trap portion 1314C is removed from base portion 1312C, as well as allowing the user to raise and lower shade 1386C by hand. Shade 1386C is configured to operate as a tambour (e.g., in a similar manner to the cover of a roll-top desk). Knob 1390C also prevents shade 1386C from being raised above top edge of opening 1368C in front plate 1370C and from being lowered below bottom edge of opening 1368C of front plate 1370C. Front plate 1370C, front spacer 1372C, core 1376C, membrane 1362C, back spacer 1380C and back plate 1384C may be made from a variety of materials including sheet plastic, molded plastic, corrugated cardboard, paperboard or foamed plastic, and may be assembled one over of the other in a layered configuration using a variety of manufacturing techniques including gluing, stapling ultrasonic welding and high-frequency welding. Shade 1386C may be made from a variety of materials including sheet plastic, molded plastic and paper. In some embodiments, shade 1386C may include a series of transverse scores to enhance its flexibility. Pin 1388C may be made from turned wood, molded plastic or metal. Housing 1356C may be made of a variety of materials, including thermoformed sheet plastic, molded plastic and molded paper pulp.

Figure 48:
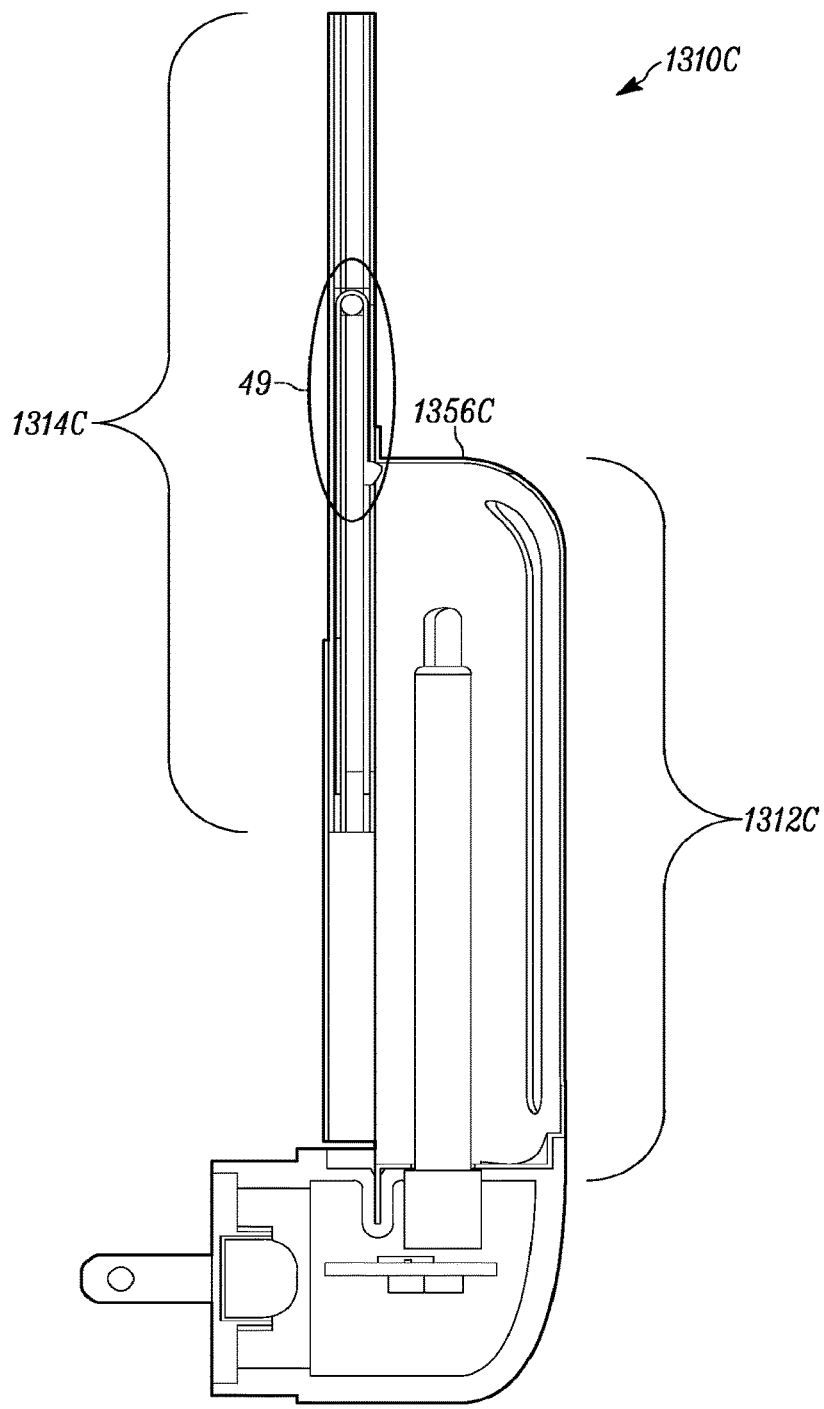
FIG. 48 is a cross-sectional view of the insect trap of FIG. 46.
Figure 49:
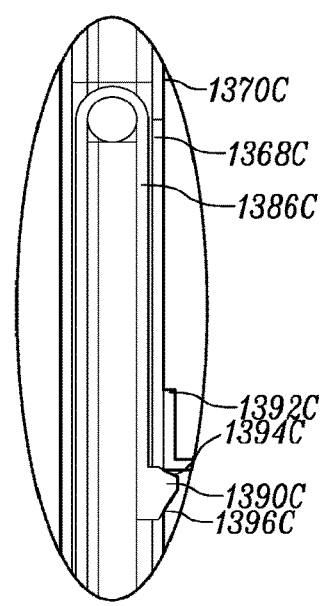
FIG. 49 is an enlarged view of a portion of FIG. 48.

FIG. 48 is a cross-sectional view of insect trap 1310C, and FIG. 49 is an enlarged view of a portion of FIG. 48. Trap portion 1314C is shown being lifted from base portion 1312C in these views. Housing 1356C includes a lip 1392C. Knob 1390C protrudes beyond front plate 1370C and includes a top angled surface 1394C and a bottom angled surface 1396C. Bottom angled surface 1396C of knob 1390C is configured to engage with lip 1392C of housing 1356C as trap portion 1314C is lowered onto base portion 1312C. When knob 1390C reaches the top edge of opening 1368C of front plate 1370C (e.g., when shade 1386C is fully open, exposing the insect-trapping adhesive), lip 1392C of housing 1356C flexes, allowing knob 1390C to pass by as trap portion 1314C is lowered into position on base portion 1312C. Top angled surface 1394C of knob 1390C is configured to engage with lip 1392C of housing 1356C as trap portion 1314C is lifted from base portion 1312C. When knob 1390C reaches the bottom edge of opening 1368C of front plate 1370C (e.g., when shade 1386C is fully closed), lip 1392C of housing 1356C flexes, allowing knob 1390C to pass by as trap portion 1314C is removed from base portion 1312C. Accordingly, shade 1386C of trap portion 1314C automatically opens when trap portion 1314C is mounted on base portion 1312C, and automatically closes when trap portion 1314C is removed from base portion 1312C, thereby preventing the user from touching the insect-trapping adhesive and from seeing or touching dead insects while removing and replacing trap portion 1314C.

Figure 50:
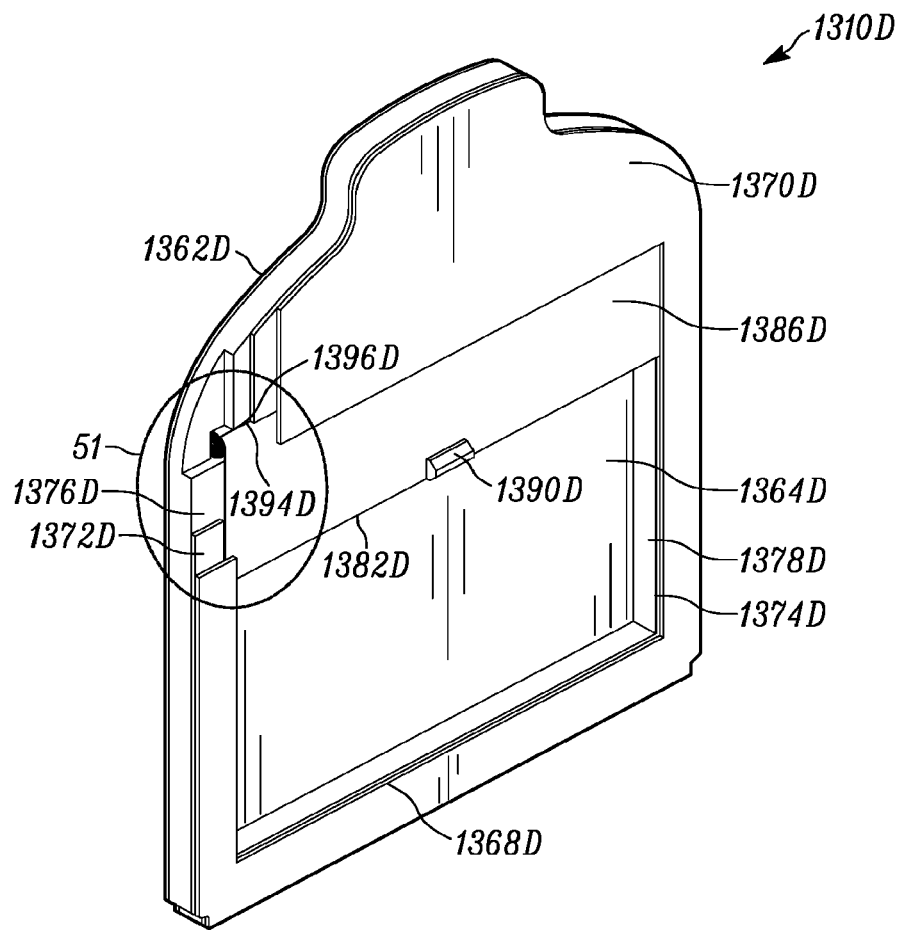
FIG. 50 is a front perspective view of an example of the thirteenth embodiment of an insect trap in accordance with the principles of the disclosure.
Figure 51:
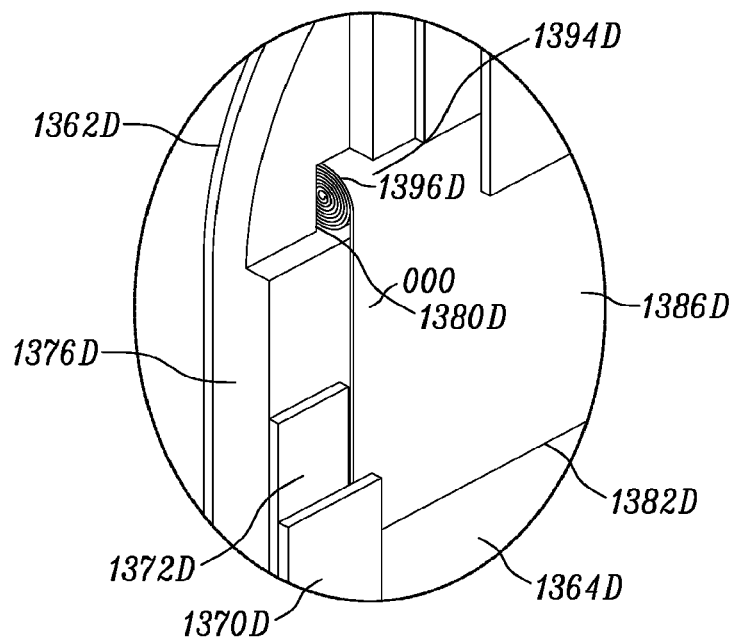
FIG. 51 is an enlarged view of a portion of FIG. 50.

A variety of configurations are contemplated to automatically protect the user from touching adhesive and from seeing and touching dead insects when removing and replacing the removable and trap portion. FIG. 50 is a front perspective view of an example of a trap portion, indicated generally at 1314D, and FIG. 51 is an enlarged view of a portion of FIG. 50. Trap portion 1314D is shown partially cut away in this view. Trap portion 1314D includes a front plate 1370D with an opening 1368D, a spacer 1372D with an opening 1374D, a core 1376D with an opening 1378D and a roll recess 1380D, a membrane 1362D with a coating of insect-trapping adhesive on its front surface 1364D, and a shade 1386D with a knob 1390D on its proximal end 1382D. As shown, trap portion 1314D has a layered construction, such that front surface 1364D of membrane 1362D attaches to the back surface (not shown) of core 1376D, and the front surface of core 1376D attaches to the back surface (not shown) of spacer 1372D, and the front surface of spacer 1372D attaches to the back surface (not shown) of front plate 1370D, and membrane 1362D, core 1376D, front spacer 1372D and front plate 1370D align along the perimeter of trap portion 1314D. The coating of insect-attracting adhesive on front surface 1364D of membrane 1362D is exposed through opening 1378D in core 1376D, opening 1374D in spacer 1372D and opening 1368D in front plate 1370D. Front plate 1370D, spacer 1372D, core 1376D and membrane 1362D may be made from a variety of materials including sheet plastic, molded plastic, corrugated cardboard, paperboard and foamed plastic, and may be assembled together in a variety of methods including adhesive, mechanical fasteners and welding. Shade 1386D has a distal end (not shown) which is rolled into a cylindrical roll portion 1394D with roll ends 1396D (only one of which is shown) and fits loosely inside roll recess 1380D of core 1376D. Roll portion 1394D of shade 1386D is configured to unroll when proximal end 1382D of shade 1386D is lowered, operating in a similar manner to a household window roller blind. Channels formed by front surface of core 1376D, opening 1374D in spacer 1372D and back surface (not shown) of front plate 1370D guide the sides of the unrolled portion of shade 1386D and keep the unrolled portion of shade 1386D substantially flat, such that when proximal end 1382D of shade 1386D is lowered, shade covers opening 1378D of core 1376D and the coating of adhesive on front surface 1364D of membrane 1362D. Shade 1386D is thin and flexible to roll tightly and remain substantially flat when unrolled, and may be made from a variety of materials including sheet plastic, molded plastic and paper. In some embodiments, roll portion 1394D of shade 1386D may have a center shaft (not shown) that provides a solid form around which the distal end of shade 1386D is rolled and imparts stiffness to roll portion 1394D. In some embodiments, the center shaft (not shown) may have ends that extend beyond roll ends 1396D of roll portion 1394D and turn freely in recesses (not shown) at the ends of roll recess 1380D, thereby providing roll portion 1394D of shade 1386D with a more positive location and reduced friction when shade 1386D is unrolled. In some embodiments, a spring mechanism (not shown) within core 1376D or within the center shaft (not shown) may provide torsion to reroll the unrolled portion of shade 1386D when proximal end 1382D is raised as well as provide tension to aid in keeping the unrolled portion substantially flat.

Other configurations are contemplated that reveal insect-trapping adhesive when insect trap 1310D is in use and cover the adhesive and dead insects when trap portion 1314C is being removed and replaced. In some embodiments, an array of pivoting slats (not shown) positioned in front of opening 1368D in front plate 1370D and configured to open and close together may replace shade 1386D.

Figure 52:
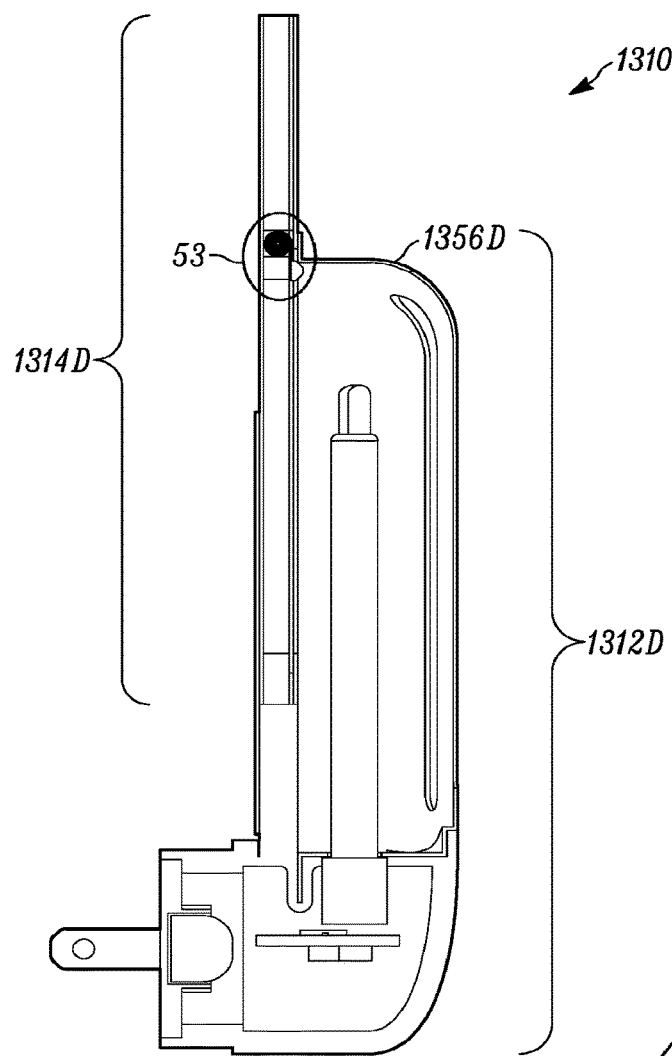
FIG. 52 is a cross-sectional view of the insect trap of FIG. 50.
Figure 53:
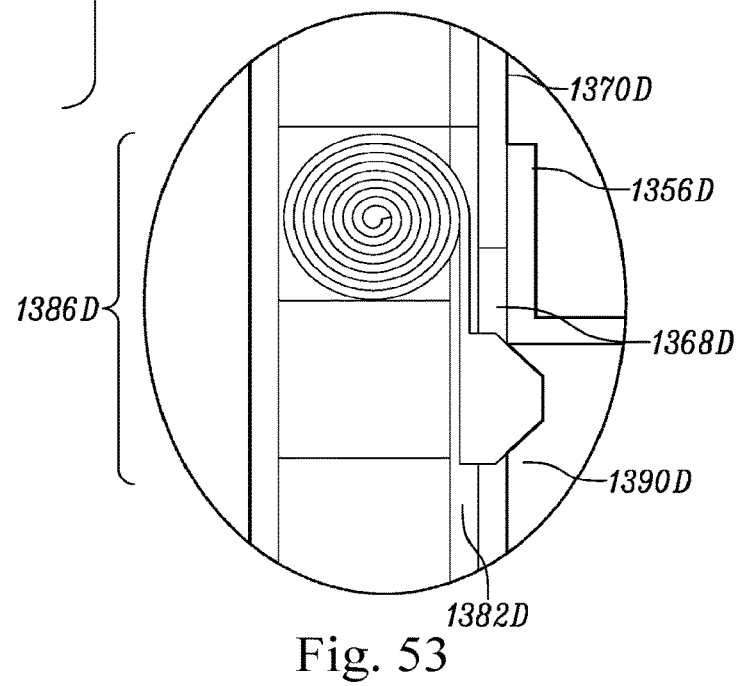
FIG. 53 is an enlarged view of a portion of FIG. 52.

FIG. 52 is a cross-sectional view of insect trap 1310D, and FIG. 53 is an enlarged portion of FIG. 52. Insect trap 1310D includes a removable trap portion 1314D and a base portion 1312D with a housing 1356D. Trap portion 1314D is shown partially removed from base portion 1312D in this view. Knob 1390D of shade 1386D is configured to engage with housing 1356D and to lower proximal end 1382D of shade 1386D, thereby covering the insect-attracting adhesive and dead insects trapped on the adhesive when trap portion 1314D is removed from base portion 1312D. Knob 1390D also prevents shade 1386D from being lowered below bottom edge of opening 1368D of front plate 1370D. In some embodiments, knob 1390D may also be configured to engage with housing 1356D and to raise proximal end 1382D of shade 1386D, thereby exposing the adhesive when trap portion 1314D is mounted in base portion 1312D, as well as to prevent shade 1386D from being raised below top edge of opening 1368D of front plate 1370D. Accordingly, shade 1386D of trap portion 1314D automatically closes when trap portion 1314D is removed from base portion 1312D, thereby preventing the user from touching the insect-trapping adhesive and from seeing or touching dead insects while removing and replacing trap portion 1314D.

Figure 54:
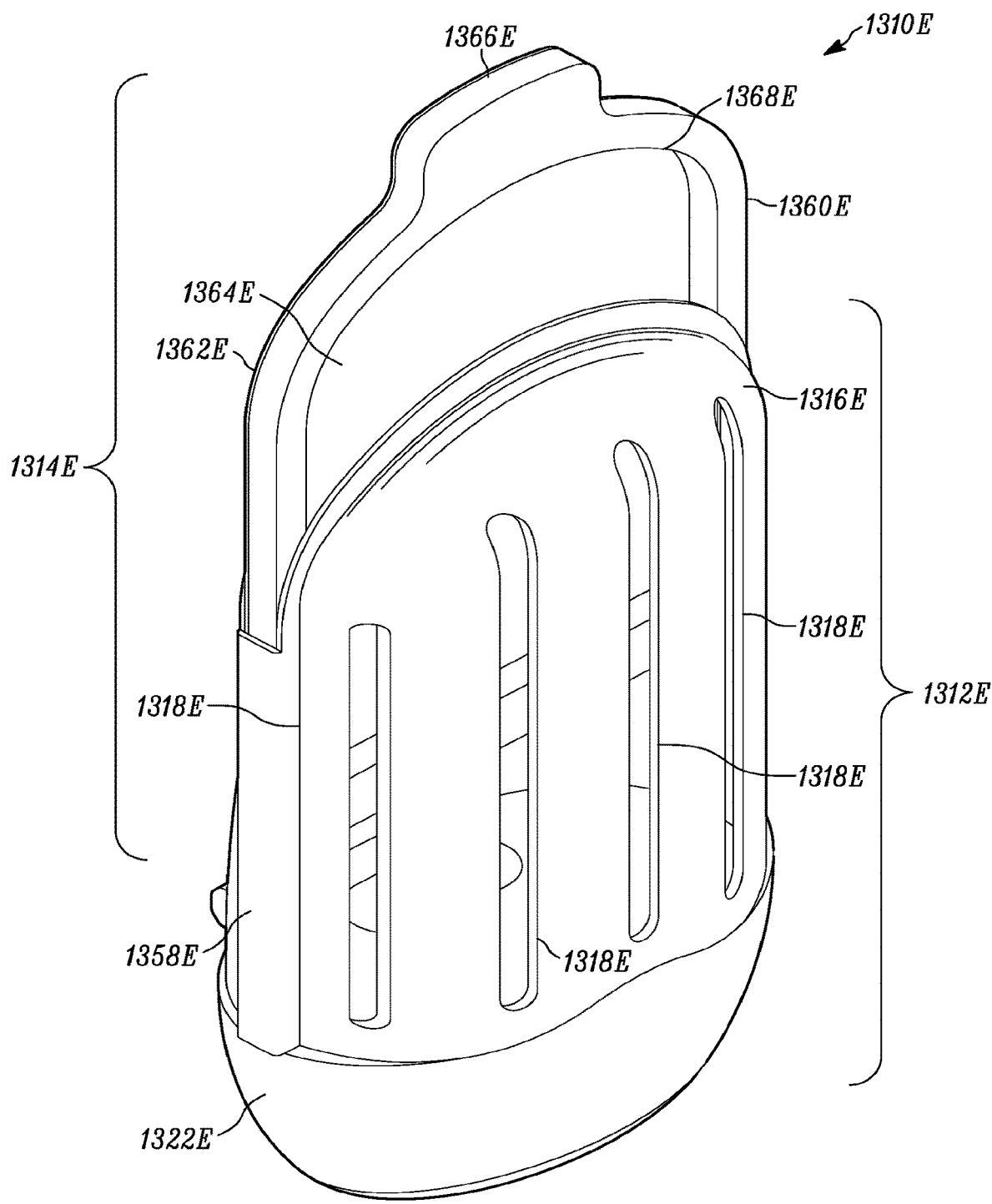
FIG. 54 is a front perspective view of an example of the thirteenth embodiment of an insect trap in accordance with the principles of the disclosure.
Figure 55:
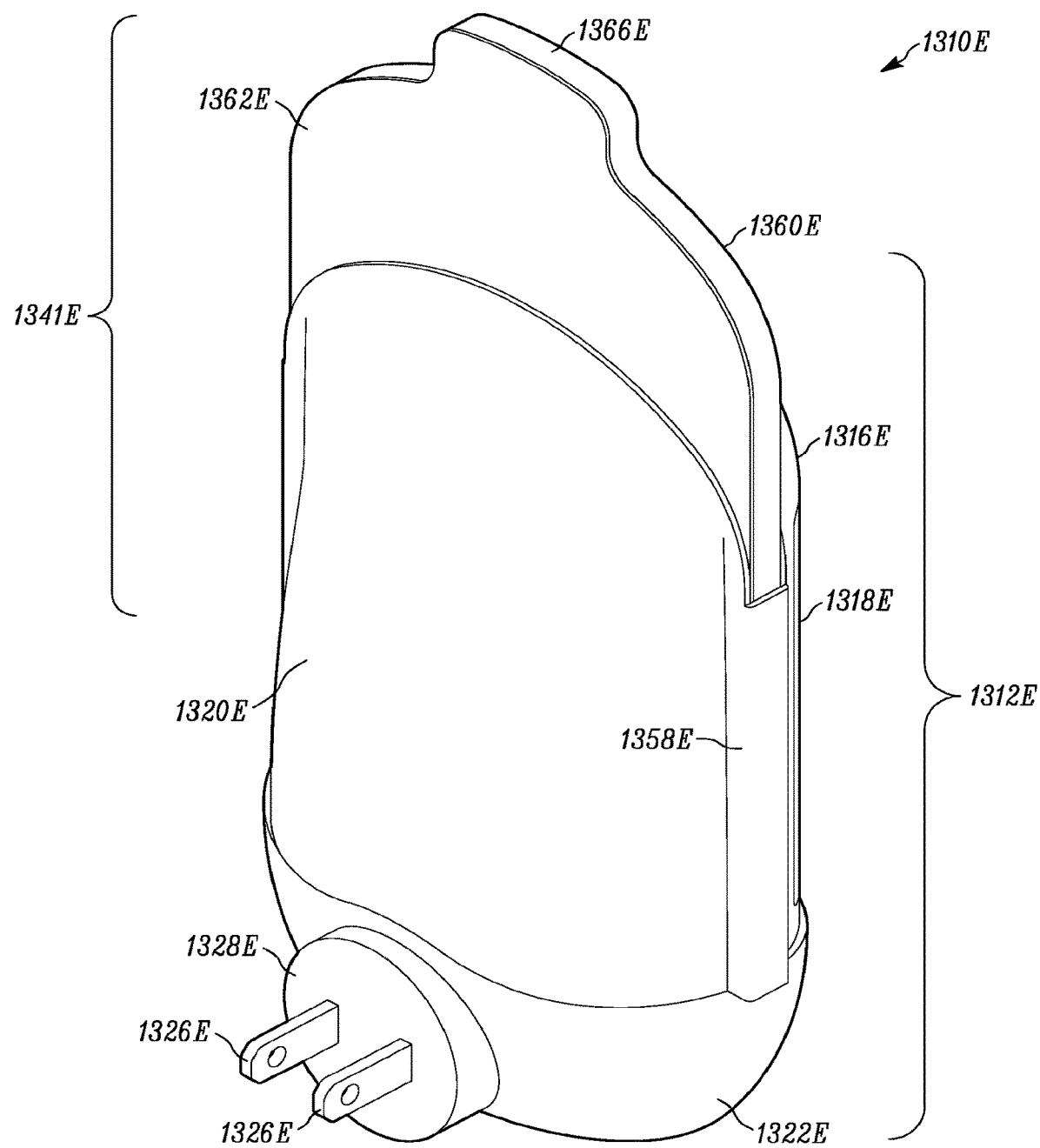
FIG. 55 is rear perspective view of the insect trap of FIG. 54.

FIG. 54 is a front perspective view and FIG. 55 is a rear perspective view of an example of the thirteenth embodiment of an insect trap, indicated generally at 1310E. Insect trap 1310E includes a base portion 1312E and a removable trap portion 1314E. Trap portion 1314E is shown partially removed from base portion 1312E. Base portion 1312E includes a front portion 1316E with at least one opening 1318E, a rear portion 1320E, side channels 1358E between front portion 1316E and rear portion 1320E, and a bottom portion 1322E with a plurality of electrically conductive prongs 1326E protruding from its rear surface 1328E. Side channels 1358E are adapted to receive trap portion 1314E and guide it into place when trap portion 1314E is mounted in base portion 1312E. Trap portion 1314E includes a frame 1360E and a membrane 1362E with a coating of insect-trapping adhesive on its front surface 1364E. Frame 1360E includes a tab 1366E and at least one opening 1368E. Tab 1366E is configured to protrude above housing 1356E when trap portion 1314E is mounted in base portion 1312E. Membrane 1362E is mounted to frame 1360E such that front surface 1364E of membrane 1362E is recessed within frame 1360E and the coating of adhesive is exposed through opening 1368E in frame 1360E. As shown, frame 1360E surrounds the entire periphery of membrane 1362E, although frame 1360E may surround only a portion (e.g., one, two or three sides) of the periphery of membrane 1362E. Membrane 1362E may be constructed from transparent or translucent materials such as paper, paperboard or plastic. Frame 1360E may be of varying thickness and may be made of a variety of sheet materials including corrugated cardboard, polystyrene foam and paperboard, as well as of molded or thermoformed plastic. Trap portion 1314E may be removed from base portion 1312E by grasping and lifting tab 1366E. Trap portion 1314E is mounted in base portion 1312E by grasping tab 1366E, inserting trap portion 1314E into side channels 1358E and lowering trap portion 1314E into place.

Figure 56:
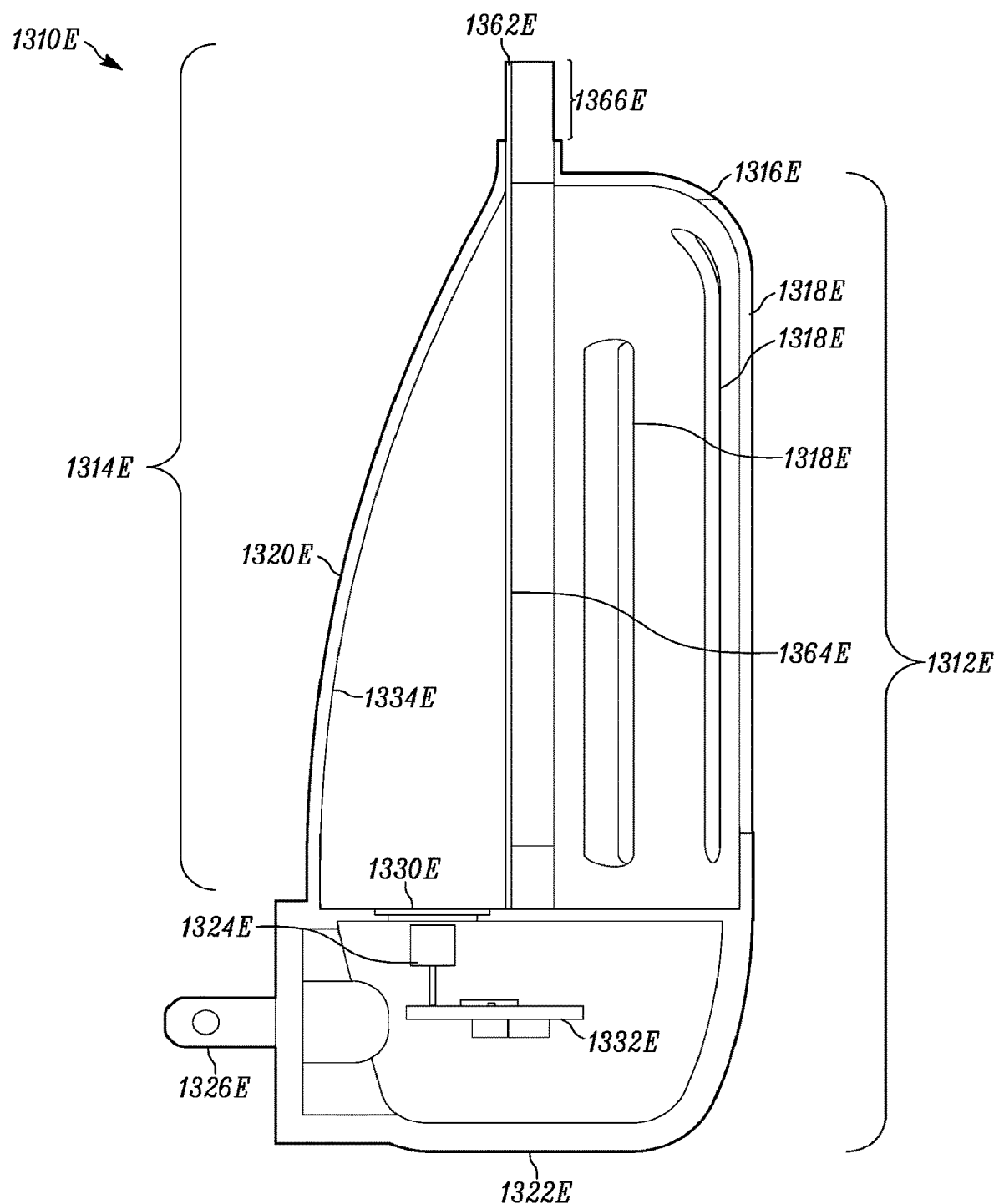
FIG. 56 is a cross-sectional view of the insect trap of FIG. 54.

FIG. 56 is a cross-sectional view of insect trap 1310E. Bottom portion 1322E of base portion 1312E includes an opening 1330E, a circuit board 1332E electrically connected to conductive prongs 1326E, only one of which is shown, and a lighting element such as one or more LEDs 1324E, only one of which is shown. For clarity, not all electrical connections are shown. Circuit board 1332E includes electronic circuitry to receive ordinary household current from conductive prongs 1326E, only one of which is shown, and provide power to illuminate LEDs 1324E. Trap portion 1314E is held between rear portion 1320E of base portion 1312E and front portion 1316E of base portion 1312E by side channels 1358E (not shown in this view). Rear portion 1320E of base portion 1312E includes an inside surface 1334E configured to reflect light from LEDs 1324E and direct it toward membrane 1362E of trap portion 1314E. In some embodiments, rear portion 1320E includes a window (not shown) positioned adjacent to membrane 1362E of trap portion 1314E when trap portion 1314E is mounted in base portion 1312E, to protect LEDs 1324E and inside surface 1334E of rear portion 1320E from dust and insect debris when trap portion 1314E is removed from base portion 1312E.

In the operation of insect trap 1310E, conductive prongs 1326E are inserted into a wall electrical socket. LEDs 1324E emit light, which transmits through opening 1330E bottom portion 1322E, onto inside surface 1334E of rear portion 1320E, and is reflected onto membrane 1362E of trap portion 1314E. A portion of light from LEDs 1324E emits directly onto membrane 1362E. The light transmits through membrane 1362E and adhesive on front surface 1364E and then through opening 1318E in front portion 1316E and into the area where insect trap 1310E is installed. Insects are attracted to the light transmitted through adhesive and through opening 1318E, and fly or crawl through opening 1318E and onto adhesive, where they become trapped. The user may observe trapped insects by looking through opening 1318E. When a sufficient number of insects have been trapped, the user may easily remove trap portion 1314E by grasping tab 1366E and lifting trap portion 1314E out of base portion 1312E and may discard the entire used trap portion 1314E without touching trapped insects, insect debris or adhesive, and replace it with a new trap portion 1314E. The new trap portion 1314E has fresh adhesive-coated surfaces, ensuring that insect trap 1310E will continue to efficiently and effectively attract and trap insects.

Figure 57:
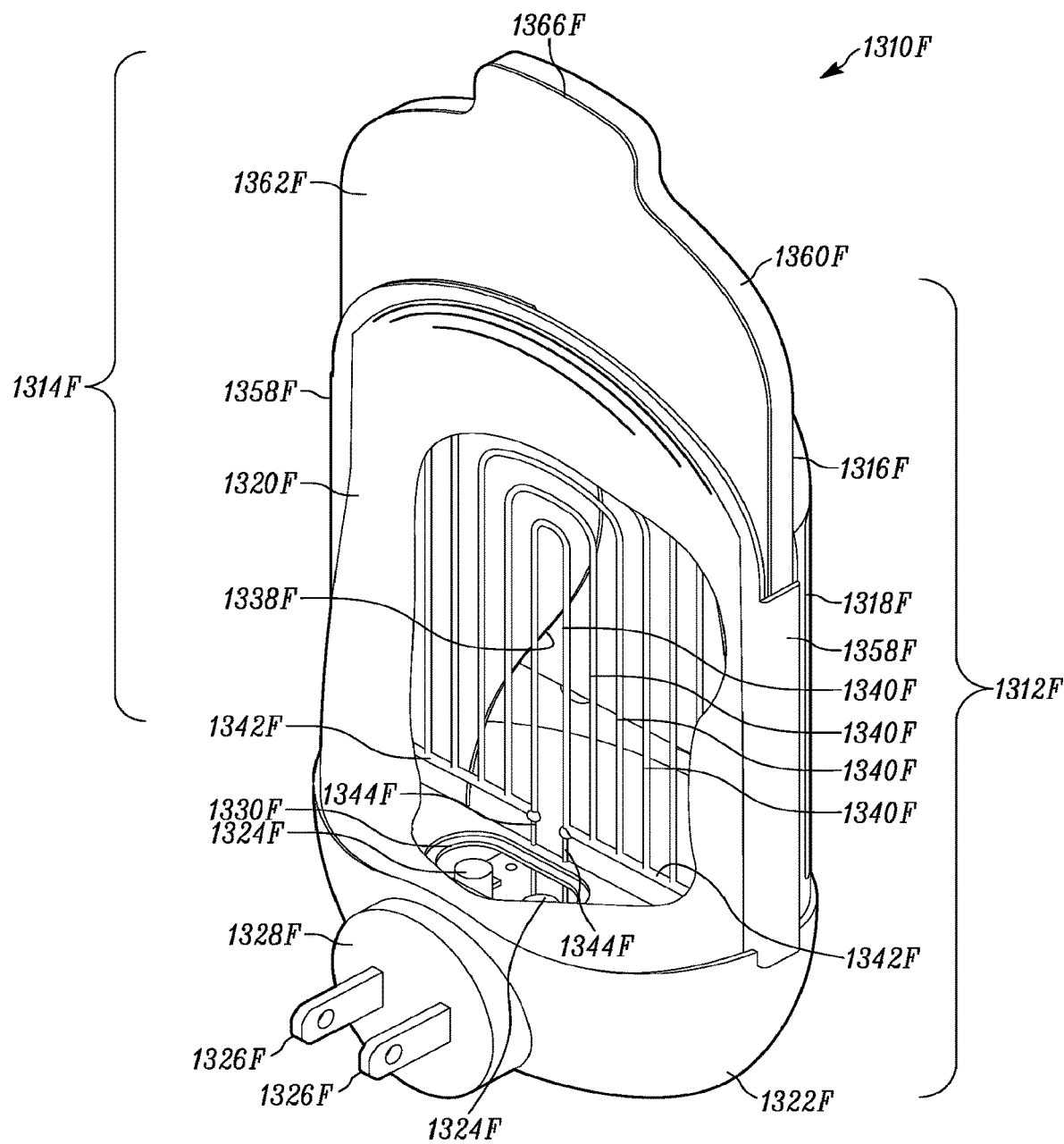
FIG. 57 is a rear perspective view of an example of the thirteenth embodiment of an insect trap in accordance with the principles of the disclosure.

FIG. 57 is a rear perspective view of an example of the thirteenth embodiment of an insect trap, indicated generally at 1310F. Insect trap 1310F includes a base portion 1312F and a removable trap portion 1314F. Base portion 1312F includes a front portion 1316F with at least one opening 1318F, a rear portion 1320F, side channels 1358F between front portion 1316F and rear portion 1320F, and a bottom portion 1322F with an opening 1330F, a lighting element such as one or more LEDs 1324F, and a plurality of electrically conductive prongs 1326F protruding from its rear surface 1328F. Rear portion 1320F includes a window 1338F that protects LEDs 1324F from dust and insect debris when trap portion 1314F is removed from base portion 1312F. Window 1338F is shown partially cut away in this view. On a rear surface of window 1338F is a heating element such as one or more heating wires 1340F mounted on its rear surface. Heating wires 1340F may be configured in a uniform pattern to produce heat in response to electric power. Heating wires 1340F are connected to a plurality of busses 1342F, which, in turn, are electrically connected to a corresponding plurality of connecting wires 1344F. In some embodiments, connecting wires 1344F are electrically connected to busses 1342F with solder. In some embodiments, heating wires 1340F may be made of resistance wires glued or otherwise affixed to the rear surface of window 1338F in a uniformly-spaced pattern and configured to produce heat in response to electric current. In some embodiments, heating wires 1340F may be of conductive polymer or other conductive material applied directly to the rear surface of window 1338F. In some embodiments, heating wires 1340F may be of a self-correcting conductive polymer or other self-correcting conductive material that increases its internal resistance at higher temperatures and transfers electrical power from warmer regions to cooler ones, thereby improving temperature uniformity across heating wires 1340F and window 1338F. In some embodiments busses 1342F may be made of highly conductive metal such as copper. In some embodiments, heating wires 1340F and busses 1342F both may be made of conductive polymer. In some embodiments, heating wires 1340F may be of a transparent or translucent material. In some embodiments, heating wires 1340F are replaced by a thin, transparent layer of metal oxide (not shown) on the rear surface of window 1338F that is electrically connected at opposite sides of the rear surface of window 1338F and produces heat in response to electric current. In general, the heat generated may increase and maintain the temperature of at least a portion of adhesive to between approximately 30 degrees C. and 45 degrees C., and to preferably between approximately 33 degrees C. and 42 degrees C., in order to mimic the skin and body temperatures of mammals. In some embodiments, heat alone or heat and scent alone are used as an attractant, and light sources are not used in insect trap 1310F.

Side channels 1358F are adapted to receive trap portion 1314F and guide it into place when trap portion 1314F is mounted in base portion 1312F. Trap portion 1314F includes a frame 1360F and a membrane 1362F. Frame 1360F includes a tab 1366F, configured to protrude above housing 1356F when trap portion 1314F is mounted in base portion 1312F. Membrane 1362F may be constructed from transparent or translucent materials such as paper, paperboard or plastic. Frame 1360F may be of varying thickness and may be made of a variety of sheet materials including corrugated cardboard, polystyrene foam and paperboard, as well as of molded or thermoformed plastic. Trap portion 1314F may be removed from base portion 1312F by grasping and lifting tab 1366F. Trap portion 1314F is mounted in base portion 1312F by grasping tab 1366F, inserting trap portion 1314F into side channels 1358F and lowering trap portion 1314F into place.

Figure 58:
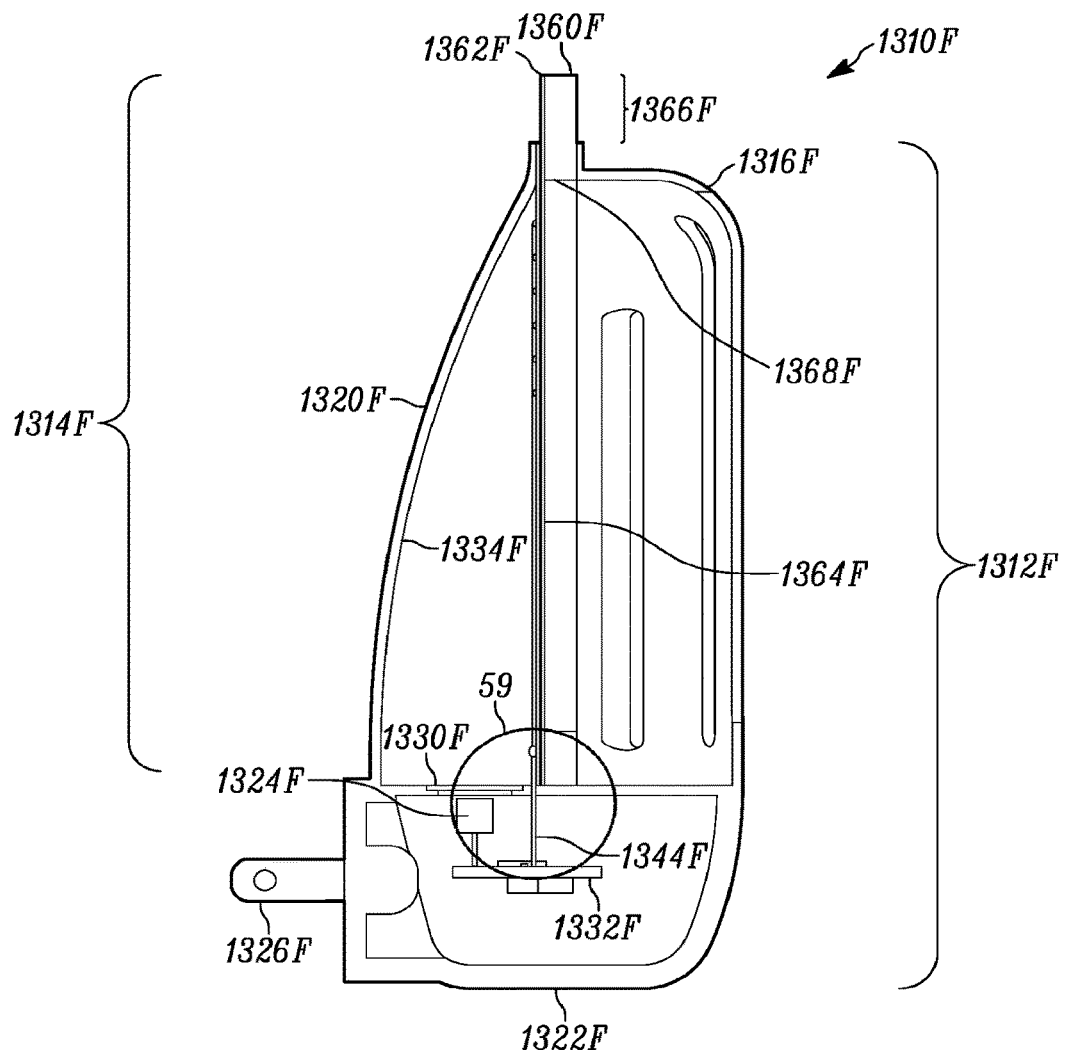
FIG. 58 is a cross-sectional view of the insect trap of FIG. 57.
Figure 59:
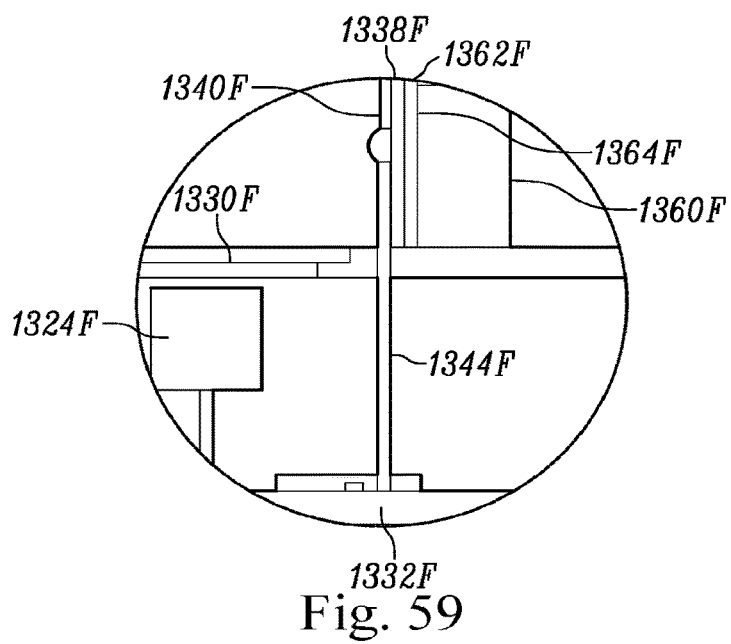
FIG. 59 is an enlarged view of a portion of FIG. 58.

FIG. 58 is a cross-sectional view of insect trap 1310F, and FIG. 59 is an enlarged view of a portion of FIG. 58. Bottom portion 1322F of base portion 1312F includes a circuit board 1332F electrically connected to conductive prongs 1326F, only one of which is shown, LEDs 1324F, only one of which is shown, and connecting wires 1344F, only one of which is shown. For clarity, not all electrical connections are shown. Circuit board 1332F includes electronic circuitry to receive ordinary household current from conductive prongs 1326F and provide power to illuminate LEDs 1324F, which emit light, and to connecting wires 1344F, which, in turn, provide power to buses 1342F (not shown in this view), which, in turn, provide power to heating wires 1340F. Trap portion 1314F is held between rear portion 1320F of base portion 1312F and front portion 1316F of base portion 1312F by side channels 1358F (not shown in this view). Frame 1360F includes an opening 1368F. Membrane 1362F includes a front surface 1364F with a coating of insect-trapping adhesive. Membrane 1362F is mounted to frame 1360F such that front surface 1364F of membrane 1362F is recessed within frame 1360F and the coating of adhesive is exposed through opening 1368F in frame 1360F. As shown, frame 1360F surrounds the entire periphery of membrane 1362F, although frame 1360F may surround only a portion (e.g., one, two or three sides) of the periphery of membrane 1362F. Rear portion 1320F of base portion 1312F includes an inside surface 1334F configured to reflect light from LEDs 1324F and direct it toward membrane 1362F of trap portion 1314F.

In the operation of insect trap 1310F, conductive prongs 1326F are inserted into a wall electrical socket, LEDs 1324F emit light, and heating wires 1340F generate heat and warm window 1338F, which warms membrane 1362F, which, in turn, warms adhesive. In some embodiments, circuit board 1332F is configured to monitor the current through connecting wires 1344F and respond to temperature-related changes in resistance through heating wires 1340F by increasing or decreasing voltage through heating wires 1340F, thereby warming adhesive to a steady, uniform temperature. Light from LEDs 1324F transmits through opening 1330F in base portion 1312F, onto inside surface 1334F of rear portion 1320F, and is reflected onto membrane 1362F of trap portion 1314F. A portion of light from LEDs 1324F emits directly onto membrane 1362F. The light transmits through membrane 1362F and adhesive on front surface 1364F and through opening 1318F in front portion 1316F and into the area where insect trap 1310F is installed. Insects are attracted to the light and heat transmitted through the adhesive, and fly or crawl through opening 1318F and onto the adhesive, where they become trapped. The user may observe trapped insects by looking through opening 1318F. When a sufficient number of insects have been trapped, the user may easily remove trap portion 1314F by grasping tab 1366F and lifting trap portion 1314F out of base portion 1312F and may discard the entire used trap portion 1314F without touching trapped insects, insect debris or adhesive, and replace it with a new trap portion 1314F. The new trap portion 1314F has fresh adhesive-coated surfaces, ensuring that insect trap 1310F will continue to efficiently and effectively attract and trap insects.

Figure 60:
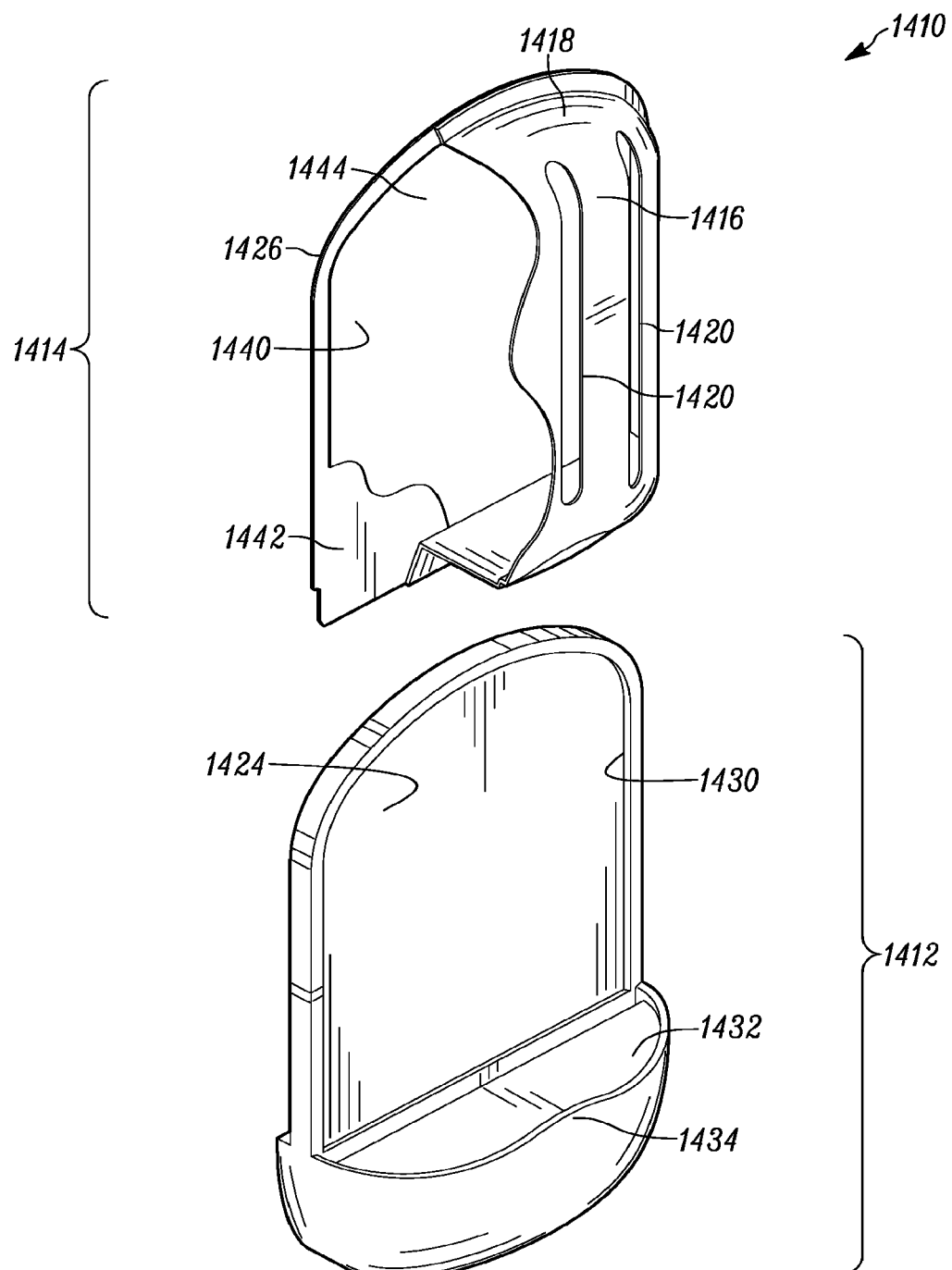
FIG. 60 is a front perspective view of a fourteenth embodiment of an insect trap in accordance with principles of the disclosure.

FIG. 60 is a front perspective view of a fourteenth embodiment of an insect trap, indicated generally at 1410. Insect trap 1410 includes a base portion 1412 and a removable trap portion 1414. Trap portion 1414 is shown partially cut away and removed from base portion 1412 in this view. Insect trap 1410 may have an overall length, an overall width and an overall depth, and may be configured such that when insect trap 1410 is mounted to a wall, its overall depth, defined by the overall distance insect trap 1410 protrudes from the wall, is the smallest of the three overall dimensions. Base portion 1412 includes a top surface 1432, at least one light source 1424 and at least one opening 1430, through which light source 1424 is exposed.

In some embodiments, light source 1424 uses electroluminescent (EL) technology, although other lighting technologies or combination of lighting technologies may be adapted for use. In some embodiments, light source 1424 emits both UV and visible light. In some embodiments, light source 1424 emits both UV and blue light to better attract a wide variety of insect species. In some embodiments, light source 1424 emits a combination of wavelengths to mimic sunlight. In some embodiments, light source 1424 emits infrared (IR) light to better attract certain species of insects including mosquitos and fleas. On the perimeter of top surface 1432 may be an upwardly directed rim or protrusions 1434. Trap portion 1414 includes a front housing 1418 with at least one opening 1420 in a front surface 1416, and a transparent or translucent back plate 1426. Opening 1420 in front housing 1418 may be configured to admit a wide variety of insects into insect trap 1410, or alternatively it may be configured to admit one or more specific insect species. In some embodiments, opening 1420 is configured to prevent a user's fingers from penetrating opening 1420 and inadvertently touching trapped insects or adhesive when removing and replacing trap portion 1414. In some embodiments, opening 1420 has a size and shape such that a sphere 25 mm in diameter cannot pass through opening 1420, and has a size and shape such that a sphere 1 mm in diameter can pass through any portion of opening 1420. Opening 1420 may be of uniform or of varying width, shape and orientation, and if trap portion 1414 has more than one opening 1420, they may be of identical or of differing widths, shapes and orientations. Opening 1420 may be configured to attract one or more individual insect species or a variety of insect species. Front housing 1418 and back plate 1426 form an enclosure 1444. As shown, back plate 1426 is substantially planar, although it may have ribs or other features (not shown) that increase adhesive surface area and create regions of light/dark contrast, which are highly visible to a wide variety of insects and may be more attractive to them.

Back plate 1426 includes a front surface 1442, which may be coated with a transparent or translucent adhesive 1440. Back plate 1426 may also be configured to polarize light transmitted through it in an orientation similar to that of daylight to further attract flying insects, a wide variety of which are known to detect polarized light. In some embodiments, front housing 1418 is coated with transparent, translucent or opaque adhesive (not shown) on its inside surface (not shown) to provide additional insect trapping efficiency and capacity. In some embodiments, front housing 1418 may also have a reflective coating (not shown) underneath the adhesive coating on its inside surface to enhance its attraction to insects and further improve the insect trapping efficiency and effectiveness. In some embodiments, front housing 1418 and back plate 1426 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1418 and back plate 1426 are constructed by injection molding or by other suitable manufacturing techniques.

In some embodiments, front housing 1418 and back plate 1426 are joined together where they intersect or engage with an adhesive, although they may also be joined together by other commonly used packaging assembly techniques such as ultrasonic welding or RF sealing, or any other suitable assembly method. The materials of trap portion 1414 may also be impregnated with one or more insect attractants. For example, trap portion 1414 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cuelure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1410. Alternatively, the insect attractants may be embedded or contained in a separate piece (not shown) that may mount on an inside surface of enclosure 1444 or on front surface 1416 of front housing 1418 or through an opening in front housing 1418 or back plate 1426. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 1410.

Figure 61:
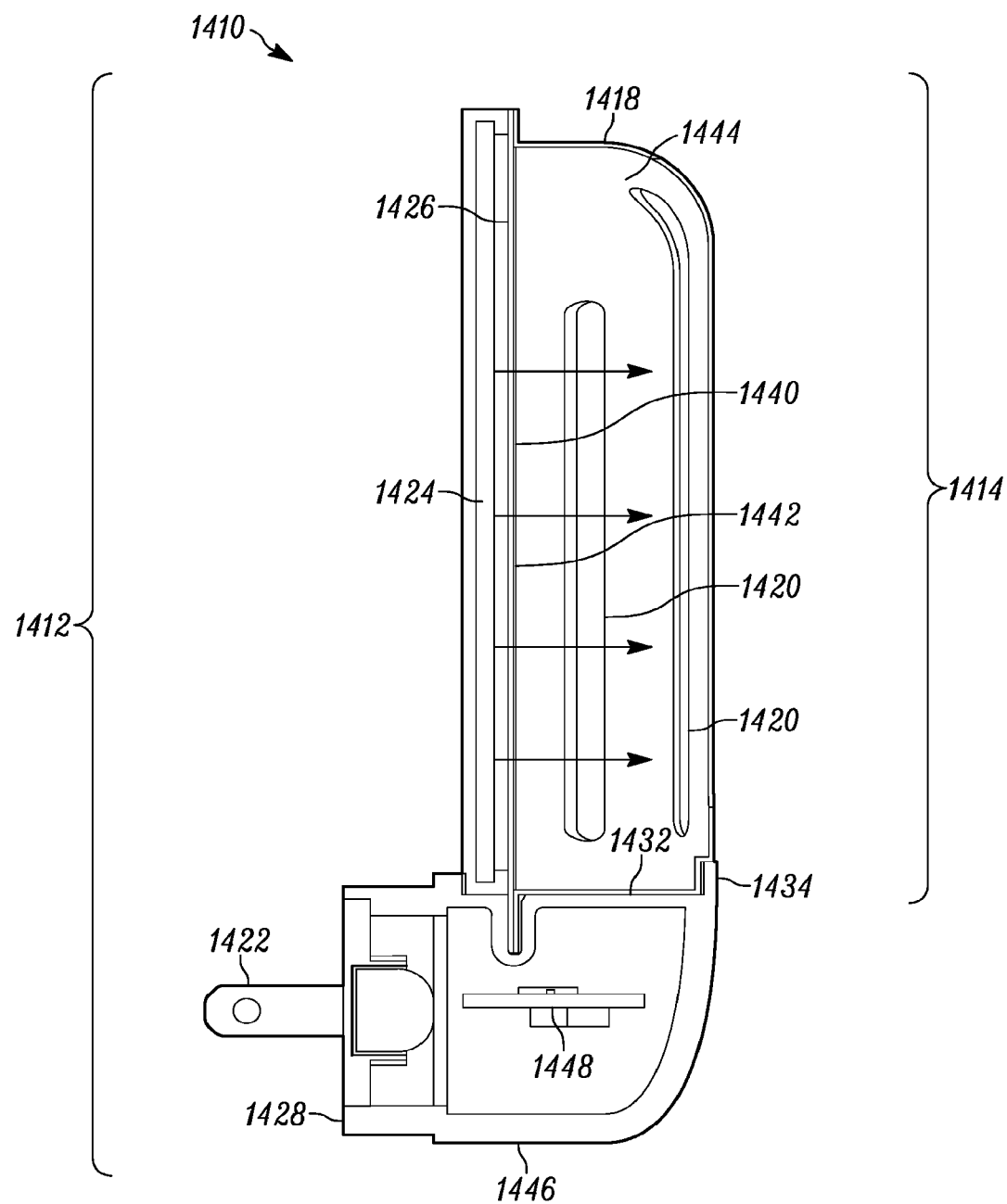
FIG. 61 is a cross-sectional view of the insect trap of FIG. 60.

FIG. 61 is a cross-sectional view of insect trap 1410. Protruding from a rear surface 1428 of base portion 1412 are a plurality of electrically conductive prongs 1422 (only one of which is shown), adapted to mount insect trap 1410 to a wall and provide power to insect trap 1410 by inserting conductive prongs 1422 into a standard household electrical wall socket. Alternatively, conductive prongs 1422 may be adapted to swivel to allow insect trap 1410 to remain upright when conductive prongs 1422 are inserted into a horizontally oriented electrical wall socket. Alternatively, base portion 1412 may be configured to sit or hang wherever desired and receive power from batteries (not shown) mounted in base portion 1412. While an electrical socket and batteries have been described as providing power to insect trap 1410, any suitable power source may be used. In some embodiments, base portion 1412 includes a circuit board 1448 having a programmable processor or chip (not shown) for executing commands, electrically connected to conductive prongs 1422 (only one of which is shown) and light source 1424. For clarity, however, not all of the electrical connections are shown. Circuit board 1448 may include electronic circuitry to receive ordinary household current from conductive prongs 1422 and provide power to illuminate light source 1424. Circuit board 1448 may include an energy stabilizer such as a full wave rectifier circuit or any other circuit that provides steady voltage to light source 1424, although it may also provide a varying voltage to light source 1424 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1448 may provide power to light source 1424 to provide both UV and/or visible and/or IR light, although it may be configured to provide power to only the UV light source 1424 or to only the visible light source 1424 or to only the IR light source, or to provide variable power to produce combinations of flickering UV and/or visible and/or IR light. Circuit board 1448 may also be configured to drive a transmitter or transceiver such as a piezoelectric speaker (not shown) or other device that may be mounted in base portion 1412 to emit an insect-attracting sound. In some embodiments, the transmitter of transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1410. It is desirable for such insect-attracting sound to be undetectable by a human beyond approximately a 1-meter distance from insect trap 1410. Circuit board 1448 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1412 and into trap portion 1414, to attract some insect species, including fleas and mosquitoes. Alternatively, at least one of light source 1424 may generate heat, to replace or augment the heat generated by the one or more electrical elements. In general, the heat generated may increase and maintain the temperature of at least a portion of trap portion 1414 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, rim or protrusions 1434 on top surface 1432 of base portion 1412 engage with trap portion 1414 to secure it in place during use, although any other form of attachment may be substituted that allows trap portion 1414 to be securely but removably mounted on base portion 1412. Bottom surface 1446 of base portion 1412 may be substantially flat or concave to allow insect trap 1410 to sit upright on a floor, desk, table or shelf when insect trap 1410 is unplugged. Alternatively, bottom surface 1446 of base portion 1412 may have two or more protrusions (not shown) or legs that allow insect trap 1410 to sit upright when insect trap 1410 is unplugged.

In the operation of insect trap 1410, conductive prongs 1422 are inserted into a wall electrical socket, circuit board 1448 may provide current to light source 1424, and light source 1424 emits light, represented by arrows, which transmit directly onto and through back plate 1426, through adhesive 1440 on front surface 1442, and into enclosure 1444. In some embodiments, light is not manipulated in base portion 1412 and is emitted directly into trap portion 1414. In some embodiments, the light is further evenly distributed by the light-diffusing properties of back plate 1426, or adhesive 1440, or by a combination of the two.

Thereafter, a portion of the light entering enclosure 1444 continues through opening 1420 in front housing 1418 and into the surrounding area where insect trap 1410 is installed. Insects are attracted to the light transmitted through adhesive 1440 and through opening 1420, and fly or crawl into opening 1420 and onto adhesive 1440, where they become trapped. A user may observe trapped insects by looking through opening 1420 in front housing 1418. When a sufficient number of insects have been trapped, the user may easily remove and discard the entire trap portion 1414 without touching trapped insects, insect debris or adhesive, which remain out of reach inside trap portion 1414, and replace it with a new trap portion 1414. The new trap portion 1414 has fresh adhesive-coated surfaces, ensuring that insect trap 1410 will continue to efficiently and effectively attract and trap insects.

In some embodiments, insect trap 1410 is configured such that when insect trap 1410 is mounted to a wall, its overall depth, defined by the overall distance insect trap 1410 protrudes from the wall, is smaller than its overall height and its overall width.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1410 of this configuration may accommodate a variety of different trap portions 1414 that may be removably mounted to base portion 1412, each trap portion 1414 being uniquely configured to attract and trap a specific species or multiple species of insects. For example, the overall size and shape of trap portion 1414, and the size, shape, location and orientation of opening 1420 in front housing 1418 of trap portion 1414, may be uniquely configured to attract and trap a specific species or multiple species of flying insect. For example, in some embodiments, trap portion 1414 is approximately 20 mm to 600 mm wide, 20 mm to 600 mm high and 5 mm to 150 mm deep. In some embodiments, trap portion 1414 is approximately 20 mm to 200 mm wide, 20 mm to 200 mm high and 5 mm to 80 mm deep. In some embodiments, trap portion 1414 is approximately 20 mm to 130 mm wide, 20 mm to 130 mm high and 5 mm to 50 mm deep.

In some embodiments, base portion 1412 is approximately 20 mm to 600 mm wide, 10 mm to 150 mm high and 10 mm to 150 mm deep. In some embodiments, base portion 1412 is 20 mm to 200 mm wide, 10 mm to 100 mm high and 10 mm to 80 mm deep. In some embodiments, base portion 1412 is 20 mm to 130 mm wide, 10 mm to 50 mm high and 10 mm to 50 mm deep.

As provided herein, opening 1420 may be a variety of shapes and/or sizes. For example, opening 1420 may be circular, square, rectangular, polygonal and/or elliptical in shape. Alternatively, opening 1420 may be slot shaped having a straight, curved or undulating shape or pattern. When opening 1420 is circular, opening 1420 may be approximately 0.5 mm to 30 mm in diameter. In some embodiments, circular opening 1420 is approximately 0.5 mm to 20 mm in diameter. In some embodiments, circular opening 1420 is approximately 0.5 mm to 15 mm in diameter. When opening 1420 is slot shaped, opening 1420 may be approximately 2 mm to 30 mm wide and 5 mm to 500 mm long. In some embodiments, slot shaped opening 1420 is approximately 2 mm to 20 mm wide and 5 mm to 200 mm long. In some embodiments, slot shaped opening 1420 is approximately 2 mm to 15 mm wide and 5 mm to 100 mm long.

In some embodiments, opening 1420 covers all or a portion of front housing 1418. For example, opening 1420 may cover a range of approximately 1% to 75% of the surface area of front housing 1418. In some embodiments, opening 1420 covers approximately 5% to 50% of the surface area of front housing 1418. In some embodiments, opening 1420 covers approximately 10% to 30% of the surface area of front housing 1418.

Figure 62:
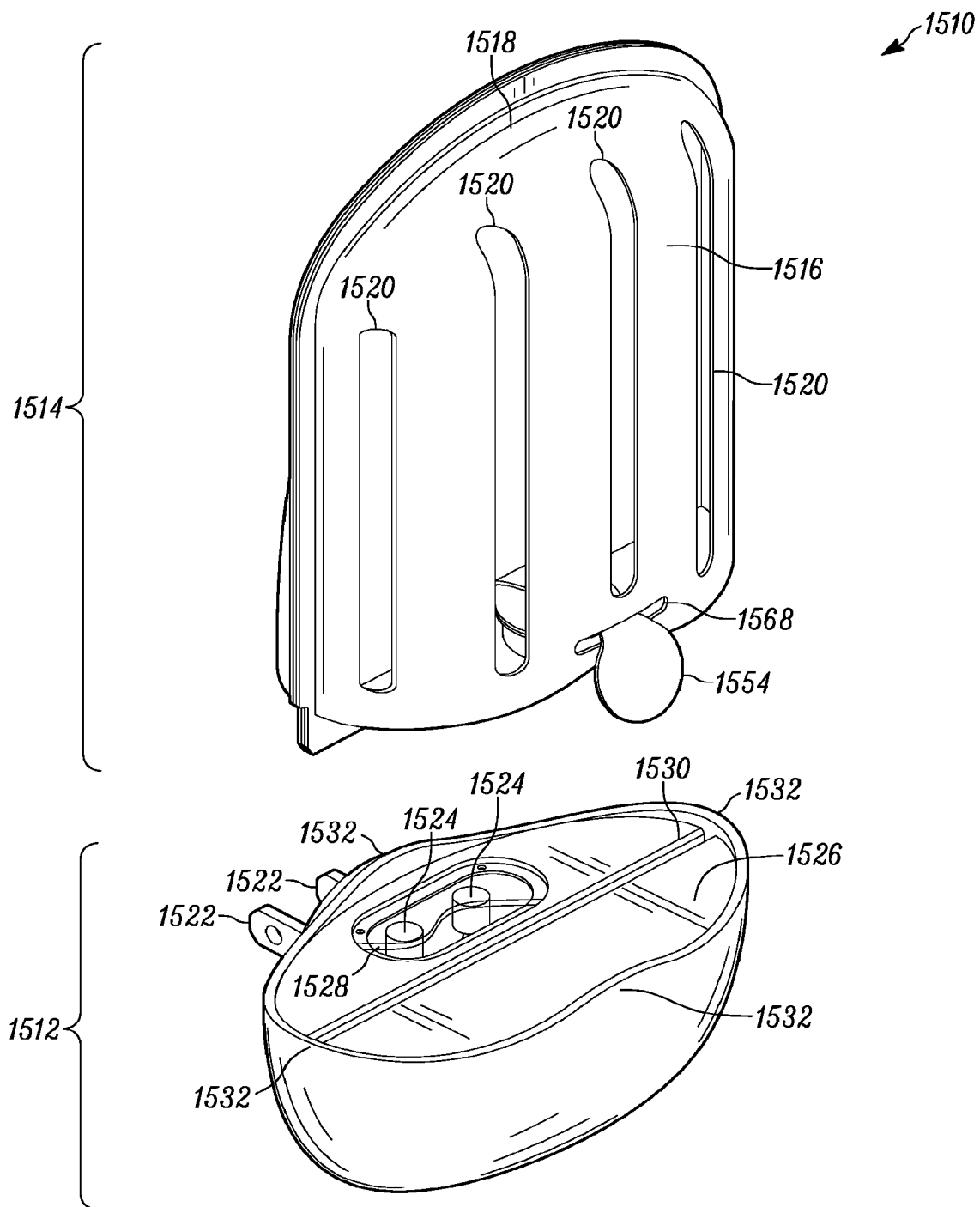
FIG. 62 is a front perspective view of a fifteenth embodiment of an insect trap in accordance with principles of the disclosure.

FIG. 62 is a front perspective view of a fifteenth embodiment of an insect trap, indicated generally at 1510. Insect trap 1510 includes a base portion 1512 and a removable trap portion 1514. Trap portion 1514 is shown removed from base portion 1512 in this view. Insect trap 1510 may have an overall length, an overall width and an overall depth, and may be configured such that when insect trap 1510 is mounted to a wall, its overall depth, defined by the overall distance insect trap 1510 protrudes from the wall, is the smallest of the three overall dimensions. Trap portion 1514 includes a front housing 1518 with a tab slot 1568 and at least one opening 1520 in a front surface 1516. Trap portion 1514 may have an overall length, an overall width and an overall depth, and may be configured such that when trap portion 1514 is mounted in insect trap 1510, and insect trap 1510 is mounted to a wall, the overall depth of trap portion 1514, which is measured in the direction perpendicular to the wall, is the smallest of the three overall dimensions of trap portion 1514. Opening 1520 in front housing 1518 may be configured to admit a wide variety of insects into insect trap 1510, or alternatively it may be configured to admit one or more specific insect species. In some embodiments, opening 1520 is configured to prevent user's fingers from penetrating opening 1520 and inadvertently touching trapped insects or adhesive when removing and replacing trap portion 1514. In some embodiments, opening 1520 has a size and shape such that a sphere 25 mm in diameter cannot pass through opening 1520, and has a size and shape such that a sphere 1 mm in diameter can pass through any portion of opening 1520. Opening 1520 may be of uniform or of varying width, shape and orientation, and if trap portion 1514 has more than one opening 1520, they may be of identical or of differing widths, shapes and orientations. Opening 1520 may be configured to attract one or more individual insect species or a variety of insect species. As shown, protruding from tab slot 1568 in front housing 1518 in trap portion 1514 is a grip end 1562 of a removable tab 1554. Protruding from a rear surface 1572 (shown in FIG. 65) of base portion 1512 are a plurality of electrically conductive prongs 1522, adapted to mount insect trap 1510 to a wall and provide power to insect trap 1510 by inserting conductive prongs 1522 into a standard household electrical wall socket. Alternatively, conductive prongs 1522 may be adapted to swivel to allow insect trap 1510 to remain upright when conductive prongs 1522 are inserted into a horizontally oriented electrical wall socket. Alternatively, base portion 1512 may be configured to sit or hang wherever desired and receive power from batteries (not shown) mounted in base portion 1512. While an electrical socket and batteries have been described as providing power to insect trap 1510, any suitable power source may be used. Base portion 1512 includes a top surface 1526 and at least one LED 1524. In some embodiments, LED 1524 includes at least one that emits ultraviolet (UV) light and at least one that emits visible light. In some embodiments, LED 1524 includes at least one that emits UV light and at least one that emits blue light to better attract a wide variety of insect species. In some embodiments, the lighting element emits a combination of wavelengths to mimic sunlight. In some embodiments, LED 1524 includes at least one that emits IR light to better attract certain species of insects including mosquitos and fleas. Mounted in top surface 1526 of base portion 1512 may be a transparent or translucent window 1528, shown partially cut away to reveal LED 1524. Window 1528 protects LED 1524 from dust and insect debris, and allows base portion 1512 to be easily cleaned. In top surface 1526 may be a slot 1530, and on the perimeter of the top surface 1526 is a rim or upwardly directed protrusions 1532.

Figure 63:
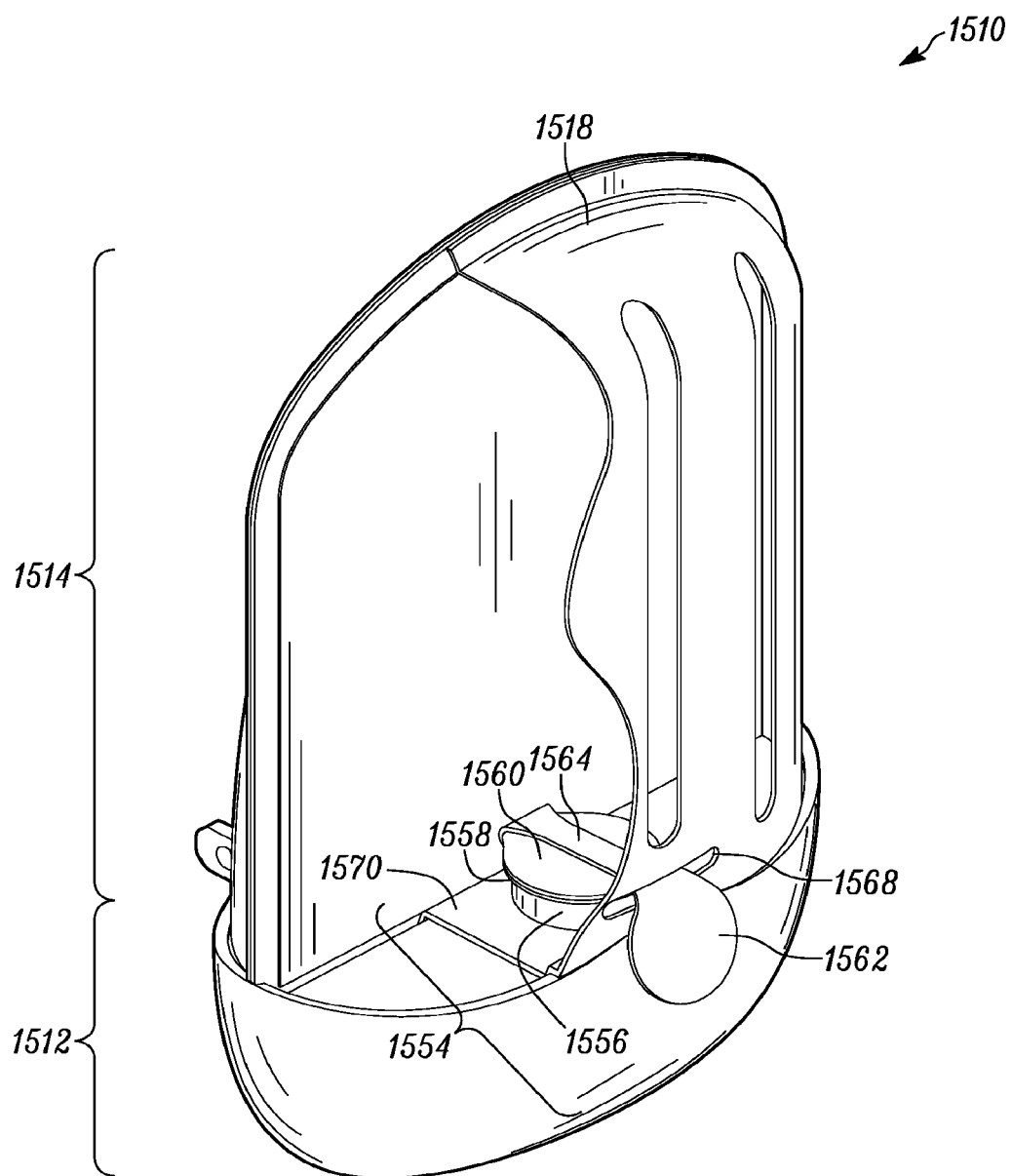
FIG. 63 is a front perspective view of the insect trap of FIG. 62.

FIG. 63 is a front perspective view of insect trap 1510. Insect trap 1510 is shown partially cut away in this view. As shown, an upwardly-facing cup 1556 is mounted on a bottom inside surface 1570 of front housing 1518. Cup 1556 may have a lip 1558 protruding from the perimeter of its open end. Cup 1556 may be constructed of any material or combination of materials that act as a barrier to any of the insect-attracting substances mentioned herein. Removable tab 1554 may have a sealing end 1560 and a web 1564 between grip end 1562 and sealing end 1560, and may be constructed of any flexible and durable material or combination of materials that act as a barrier to any of the insect-attracting substances mentioned herein. As shown, sealing end 1560 is configured to cover the open end of cup 1556, and may be affixed to lip 1558 with an adhesive to create an airtight seal, thereby maintaining the freshness of any insect-attracting substances (not shown) inside cup 1556, as well as holding removable tab 1554 in place until it is removed by a user. Web 1564 may be folded over sealing end 1560 of removable tab 1554 and extend to tab slot 1568 of front housing 1518. Grip end 1562 of removable tab 1554 protrudes through tab slot 1568 and may be folded downwards over an outside portion of front housing 1518.

Figure 64:
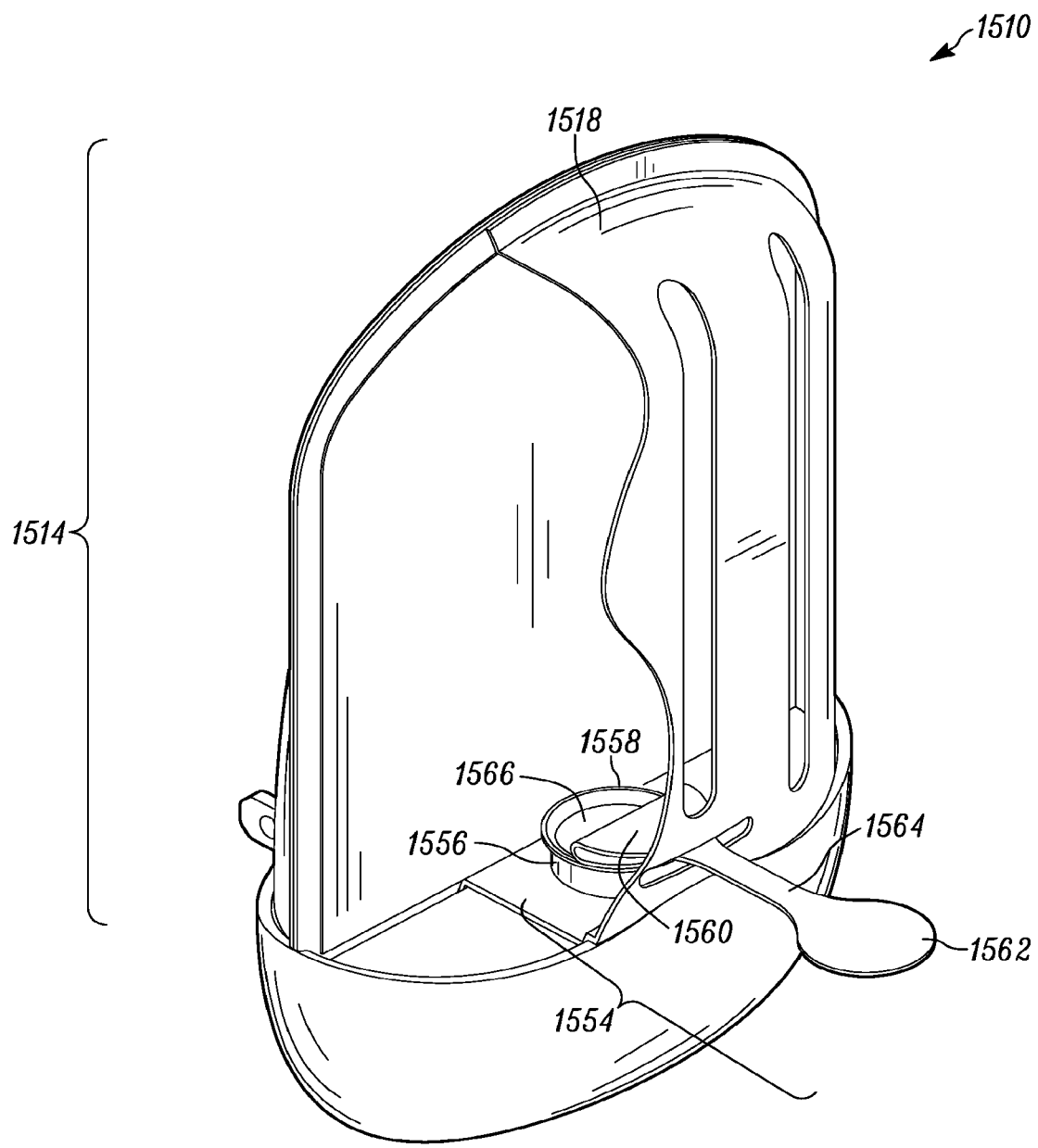
FIG. 64 is a front perspective view of the insect trap of FIG. 62.

FIG. 64 is a front perspective view of insect trap 1510. Trap portion 1514 is shown partially cut away and removable tab 1554 partially removed in this view. A user may grasp removable tab 1554 at grip end 1562 and pull removable tab 1554 away from trap portion 1514, and thereby breaking the seal between lip 1558 of cup 1556 and sealing end 1560 of removable tab 1554. Inside cup 1556 is a carrier material 1566 impregnated with one or more insect-attracting substances. Carrier material 1566 inside cup 1556 may be a solid, a liquid, a gel, or any combination thereof. For example, carrier material 1566 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of the insect trap. Alternatively, carrier material 1566 may be impregnated with water in addition to, or in place of, the one or more insect-attracting substances, as water vapor is a known mosquito attractant. Alternatively, other insect attractants such sugar solution, molasses, or honey may be embedded in carrier material 1566 in addition to, or in place of, the one or more insect-attracting substances. Alternatively, a combination of live yeast, sugar, and water, which can produce mosquito-attracting carbon dioxide, may be embedded in carrier material 1566 in addition to, or in place of, the one or more insect-attracting substances. Alternatively, the insect-attracting substances may be contained in cup 1556 without a carrier material 1566. Breaking the seal between cup 1556 and sealing end 1560 of removable tab 1554 releases the insect-attracting scent or scents through opening 1520 of front housing 1518 and into the surrounding area where insect trap 1510 is installed. It is desirable for such attractants to be detectable by an insect for approximately a 2-meter radius from insect trap 1510.

Figure 65:
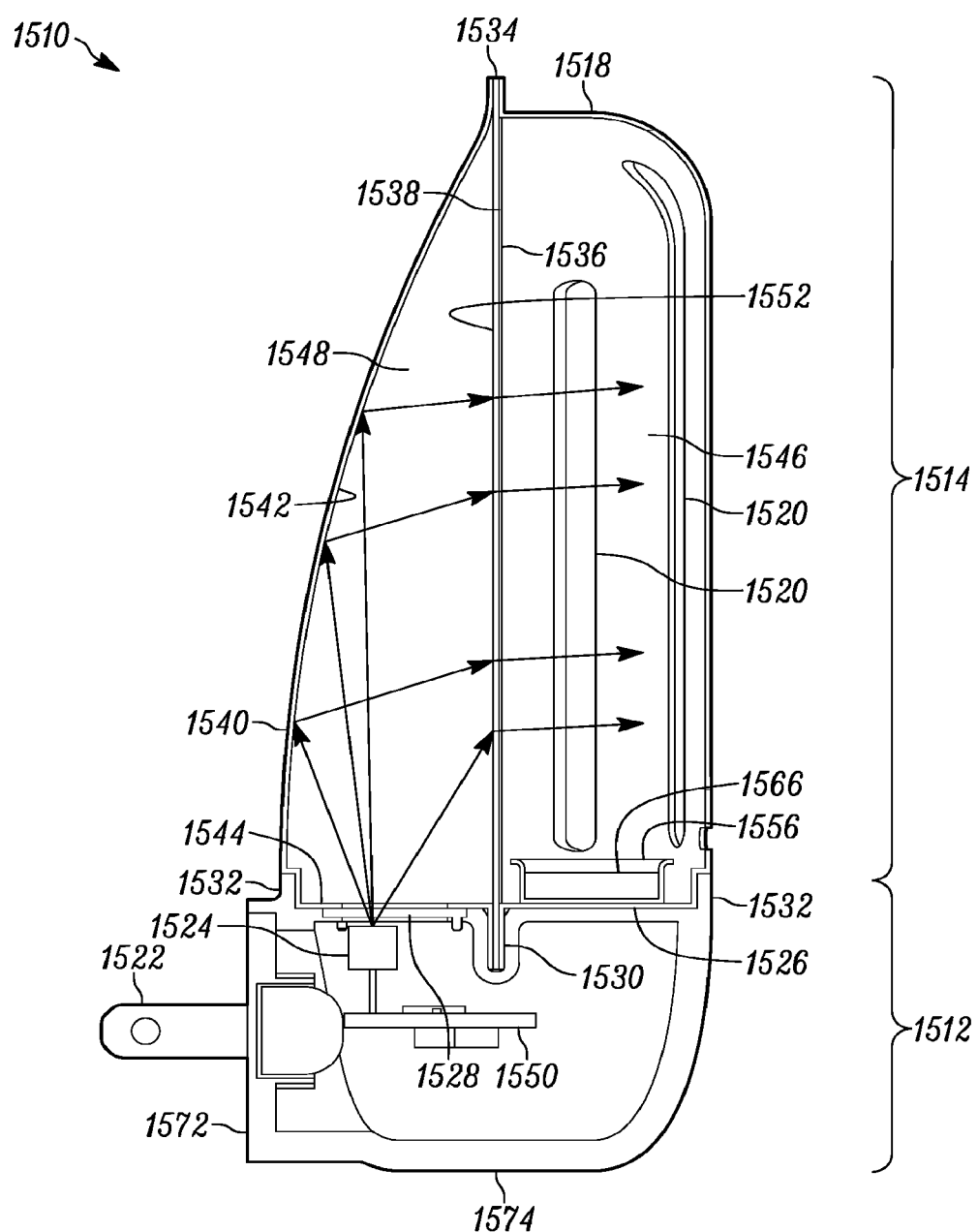
FIG. 65 is a cross-sectional view of the insect trap of FIG. 62.

FIG. 65 is a cross-sectional view of insect trap 1510. Removable tab 1554 (not shown) has been completely removed in this view. Trap portion 1514 includes a divider 1534 with a front surface 1538, and a rear housing 1540 with an inside surface 1542. In some embodiments, divider 1534 is constructed from or includes a transparent or translucent material and may be coated with a transparent or translucent adhesive 1536 on front surface 1538. In some embodiments, divider 1534 may also be configured to polarize light transmitted through it in an orientation similar to that of daylight to further attract flying insects, a wide variety of which are known to detect polarized light. In some embodiments, the material and thickness of divider 1534 and the material and thickness of adhesive 1536 are selected to transmit a substantial proportion of the UV and/or visible and/or IR light, for example greater than 60% of the light is transmitted through divider 1534 and adhesive 1536. In some embodiments, inside surface 1542 of rear housing 1540 has a reflective coating. Alternatively, the material and surface finish of rear housing 1540 may be configured to reflect and disperse UV and/or visible light without a reflective coating. Rear housing 1540 may include an opening 1544 on its bottom surface, or alternatively opening 1544 may be replaced by a transparent or translucent window (not shown).

In some embodiments, front housing 1518 and rear housing 1540 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1518 and rear housing 1540 are constructed by injection molding or by other suitable manufacturing techniques. As shown, divider 1534 has a rear surface 1552, and may be substantially planar, and may be configured to be parallel to, or at an angle to, the primary direction (not shown) of the light produced by LED 1524. In some embodiments, divider 1534 may be formed into a convex, concave or saddle-shaped contour (not shown), or a combination of contours to optimize the even distribution of light. In some embodiments, divider 1534 may have ribs or other features (not shown) that increase adhesive surface area and create regions of light/dark contrast, which are highly visible to a wide variety of insects and may be more attractive to them.

In some embodiments, front housing 1518 is coated with transparent, translucent or opaque adhesive (not shown) on its inside surface to provide additional insect trapping efficiency and capacity. In addition, front housing 1518 may also have a reflective coating (not shown) underneath the adhesive coating on its inside surface to enhance its attraction to insects and further improve the insect trapping efficiency and effectiveness. In some embodiments, front housing 1518, divider 1534 and rear housing 1540 are joined together at where they intersect or engage by ultrasonic welding or high frequency (HF) welding, although they may also be permanently or removably joined together by gluing or by any other suitable assembly method. The materials of trap portion 1514 (e.g., front housing 1518, rear housing 1540, divider 1534 and adhesive 1536) may also be impregnated with one or more insect attractants. Divider 1534 separates trap portion 1514 into a front enclosure 1546 and a rear enclosure 1548.

In some embodiments, base portion 1512 includes a circuit board 1550 having a programmable processor or chip (not shown) for executing commands, electrically connected to conductive prongs 1522 (only one of which is shown) and LED 1524. For clarity, however, not all of the electrical connections are shown. Circuit board 1550 may include electronic circuitry to receive ordinary household current from conductive prongs 1522 and provide power to illuminate LED 1524. Circuit board 1550 may include an energy stabilizer such as a full wave rectifier circuit or any other circuit that provides steady voltage to LED 1524, although it may also provide a varying voltage to LED 1524 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1550 may provide power to LED 1524 to provide UV and/or visible and/or IR light although it may be configured to provide power to only UV LED 1524 or to only visible light LED 1524 or to only IR LED 1524, or to provide variable power to produce combinations of flickering UV and/or visible and/or IR light. Circuit board 1550 may also be configured to drive a transmitter or transceiver such as a piezoelectric speaker (not shown) or other device that may be mounted in base portion 1512 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 1510. It is desirable for such insect-attracting sound to be undetectable by a human beyond approximately a 1-meter distance from insect trap 1510. Circuit board 1550 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1512 and into trap portion 1514, to attract some insect species, including fleas and mosquitoes. Alternatively, one or more of LED 1524 may generate heat, to replace or augment the heat generated by the one or more electrical elements. Alternatively, one or more of LED 1524 may be replaced or augmented by one or more incandescent light bulbs to generate both heat and light. In general, the heat generated may increase and maintain the temperature of at least a portion of trap portion 1514 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide. In some embodiments, heat alone or heat and scent alone are used as attractants, and light sources are not used in insect trap 1510.

As shown, slot 1530 in top surface 1526 of base portion 1512 and rim or protrusions 1532 on top surface 1526 of base portion 1512 engage with trap portion 1514 to secure it in place during use, although any other form of attachment may be substituted that may allow trap portion 1514 to be securely but removably mounted on base portion 1512. A bottom surface 1574 of the base portion 1512 may be substantially flat or concave to allow the insect trap 1510 to sit upright on a floor, desk, table or shelf when the insect trap 1510 is unplugged. Alternatively, the bottom surface 1574 of the base portion 1512 may have two or more protrusions (not shown) or legs that allow the insect trap 1510 to sit upright when the insect trap 1510 is unplugged.

In the operation of insect trap 1510, conductive prongs 1522 (only one of which is shown) are inserted into a wall electrical socket, and removable tab 1554 (not shown) is pulled from trap portion 1514 and removed, thereby breaking the seal between cup 1556 and removable tab 1554 and exposing carrier material 1566 and insect-attracting substance or substances to the air and releasing an insect-attracting scent or scents into trap portion 1514 and into the surrounding area where insect trap 1510 is installed. Cup 1556, carrier material 1566 and the insect-attracting substance or substances may be configured to release an insect-attracting scent or scents for a predetermined amount of time to correspond with the expected useful life of trap portion 1514, which may be e.g., a week, a month or three months. Alternatively, cup 1556, carrier material 1566 and the insect-attracting substance or substances may be configured to preferentially release one insect-attracting scent or group of scents earlier in the useful life of trap portion 1514 and another insect-attracting scent or group of scents later in the useful life of trap portion 1514 to attract more insects or a wider variety of insects with a changing scent, or to provide a stronger scent later in the useful life of trap portion 1514, to compensate for the reduced light emitted from trap portion 1514 when many insects are caught in adhesive 1536. Alternatively, cup 1556 and carrier material 1566 may be configured to release additional scents that may mask the insect-attracting scent or scents or mask or eliminate components of the insect-attracting scent or scents that humans may find objectionable, or that children or non-intended animals (e.g., pets) may find attractive, without substantially reducing their attractiveness to insects. LED 1524 emits light, represented by arrows, which transmits through window 1528 in base portion 1512, through opening 1544 in rear housing 1540 of trap portion 1514, into rear enclosure 1548, and directly onto inside surface 1542 of rear housing 1540 and rear surface 1552 of divider 1534. Because the light from LED 1524 enters rear enclosure 1548 through opening 1544 in a bottom face of rear housing 1540 (e.g., in a face that is substantially parallel to the overall depth of trap portion 1514), the light can travel the entire length of rear enclosure 1548 and can diverge over the entire length of rear enclosure 1548, and therefore can be more evenly distributed throughout rear enclosure 1548. In some embodiments, light is not manipulated in base portion 1512 and is emitted directly into trap portion 1514. Inside surface 1542 of rear housing 1540 may include a concave shape and may be configured to reflect and disperse the UV and visible light from LED 1524 to distribute the light evenly onto rear surface 1552 of divider 1534, although inside surface 1542 of rear housing 1540 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the light (e.g., evenly, according to specific patterns, at a focal point, etc.) onto rear surface 1552 of divider 1534, may be mounted to rear housing 1540 at or near opening 1544 or to base portion 1512 at or near window 1528, and may replace or augment the role of inside surface 1542 of rear housing 1540. In some embodiments, the light from LED 1524 may directly strike rear surface 1552 of divider 1534 at an oblique angle (e.g., an acute angle from approximately 0° to 90°) and be spread across divider 1534, and may replace or augment the role of inside surface 1542 of rear housing 1540 or of the lens or lenses mounted to rear housing 1540.

Thereafter, light transmits through divider 1534 and adhesive 1536 on front surface 1538, and into front enclosure 1546. Light may be further evenly distributed by the light-diffusing properties of divider 1534, adhesive 1536 on front surface 1538, or both. A portion of the light entering front enclosure 1546 continues through opening 1520 in front housing 1518 and is emitted into the surrounding area where insect trap 1510 is installed. Insects are attracted to the light emitted through adhesive 1536 and through opening 1520 in front housing 1518. Insects are also attracted to the scents and/or pheromones released from carrier material 1566 in cup 1556. In addition, heat generated by circuit board 1550 may warm carrier material 1566, and may thereby increase the release of insect-attracting scents and/or pheromones. Insects fly or crawl into opening 1520 and onto adhesive 1536, where they become trapped. A user may observe trapped insects by looking through opening 1520 in front housing 1518. When a sufficient number of insects have been trapped, the user may easily remove and discard the entire used trap portion 1514 without touching trapped insects, insect debris or adhesive, which remain out of reach inside trap portion 1514, and replace it with a new trap portion 1514. The new trap portion 1514 has fresh adhesive-coated surfaces and light-directing surfaces, ensuring that insect trap 1510 will continue to efficiently and effectively attract and trap insects.

In some embodiments, because trap portion 1514 mounts on top of, and not in front of, base portion 1512, insect trap 1510 protrudes minimally from the wall when plugged into an ordinary household wall socket, and therefore intrudes minimally into the home environment. In some embodiments, insect trap 1510 is configured such that when insect trap 1510 is mounted to a wall, its overall depth, defined by the overall distance insect trap 1510 protrudes from the wall, is smaller than its overall height and its overall width.

It should be appreciated that a benefit of insect trap 1510 is the manipulation of light within trap portion 1514. In some embodiments, light manipulation occurs solely within trap portion 1514. Light manipulation may include reflection, refraction, polarization, dispersion and/or diffusion and is achieved by engaging with a manipulative element or surface (e.g., inside surface 1542, divider 1534 and adhesive 1536). In some embodiments, light manipulation produces an even distribution of light on adhesive 1536. In some embodiments, light is manipulated to produce a predetermined pattern on adhesive 1536 or within trap portion 1514, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1510 of this configuration may accommodate a variety of different trap portions 1514 that may be removably mounted to base portion 1512, each trap portion 1514 being uniquely configured to attract and trap a specific species or multiple species of flying or non-flying insect. For example, the overall size and shape of trap portion 1514, the size, shape, location and orientation of opening 1520 in front housing 1518 of trap portion 1514, and the scent or scents impregnated in carrier material 1566, front housing 1518, divider 1534, adhesive 1536 or rear housing 1540, may be uniquely configured to attract and trap a specific species or multiple species of flying insect.

For example, in some embodiments, trap portion 1514 is approximately 20 mm to 600 mm wide, 20 mm to 600 mm high and 5 mm to 150 mm deep. In some embodiments, trap portion 1514 is approximately 20 mm to 200 mm wide, 20 mm to 200 mm high and 5 mm to 80 mm deep. In some embodiments, trap portion 1514 is approximately 20 mm to 130 mm wide, 20 mm to 130 mm high and 5 mm to 50 mm deep.

In some embodiments, base portion 1512 is approximately 20 mm to 600 mm wide, 10 mm to 150 mm high and 10 mm to 150 mm deep. In some embodiments, base portion 1512 is 20 mm to 200 mm wide, 10 mm to 100 mm high and 10 mm to 80 mm deep. In some embodiments, base portion 1512 is 20 mm to 130 mm wide, 10 mm to 50 mm high and 10 mm to 50 mm deep.

As provided herein, opening 1520 may be a variety of shapes and/or sizes. For example, opening 1520 may be circular, square, rectangular, polygonal and/or elliptical in shape. Alternatively, opening 1520 may be slot shaped having a straight, curved or undulating shape or pattern. When opening 1520 is circular, opening 1520 may be approximately 0.5 mm to 30 mm in diameter. In some embodiments, circular opening 1520 is approximately 0.5 mm to 20 mm in diameter. In some embodiments, circular opening 1520 is approximately 0.5 mm to 15 mm in diameter. When opening 1520 is slot shaped, opening 1520 may be approximately 2 mm to 30 mm wide and 5 mm to 500 mm long. In some embodiments, slot shaped opening 1520 is approximately 2 mm to 20 mm wide and 5 mm to 200 mm long. In some embodiments, slot shaped opening 1520 is approximately 2 mm to 15 mm wide and 5 mm to 100 mm long.

In some embodiments, opening 1520 covers all or a portion of front housing 1518. For example, opening 1520 may cover a range of approximately 1% to 75% of the surface area of front housing 1518. In some embodiments, opening 1520 covers 5 approximately 5% to 50% of the surface area of front housing 1518. In some embodiments, opening 1520 covers approximately 10% to 30% of the surface area of front housing 1518.

Figure 66:
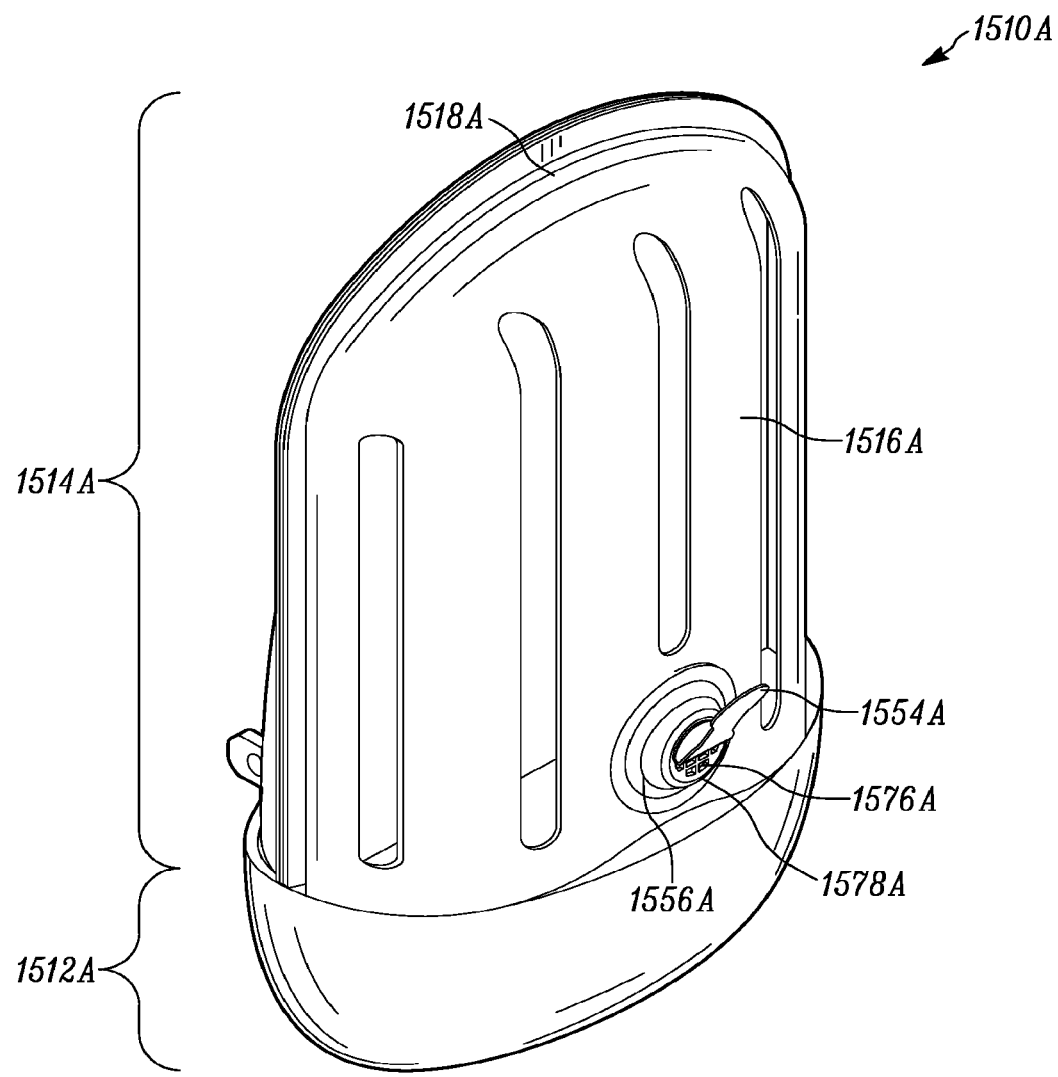
FIG. 66 is a front perspective view of an example of the fifteenth embodiment of an insect trap in accordance with the principles of the disclosure.

It should be appreciated that a variety of configurations to store and deliver insect-attracting substances are contemplated. FIG. 66 is a front perspective view of an example of the fifteenth embodiment of an insect trap, indicated generally at 1510A. As shown, insect trap 1510A includes a base portion 1512A and a trap portion 1514A. Trap portion 1514A includes a front housing 1518A with a cap 1556A attached to its front surface 1516A. Cap 1556A and front surface 1516A of front housing 1518A form an enclosure (not shown) containing a carrier material (not shown) impregnated with one or more insect-attracting substances (not shown). Alternatively, cap 1556A may be sealed on its back surface (not shown) by a membrane (not shown) of foil or other barrier material. Cap 1556A includes openings 1576A through its front surface 1578A, and a removable tab 1554A configured to cover openings 1576A is affixed to front surface 1578A with an adhesive to create a seal. Removing tab 1554A from cap 1556A releases the insect-attracting substances into the room where insect trap 1510A is installed. An added benefit of this configuration is that the carrier material (not shown), which is visible to the user, may be formulated to change color when the insect-attracting substances are depleted, thereby providing a visual cue indicating that the trap portion 1514A should be removed and replaced with a fresh one.

Figure 67:
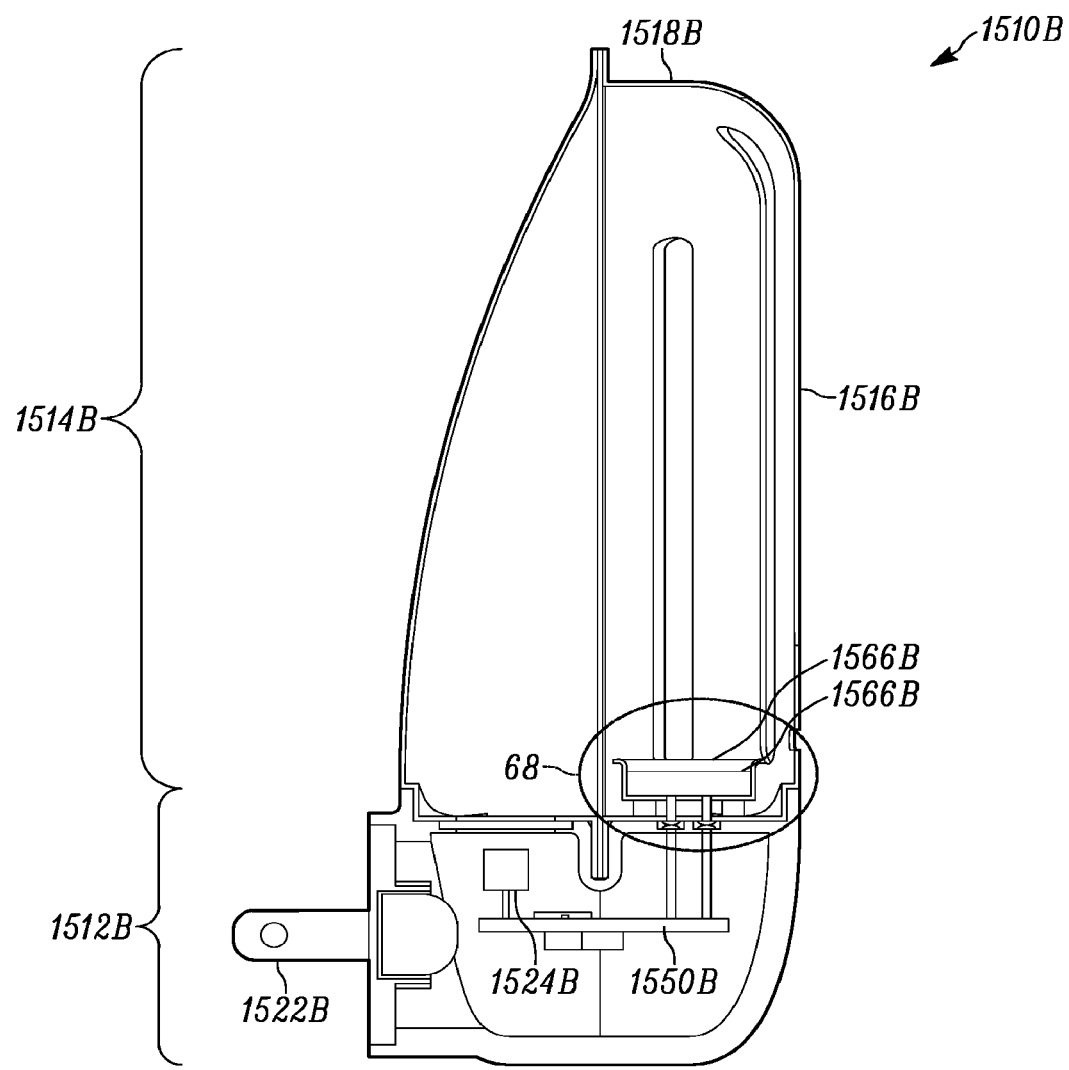
FIG. 67 is a front perspective view of an example of the fifteenth embodiment of an insect trap in accordance with the principles of the disclosure.
Figure 68:
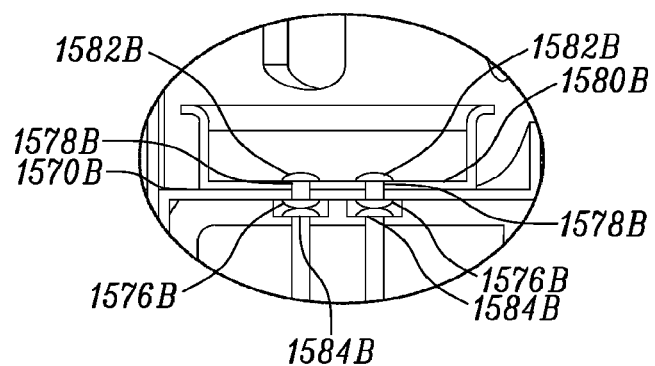
FIG. 68 is a cross-sectional view of the insect trap of FIG. 67.

Other configurations are contemplated that provide a visual cue indicating that the insect-attracting substances are depleted. FIG. 67 is a cross-sectional view of an example of the fifteenth embodiment of an insect trap, indicated generally at 1510B, and FIG. 68 is an enlarged view of a portion of FIG. 67. As shown, insect trap 1510B includes a base portion 1512B and a removable trap portion 1514B. Trap portion 1514B includes a front housing 1518B with a bottom inside surface 1570B, an upwardly-facing cup 1556B mounted on bottom inside surface 1570B of front housing 1518B, a plurality of electrical trap contacts 1576B and a plurality of electrical trap wires 1578B. Cup 1556B contains a carrier material 1566B impregnated with one or more insect-attracting substances (not shown). Alternatively, cup 1556B may contain one or more insect-attracting substances and not a carrier material 1566B. On an inside bottom surface 1580B of cup 1556B are a plurality of electrodes 1582B that contact carrier material 1566B. Trap wires 1578B are electrically connected to electrodes 1582B and trap contacts 1576B. A removable tab that seals the open end of cup 1556B has been removed in this view. Base portion 1512B includes a plurality of electrically conductive prongs 1522B (only one of which is shown), at least one LED 1524B, a plurality of electrical base contacts 1584B, and a circuit board 1550B having a programmable processor or chip (not shown) for executing commands and electrically connected to conductive prongs 1522B, LED 1524B and base contacts 1584B. For clarity, however, not all of the electrical connections are shown. While two sets of base contacts 1584B, trap contacts 1576B, trap wires 1578B and electrodes 1582B are shown, any suitable number of sets may be used. Base contacts 1584B are configured to provide an electrical connection with their corresponding trap contacts 1576B when trap portion 1514B is removably mounted to base portion 1512B. Circuit board 1550B may include electronic circuitry to receive ordinary household current from conductive prongs 1522B, provide power to LED 1524B, and provide power to base contacts 1584B, which, in turn, provide power to trap contacts 1576B, when trap portion 1514B is removably mounted to base portion 1512B.

In use, as the insect attracting substances (not shown) evaporate from carrier material 1566B, the electrical resistance of carrier material 1566B changes. Circuit board 1550B is configured to monitor the electrical resistance across electrodes 1582B. In some embodiments, circuit board 1550B is configured to measure the resistance across electrodes 1582B by maintaining a constant voltage across electrodes 1582B and measuring the resulting current across electrodes 1582B. In some embodiments, circuit board 1550B is configured to measure the resistance across electrodes 1582B by maintaining a constant current across electrodes 1582B and measuring the resulting voltage across electrodes 1582B. In some embodiments, circuit board 1550B is configured to signal that the insect-attracting substances are depleted by causing LED 1524B to flash on and off when the resistance across electrodes 1582B exceeds or drops below a threshold value. Alternatively, circuit board 1550B may be configured to cause LED 1524B to flash on and off when the rate of change in resistance (e.g., the change in resistance over an established period of time) across electrodes 1582B exceeds or drops below a threshold value. Alternatively, circuit board 1550B may be configured to cause LED 1524B to flash on and off when the resistance across electrodes 1582B increases by a threshold value above, or decreases by a threshold value below the resistance measured when trap portion 1514B was mounted to base portion 1512B (e.g., when insect-attracting substances impregnated in carrier material 1566B were fresh). Alternatively, circuit board 1550B may be configured to respond to a changes in or threshold values of capacitance across electrodes 1582B, or changes in or threshold values of impedance across electrodes 1582B, or changes in or threshold values of any other measurable electrical property that is affected by the depletion of insect-attracting substances, or of carrier material 1566B, or of both. Alternatively, circuit board 1550B may be configured to signal that the insect-attracting substances are depleted by causing a speaker (not shown) such as a piezoelectric speaker to create an audible noise such as a beeping sound, or to change the color of the visible light illuminating insect trap 1510B by illuminating a different colored LED 1524B, or by any other configuration or combination of configurations providing a visual and/or audible signal or signals.

Figure 69:
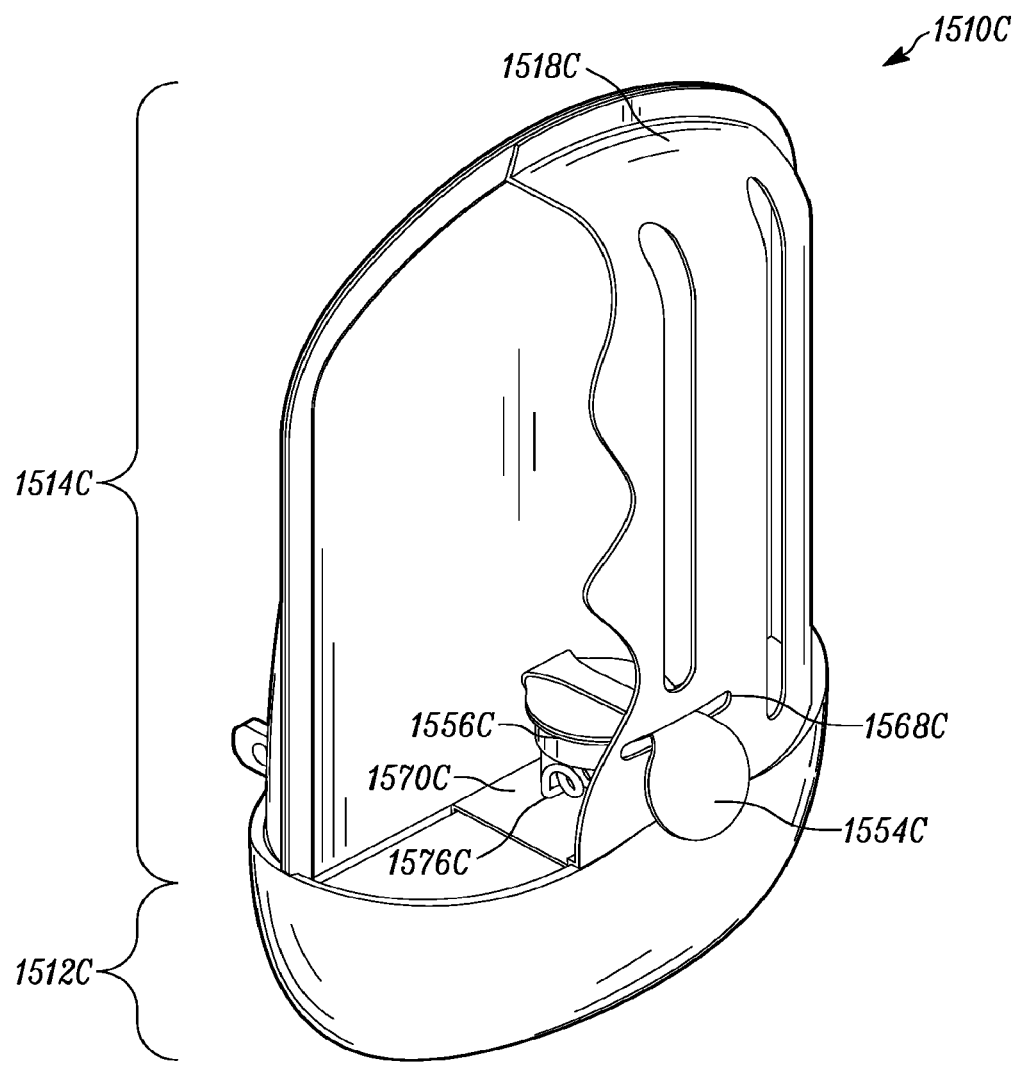
FIG. 69 is a front perspective view of an example of the fifteenth embodiment of an insect trap in accordance with the principles of the disclosure.

In addition, the application of heat can enhance the release of insect-attracting substances. FIG. 69 is a front perspective view of an example of the fifteenth embodiment of an insect trap, indicated generally at 1510C. As shown, insect trap 1510C includes a base portion 1512C and a trap portion 1514C. Trap portion 1514C is shown partially cut away in this view. Trap portion 1514C includes a front housing 1518C with a front surface 1516C and a bottom inside surface 1570C, a tab slot 1568C in front surface 1516C, an upwardly facing cup 1556C holding a carrier material 1566C impregnated with one or more insect-attracting substances, a removable tab 1554C sealing its open end (not shown) and protruding through tab slot 1568C, and a heating element 1576C mounted on bottom inside surface 1570C and underneath cup 1556C. In some embodiments, cup 1556C may contain an insect-attracting substance or substances without carrier material 1566C. Although heating element 1576C is shown as a single electrical resistance coil mounted under cup 1556C, it may also be a combination of one or more resistors, infrared LEDs (not shown), Peltier or Thompson effect devices (not shown), conductive ink circuits printed directly on cup 1556C, or any other element or combination of elements that provides heat to cup 1556C and carrier material 1566C. In some embodiments, heating element 1576C may be mounted directly to the underside (not shown) or any other area on the inside or outside of cup 1556C.

Figure 70:
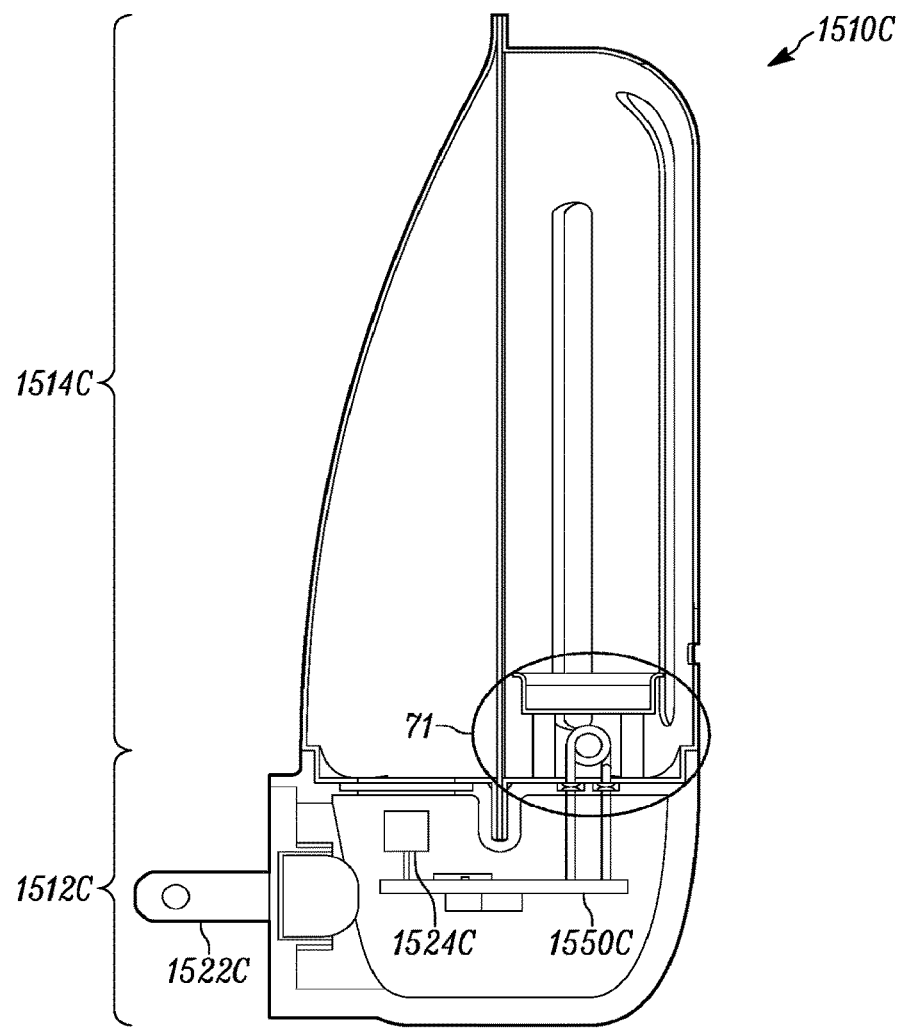
FIG. 70 is cross-sectional view of the insect trap of FIG. 69.
Figure 71:
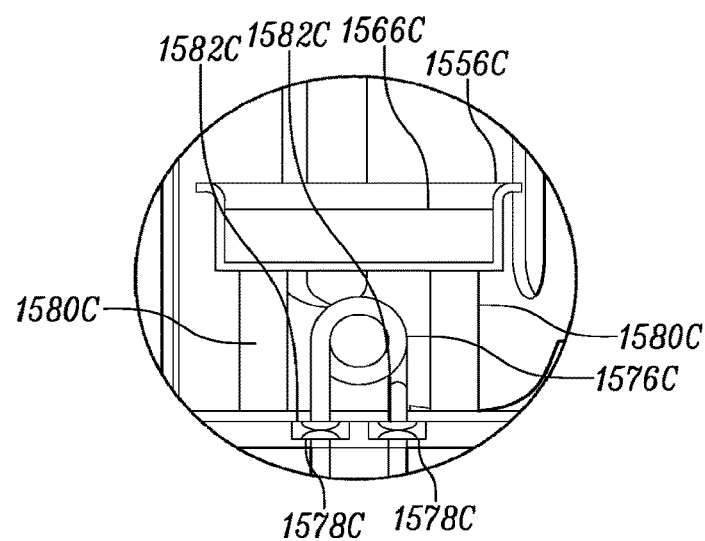
FIG. 71 is an enlarged view of a portion of FIG. 70.

FIG. 70 is a cross-sectional view of insect trap 1510C, and FIG. 71 is an enlarged view of a portion of FIG. 70. Removable tab 1554C (not shown) has been completely removed in this view. Base portion 1512C includes a plurality of electrically conductive prongs 1522C, only one of which is shown, at least one LED 1524C, only one of which is shown, a plurality of base contacts 1578C, and a circuit board 1550C electrically connected to prongs 1522C, LED 1524C and base contacts 1578C. For clarity, not all electrical connections are shown. In some embodiments, trap portion 1514C includes cup supports 1580C that attach to bottom inside surface 1570C of front housing 1518C and hold cup 1556C over heating element 1576C. In some embodiments, heating element 1576C may be directly mounted to cup 1556C, thereby eliminating the need for cup supports 1580C. In some embodiments, bottom inside surface 1570C of front housing 1518C may have protrusions (not shown) that hold cup 1556C over heating element 1576C, thereby eliminating the need for cup supports 1580C.

Trap portion 1514C also includes a plurality of trap contacts 1582C, electrically connected to heating element 1576C and configured to make electrical contact with their corresponding base contacts 1578C in base portion 1512C when trap portion 1514C is removably mounted to base portion 1512C. While two sets of base contacts 1578C and trap contacts 1582C are shown, any suitable number may be used. Circuit board 1550C includes electronic circuitry to receive ordinary household current from conductive prongs 1522C, provide power to LEDs 1524C and to base contacts 1578C, which, in turn, provide power to trap contacts 1582C and heating element 1576C when trap portion 1514C is mounted to base portion 1512C. Heating element 1576C produces heat in response to power from circuit board 1550C, which warms cup 1556C and in turn, carrier material 1566C by radiation, conduction, or convection, or any combination thereof. Increasing the temperature of carrier material 1566C may increase the release of insect-attracting substances, and may enable a more complete release of insect-attracting substances. In some embodiments, increasing the temperature of carrier material 1566C may enable the release of some insect-attracting substances that cannot release at ordinary room temperature. In some embodiments, heating element 1576C may also be configured to attract heat-sensing insects such as mosquitos. In some embodiments, heat and scent alone are used as attractants, and light sources are not used in insect trap 1510C.

Figure 72:
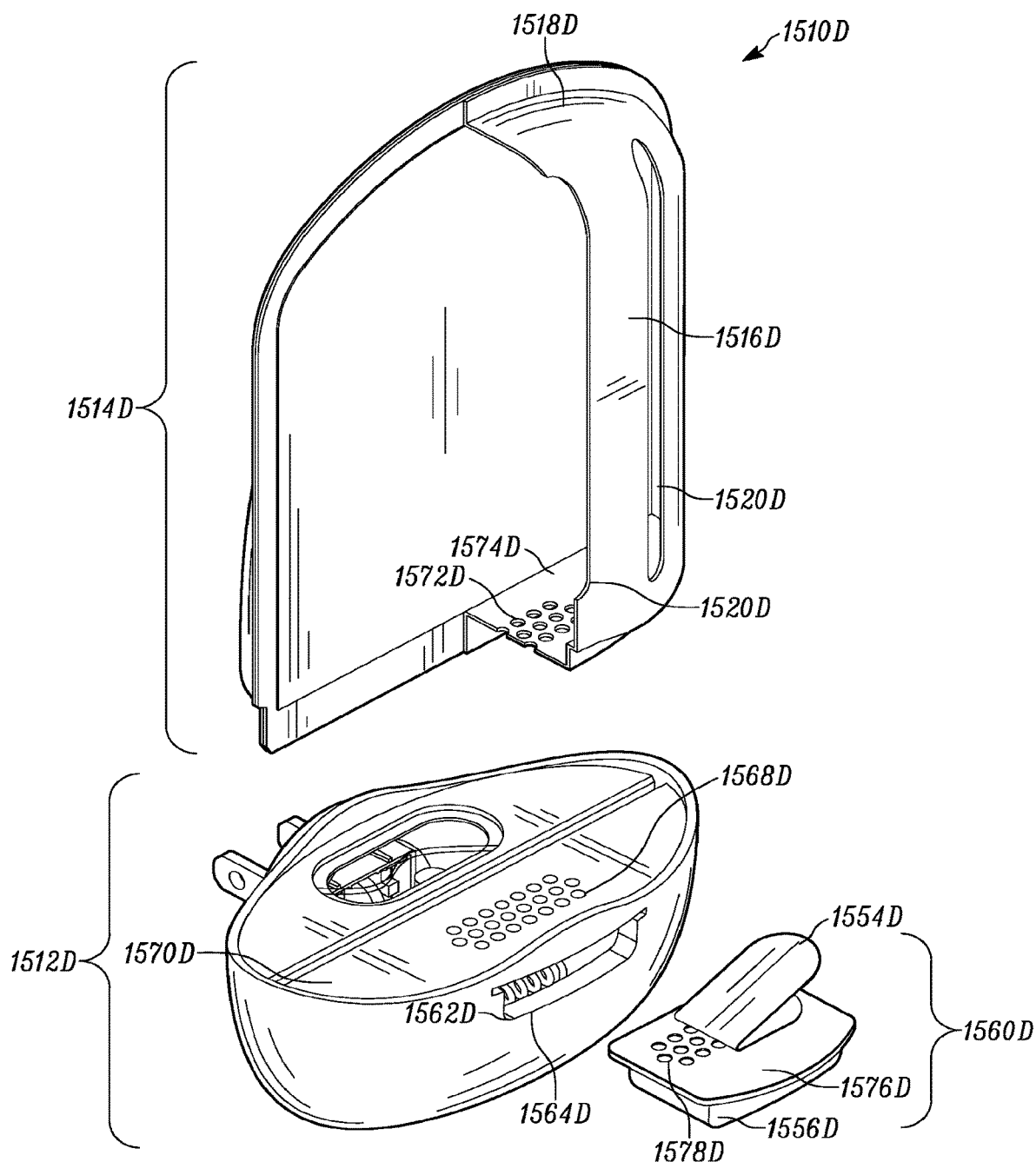
FIG. 72 is a front perspective view of an example of the fifteenth embodiment of an insect trap in accordance with the principles of the disclosure.

It should be appreciated that a variety of configurations to store and deliver insect-attracting substances from a removable container are contemplated. FIG. 72 is a front perspective view of an example of the fifteenth embodiment of an insect trap, indicated generally at 1510D. As shown, insect trap 1510D includes a base portion 1512D, a removable and replaceable trap portion 1514D, and a removable and replaceable scent cartridge 1560D. Trap portion 1514D is shown partially cut away, and trap portion 1514D and scent cartridge 1560D are shown removed from base portion 1512D in this view. Base portion 1512D includes an opening 1562D in a front surface 1564D configured to accept scent cartridge 1560D, and at least one opening 1568D in a top front surface 1570D. Trap portion 1514D includes a front housing 1518D with at least one opening 1520D in its front surface 1516D and at least one opening 1572D in its bottom surface 1574D. Opening 1572D is configured to align with opening 1568D in top front surface 1570D of base portion 1512D when trap portion 1514D is mounted to base portion 1512D. Scent cartridge 1560D includes an upwardly facing cup 1556D with a lid 1576D sealing its open end (not shown), and a removable tab 1554D, shown partially removed in this view to reveal at least one opening 1578D in lid 1576D. Removable tab 1554D, lid 1576D and cup 1556D are configured to seal contents of scent cartridge 1560D until removable tab 1554D is removed from lid 1576D. Opening 1578D in lid 1576D is configured to align with opening 1568D in top front surface 1570D of base portion 1512D when scent cartridge 1560D is inserted into opening 1562D of base portion 1512D.

Figure 73:
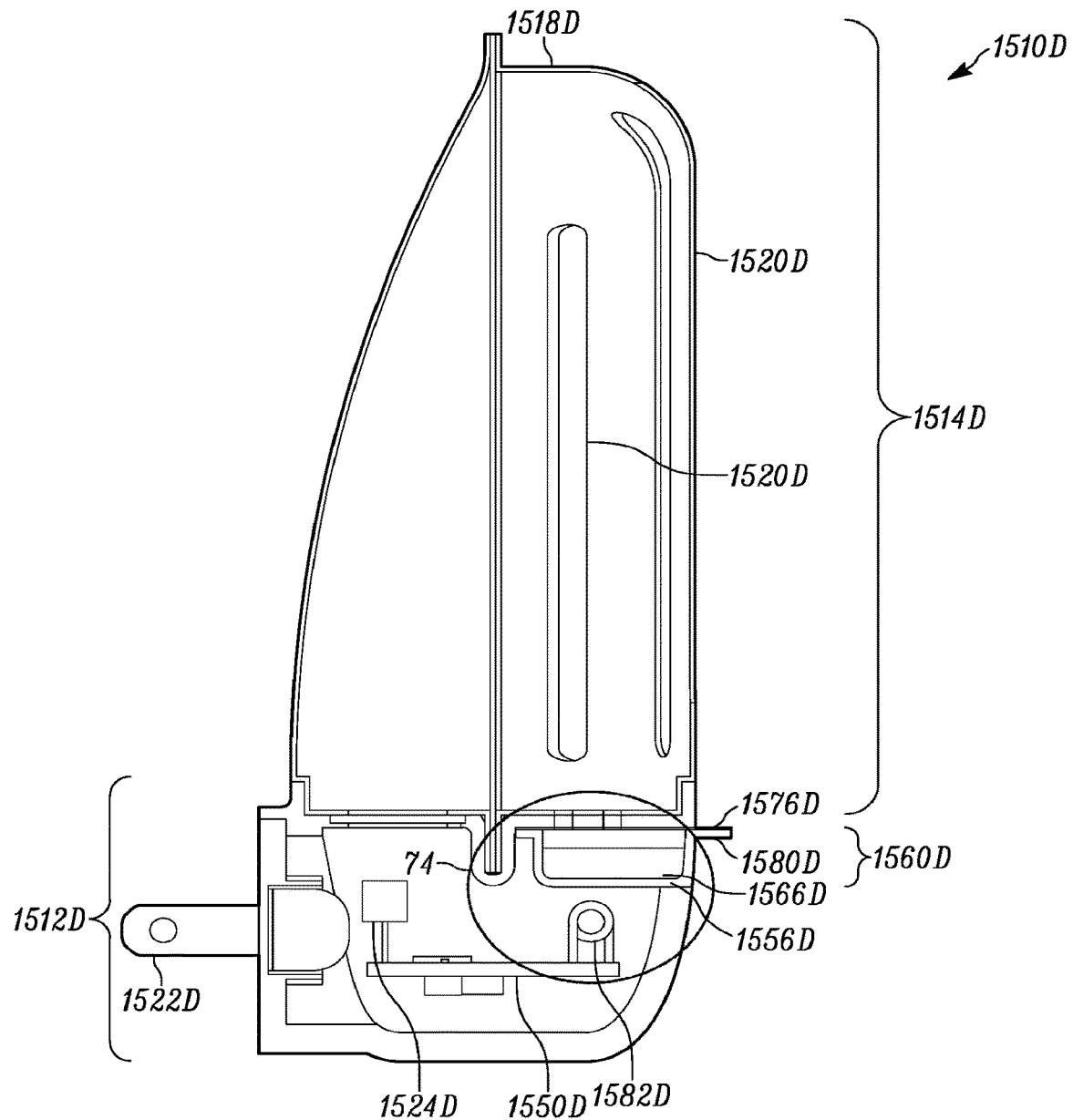
FIG. 73 is a cross-sectional view of the insect trap of FIG. 72.
Figure 74:
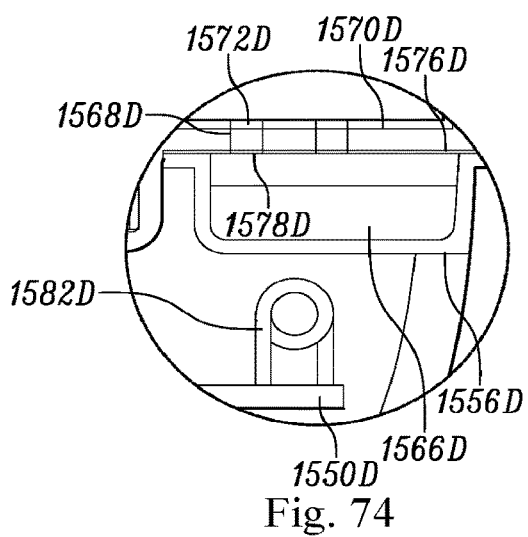
FIG. 74 is an enlarged view of a portion of FIG. 73.

FIG. 73 is a cross-sectional view of insect trap 1510D, and FIG. 74 is an enlarged view of FIG. 73. Trap portion 1514D is shown mounted on base portion 1512D, removable tab 1554D has been removed and scent cartridge 1560D is inserted into base portion 1512D in this view. For clarity, support features that hold scent cartridge 1560D in place inside base portion 1512D are not shown. Cup 1556D contains a carrier material 1566D impregnated with one or more insect-attracting substances. In some embodiments, cup 1556D may contain an insect-attracting substance or substances without carrier material 1566D. Scent cartridge 1560D includes a tab 1580D configured to protrude from base portion 1512D when scent cartridge 1560D is inserted into base portion 1512D, allowing the user to remove and replace scent cartridge 1560D when insect-attracting substances in carrier material 1566D are depleted. Base portion 1512D includes a plurality of electrically conductive prongs 1522D (only one of which is shown), at least one LED 1524D (only one of which is shown), a circuit board 1550D, and a heating element 1582D mounted on circuit board 1550D and positioned underneath scent cartridge 1560D. Although heating element 1582D is shown as a single electrical resistance coil mounted under scent cartridge 1560D, it may also be made up of a combination of one or more resistors, infrared LEDs (not shown), Peltier or Thompson effect devices (not shown), or any other element or combination of elements that provides heat to scent cartridge 1560D and carrier material 1566D. Circuit board 1550D is electrically connected to prongs 1522D, LED 1524D and heating element 1582D. For clarity, not all electrical connections are shown. Circuit board 1550D includes electronic circuitry to receive ordinary household current from conductive prongs 1522D, provide power to LED 1524D and to heating element 1582D. Heating element 1582D produces heat in response to power from circuit board 1550D, which warms cup 1556D and carrier material 1566D by radiation, conduction, or convection, or any combination thereof. Increasing the temperature of carrier material 1566D may increase the release of insect-attracting substances, and may enable a more complete release of insect-attracting substances. In some embodiments, increasing the temperature of carrier material 1566D may enable the release of some insect-attracting substances that cannot release at ordinary room temperature. In some embodiments, heating element 1582D also provides heat to other components of trap portion to better attract certain species of insects including mosquitos. In some embodiments, base portion 1512D does not include heating element 1582D, and insect-attracting substances are released from carrier material 1566D at room temperature or as a result of heat generated by circuit board 1550D. Lid 1576D of scent cartridge 1560D contacts underside of top front surface 1570D of base portion 1512D. The insect attracting substances released by carrier material 1566D proceed through opening 1578D in scent cartridge 1560D, through opening 1568D in base portion 1512D, and through opening 1572D and opening 1520D in front housing 1518D, and on into the surrounding area where insect trap 1510D is installed. In some embodiments, heat and scent alone are used as attractants, and light sources are not used in insect trap 1510D.

Figure 75:
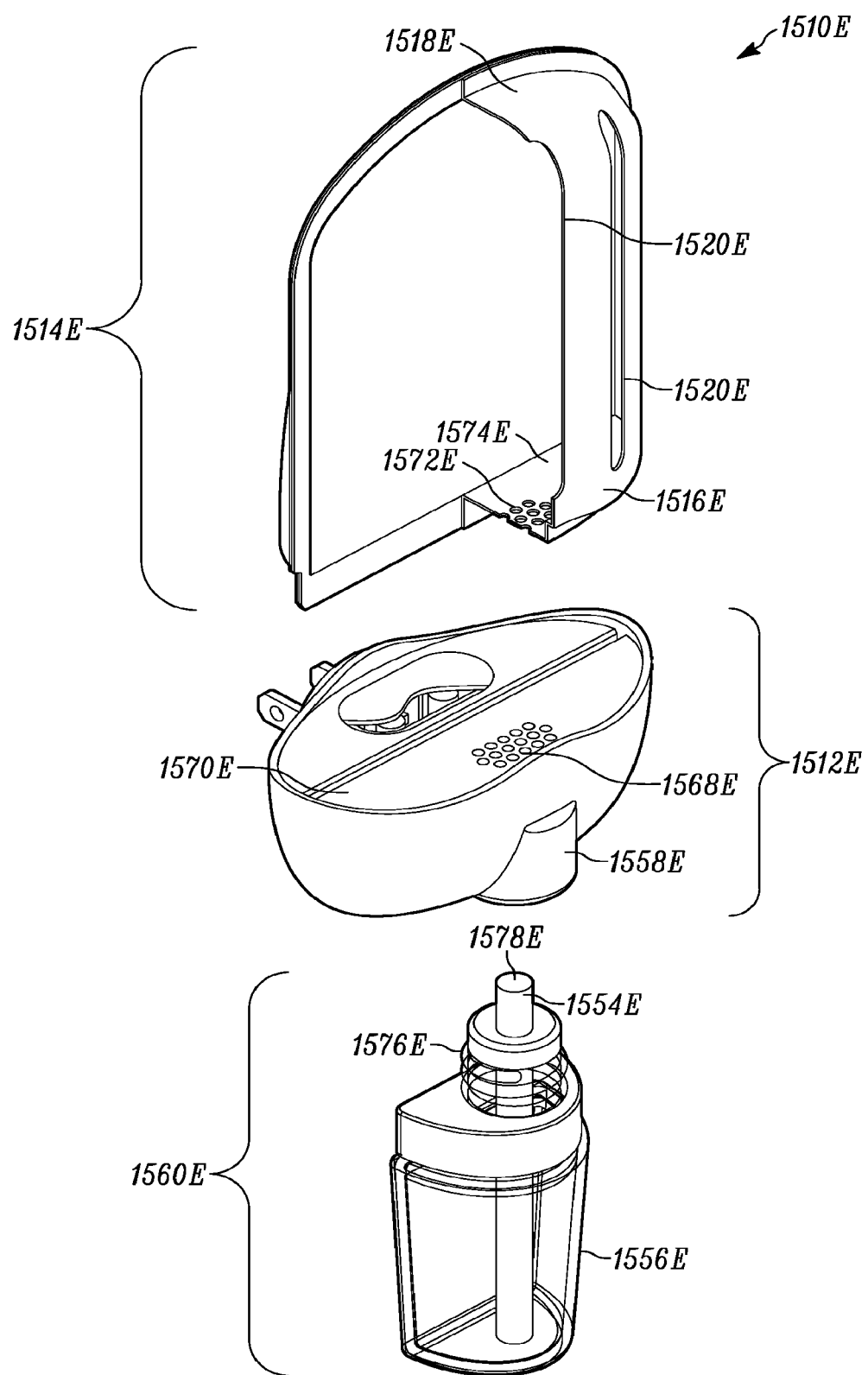
FIG. 75 is a front perspective view of an example of the fifteenth embodiment of an insect trap in accordance with the principles of the disclosure.

Additional configurations to store and deliver insect-attracting substances, including evaporable liquids, from a removable container are contemplated. FIG. 75 is a front perspective view of an example of the fifteenth embodiment of an insect trap, indicated generally at 1510E. Insect trap 1510E includes a base portion 1512E, a removable trap portion 1514E, and a removable scent cartridge 1560E. Scent cartridge 1560E and trap portion 1514E are shown removed from base portion 1512E, and trap portion is shown partially cut away in this view. Base portion 1512E includes a port 1558E with an opening 1562E (shown in FIG. 76) in a bottom surface 1564E (shown in FIG. 76) configured to accept scent cartridge 1560E, and at least one opening 1568E in a top front surface 1570E. Trap portion 1514E includes a front housing 1518E with at least one opening 1520E in its front surface 1516E and at least one opening 1572E in its bottom surface 1574E. Opening 1572E in trap portion 1514E is configured to align with opening 1568E in top front surface 1570E of base portion 1512E when trap portion 1514E is mounted to base portion 1512E. Scent cartridge 1560E, which may be similar in configuration to those found in plug-in room air freshener refills, includes a container portion 1556E holding a liquid 1566E, an attachment portion 1576E and a wick 1554E with an open end 1578E protruding from attachment portion 1576E. Attachment portion 1576E is configured to securely but removably attach scent cartridge 1560E to base portion 1512E. Container portion 1556E may be molded of glass or of a plastic that resists penetration by, and acts as a barrier to, an insect-attracting substance or substances, and may be transparent or translucent to allow the user to observe the amount of liquid 1566E remaining in container portion 1556E. In some embodiments, scent cartridge 1560E may have a protective cap (not shown) that engages with attachment portion 1576E and is configured to seal contents of scent cartridge 1560E before scent cartridge 1560E is installed in base portion 1512E.

Figure 76:
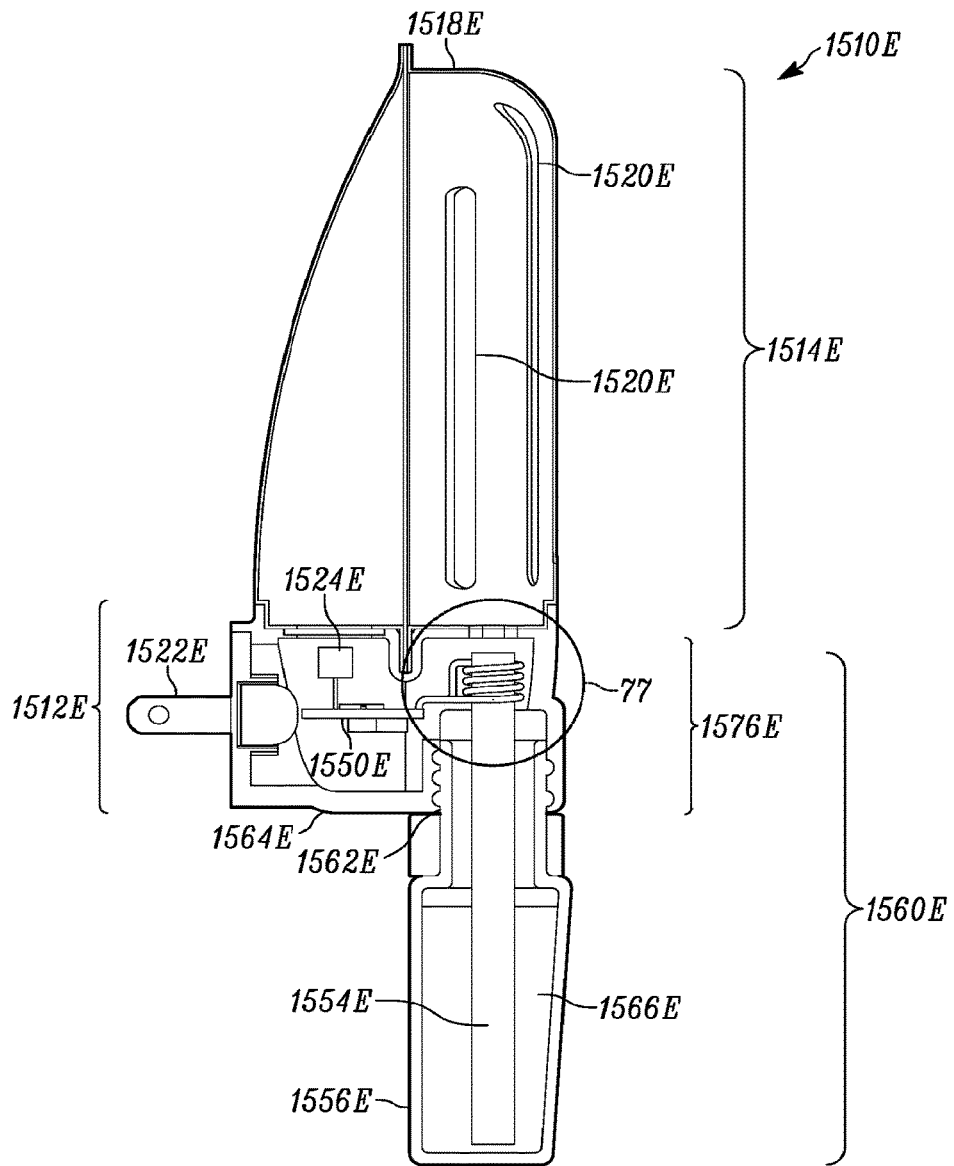
FIG. 76 is a cross-sectional view of a portion of FIG. 75.
Figure 77:
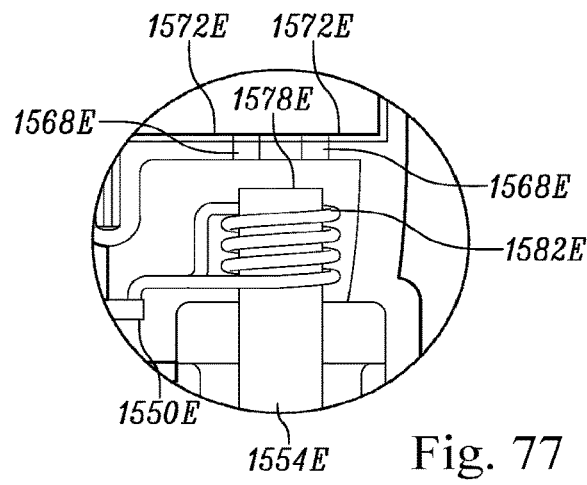
FIG. 77 is an enlarged view of a portion of FIG. 76.

FIG. 76 is a cross-sectional view of insect trap 1510E, and FIG. 77 is an enlarged portion of FIG. 76. Trap portion 1514E is shown mounted on base portion 1512E and scent cartridge 1560E is shown inserted into base portion 1512E in this view. Liquid 1566E in container portion 1556E of scent cartridge 1560E, which may include a liquid carrier material and/or an insect-attracting substance or substances, and is configured to evaporate, thereby releasing the insect-attracting substance or substances into the air. Open end 1578E of wick 1554E protrudes through attachment portion 1576E and into the interior of base portion 1512E, and the remainder of wick 1554E extends into liquid 1566E and to the bottom of container portion 1556E. Wick 1554E may be manufactured of fibers of polyester or other natural or manufactured materials, and is configured to absorb and, via capillary action, pull liquid 1566E up open end 1578E of wick 1554E, where liquid 1566E is exposed to the air and evaporates, releasing the insect-attracting substance or substances into the air. Base portion 1512E includes a plurality of electrically conductive prongs 1522E (only one of which is shown), at least one LED 1524E (only one of which is shown), a circuit board 1550E, and a heating element 1582E mounted on circuit board 1550D and configured to surround open end 1578E of wick 1554E. Heating element 1582E may be similar in configuration to those found in plug-in room air fresheners. Although heating element 1582E is shown as a single electrical resistance coil, it may also be made up of a combination of one or more resistors (not shown), infrared LEDs (not shown), Peltier or Thompson effect devices (not shown), or any other element or combination of elements that provides heat to open end 1578E of wick 1554E. Circuit board 1550E is electrically connected to prongs 1522E, LED 1524E and heating element 1582E. For clarity, not all electrical connections are shown. Circuit board 1550E includes electronic circuitry to receive ordinary household current from conductive prongs 1522E and provide power to LEDs 1524E and to heating element 1582E. Heating element 1582E produces heat in response to power from circuit board 1550E, which warms open end 1578E of wick 1554E, and liquid 1566E in open end 1578E of wick 1554E by radiation, conduction, or convection, or any combination thereof. In some embodiments, heating element 1582E may heat metal particles (not shown) impregnated in open end 1578E of wick 1554E by induction. In some embodiments, circuit board 1550E may be configured to maintain a constant temperature in heating element 1582E, or heating element 1582E may include self-regulating materials that increase their electrical resistance when their temperature increases, or any combination of feature or features to regulate the temperature of heating element 1582E. Increasing the temperature of liquid 1566E may increase the release of insect-attracting substances, and may enable a more complete release of insect-attracting substances. In some embodiments, increasing the temperature of liquid 1566E may enable the release of some insect-attracting substances that cannot release at ordinary room temperature. In some embodiments, heating element 1582E also provides heat to other components of trap portion to better attract certain species of insects including mosquitos. In some embodiments, base portion 1512E does not include heating element 1582E, and insect-attracting substances are released from liquid 1566E at room temperature or as a result of heat generated by circuit board 1550E. In some embodiments, heat alone or heat and scent alone are used as attractants, and light sources are not used in insect trap 1510E.

The insect attracting substances released by liquid 1566E at open end 1578E of wick 1554E proceed through opening 1568E in base portion 1512E, and through opening 1572E and opening 1520E in front housing 1518E, and on into the surrounding area where insect trap 1510E is installed.

An added benefit of insect trap 1510E is that scent cartridge 1560E may include a built-in life indicator. In some embodiments, the amount of liquid 1566E remaining in container portion 1556E may be visible to the user. In some embodiments, liquid 1566E may be tinted or colored to enhance its visibility in container portion 1556E. In some embodiments, a marking or markings (not shown) on container portion 1556E may indicate the level of liquid 1566E when liquid 1566E is partially and/or fully depleted, thereby providing a visual cue indicating that trap portion 1514E should be removed and replaced with a fresh trap portion 1514E.

Figure 78:
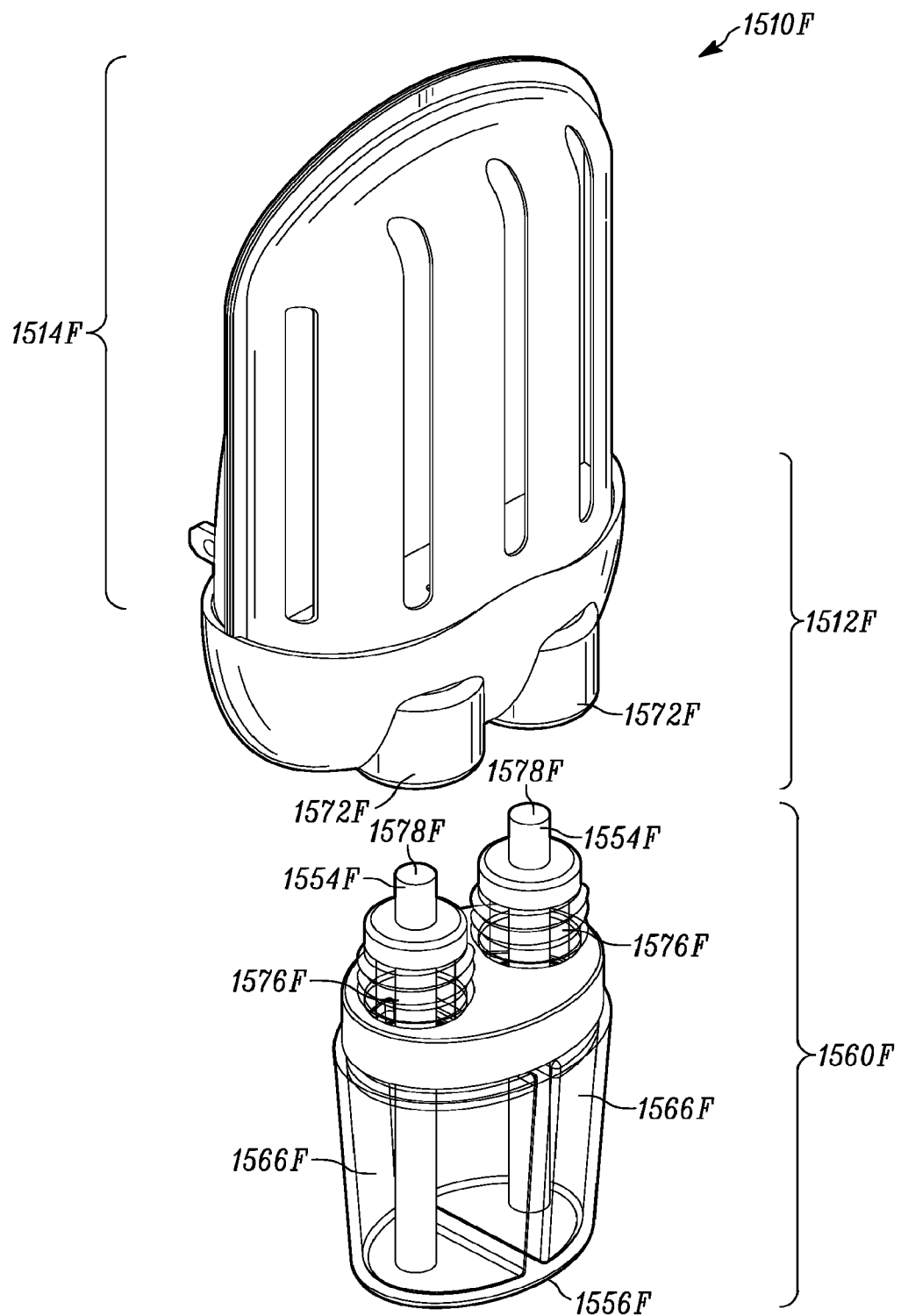
FIG. 78 is a front perspective view of an example of the fifteenth embodiment of an insect trap in accordance with the principles of the disclosure.

It should be appreciated that the configuration of insect trap 1510E may be adapted to store and deliver two or more insect-attracting substances. FIG. 78 is a front perspective view of an example of the fifteenth embodiment of an insect trap, indicated generally at 1510F. Insect trap 1510F includes a base portion 1512F, a removable trap portion 1514F, and a scent cartridge 1560F. Scent cartridge 1560F is shown removed from base portion 1512F in this view. Scent cartridge 1560F may be similar in configuration to those found in plug-in room air freshener refills. As shown, scent cartridge 1560F includes two or more attachment portions 1576F, two or more wicks 1554F with open ends 1578F, and a multiple container portion 1556F, configured to hold two or more different liquids 1566F. Alternatively, two or more individual scent cartridges (not shown), each containing a single liquid (not shown), may be used in place of scent cartridge 1560F. Base portion 1512F includes two or more ports 1572F to engage with two or more attachment portions 1576F of scent cartridge 1560F. Inside base portion 1512F are two or more heating elements (not shown) to warm two or more wicks 1554F. Heating elements (not shown) may be similar in configuration to those found in plug-in room air fresheners. In some embodiments, heating elements may be configured to operate at different temperatures from one another. In some embodiments, heating elements may be configured to operate at different times from one another.

Insect trap 1510F may provide a number of advantages. In some embodiments, a combination of insect attracting substances that cannot be formulated into a single liquid may be delivered. In some embodiments, a combination of insect-attracting substances that require heating to different temperatures may be delivered. In some embodiments, different insect-attracting substances may be delivered at daytime and nighttime, to better attract and trap different types of insects that are more active during the day or during the night. In some embodiments, one substance delivered may be an insect attractant with an unpleasant odor to humans, while another substance delivered separately may neutralize the unpleasant odor without diminishing the effectiveness of the insect attractant. In some embodiments, delivery of different insect attractants is alternated over time to better attract insects that may respond to changing attractants. In some embodiments, one or more of substances delivered may be pleasant to humans, such as natural scents or nature-inspired scents.

Figure 79:
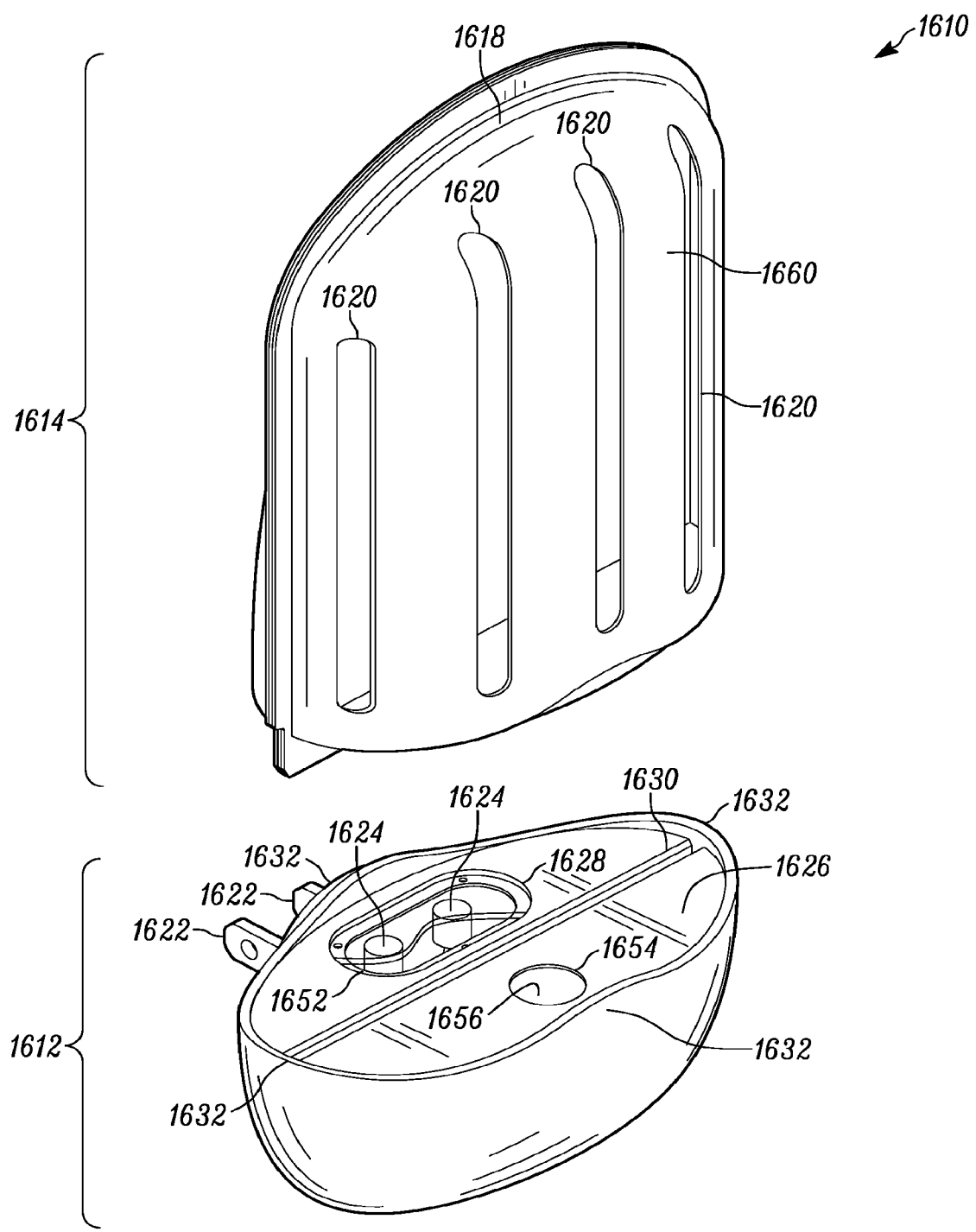
FIG. 79 is a front perspective view of a sixteenth embodiment of an insect trap in accordance with principles of the disclosure.

FIG. 79 is a front perspective view of a sixteenth embodiment of an insect trap, indicated generally at 1610. Insect trap 1610 includes a base portion 1612 and a removable trap portion 1614. Trap portion 1614 is shown removed from the base portion 1612 in this view. Insect trap 1610 may have an overall length, an overall width and an overall depth, and may be configured such that when insect trap 1610 is mounted to a wall, its overall depth, defined by the overall distance insect trap 1610 protrudes from the wall, is the smallest of the three overall dimensions. Trap portion 1614 includes a front housing 1618 with at least one opening 1620 in a front surface 1660. Trap portion 1614 may have an overall length, an overall width and an overall depth, and may be configured such that when trap portion 1614 is mounted in insect trap 1610, and insect trap 1610 is mounted to a wall, the overall depth of trap portion 1614, which is measured in the direction perpendicular to the wall, is the smallest of the three overall dimensions of trap portion 1614. Opening 1620 in front housing 1618 may be configured to admit a wide variety of insects into insect trap 1610, or alternatively it may be configured to admit one or more specific insect species. In some embodiments, opening 1620 is configured to prevent user's fingers from penetrating opening 1620 and inadvertently touching trapped insects or adhesive when removing and replacing trap portion 1614. In some embodiments, opening 1620 has a size and shape such that a sphere 25 mm in diameter cannot pass through opening 1620, and has a size and shape such that a sphere 1 mm in diameter can pass through any portion of opening 1620. Opening 1620 may be of uniform or of varying width, shape and orientation, and if trap portion 1614 has more than one opening 1620, they may be of identical or of differing widths, shapes and orientations. Opening 1620 may be configured to attract one or more individual insect species or a variety of insect species. Protruding from a rear surface 1662 (shown in FIG. 80) of base portion 1612 may be a plurality of electrically conductive prongs 1622, adapted to mount insect trap 1610 to a wall and provide power to insect trap 1610 by inserting conductive prongs 1622 into a standard household electrical wall socket. Alternatively, conductive prongs 1622 may be adapted to swivel to allow insect trap 1610 to remain upright when conductive prongs 1622 are inserted into a horizontally oriented electrical wall socket. Alternatively, base portion 1612 may be configured to sit or hang wherever desired and receive power from batteries (not shown) mounted in base portion 1612. While an electrical socket and batteries have been described as providing power to insect trap 1610, any suitable power source may be used. Base portion 1612 includes a lighting element such as one or more LEDs 1624. In some embodiments, LEDs 1624 include at least one that emits UV light and at least one that emits visible light. In some embodiments, LEDs 1624 include at least one that emits UV light and at least one that emits blue light to better attract a wide variety of insect species. In some embodiments, the lighting element emits a combination of wavelengths to mimic sunlight. In some embodiments, LEDs 1624 include at least one that emits IR light to better attract certain species of insects including mosquitos and fleas. In a top surface 1626 of base portion 1612 is an opening 1652, which may be covered by a transparent or translucent window 1628, shown partially cut away to reveal LEDs 1624. Window 1628 protects LEDs 1624 from dust and insect debris, and allows base portion 1612 to be easily cleaned. Mounted in a second opening 1654 in top surface 1626 is an electromechanical actuator 1656, preferably a transmitter or transceiver such as a piezoelectric speaker. Also in top surface 1626 may be a slot 1630, and on the perimeter of top surface 1626 is a rim or upwardly directed protrusions 1632.

Figure 80:
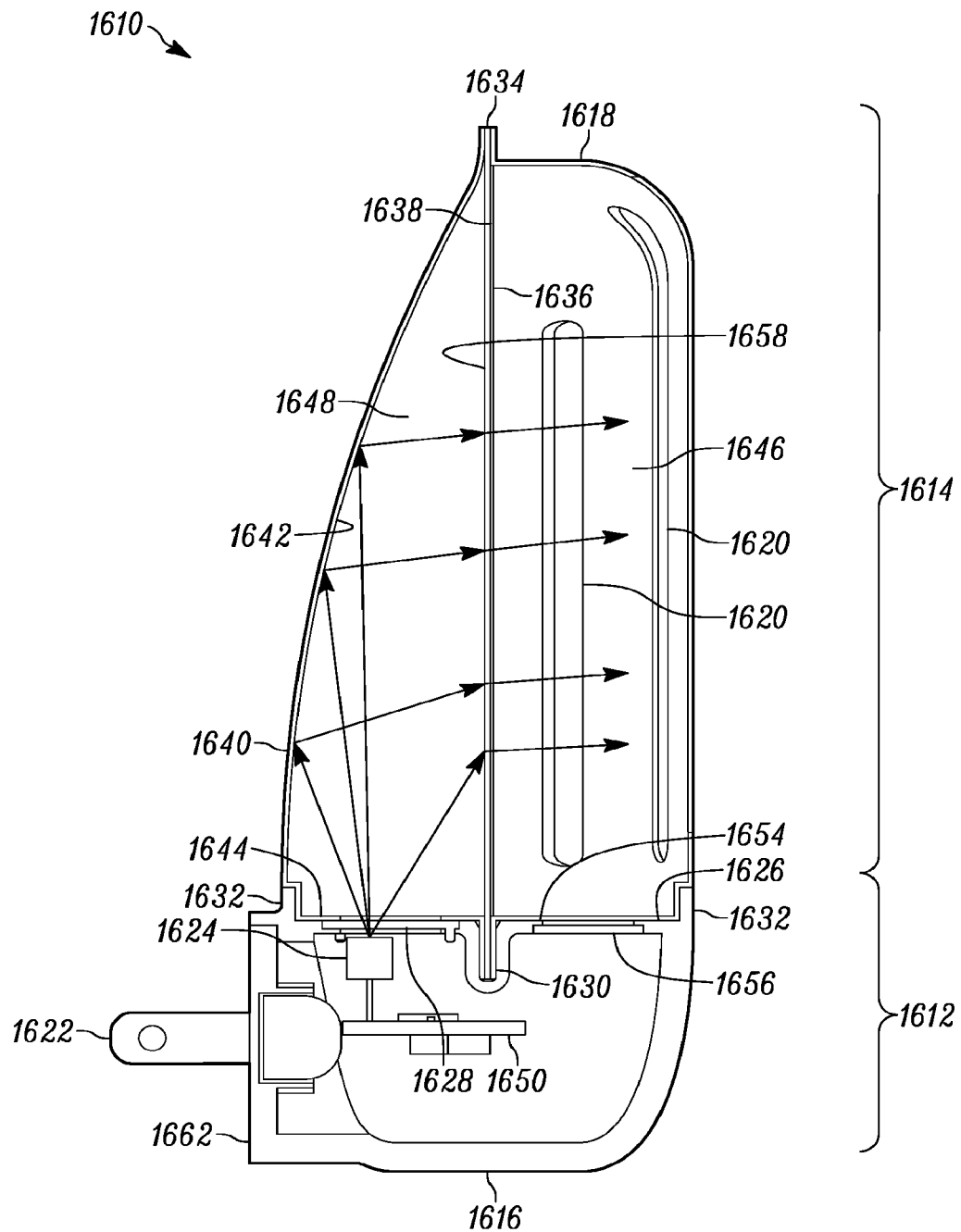
FIG. 80 is a cross-sectional view of the insect trap of FIG. 79.

FIG. 80 is a cross-sectional view of insect trap 1610. Trap portion 1614 includes a divider 1634 with a front surface 1638, and a rear housing 1640 with an inside surface 1642. In some embodiments, divider 1634 is constructed from or includes a transparent or translucent material and may be coated with a transparent or translucent adhesive 1636 on front surface 1638. In some embodiments, divider 1634 is configured to polarize light transmitted through it in an orientation similar to that of daylight to further attract flying insects, a wide variety of which are known to detect polarized light. In some embodiments, inside surface 1642 of rear housing 1640 is coated with a reflective material. In some embodiments, the material and surface finish of rear housing 1640 may be configured to reflect and disperse UV and/or visible light without a reflective coating. In some embodiments, the material and thickness of divider 1634 and the material and thickness of adhesive 1636 are selected to transmit a substantial proportion of the UV and/or visible and/or IR light, for example greater than 60% of the light is transmitted through divider 1634 and adhesive 1636. Rear housing 1640 may include an opening 1644 on its bottom surface, or alternatively opening 1644 may be replaced by a transparent or translucent window.

In some embodiments, front housing 1618 and rear housing 1640 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1618 and rear housing 1640 are constructed by injection molding or by other suitable manufacturing techniques. As shown, divider 1634 may be substantially planar, and may be configured to be parallel to, or at an angle to the primary direction of the light (not shown) produced by LEDs 1624. Alternatively, divider 1634 may be formed into a convex, concave or saddle-shaped contour (not shown), or a combination of contours to optimize the even distribution of light. In some embodiments, divider 1634 has ribs or other features (not shown) that increase adhesive surface area and create regions of light/dark contrast, which are highly visible to a wide variety of insects and may be more attractive to them.

In some embodiments, front housing 1618 is coated with transparent, translucent or opaque adhesive (not shown) on an inside surface to provide additional insect trapping efficiency and capacity. In addition, front housing 1618 may also have a reflective coating (not shown) underneath the adhesive coating on its inside surface to enhance its attraction to insects and further improve the insect trapping efficiency and effectiveness.

In some embodiments, front housing 1618, divider 1634 and rear housing 1640 are joined together where they intersect or engage with an adhesive, although they may also be joined by other commonly used packaging assembly techniques such as ultrasonic welding or RF sealing, or any other suitable assembly method. As shown, divider 1634 separates the trap portion 1614 into a front enclosure 1646 and a rear enclosure 1648.

In some embodiments, base portion 1612 includes a circuit board 1650 having a programmable processor or chip (not shown) for executing commands, electrically connected to conductive prongs 1622, only one of which is shown, and LEDs 1624. For clarity, however, not all of the electrical connections are shown. Circuit board 1650 may include electronic circuitry to receive ordinary household current from conductive prongs 1622 and provide power to illuminate LEDs 1624. Circuit board 1650 may include an energy stabilizer such as a full wave rectifier circuit or any other circuit that provides steady voltage to LEDs 1624, although it may also provide a varying voltage to LEDs 1624 to provide a flickering light, which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1650 may provide power to LEDs 1624 to provide UV and/or visible and/or IR light, although it may be configured to provide power to only UV LEDs 1624 or to only visible light LEDs 1624 or to only IR light LEDs 1624, or to provide variable power to produce combinations of flickering UV and/or visible and/or IR light. Circuit board 1650 may also be configured to drive actuator 1656, mounted in opening 1654 in base portion 1612, to emit an insect-attracting sound. In some embodiments, actuator 1656 emits recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1610. It is desirable for such insect-attracting sound to be undetectable by a human beyond approximately a 1-meter distance from insect trap 1610. Circuit board 1650 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1612 and into trap portion 1614, to attract some insect species, including fleas and mosquitoes. Alternatively, one or more of LEDs 1624 may generate heat, to replace or augment the heat generated by the one or more electrical elements. Alternatively, one or more of LEDs 1624 may be replaced or augmented by one or more incandescent light bulbs to generate both heat and light. In general, the heat generated may increase and maintain the temperature of at least a portion of trap portion 1614 to between approximately 30 degrees C. and 45 degrees C., and to preferably between approximately 33 degrees C. and 42 degrees C., in order to mimic the skin and body temperatures of mammals.

As shown, slot 1630 in top surface 1626 of base portion 1612 and rim or protrusions 1632 on top surface 1626 of base portion 1612 engage with trap portion 1614 to secure it in place during use, although any other form of attachment may be substituted that may allow trap portion 1614 to be securely but removably mounted on base portion 1612. Bottom surface 1616 of base portion 1612 may be substantially flat or concave to allow insect trap 1610 to sit upright on a floor, desk, table or shelf when insect trap 1610 is unplugged. Alternatively, bottom surface 1616 of base portion 1612 may have two or more protrusions (not shown) or legs that allow insect trap 1610 to sit upright when insect trap 1610 is unplugged.

In the operation of insect trap 1610, conductive prongs 1622, only one of which is shown, are inserted into a wall electrical socket. Circuit board 1650 provides power to LEDs 1624 and to actuator 1656. LEDs 1624 emit light, represented by arrows, which transmits through window 1628 in base portion 1612, through opening 1644 in rear housing 1640 of trap portion 1614, into rear enclosure 1648, and directly onto inside surface 1642 of rear housing 1640 and onto a rear surface 1658 of divider 1634. Because the light from LEDs 1624 enters rear enclosure 1648 through opening 1644 in a bottom face of rear housing 1640 (e.g., in a face that is substantially parallel to the overall depth of trap portion 1614), the light can travel the entire length of rear enclosure 1648 and can diverge over the entire length of rear enclosure 1648, and therefore can be more evenly distributed throughout rear enclosure 1648. In some embodiments, light is not manipulated in base portion 1612 and is emitted directly into trap portion 1614. Inside surface 1642 of rear housing 1640 may include a concave shape and may be configured to reflect and disperse the light from LEDs 1624 to further distribute the light evenly onto rear surface 1658 of divider 1634, although inside surface 1642 of rear housing 1640 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 1658 of divider 1634, may be mounted to rear housing 1640 at or near opening 1644 or to base portion 1612 at or near window 1628, and may replace or augment the role of inside surface 1642 of rear housing 1640. In some embodiments, the light from LEDs 1624 may directly strike rear surface 1658 of divider 1634 at an oblique angle (e.g., an acute angle from approximately 0° to 90°) and be spread across divider 1634, and may replace or augment the role of inside surface 1642 of rear housing 1640 or of the lens or lenses mounted to rear housing 1640.

Thereafter, light transmits through divider 1634 and adhesive 1636 on front surface 1638, and into front enclosure 1646. Light may be further evenly distributed by the light-diffusing properties of divider 1634, adhesive 1636, or both. A portion of the light entering front enclosure 1646 continues through opening 1620 in front housing 1618 and is emitted into the surrounding area where insect trap 1610 is installed. Actuator 1656 produces insect-attracting vibrations which travel through front housing 1618 of trap portion 1614, into front enclosure 1646 of trap portion 1614, and out through opening 1620 of trap portion 1614. In addition, actuator 1656 may induce front housing 1618 of trap portion 1614 to vibrate and project insect-attracting sounds or vibrations into the room. Insects are attracted to the light transmitted through adhesive 1636 and through opening 1620 in front housing 1618. Insects are also attracted to the sounds or vibrations produced by actuator 1656 in base portion 1612 and traveling through front housing 1618 in trap portion 1614. Insects fly or crawl into opening 1620 and onto adhesive 1636, where they become trapped. A user may observe trapped insects by looking through opening 1620 in front housing 1618. When a sufficient number of insects have been trapped, the user may easily remove and discard the entire used trap portion 1614 without touching trapped insects, insect debris or adhesive, which remain out of reach inside trap portion 1614, and replace it with a new trap portion 1614. New trap portion 1614 has fresh adhesive-coated surfaces and light-directing surfaces, ensuring that insect trap 1610 will continue to efficiently and effectively attract and trap insects.

In some embodiments, because trap portion 1614 mounts on top of, and not in front of, base portion 1612, insect trap 1610 protrudes minimally from the wall when plugged into an ordinary household wall socket, and therefore intrudes minimally into the home environment. In some embodiments, insect trap 1610 is configured such that when insect trap 1610 is mounted to a wall, its overall depth, defined by the overall distance insect trap 1610 protrudes from the wall, is smaller than its overall height and its overall width.

It should be appreciated that a benefit of insect trap 1610 is the manipulation of light within trap portion 1614. In some embodiments, light manipulation occurs solely within trap portion 1614. Light manipulation may include reflection, refraction, polarization, dispersion and/or diffusion and is achieved by engaging with a manipulative element or surface (e.g., inside surface 1642, divider 1634 and adhesive 1636). In some embodiments, light manipulation produces an even distribution of light on adhesive 1636. In some embodiments, light is manipulated to produce a predetermined pattern on adhesive 1636 or within trap portion 1614, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1610 of this configuration may accommodate a variety of different trap portions 1614 that may be removably mounted to base portion 1612, each trap portion 1614 being uniquely configured to attract and trap a specific species or multiple species of flying or non-flying insect. For example, the overall size and shape of trap portion 1614, the size, shape, location and orientation of opening 1620 in front housing 1618 of trap portion 1614, and the natural frequency and sound amplifying properties of trap portion 1614 may be uniquely configured to attract and trap a specific species or multiple species of flying or non-flying insect. For example, in some embodiments, trap portion 1614 is approximately 20 mm to 600 mm wide, 20 mm to 600 mm high and 5 mm to 150 mm deep. In some embodiments, trap portion 1614 is approximately 20 mm to 200 mm wide, 20 mm to 200 mm high and 5 mm to 80 mm deep. In some embodiments, trap portion 1614 is approximately 20 mm to 130 mm wide, 20 mm to 130 mm high and 5 mm to 50 mm deep.

In some embodiments, base portion 1612 is approximately 20 mm to 600 mm wide, 10 mm to 150 mm high and 10 mm to 150 mm deep. In some embodiments, base portion 1612 is 20 mm to 200 mm wide, 10 mm to 100 mm high and 10 mm to 80 mm deep. In some embodiments, base portion 1612 is 20 mm to 130 mm wide, 10 mm to 50 mm high and 10 mm to 50 mm deep.

As provided herein, opening 1620 may be a variety of shapes and/or sizes. For example, opening 120 may be circular, square, rectangular, polygonal and/or elliptical in shape. Alternatively, opening 1620 may be slot shaped having a straight, curved or undulating shape or pattern. When opening 1620 is circular, opening 1620 may be approximately 0.5 mm to 30 mm in diameter. In some embodiments, circular opening 1620 is approximately 0.5 mm to 20 mm in diameter. In some embodiments, circular opening 1620 is approximately 0.5 mm to 15 mm in diameter. When opening 1620 is slot shaped, opening 1620 may be approximately 2 mm to 30 mm wide and 5 mm to 500 mm long. In some embodiments, slot shaped opening 1620 is approximately 2 mm to 20 mm wide and 5 mm to 200 mm long. In some embodiments, slot shaped opening 1620 is approximately 2 mm to 15 mm wide and 5 mm to 100 mm long.

In some embodiments, opening 1620 covers all or a portion of front housing 1618. For example, opening 1620 may cover a range of approximately 1% to 75% of the surface area of front housing 1618. In some embodiments, opening 1620 covers approximately 5% to 50% of the surface area of front housing 1618. In some embodiments, opening 1620 covers approximately 10% to 30% of the surface area of front housing 1618.

Figure 81:
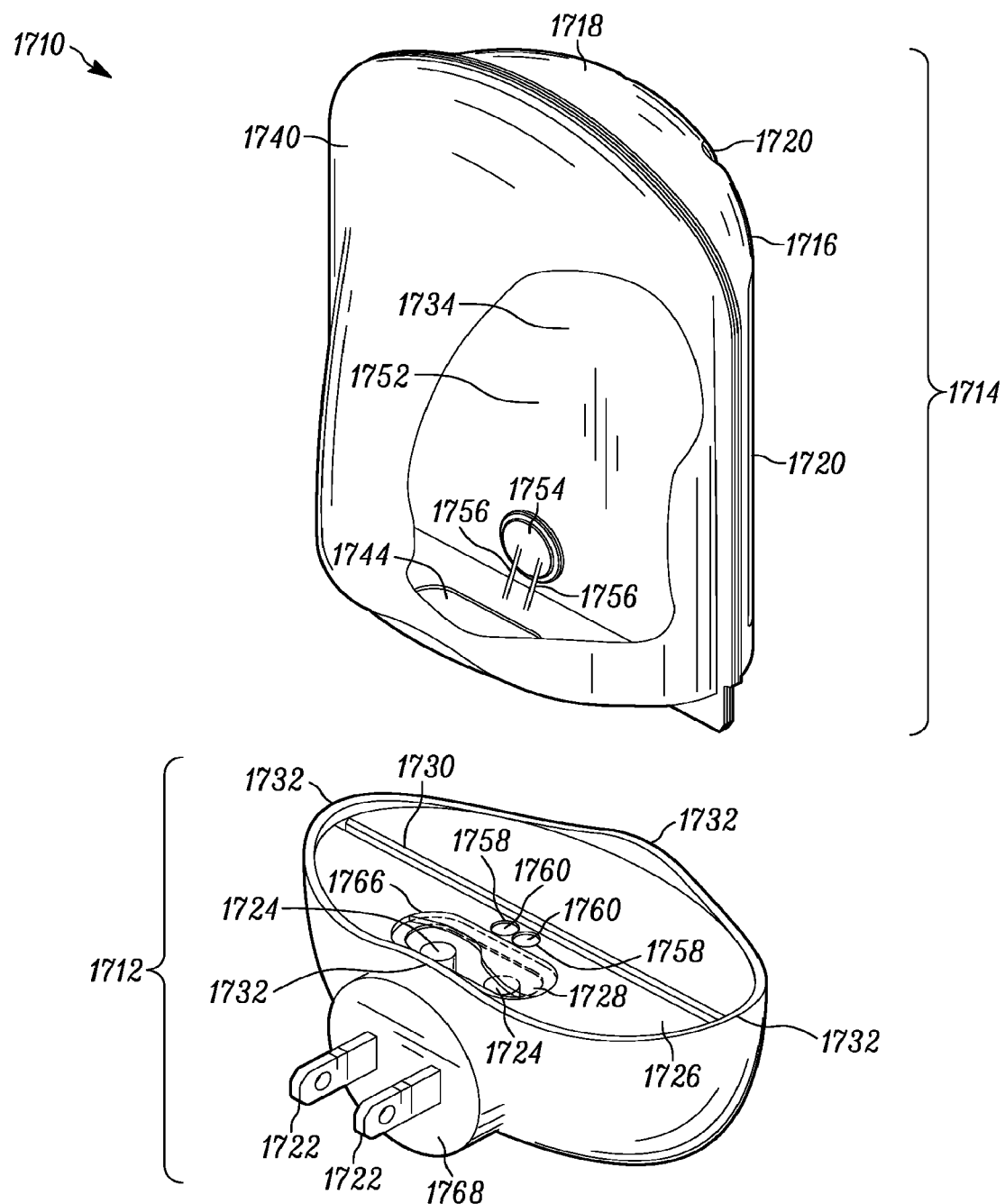
FIG. 81 is a rear perspective view of a seventeenth embodiment of an insect trap in accordance with principles of the disclosure.

FIG. 81 is a rear perspective view of a seventeenth embodiment of an insect trap, indicated generally at 1710. Insect trap 1710 includes a base portion 1712 and a removable trap portion 1714. Trap portion 1714 is shown partially cut away and removed from base portion 1712 in this view. Insect trap 1710 may have an overall length, an overall width and an overall depth, and may be configured such that when insect trap 1710 is mounted to a wall, its overall depth, defined by the overall distance insect trap 1710 protrudes from the wall, is the smallest of the three overall dimensions. Trap portion 1714 includes a front housing 1718 with at least one opening 1720 in a front surface 1716, a rear housing 1740, and a divider 1734 with a rear surface 1752. Trap portion 1714 may have an overall length, an overall width and an overall depth, and may be configured such that when Trap portion 1714 is mounted in insect trap 1710, and insect trap 1710 is mounted to a wall, the overall depth of trap portion 1714, which is measured in the direction perpendicular to the wall, is the smallest of the three overall dimensions of trap portion 1714. Opening 1720 in front housing 1718 may be configured to admit a wide variety of insects into insect trap 1710, or alternatively it may be configured to admit one or more specific insect species. In some embodiments, opening 1720 is configured to prevent user's fingers from penetrating opening 1720 and inadvertently touching trapped insects or adhesive when removing and replacing trap portion 1714. In some embodiments, opening 1720 has a size and shape such that a sphere 25 mm in diameter cannot pass through opening 1720, and has a size and shape such that a sphere 1 mm in diameter may pass through any portion of opening 1720. Opening 1720 may be of uniform or of varying width, shape and orientation, and if trap portion 1714 has more than one opening 1720, they may be of identical or of differing widths, shapes and orientations. Opening 1720 may be configured to attract one or more individual insect species or a variety of insect species. Affixed to rear surface 1752 of divider 1734 is an electromechanical actuator 1754, preferably a transmitter or transceiver such as a piezoelectric actuator. Attached to actuator 1754 are electric trap wires 1756. While two trap wires 1756 are shown attached to actuator 1754, any suitable number may be used. Rear housing 1740 may include an opening 1744 on its bottom surface, or alternatively opening 1744 may be replaced by a transparent or translucent window (not shown).

Protruding from a rear surface 1768 of base portion 1712 are a plurality of electrically conductive prongs 1722, adapted to mount insect trap 1710 to a wall and provide power to insect trap 1710 by inserting conductive prongs 1722 into a standard household electrical wall socket. Alternatively, conductive prongs 1722 may be adapted to swivel to allow insect trap 1710 to remain upright when conductive prongs 1722 are inserted into a horizontally oriented electrical wall socket. Alternatively, base portion 1712 may be configured to sit or hang wherever desired and receive power from batteries (not shown) mounted in base portion 1712. While an electrical socket and batteries have been described as providing power to insect trap 1710, any suitable power source may be used. Base portion 1712 includes a lighting element such as one or more LEDs 1724. In some embodiments, LEDs 1724 include at least one that emits UV light and at least one that emits visible light. In some embodiments, LEDs 1724 include at least one that emits UV light and at least one that emits blue light to better attract a wide variety of insect species. In some embodiments, the lighting element emits a combination of wavelengths to mimic sunlight. In some embodiments, LEDs 1724 include at least one that emits infrared (IR) to better attract certain species of insects including mosquitos. A top surface 1726 of base portion 1712 includes an opening 1766, which may be covered by a transparent or translucent window 1728, shown partially cut away to reveal LEDs 1724. Window 1728 protects LEDs 1724 from dust and insect debris, and allows base portion 1712 to be easily cleaned. Mounted in one or more additional openings 1758 in top surface 1726 of base portion 1712 are a plurality of electrical base contacts 1760. While two base contacts 1760 are shown, any suitable number may be used. In top surface 1726 may be a slot 1730, and on the perimeter of top surface 1726 is a rim or upwardly directed protrusions 1732.

Figure 82:
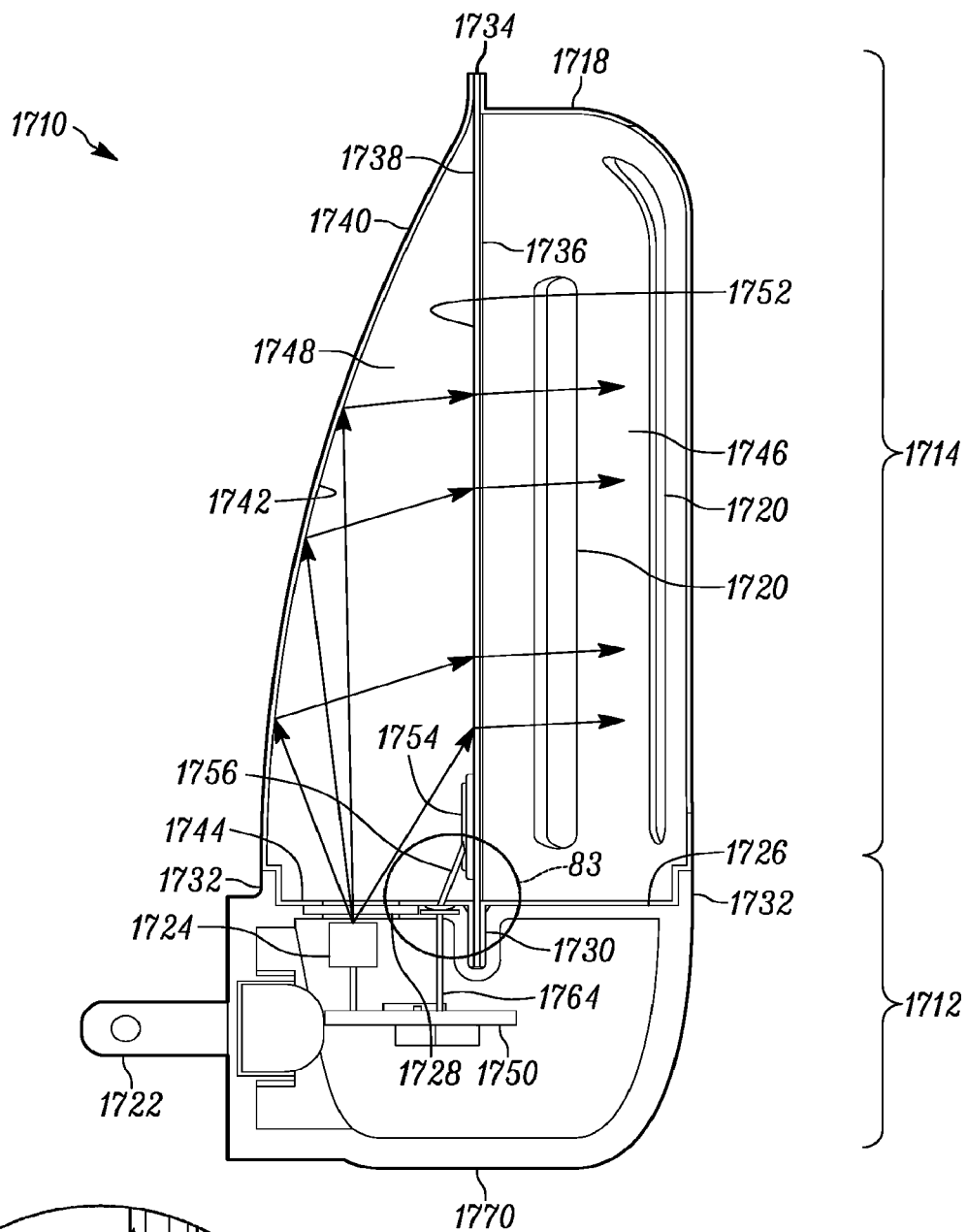
FIG. 82 is a cross-sectional view of the insect trap of FIG. 81.
Figure 83:
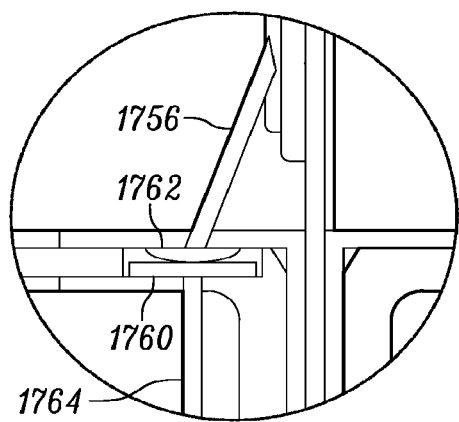
FIG. 83 is an enlarged view of a portion of FIG. 82.

FIG. 82 is a cross-sectional view of insect trap 1710 showing the interiors of base portion 1712 and trap portion 1714, and FIG. 83 is an enlarged view of a portion of FIG. 82. In some embodiments, rear housing 1740 includes a reflective-coated inside surface 1742. Alternatively, the material and surface finish of rear housing 1740 may be configured to reflect UV and/or visible and/or IR light without a reflective coating. In some embodiments, divider 1734 is constructed from or includes a transparent or translucent material and may be coated with a transparent or translucent adhesive 1736 on its front surface 1738. In some embodiments, divider 1734 is configured to polarize light transmitted through it in an orientation similar to that of daylight to further attract flying insects, a wide variety of which are known to detect polarized light. In some embodiments, the material and thickness of divider 1734 and the material and thickness of adhesive 1736 are selected to transmit a substantial proportion of the UV and/or visible and/or IR light, for example greater than 60% of the light is transmitted through divider 1734 and adhesive 1736.

In some embodiments, front housing 1718 and rear housing 1740 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1718 and rear housing 1740 are constructed by injection molding or by other suitable manufacturing techniques. As shown, divider 1734 is substantially planar, and may be configured to be parallel to, or at an angle to the primary direction of the light produced by LEDs 1724. In some embodiments, divider 1734 may be formed into a convex, concave or saddle-shaped contour, or a combination of contours to optimize the even distribution of light. In some embodiments, divider 1734 may have ribs or other features (not shown) that increase adhesive surface area and create regions of light/dark contrast, which are highly visible to a wide variety of insects and may be more attractive to them.

In some embodiments, front housing 1718 may also be coated with transparent, translucent or opaque adhesive on its inside surface to provide additional insect trapping efficiency and capacity. In addition, front housing 1718 may also have a reflective coating (not shown) underneath the adhesive coating on its inside surface to enhance its attraction to insects and further improve the insect trapping efficiency and effectiveness. In some embodiments, front housing 1718, divider 1734 and rear housing 1740 are joined together at where they intersect or engage by ultrasonic welding or high frequency (HF) welding, although they may also be permanently or removably joined together by gluing or by any other suitable assembly method. The materials of trap portion 1714 may also include one or more insect attractants. For example, trap portion 1714 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of insect trap 1710. In such embodiments, the insect attractant is integral to trap portion 1714. Alternatively, the insect attractants may be embedded or contained in a separate piece (not shown) that mounts on an inside surface of front housing 1718 or through opening 1720 in front housing 1718 or on front surface 1716 of front housing 1718 or on front surface 1738 of divider 1734. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances.

It is desirable for such attractants to be detectable by an insect for approximately a 2-meter radius from insect trap 1710. Divider 1734 separates trap portion 1714 into a front enclosure 1746 and a rear enclosure 1748. Rear housing 1740 includes a plurality of electrical trap contacts 1762 (only one of which is shown) that correspond to base contacts 1760 in base portion 1712. Trap contacts 1762 are electrically connected to trap wires 1756 and are configured to create an electrical contact with base contacts 1760 (only one of which is shown), when trap portion 1714 is mounted to base portion 1712. In some embodiments, base portion 1712 includes a circuit board 1750, having a programmable processor or chip (not shown) for executing commands, electrically connected to conductive prongs 1722 (only one of which is shown), LEDs 1724 (only one of which is shown), and a plurality of electric base wires 1764 (only one of which is shown), that correspond to base contacts 1760. Circuit board 1750 may be electrically connected to conductive prongs 1722 (only one of which is shown), LEDs 1724 (only one of which is shown), and base wires 1764, which, in turn, may be electrically connected to their corresponding base contacts 1760. Accordingly, actuator 1754, mounted on rear surface 1752 of divider 1734, may be electrically connected to circuit board 1750 when trap portion 1714 is mounted to base portion 1712. For clarity, however, not all of the electrical connections are shown. Circuit board 1750 may include electronic circuitry to receive ordinary household current from conductive prongs 1722 and provide power to illuminate LEDs 1724. Circuit board 1750 may include an energy stabilizer such as a full wave rectifier circuit or any other circuit that provides steady voltage to LEDs 1724, although it may also provide a varying voltage to LEDs 1724 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1750 may provide power to LEDs 1724 to provide both UV and visible light, although it may be configured to provide power to only UV LEDs 1724 or to only visible light LEDs 1724, or to only IR LEDs 1724, or to provide variable power to produce combinations of flickering UV and/or visible and/or IR light. Circuit board 1750 may also be configured to power actuator 1754 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 1710. It is desirable for such insect-attracting sound to be undetectable by a human beyond approximately a 1-meter distance from insect trap 1710. Circuit board 1750 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1712 and into trap portion 1714, to attract some insect species, including fleas and mosquitoes. Alternatively, one or more of LEDs 1724 may generate heat, to replace or augment the heat generated by the one or more electrical elements. Alternatively, one or more of LEDs 1724 may be replaced or augmented by one or more incandescent light bulbs to generate both heat and light. In general, the heat generated may increase and maintain the temperature of at least a portion of trap portion 1714 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, slot 1730 in top surface 1726 of base portion 1712 and rim or protrusions 1732 on top surface 1726 of base portion 1712 engage with trap portion 1714 to secure it in place during use, although any other form of attachment may be substituted that allows trap portion 1714 to be securely but removably mounted on base portion 1712. A bottom surface 1770 of base portion 1712 may be substantially flat to allow insect trap 1710 to sit upright on a floor, desk, table or shelf when insect trap 1710 is unplugged. Alternatively, bottom surface 1770 of base portion 1712 may have two or more protrusions (not shown) or legs that allow insect trap 1710 to sit upright when insect trap 1710 is unplugged.

In the operation of insect trap 1710, conductive prongs 1722 are inserted into a wall electrical socket, and circuit board 1750 provides power to LEDs 1724 and to actuator 1754. LEDs 1724 emit light, represented by arrows, which transmits through window 1728 in base portion 1712, through opening 1744 in rear housing 1740 of trap portion 1714, into rear enclosure 1748, and directly onto inside surface 1742 of rear housing 1740 and rear surface 1752 of divider 1734. Because the light from LEDs 1724 enters rear enclosure 1748 through opening 1744 in a bottom face of rear housing 1740 (e.g., in a face that is substantially parallel to the overall depth of trap portion 1714), the light can travel the entire length of rear enclosure 1748 and can diverge over the entire length of rear enclosure 1748, and therefore can be more evenly distributed throughout rear enclosure 1748. In some embodiments, light is not manipulated in base portion 1712 and is emitted directly into trap portion 1714. Inside surface 1742 of rear housing 1740 may include a concave shape and may be configured to light from LEDs 1724 to distribute the light evenly onto rear surface 1752 of divider 1734, although the shape of inside surface 1742 of rear housing 1740 may have a convex shape or a saddle shape or a combination of shapes, or may also have ribs or other features (not shown) to more evenly distribute the light. Alternatively, an optical enhancer such as an anamorphic lens or any other lens or combination of lenses (not shown) configured to distribute the light (e.g., evenly, according to specific patterns, at a focal point, etc.) onto rear surface 1752 of divider 1734, may be mounted to rear housing 1740 at or near opening 1744 or to base portion 1712 at or near opening 1766, and may replace or augment the role of inside surface 1742 of rear housing 1740. In some embodiments, the light from LEDs 1724 may directly strike rear surface 1752 of divider 1734 at an oblique angle (e.g., an acute angle from approximately 0° to 90°) and be spread across divider 1734, and may replace or augment the role of inside surface 1742 of rear housing 1740 or of the lens or lenses mounted to rear housing 1740.

Thereafter, light transmits through divider 1734 and adhesive 1736 on front surface 1738, and into front enclosure 1746. The light may be further evenly distributed by the light-diffusing properties of divider 1734, adhesive 1736 on front surface 1738, or both. A portion of the light entering front enclosure 1746 continues through opening 1720 in front housing 1718 and emits into the surrounding area where the trap is installed. Actuator 1754 produces insect-attracting vibrations which are amplified by divider 1734, and transmit through front enclosure 1746 of trap portion 1714, and out through opening 1720 of trap portion 1714. Insects are attracted to the light transmitted through adhesive 1736 and through opening 1720 in front housing 1718. Insects are also attracted to the insect-attracting vibrations produced by actuator 1754. Insects fly or crawl into opening 1720 and onto adhesive 1736, where they become trapped. A user may observe trapped insects by looking through opening 1720 in front housing 1718. When a sufficient number of insects have been trapped, the user may easily remove and discard the entire used trap portion 1714 without touching trapped insects, insect debris or adhesive, which remain out of reach inside trap portion 1714, and replace it with a new trap portion 1714. New trap portion 1714 has fresh adhesive-coated surfaces and light-directing surfaces, ensuring that insect trap 1710 will continue to efficiently and effectively attract and trap insects.

In some embodiments, because trap portion 1714 mounts on top of, and not in front of, base portion 1712, insect trap 1710 protrudes minimally from the wall when plugged into an ordinary household wall socket, and therefore intrudes minimally into the home environment. In some embodiments, insect trap 1710 is configured such that when insect trap 1710 is mounted to a wall, its overall depth, defined by the overall distance insect trap 1710 protrudes from the wall, is smaller than its overall height and its overall width.

It should be appreciated that a benefit of insect trap 1710 is the manipulation of light within trap portion 1714. In some embodiments, light manipulation occurs solely within trap portion 1714. Light manipulation may include reflection, refraction, polarization, dispersion and/or diffusion and is achieved by engaging with a manipulative element or surface (e.g., inside surface 1742, divider 1734 and adhesive 1736). In some embodiments, light manipulation produces an even distribution of light on adhesive 1736. In some embodiments, light is manipulated to produce a predetermined pattern on adhesive 1736 or within trap portion 1714, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1710 of this configuration may accommodate a variety of different trap portions 1714 that may be removably mounted to base portion 1712, each trap portion 1714 being uniquely configured to attract and trap a specific species or multiple species of flying insect. For example, the overall size and shape of trap portion 1714, the size, shape, location and orientation of openings 1720 in front housing 1718 of trap portion 1714, the vibration-producing properties of actuator 1754, and the natural frequency and sound amplifying properties of trap portion 1714 may be uniquely configured to attract and trap a specific species or multiple species of flying insect.

For example, in some embodiments, trap portion 1714 is approximately 20 mm to 600 mm wide, 20 mm to 600 mm high and 5 mm to 150 mm deep. In some embodiments, trap portion 1714 is approximately 20 mm to 200 mm wide, 20 mm to 200 mm high and 5 mm to 80 mm deep. In some embodiments, trap portion 1714 is approximately 20 mm to 130 mm wide, 20 mm to 130 mm high and 5 mm to 50 mm deep.

In some embodiments, base portion 1712 is approximately 20 mm to 600 mm wide, 10 mm to 150 mm high and 10 mm to 150 mm deep. In some embodiments, base portion 1712 is 20 mm to 200 mm wide, 10 mm to 100 mm high and 10 mm to 80 mm deep. In some embodiments, base portion 1712 is 20 mm to 130 mm wide, 10 mm to 50 mm high and 10 mm to 50 mm deep.

As provided herein, opening 1720 may be a variety of shapes and/or sizes. For example, opening 1720 may be circular, square, rectangular, polygonal and/or elliptical in shape. Alternatively, opening 1720 may be slot shaped having a straight, curved or undulating shape or pattern. When opening 1720 is circular, opening 1720 may be approximately 0.5 mm to 30 mm in diameter. In some embodiments, circular opening 1720 is approximately 0.5 mm to 20 mm in diameter. In some embodiments, circular opening 1720 is approximately 0.5 mm to 15 mm in diameter. When opening 1720 is slot shaped, opening 1720 may be approximately 2 mm to 30 mm wide and 5 mm to 500 mm long. In some embodiments, slot shaped opening 1720 is approximately 2 mm to 20 mm wide and 5 mm to 200 mm long. In some embodiments, slot shaped opening 1720 is approximately 2 mm to 15 mm wide and 5 mm to 100 mm long.

In some embodiments, opening 1720 covers all or a portion of front housing 1718. For example, opening 1720 may cover a range of approximately 1% to 75% of the surface area of front housing 1718. In some embodiments, opening 1720 covers approximately 5% to 50% of the surface area of front housing 1718. In some embodiments, opening 1720 covers approximately 10% to 30% of the surface area of front housing 1718.

Figure 84:
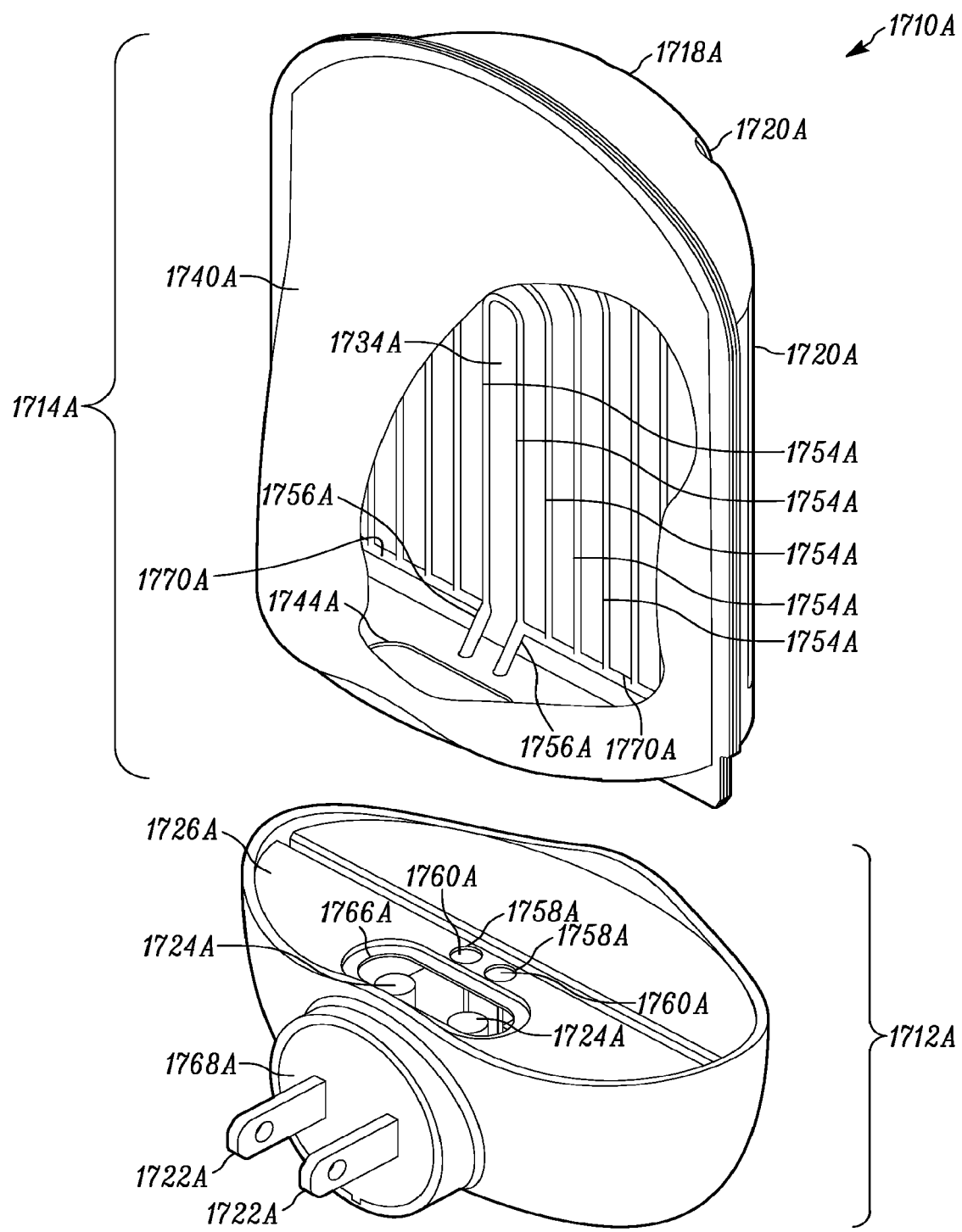
FIG. 84 is a front perspective view of an example of the seventeenth embodiment of an insect trap in accordance with the principles of the disclosure.

FIG. 84 is a front perspective view of an example of the seventeenth embodiment of an insect trap, indicated generally at 1710A. Insect trap 1710A includes a base portion 1712A and a removable trap portion 1714A. Trap portion 1714A is shown partially cut away and removed from base portion 1712A in this view. Trap portion 1714A includes a front housing 1718A with at least one opening 1720A, a divider 1734A, and a rear housing 1740A. Affixed to a rear surface of divider 1734A is a heating element such as one or more heating wires 1754A mounted on its rear surface. Heating wires 1754A may be configured in a uniform pattern to produce heat in response to electric power. Heating wires 1754A are connected to a plurality of busses 1770A, which, in turn, are electrically connected to a corresponding plurality of trap wires 1756A. While two trap wires 1756A and two busses 1770A are shown, any suitable number may be used. In some embodiments, trap wires 1756A are electrically connected to busses 1770A with solder. In some embodiments, heating wires 1754A may be made of resistance wires glued or otherwise affixed to the rear surface of divider 1734A in a uniformly-spaced pattern and configured to produce heat in response to electric current. In some embodiments, heating wires 1754A may be of conductive polymer or other conductive material applied directly to the rear surface of divider 1734A. In some embodiments, heating wires 1754A may be of a self-correcting conductive polymer or other self-correcting conductive material that increases its internal resistance at higher temperatures and transfers electrical power from warmer regions to cooler ones, thereby improving temperature uniformity across heating wires 1754A and divider 1734A. In some embodiments busses 1770A may be made of highly conductive metal such as copper. In some embodiments, heating wires 1754A and busses 1770A both may be made of conductive polymer. In some embodiments, heating wires 1754A may be of a transparent or translucent material. In some embodiments, heating wires 1754A are replaced by a thin, transparent layer of metal oxide (not shown) on the rear surface of divider 1743A that is electrically connected at opposite sides of the rear surface of divider 1734A and produces heat in response to electric current. In general, the heat generated may increase and maintain the temperature of at least a portion of adhesive to between approximately 30 degrees C. and 45 degrees C., and to preferably between approximately 33 degrees C. and 42 degrees C., in order to mimic the skin and body temperatures of mammals. In some embodiments, heat alone is used as an attractant, and a light source is not used in insect trap 1710A.

Rear housing 1740A may include an opening 1744A on its bottom surface, or alternatively opening 1744A may be replaced by a transparent or translucent window (not shown). Protruding from a rear surface 1768A of base portion 1712A are a plurality of electrically conductive prongs 1722A, adapted to mount insect trap 1710A to a wall and provide power to insect trap 1710A by inserting conductive prongs 1722A into a standard household electrical wall socket. Base portion 1712A includes a lighting element such as one or more LEDs 1724A. A top surface 1726A of base portion 1712A includes an opening 1766A. Mounted in one or more additional openings 1758A in top surface 1726A of base portion 1712A are a plurality of electrical base contacts 1760A. While two base contacts 1760A are shown, any suitable number may be used.

Figure 85:
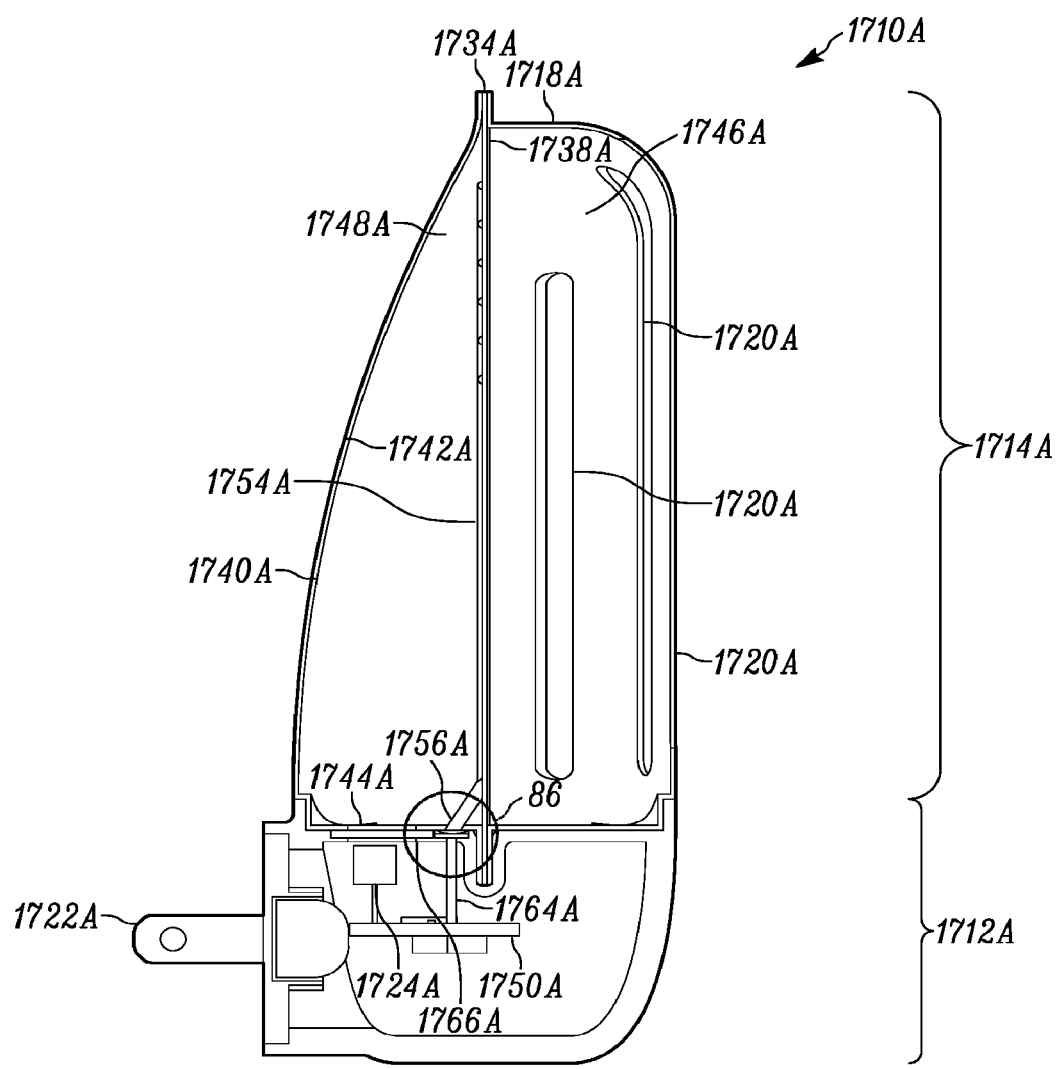
FIG. 85 is a cross-sectional view of the insect trap of FIG. 84.
Figure 86:
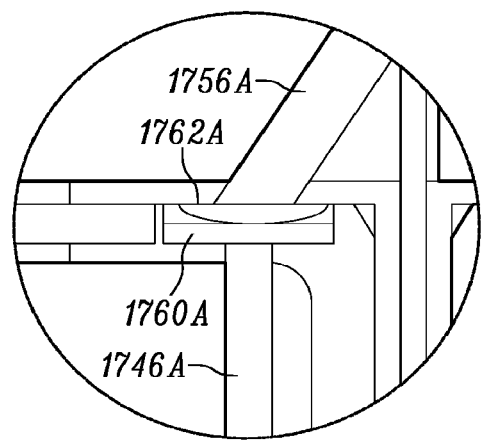
FIG. 86 is an enlarged view of a portion of FIG. 85.

FIG. 85 is a cross-sectional, cut-away view of insect trap 1710A showing the interiors of base portion 1712A and trap portion 1714A, and FIG. 86 is an enlarged view of a portion of FIG. 85. Divider 1734A is constructed from or includes a transparent or translucent material and may be coated with a transparent or translucent adhesive n its front surface 1738A. In some embodiments, front housing 1718A and rear housing 1740A are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1718A and rear housing 1740A are constructed by injection molding or by other suitable manufacturing techniques. In some embodiments, front housing 1718A, divider 1734A and rear housing 1740A are joined together at where they intersect or engage by ultrasonic welding or high frequency (HF) welding, although they may also be permanently or removably joined together by gluing or by any other suitable assembly method. Divider 1734A separates trap portion 1714A into a front enclosure 1746A and a rear enclosure 1748A. Rear housing 1740A includes an inside surface 1742A and a plurality of electrical trap contacts 1762A (only one of which is shown) that correspond to base contacts 1760A (only one of which is shown) in base portion 1712A. Trap contacts 1762A are electrically connected to trap wires 1756A (only one of which is shown) and are configured to create an electrical contact with base contacts 1760A when trap portion 1714A is mounted to base portion 1712A. In some embodiments, base portion 1712A includes a circuit board 1750A, having a programmable processor or chip (not shown) for executing commands, electrically connected to conductive prongs 1722A (only one of which is shown), LEDs 1724A (only one of which is shown), and a plurality of electric base wires 1764A (only one of which is shown), that correspond to base contacts 1760A. Circuit board 1750A may be electrically connected to conductive prongs 1722A, LEDs 1724A, and base wires 1764A, which, in turn, may be electrically connected to their corresponding base contacts 1760A. Accordingly, heating wires 1754A may be electrically connected to circuit board 1750A when trap portion 1714A is mounted to base portion 1712A. For clarity, however, not all of the electrical connections are shown. Circuit board 1750A may include electronic circuitry to receive ordinary household current from conductive prongs 1722A and provide power to illuminate LEDs 1724A and to activate heating wires 1754A.

In the operation of insect trap 1710A, conductive prongs 1722A are inserted into a wall electrical socket, and circuit board 1750A provides power to LEDs 1724A and to heating wires 1754A. Heating wires 1754A generate heat and warm divider 1734A, which, in turn, warms adhesive. In some embodiments, circuit board 1750F is configured to monitor the current through heating wires 1754A and respond to temperature-related changes in resistance by increasing or decreasing voltage through heating wires 1754A, thereby warming adhesive to a steady, uniform temperature. LEDs 1724A emit light, which transmits through opening 1766A in base portion 1712A, through opening 1744A in rear housing 1740A of trap portion 1714A, into rear enclosure 1748A, and directly onto inside surface 1742A of rear housing 1740A and rear surface of divider 1734A. Thereafter, light transmits through divider 1734A and adhesive on front surface 1738A, and into front enclosure 1746A. Heating wires 1754A are sufficiently thin to obstruct only a small fraction of the light transmitting through adhesive. A portion of the light entering front enclosure 1746A continues through opening 1720A in front housing 1718A and emits into the surrounding area where the trap is installed. Insects are attracted to the light and heat transmitted through adhesive and through opening 1720A in front housing 1718A. Insects fly or crawl into opening 1720A and onto adhesive 1736A, where they become trapped. A user may observe trapped insects by looking through opening 1720A in front housing 1718A. When a sufficient number of insects have been trapped, the user may easily remove and discard the entire used trap portion 1714A without touching trapped insects, insect debris or adhesive, which remain out of reach inside trap portion 1714A, and replace it with a new trap portion 1714A. New trap portion 1714A has fresh adhesive-coated surfaces and light-directing surfaces, ensuring that insect trap 1710A will continue to efficiently and effectively attract and trap insects.

Figure 87:
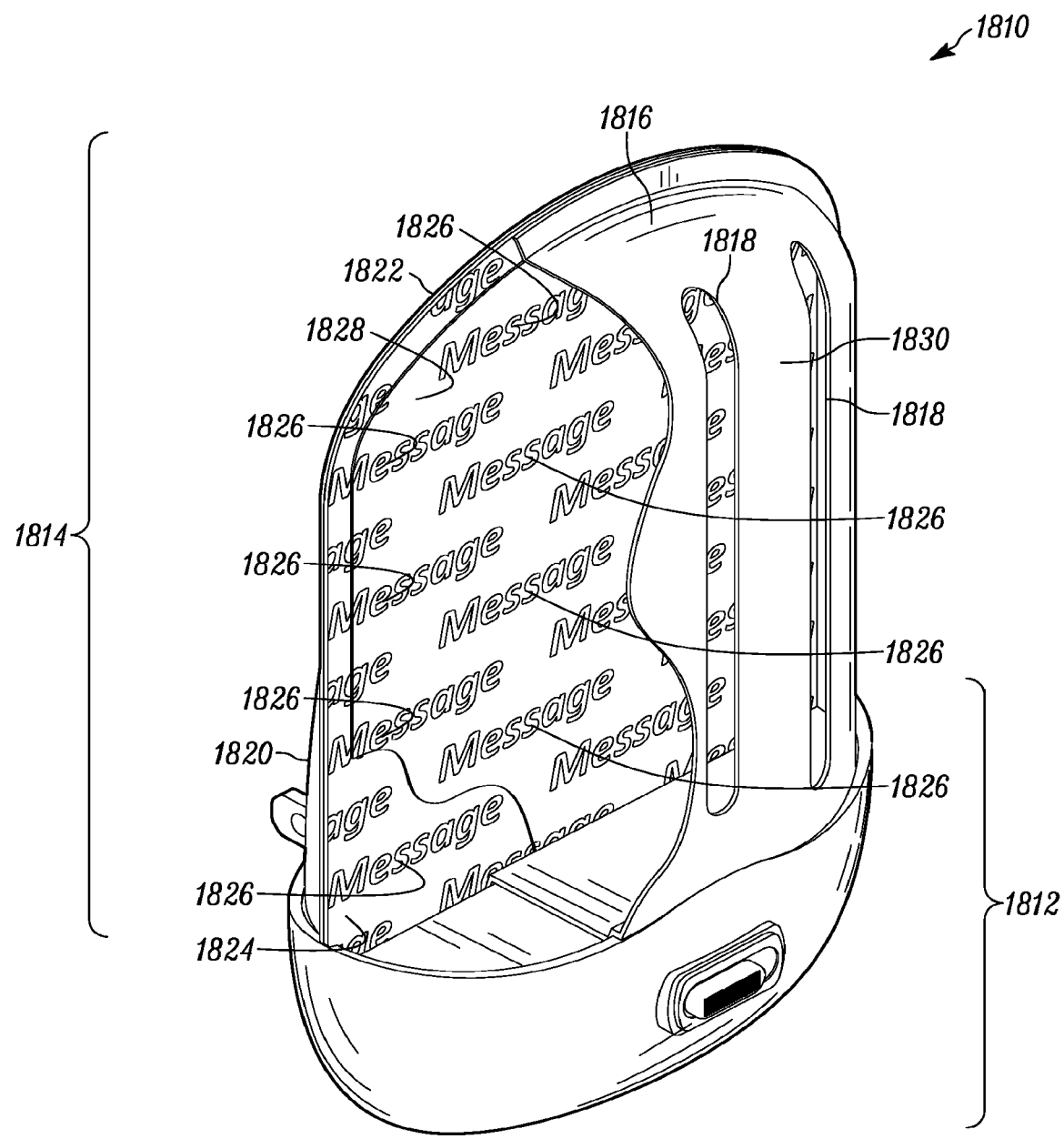
FIG. 87 is a front perspective view of an eighteenth embodiment of an insect trap in accordance with principles of the disclosure.

FIG. 87 is a front perspective view of an eighteenth embodiment of an insect trap, indicated generally at 1810. Trap portion 1814 is shown partially cut away in this view. Insect trap 1810 includes a base portion 1812 and a removable trap portion 1814. Base portion 1812 may be identical or similar to the base portions of other embodiments described previously. Trap portion 1814 may have a front housing 1816 with at least one opening 1818 in a front surface 1830, a rear housing 1820, and a transparent or translucent divider 1822 with a front surface 1824. Opening 1818 in front housing 1816 may be configured to admit a wide variety of insects into insect trap 1810, or alternatively it may be configured to admit one or more specific insect species. In some embodiments, opening 1818 is configured to prevent user's fingers from penetrating opening 1820 and inadvertently touching trapped insects or adhesive when removing and replacing trap portion 1814. In some embodiments, opening 1818 has a size and shape such that a sphere 25 mm in diameter cannot pass through opening 1818, and has a size and shape such that a sphere 1 mm in diameter can pass through any portion of opening 1820. Opening 1818 may be of uniform or of varying width, shape and orientation, and if trap portion 1814 has more than one opening 1818, they may be of identical or of differing widths, shapes and orientations. Opening 1818 may be configured to attract one or more individual insect species or a variety of insect species. In some embodiments, divider 1822 is configured to polarize light transmitted through it in an orientation similar to that of daylight to further attract flying insects, a wide variety of which are known to detect polarized light. In some embodiments, a text or graphics 1826 is applied to front surface 1824 of divider 1822, although text or graphics 1826 may be applied instead to the rear surface (not shown) of divider 1822, or it may be applied to both sides of divider 1822. Text or graphics 1826 may be applied by traditional printing, hot stamping, silk screening, inkjet printing, or any method or process by which text or graphics 1826 may be applied to front surface 1824 and/or rear surface (not shown) of divider 1822. Alternatively, a thin transparent or translucent film with the text or graphics applied to its front or rear surface or to both surfaces may be affixed to front surface 1824 of divider 1822. Alternatively, text or graphics 1826 may be embossed or raised on front surface 1824 or the rear surface (not shown) of divider 1822 by embossing, engraving or molding, such that text or graphics 1826 appears darker or lighter than the surrounding area when light is transmitted through divider 1822. A transparent or translucent coating of adhesive 1828 is applied over front surface 1824 of divider 1822 and over text or graphics 1826. Text or graphics 1826 may be visible through adhesive 1828 either in ordinary ambient light or when illuminated from behind or both. Alternatively, text or graphics 1826 may be applied in fluorescent pigments, which appear to glow when illuminated by ultraviolet light. Text or graphics 1826 may be in the form of a repeated message or brand name or company logo such that text or graphics 1826 may appear repeatedly on front surface 1824 of divider 1822, thereby eliminating alignment and printing registration issues during manufacture. Because text or graphics 1826 is visible through opening 1818 in front housing 1816, text or graphics 1826 may not be fully visible or legible unless it is viewed from a short distance, such as when a user may look closely through opening 1818 to observe insects trapped in adhesive 1828, or when the user may remove trap portion 1814 from base portion 1812 for disposal and replacement, both of which may be opportunities to remind the user of the brand name and/or logo of the insect trap, of use or disposal instructions, or of any other message or messages. Because text or graphics 1826 may not be fully visible or legible when viewed from a distance, text or graphics 1826 may not affect the appearance of the room in which insect trap 1810 is installed. When insect trap 1810 is in operation, divider 1822 and text or graphics 1826 are illuminated from behind, and text or graphics 1826 may appear as sharp light/dark contrast areas, which are highly visible to a wide variety of insects and may be more attractive to them. Text or graphics 1826 applied to front surface 1824 of divider 1822 may be visible when illuminated from behind as well as when not illuminated from behind, whereas text or graphics 1826 applied to the rear surface of divider 1822 may only be visible when illuminated from behind. Accordingly, when text or graphics 1826 are applied to both sides of divider 1822, different messages or graphics or combinations of messages or graphics may be displayed when insect trap 1810 is in operation and divider 1822 is illuminated from behind and when insect trap 1810 is not in operation.

Figure 88:
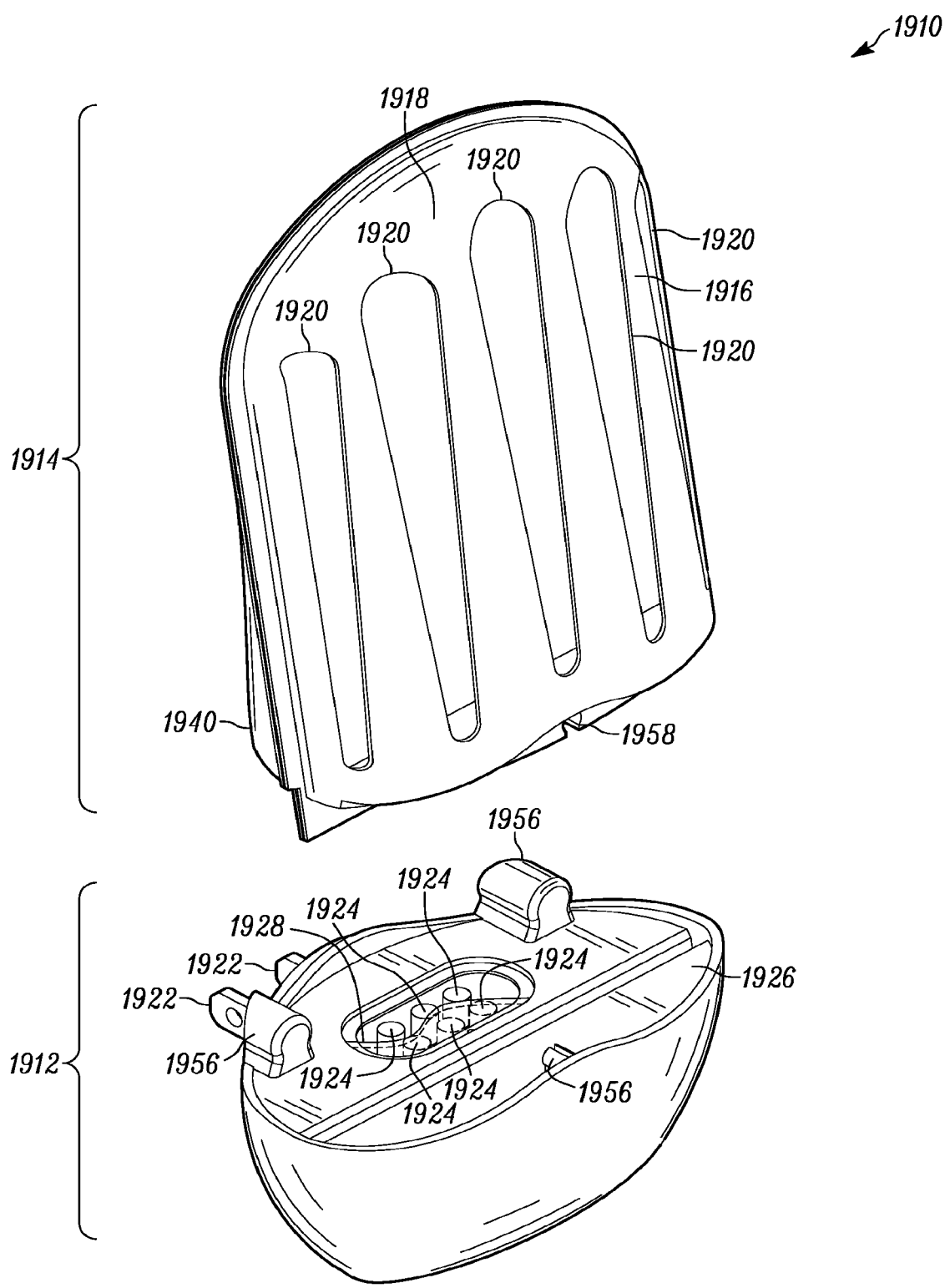
FIG. 88 is a front perspective view of a nineteenth embodiment of an insect trap in accordance with principles of the disclosure.
Figure 89:
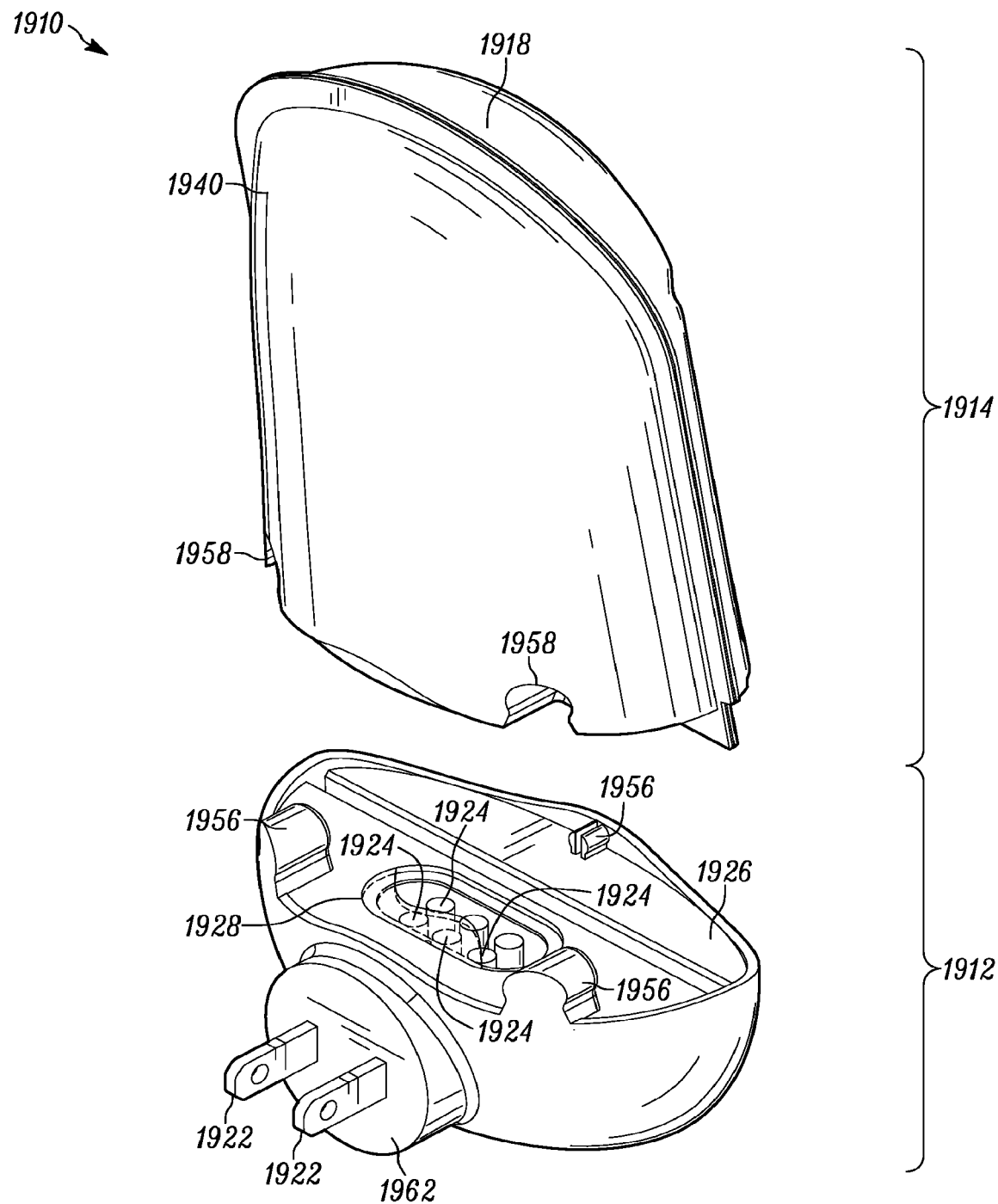
FIG. 89 is a rear perspective view of the insect trap of FIG. 88.

FIG. 88 is a front perspective view and FIG. 89 is a rear perspective view of a nineteenth embodiment of an insect trap, indicated generally at 1910. Insect trap 1910 includes a base portion 1912 and a removable trap portion 1914. Trap portion 1914 is shown removed from base portion 1912 in both views. Insect trap 1910 may have an overall length, an overall width and an overall depth, and may be configured such that when insect trap 1910 is mounted to a wall, its overall depth, defined by the overall distance insect trap 1910 protrudes from the wall, is the smallest of the three overall dimensions. Trap portion 1914 includes a front housing 1918 with at least one opening 1920 and a rear housing 1940. Trap portion 1914 may have an overall length, an overall width and an overall depth, and may be configured such that when trap portion 1914 is mounted in insect trap 1910, and insect trap 1910 is mounted to a wall, the overall depth of trap portion 1914, which is measured in the direction perpendicular to the wall, is the smallest of the three overall dimensions of trap portion 1914. Trap portion 1914 and base portion 1912 is configured such that trap portion 1914 engages with a top surface 1926 of base portion 1912 when trap portion 1914 is mounted to base portion 1912. Trap portion 1914 includes a front housing 1918 with at least one opening 1920 in a front surface 1916, and a rear housing 1940. Opening 1920 in front housing 1918 may be configured to admit a wide variety of insects into insect trap 1910, or alternatively it may be configured to admit one or more specific insect species. In some embodiments, opening 1920 is configured to prevent the user's fingers from penetrating opening 1920 and inadvertently touching trapped insects or adhesive when removing and replacing trap portion 1914. In some embodiments, opening 1920 has a size and shape such that a sphere 25 mm in diameter cannot pass through opening 1920, and has a size and shape such that a sphere 1 mm in diameter can pass through any portion of opening 1920. Opening 1920 may be of uniform or of varying width, shape and orientation, and if trap portion 1914 has more than one opening 1920, they may be of identical or of differing widths, shapes and orientations. Opening 1920 may be configured to attract one or more individual insect species or a variety of insect species. In some embodiments, front housing 1918 has one or more ribs or other relief features (not shown) to provide increased stiffness and strength, particularly around opening 1920.

In some embodiments, base portion 1912 may have a substantially flat or concave surface (not shown) or one or more protrusions (not shown) on its bottom surface to enable insect trap 1910 to remain upright when insect trap 1910 placed on a flat, horizontal surface such as the floor or on a shelf for storage. Protruding from a rear surface 1962 (shown in FIG. 89) of base portion 1912 are a plurality of electrically conductive prongs 1922, adapted to mount insect trap 1910 to a wall and provide power to insect trap 1910 by inserting conductive prongs 1922 into a standard household electrical wall socket. Alternatively, conductive prongs 1922 may be adapted to swivel to allow insect trap 1910 to remain upright when conductive prongs 1922 are inserted into a horizontally oriented electrical wall socket. Alternatively, base portion 1912 may be configured to sit or hang wherever desired and receive power from batteries (not shown) mounted in base portion 1912. While an electrical socket and batteries have been described as providing power to insect trap 1910, any suitable power source may be used. Base portion 1912 includes a top surface 1926 and a lighting element such as one or more LEDs 1924. In some embodiments, base portion 1912 includes an array of LEDs 1924. As shown, LEDs 1924 are configured in a 2 by 3 array of blue and UV LEDS 1924, although different array configurations with different numbers and arrangements (e.g., a 3 by 2 array or a 4 by 3 array or a 1 by 2 array, for example) of LEDs 1924, LEDs 1924 emitting different wavelengths of light, and different combinations of LEDs 1924 emitting different wavelengths of light, could also be used. In some embodiments, LEDs 1924 include at least one that emits UV light and at least one that emits visible light. In some embodiments, LEDs 1924 include at least one that emits UV light and at least one that emits blue light to better attract a wide variety of insect species. In some embodiments, the lighting element emits a combination of wavelengths to mimic sunlight. In some embodiments, LEDs 1924 include at least one that emits IR light to better attract certain species of insects including mosquitos. Mounted in top surface 1926 of base portion 1912 may be a transparent or translucent window 1928, shown partially cut away to reveal LEDs 1924. Window 1928 protects LEDs 1924 from dust and insect debris, and allows base portion 1912 to be easily cleaned. In some embodiments, top surface 1926 has one or more snap protrusions 1956, preferably on the front and rear portions of top surface 1926, although snap protrusions 1956 may be located anywhere on top surface 1926. In some embodiments, snap protrusions 1956 are configured such that at least a portion of their distal portions are larger in width and/or depth than at least a portion of their proximal portions, thereby creating features known as undercuts. Front housing 1918 and/or rear housing 1940 of trap portion 1914 may have one or more snap recesses 1958 that correspond in size, shape and location to snap protrusions 1956 on base portion 1912, except that the undercuts on snap recesses 1958 may be configured such that at least a portion of their proximal portions are larger in width and/or depth than at least a portion of their distal portions. When trap portion 1914 is mounted to base portion 1912, the undercuts on snap protrusions 1956 and the undercuts on snap recesses 1958 engage to create a secure but removable attachment known as a snap fit. The snap fit between base portion 1912 and trap portion 1914 may provide a positive tactile and audible cue to reassure a user that trap portion 1914 is properly engaged with base portion 1912. The snap fit between base portion 1912 and trap portion 1914 may allow trap portion 1914 to be securely but removably mounted to base portion 1912 when insect trap 1910 is in use, and may allow the user to easily remove trap portion 1914 from base portion 1912 without damaging trap portion 1914 or base portion 1912 and without the user contacting trapped insects. In some embodiments, the snap fit between base portion 1912 and trap portion 1914 is configured to allow the user to easily remove and replace trap portion 1914 from base portion 1912 using only one hand, while base portion 1912 remains securely but removably plugged into an electrical wall socket. In some embodiments, the snap fit between base portion 1912 and trap portion 1914 is configured to allow trap portion 1914 to be mounted to base portion 1912 with a downward force of not greater than e.g., 50 Newtons, and to allow trap portion 1914 to be removed from base portion 1912 with an upward force of not greater than e.g., 50 Newtons.

Figure 90:
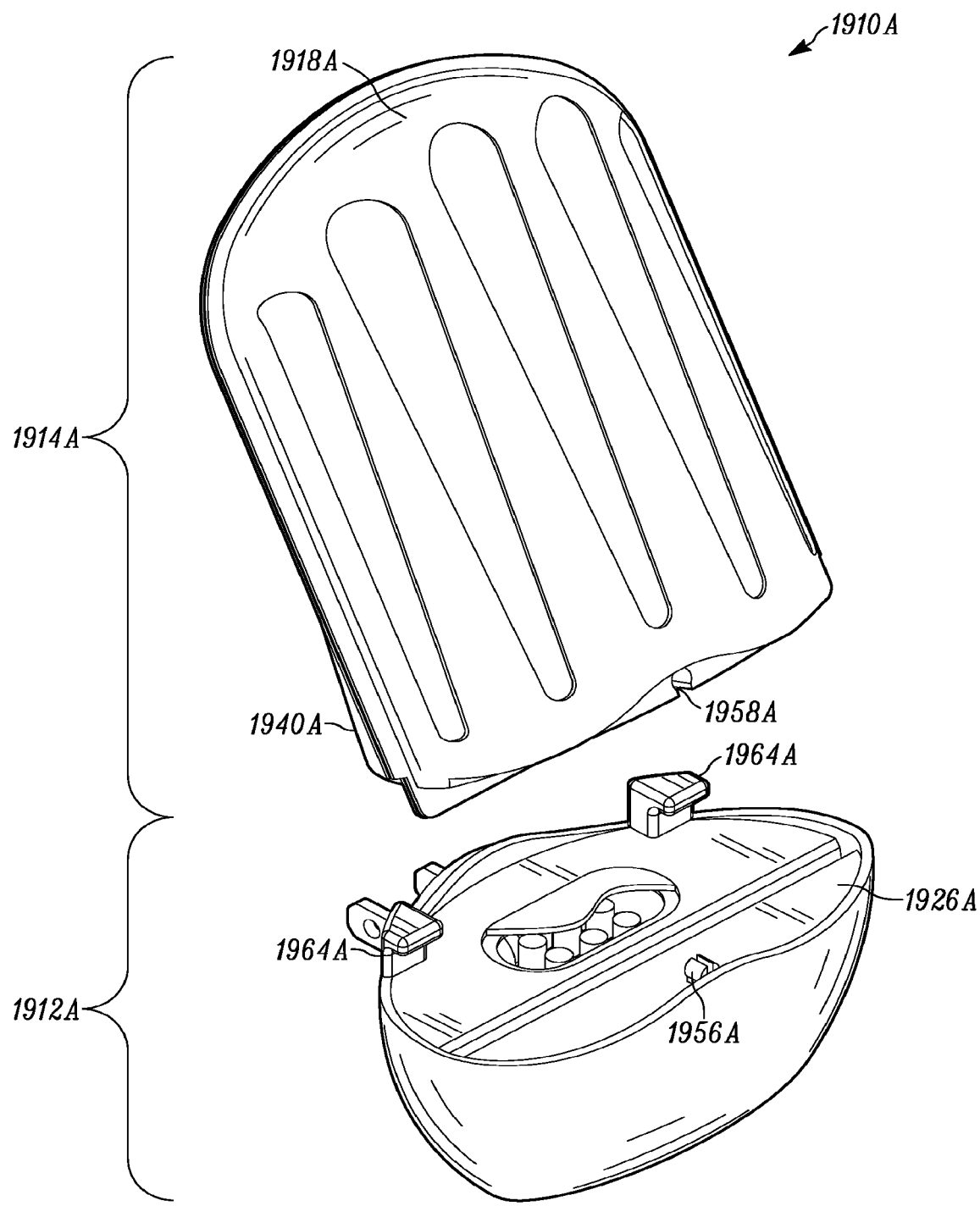
FIG. 90 is a front perspective view of an example of the nineteenth embodiment of an insect trap in accordance with the principles of the disclosure.
Figure 91:
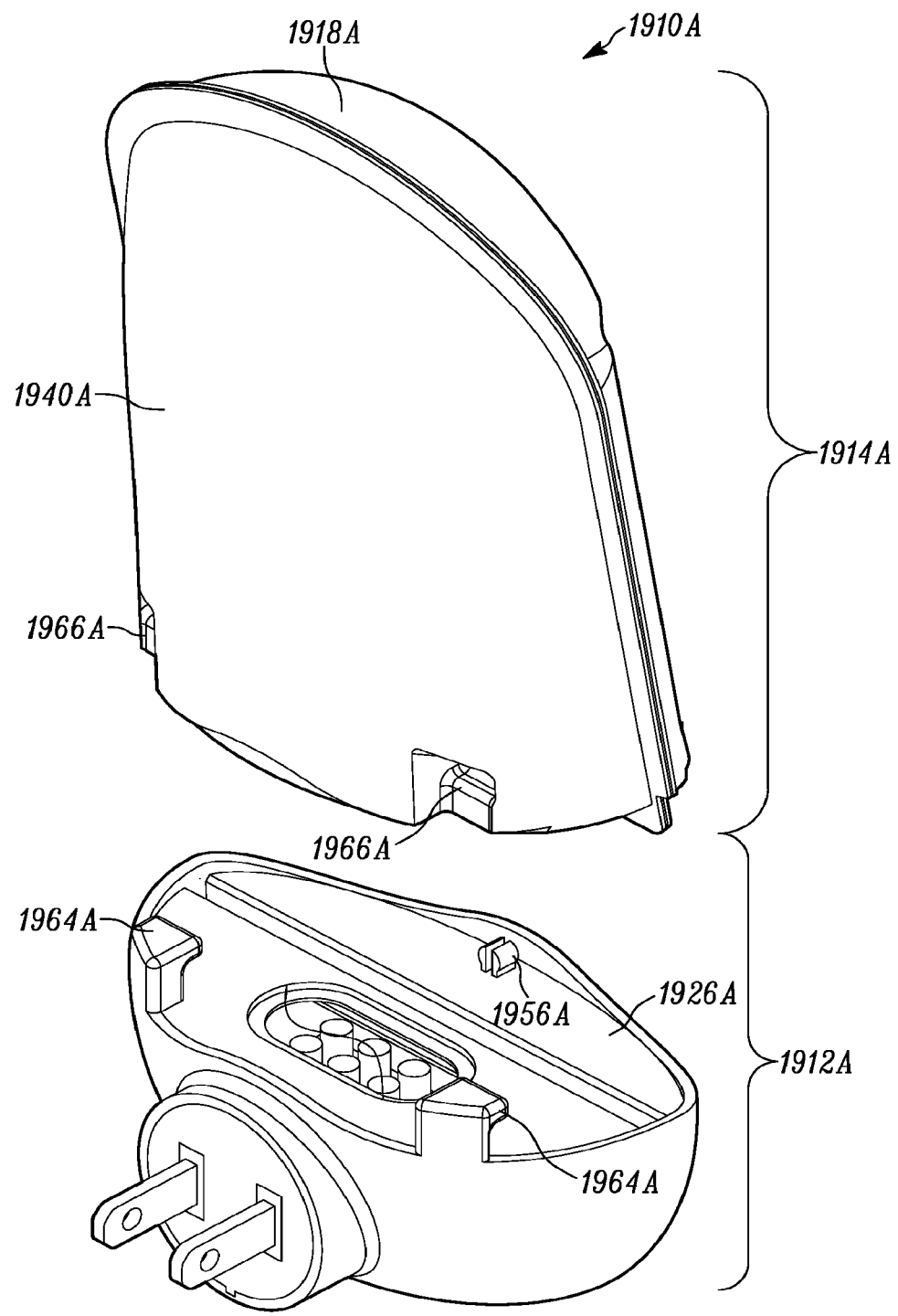
FIG. 91 is a rear perspective view of the insect trap of FIG. 90.

Although a snap fit may be preferred, other features or combinations of features may be contemplated to securely but removably attach trap portion 1914 to base portion 1912. FIG. 90 is a front perspective view and FIG. 91 is a rear perspective view of an example of the nineteenth embodiment of an insect trap, indicated generally at 1910A. Insect trap 1910A includes a base portion 1912A and a removable trap portion 1914A. Trap portion 1914A is shown removed from base portion 1912A in these views. Base portion 1912A includes a top surface 1926A, at least one snap protrusion 1956A on a front portion of top surface 1926A and at least one hook protrusion 1964A on a rear portion of top surface 1926A. Trap portion 1914A includes a front housing 1918A, a rear housing 1940A, at least one snap recess 1958A on front housing 1918A, and at least one hook recess 1966A on rear housing 1940A. Snap recess 1958A corresponds in size, shape and location to snap protrusion 1956A on base portion 1912A, and snap recess 1958A and hook recess 1966A are configured to engage with snap protrusion 1956A and hook protrusion 1964A, respectively, when trap portion 1914A is mounted on base portion 1912A.

Figure 92:
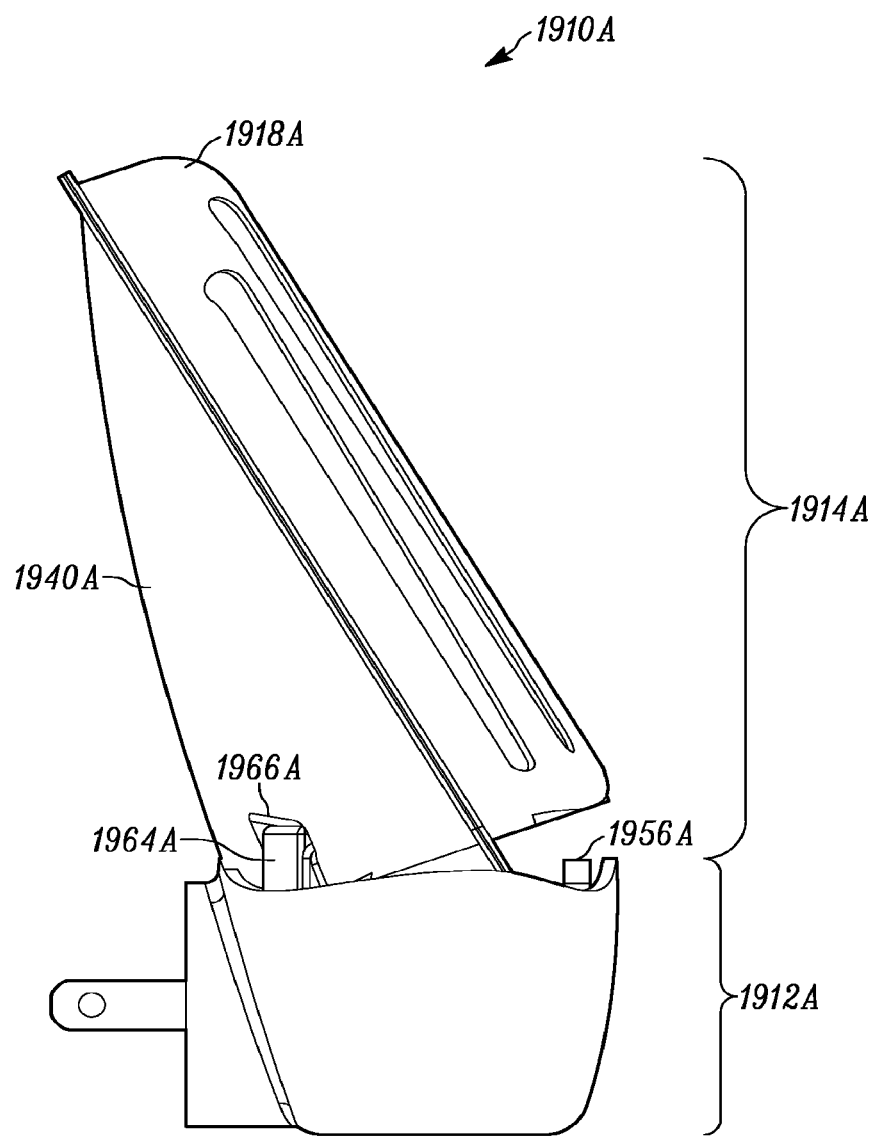
FIG. 92 is a side view of the insect trap of FIG. 90.

FIG. 92 is a left side view of insect trap 1910A. Trap portion 1914A is shown partially mounted on base portion 1912A in this view. To mount trap portion 1914A on base portion 1912A, trap portion 1914A is first tilted back (e.g., counterclockwise in this view) slightly and lowered onto base portion, so that hook recess 1966A on trap portion 1914A is engaged with hook protrusion 1964A on base portion 1912A, as shown. Then trap portion 1914A is tilted forward (e.g., clockwise in this view), thereby engaging snap recess 1958A (not shown in this view) onto snap protrusion 1956A and providing a positive tactile and audible cue to assure the user that trap portion 1914A is properly engaged with base portion 1912A. To remove trap portion 1914A from base portion 1912A, trap portion 1914A is tilted back (e.g., counterclockwise in this view), thereby disengaging snap recess 1958A from snap protrusion 1956A, and then pulling trap portion 1914A slightly forward and lifting it from base portion 1912A. Because user can hold and apply force to the top portion of trap portion 1914A to tilt it forward, thereby engaging snap recess 1958A on snap protrusion 1956A, and to tilt it backward, thereby disengaging snap recess 1958A from snap protrusion 1956A, and because the distance from the top portion of trap portion 1914A to hook recess 1966A is larger than the distance between hook protrusion 1964A and snap protrusion 1956A, the force required to tilt trap portion 1914A forward and mount trap portion 1914A on base portion 1912A and the force required to tilt trap portion 1914A backward and unmount trap portion 1914A from base portion 1912A is significantly reduced. Alternatively, this mechanical advantage could allow for a more robust attachment of trap portion 1914A onto base portion 1912A without increasing the force needed to remove and replace trap portion 1914A.

Figure 93:
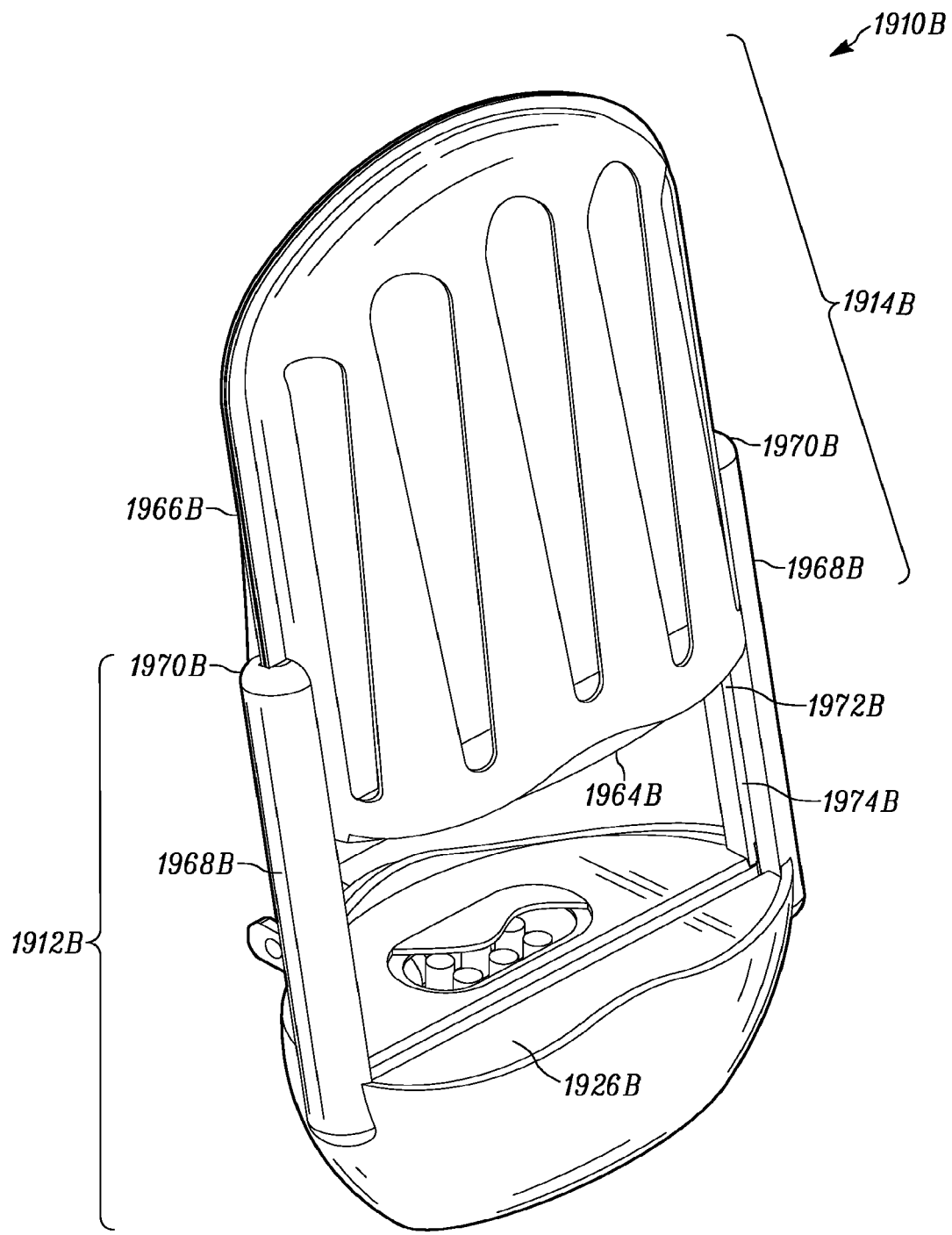
FIG. 93 is a front perspective view of an example of the nineteenth embodiment of an insect trap in accordance with the principles of the disclosure.

FIG. 93 is a front perspective view of an example of the nineteenth embodiment of an insect trap, indicated generally at 1910B. Insect trap 1910B includes a base portion 1912B with a top surface 1926B and a removable trap portion 1914B with a bottom surface 1964B and side flanges 1966B (only one of which is shown). Trap portion 1914B is shown partially removed from base portion 1912B in this view. Base portion 1914B includes two side rails 1968B protruding upward from each side of base portion 1912B roughly the length of trap portion 1914B. Each of side rails 1968B includes a distal end 1970B and an inner surface 1972B (only one of which is shown) with a channel 1974B (only one of which is shown) that extends from top surface 1926B of base portion 1912B through the distal end 1970B of side rail 1968B. Channels 1974B are configured to receive side flanges 1966B of trap portion 1914B such that trap portion 1914B may slide freely up and down side rails 1968B.

To mount trap portion 1914B on base portion 1912B, side flanges 1966B near bottom surface 1964B of trap portion 1914B are aligned with channels 1974B at distal ends 1970B of side rails 1968B on base portion 1912B, then trap portion 1914B is released, allowing trap portion 1914B to slide down side rails 1968B until bottom surface 1964B of trap portion 1914B contacts top surface 1926B of base portion 1912B. To remove trap portion 1914B from base portion 1912B, trap portion 1914B is lifted upward, allowing trap portion 1914B to slide up side rails 1968B until side flanges 1966B disengage with channels 1974B. Accordingly, removing and replacing trap portion 1914B is simple and intuitive.

Other configurations are contemplated to securely but removably attach trap portion 1914B to base portion 1912B. In some embodiments, a magnet or magnets (not shown) in base portion 1912B may attract a ferrous metal component or components (not shown) in trap portion 1914B to securely but removably attach trap portion 1914B to base portion 1912B. In some embodiments, an electromagnet or electromagnets (not shown) in base portion 1912B may replace the role of magnet or magnets.

Figure 94:
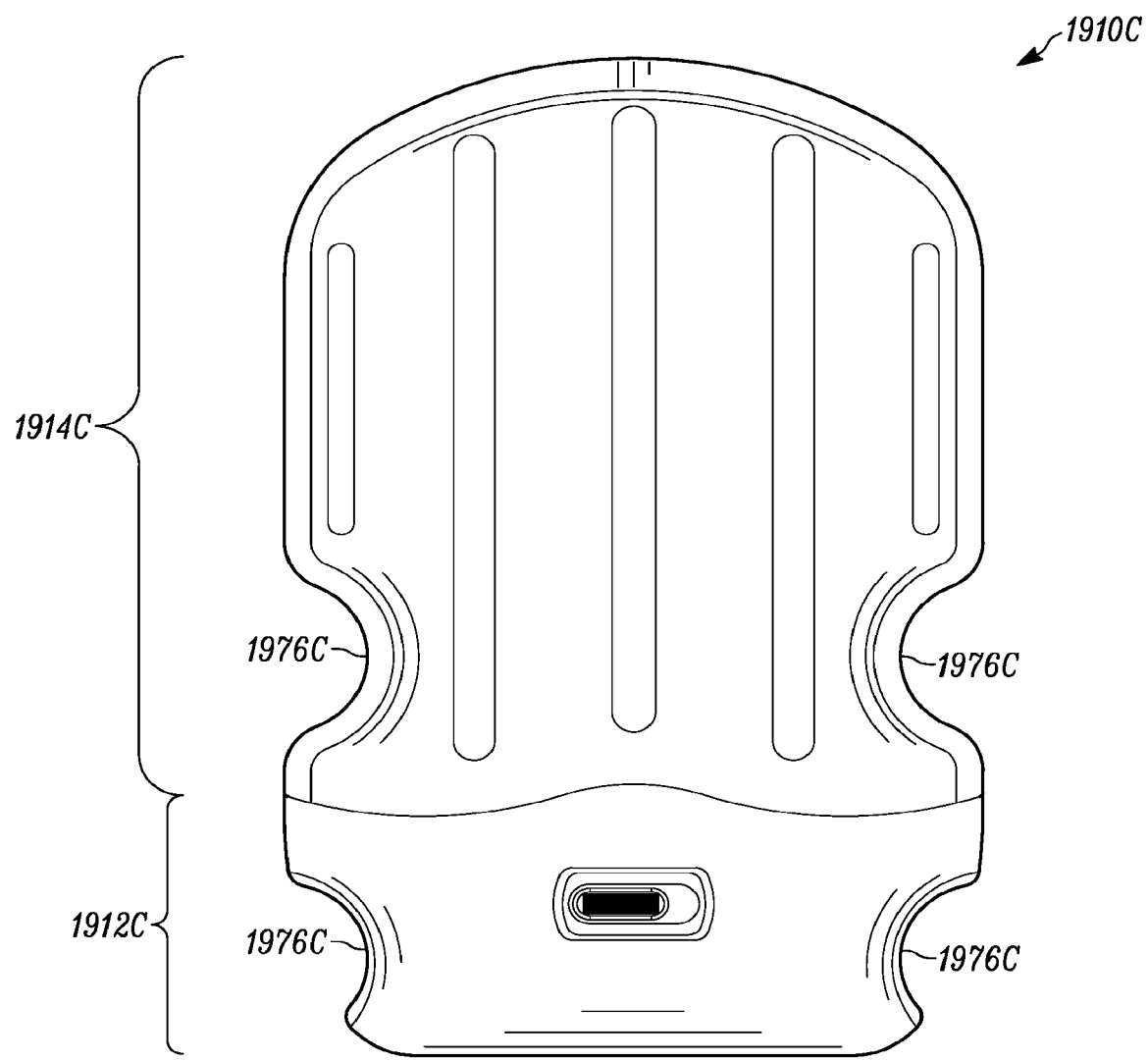
FIG. 94 is a front view of an example of the nineteenth embodiment of an insect trap in accordance with the principles of the disclosure.

FIG. 94 is a front view of an example of the nineteenth embodiment of an insect trap, indicated generally at 1910C. Insect trap 1910C includes a base portion 1912C and a removable trap portion 1914C. Base portion 1912C and trap portion 1914C include one or more grip features 1976C. Grip features 1976C may enhance the user's grip on base portion 1912C and/or trap portion 1914C when installing insect trap 1910C and/or when removing and replacing trap portion 1914C. As shown, both base portion 1912C and trap portion 1914C include grip features 1976C. In some embodiments, only trap portion 1914C may include grip features 1976C, or only base portion 1912C may include grip features 1976C. Grip features 1976C are shown as side recesses configured to conform to the fingers of the user, although grip features 1976C may also take the form of ribs, bumps, waves or any other positive or negative shape of any size and on any part of base portion 1912C or trap portion 1914C. Grip features 1976C may be molded, thermoformed, cut, machined or stamped directly into base portion 1912C and trap portion 1914C components prior to assembly, during assembly or after assembly. Grip features 1976C may allow for easier installation of insect trap 1910C and easier removal and replacement of trap portion 1914C on base portion 1912C. Alternatively, grip features 1976C may allow for a more secure removable attachment between base portion 1912C and trap portion 1914C without compromising ease of removing and replacing trap portion 1914C.

Figure 95:
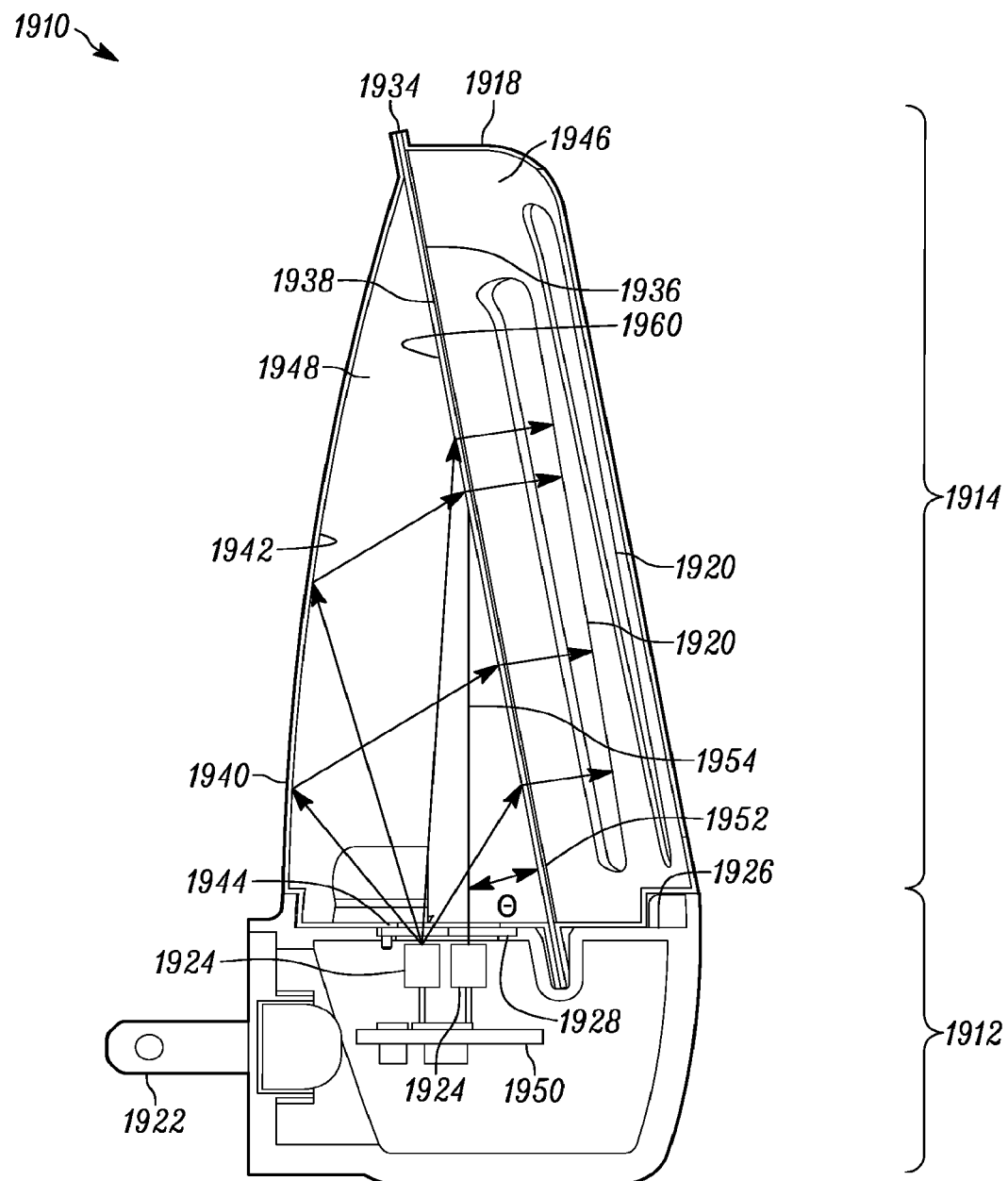
FIG. 95 is a cross-sectional view of the insect of FIG. 90.

Returning now to insect trap 1910, FIG. 95 is a cross-sectional view of insect trap 1910. In some embodiments, the light emitted from each of LEDs 1924 has a primary direction 1954. Trap portion 1914 includes a divider 1934 with a front surface 1938. In some embodiments, divider 1934 is constructed from or includes a transparent or translucent material and may be coated with a transparent or translucent adhesive 1936 on front surface 1938. In some embodiments, divider 1934 is configured to polarize light transmitted through it in an orientation similar to that of daylight to further attract flying insects, a wide variety of which are known to detect polarized light. In some embodiments, the material and thickness of divider 1934 and the material and thickness of adhesive 1936 are selected to transmit a substantial proportion of the UV and/or visible and/or IR light, for example greater than 60% of the light is transmitted through divider 1934 and adhesive 1936. In some embodiments, rear housing 1940 includes a reflective-coated inside surface 1942. Alternatively, the material and surface finish of rear housing 1940 may be configured to reflect and disperse UV and/or visible and/or IR light without a reflective coating. Rear housing 1940 may include an opening 1944 on its bottom surface, or alternatively opening 1944 may be replaced by a transparent or translucent window (not shown).

In some embodiments, front housing 1918 and rear housing 1940 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1918 and rear housing 1940 are constructed by injection molding or by other suitable manufacturing techniques. As shown, divider 1934 is substantially planar, and may be configured to be parallel to, or at an angle 1952 to primary direction 1954 of the light produced by LEDs 1924. Angle 1952 may preferably be an acute angle to assist in distributing the light evenly over divider 1934, and may preferably be from 0° to 45°. In some embodiments, divider 1934 may be formed into a convex, concave or saddle-shaped contour, or a combination of contours to optimize the even distribution of light. In some embodiments, divider 1934 may have ribs or other features (not shown) that increase adhesive surface area and create regions of light/dark contrast, which are highly visible to a wide variety of insects and may be more attractive to them.

In some embodiments, front housing 1918 may also be coated with transparent, translucent or opaque adhesive (not shown) on its inside surface to provide additional insect trapping efficiency and capacity. In addition, front housing 1918 may also have a reflective coating (not shown) underneath the adhesive coating on its inside surface to enhance its attraction to insects and further improve the insect trapping efficiency and effectiveness.

In some embodiments, front housing 1918, divider 1934 and rear housing 1940 are joined together where they intersect or engage by ultrasonic welding or high frequency (HF) welding, although they may also be permanently or removably joined together by gluing or any other suitable assembly method. The materials of trap portion 1914 may also include one or more insect attractants. For example, trap portion 1914 may be impregnated with one or more of insect-attracting substances known in the art, including sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1910. In such embodiments, the insect attractant is integral to trap portion 1914. Alternatively, the insect attractants may be embedded or contained in a separate piece (not shown) that mounts on an inside surface of front housing 1918 or through an opening in front housing 1918 or on front surface 1916 of front housing 1918 or on front surface 1938 of divider 1934. Alternatively, water may be embedded or contained in the separate piece or container in addition to, or in place of, the one or more insect-attracting substances, as water vapor is a known mosquito attractant. Alternatively, other insect attractants such sugar solution, molasses, or honey may be embedded or contained in the separate piece or container in addition to, or in place of, the one or more insect-attracting substances. Alternatively, a combination of live yeast, sugar, and water, which can produce mosquito-attracting carbon dioxide, may be embedded or contained in the separate piece or container in addition to, or in place of, the one or more insect-attracting substances. It is desirable for such attractants to be detectable by an insect for approximately a 2-meter radius from insect trap 1910. Divider 1934 separates trap portion 1914 into a front enclosure 1946 and a rear enclosure 1948. In some embodiments, base portion 1912 includes a circuit board 1950 having a programmable processor or chip (not shown) for executing commands, electrically connected to conductive prongs 1922, only one of which is shown, and LEDs 1924, only one of which is shown. For clarity, however, not all of the electrical connections are shown. Circuit board 1950 may include electronic circuitry to receive ordinary household current from conductive prongs 1922 and provide power to illuminate LEDs 1924. Circuit board 1950 may include an energy stabilizer such as a full wave rectifier circuit or any other circuit that provides steady voltage to LEDs 1924, although it may also provide a varying voltage to LEDs 1924 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1950 may provide power to LEDs 1924 to provide UV and/or visible and/or IR light, although it may be configured to provide power to only UV LEDs 1924 or to only visible light LEDs 1924 or to only IR LEDs 1924, or to provide variable power to produce combinations of flickering UV and/or visible and/or IR light. Circuit board 1950 may also be configured to drive a transmitter or transceiver such as a piezoelectric speaker (not shown) or other device that may be mounted in base portion 1912 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 1910. It is desirable for such insect-attracting sound to be undetectable by a human beyond approximately a 1-meter distance from insect trap 1910. Circuit board 1950 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 1912 and into trap portion 1914, to attract some insect species, including fleas and mosquitoes. Alternatively, one or more of LEDs 1924 may generate heat, to replace or augment the heat generated by the one or more electrical elements. Alternatively, one or more of LEDs 1924 may be replaced or augmented by one or more incandescent light bulbs to generate both heat and light. In general, the heat generated may increase and maintain the temperature of at least a portion of trap portion 1914 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

In the operation of insect trap 1910, conductive prongs 1922 are inserted into a wall electrical socket, and trap portion 1914 is mounted to base portion 1912 by engaging snap recesses 1958 (not shown) of trap portion 1914 with their corresponding snap protrusions 1956 (not shown) on base portion 1912. LEDs 1924 emit light, represented by arrows, which transmit through window 1928 in base portion 1912, through opening 1944 in rear housing 1940 of trap portion 1914, into rear enclosure 1948, and directly onto inside surface 1942 of rear housing 1940 and onto a rear surface 1960 of divider 1934. For clarity, the arrows representing the light are only shown emitted from one of LEDs 1924. Because the light from LEDs 1924 enters rear enclosure 1948 through opening 1944 in a bottom face of rear housing 1940 (e.g., in a face that is substantially parallel to the overall depth of trap portion 1914), the light can travel the entire length of rear enclosure 1948 and can diverge over the entire length of rear enclosure 1948, and therefore can be more evenly distributed throughout rear enclosure 1948. In some embodiments, light is not manipulated in base portion 1912 and is emitted directly into trap portion 1914. Inside surface 1942 of rear housing 1940 may include a concave shape and may be configured to reflect and disperse the UV and visible light from LEDs 1924 to distribute the light evenly onto rear surface 1960 of divider 1934, although the shape of inside surface 1942 of rear housing 1940 may have a convex shape or a saddle shape or a combination of shapes (not shown), or may also have ribs or other features to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 1960 of divider 1934, may be mounted to rear housing 1940 at or near opening 1944 or to base portion 1912 at or near window 1928, and may replace or augment the role of inside surface 1942 of rear housing 1940. In some embodiments, the light from LEDs 1924 may directly strike rear surface 1960 of divider 1934 at an oblique angle (e.g., an acute angle from approximately 0° to 90°) and may be spread across divider 1934, and may replace or augment the role of inside surface 1942 of rear housing 1940 or of the lens or lenses mounted to rear housing 1940.

Thereafter, light transmits through divider 1934 and adhesive 1936 on front surface 1938, and into front enclosure 1946. The light may be further evenly distributed by the light-diffusing properties of divider 1934, adhesive 1936 on front surface 1938, or both. A portion of the light entering front enclosure 1946 continues through opening 1920 in front housing 1918 and into the area where the trap is installed. Insects are attracted to the UV and/or visible light transmitted through adhesive 1936 and through opening 1920 in front housing 1918, and fly or crawl into opening 1920 and onto adhesive 1936, where they become trapped. A user may observe trapped insects by looking through opening 1920 in front housing 1918. When a sufficient number of insects have been trapped, the user may easily remove and discard the entire used trap portion 1914 without touching the trapped insects, insect debris or adhesive, which remain out of reach inside trap portion 1914, and replace it with a new trap portion 1914. New trap portion 1914 has fresh adhesive-coated surfaces and light-directing surfaces, ensuring that insect trap 1910 will continue to efficiently and effectively attract and trap insects.

In some embodiments, because trap portion 1914 mounts on top of, and not in front of, base portion 1912, insect trap 1910 protrudes minimally from the wall when plugged into an ordinary household wall socket, and therefore intrudes minimally into the home environment. In some embodiments, insect trap 1910 is configured such that when insect trap 1910 is mounted to a wall, its overall depth, defined by the overall distance insect trap 1910 protrudes from the wall, is smaller than its overall height and its overall width.

It should be appreciated that a benefit of insect trap 1910 is the manipulation of light within trap portion 1914. In some embodiments, light manipulation occurs solely within trap portion 1914. Light manipulation may include reflection, refraction, polarization, dispersion and/or diffusion and is achieved by engaging with a manipulative element or surface (e.g., inside surface 1942, divider 1934 and adhesive 1936). In some embodiments, light manipulation produces an even distribution of light on adhesive 1936. In some embodiments, light is manipulated to produce a predetermined pattern on adhesive 1936 or within trap portion 1914, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1910 of this configuration may accommodate a variety of different trap portions 1914 that may be removably mounted to base portion 1912, each trap portion 1914 being uniquely configured to attract and trap a specific species or multiple species of flying or non-flying insect. For example, the overall size and shape of trap portion 1914, and the size, shape, location and orientation of openings 1920 in front housing 1918 of trap portion 1914, may be uniquely configured to attract and trap a specific species or multiple species of flying or non-flying insect.

For example, in some embodiments, trap portion 1914 is approximately 20 mm to 600 mm wide, 20 mm to 600 mm high and 5 mm to 150 mm deep. In some embodiments, trap portion 1914 is approximately 20 mm to 200 mm wide, 20 mm to 200 mm high and 5 mm to 80 mm deep. In some embodiments, trap portion 1914 is approximately 20 mm to 130 mm wide, 20 mm to 130 mm high and 5 mm to 50 mm deep.

In some embodiments, base portion 1912 is approximately 20 mm to 600 mm wide, 10 mm to 150 mm high and 10 mm to 150 mm deep. In some embodiments, base portion 1912 is 20 mm to 200 mm wide, 10 mm to 100 mm high and 10 mm to 80 mm deep. In some embodiments, base portion 1912 is 20 mm to 130 mm wide, 10 mm to 50 mm high and 10 mm to 50 mm deep.

As provided herein, opening 1920 may be a variety of shapes and/or sizes. For example, opening 1920 may be circular, square, rectangular, polygonal and/or elliptical in shape. Alternatively, opening 1920 may be slot shaped having a straight, curved or undulating shape or pattern. When opening 1920 is circular, opening 1920 may be approximately 0.5 mm to 30 mm in diameter. In some embodiments, circular opening 1920 is approximately 0.5 mm to 20 mm in diameter. In some embodiments, circular opening 1920 is approximately 0.5 mm to 15 mm in diameter. When opening 1920 is slot shaped, opening 1920 may be approximately 2 mm to 30 mm wide and 5 mm to 500 mm long. In some embodiments, slot shaped opening 1920 is approximately 2 mm to 20 mm wide and 5 mm to 200 mm long. In some embodiments, slot shaped opening 1920 is approximately 2 mm to 15 mm wide and 5 mm to 100 mm long.

In some embodiments, opening 1920 covers all or a portion of front housing 1918. For example, opening 1920 may cover a range of approximately 1% to 75% of the surface area of front housing 1918. In some embodiments, opening 1920 covers approximately 5% to 50% of the surface area of front housing 1918. In some embodiments, opening 1920 covers approximately 10% to 30% of the surface area of front housing 1918.

Figure 96:
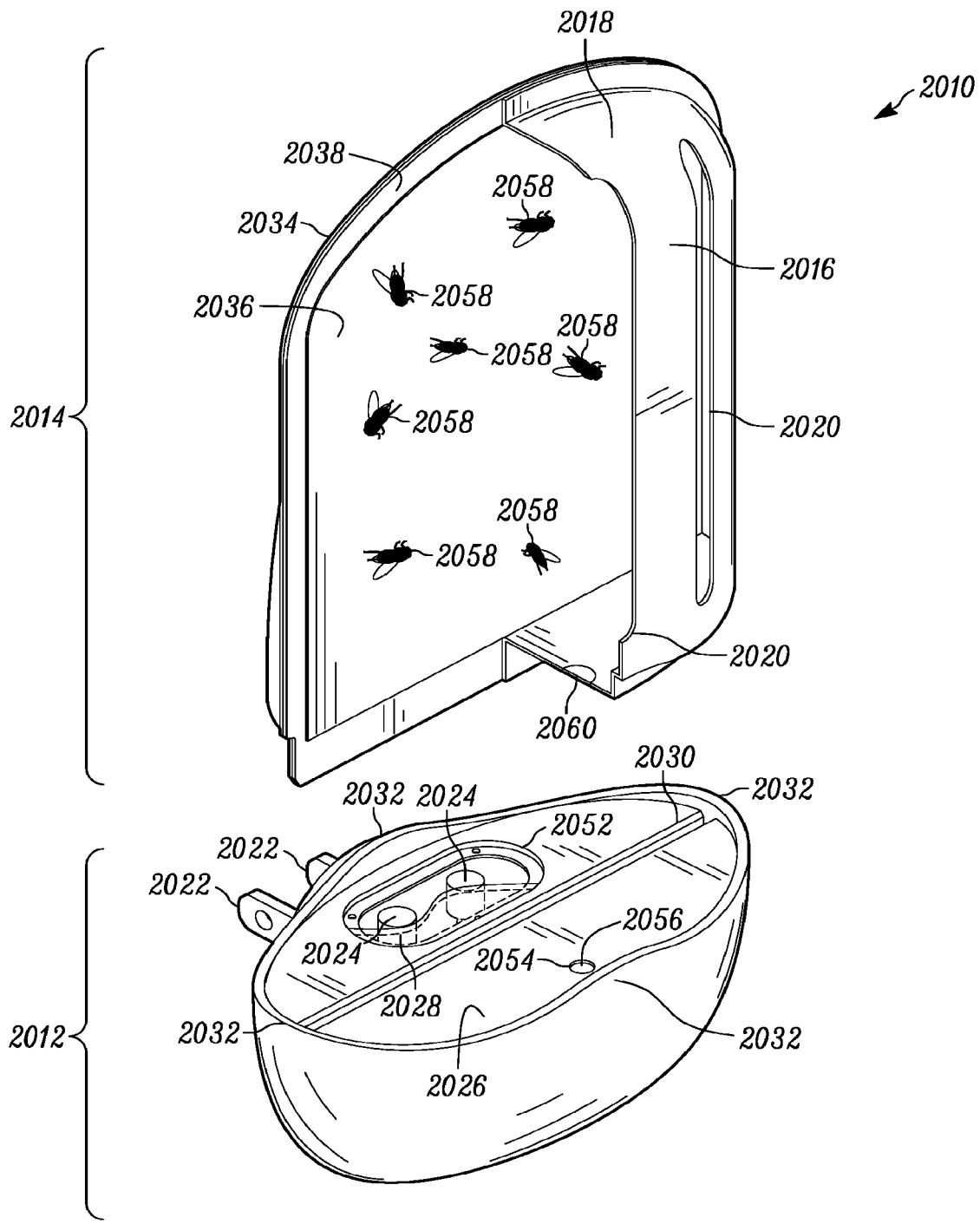
FIG. 96 is a front perspective view of a twentieth embodiment of an insect trap in accordance with principles of the disclosure.

FIG. 96 is a front perspective view of a twentieth embodiment of an insect trap, indicated generally at 2010. Insect trap 2010 may include a base portion 2012 and a removable trap portion 2014. Trap portion 2014 is shown partially cut away and removed from base portion 2012 in this view. Insect trap 2010 may have an overall length, an overall width and an overall depth, and may be configured such that when insect trap 2010 is mounted to a wall, its overall depth, defined by the overall distance insect trap 2010 protrudes from the wall, is the smallest of the three overall dimensions. Trap portion 2014 includes a divider 2034 and a front housing 2018 with at least one opening 2020 in a front surface 2016. Trap portion 2014 may have an overall length, an overall width and an overall depth, and may be configured such that when trap portion 2014 is mounted in insect trap 2010, and insect trap 2010 is mounted to a wall, the overall depth of trap portion 2014, which is measured in the direction perpendicular to the wall, is the smallest of the three overall dimensions of trap portion 2014. Opening 2020 in front housing 2018 may be configured to admit a wide variety of insects into insect trap 2010, or alternatively it may be configured to admit one or more specific insect species. In some embodiments, opening 2020 is configured to prevent user's fingers from penetrating opening 2020 and inadvertently touching trapped insects or adhesive when removing and replacing trap portion 2014. In some embodiments, opening 2020 may preferably have a size and shape such that a sphere 25 mm in diameter cannot pass through opening 2020, and has a size and shape such that a sphere 1 mm in diameter can pass through any portion of opening 2020. Opening 2020 may be of uniform or of varying width, shape and orientation, and if trap portion 2014 has more than one opening 2020, they may be of identical or of differing widths, shapes and orientations. Opening 2020 may be configured to attract one or more individual insect species or a variety of insect species. The front housing 2018 may also include a window 2060, although an opening may take the place of window 2060. In some embodiments, divider 2034 is constructed from or includes a transparent or translucent material and may be coated with a transparent or translucent adhesive 2036 on a front surface 2038. During use, one or more trapped insects 2058 may adhere to adhesive 2036 on front surface 2038 of divider 2034. In some embodiments, divider 2034 may also be configured to polarize light transmitted through it in an orientation similar to that of daylight to further attract flying insects, a wide variety of which are known to detect polarized light. Protruding from a rear surface 2064 (shown in FIG. 97 of base portion 2012 may be a plurality of electrically conductive prongs 2022, adapted to mount insect trap 2010 to a wall and provide power to insect trap 2010 by inserting conductive prongs 2022 into a standard household electrical wall socket. Alternatively, conductive prongs 2022 may be adapted to swivel to allow insect trap 2010 to remain upright when conductive prongs 2022 are inserted into a horizontal outlet. Alternatively, base portion 2012 may be configured to sit or hang wherever desired and receive power from batteries (not shown) mounted in base portion 2012. While an electrical socket and batteries have been described as providing power to insect trap 2010, any suitable power source may be used. Base portion 2012 includes a lighting element such as one or more LEDs 2024. In some embodiments, LEDs 2024 include at least one that emits UV light and at least one that emits visible light. In some embodiments, LEDs 2024 include at least one that emits UV light and at least one that emits blue light to better attract a wide variety of insect species. In some embodiments, the lighting element emits a combination of wavelengths to mimic sunlight. In some embodiments, LEDs 2024 include at least one that emits IR light to better attract certain species of insects including mosquitos and fleas. In a top surface 2026 of base portion 2012 is an opening 2052, which may be covered by a transparent or translucent window 2028, shown partially cut away to reveal LEDs 2024. One of ordinary skill in the art would realize that openings and windows (e.g., 2052 and 2028) as described herein or depicted in the accompanying drawings may vary in size and/or positioning, without departing from the scope of the disclosure. Window 2028 protects LEDs 2024 from dust and insect debris, and may allow base portion 2012 to be easily cleaned. In some embodiments, at least a portion of window 2028 and at least a portion of LEDs 2024 protrude from top surface 2026 of base portion 2012 and into trap portion 2014 when trap portion 2014 is mounted to base portion 2012. In some embodiments, base portion does not include window 2028, and at least a portion of LEDs 2024 protrude from top surface 2026 of base portion 2012 and into trap portion 2014 when trap portion 2014 is mounted to base portion 2012. In some embodiments, mounted in an opening 2054 of top surface 2026 is a photosensor 2056, preferably a photoresistor, although a photovoltaic cell, a photodiode, a phototransistor, or any sensor that detects light and responds by changing its electrical characteristics may be used. Also in top surface 2026 may be a slot 2030, and on the perimeter of top surface 2026 is a rim or upwardly directed protrusions 2032.

Figure 97:
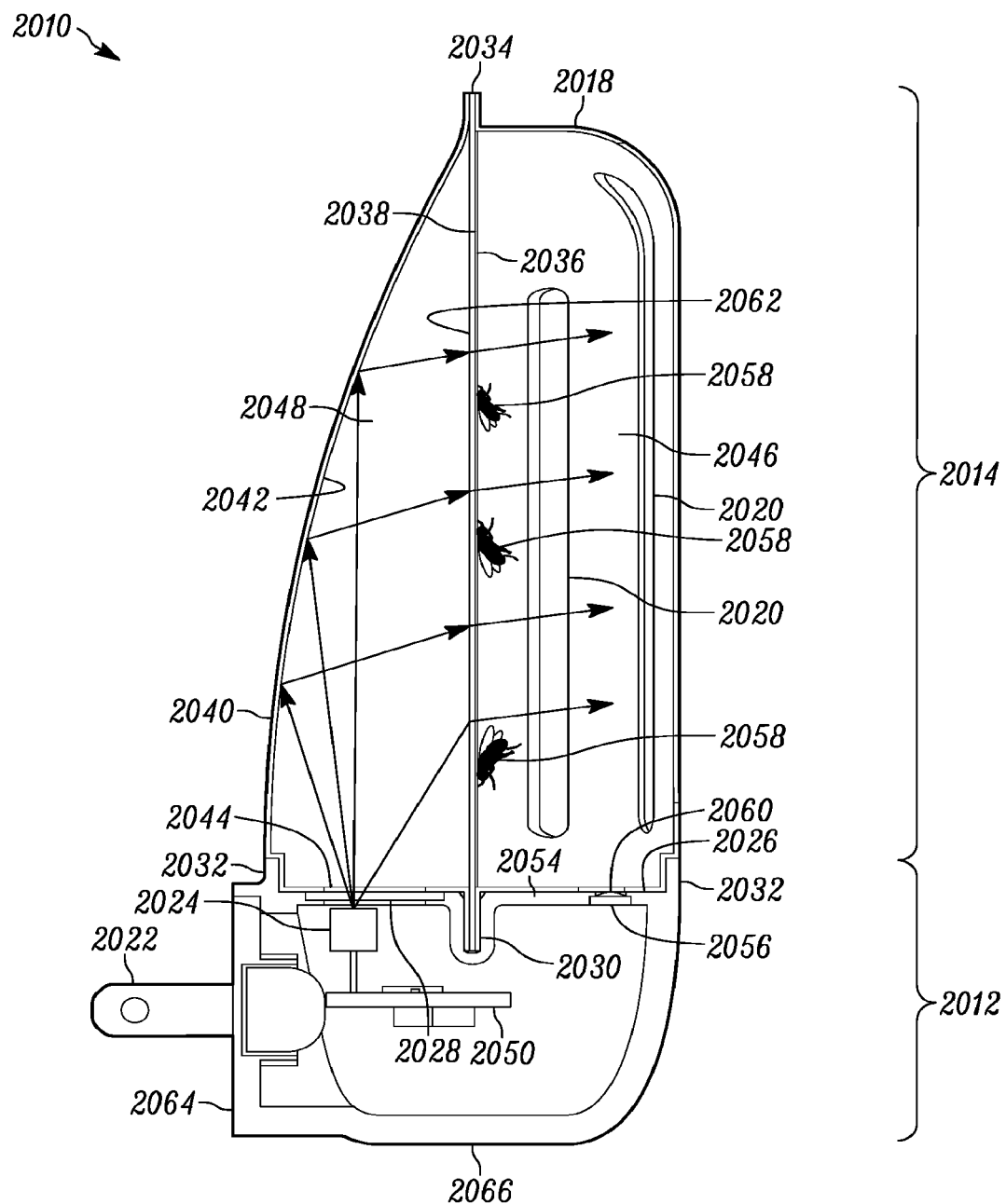
FIG. 97 is a cross-sectional view of the insect trap of FIG. 96.

FIG. 97 is a cross-sectional view of insect trap 2010. Trap portion 2014 includes a rear housing 2040 with an inside surface 2042. In some embodiments, inside surface 2042 has a reflective coating. In some embodiments, the material and surface finish of rear housing 2040 may be configured to reflect and disperse UV and/or visible and/or IR light without a reflective coating. In some embodiments, the material and thickness of divider 2034 and the material and thickness of adhesive 2036 are selected to transmit a substantial proportion of the UV and/or visible and/or IR light, for example greater than 60% of the light is transmitted through divider 2034 and adhesive 2036. Rear housing 2040 may include an opening 2044 on its bottom face, or alternatively opening 2044 may be replaced by a transparent or translucent window (not shown).

In some embodiments, front housing 2018 and rear housing 2040 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 2018 and rear housing 2040 are constructed by injection molding or by other suitable manufacturing techniques. As shown, divider 2034 is substantially planar, and may be configured to be parallel to, or at an angle to the primary direction of the light (not shown) produced by LEDs 2024. Alternatively, divider 2034 may be formed into a convex, concave or saddle-shaped contour (not shown), or a combination of contours to optimize the even distribution of light. In some embodiments, divider 2034 has ribs or other features (not shown) that increase adhesive surface area and create regions of light/dark contrast, which are highly visible to a wide variety of insects and may be more attractive to them.

In some embodiments, front housing 2018 is coated with transparent, translucent or opaque adhesive (not shown) on its inside surface to provide additional insect trapping efficiency and capacity. In addition, front housing 2018 may also have a reflective coating (not shown) underneath the adhesive coating on its inside surface to enhance its attraction to insects and further improve the insect trapping efficiency and effectiveness.

In some embodiments, front housing 2018, divider 2034 and rear housing 2040 are joined together where they intersect or engage with an adhesive, although they may also be joined by other commonly used packaging assembly techniques such as ultrasonic welding or RF sealing, or any other suitable assembly method. As shown, divider 2034 may separate trap portion 2014 into a front enclosure 2046 and a rear enclosure 2048. In some embodiments, base portion 2012 includes a circuit board 2050 having a programmable processor or chip (not shown) for executing commands, electrically connected to conductive prongs 2022, only one of which is shown, and LEDs 2024. For clarity, however, not all of the electrical connections are shown. Circuit board 2050 may include electronic circuitry to receive ordinary household current, for example, from conductive prongs 2022 and provide power to illuminate LEDs 2024. Circuit board 2050 may include an energy stabilizer such as a full wave rectifier circuit or any other circuit that provides steady voltage to LEDs 2024, although it may also provide a varying voltage to LEDs 2024 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 2050 may provide power to LEDs 2024 to provide UV and/or visible and/or IR light, although it may be configured to provide power to only the UV LEDs 2024 or to only the visible light LEDs 2024 or to only the IR LEDs 2024, or to provide variable power to produce combinations of flickering UV and/or visible and/or IR light. Circuit board 2050 may also be configured to drive a transmitter or transceiver such as a piezoelectric speaker (not shown) or other device that may be mounted in base portion 2012 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 2010. It is desirable for such insect-attracting sound to be undetectable by a human beyond approximately a 1-meter distance from insect trap 2010. Circuit board 2050 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 2012 and into trap portion 2014, to attract some insect species, including fleas and mosquitoes. Alternatively, one or more of light sources 2024 may generate heat, to replace or augment the heat generated by the one or more electrical elements. In general, the heat generated may increase and maintain the temperature of at least a portion of trap portion 2014 to between approximately 30 degrees C. and 45 degrees C., and to preferably between approximately 33 degrees C. and 42 degrees C., in order to mimic the skin and body temperatures of mammals.

As shown, slot 2030 in top surface 2026 of base portion 2012 and rim or protrusions 2032 on top surface 2026 of base portion 2012 engage with trap portion 2014 to secure it in place during use, although any other form of attachment may be substituted that may allow trap portion 2014 to be securely but removably mounted on base portion 2012. Bottom surface 2066 of base portion 2012 may be substantially flat or concave to allow insect trap 2010 to sit upright on a floor, desk, table or shelf when insect trap 2010 is unplugged. Alternatively, bottom surface 2066 of base portion 2012 may have two or more protrusions (not shown) or legs that allow the insect trap 2010 to sit upright when insect trap 2010 is unplugged.

In the operation of insect trap 2010, conductive prongs 2022, only one of which is shown, are inserted into a wall electrical socket. Circuit board 2050 provides power to LEDs 2024 and to photosensor 2056. LEDs 2024 emit light, represented by arrows, which transmits through window 2028 in base portion 2012, through opening 2044 in rear housing 2040 of trap portion 2014, into rear enclosure 2048, and directly onto inside surface 2042 of rear housing 2040 and a rear surface 2062 of divider 2034. Because the light from LEDs 2024 enters rear enclosure 2048 through opening 2044 in a bottom face of rear housing 2040 (e.g., in a face that is substantially parallel to the overall depth of trap portion 2014), the light can travel the entire length of rear enclosure 2048 and can diverge over the entire length of rear enclosure 2048, and therefore can be more evenly distributed throughout rear enclosure 2048. In some embodiments, light is not manipulated in base portion 2012 and is emitted directly into trap portion 2014. Inside surface 2042 of rear housing 2040 may include a concave shape and may be configured to reflect and disperse the UV and visible light from LEDs 2024 to distribute the light evenly onto rear surface 2062 of divider 2034, although the shape of inside surface 2042 of rear housing 2040 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 2062 of divider 2034, may be mounted to rear housing 2040 at or near opening 2044 or to base portion 2012 at or near opening 2052, and may replace or augment the role of inside surface 2042 of rear housing 2040. In some embodiments, the light from LEDs 2024 may directly strike rear surface 2062 of divider 2034 at an oblique angle (e.g., an acute angle from approximately 0° to 90°) and may be spread across divider 2034, and may replace or augment the role of inside surface 2042 of rear housing 2040 or of the lens or lenses mounted to rear housing 2040.

Thereafter, the light transmits through divider 2034 and adhesive 2036 on front surface 2038, and into front enclosure 2046. The light-diffusing properties of divider 2034, adhesive 2036, or both may further evenly distribute the light. A portion of the light entering front enclosure 2046 continues through opening 2020 in front housing 2018 and emits into the surrounding area where insect trap 2010 is installed. Insects are attracted to the UV and/or visible light transmitted through adhesive 2036 and through opening 2020 in front housing 2018, and fly or crawl into opening 2020 and onto adhesive 2036, where they become trapped. Trapped insects 2058 reduce the amount light transmitted into front enclosure 2046. Photosensor 2056 detects this reduction in light and responds by changing its electrical properties. Circuit board 2050 responds to changes in electrical properties that exceed a predetermined threshold by causing LEDs 2024 to blink on and off, thereby providing an indicator feature signaling that trap portion 2014 may need to be replaced. Alternatively, other visual indicator features, such as a change in the color of the light (e.g., to yellow, orange or red) or an audible indicator feature such as a tone, chime or voice, may augment or replace the blinking light indicator feature. In some embodiments, circuit board 2050 is configured to avoid responding inadvertently to changes in the ambient light levels by periodically pulsing or varying the light emitting from LEDs 2024, preferably at a faster rate than is distinguishable by the human eye, detecting the changes in electrical properties of photosensor 2056 resulting from the periodic pulses of light, and responding to the changes that exceed a predetermined threshold by causing LEDs 2024 to blink on and off. A user may notice the blinking light emitting from insect trap 2010 and observe trapped insects 2058 by looking through opening 2020 in front housing 2018. The user may easily remove and discard the entire used trap portion 2014 without touching trapped insects, insect debris or adhesive, which remain out of reach inside trap portion 2014, and replace it with a new trap portion 2014. The new trap portion 2014 has fresh adhesive-coated surfaces and light-directing surfaces, ensuring that insect trap 2010 will continue to efficiently and effectively attract and trap insects.

In some embodiments, because trap portion 2014 mounts on top of, and not in front of, base portion 2012, insect trap 2010 protrudes minimally from the wall when plugged into an ordinary household wall socket, and therefore intrudes minimally into the home environment. In some embodiments, insect trap 2010 is configured such that when insect trap 2010 is mounted to a wall, its overall depth, defined by the overall distance insect trap 2010 protrudes from the wall, is smaller than its overall height and its overall width.

It should be appreciated that a benefit of insect trap 2010 is the manipulation of light within trap portion 2014. In some embodiments, light manipulation occurs solely within trap portion 2014. Light manipulation may include reflection, refraction, polarization, dispersion and/or diffusion and is achieved by engaging with a manipulative element or surface (e.g., inside surface 2042, divider 2034 and adhesive 2036). In some embodiments, light manipulation produces an even distribution of light on adhesive 2036. In some embodiments, light is manipulated to produce a predetermined pattern on the adhesive 2036 or within trap portion 2014, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2010 of this configuration may accommodate a variety of different trap portions 2014 that may be removably mounted to base portion 2012, each trap portion 2014 being uniquely configured to attract and trap a specific species or multiple species of flying or non-flying insect. For example, the overall size and shape of trap portion 2014, the size, shape, location and orientation of opening 2020 in front housing 2018 of trap portion 2014, and the natural frequency and sound amplifying properties of trap portion 2014 may be uniquely configured to attract and trap a specific species or multiple species of flying insect. For example, in some embodiments, trap portion 2014 is approximately 20 mm to 600 mm wide, 20 mm to 600 mm high and 5 mm to 150 mm deep. In some embodiments, trap portion 2014 is approximately 20 mm to 200 mm wide, 20 mm to 200 mm high and 5 mm to 80 mm deep. In some embodiments, trap portion 2014 is approximately 20 mm to 130 mm wide, 20 mm to 130 mm high and 5 mm to 50 mm deep.

In some embodiments, base portion 2012 is approximately 20 mm to 600 mm wide, 10 mm to 150 mm high and 10 mm to 150 mm deep. In some embodiments, base portion 2012 is 20 mm to 200 mm wide, 10 mm to 100 mm high and 10 mm to 80 mm deep. In some embodiments, base portion 2012 is 20 mm to 130 mm wide, 10 mm to 50 mm high and 10 mm to 50 mm deep.

As provided herein, opening 2020 may be a variety of shapes and/or sizes. For example, opening 2020 may be circular, square, rectangular, polygonal and/or elliptical in shape. Alternatively, opening 2020 may be slot shaped having a straight, curved or undulating shape or pattern. When opening 2020 is circular, opening 2020 may be approximately 0.5 mm to 30 mm in diameter. In some embodiments, circular opening 2020 is approximately 0.5 mm to 20 mm in diameter. In some embodiments, circular opening 2020 is approximately 0.5 mm to 15 mm in diameter. When opening 2020 is slot shaped, opening 2020 may be approximately 2 mm to 30 mm wide and 5 mm to 500 mm long. In some embodiments, slot shaped opening 2020 is approximately 2 mm to 20 mm wide and 5 mm to 200 mm long. In some embodiments, slot shaped opening 2020 is approximately 2 mm to 15 mm wide and 5 mm to 100 mm long.

In some embodiments, opening 2020 covers all or a portion of front housing 2018. For example, opening 2020 may cover a range of approximately 1% to 75% of the surface area of front housing 2018. In some embodiments, opening 2020 covers approximately 5% to 50% of the surface area of front housing 2018. In some embodiments, opening 2020 covers approximately 10% to 30% of the surface area of front housing 2018.

Figure 98:
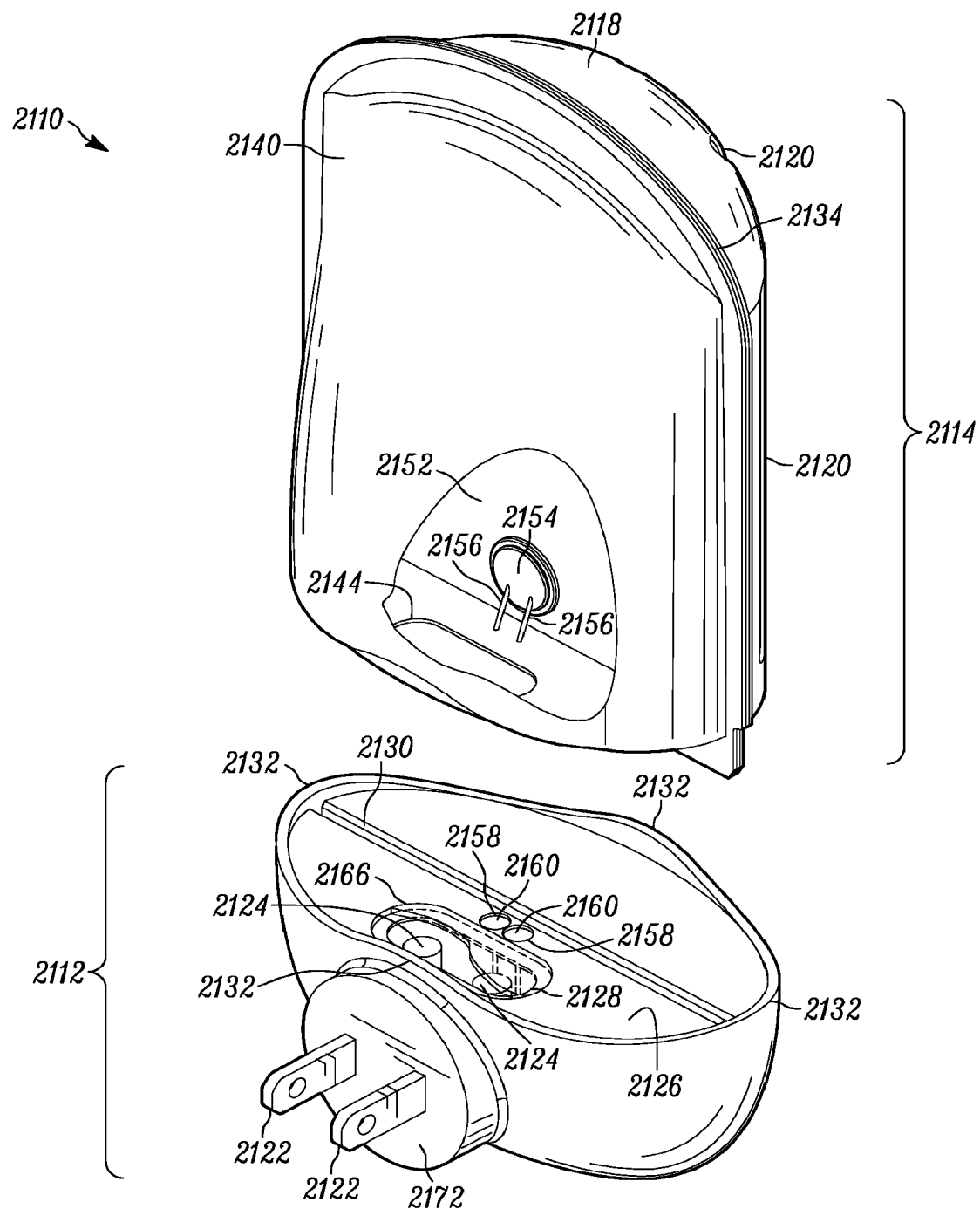
FIG. 98 is a rear perspective view of a twenty-first embodiment of an insect trap in accordance with principles of the disclosure.

FIG. 98 is a rear perspective view of a twenty-first embodiment of an insect trap, indicated generally at 2110. Insect trap 2110 includes a base portion 2112 and a removable trap portion 2114. Trap portion 2114 is shown partially cut away and removed from base portion 2112 in this view. Insect trap 2110 may have an overall length, an overall width and an overall depth, and may be configured such that when insect trap 2110 is mounted to a wall, its overall depth, defined by the overall distance insect trap 2110 protrudes from the wall, is the smallest of the three overall dimensions. Trap portion 2114 includes a front housing 2118 with at least one opening 2120 in its front surface 2116 (shown in FIG. 99), a rear housing 2140, and a divider 2134 with a rear surface 2152. Trap portion 2114 may have an overall length, an overall width and an overall depth, and may be configured such that when trap portion 2114 is mounted in insect trap 2110, and insect trap 2110 is mounted to a wall, the overall depth of trap portion 2114, which is measured in the direction perpendicular to the wall, is the smallest of the three overall dimensions of trap portion 2114. Affixed to rear surface 2152 of divider 2134 is an electromechanical actuator 2154, preferably a transmitter or transceiver such as a piezoelectric actuator. Attached to actuator 2154 are electric trap wires 2156. While two trap wires 2156 are shown attached to actuator 2154, any suitable number may be used. Rear housing 2140 may include an opening 2144 on its bottom surface, or alternatively opening 2144 may be replaced by a transparent or translucent window (not shown).

Protruding from a rear surface 2172 of base portion 2112 are a plurality of electrically conductive prongs 2122, adapted to mount insect trap 2110 to a wall and provide power to insect trap 2110 by inserting conductive prongs 2122 into a standard household electrical wall socket. Alternatively, conductive prongs 2122 may be adapted to swivel to allow insect trap 2110 to remain upright when conductive prongs 2122 are inserted into a horizontally oriented electrical wall socket. Alternatively, base portion 2112 may be configured to sit or hang wherever desired and receive power from batteries (not shown) mounted in base portion 2112. While an electrical socket and batteries have been described as providing power to insect trap 2110, any suitable power source may be used. Base portion 2112 includes a lighting element such as one or more LEDs 2124. In some embodiments, LEDs 2124 include at least one that emits UV light and at least one emits visible light. In some embodiments, LEDs 2124 include at least one that emits UV light and at least one that emits blue light to better attract a wide variety of insect species. In some embodiments, the lighting element emits a combination of wavelengths to mimic sunlight. In some embodiments, LEDs 2124 include at least one that emits IR light to better attract certain species of insects such as mosquitos and fleas. A top surface 2126 of base portion 2112 includes an opening 2166, which may be covered by a transparent or translucent window 2128, shown partially cut away to reveal LEDs 2124. Window 2128 protects LEDs 2124 from dust and insect debris, and allows base portion 2112 to be easily cleaned. In some embodiments, at least a portion of window 2128 and at least a portion of LEDs 2124 protrude from top surface 2126 of base portion 2112, and protrude into trap portion 2114 when trap portion 2114 is mounted to base portion 2112. In some embodiments, base portion 2112 does not include a window 2128, and at least a portion of LEDs 2124 protrude from top surface 2126 of base portion 2112 and protrude into trap portion 2114 when trap portion 2114 is mounted to base portion 2112. Mounted in one or more additional openings 2158 in top surface 2126 of base portion 2112 is a plurality of electrical base contacts 2160. While two base contacts 2160 are shown, any suitable number may be used. In top surface 2126 may be a slot 2130, and on the perimeter of top surface 2126 is a rim or upwardly directed protrusions 2132.

Figure 99:
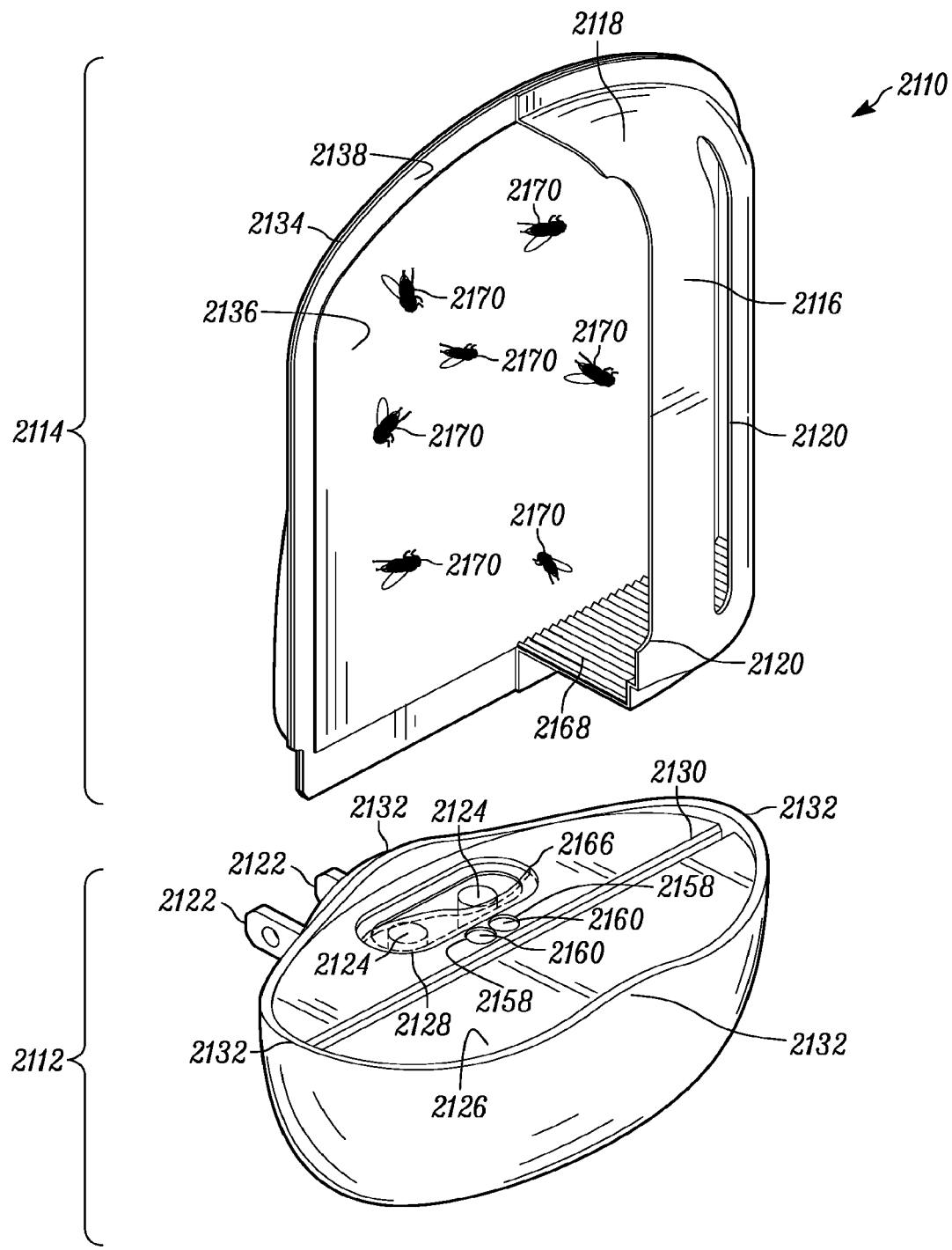
FIG. 99 is a front perspective view of the insect trap of FIG. 98.

FIG. 99 is a front perspective view of insect trap 2110. Trap portion 2114 is shown partially cut away and removed from base portion 2112 in this view. Opening 2120 in front housing 2118 may be configured to admit a wide variety of insects into insect trap 2110, or alternatively it may be configured to admit one or more specific insect species. In some embodiments, opening 2120 is configured to prevent user's fingers from penetrating opening 2120 and inadvertently touching trapped insects or adhesive when removing and replacing trap portion 2114. In some embodiments, opening 2120 has a size and shape such that a sphere 25 mm in diameter cannot pass through opening 2120, and has a size and shape such that a sphere 1 mm in diameter can pass through any portion of opening 2120. Opening 2120 may be of uniform or of varying width, shape and orientation, and if trap portion 2114 has more than one opening 2120, they may be of identical or of differing widths, shapes and orientations. Opening 2120 may be configured to attract one or more individual insect species or a variety of insect species. In some embodiments, divider 2134 is constructed from or includes a transparent or translucent material and may be coated with a transparent or translucent adhesive 2136 on its front surface 2138. During use, trapped insects 2170 may adhere to adhesive 2136 on front surface 2138 of divider 2134. In some embodiments, the material and thickness of divider 2134 and the material and thickness of adhesive 2136 are selected to transmit a substantial proportion of the UV and/or visible and/or IR light, for example greater than 60% of the light is transmitted through divider 2134 and adhesive 2136.

In some embodiments, divider 2134 may also be configured to polarize light transmitted through it in an orientation similar to that of daylight to further attract flying insects, a wide variety of which are known to detect polarized light. In some embodiments, mounted on the inside bottom of front housing 2118 is an insert 2168 configured to reflect and polarize light in an orientation similar to that of light reflecting from the surface of water to better attract a variety of insect species, especially those that breed near water. Insert 2168 may be configured of material that reflects and polarizes light, and may have ridges or other surface or subsurface features to enhance its reflecting and/or polarizing properties, thereby further attracting insects.

Figure 100:
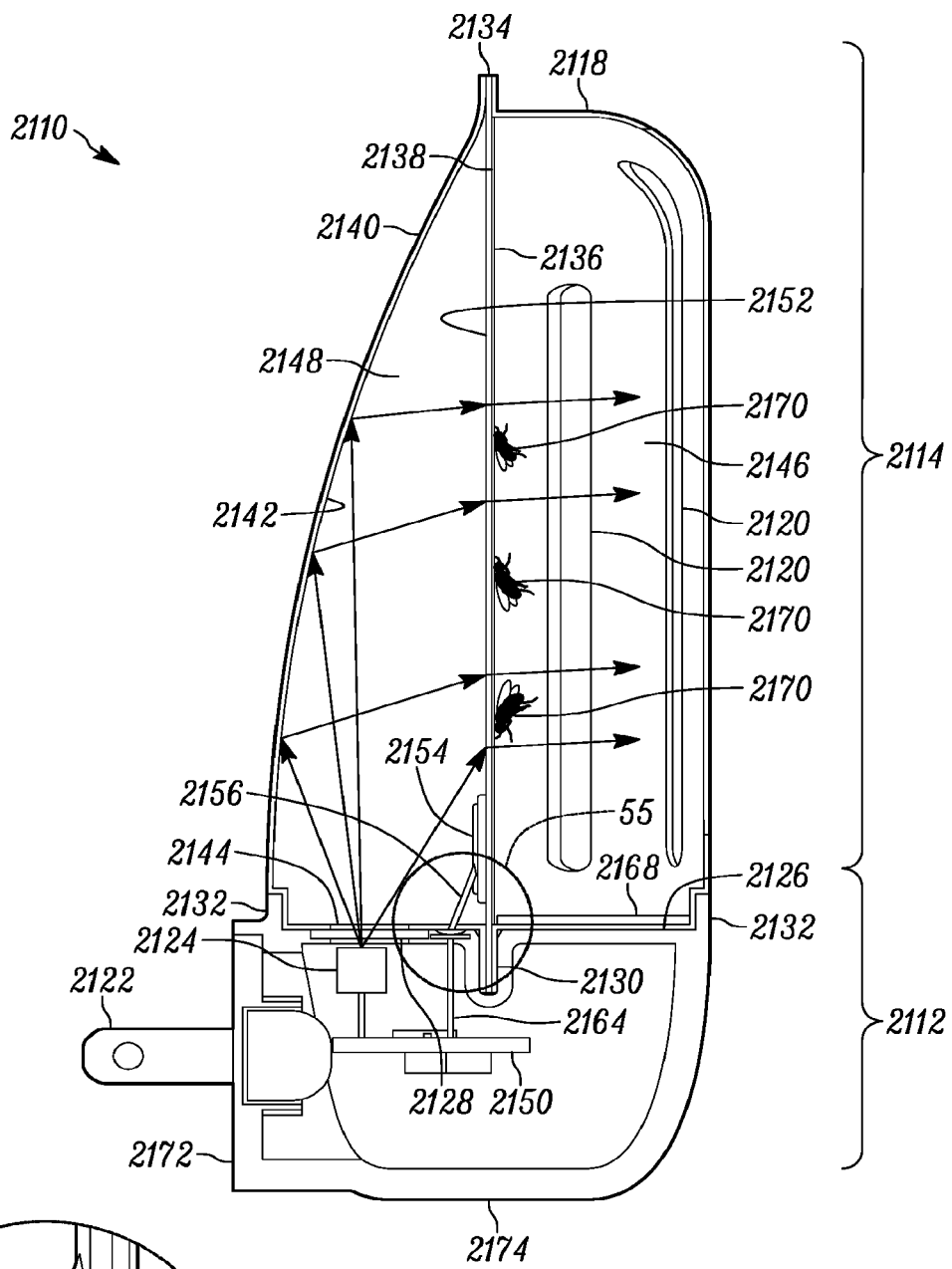
FIG. 100 is a cross-sectional view of the insect trap of FIG. 98.
Figure 101:
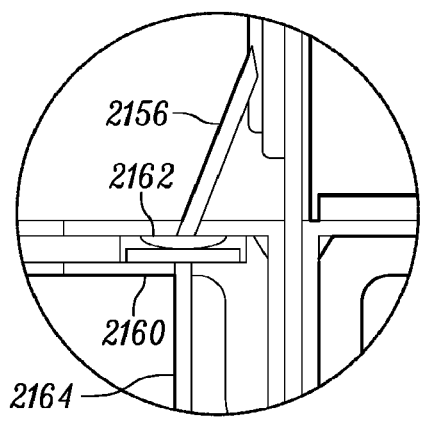
FIG. 101 is an enlarged view of a portion of FIG. 100.

FIG. 100 is a cross-sectional view of insect trap and FIG. 101 is an enlarged view of a portion of FIG. 100. In some embodiments, rear housing 2140 may have a reflective-coated inside surface 2142. Alternatively, the material and surface finish of rear housing 2140 may be configured to reflect and disperse UV and/or visible and/or IR light without a reflective coating.

In some embodiments, front housing 2118 and rear housing 2140 are thermoformed from opaque sheet plastic, creating a clean and aesthetically pleasing shape while maintaining low cost and disposability. Alternatively, other opaque, transparent or translucent materials such as paper, paperboard, cardboard or paper pulp may be used. In some embodiments, front housing 2118 and rear housing 2140 are constructed by injection molding or by other suitable manufacturing techniques. As shown, divider 2134 is substantially planar, and may be configured to be parallel to, or at an angle to the primary direction of the light produced by LEDs 2124. In some embodiments, divider 2134 may be formed into a convex, concave or saddle-shaped contour, or a combination of contours to optimize the even distribution of light. In some embodiments, divider 2134 may have ribs or other features (not shown) that increase adhesive surface area and create regions of light/dark contrast, which are highly visible to a wide variety of insects and may be more attractive to them.

In some embodiments, front housing 2118 may also be coated with transparent, translucent or opaque adhesive on its inside surface to provide additional insect trapping efficiency and capacity. In addition, front housing 2118 may also have a reflective coating (not shown) underneath the adhesive coating on its inside surface to enhance its attraction to insects and further improve the insect trapping efficiency and effectiveness. In some embodiments, front housing 2118, divider 2134 and rear housing 2140 are joined together where they intersect or engage by ultrasonic welding or high frequency (HF) welding, although they may also be permanently or removably joined together by gluing or any other suitable assembly method. Divider 2134 separates trap portion 2114 into a front enclosure 2146 and a rear enclosure 2148. Rear housing 2140 includes a plurality of electrical trap contacts 2162 (only one of which is shown) that correspond to base contacts 2160 in base portion 2112. Trap contacts 2162 are electrically connected to their corresponding trap wires 2156 and are configured to create an electrical contact with base contacts 2160 (only one of which is shown) when trap portion 2114 is mounted to base portion 2112. In some embodiments, base portion 2112 includes a circuit board 2150, having a programmable processor or chip (not shown) for executing commands, electrically connected to conductive prongs 2122 (only one of which is shown), LEDs 2124 (only one of which is shown), and a plurality of electric base wires 2164, that correspond to, and are electrically connected to, base contacts 2160. Accordingly, actuator 2154, mounted on rear surface 2152 of divider 2134, may be electrically connected to circuit board 2150 when trap portion 2114 is mounted to base portion 2112. For clarity, however, not all of the electrical connections are shown. Circuit board 2150 may include electronic circuitry to receive ordinary household current from conductive prongs 2122 and provide power to illuminate LEDs 2124. Circuit board 2150 may include an energy stabilizer such as a full wave rectifier circuit or any other circuit that provides steady voltage to LEDs 2124, although it may also provide a varying voltage to LEDs 2124 to provide a flickering light, which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 2150 may provide power to LEDs 2124 to provide UV and/or visible and/or IR light, although it may be configured to provide power to only UV LEDs 2124 or to only visible light LEDs 2124 or to only IR LEDs 2124, or to provide variable power to produce combinations of flickering UV and/or visible and/or IR light. Circuit board 2150 may also be configured to power actuator 2154 mounted on rear surface 2152 of divider 2134 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 2110. It is desirable for such insect-attracting sound to be undetectable by a human beyond approximately a 1-meter distance from insect trap 2110. Circuit board 2150 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 2112 and into trap portion 2114, to attract some insect species, including fleas and mosquitoes. Alternatively, one or more of LEDs 2124 may generate heat, to replace or augment the heat generated by the one or more electrical elements. In general, the heat generated may increase and maintain the temperature of at least a portion of trap portion 2114 to between approximately 30 degrees C. and 45 degrees C., and to preferably between approximately 33 degrees C. and 42 degrees C., in order to mimic the skin and body temperatures of mammals.

As shown, slot 2130 in top surface 2126 of base portion 2112 and rim or protrusions 2132 on top surface 2126 of base portion 2112 engage with trap portion 2114 to secure it in place during use, although any other form of attachment may be substituted that allows trap portion 2114 to be securely but removably mounted on base portion 2112. Bottom surface 2174 of base portion 2112 may be substantially flat or concave to allow insect trap 2110 to sit upright on a floor, desk, table or shelf when insect trap 2110 is unplugged. Alternatively, bottom surface 2174 of base portion 2112 may have two or more protrusions (not shown) or legs that allow insect trap 2110 to sit upright when insect trap 2110 is unplugged.

In the operation of insect trap 2110, conductive prongs 2122 are inserted into a wall electrical socket. Circuit board 2150 provides power to LEDs 2124 and to actuator 2154. LEDs 2124 emit light, represented by arrows, which transmits through window 2128 in base portion 2112, through opening 2144 in rear housing 2140 of trap portion 2114, into the rear enclosure 2148, and directly onto inside surface 2142 of rear housing 2140 and rear surface 2152 of divider 2134. Because the light from LEDs 2124 enters rear enclosure 2148 through opening 2144 in a bottom face of rear housing 2140 (e.g., in a face that is substantially parallel to the overall depth of trap portion 2114), the light can travel the entire length of rear enclosure 2148 and can diverge over the entire length of rear enclosure 2148, and therefore can be more evenly distributed throughout rear enclosure 2148. In some embodiments, light is not manipulated in base portion 2112 and is emitted directly into trap portion 2114. Inside surface 2142 of rear housing 2140 may include a concave shape and may be configured to reflect and disperse the UV and visible light from LEDs 2124 to distribute the light evenly onto rear surface 2152 of divider 2134, although the shape of inside surface 2142 of rear housing 2140 may have a convex shape or a saddle shape or a combination of shapes, or may also have ribs or other features (not shown) to more evenly distribute the light. Alternatively, an optical enhancer such as an anamorphic lens or any other lens or combination of lenses (not shown) configured to distribute the UV and visible light (e.g., evenly, according to specific patterns, at a focal point, etc.) onto rear surface 2152 of divider 2134, may be mounted to rear housing 2140 at or near opening 2144 or to base portion 2112 at or near opening 2166, and may replace or augment the role of inside surface 2142 of rear housing 2140. In some embodiments, the light from LEDs 2124 directly strikes rear surface 2152 of divider 2134 at an oblique angle (e.g., an acute angle from approximately 0° to 90°) and spreads across divider 2134, and may replace or augment the role of inside surface 2142 of rear housing 2140 or of the lens or lenses mounted to rear housing 2140 or to base portion 2112.

Thereafter, the light transmits through divider 2134 and adhesive 2136 on front surface 2138, and into front enclosure 2146. The light may be further evenly distributed by the light-diffusing properties of divider 2134, adhesive 2136 on front surface 2138, or both. A portion of the light entering front enclosure 2146 continues through opening 2120 in front housing 2118 and into the area where the trap is installed. Actuator 2154 produces insect-attracting vibrations, which are amplified by divider 2134, and transmit through front enclosure and out through opening 2120. Insects are attracted to the UV and/or visible light transmitted through adhesive 2136 and through opening 2120 in front housing 2118. Insects are also attracted to the insect-attracting vibrations produced by actuator 2154. Insects fly or crawl into opening 2120 and onto adhesive 2136, where they become trapped. A user may observe trapped insects by looking through opening 2120 in front housing 2118. In some embodiments, circuit board 2150 periodically sends electrical pulses to actuator 2154, causing divider 2134 to vibrate. The vibrations in divider 2134 in turn cause actuator 2154 to create electrical response signals such as changes of voltage, resistance or charge. When trapped insects 2170 become stuck in adhesive 2136, they change the vibration characteristics of divider 2134, and thereby change the electrical response signals from actuator 2154. Circuit board 2150 is configured such that when a sufficient number of trapped insects 2170 are stuck in adhesive 2136, circuit board 2150 responds to the change in electrical response signals exceeding a predetermined threshold from actuator 2154 and cause LEDs 2124 to blink on and off, indicating that trap portion 2114 may need to be replaced. Alternatively, other visual indicator features, such as a change in the color of the light (e.g., to yellow, orange or red) or an audible indicator feature such as a tone, chime or voice, may augment or replace the blinking light indicator feature. The user may easily remove and discard the entire used trap portion 2114 without touching trapped insects, insect debris or adhesive, which remain out of reach inside trap portion 2114, and replace it with a new trap portion 2114. The new trap portion 2114 has fresh adhesive-coated surfaces and light-directing surfaces, ensuring that insect trap 2110 will continue to efficiently and effectively attract and trap insects.

In some embodiments, because trap portion 2114 mounts on top of, and not in front of, base portion 2112, insect trap 2110 protrudes minimally from the wall when plugged into an ordinary household wall socket, and therefore intrudes minimally into the home environment. In some embodiments, insect trap 2110 is configured such that when insect trap 2110 is mounted to a wall, its overall depth, defined by the overall distance insect trap 2110 protrudes from the wall, is smaller than its overall height and its overall width.

It should be appreciated that a benefit of insect trap 2110 is the manipulation of light within trap portion 2114. In some embodiments, light manipulation occurs solely within trap portion 2114. Light manipulation may include reflection, refraction, polarization, dispersion and/or diffusion and is achieved by engaging with a manipulative element or surface (e.g., inside surface 2142, divider 2134 and adhesive 2136). In some embodiments, light manipulation produces an even distribution of light on adhesive 2136. In some embodiments, light is manipulated to produce a predetermined pattern on adhesive 2136 or within trap portion 2114, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 2110 of this configuration may accommodate a variety of different trap portions 2114 that may be removably mounted to base portion 2112, each trap portion 2114 being uniquely configured to attract and trap a specific species or multiple species of flying or non-flying insect. For example, the overall size and shape of trap portion 2114, the size, shape, location and orientation of opening 2120 in front housing 2118 of trap portion 2114, the vibration-producing properties of actuator 2154, the natural frequency and sound amplifying properties of trap portion 2114 and the electrical response signals from actuator 2154 may be uniquely configured to attract and trap a specific species or multiple species of flying or non-flying insect. For example, in some embodiments, trap portion 2114 is approximately 20 mm to 600 mm wide, 20 mm to 600 mm high and 5 mm to 150 mm deep. In some embodiments, trap portion 2114 is approximately 20 mm to 200 mm wide, 20 mm to 200 mm high and 5 mm to 80 mm deep. In some embodiments, trap portion 2114 is approximately 20 mm to 130 mm wide, 20 mm to 130 mm high and 5 mm to 50 mm deep.

In some embodiments, base portion 2112 is approximately 20 mm to 600 mm wide, 10 mm to 150 mm high and 10 mm to 150 mm deep. In some embodiments, base portion 2112 is 20 mm to 200 mm wide, 10 mm to 100 mm high and 10 mm to 80 mm deep. In some embodiments, base portion 2112 is 20 mm to 130 mm wide, 10 mm to 50 mm high and 10 mm to 50 mm deep.

As provided herein, opening 2120 may be a variety of shapes and/or sizes. For example, opening 2120 may be circular, square, rectangular, polygonal and/or elliptical in shape. Alternatively, opening 2120 may be slot shaped having a straight, curved or undulating shape or pattern. When opening 2120 is circular, opening 2120 may be approximately 0.5 mm to 30 mm in diameter. In some embodiments, circular opening 2120 is approximately 0.5 mm to 20 mm in diameter. In some embodiments, circular opening 2120 is approximately 0.5 mm to 15 mm in diameter. When opening 2120 is slot shaped, opening 2120 may be approximately 2 mm to 30 mm wide and 5 mm to 500 mm long. In some embodiments, slot shaped opening 2120 is approximately 2 mm to 20 mm wide and 5 mm to 200 mm long. In some embodiments, slot shaped opening 2120 is approximately 2 mm to 15 mm wide and 5 mm to 100 mm long.

In some embodiments, opening 2120 covers all or a portion of front housing 2118. For example, opening 2120 may cover a range of approximately 1% to 75% of the surface area of front housing 2118. In some embodiments, opening 2120 covers approximately 5% to 50% of the surface area of front housing 2118. In some embodiments, opening 2120 covers approximately 10% to 30% of the surface area of front housing 2118.

Figure 102:
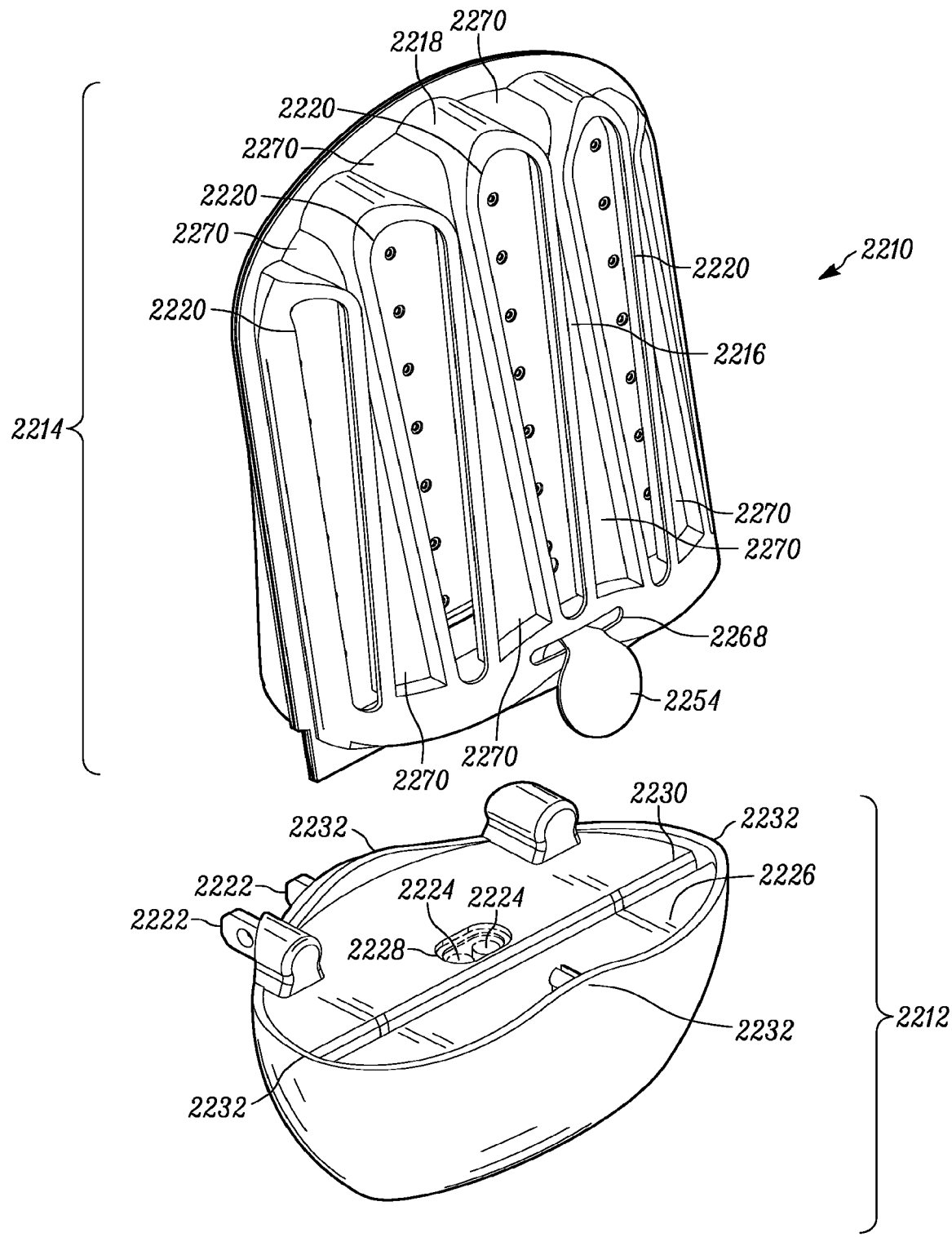
FIG. 102 is a front perspective view of a twenty-second embodiment of an insect trap in accordance with principles of the disclosure.

FIG. 102 is a front perspective view of a twenty-second embodiment of an insect trap, indicated generally at 2210. Insect trap 2210 includes a base portion 2212 and a removable trap portion 2214. Trap portion 2214 is shown removed from base portion 2212 in this view. Insect trap 2210 may have an overall length, an overall width and an overall depth, and may be configured such that when insect trap 2210 is mounted to a wall, its overall depth, defined by the overall distance insect trap 2210 protrudes from the wall, is the smallest of the three overall dimensions. Trap portion 2214 includes a front housing 2218 with a tab slot 2268 and at least one opening 2220 in a front surface 2216. Trap portion 2214 may have an overall length, an overall width and an overall depth, and may be configured such that when trap portion 2214 is mounted in insect trap 2210, and insect trap 2210 is mounted to a wall, the overall depth of trap portion 2214, which is measured in the direction perpendicular to the wall, is the smallest of the three overall dimensions of trap portion 2214. Opening 2220 in front housing 2218 may be configured to admit a wide variety of insects into insect trap 2210, or alternatively it may be configured to admit one or more specific insect species. In some embodiments, opening 2220 is configured to prevent user's fingers from penetrating opening 2220 and inadvertently touching dead insects or adhesive when removing and replacing trap portion 2214. In some embodiments, opening 2220 has a size and shape such that a sphere 25 mm in diameter cannot pass through opening 2220, and has a size and shape such that a sphere 1 mm in diameter can pass through any portion of opening 2220. Opening 2220 may be of uniform or of varying width, shape and orientation, and if trap portion 2214 has more than one opening 2220, they may be of identical or of differing widths, shapes and orientations. Opening 2220 may be configured to attract one or more individual insect species or a variety of insect species. In some embodiments, front housing 2218 is configured with ribs or reliefs 2270 surrounding opening 2220 to confer stiffness and strength to trap portion 2210 and to enable front housing 2218 to be made of thinner material. As shown, protruding from tab slot 2268 in front housing 2218 in trap portion 2214 is a removable tab 2254. Protruding from a rear surface 2278 (shown in FIG. 105) of base portion 2212 are a plurality of electrically conductive prongs 2222, adapted to mount insect trap 2210 to a wall and provide power to insect trap 2210 by inserting conductive prongs 2222 into a standard household electrical wall socket. Alternatively, conductive prongs 2222 may be adapted to swivel to allow insect trap 2210 to remain upright when conductive prongs 2222 are inserted into a horizontally oriented electrical wall socket. Alternatively, base portion 2212 may be configured to sit or hang wherever desired and receive power from batteries (not shown) mounted in base portion 2212. While an electrical socket and batteries have been described as providing power to insect trap 2210, any suitable power source may be used. Base portion 2212 includes a top surface 2226 and a lighting element such as one or more LEDs 2224. In some embodiments, LEDs 2224 includes at least one that emits UV light and at least one that emits visible light. In some embodiments, LEDs 2224 includes at least one that emits UV light and at least one that emits blue light to better attract a wide variety of insect species. In some embodiments, the lighting element emits a combination of wavelengths to mimic sunlight. In some embodiments, LEDs 2224 include at least one that emits infrared (IR) light to better attract certain species of insects such as mosquitos and fleas. Mounted in top surface 2226 of base portion 2212 may be a transparent or translucent window 2228, shown partially cut away to reveal LEDs 2224. Window 2228 protects LEDs 2224 from dust and insect debris, and allows base portion 2212 to be easily cleaned. In some embodiments, at least a portion of window 2228 and at least a portion of LEDs 2224 protrude from top surface 2226 of base portion 2212 and into trap portion 2214 when trap portion 2214 is mounted to the base portion 2212. Alternatively, base portion 2212 may not include window 2228, and at least a portion of LEDs 2224 protrude from top surface 2226 of base portion 2212, and into trap portion 2214 when trap portion 2214 is mounted to base portion 2212. In top surface 2226 may be a slot 2230, and on the perimeter of top surface 2226 is a rim or upwardly directed protrusions 2232.

Figure 103:
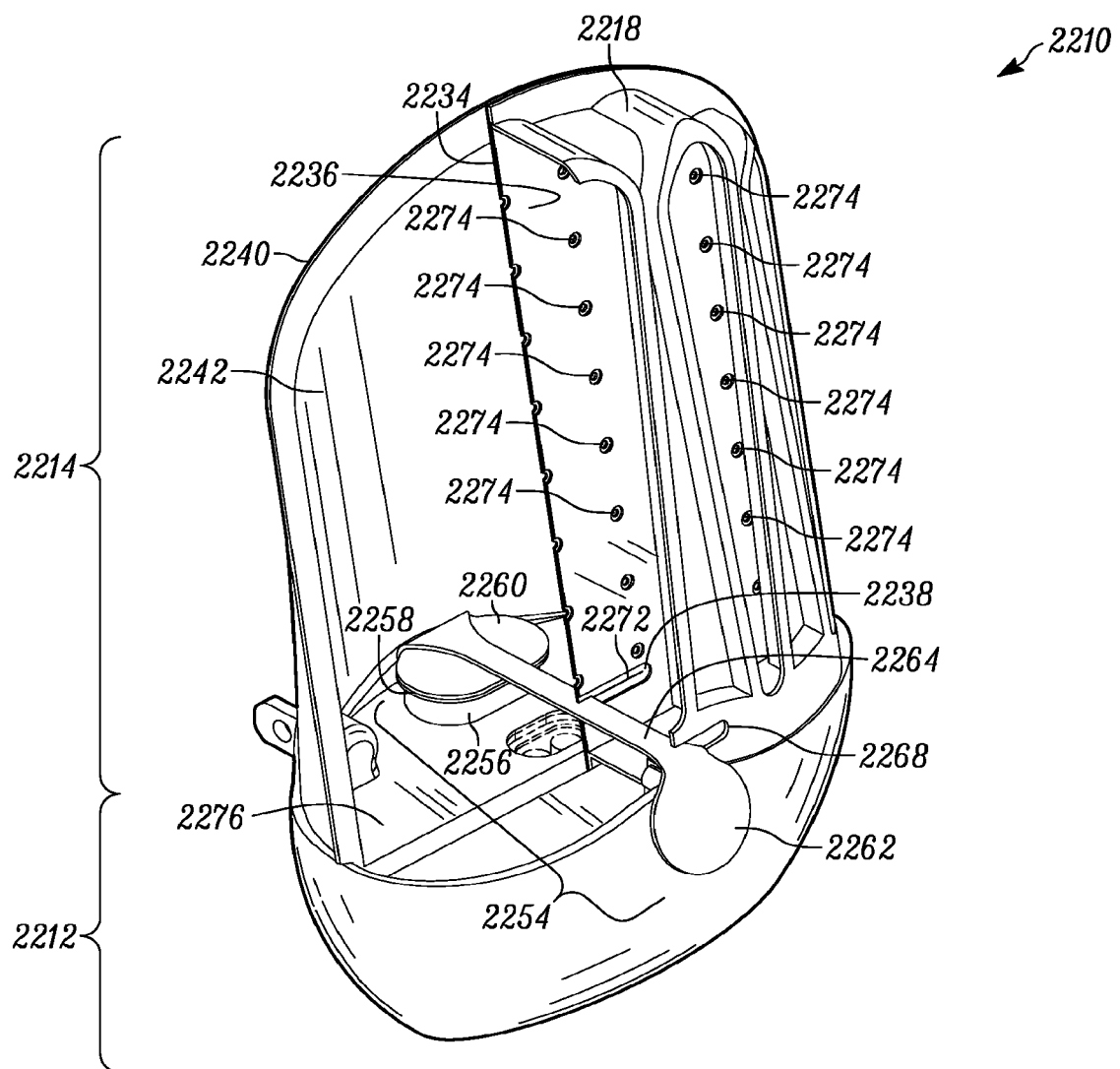
FIG. 103 is a front perspective view of the insect trap of FIG. 102.

FIG. 103 is a front perspective view of insect trap 2210. Trap portion 2214 is shown partially cut away in this view. In some embodiments, trap portion 2214 includes a divider 2234, constructed from or including a transparent or translucent material and coated with a transparent or translucent adhesive 2236 on its front surface 2238. In some embodiments, divider 2234 is configured to polarize light transmitted through it in an orientation similar to that of daylight to further attract flying insects, a wide variety of which are known to detect polarized light. In some embodiments, the material and thickness of divider 2234 and the material and thickness of adhesive 2236 are selected to transmit a substantial proportion of the UV and/or visible and/or IR light, for example greater than 60% of the light is transmitted through divider 2234 and adhesive 2236. Divider 2234 may include a divider slot 2272 and one or more perforations 2274. In some embodiments, the regions on front surface 2238 of divider 2234 immediately around divider slot 2272 and perforations 2274 are not coated with adhesive 2236. Trap portion 2214 includes a rear housing 2240 with an inside surface 2242 and a bottom inside surface 2276. As shown, an upwardly-facing cup 2256 is mounted on bottom inside surface 2276 of rear housing 2240. Cup 2256 may have a lip 2258 protruding from the perimeter of its open end. Cup 2256 may be constructed of any material or combination of materials that act as a barrier to any of the insect-attracting substances mentioned herein. Removable tab 2254 includes a sealing end 2260 and a web 2264 between sealing end 2260 and a grip end 2262, and may be made of any flexible and durable material or combination of materials that act as a barrier to any of the insect-attracting substances mentioned herein. As shown, sealing end 2260 is configured to cover the open end of cup 2256, and is affixed to lip 2258 of cup 2256 with an adhesive to create an airtight seal, thereby maintaining the freshness of any insect-attracting substances (not shown) inside cup 2256, as well as holding removable tab 2254 in place until it is removed by a user. Web 2264 may be folded over sealing end 2260 of removable tab 2254 and extends through divider slot 2272 in divider 2234 to tab slot 2268 in front housing 2218. Grip end 2262 of removable tab 2254 protrudes through tab slot 2268 and may be folded downwards over an outside portion of front housing 2218.

Figure 104:
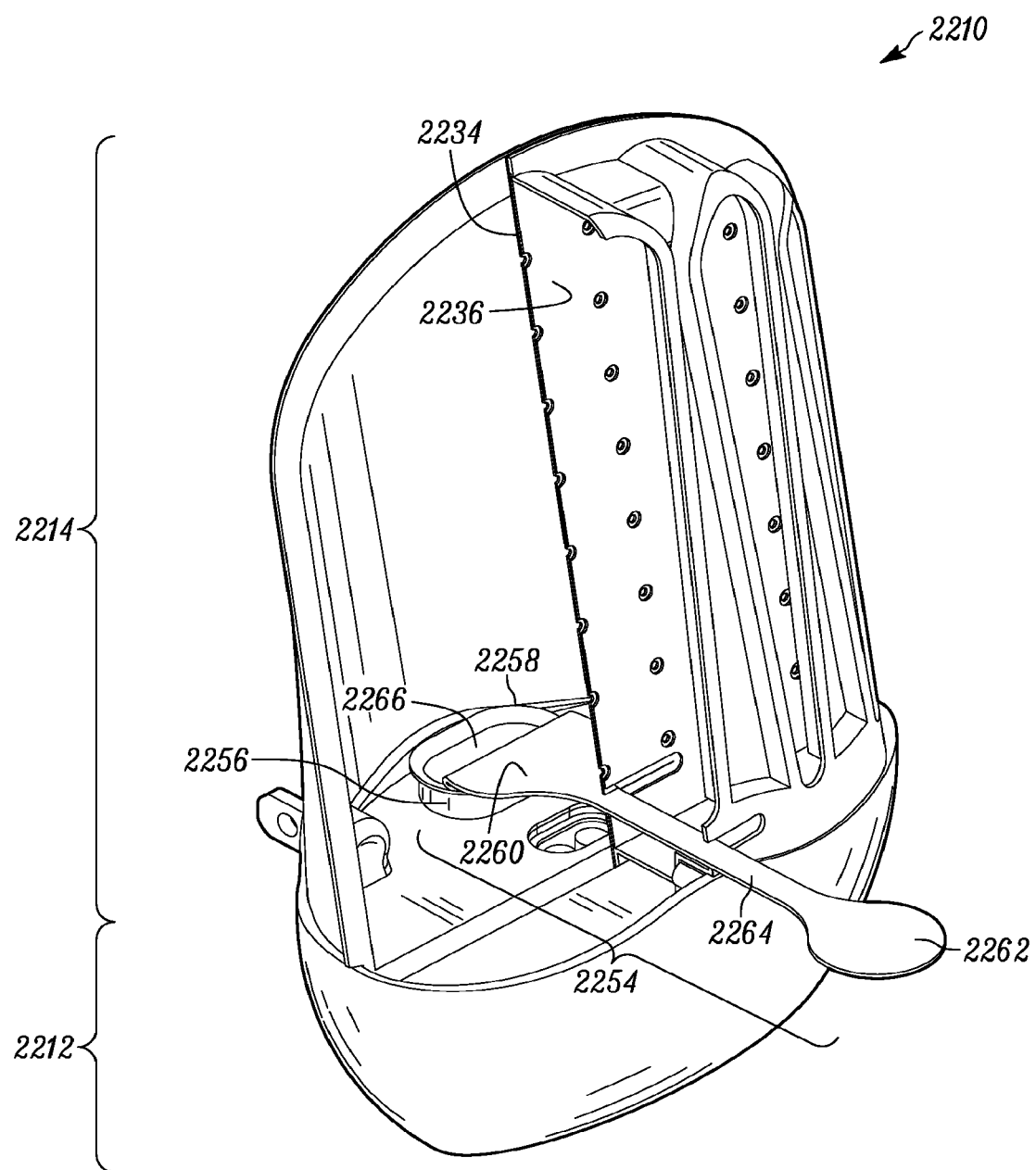
FIG. 104 is a front perspective view of the insect trap of FIG. 102.

FIG. 104 is a front perspective view of insect trap 2210. Trap portion 2214 is shown partially cut away and removable tab 2254 partially removed in this view. A user may grasp removable tab 2254 at grip end 2262 and may pull removable tab 2254 away from trap portion 2214, thereby breaking the seal between lip 2258 of cup 2256 and sealing end 2260 of removable tab 2254. Inside cup 2256 is a carrier material 2266 impregnated with one or more of insect-attracting substances. Carrier material 2266 inside cup 2256 may be a solid, a liquid, a gel, or any combination thereof. For example, carrier material 2266 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2210. Alternatively, carrier material 2266 may be impregnated with water in addition to, or in place of, the one or more insect-attracting substances, as water vapor is a known mosquito attractant. Alternatively, other insect attractants such sugar solution, molasses, or honey may be embedded in carrier material 2266 in addition to, or in place of, the one or more insect-attracting substances. Alternatively, a combination of live yeast, sugar, and water, which can produce mosquito-attracting carbon dioxide, may be embedded in carrier material 2266 in addition to, or in place of, the one or more insect-attracting substances. Alternatively, the insect-attracting substances may be contained in cup 2256 without a carrier material 2266. Breaking the seal between cup 2256 and removable tab 2254 releases the insect-attracting scent or scents from the carrier material 2266. The materials of trap portion 2214 (e.g., front housing 2218, rear housing 2240, divider 2234 and adhesive 2236) may also be impregnated with one or more insect attractants. It is desirable for such attractants to be detectable by an insect for approximately a 2-meter radius from insect trap 2210.

Figure 105:
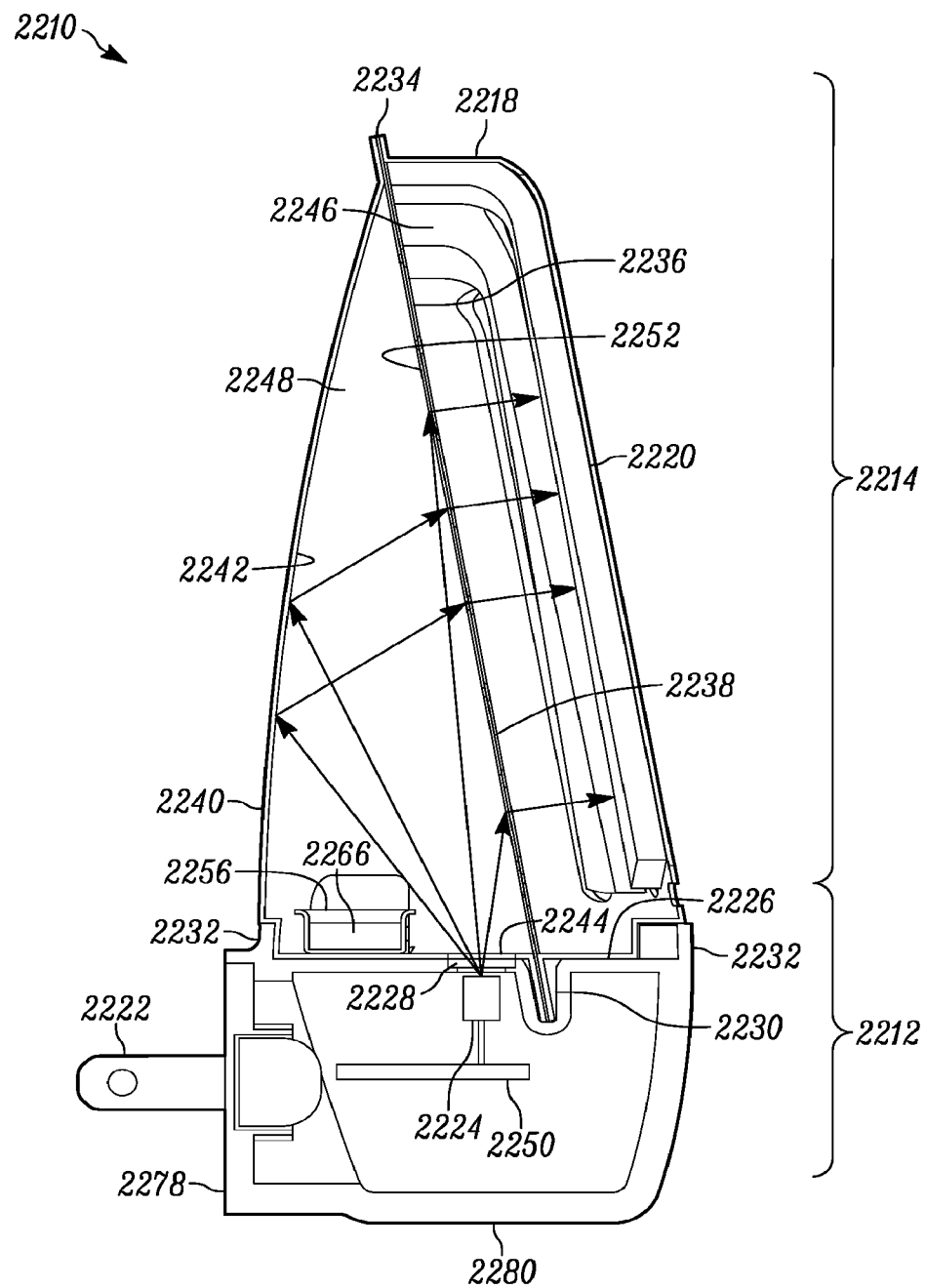
FIG. 105 is a cross-sectional view of the insect trap of FIG. 102.

FIG. 105 is a cross-sectional view of insect trap 2210. Removable tab 2254 has been completely removed in this view. In some embodiments, inside surface 2242 of rear housing 2240 has a reflective coating. Alternatively, the material and surface finish of rear housing 2240 may be configured to reflect and disperse UV and/or visible light without a reflective coating. Rear housing 2240 may include an opening 2244 in its bottom face, or alternatively opening 2244 may be replaced by a transparent or translucent window (not shown).

In some embodiments, front housing 2218 and rear housing 2240 are thermoformed from opaque sheet plastic, creating a clean and aesthetically pleasing shape while maintaining low cost and disposability. Alternatively, other opaque, transparent or translucent materials such as paper, paperboard, cardboard or paper pulp may be used. In some embodiments, front housing 2218 and rear housing 2240 are made by injection molding or by other suitable manufacturing techniques. As shown, divider 2234 has a rear surface 2252, and is substantially planar, and may be configured to be parallel to, or at an angle to, the primary direction (not shown) of the light produced by LEDs 2224. In some embodiments, divider 2234 may be formed into a convex, concave or saddle-shaped contour (not shown), or a combination of contours to optimize the even distribution of light. In some embodiments, divider 2234 may have ribs or other features (not shown) that increase adhesive surface area and create regions of light/dark contrast, which are highly visible to a wide variety of insects and may be more attractive to them.

In some embodiments, front housing 2218 is coated with transparent, translucent or opaque adhesive (not shown) on its inside surface to provide additional insect trapping efficiency and capacity. In addition, front housing 2218 may also have a reflective coating (not shown) underneath the adhesive coating on its inside surface to enhance its attraction to insects and further improve the insect trapping efficiency and effectiveness. In some embodiments, front housing 2218, divider 2234 and rear housing 2240 are joined together where they intersect or engage by ultrasonic welding or high frequency welding, although they may also be permanently or removably joined together by gluing or any other suitable assembly method. Divider 2234 separates trap portion 2214 into a front enclosure 2246 and a rear enclosure 2248.

In some embodiments, base portion 2212 includes a circuit board 2250 having a programmable processor or chip (not shown) for executing commands, electrically connected to conductive prongs 2222 (only one of which is shown) and LEDs 2224 (only one of which is shown). For clarity, not all of the electrical connections are shown. Circuit board 2250 may include electronic circuitry to receive ordinary household current from conductive prongs 2222 and provide power to illuminate LEDs 2224. Circuit board 2250 may include an energy stabilizer such as a full wave rectifier circuit or any other circuit that provides steady voltage to LEDs 2224, although it may also provide a varying voltage to LEDs 2224 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 2250 may provide power to LEDs 2224 to provide UV and/or visible and/or IR light, although it may be configured to provide power to only the UV LEDs 2224 or to only the visible light LEDs 2224 or to only the IR LEDs 2224, or to provide variable power to produce combinations of flickering UV and/or visible and/or IR light. Circuit board 2250 may also be configured to drive a transmitter or transceiver such as a piezoelectric speaker (not shown) or other device that may be mounted in base portion 2212 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 2210. It is desirable for such insect-attracting sound to be undetectable by a human beyond approximately a 1-meter distance from insect trap 2210.

Circuit board 2250 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 2212 and into trap portion 2214, to attract some insect species, including fleas and mosquitoes. Alternatively, one or more of LEDs 2224 may generate heat, to replace or augment the heat generated by the one or more electrical elements. In general, the heat generated may increase and maintain the temperature of at least a portion of trap portion 2214 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, slot 2230 in top surface 2226 of base portion 2212 and rim or protrusions 2232 on top surface 2226 of base portion 2212 engage with trap portion 2214 to secure it in place during use, although any other form of attachment may be substituted that may allow trap portion 2214 to be securely but removably mounted on base portion 2212. Bottom surface 2280 of base portion 2212 may be substantially flat or concave to allow insect trap 2210 to sit upright on a floor, desk, table or shelf when insect trap 2210 is unplugged. Alternatively, bottom surface 2280 of base portion 2212 may have two or more protrusions (not shown) or legs that allow insect trap 2210 to sit upright when insect trap 2210 is unplugged.

In the operation of insect trap 2210, conductive prongs 2222 (only one of which is shown), are inserted into a wall electrical socket, and removable tab 2254 (not shown) is pulled from trap portion 2214 and removed, thereby breaking the seal between cup 2256 and removable tab 2254, and exposing carrier material 2266 and the insect-attracting substance or substances to the air and releasing an insect-attracting scent or scents through perforations 2274 (not shown in this view) in divider 2234, through opening 2220 in front housing 2218 and into the surrounding area where insect trap 2210 is installed. Cup 2256, carrier material 2266 and the insect-attracting substance or substances may be configured to release an insect-attracting scent or scents for a predetermined amount of time to correspond with the expected useful life of trap portion 2214, which may be e.g., a week, a month or three months, or another length of time. Alternatively, cup 2256, carrier material 2266 and the insect-attracting substance or substances may be configured to preferentially release one insect-attracting scent or group of scents earlier in the useful life of trap portion 2214 and another insect-attracting scent or group of scents later in the useful life of trap portion 2214 to attract more insects or a wider variety of insects with a changing scent, or to provide a stronger scent later in the useful life of trap portion 2214 to compensate for the reduced light emitted from trap portion 2214 when many insects are caught in adhesive 2236. Alternatively, cup 2256 and carrier material 2266 may be configured to release additional scents that may mask the insect-attracting scent or scents or mask or eliminate components of the insect-attracting scent or scents that humans may find objectionable, or that children or non-intended animals (e.g., pets) may find attractive, without substantially reducing their attractiveness to insects. LEDs 2224 emit light, represented by arrows, which transmits through window 2228 in base portion 2212, through opening 2244 in rear housing 2240 of trap portion 2214, into rear enclosure 2248, and directly onto inside surface 2242 of rear housing 2240 and rear surface 2252 of divider 2234. Because the light from LEDs 2224 enters rear enclosure 2248 through opening 2244 through bottom inside surface 2276 of rear housing 2240 (e.g., in a face that is substantially parallel to the overall depth of trap portion 2214), the light can travel the entire length of rear enclosure 2248 and can diverge over the entire length of rear enclosure 2248, and therefore can be more evenly distributed throughout rear enclosure 2248. In some embodiments, light is not manipulated in base portion 2212 and is emitted directly into trap portion 2214. Inside surface 2242 of rear housing 2240 may include a concave shape and may be configured to reflect and disperse the UV and visible light from LEDs 2224 to distribute the light evenly onto rear surface 2252 of divider 2234, although inside surface 2242 of rear housing 2240 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 2252 of divider 2234, may be mounted to rear housing 2240 at or near opening 2244 or to base portion 2212 at or near window 2228, and may replace or augment the role of inside surface 2242 of rear housing 2240. Alternatively, the UV and visible light from the one or more LEDs 2224 may directly strike rear surface 2252 of divider 2234 at an oblique angle (e.g., an acute angle from approximately 0° to 90°) and may be spread across divider 2234, and may replace or augment the role of inside surface 2242 of rear housing 2240 or of the lens or lenses mounted to rear housing 2240.

Thereafter, the light transmits through divider 2234 and adhesive 2236 on its front surface 2238, and into front enclosure 2246. The light may be further evenly distributed by the light-diffusing properties of divider 2234, adhesive 2236, or both. A portion of the light entering front enclosure 2246 continues through opening 2220 in front housing 2218 and emits into the surrounding area where insect trap 2210 is installed. Insects are attracted to the light transmitted through adhesive 2236 and through opening 2220 in front housing 2218. Insects are also attracted to the scents and/or pheromones released from carrier material 2266 in cup 2256. In addition, heat generated by circuit board 2250 may warm carrier material 2266, and may thereby increase the release of insect-attracting scents and/or pheromones. Insects fly or crawl into opening 2220 and onto adhesive 2236, where they become trapped. A user may observe trapped insects by looking through opening 2220 in front housing 2218. When a sufficient number of insects have been trapped, the user may easily remove and discard the entire used trap portion 2214 without touching trapped insects, insect debris or adhesive, which remain out of reach inside trap portion 2214, and replace it with a new trap portion 2214. The new trap portion 2214 has fresh adhesive-coated surfaces and light-directing surfaces, ensuring that insect trap 2210 will continue to efficiently and effectively attract and trap insects.

In some embodiments, because trap portion 2214 mounts on top of, and not in front of, base portion 2212, insect trap 2210 protrudes minimally from the wall when plugged into an ordinary household wall socket, and therefore intrudes minimally into the home environment. In some embodiments, insect trap 2210 is configured such that when insect trap 2210 is mounted to a wall, its overall depth, defined by the overall distance insect trap 2210 protrudes from the wall, is smaller than its overall height and its overall width.

It should be appreciated that a benefit of insect trap 2210 is the manipulation of light within trap portion 2214. In some embodiments, light manipulation occurs solely within trap portion 2214. Light manipulation may include reflection, refraction, polarization, dispersion and/or diffusion and is achieved by engaging with a manipulative element or surface (e.g., inside surface 2242, divider 2234 and adhesive 2236). In some embodiments, light manipulation produces an even distribution of light on adhesive 2236. In some embodiments, light is manipulated to produce a predetermined pattern on adhesive 2236 or within trap portion 2214, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2210 of this configuration may accommodate a variety of different trap portions 2214 that may be removably mounted to base portion 2212, each trap portion 2214 being uniquely configured to attract and trap a specific species or multiple species of flying insect. For example, the overall size and shape of trap portion 2214, the size, shape, location and orientation of opening 2220 in front housing 2218, and the scent or scents impregnated in carrier material 2266, front housing 2218, divider 2234, adhesive 2236 or rear housing 2240, may be uniquely configured to attract and trap a specific species or multiple species of flying insect.

For example, in some embodiments, trap portion 2214 is approximately 20 mm to 600 mm wide, 20 mm to 600 mm high and 5 mm to 150 mm deep. In some embodiments, trap portion 2214 is approximately 20 mm to 200 mm wide, 20 mm to 200 mm high and 5 mm to 80 mm deep. In some embodiments, trap portion 2214 is approximately 20 mm to 130 mm wide, 20 mm to 130 mm high and 5 mm to 50 mm deep.

In some embodiments, base portion 2212 is approximately 20 mm to 600 mm wide, 10 mm to 150 mm high and 10 mm to 150 mm deep. In some embodiments, base portion 2212 is 20 mm to 200 mm wide, 10 mm to 100 mm high and 10 mm to 80 mm deep. In some embodiments, base portion 2212 is 20 mm to 130 mm wide, 10 mm to 50 mm high and 10 mm to 50 mm deep.

As provided herein, opening 2220 may be a variety of shapes and/or sizes. For example, opening 2220 may be circular, square, rectangular, polygonal and/or elliptical in shape. Alternatively, opening 2220 may be slot shaped having a straight, curved or undulating shape or pattern. When opening 2220 is circular, opening 2220 may be approximately 0.5 mm to 30 mm in diameter. In some embodiments, circular opening 2220 is approximately 0.5 mm to 20 mm in diameter. In some embodiments, circular opening 2220 is approximately 0.5 mm to 15 mm in diameter. When opening 2220 is slot shaped, opening 2220 may be approximately 2 mm to 30 mm wide and 5 mm to 500 mm long. In some embodiments, slot shaped opening 2220 is approximately 2 mm to 20 mm wide and 5 mm to 200 mm long. In some embodiments, slot shaped opening 2220 is approximately 2 mm to 15 mm wide and 5 mm to 100 mm long.

In some embodiments, opening 2220 covers all or a portion of front housing 2218. For example, opening 2220 may cover a range of approximately 1% to 75% of the surface area of front housing 2218. In some embodiments, opening 2220 covers 5 approximately 5% to 50% of the surface area of front housing 2218. In some embodiments, opening 2220 covers approximately 10% to 30% of the surface area of front housing 2218.

Figure 106:
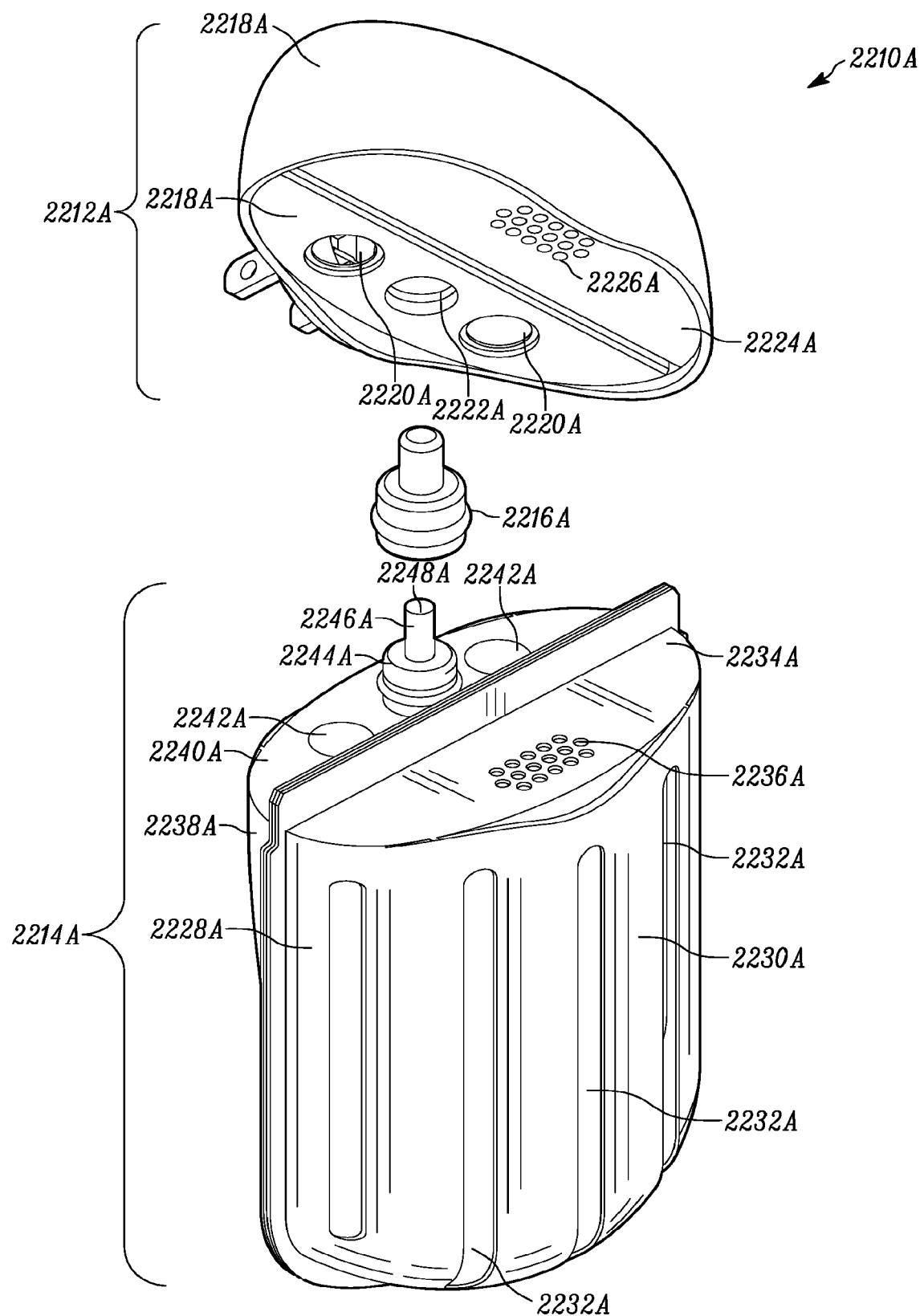
FIG. 106 is a front perspective view of an example of the twenty-second embodiment of an insect trap in accordance with the principles of the disclosure.

Other features or combinations of features are contemplated to deliver insect-attracting scent in an insect trap. FIG. 106 is a front perspective view of an example of the twenty-second embodiment of an insect trap, indicated generally at 2210A. Insect trap 2210A includes a base portion 2212A and a removable trap portion 2214A with a protective cap 2216A. Insect trap 2210A may have an upside-down orientation as compared to other described embodiments. (e.g., base portion above the trap portion when plugged into a wall). In this view, base portion 2212A is shown tilted to reveal its underside, trap portion 2214A is shown removed from base portion 2212A, and protective cap 2216A is shown removed from trap portion. Base portion 2212A includes a bottom rear surface 2218A with one or more light openings 2220A and at least one scent attachment opening 2222A, and a bottom front surface 2224A with one or more front scent openings 2226A. Alternatively, light openings 2220A in base portion 2212A may be replaced by transparent or translucent windows (not shown). Trap portion 2214A includes a front housing 2228A with openings 2232A on its front surface 2230A and one or more front scent openings 2236A on its top surface 2234A, and a rear housing 2238A with one or more windows 2242A and at least one scent protrusion 2244A on its top surface 2240A, with the free end 2248A of a wick 2246A protruding from scent protrusion 2244A. Wick 2246A configuration may be similar to those found in plug-in room air freshener refills.

Figure 107:
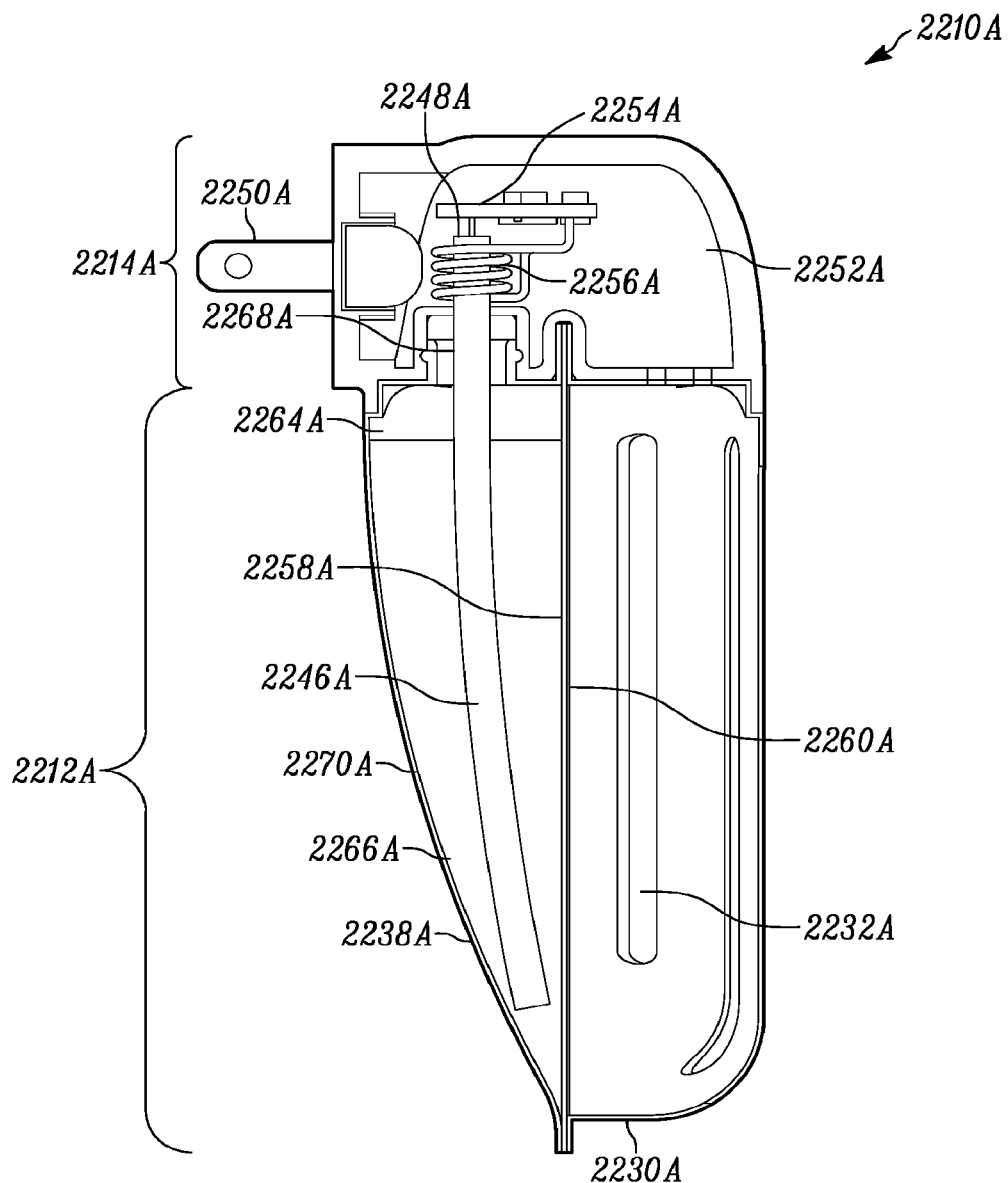
FIG. 107 is a cross-sectional view of the insect trap of FIG. 106.

FIG. 107 is a cross-sectional view of insect trap 2210A. Protective cap 2216A has been removed and trap portion 2214A has been mounted onto base portion 2212A. Base portion 2212A may include a plurality of electrically conductive prongs 2250A and a base enclosure 2252A with a circuit board 2254A, one or more LEDs (not shown) adjacent to light openings 2220A, and a heating element 2256A inside base enclosure 2252A and adjacent to scent attachment opening 2222A. Circuit board 2254A is electrically connected to conductive prongs 2250A, LEDs and heating element 2256A. For clarity, not all electrical connections are shown. Heating element 2256A is configured to coil around free end 2248A of wick 2246A, receive power from circuit board 2254A, and provide heat to free end 2248A of wick 2246A. Heating element 2256A may be similar in configuration to those found in plug-in room air fresheners.

Trap portion 2214A includes a divider 2258A, constructed from or including a transparent or translucent material and coated with a transparent or translucent adhesive on its front surface 2260A. Rear housing 2238A and divider 2258A are sealed together by heat sealing, ultrasonic welding, high-frequency welding or adhesive boding to form a rear enclosure 2264A. Rear enclosure 2264A contains a liquid 2266A, which may include a liquid carrier material and/or an insect-attracting substance or substances. In some embodiments, rear enclosure 2264A may also contain a transparent or translucent bladder (not shown), which contains liquid 2266A. Free end 2248A of wick 2246A protrudes through an opening 2268A in scent protrusion 2244A and into base portion 2212A, and the remainder of wick 2246A extends into liquid 2266A and to the bottom of rear enclosure 2264A. Wick 2246A may be manufactured of fibers of polyester or other natural or manufactured materials, and is configured to absorb and, via capillary action, pull liquid 2266A up the length of wick 2246A to free end 2248A, where liquid 2266A is exposed to the air. Heating element 2256A heats free end 2248A of wick 2246A and liquid 2266A at free end 2248A of wick 2246A. Liquid 2266A at free end 2248A of wick 2246A evaporates into base enclosure 2252A, through front scent openings 2226A in base 2212A, through corresponding front scent openings 2236A in front housing 2228A of trap portion 2214A, on through openings 2232A of front housing 2228A, and into the room where insect trap 2210A has been installed. LEDs (not shown) illuminate, projecting light through light openings 2220A of base portion 2212A and through windows 2242A of rear housing 2238A, and into rear enclosure 2264A and through liquid 2266A. In some embodiments, a portion of light from LEDs (not shown) reflects against an inside surface 2270A of rear housing 2238A. Light from LEDs projects through liquid 2266A, through divider 2258A, through adhesive 2262A, through openings 2232A in front surface 2230A of front housing 2228A, and on into room where insect trap 2210A has been installed. In some embodiments, heat and scent alone are used as attractants, and light sources are not used in insect trap 2210A.

An added benefit of insect trap 2210A is that trap portion 2214A may include a built-in life indicator. In some embodiments, light from the LEDs projecting through liquid 2266A may show a visible horizontal line through divider 2258A, corresponding to the amount of liquid 2266A remaining in rear enclosure 2264A. In some embodiments, liquid 2266A may be tinted or colored to enhance the visibility of the horizontal line showing through divider 2258A. In some embodiments, a marking or markings on divider 2258A may indicate the position of the horizontal line showing through divider 2258A when liquid 2266A is partially and/or fully depleted, thereby providing a visual cue indicating that trap portion 2214A should be removed and replaced with a fresh trap portion 2214A.

Figures 108, 109:
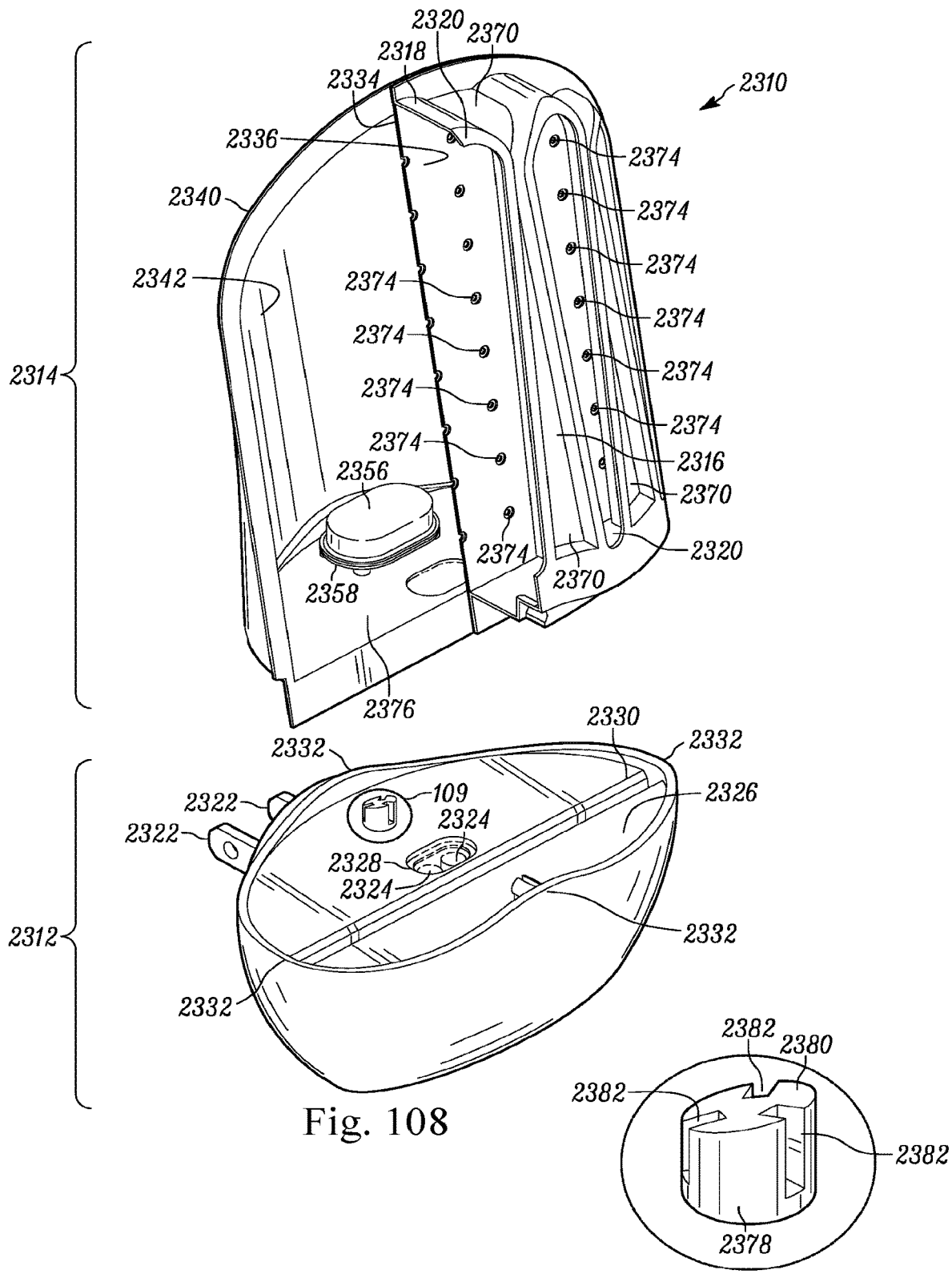
FIG. 108 is a front perspective view of a twenty-third embodiment of an insect trap in accordance with principles of the disclosure.
FIG. 109 is an enlarged view of a portion of FIG. 108.

FIG. 108 is a front perspective view of a twenty-third embodiment of an insect trap, indicated generally at 2310, and FIG. 109 is an enlarged view of a portion of FIG. 108. Insect trap 2310 includes a base portion 2312 and a removable trap portion 2314. Insect trap 2310 may have an overall length, an overall width and an overall depth, and may be configured such that when insect trap 2310 is mounted to a wall, its overall depth, defined by the overall distance insect trap 2310 protrudes from the wall, is the smallest of the three overall dimensions. Trap portion 2314 is shown partially cut away and removed from base portion 2312 in FIG. 108. Trap portion 2314 may have an overall length, an overall width and an overall depth, and may be configured such that when trap portion 2314 is mounted in insect trap 2310, and insect trap 2310 is mounted to a wall, the overall depth of trap portion 2314, which is measured in the direction perpendicular to the wall, is the smallest of the three overall dimensions of trap portion 2314. Trap portion 2314 includes a front housing 2318 with at least one opening 2320 in a front surface 2316. Opening 2320 in front housing 2318 may be configured to admit a wide variety of insects into insect trap 2310, or alternatively it may be configured to admit one or more specific insect species. In some embodiments, opening 2320 is configured to prevent user's fingers from penetrating opening 2320 and inadvertently touching trapped insects or adhesive when removing and replacing trap portion 2314. In some embodiments, opening 2320 has a size and shape such that a sphere 25 mm in diameter cannot pass through opening 2320, and has a size and shape such that a sphere 1 mm in diameter can pass through any portion of opening 2320. Opening 2320 may be of uniform or of varying width, shape and orientation, and if trap portion 2314 has more than one opening 2320, they may be of identical or of differing widths, shapes and orientations. Opening 2320 may be configured to attract one or more individual insect species or a variety of insect species. In some embodiments, front housing 2318 is configured with ribs or reliefs 2370 surrounding opening 2320 to confer stiffness and strength to trap portion 2314 and to enable front housing 2318 to be made of thinner material. Trap portion 2314 includes a divider 2334, constructed from or including a transparent or translucent material and coated with a transparent or translucent adhesive 2336 on its front surface 2338 (shown in FIG. 110). In some embodiments, divider 2334 is configured to polarize light transmitted through it in an orientation similar to that of daylight to further attract flying insects, a wide variety of which are known to detect polarized light. In some embodiments, the material and thickness of divider 2334 and the material and thickness of adhesive 2336 are selected to transmit a substantial proportion of the light, for example greater than 60% of the light is transmitted through divider 2334 and adhesive 2336. Divider 2334 includes one or more perforations 2374. In some embodiments, the regions on front surface 2338 of divider 2334 immediately around perforations 2374 are not coated with adhesive 2336. Trap portion 2314 includes a rear housing 2340 with an inside surface 2342 and a bottom inside surface 2376, and a downwardly-facing cup 2356. Cup 2356 may have a lip 2358 protruding from the perimeter of its open end, and may be made of any material or combination of materials that act as a barrier to any of the insect-attracting substances mentioned herein.

Protruding from a rear surface 2354 (shown in FIG. 110) of base portion 2312 may be a plurality of electrically conductive prongs 2322, adapted to mount insect trap 2310 to a wall and provide power to insect trap 2310 by inserting conductive prongs 2322 into a standard household electrical wall socket. Alternatively, conductive prongs 2322 may be adapted to swivel to allow insect trap 2310 to remain upright when conductive prongs 2322 are inserted into a horizontally oriented electrical wall socket. Alternatively, base portion 2312 may be configured to sit or hang wherever desired and receive power from batteries (not shown) mounted in base portion 2312. While an electrical socket and batteries have been described as providing power to insect trap 2310, any suitable power source may be used. Base portion 2312 includes a top surface 2326 and a lighting element such as one or more LEDs 2324. In some embodiments, LEDs 2324 include at least one that emits UV light and at least one that emits visible light. In some embodiments, LEDs 2324 includes at least one that emits UV light and at least one that emits blue light to better attract a wide variety of insect species. In some embodiments, the lighting element emits a combination of wavelengths to mimic sunlight. In some embodiments, LEDs 2324 include at least one that emits IR light to better attract certain species of insects including mosquitos and fleas. Mounted in top surface 2326 of base portion 2312 may be a transparent or translucent window 2328, shown partially cut away to reveal LEDs 2324. Window 2328 protects LEDs 2324 from dust and insect debris, and allows base portion 2312 to be easily cleaned. In some embodiments, at least a portion of window 2328 and at least a portion of LEDs 2324 protrude from top surface 2326 of base portion 2312 and into trap portion 2314 when trap portion 2314 is mounted to base portion 2312. Alternatively, base portion 2312 may not include window 2328, and at least a portion of LEDs 2324 protrude from top surface 2326 of base portion 2312 and into trap portion 2314 when trap portion 2314 is mounted to the base portion 2312. In top surface 2326 may be a slot 2330, and on the perimeter of top surface 2326 is a rim or upwardly directed protrusions 2332. As shown, protruding from top surface 2326 of base portion 2312 is a punch 2378 with an angled top surface 2380 and one or more axial grooves 2382 that extend through angled top surface 2380, but do not extend to the bottom of punch 2378. Angled top surface 2380 of punch 2378 forms a point at the distal end of punch 2378. In some embodiments, the sides of punch 2378 are tapered such that punch 2378 has a larger cross section at its proximal end than at its distal end.

FIG. 110 is a cross-sectional view of insect trap 2310 and FIG. 111 is an enlarged view of a portion of FIG. 110. Trap portion 2314 is raised above base portion 2312 in this view. A lid 2360 configured to cover the open end and lip 2358 of cup 2356, is affixed to lip 2358 of cup 2356 with an adhesive to create an airtight seal, thereby maintaining the freshness of any substances (not shown) inside sealed cup 2356. Lid 2360 may be made of a thin, durable, but puncturable material or combination of materials that may act as a barrier to any of the insect-attracting substances mentioned herein. Cup 2356 is mounted on at least one support post 2362, configured to mount cup 2356 and lid 2360 above bottom inside surface 2376 of rear housing 2340. In some embodiments, support post 2362 is replaced by at least one protrusion (not shown) in bottom inside surface 2376 of rear housing 2340. Inside cup 2356 is a carrier material 2366 impregnated with one or more insect-attracting substances. For example, carrier material 2366 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2310. Carrier material 2366 inside cup 2356 may be a solid, a liquid, a gel, or any combination thereof. Alternatively, carrier material 2366 may be impregnated with water in addition to, or in place of, the one or more insect-attracting substances, as water vapor is a known mosquito attractant. Alternatively, other insect attractants such sugar solution, molasses, or honey may be embedded in carrier material 2366 in addition to, or in place of, the one or more insect-attracting substances. Alternatively, a combination of live yeast, sugar, and water, which can produce mosquito-attracting carbon dioxide, may be embedded in carrier material 2366 in addition to, or in place of, the one or more insect-attracting substances. Alternatively, the insect-attracting substances may be contained in cup 2356 without a carrier material 2366. The materials of trap portion 2314 (e.g., front housing 2318, rear housing 2340, divider 2334 and adhesive 2336) may also be impregnated with one or more insect attractants. It is desirable for such attractants to be detectable by an insect for approximately a 2-meter radius from insect trap 2310.

In some embodiments, inside surface 2342 of rear housing 2340 has a reflective coating. Alternatively, the material and surface finish of rear housing 2340 may be configured to reflect and disperse UV and/or visible light without a reflective coating. Rear housing 2340 may include an opening 2344 on its bottom face, or alternatively opening 2344 may be replaced by a transparent or translucent window (not shown). In some embodiments, front housing 2318 and rear housing 2340 are thermoformed from sheet plastic, creating a clean and aesthetically pleasing shape while maintaining low cost and disposability. Alternatively, other opaque, transparent or translucent materials such as paper, paperboard, cardboard or paper pulp may be used. In some embodiments, front housing 2318 and rear housing 2340 are made by injection molding or by other suitable manufacturing techniques. As shown, divider 2334 has a rear surface 2352, and is substantially planar, and may be configured to be parallel to, or at an angle to, the primary direction (not shown) of the light produced by LEDs 2324. In some embodiments, divider 2334 is formed into a convex, concave or saddle-shaped contour (not shown), or a combination of contours to optimize the even distribution of light. In some embodiments, divider 2334 has ribs or other features (not shown) that increase adhesive surface area and create regions of light/dark contrast, which are highly visible to a wide variety of insects and may be more attractive to them.

In some embodiments, front housing 2318 is coated with transparent, translucent or opaque adhesive (not shown) on its inside surface to provide additional insect trapping efficiency and capacity. In addition, front housing 2318 may also have a reflective coating (not shown) underneath the adhesive coating on its inside surface to enhance its attraction to insects and further improve the insect trapping efficiency and effectiveness. In some embodiments, front housing 2318, divider 2334 and rear housing 2340 are joined together where they intersect or engage by ultrasonic welding or high frequency (HF) welding, although they may also be permanently or removably joined together by gluing or any other suitable assembly method. Divider 2334 separates trap portion 2314 into a front enclosure 2346 and a rear enclosure 2348.

In some embodiments, base portion 2312 includes a circuit board 2350 having a programmable processor or chip (not shown) for executing commands, electrically connected to conductive prongs 2322 (only one of which is shown) and LEDs 2324 (only one of which is shown). For clarity, not all of the electrical connections are shown. Circuit board 2350 may include electronic circuitry to receive ordinary household current from conductive prongs 2322 and provide power to illuminate LEDs 2324. Circuit board 2350 may include an energy stabilizer such as a full wave rectifier circuit or any other circuit that provides steady voltage to LEDs 2324, although it may also provide a varying voltage to LEDs 2324 to provide a flickering light, which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 2350 may provide power to LEDs 2324 to provide UV and/or visible and/or IR light, although it may be configured to provide power to only UV LEDs 2324 or to only visible light LEDs 2324 or to only IR LEDs 2324, or to provide variable power to produce combinations of flickering UV and/or visible and/or IR light. Circuit board 2350 may also be configured to drive a transmitter or transceiver such as a piezoelectric speaker (not shown) or other device that may be mounted in base portion 2312 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 khz. It is desirable for such insect-attracting sound to be detectable by an insect within approximately a 2-meter distance from insect trap 2310. It is desirable for such insect-attracting sound to be undetectable by a human beyond approximately a 1-meter distance from insect trap 2310.

Circuit board 2350 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 2312 and into trap portion 2314, to attract some insect species, including fleas and mosquitoes. Alternatively, one or more of LEDs 2324 may generate heat, to replace or augment the heat generated by the one or more electrical elements. In general, the heat generated may increase and maintain the temperature of at least a portion of trap portion 2314 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

In some embodiments, a bottom surface 2364 of base portion 2312 may be substantially flat or concave to allow the insect trap 2310 to sit upright on a floor, desk, table or shelf when the insect trap 2310 is unplugged. Alternatively, the bottom surface 2364 of the base portion 2312 may have two or more protrusions (not shown) or legs that allow the insect trap 2310 to sit upright when the insect trap 2310 is unplugged.

Figure 112:
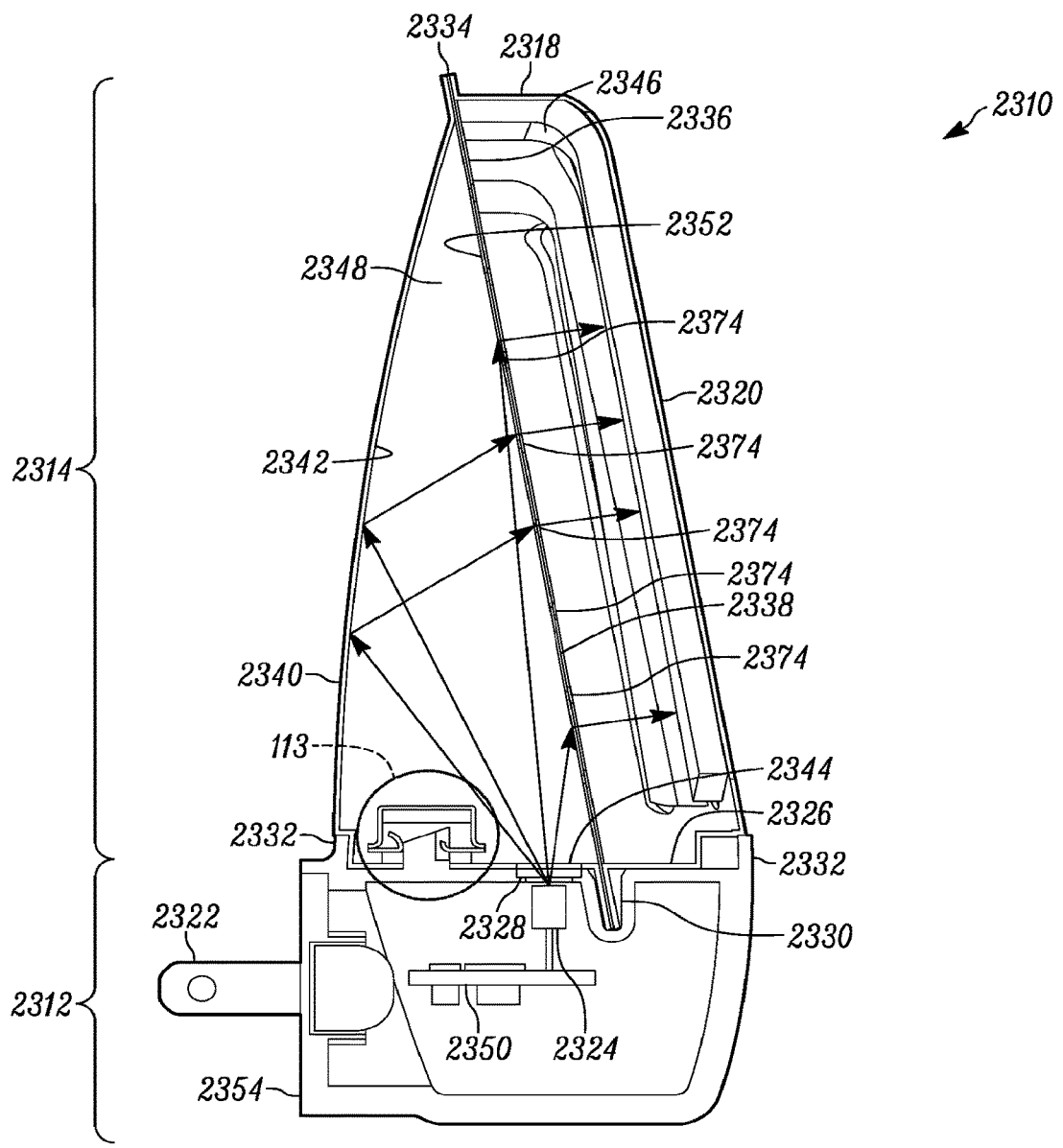
FIG. 112 is a cross-sectional view of the insect trap of FIG. 108.
Figure 113:
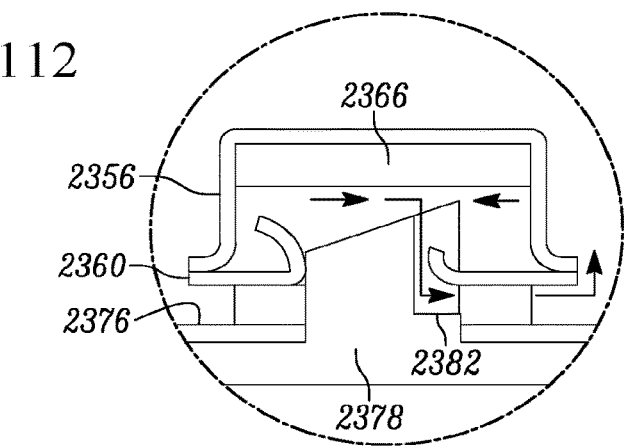
FIG. 113 is an enlarged view of a portion of FIG. 112.

FIG. 112 is a cross-sectional view of insect trap 2310 and FIG. 113 is an enlarged view of a portion of FIG. 112. Trap portion 2314 is shown mounted to base portion 2312 in this view. As shown, slot 2330 in top surface 2326 of base portion 2312 and rim or protrusions 2332 on top surface 2326 of base portion 2312 engage with trap portion 2314 to secure it in place during use, although any other form of attachment may be substituted that may allow trap portion 2314 to be securely but removably mounted on base portion 2312. Mounting trap portion 2314 to base portion 2312 causes the pointed distal end of punch 2378 to break through the bottom surface of rear housing 2340 and lid 2360. The portion or portions of lid 2360 corresponding to axial grooves 2382 in punch 2378 deform to create clearance between lid 2360 and punch 2378 and release the insect-attracting scent or scents through axial grooves 2382, into rear enclosure 2348 of trap portion 2314, shown by arrows, and on through perforations 2374 in divider 2334 and opening 2320 in front housing 2318, and on into the surrounding area where insect trap 2310 is installed. Because axial grooves 2382 do not extend to the proximal end of punch 2378, punch 2378 itself plugs the opening in the bottom of rear housing 2340 where punch 2378 has broken through, thereby ensuring that the insect-attracting scent or scents are released only through the one or more perforations 2374 in divider 2334.

In the operation of insect trap 2310, conductive prongs 2322 (only one of which is shown) are inserted into a wall electrical socket, and trap portion 2314 is mounted to base portion 2312, thereby breaking the sealed lid 2360 and releasing an insect-attracting scent or scents through perforations 2374 in divider 2334 and through opening 2320 in front housing 2318 and into the surrounding area where insect trap 2310 is installed. Cup 2356, carrier material 2366 and the insect-attracting substance or substances may be configured to release an insect-attracting scent or scents for a predetermined amount of time to correspond with the expected useful life of trap portion 2314, which may be e.g., a week, a month or three months, or another length of time. Alternatively, cup 2356, carrier material 2366 and the insect-attracting substance or substances may be configured to preferentially release one insect-attracting scent or group of scents earlier in the useful life of trap portion 2314 and another insect-attracting scent or group of scents later in the useful life of trap portion 2314 to attract more insects or a wider variety of insects with a changing scent, or to provide a stronger scent later in the useful life of trap portion 2314 to compensate for the reduced light emitted from trap portion 2314 when many insects are caught in adhesive 2336. Alternatively, cup 2356 and carrier material 2366 may be configured to release additional scents that may mask the insect-attracting scent or scents or mask or eliminate components of the insect-attracting scent or scents that humans may find objectionable, or that children or non-intended animals (e.g., pets) may find attractive, without substantially reducing its attractiveness to insects. LEDs 2324 emit light, represented by arrows, which transmits through window 2328 in base portion 2312, through opening 2344 in rear housing 2340 of trap portion 2314, into rear enclosure 2348 and directly onto inside surface 2342 of rear housing 2340 and rear surface 2352 of divider 2334. Because the light from LEDs 2324 enters rear enclosure 2348 through opening 2344 in bottom inside surface 2376 of rear housing 2340 (e.g., in a face that is substantially parallel to the overall depth of trap portion 2314), the light can travel the entire length of rear enclosure 2348 and can diverge over the entire length of rear enclosure 2348, and therefore can be more evenly distributed throughout rear enclosure 2348. In some embodiments, light is not manipulated in base portion 2312 and is emitted directly into trap portion 2314. Inside surface 2342 of rear housing 2340 may include a concave shape and may be configured to reflect and disperse the UV and visible light from LEDs 2324 to distribute the light evenly onto rear surface 2352 of divider 2334, although the shape of inside surface 2342 of rear housing 2340 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 2352 of divider 2334, may be mounted to rear housing 2340 at or near opening 2344 or to base portion 2312 at or near window 2328, and may replace or augment the role of inside surface 2342 of rear housing 2340. Alternatively, the light from LEDs 2324 may directly strike rear surface 2352 of divider 2334 at an oblique angle (e.g., an acute angle from approximately 0° to 90°) and may be spread across divider 2334, and may replace or augment the role of inside surface 2342 of rear housing 2340 or of the lens or lenses mounted to rear housing 2340.

Thereafter, the light is transmitted through divider 2334 and adhesive 2336 on front surface 2338, and into front enclosure 2346. The light may be further evenly distributed by the light-diffusing properties of divider 2334, adhesive 2336, or both. A portion of the light entering front enclosure 2346 continues through opening 2320 in front housing 2318 and into the surrounding area where insect trap 2310 is installed. Insects are attracted to the light transmitted through adhesive 2336 and through opening 2320 in front housing 2318. Insects are also attracted to the scents and/or pheromones released from carrier material 2366 in cup 2356. In addition, heat generated by circuit board 2350 may warm carrier material 2366, and may thereby increase the release of insect-attracting scents and/or pheromones. Insects fly or crawl into opening 2320 and onto adhesive 2336, where they become trapped. A user may observe trapped insects by looking through opening 2320 in front housing 2318. When a sufficient number of insects have been trapped, the user may easily remove and discard the entire used trap portion 2314 without touching trapped insects, insect debris or adhesive, which remain out of reach inside trap portion 2314, and replace it with a new trap portion 2314. The new trap portion 2314 has fresh adhesive-coated surfaces and light-directing surfaces, ensuring that insect trap 2310 will continue to efficiently and effectively attract and trap insects.

In some embodiments, because trap portion 2314 mounts on top of, and not in front of, base portion 2312, insect trap 2310 protrudes minimally from the wall when plugged into an ordinary household wall socket, and therefore intrudes minimally into the home environment. In some embodiments, insect trap 2310 is configured such that when insect trap 2310 is mounted to a wall, its overall depth, defined by the overall distance insect trap 2310 protrudes from the wall, is smaller than its overall height and its overall width.

It should be appreciated that a benefit of insect trap 2310 is the manipulation of light within trap portion 2314. In some embodiments, light manipulation occurs solely within trap portion 2314. Light manipulation may include reflection, refraction, polarization, dispersion and/or diffusion and is achieved by engaging with a manipulative element or surface (e.g., inside surface 2342, divider 2334 and adhesive 2336). In some embodiments, light manipulation produces an even distribution of light on adhesive 2336. In some embodiments, light is manipulated to produce a predetermined pattern on adhesive 2336 or within trap portion 2314, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2310 of this configuration may accommodate a variety of different trap portions 2314 that may be removably mounted to base portion 2312, each trap portion 2314 being uniquely configured to attract and trap a specific species or multiple species of flying insect. For example, the overall size and shape of trap portion 2314, the size, shape, location and orientation of opening 2320 in front housing 2318 of trap portion 2314, and the scent or scents impregnated in carrier material 2366, front housing 2318, divider 2334, adhesive 2336 or rear housing 2340, may be uniquely configured to attract and trap a specific species or multiple species of flying insect.

For example, in some embodiments, trap portion 2314 is approximately 20 mm to 600 mm wide, 20 mm to 600 mm high and 5 mm to 150 mm deep. In some embodiments, trap portion 2314 is approximately 20 mm to 200 mm wide, 20 mm to 200 mm high and 5 mm to 80 mm deep. In some embodiments, trap portion 2314 is approximately 20 mm to 130 mm wide, 20 mm to 130 mm high and 5 mm to 50 mm deep.

In some embodiments, base portion 2312 is approximately 20 mm to 600 mm wide, 10 mm to 150 mm high and 10 mm to 150 mm deep. In some embodiments, base portion 2312 is 20 mm to 200 mm wide, 10 mm to 100 mm high and 10 mm to 80 mm deep. In some embodiments, base portion 2312 is 20 mm to 130 mm wide, 10 mm to 50 mm high and 10 mm to 50 mm deep.

As provided herein, opening 2320 may be a variety of shapes and/or sizes. For example, opening 2320 may be circular, square, rectangular, polygonal and/or elliptical in shape. Alternatively, opening 2320 may be slot shaped having a straight, curved or undulating shape or pattern. When opening 2320 is circular, opening 2320 may be approximately 0.5 mm to 30 mm in diameter. In some embodiments, circular opening 2320 is approximately 0.5 mm to 20 mm in diameter. In some embodiments, circular opening 2320 is approximately 0.5 mm to 15 mm in diameter. When opening 2320 is slot shaped, opening 2320 may be approximately 2 mm to 30 mm wide and 5 mm to 500 mm long. In some embodiments, slot shaped opening 2320 is approximately 2 mm to 20 mm wide and 5 mm to 200 mm long. In some embodiments, slot shaped opening 2320 is approximately 2 mm to 15 mm wide and 5 mm to 100 mm long.

In some embodiments, opening 2320 covers all or a portion of front housing 2318. For example, opening 2320 may cover a range of approximately 1% to 75% of the surface area of front housing 2318. In some embodiments, opening 2320 covers approximately 5% to 50% of the surface area of front housing 2318. In some embodiments, opening 2320 covers approximately 10% to 30% of the surface area of front housing 2318.

Figure 114:
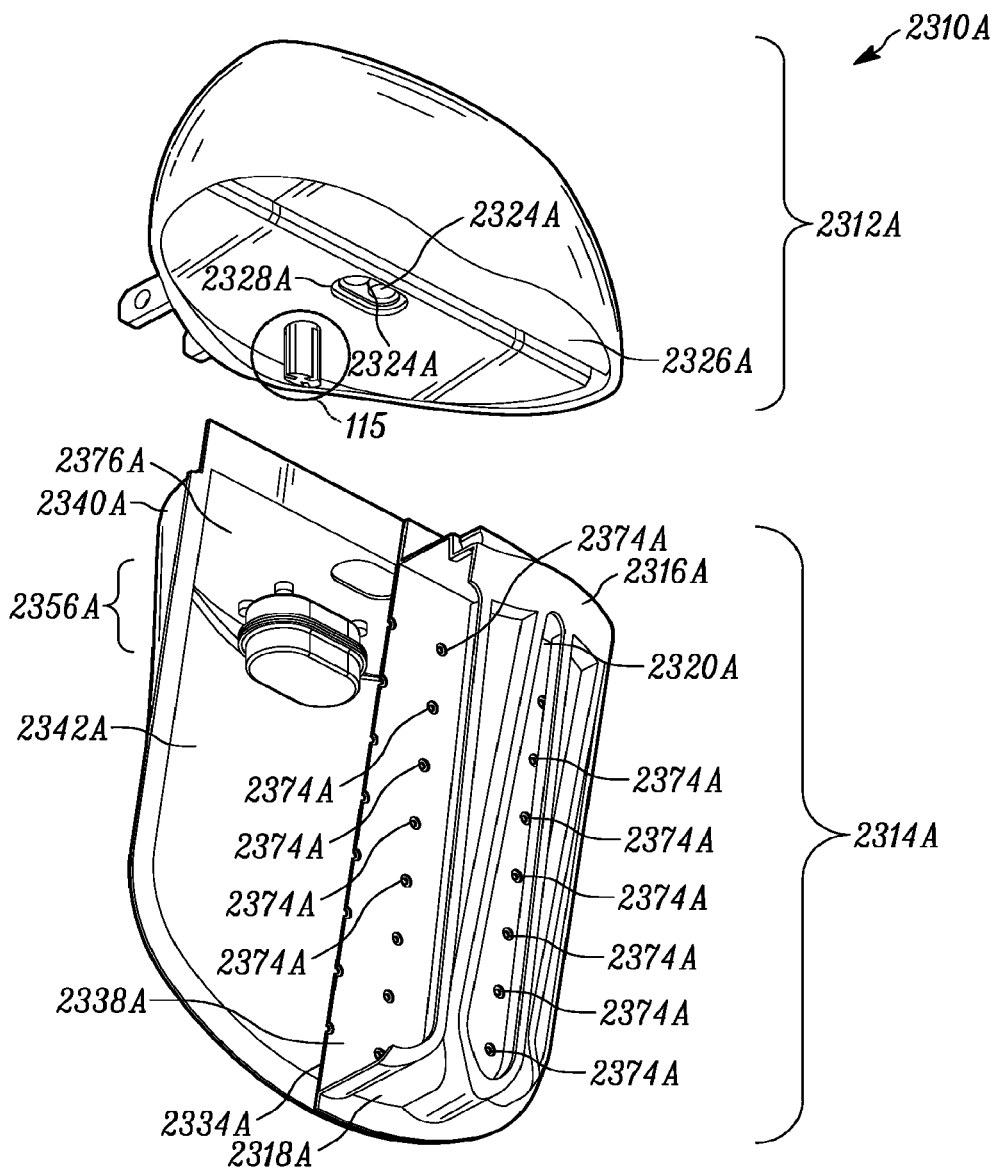
FIG. 114 is a front perspective view of an example of the twenty-third embodiment of an insect trap in accordance with the principles of the disclosure.
Figure 115:
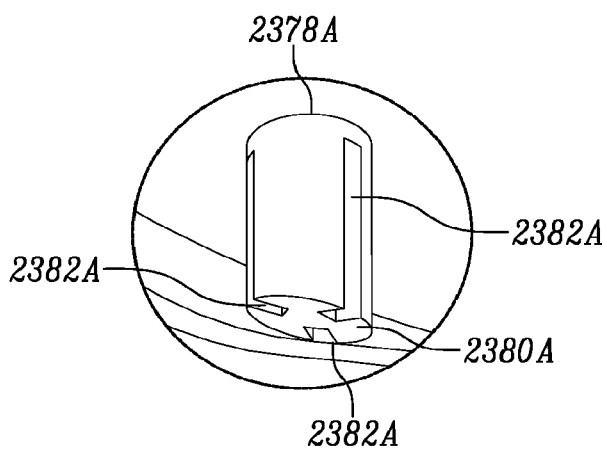
FIG. 115 is an enlarged view of a portion of FIG. 114.

The configuration of insect trap 2310 may be adapted to self-activate and deliver carbon dioxide ($CO_2$), which is known to attract some types of insects such as mosquitos. FIG. 114 is a front perspective view of an example of the twenty-third embodiment of an insect trap, indicated generally at 2310A, and FIG. 115 is an enlarged view of a portion of FIG. 114. Insect trap 2310A includes a base portion 2312A and a removable trap portion 2314A. Trap portion 2314A is shown partially cut away and removed from base portion 2312A. In this configuration, trap portion 2014A may be mounted underneath base portion 2012A. Trap portion 2314A includes a front housing 2318A with at least one opening 2320A in a front surface 2316A, a divider 2334A with one or more perforations 2374A and a transparent or translucent adhesive on its front surface 2338A, a rear housing 2340A with an inside surface 2342A and a top inside surface 2376A, and a reservoir assembly 2356A. Base portion 2312A includes a bottom surface 2326A, at least one opening 2328A in bottom surface 2326A, and a lighting element such as one or more LEDs 2324A inside base portion 2012A and adjacent to opening 2328A. As shown, protruding from bottom surface 2326A of base portion 2312A is a punch 2378A with an angled top surface 2380A and one or more axial grooves 2382A that extend through angled top surface 2380A, but do not extend to the bottom of punch 2378A. Angled top surface 2380A of punch 2378A forms a point at the distal end of punch 2378A. In some embodiments, the sides of punch 2378A are tapered such that punch 2378A has a larger cross section at its proximal end than at its distal end. Punch 2378A aligns with and punctures reservoir assembly 2356A in trap portion 2314A when trap portion 2314A is mounted to base portion 2312A.

Figure 116:
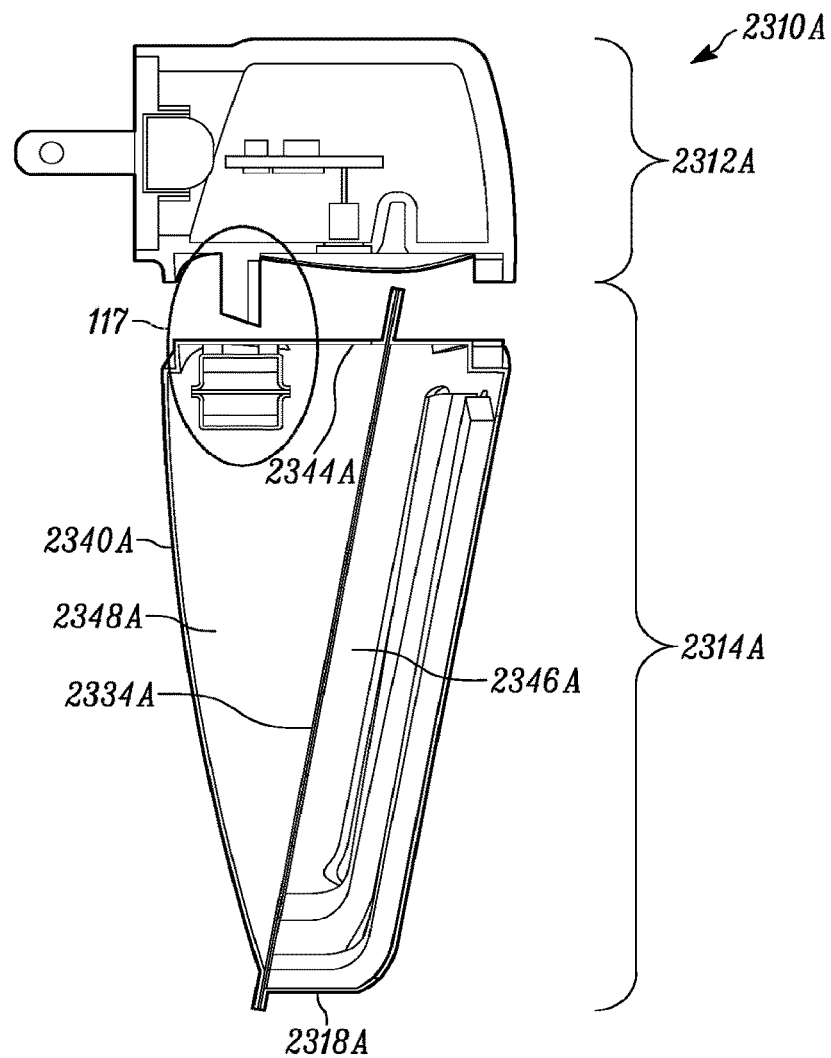
FIG. 116 is a cross-sectional view of the insect trap of FIG. 114.
Figure 117:
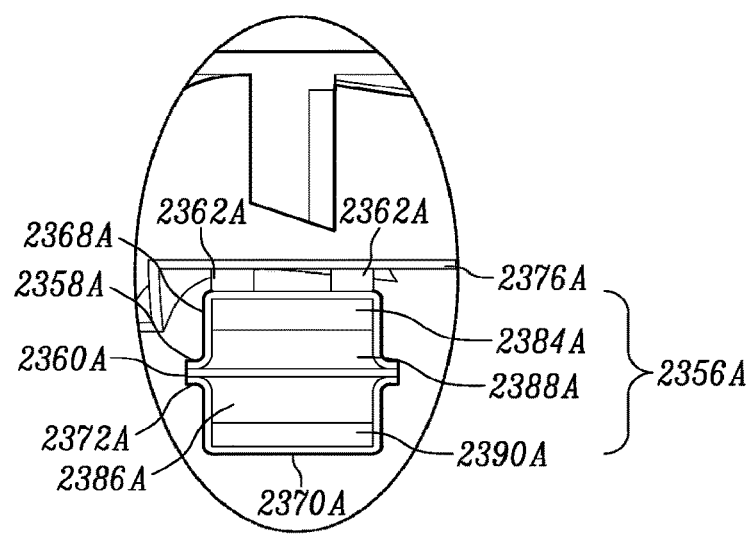
FIG. 117 is an enlarged view of a portion of FIG. 116.

FIG. 116 is a cross-sectional view of insect trap 2310A and FIG. 117 is an enlarged view of a portion of FIG. 116. Base portion 2312A is raised above trap portion 2314 in this view. Reservoir assembly 2356A includes a downwardly facing top cup 2368A with a lip 2358A protruding from the perimeter of its open end, an upwardly facing bottom cup 2370A with a lip 2372A protruding from its open end, and a reservoir divider 2360A between top cup 2368A and bottom cup 2370A. Reservoir divider 2360A is affixed to top cup 2368A at lip 2358A with adhesive to form a top enclosure 2384A with an airtight seal, and reservoir divider 2360A is affixed to bottom cup 2370A at lip 2372A to form a bottom enclosure 2386A with an airtight seal, such that reservoir divider 2360A separates top enclosure 2384A from bottom enclosure 2386A. Top enclosure 2384A includes a sugar and water solution 2388A and bottom enclosure 2386A includes an active yeast culture 2390A. In some embodiments, top enclosure 2384A and/or bottom enclosure 2386A may include an additional substance or substances to enhance or control the production of $CO_2$, or augment or complement the $CO_2$ with additional insect-attracting substances. Bottom cup 2370A may be made of any material or combination of materials that act as a barrier to any of the insect-attracting substances mentioned herein. Reservoir divider 2360A and top cup 2368A may be made of a thin, durable, but puncturable material or combination of materials that may act as a barrier to any of the insect-attracting substances mentioned herein. Reservoir assembly 2356A is mounted on at least one support post 2362A, configured to reservoir assembly 2356A below top inside surface 2376A of rear housing 2340A. In some embodiments, support post 2362A is replaced by at least one protrusion (not shown) in top inside surface 2376A of rear housing 2340A. Rear housing 2340A includes an opening 2344A on its top inside surface 2376A, or alternatively opening 2344A may be replaced by a transparent or translucent window (not shown). In some embodiments, front housing 2318A and rear housing 2340A are thermoformed from sheet plastic, creating a clean and aesthetically pleasing shape while maintaining low cost and disposability. Alternatively, other opaque, transparent or translucent materials such as paper, paperboard, cardboard or paper pulp may be used. In some embodiments, front housing 2318A and rear housing 2340A are made by injection molding or by other suitable manufacturing techniques. In some embodiments, front housing 2318A, divider 2334A and rear housing 2340 are joined together where they intersect or engage by ultrasonic welding or high frequency (HF) welding, although they may also be permanently or removably joined together by gluing or any other suitable assembly method. Divider 2334 separates trap portion 2314 into a front enclosure 2346A and a rear enclosure 2348A.

Figure 118:
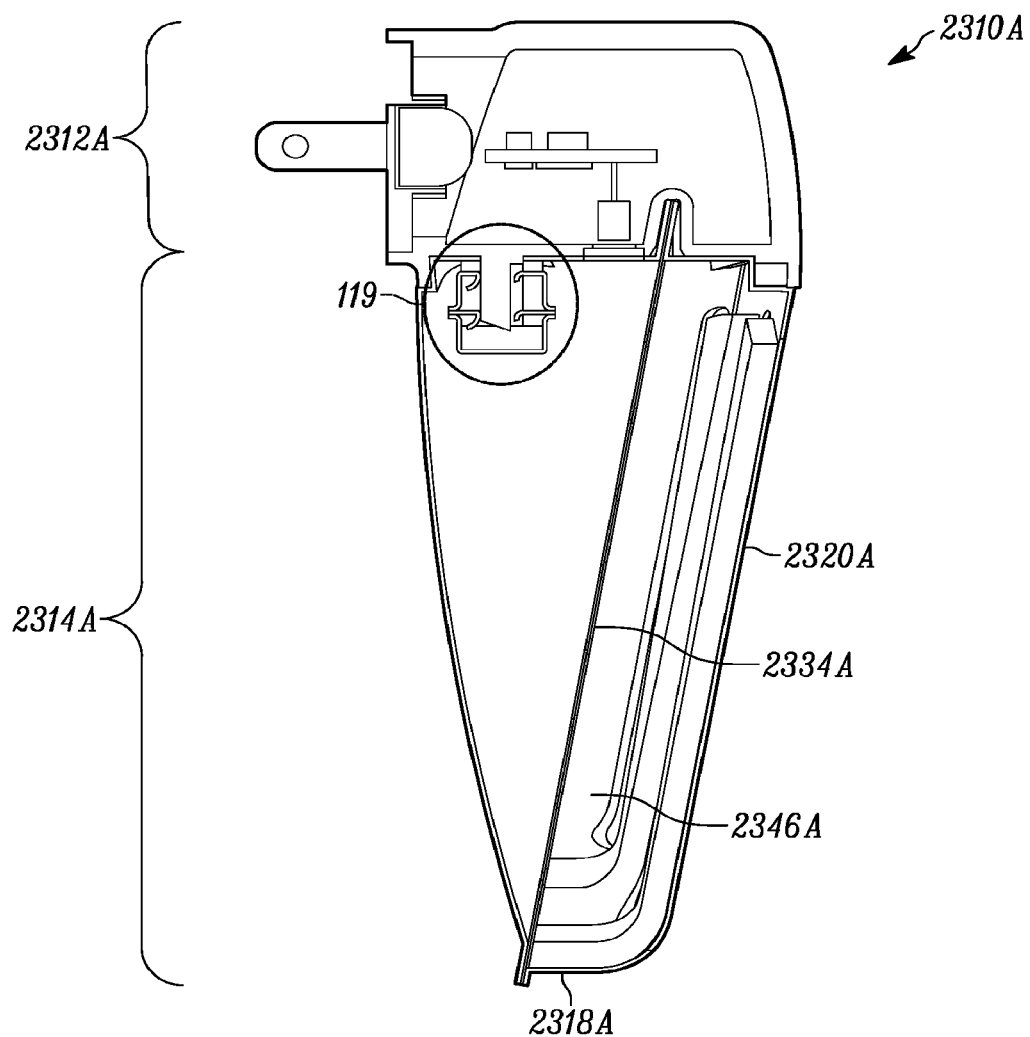
FIG. 118 is a cross-sectional view of the insect trap of FIG. 114.
Figure 119:
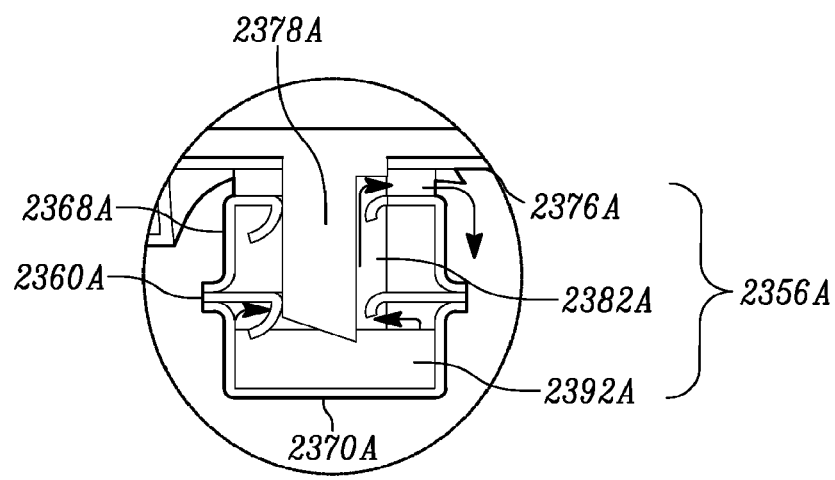

FIG. 118 is a cross-sectional view of insect trap 2310A and FIG. 119 is an enlarged view of a portion of FIG. 118. Trap portion 2314A is shown mounted to base portion 2312A in this view. Mounting trap portion 2314A to base portion 2312A causes the pointed distal end of punch 2378A to break through top inside surface 2376A of rear housing 2340A, the closed end of top cup 2368A and reservoir divider 2360A. The portion or portions of top cup 2368A and reservoir divider 2360A corresponding to axial grooves 2382A in punch 2378A deform to create clearance between top cup 2368A and punch 2378A and between reservoir divider 2360A and punch 2378A. Sugar and water solution 2388A (shown in FIG. 117) trickles down through the clearance between reservoir divider 2360A and axial grooves 2382A of punch 2378A and onto yeast culture 2390A (shown in FIG. 117) inside bottom cup 2370A and forms a sugar, water and yeast culture mix 2392A, which reacts and, within a few hours, begins to produce $CO_2$, which releases through the clearance between reservoir divider 2360A and axial grooves 2382A of punch 2378A, through the clearance between top cup 2368A and axial grooves 2382A of punch 2378A, into rear enclosure 2348A of trap portion 2314A, shown by arrows, and on through perforations 2374A (shown in FIG. 114) in divider 2334A and opening 2320A in front housing 2318A, and on into the surrounding area where insect trap 2310A is installed. Because axial grooves 2382A do not extend to the proximal end of punch 2378A, punch 2378A itself plugs the opening in top inside surface 2376A of rear housing 2340A where punch 2378A has broken through, thereby ensuring that $CO_2$ is released only through the one or more perforations 2374A in divider 2334A. Reservoir assembly 2356A, axial grooves 2382A in punch 2378A, sugar and water solution 2388A, yeast culture 2390A, and any other substance or substances in reservoir assembly 2356A may be configured to release $CO_2$ and any other insect-attracting substance or substances for a predetermined amount of time to correspond with the expected useful life of trap portion 2314A, which may be e.g., a week, a month or three months, or another length of time. It is desirable for $CO_2$ and any other insect-attracting substance or substances to be detectable by insects within a 2-meter radius of insect trap 2310A. In some embodiments, heat alone or heat and insect-attracting substances alone are used as attractants, and light sources are not used in insect trap 2310A.

Figure 120:
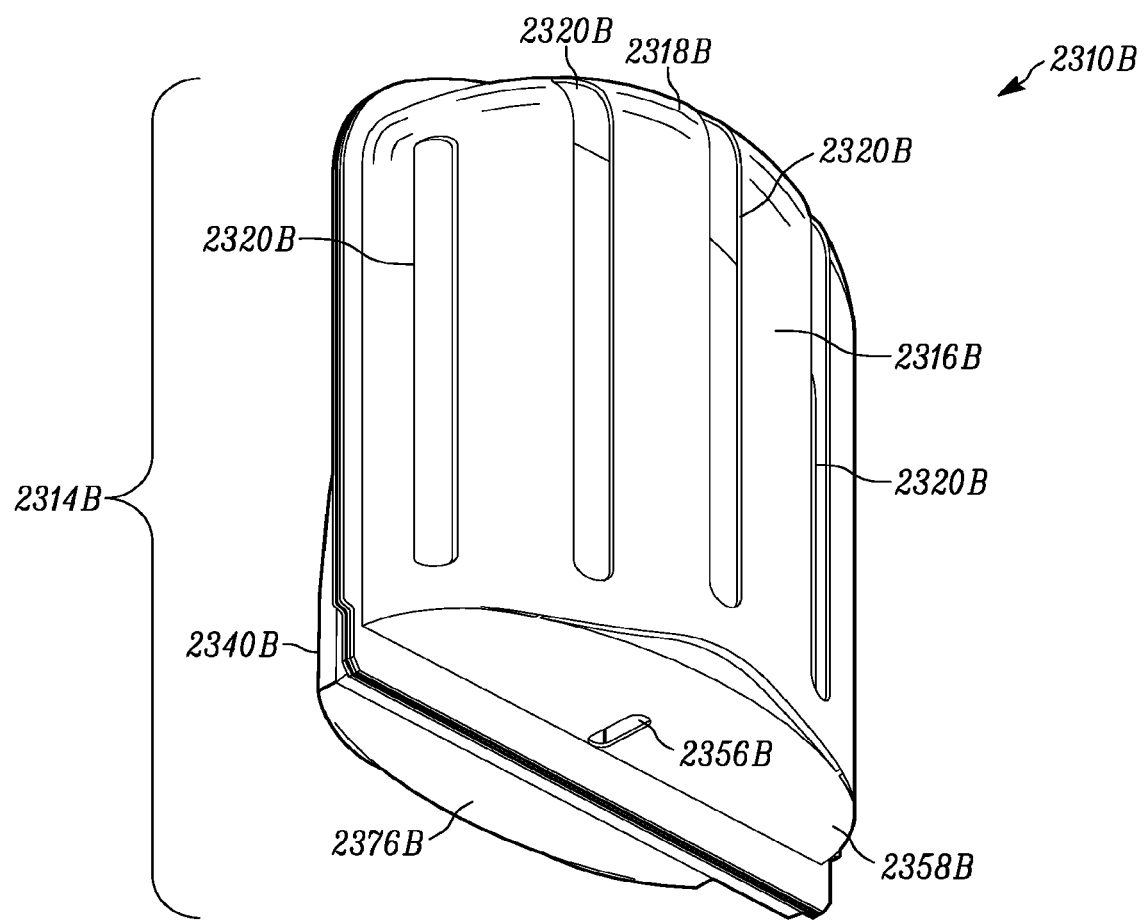
Figure 120:
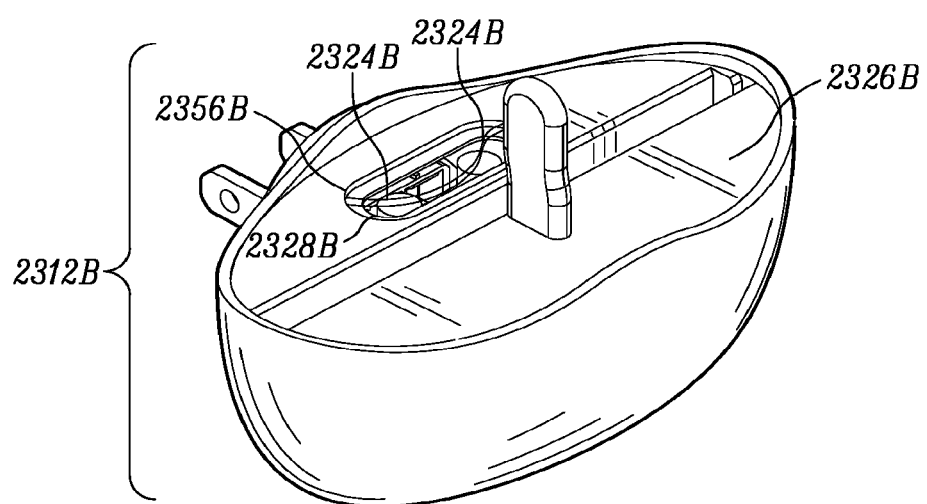

Other configurations adapted to self-activate and deliver an insect-attracting substance or substances are contemplated. FIG. 120 is a front perspective view of an example of the twenty-third embodiment of an insect trap, indicated generally at 2310B. Insect trap 2310B includes a base portion 2312B and a removable trap portion 2314B. In this view, trap portion 2314B is shown removed from base portion 2312B and tilted to reveal its underside. Trap portion 2314B includes a front housing 2318B with at least one opening 2320B in a front surface 2316B and an opening 2356B in a bottom surface 2358B, and a rear housing 2340B with a bottom surface 2376B. Base portion 2312B includes a top surface 2326B, and a lighting element such as one or more LEDs 2324B. Mounted in top surface 2326B of base portion 2312B may be a transparent or translucent window 2328B, shown partially cut away to reveal LEDs 2324B. Window 2328B protects LEDs 2324B from dust and insect debris, and allows base portion 2312B to be easily cleaned. As shown, protruding from top surface 2326B of base portion 2312B is a protrusion 2378B, which aligns with and enters opening 2356B in bottom surface 2358B of rear housing 2340B when trap portion 2314B is mounted on base portion 2312B.

Figure 121:
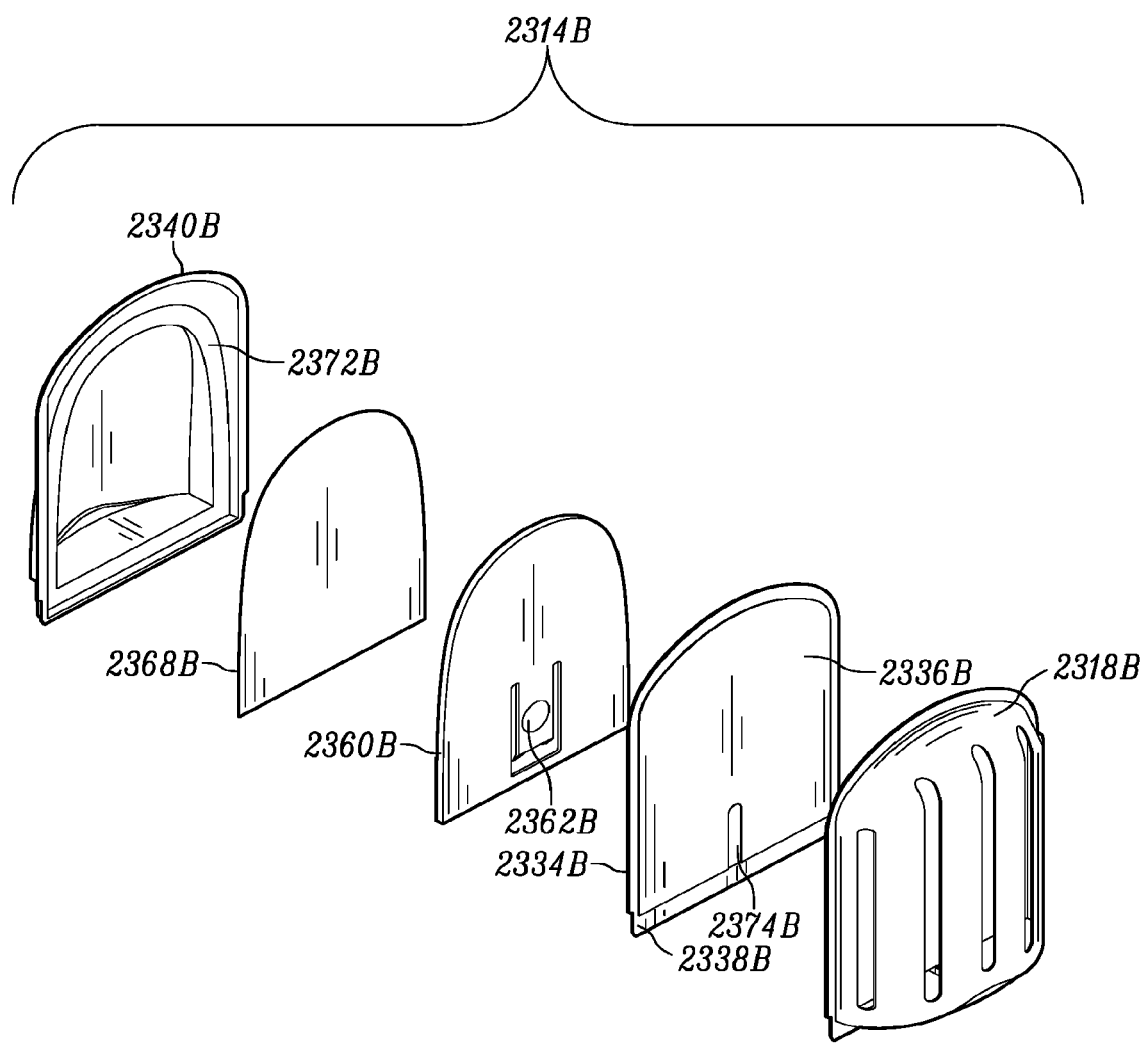

FIG. 121 is an exploded view of trap portion 2314B of insect trap 2310B. Trap portion 2314B includes front housing 2318B, a divider 2334B with a coating of insect-trapping adhesive 2336B on its front surface 2338B, a trigger 2360B with a dome 2362B, a membrane 2368B, and rear housing 2340B with a planar seat 2372B. Divider 2334B may be made of a porous translucent sheet material, and adhesive 2336B may be transparent or translucent. Trigger 2360B may be injection molded of transparent or translucent plastic. Membrane 2368B may be of transparent or translucent sheet material with vapor barrier properties, and rear housing 2340B may be injection molded or thermoformed of transparent or translucent plastic with vapor barrier properties. In some embodiments, rear housing 2340B, divider 2334B and front housing 2318B are joined where they intersect or engage by ultrasonic welding, high-frequency welding, or adhesive. Membrane 2368B is configured to fit in rear housing 2340B against seat 2372B, and trigger 2360B is configured to fit between rear housing 2340B, membrane 2368B and divider 2334B. Configuration of trap portion 2314B components may be similar to those found in plug-in room air freshener refills. In some embodiments, a region 2374B at the bottom center of front surface 2338B of divider 2334B is not coated with adhesive 2336B.

FIG. 122 is a cross-sectional view of insect trap 2310B and FIG. 123 is an enlarged view of a portion of FIG. 122. Trap portion 2314B is shown raised above base portion 2312B in this view. Base portion 2312B includes a plurality of electrically conductive prongs 2322B (only one of which is shown in this view), LEDs 2324B, and circuit board 2350B, which is electrically connected to prongs 2322B and LEDs 2324B. For clarity, not all electrical connections are shown. Rear housing 2340B and membrane form a rear enclosure 2348B containing a transparent or translucent liquid 2366B, which may include a liquid carrier material and/or an insect-attracting substance or substances. Membrane 2368B and divider 2334B form a middle enclosure 2380B containing trigger 2360B, and divider 2334B and front housing 2318B form a front enclosure 2346B. Trigger 2360B includes sharp points 2382B (only one of which is shown in this view), and dome 2362B presses lightly against divider 2334B, causing it to slightly deform into front enclosure 2346B.

Figure 124:
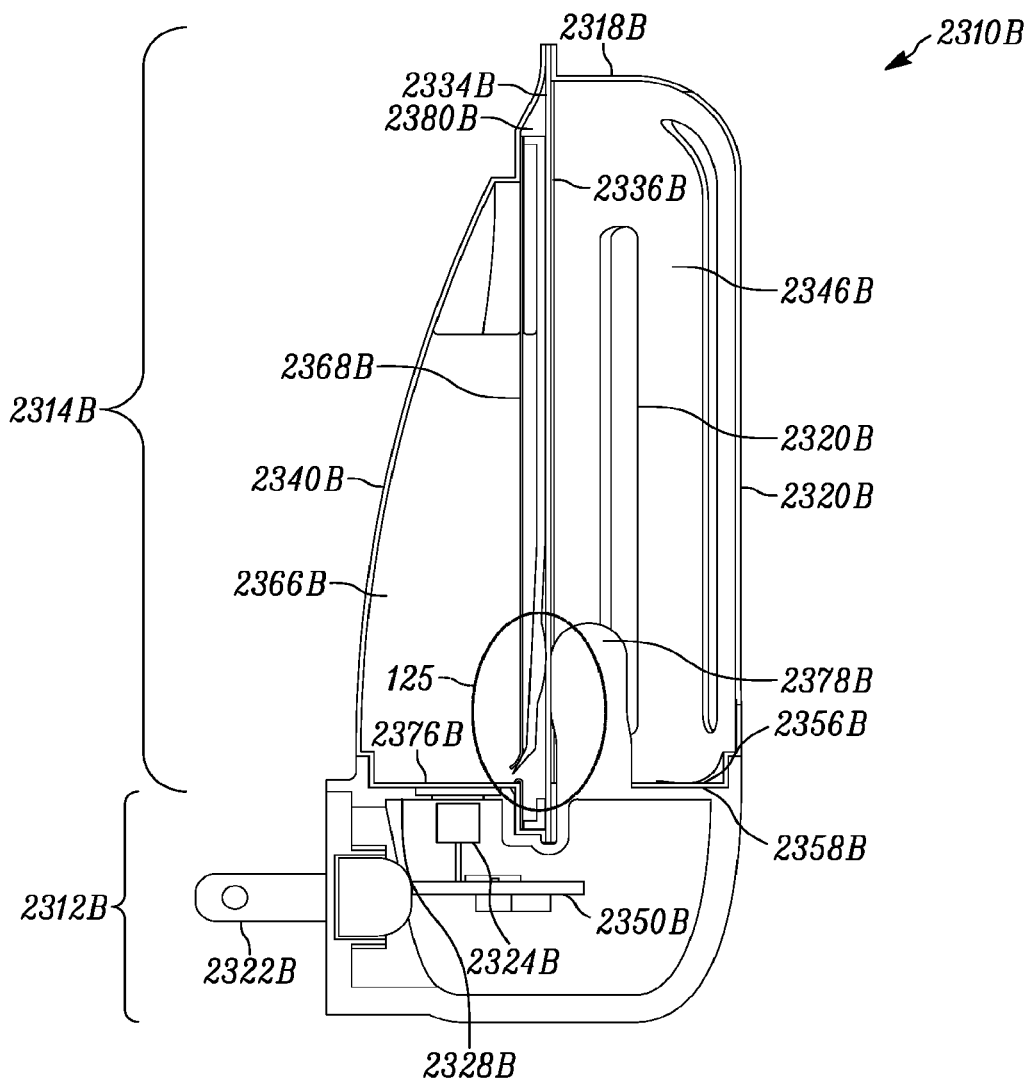
Figure 125:
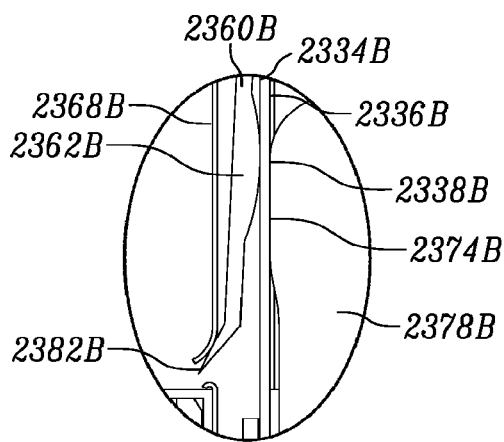

FIG. 124 is a cross-sectional view of insect trap 2310B and FIG. 125 is an enlarged view of a portion of FIG. 124. Trap portion 2314B is shown mounted to base portion 2312B in this view. Mounting trap portion 2314B to base portion 2312B causes protrusion 2378B on base portion 2312B to enter opening 2356B in bottom surface 2358B of front housing 2318B and press against front surface 2338B of divider 2334B, in region 2374B not coated with adhesive 2336B. Protrusion 2378B causes divider 2334B to press against dome 2362B of trigger 2360B, which deflects, causing points 2382B (only one of which is shown) of trigger 2360B to puncture membrane 2368B, releasing liquid 2366B into middle enclosure 2380B and against divider 2334B. In some embodiments, trigger 2360B may have openings (not shown) through body of trigger 2360B that allow liquid 2366B to flow more quickly through trigger 2360B and onto divider 2334B. Divider 2334B absorbs liquid 2366B and allows it to evaporate through adhesive 2336B or through region 2374B or other regions (not shown) of divider 2334B not coated with adhesive 2336B, releasing an insect-attracting substance or substances at a controlled rate into front enclosure 2346B, through opening 2320B and on into the surrounding area where insect trap 2310B is installed. Liquid 2366B, membrane 2368B, trigger 2360B and divider 2334B may be configured to release an insect-attracting substance or substances for a predetermined amount of time to correspond with the expected useful life of trap portion 2314B, which may be e.g., a week, a month or three months, or another length of time. When conductive prongs 2322B are inserted into an ordinary household electrical wall socket (not shown), circuit board 2350B receives power from prongs 2322B and illuminates LEDs 2324B. Light from LEDs 2324B projects through window 2328B in base portion 2312B, through bottom surface 2376B of rear housing 2340B, through liquid 2366B, membrane 2368B, trigger 2360B, divider 2334B and adhesive 2336B, into front enclosure 2346B, through opening 2320B and into the surrounding area where insect trap 2310B is installed. In some embodiments, heat and scent alone are used as attractants, and light sources are not used in insect trap 2310B.

An added benefit of insect trap 2310B is that trap portion 2314B may include a built-in life indicator. In some embodiments, light from the LEDs projecting through liquid 2366B may show a visible horizontal line through divider 2334B, corresponding to the amount of liquid 2366B remaining in rear enclosure 2348B and middle enclosure 2380B. In some embodiments, liquid 2366B may be tinted or colored to enhance the visibility of the horizontal line showing through divider 2334B. In some embodiments, markings on divider 2334B may indicate the position of the horizontal line showing through divider 2334B when liquid 2366B is fully depleted, thereby providing a visual cue indicating that trap portion 2314B should be removed and replaced with a fresh trap portion 2314B.

Figure 126:
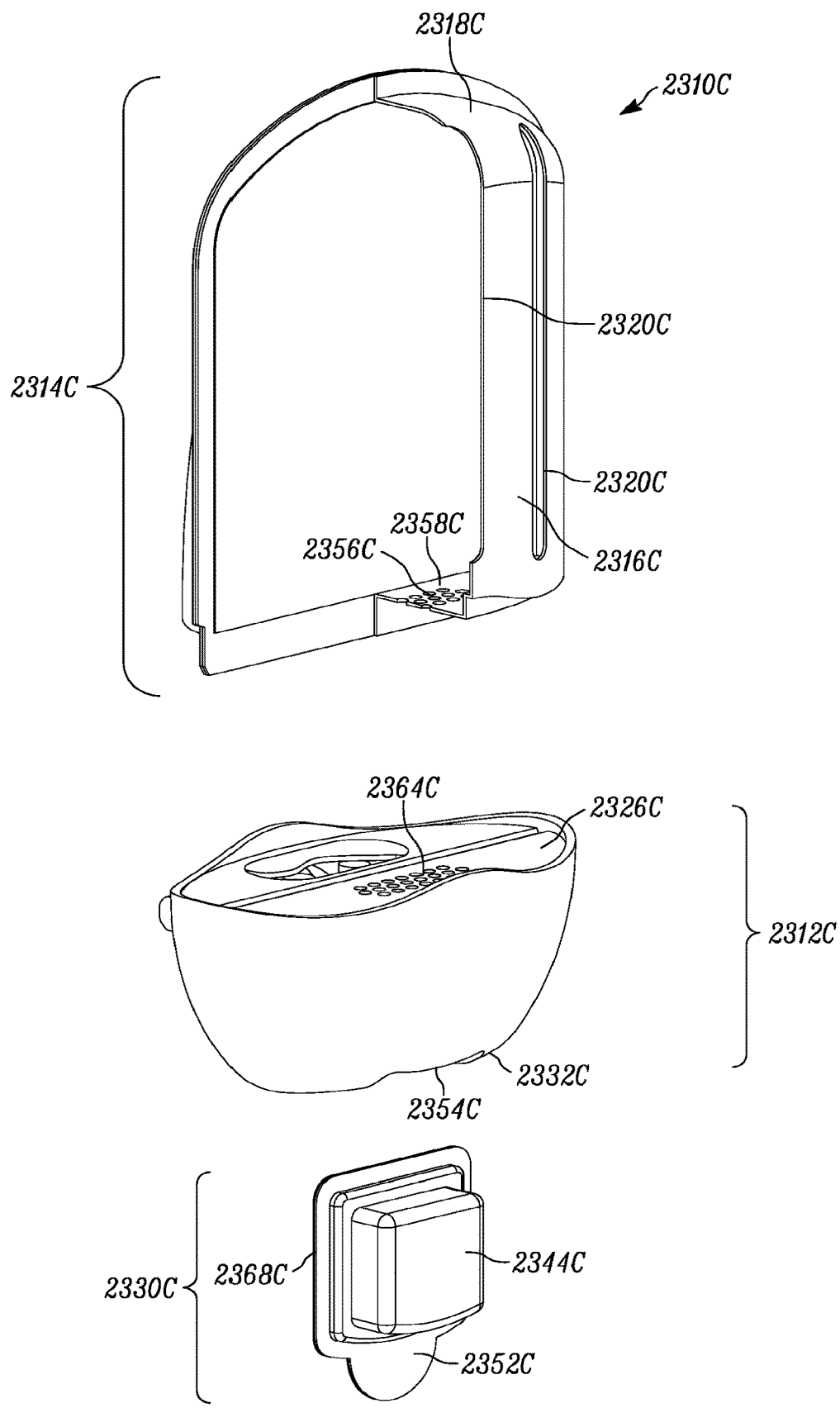

FIG. 126 is a front perspective view of an example of the twenty-third embodiment of an insect trap, indicated generally at 2310C. As shown, insect trap 2310C includes a base portion 2312C, a removable and replaceable trap portion 2314C, and a removable and replaceable scent cartridge 2330C. Trap portion 2314C is shown partially cut away, and trap portion 2314C and scent cartridge 2330C are shown removed from base portion 2312C in this view. Base portion 2312C includes a port 2332C in a bottom surface 2354C configured to accept scent cartridge 2330C, and at least one opening 2364C in a top front surface 2326C. In some embodiments, port 2332C is configured to receive scent cartridge 2330C in a front surface, or a side surface, or in a top surface of base portion 2312C. Trap portion 2314C includes a front housing 2318C with at least one opening 2320C in a front surface 2316C and at least one opening 2356C in a bottom surface 2358C. Opening 2356C is configured to align with opening 2364C in base portion 2312C when trap portion 2314C is mounted to base portion 2312C. Scent cartridge 2330C, which may be similar in configuration to those found in plug-in room air freshener refills, includes a rearwardly facing cup 2344C with a lid 2368C covering its open end (not shown). In some embodiments, cup 2344C may face forward, left, right, upward or downward when inserted into base portion 2312C. Scent cartridge 2330C includes a tab 2352C configured to protrude from port 2332C in base portion 2312C when scent cartridge 2330C is inserted into base portion 2312C, thereby allowing the user to easily remove and replace scent cartridge 2330C.

Figure 127:
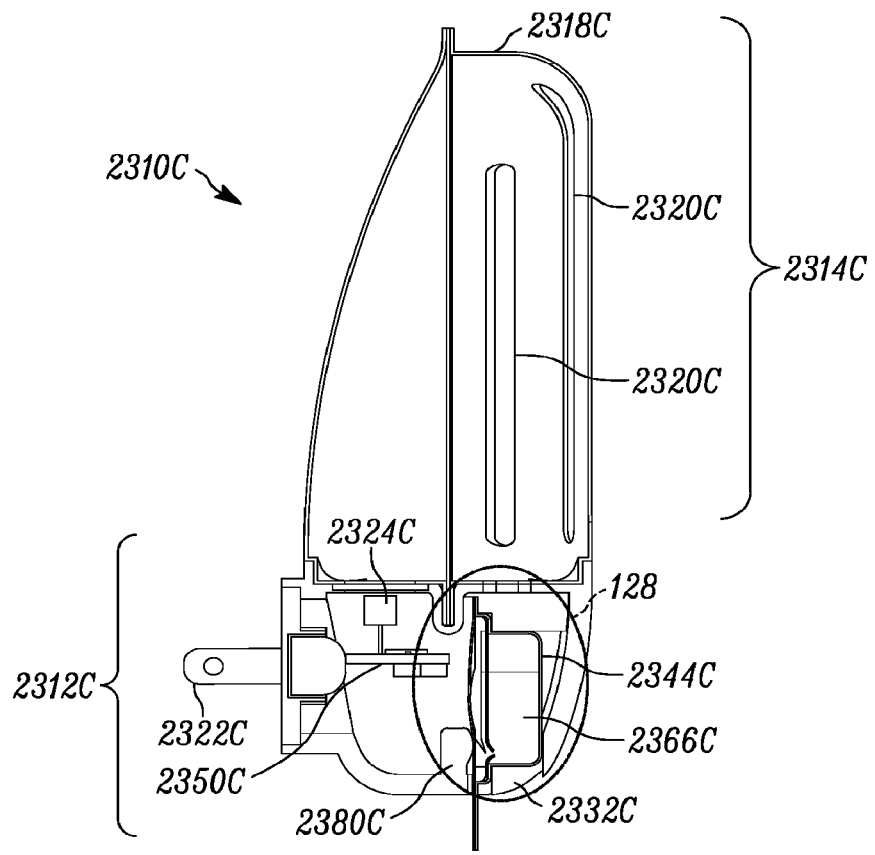
Figure 128:
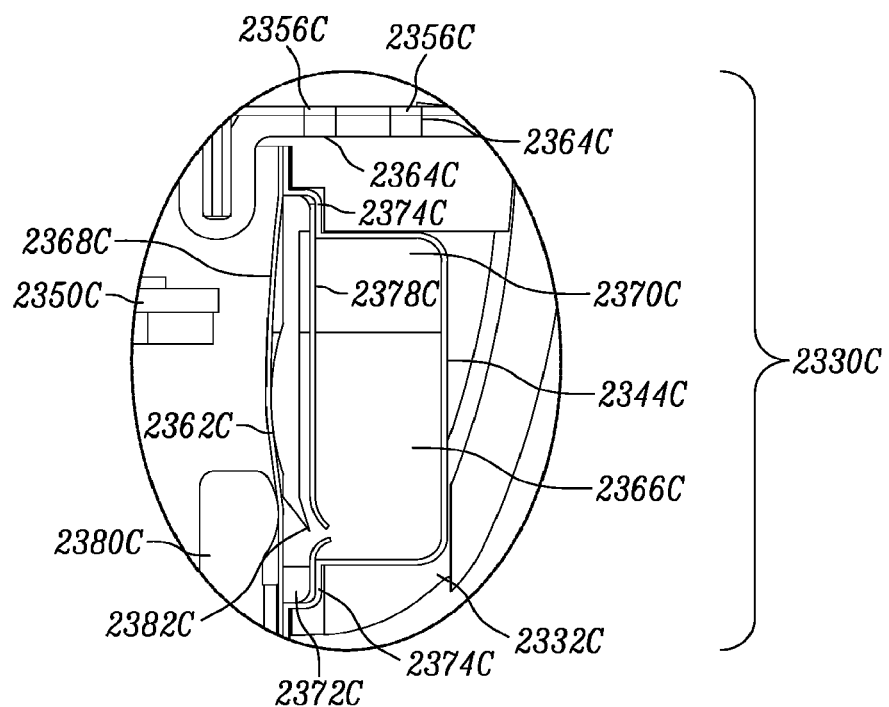

FIG. 127 is a cross-sectional view of insect trap 2310C and FIG. 128 is an enlarged view of a portion of FIG. 127. Scent cartridge 2330C is shown inserted into port 2332C in base portion 2312C in these views. Base portion 2312C includes a plurality of electrically conductive prongs 2322C (only one of which is shown in this view), LEDs 2324C (only one of which is shown), and circuit board 2350C, which is electrically connected to prongs 2322C and LEDs 2324C. For clarity, not all electrical connections are shown. Inside of base portion 2312C adjacent to port 2332C is a protrusion 2380C configured to press against lid 2368C of scent cartridge 2330C when scent cartridge 2330C is inserted into port 2332C of base portion 2312C. Scent cartridge 2330C includes a membrane 2378C which is glued to a seat 2374C in cup 2344C to form a sealed inner scent enclosure 2370C containing a transparent or translucent liquid 2366C, which may include a liquid carrier material and/or an insect-attracting substance or substances. Cup 2344C, membrane 2378C and lid 2368C form an outer scent enclosure 2372C containing a trigger 2360C with at least one sharp spike 2382C pointing toward membrane 2378C, and a dome 2362C facing toward lid 2368C. Before scent cartridge 2330C is inserted into port 2332C, dome 2362C of trigger 2360C presses lightly against lid 2368C and spike 2382C does not make contact with, or only presses lightly against membrane 2378C. As shown, scent cartridge 2330C was inserted into port 2332C of base portion 2312C, causing protrusion 2380C to press against lid 2368C, which in turn pressed against dome 2362C of trigger 2360C, which deflected, causing spike 2382C to break through membrane 2378C, thereby releasing liquid 2366C into outer scent enclosure 2372C and onto porous lid 2368C. In some embodiments, trigger 2360C may include openings (not shown) through body of trigger 2360C that allow liquid 2366C to flow more quickly through trigger 2360C and onto lid 2368C. Lid 2368C absorbs liquid 2366C and allows it to evaporate, releasing an insect-attracting substance or substances at a controlled rate into inside of base portion 2312C, through opening 2364C in base portion 2312C, through adjacent opening 2356C of front housing 2318C, on through opening 2320C of front housing, and on into the surrounding area where insect trap 2310C is installed. Liquid 2366C, membrane 2378C, trigger 2360C and lid 2368C may be configured to release an insect-attracting substance or substances for a predetermined amount of time to correspond with the expected useful life of trap portion 2314C, which may be e.g., a week, a month or three months, or another length of time. In some embodiments, one or more heating elements (not shown) may be electrically connected to circuit board 2350C and located adjacent to lid 2368C of scent cartridge 2330C and may be configured to warm lid 2368C and liquid 2366C absorbed in lid 2368C, thereby enhancing the release of insect-attracting substances.

It should be appreciated that the principles described in this disclosure for attracting and trapping indoor flying insect pests are also beneficial for attracting and trapping indoor crawling and jumping arthropod pests. For example, while mosquitoes and flies have been described as being attracted to the disclosed insect traps, crawling or wingless insects such as cockroaches and crawling arthropod pests such as spiders may also be attracted by and trapped by the disclosed insect traps. FIG. 129 is a front perspective view of a twenty-fourth embodiment of an insect trap, indicated generally at 2410. Insect trap 2410 may include a base portion 2412, a removable trap portion 2414, an electrical cord 2416 and an electrical plug 2430 with a plurality of electrically conductive prongs 2422, adapted to provide power to insect trap 2410 by inserting conductive prongs 2422 into a standard household electrical wall socket. Alternatively, base portion 2412 may be configured to receive power from batteries (not shown) mounted in base portion 2412. While an electrical socket and batteries have been described as providing power to insect trap 2410, any suitable power source may be used. As shown, insect trap 2410 is configured to sit on the floor when in use and attract and trap crawling and hopping insects and other arthropod pests. Trap portion 2414 includes a housing 2418 with at least one opening 2420 on its perimeter. Opening 2420 may be configured to admit a wide variety of insects into insect trap 2410, or alternatively it may be configured to admit one or more specific insect species. In some embodiments, opening 2420 is configured to prevent the user's fingers from penetrating opening 2420 and inadvertently touching trapped insects or adhesive when removing and replacing trap portion 2414. In some embodiments, opening 2420 has a size and shape such that a sphere 25 mm in diameter cannot pass through opening 2420, and has a size and shape such that a sphere 1 mm in diameter can pass through any portion of opening 2420. Opening 2420 may be of uniform or of varying width, shape and orientation, and if trap portion 2414 has more than one opening 2420, they may be of identical or of differing widths, shapes and orientations. Opening 2420 may be configured to attract one or more individual insect species or a variety of insect species.

Figure 130:
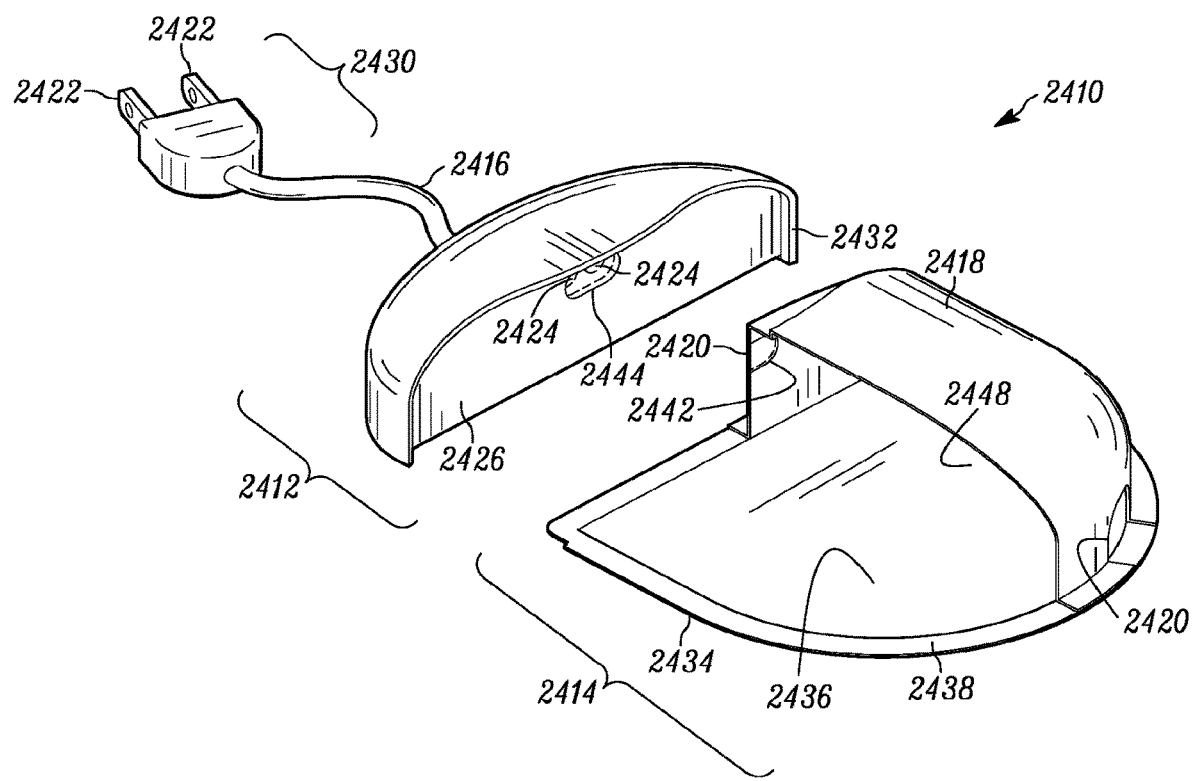

FIG. 130 is a front perspective view of insect trap 2410. Trap portion 2414 is shown partially cut away and removed from base portion 2412 in this view. Base portion 2412 includes a lighting element such as one or more LEDs 2424. In some embodiments, LEDs 2424 include at least one that emits UV light and at least one that emits visible light. In some embodiments, LEDs 2424 include at least one that emits UV light and at least one that emits blue light to better attract a wide variety of insect species. In some embodiments, the lighting element emits a combination of wavelengths to mimic sunlight. In some embodiments, LEDs 2424 include at least one that emits IR light to better attract certain species of insects including fleas. In a front surface 2426 of base portion 2412 is at least one opening 2444, and mounted in opening 2444 may be a transparent or translucent window (not shown). The window protects LEDs 2424 from dust and insect debris and allows base portion 2412 to be easily cleaned. In some embodiments, at least a portion of LEDs 2424 protrude from front surface 2426 of base portion 2412, and into trap portion 2414 when trap portion 2414 is mounted to base portion 2412. On the perimeter of front surface 2426 may be a forwardly directed rim 2432. Trap portion 2414 includes a bottom plate 2434 with a top surface 2438, at least a portion of which is coated with an adhesive 2436. In some embodiments, the bottom surface (not shown) of bottom plate 2434 is planar or is planar at its perimeter and is configured such that insects cannot crawl under insect trap 2410 when insect trap 2410 is placed on a floor. As shown, housing 2418 has at least one opening 2442 that corresponds to opening 2444 in base portion 2412. In some embodiments, opening 2442 in housing 2418 has a transparent or translucent window 2440. In some embodiments, housing 2418 has a reflective coating (not shown) on its inside surface (not shown). Alternatively, the material and surface finish of housing 2418 may be configured to reflect and disperse UV light and/or visible light and/or IR light without a reflective coating on its inside surface. Housing 2418 may also be coated with transparent, translucent or opaque adhesive on its inside surface (not shown) to provide additional insect trapping efficiency and capacity. In some embodiments, adhesive 2436 is configured to reflect and disperse UV and/or visible light and/or IR light. Housing 2418 and bottom plate 2434 form an enclosure 2448. In some embodiments, housing 2418 is thermoformed from opaque sheet plastic, creating a clean and aesthetically pleasing shape while maintaining low cost and disposability. Alternatively housing 2418 may be constructed of other opaque, transparent or translucent materials such as paper, paperboard, cardboard or paper pulp. In some embodiments, housing 2418 is constructed by injection molding or by other suitable manufacturing techniques. In some embodiments, housing 2418 and bottom plate 2434 are joined together where they intersect or engage with an adhesive, although they may also be joined by other commonly used packaging assembly techniques such as ultrasonic welding or high frequency (HF) welding, or by any other suitable assembly method. The materials of trap portion 2414 may also include one or more insect attractants. For example, housing 2418 and/or bottom plate 2434 and/or adhesive 2436 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2410. In such embodiments, the insect attractant is integral to trap portion 2414. Alternatively, the insect attractants may be embedded or contained in a separate piece (not shown) that may mount on an inside surface of enclosure 2448 or on an outside surface of housing 2418 or through an opening in housing 2418. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 2410.

FIG. 131 is a cross-sectional view of insect trap 2410. For clarity, cord 2416, plug 2430 and conductive prongs 2422 are not shown in this view. In some embodiments, base portion 2412 has a circuit board 2450 having a programmable processor or chip (not shown) for executing commands, electrically connected to cord 2416, conductive prongs 2422 and LEDs 2424 (only one of which is shown). For clarity, however, not all of the electrical connections are shown. Circuit board 2450 may include electronic circuitry to receive ordinary household current from conductive prongs 2422 and provide power to illuminate LEDs 2424. Circuit board 2450 may include an energy stabilizer such as a full wave rectifier circuit or any other circuit that may provide steady voltage to LEDs 2424, although it may also provide a varying voltage to LEDs 2424 to provide a flickering light, which mimics movement that some insect species, may find attractive. Circuit board 2450 may provide power to LEDs 2424 to provide UV and/or visible and/or IR light although it may be configured to provide power to only the one or more UV LEDs 2424 or to only the visible light LEDs 2424 or to only the IR LEDs 2424, or to provide variable power to produce combinations of flickering UV and/or visible and/or IR light. Circuit board 2450 may also be configured to drive a transmitter or transceiver such as a piezoelectric speaker (not shown) or other device that may be mounted in base portion 2412 to emit insect-attracting sounds. In some embodiments, the transmitter or transceiver may emit recorded and/or generated insect sounds or vibrations to better attract insects, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2410. It is desirable for such insect-attracting sound to be undetectable by a human beyond approximately a 1-meter distance from insect trap 2410.

Circuit board 2450 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 2412 and into trap portion 2414, to attract some insect species, including fleas and mosquitoes. Alternatively, LEDs 2424 may generate heat, to replace or augment the heat generated by the one or more electrical elements. In general, the heat generated may increase and maintain the temperature of at least a portion of trap portion 2414 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, rim 2432 on front surface 2426 of base portion 2412 engages with trap portion 2414 to secure it in place during use, although any other form of attachment may be substituted that allows trap portion 2414 to be securely but removably mounted on base portion 2412.

In the operation of insect trap 2410, conductive prongs 2422 (not shown) are inserted into a wall electrical socket, and LEDs 2424 emit light, represented by arrows, which is transmitted through opening 2444 in base portion 2412 and into enclosure 2448, and directly onto the inside surface of housing 2418 and adhesive 2436 on top surface 2438 of bottom plate 2434. In some embodiments, light is not manipulated in base portion 2412 and is emitted directly into trap portion 2414.

The inside surface of housing 2418 may include a concave shape and may be configured to reflect and disperse the UV and/or visible and/or IR light from LEDs 2424 to distribute the light evenly onto adhesive 2436 on top surface 2438 of bottom plate 2434 and through enclosure 2448 and out through opening 2420 of housing 2418, although the inside surface of housing 2418 may have a convex shape or a saddle shape or a combination of shapes, or may also have ribs or other features to more evenly distribute the light, or may also have ribs or other features to more evenly distribute the light. Alternatively, an optical enhancer such as an anamorphic lens or any other lens or combination of lenses (not shown) configured to distribute the UV and/or visible and/or IR light (e.g., evenly, according to specific patterns, at a focal point, etc.) onto the inside surface of housing 2418, may be mounted to trap portion 2414 at or near opening 2442 or to base portion 2412 at or near opening 2444, and may replace or augment the role of the reflective-coated inside surface of housing 2418. In some embodiments, the light from LEDs 2424 may directly strike the adhesive 2436 on top surface 2438 of bottom plate 2434 at an oblique angle (e.g., an acute angle from approximately 0° to 90°) and be spread across the adhesive 2436, and may replace or augment the light-distributing role of the inside surface of housing 2418 or the lens or lenses mounted to trap portion 2414 or to base portion 2412. The light may be further evenly distributed by the light-diffusing properties of window 2440 in trap portion 2414, by adhesive 2436 on top surface 2438 of bottom plate 2434, or by a combination of the two.

Thereafter, a portion of the light entering enclosure 2448 continues through opening 2420 in housing 2418 and into the surrounding area where insect trap 2410 is installed. Insects are attracted to the light transmitted through opening 2420 and hop or crawl into opening 2420 and onto adhesive 2436, where they become trapped. A user may observe trapped insects by looking through opening 2420 in housing 2418. When a sufficient number of insects have been trapped, the user may easily remove and discard the entire used trap portion 2414 without touching the trapped insects, insect debris or adhesive, which remain out of reach inside trap portion 2414, and replace it with a new trap portion 2414. The new trap portion 2414 has fresh adhesive-coated surfaces, ensuring that insect trap 2410 will continue to efficiently and effectively attract and trap insects.

In some embodiments, because trap portion 2414 mounts beside, and not on top of or underneath base portion 2412, insect trap 2410 protrudes minimally from the floor and therefore intrudes minimally into the home environment. In some embodiments, insect trap 2410 is configured such that when placed on a floor, its overall height, defined by the overall distance insect trap 2410 protrudes from the floor, is smaller than its overall length and its overall width.

It should be appreciated that a benefit of insect trap 2410 is the manipulation of light within trap portion 2414. In some embodiments, light manipulation occurs solely within trap portion 2414. Light manipulation may include reflection, refraction, polarization and/or diffusion and is achieved by engaging with a manipulative element or surface (e.g., the inside surface of housing 2418 and adhesive 2436). In some embodiments, light manipulation produces an even distribution of light on adhesive 2436. In some embodiments, light is manipulated to produce a predetermined pattern on adhesive 2436 or within trap portion 2414, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2410 of this configuration may accommodate a variety of different trap portions 2414 that may be removably mounted to base portion 2412, each trap portion 2414 being uniquely configured to attract and trap a specific species or multiple species of insects. For example, the overall size and shape of trap portion 2414, the size, shape, location and orientation of opening 2420 in housing 2418, and the scent or scents impregnated in housing 2418, bottom plate 2434, or adhesive 2436, may be uniquely configured to attract and trap a specific species or multiple species of insects.

For example, in some embodiments, trap portion 2414 is approximately 20 mm to 600 mm wide, 20 mm to 600 mm long and 5 mm to 150 mm high. In some embodiments, trap portion 2414 is approximately 20 mm to 200 mm wide, 20 mm to 200 mm long and 5 mm to 80 mm high. In some embodiments, trap portion 2414 is approximately 20 mm to 130 mm wide, 20 mm to 130 mm long and 5 mm to 50 mm high.

In some embodiments, base portion 2412 is approximately 20 mm to 600 mm wide, 10 mm to 150 mm long and 10 mm to 150 mm high. In some embodiments, base portion 2412 is 20 mm to 200 mm wide, 10 mm to 100 mm long and 10 mm to 80 mm high. In some embodiments, base portion 2412 is 20 mm to 130 mm wide, 10 mm to 50 mm long and 10 mm to 50 mm high.

FIG. 132 is a front perspective view of a twenty-fifth embodiment of an insect trap, indicated generally at 2510.

Insect trap 2510 includes a base portion 2512 and a removable trap portion 2514. Trap portion 2514 is shown partially cut away and removed from base portion 2512 in this view. As shown, base portion 2512 includes an electrical cord 2516 and an electrical plug 2530 with a plurality of electrically conductive prongs 2522, adapted to provide power to insect trap 2510 by inserting conductive prongs 2522 into a standard household electrical wall socket. Alternatively, base portion 2512 may be configured to receive power from batteries (not shown) mounted in base portion 2512. While an electrical socket and batteries have been described as providing power to insect trap 2510, any suitable power source may be used. As shown, insect trap 2510 is configured to sit on the floor when in use and attract and trap crawling and hopping insects or pests. Trap portion 2514 includes a housing 2518 with at least one opening 2520 on its perimeter. Opening 2520 in housing 2518 may be configured to admit a wide variety of insects into insect trap 2510, or alternatively it may be configured to admit one or more specific insect species. In some embodiments, opening 2520 is configured to prevent the user's fingers from penetrating opening 2520 and inadvertently touching trapped insects or adhesive when removing and replacing trap portion 2514. In some embodiments, opening 2520 has a size and shape such that a sphere 25 mm in diameter cannot pass through opening 2520, and has a size and shape such that a sphere 1 mm in diameter can pass through any portion of opening 2520. Opening 2520 may be of uniform or of varying width, shape and orientation, and if trap portion 2514 has more than one opening 2520, they may be of identical or of differing widths, shapes and orientations. Opening 2520 may be configured to attract one or more individual insect species or a variety of insect species. Base portion 2512 includes a lighting element such as one or more LEDs 2524. In some embodiments, LEDs 2524 include at least one that emits UV light and at least one that emits visible light. In some embodiments, LEDs 2524 include at least one that emits UV light and at least one that emits blue light to better attract a wide variety of insect species. In some embodiments, the lighting element emits a combination of wavelengths to mimic sunlight. In some embodiments, LEDs 2524 include at least one that emits IR light to better attract certain species of insects including fleas. In a front surface 2526 of base portion 2512 is at least one opening 2544, and mounted in opening 2544 may be a transparent or translucent window (not shown) that may protect LEDs 2524 from dust and insect debris, and may allow base portion 2512 to be easily cleaned. However, the window is not required. In some embodiments, at least a portion of LEDs 2524 protrude from front surface 2526 of base portion 2512 and into trap portion 2514 when trap portion 2514 is mounted to base portion 2512. On the perimeter of front surface 2526 may be a forwardly directed rim 2532. Trap portion 2514 includes a bottom plate 2534 with a top surface 2538. In some embodiments, the bottom surface (not shown) of bottom plate 2534 is planar or is planar at its perimeter and is configured such that insects cannot crawl under insect trap 2510 when it is placed on a floor. In some embodiments, top surface 2538 of bottom plate 2534 has a reflective coating (not shown). Alternatively, the material of bottom plate 2534 and the surface finish of top surface 2538 of bottom plate 2534 may be configured to reflect UV and/or visible and/or IR light without a reflective coating on its inside surface. Trap portion 2514 also includes a divider 2546, comprised of transparent or translucent material and that may have a convex shape. Divider 2546 has a top surface, of which at least a portion is coated with a transparent or translucent adhesive 2536, and a bottom surface (not shown). In some embodiments, housing 2518 is coated with adhesive on its inside surface (not shown) to provide additional insect trapping efficiency and capacity. In some embodiments, the inside surface of housing 2518 is configured to reflect and disperse UV and/or visible and/or IR light. In some embodiments, the adhesive coating the inside surface of housing 2518 may be configured to reflect and disperse UV and/or visible and/or IR light. As shown, housing 2518 and divider 2546 form a top enclosure 2548, and divider 2546 and bottom plate 2534 form a bottom enclosure 2528. As shown, housing 2518 and divider 2546 each have at least one opening 2542 corresponding to opening 2544 in front surface 2526 of base portion 2512. In some embodiments, opening 2542 may have a transparent or translucent window (not shown). In some embodiments, housing 2518 is thermoformed from opaque sheet plastic, creating a clean and aesthetically pleasing shape while maintaining low cost and disposability. Alternatively, they may be constructed of other opaque, transparent or translucent materials such as paper, paperboard, cardboard or paper pulp. In some embodiments, housing 2518 is constructed by injection molding or by other suitable manufacturing techniques. In some embodiments, housing 2518, divider 2546 and bottom plate 2534 are joined together where they intersect or engage with an adhesive, although they may also be joined by other commonly used packaging assembly techniques such as ultrasonic welding or high frequency (HF) welding or by any other suitable assembly method. The materials of trap portion 2514 may also include one or more of insect-attracting substances. For example, housing 2518 and/or divider 2546 and/or bottom plate 2534 and/or adhesive 2536 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2510. In such embodiments, the insect attractant is integral to trap portion 2414. Alternatively, the insect attractants may be embedded or contained in a separate piece (not shown) that may mount on an inside surface of top enclosure 2548 or on an outside surface of housing 2518 or through an opening in housing 2518. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 2510.

FIG. 133 is a cross-sectional view of insect trap 2510. For clarity, cord 2516, plug 2530 and conductive prongs 2522 are not shown in this view. In some embodiments, base portion 2512 has a circuit board 2550 having a programmable processor or chip (not shown) for executing commands, electrically connected to cord 2516, conductive prongs 2522, and LEDs 2524. For clarity, however, not all of the electrical connections are shown. Circuit board 2550 may include electronic circuitry to receive ordinary household current from conductive prongs 2522 and provide power to illuminate LEDs 2524. Circuit board 2550 may include an energy stabilizer such as a full wave rectifier circuit or any other circuit that may provide steady voltage to LEDs 2524, although it may also provide a varying voltage to LEDs 2524 to provide a flickering light which mimics movement that some insect species may find attractive. Circuit board 2550 may provide power to LEDs 2524 to provide UV and/or visible and/or IR light, although it may be configured to provide power to only UV LEDs 2524 or to only visible light LEDs 2524 or to only IR LEDs 2524, or to provide variable power to produce combinations of flickering UV and/or visible and/or IR light. Circuit board 2550 may also be configured to drive a transmitter or transceiver such as a piezoelectric speaker (not shown) or other device that may be mounted in base portion 2512 to emit insect-attracting sounds or vibrations. In some embodiments, the transmitter or transceiver may emit recorded and/or generated insect sounds or vibrations to better attract insects, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2510. It is desirable for such insect-attracting sound to be undetectable by a human beyond approximately a 1-meter distance from insect trap 2510.

Circuit board 2550 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 2512 and into trap portion 2514, to attract some insect species, including fleas and mosquitoes. Alternatively, LEDs 2524 may generate heat, to replace or augment the heat generated by the one or more electrical elements. In general, the heat generated may increase and maintain the temperature of at least a portion of trap portion 2514 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, rim 2532 on front surface 2526 of base portion 2512 engages with trap portion 2514 to secure it in place during use, although any other form of attachment may be substituted that allows trap portion 2514 to be securely but removably mounted on base portion 2512.

In the operation of insect trap 2510, conductive prongs 2522 are inserted into a wall electrical socket, and LEDs 2524 emit light, represented by arrows, which transmits through opening 2544 in base portion 2512 and opening 2542 in trap portion 2514 and into bottom enclosure 2528, and directly onto the bottom surface of divider 2546 and top surface 2538 of bottom plate 2534. In some embodiments, light is not manipulated in base portion 2512 and is emitted directly into trap portion 2514. Top surface 2538 of bottom plate 2534 may be configured to reflect and disperse the light from LEDs 2524 to project the light evenly onto the bottom surface of divider 2546, although top surface 2538 of bottom plate 2534 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute the light (e.g., evenly, according to specific patterns, at a focal point, etc.) onto the bottom surface of divider 2546, may be mounted to trap portion 2514 at or near opening 2542 or to base portion 2512 at or near opening 2544, and may replace or augment the role of top surface 2538 of bottom plate 2534. In some embodiments, the light from LEDs 2524 may directly strike top surface 2538 of bottom plate 2534 at an oblique angle (e.g., an acute angle from approximately 0° to 90°) and be spread across top surface 2538, and may replace or augment the light-distributing role of the bottom surface of divider 2546 or the lens or lenses mounted to trap portion 2514 or to base portion 2512.

Thereafter, the light transmits through divider 2546 and adhesive 2536 and into top enclosure 2548. The light may be further evenly distributed by the light-diffusing properties of divider 2546, adhesive 2536, or by a combination of the two. A portion of the light entering top enclosure 2548 transmits through opening 2520 and into the surrounding area where insect trap 2510 is installed. Insects and other arthropod pests are attracted to the light transmitted through opening 2520, and hop or crawl into opening 2520 and onto adhesive 2536, where they become trapped. A user may observe trapped insects by looking through opening 2520. When a sufficient number of insects have been trapped, the user may easily remove and discard the entire used trap portion 2514 without touching the trapped insects, insect debris or adhesive, which remain out of reach inside trap portion 2514, and replace it with a new trap portion 2514. New trap portion 2514 has fresh adhesive-coated surfaces, ensuring that insect trap 2510 will continue to efficiently and effectively attract and trap insects.

In some embodiments, because trap portion 2514 mounts beside, and not on top of or underneath base portion 2512, insect trap 2510 protrudes minimally from the floor and therefore intrudes minimally into the home environment. In some embodiments, insect trap 2510 may be configured such that when placed on a floor, its overall height, defined by the overall distance insect trap 2510 protrudes from the floor, is smaller than its overall length and its overall width.

It should be appreciated that a benefit of insect trap 2510 is the manipulation of light within trap portion 2514. In some embodiments, light manipulation occurs solely within trap portion 2514. Light manipulation may include reflection, refraction, polarization, dispersion and/or diffusion and is achieved by engaging with a manipulative element or surface (e.g., inside surface of housing 2518 and adhesive 2536). In some embodiments, light manipulation produces an even distribution of light on adhesive 2536. In some embodiments, light is manipulated to produce a predetermined pattern on adhesive 2536 or within trap portion 2514, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 2510 of this configuration may accommodate a variety of different trap portions 2514 that may be removably mounted to base portion 2512, each trap portion 2514 being uniquely configured to attract and trap a specific species or multiple species of insects. For example, the overall size and shape of trap portion 2514, the size, shape, location and orientation of opening 2520 in housing 2518 of trap portion 2514, and the scent or scents impregnated in housing 2518, bottom plate 2534, divider 2546 or adhesive 2536, may be uniquely configured to attract and trap a specific species or multiple species of insects.

For example, in some embodiments, trap portion 2514 is approximately 20 mm to 600 mm wide, 20 mm to 600 mm long and 5 mm to 150 mm high. In some embodiments, trap portion 2514 is approximately 20 mm to 200 mm wide, 20 mm to 200 mm long and 5 mm to 80 mm high. In some embodiments, trap portion 2514 is approximately 20 mm to 130 mm wide, 20 mm to 130 mm long and 5 mm to 50 mm high.

In some embodiments, base portion 2512 is approximately 20 mm to 600 mm wide, 10 mm to 150 mm long and 10 mm to 150 mm high. In some embodiments, base portion 2512 is 20 mm to 200 mm wide, 10 mm to 100 mm long and 10 mm to 80 mm high. In some embodiments, base portion 2512 is 20 mm to 130 mm wide, 10 mm to 50 mm long and 10 mm to 50 mm high.

It should be appreciated that insect trap 2510 may be adapted to attract and trap flying insects in addition to crawling and jumping arthropod pests. FIG. 134 is a front perspective view of an example of the twenty-fifth embodiment of an insect trap, indicated generally at 2510A. Insect trap 2510A includes a base portion 2512A and a removable trap portion 2514A. Trap portion includes a housing 2518A with a top surface 2540A. Insect trap 2510A may be identical to trap portion 2510 (not shown in this view), except that top surface 2540A of trap portion 2514A has openings 2552A configured to allow light from trap portion 2514A to project upwardly into the room where insect trap 2510A is installed and attract flying insects, which fly or crawl through openings 2552A in housing 2518A, into trap portion 2514A, and onto adhesive (not shown) inside trap portion 2514A.

It should also be appreciated that insect trap 2510A may be adapted to mount on a wall by plugging into an ordinary household wall electrical socket. FIG. 135 is a front perspective view of an example of the twenty-fifth embodiment of an insect trap, indicated generally at 2510B. Insect trap 2510B includes a base portion 2512B and a removable trap portion 2514B. Insect trap 2510B is shown plugged into a household wall electrical socket 2562B in this view. Trap portion 2514B includes a housing 2518B with openings 2552B in its top surface 2540B and openings 2520B (only one of which is shown) on its perimeter.

FIG. 136 is a rear perspective view of insect trap 2510B. Insect trap 2510B is shown removed from a household wall electrical socket (not shown) in this view. Base portion 2512B includes a wall plate recess 2554B in its rear surface 2556B, and a plurality of electrically conductive prongs 2522B, affixed into and protruding perpendicularly from wall plate recess 2554B. Insect trap 2510B mounts to a wall (not shown in this view) and receives power by plugging prongs 2522B into a household electrical socket (not shown in this view). Trap portion 2514B includes a bottom plate 2534B with a wall plate recess 2558B in its rear surface 2560B. When insect trap 2510B is plugged into a household wall electrical socket (not shown in this view), wall plate recess 2554B in base portion 2512B and wall plate recess 2558B in bottom plate 2534B are configured to accommodate the wall plate (not shown in this view) and allow rear surface 2556B of base portion 2512B and rear surface 2560B of bottom plate 2534B to contact the wall (not shown in this view) adjacent to the wall plate. Insect trap 2510B is configured to attract and trap flying insects through openings 2552B (shown in FIG. 135) in top surface 2540B (shown in FIG. 135) of housing 2518B, and is also configured to attract and trap arthropod pests crawling on the wall through openings 2520B (only one of which is shown) on the perimeter of housing 2518B.

FIG. 137 is a front perspective view of a twenty-sixth embodiment of an insect trap, indicated generally at 2610. Insect trap 2610 includes a base portion 2612 and a removable trap portion 2614. Trap portion 2614 is shown partially cut away and removed from base portion 2612 in this view. As shown, base portion 2612 includes an electrical cord 2616 and an electrical plug 2630 with a plurality of electrically conductive prongs 2622, adapted to provide power to insect trap 2610 by inserting conductive prongs 2622 into a standard household electrical wall socket. Alternatively, base portion 2612 may be configured to receive power from batteries (not shown) mounted in base portion 2612. While an electrical socket and batteries have been described as providing power to insect trap 2610, any suitable power source may be used. As shown, insect trap 2610 is configured to sit on the floor when in use and attract and trap crawling and hopping insects and other arthropod pests. Trap portion 2614 includes a housing 2618 with at least one opening 2620 on its perimeter. Opening 2620 in housing 2618 may be configured to admit a wide variety of insects into insect trap 2610, or alternatively it may be configured to admit one or more specific insect species. In some embodiments, opening 2620 is configured to prevent the user's fingers from penetrating opening 2620 and inadvertently touching trapped insects or adhesive when removing and replacing trap portion 2614. In some embodiments, opening 2620 has a size and shape such that a sphere 25 mm in diameter cannot pass through opening 2620, and has a size and shape such that a sphere 1 mm in diameter can pass through any portion of opening 2620. Opening 2620 may be of uniform or of varying width, shape and orientation, and if trap portion 2614 has more than one opening 2620, they may be of identical or of differing widths, shapes and orientations. Opening 2620 may be configured to attract one or more individual insect species or a variety of insect species. In some embodiments, the inside surface (not shown) of housing 2618 may have a reflective coating. Alternatively, the material of housing 2618 and the surface finish of the inside surface of housing 2618 may be configured to reflect light without a reflective coating on its inside surface. Base portion 2612 includes a lighting element such as one or more LEDs 2624. In some embodiments, LEDs 2624 include at least one that emits UV light and at least one that emits visible light. In some embodiments, LEDs 2624 include at least one that emits UV light and at least one that emits blue light to better attract a wide variety of insect species. In some embodiments, the lighting element emits a combination of wavelengths to mimic sunlight. In some embodiments, LEDs 2624 include at least one that emits IR light to better attract certain species of insects including fleas. In a front surface 2644 of base portion 2612 is at least one opening 2620, and mounted in opening 2620 may be a transparent or translucent window (not shown), which may protect LEDs 2624 from dust and insect debris, and may allow base portion 2612 to be easily cleaned. However, the window is not required. In some embodiments, at least a portion of LEDs 2624 protrude from front surface 2626 of base portion 2612 and into trap portion 2614 when trap portion 2614 is mounted to base portion 2612. On the perimeter of front surface 2626 may be a forwardly directed rim 2632. Trap portion 2614 includes a bottom plate 2634 with a top surface 2638, at least a portion of which is coated with an adhesive 2636. In some embodiments, the bottom surface (not shown) of bottom plate 2634 is planar or is planar at its perimeter and is configured such that insects cannot crawl under insect trap 2610 when it is placed on a floor. Trap portion 2614 includes a divider 2646, comprised of transparent or translucent material and which includes a top surface 2640. In some embodiments, divider 2646 is coated on its inside surfaces with a transparent or translucent adhesive to provide additional insect trapping efficiency and capacity. Divider 2646 has at least one opening 2652 that corresponds to opening 2620 in housing 2618. As shown, housing 2618 and divider 2646 form a top enclosure 2648, and divider 2646 and bottom plate 2634 form a bottom enclosure 2628. As shown, housing 2618 has at least one opening 2642 that corresponds to opening 2644 in front surface 2626 of base portion 2614. In some embodiments, opening 2642 has a transparent or translucent window (not shown). In some embodiments, housing 2618 is thermoformed from opaque sheet plastic, creating a clean and aesthetically pleasing shape while maintaining low cost and disposability. Alternatively, they may be constructed of other opaque, transparent or translucent materials such as paper, paperboard, cardboard or paper pulp. In some embodiments, housing 2618 is constructed by injection molding or by other suitable manufacturing techniques. In some embodiments, housing 2618, divider 2646 and bottom plate 2634 are joined together where they intersect or engage with an adhesive, although they may also be joined together by other commonly used packaging assembly techniques such as ultrasonic welding or high frequency (HF) welding or by any other suitable assembly method. The materials of trap portion 2614 may also include one or more of insect-attracting substances. For example, housing 2618 and/or divider 2646 and/or bottom plate 2634 and/or adhesive 2636 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2610. In such embodiments, the insect attractant is integral to trap portion 2614. Alternatively, the insect attractants may be embedded or contained in a separate piece (not shown) that may mount on an inside surface of bottom enclosure 2628 or on an outside surface of housing 2618 or through an opening in housing 2618. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 2610.

FIG. 138 is a cross-sectional view of insect trap 2610. For clarity, cord 2616, plug 2630 and conductive prongs 2622 are not shown. In some embodiments, base portion 2612 has a circuit board 2650 having a programmable processor or chip (not shown) for executing commands, electrically connected to cord 2616, conductive prongs 2622 and LEDs 2624. For clarity, however, not all of the electrical connections are shown. Circuit board 2650 may include electronic circuitry to receive ordinary household current, for example from conductive prongs 2622 and provide power to illuminate LEDs 2624. Circuit board 2650 may include an energy stabilizer such as a full wave rectifier circuit or any other circuit that may provide steady voltage to LEDs 2624, although it may also provide a varying voltage to LEDs 2624 to provide a flickering light which mimics movement that some insect species may find attractive. Circuit board 2650 may provide power to LEDs 2624 to provide UV and/or visible and/or IR light, although it may be configured to provide power to only UV LEDs 2624 or to only visible light LEDs 2624 or to only IR LEDs 2624, or to provide variable power to produce combinations of flickering UV and/or visible and/or IR light. Circuit board 2650 may also be configured to drive a transmitter or transceiver such as a piezoelectric speaker (not shown) or other device that may be mounted in base portion 2612 to emit insect-attracting sounds or vibrations. In some embodiments, the transmitter or transceiver may emit recorded and/or generated insect sounds or vibrations to better attract insects, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2610. It is desirable for such insect-attracting sound to be undetectable by a human beyond approximately a 1-meter distance from insect trap 2610.

Circuit board 2650 may also include one or more electrical elements (not shown), such as resistors (not shown) or resistance heating elements (not shown), or one or more heating exchanging elements (not shown) (e.g., using the Peltier effect and/or the Thomson effect to move heat to a specific region), or a combination of electrical elements that generate and/or move heat, which may transmit through base portion 2612 and into trap portion 2614, to attract some insect species, including fleas and mosquitoes. Alternatively, LEDs 2624 may generate heat, to replace or augment the heat generated by the one or more electrical elements. In general, the heat generated may increase and maintain the temperature of at least a portion of trap portion 2614 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, rim 2632 on front surface 2626 of base portion 2612 engages with trap portion 2614 to secure it in place during use, although any other form of attachment may be substituted that allows trap portion 2614 to be securely but removably mounted on base portion 2612.

In the operation of insect trap 2610, conductive prongs 2622 (not shown) are inserted into a wall electrical socket, and LEDs 2624 light, represented by arrows, which transmits through opening 2644 in base portion 2612 and opening 2642 in housing 2618, and into top enclosure 2648, and directly onto the inside surface of housing 2618 and top surface 2640 of divider 2646. In some embodiments, light is not manipulated in base portion 2612 and is emitted directly into trap portion 2614. In some embodiments, the inside surface of housing 2618 is configured to reflect the light from LEDs 2624 to project the light onto and through top surface 2640 of divider 2646 and on into bottom enclosure 2628, although the inside surface of housing 2618 may also have ribs or other features (not shown) to more evenly distribute the light. Top surface 2640 of divider 2646 may be planar or convex or concave or be a combination of forms to more evenly distribute the light onto adhesive 2636. In some embodiments, an optical enhancer such as an anamorphic lens (not shown) or any other lens or combination of lenses configured to distribute the light (e.g., evenly, according to specific patterns, at a focal point, etc.) through divider 2646 and onto adhesive 2636, may be mounted to trap portion 2614 at or near opening 2642 in housing 2618 or to base portion 2612 at or near opening 2644, and may replace or augment the role of inside surface of housing 2618. The light may be further evenly distributed by the light-diffusing properties of divider 2646, the adhesive coating the inside surface of divider 2646, or by a combination of the two. In some embodiments, the light from LEDs 2624 may directly strike top surface 2640 of divider 2646 at an oblique angle (e.g., an acute angle from approximately 0° to 90°) and be spread across top surface 2640, and may replace or augment the light-distributing role of top surface 2640 of divider 2646 or of the lens or lenses mounted to trap portion 2614 or to base portion 2612.

Thereafter, a portion of the light entering bottom enclosure 2628 continues through opening 2652 in divider 2646 and its corresponding opening 2620 in housing 2618 and into the surrounding area where insect trap 2610 is installed. Insects and other arthropod pests are attracted to the light transmitted through opening 2652 in divider 2646 and its corresponding opening 2620 in housing 2618, and crawl through opening 2620 in housing 2618 and its corresponding opening 2652 in divider 2646 and onto adhesive 2636 on bottom plate 2634, where they become trapped. A user may observe trapped insects by looking through opening 2620 in housing 2618 and its corresponding opening 2652 in divider 2646. When a sufficient number of insects have been trapped, the user can easily remove and discard entire used trap portion 2614 without touching the trapped insects, insect debris or adhesive, which remain out of reach inside trap portion 2614, and replace it with a new trap portion 2614. New trap portion 2614 has fresh adhesive-coated surfaces, ensuring that insect trap 2610 continues to efficiently and effectively attract and trap insects.

In some embodiments, because trap portion 2614 mounts beside, and not on top of or underneath base portion 2612, insect trap 2610 protrudes minimally from the floor and therefore intrudes minimally into the home environment. In some embodiments, insect trap 2610 is configured such that when placed on a floor, its overall height, defined by the overall distance insect trap 2610 protrudes from the floor, is smaller than its overall length and its overall width.

It should be appreciated that a benefit of insect trap 2610 is the manipulation of light within trap portion 2614. In some embodiments, light manipulation occurs solely within trap portion 2614. Light manipulation may include reflection, refraction, polarization, dispersion and/or diffusion and is achieved by engaging with a manipulative element or surface (e.g., inside surface of housing 2618 and adhesive 2636). In some embodiments, light manipulation produces an even distribution of light on adhesive 2636. In some embodiments, light is manipulated to produce a predetermined pattern on adhesive 2636 or within trap portion 2614, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2610 of this configuration may accommodate a variety of different trap portions 2614 that may be removably mounted to base portion 2612, each trap portion 2614 being uniquely configured to attract and trap a specific species or multiple species of insects. For example, the overall size and shape of trap portion 2614, the size, shape, location and orientation of opening 2620 in housing 2618 of trap portion 2614, and the scent or scents impregnated in housing 2618, bottom plate 2634, divider 2646 or adhesive 2636, may be uniquely configured to attract and trap a specific species or multiple species of insects.

For example, in some embodiments, trap portion 2614 is approximately 20 mm to 600 mm wide, 20 mm to 600 mm long and 5 mm to 150 mm high. In some embodiments, trap portion 2614 is approximately 20 mm to 200 mm wide, 20 mm to 200 mm long and 5 mm to 80 mm high. In some embodiments, trap portion 2614 is approximately 20 mm to 130 mm wide, 20 mm to 130 mm long and 5 mm to 50 mm high.

In some embodiments, base portion 2612 is approximately 20 mm to 600 mm wide, 10 mm to 150 mm long and 10 mm to 150 mm high. In some embodiments, base portion 2612 is 20 mm to 200 mm wide, 10 mm to 100 mm long and 10 mm to 80 mm high. In some embodiments, base portion 2612 is 20 mm to 130 mm wide, 10 mm to 50 mm long and 10 mm to 50 mm high.

FIG. 139 is a front perspective view of a twenty-seventh embodiment of an insect trap, indicated generally at 2710. Insect trap 2710 includes a base portion 2712 and a removable trap portion 2714. Trap portion 2714 and base portion 2712 are shown partially cut away, and trap portion 2714 is shown removed from base portion 2712 in this view. Insect trap 2710 is configured to be placed on the floor and to attract and trap crawling and hopping insects or pests. As shown, base portion 2712 includes an electrical cord 2716 and an electrical plug 2730 with a plurality of electrically conductive prongs 2722, adapted to provide power to insect trap 2710 by inserting conductive prongs 2722 into a standard household electrical wall socket. Alternatively, base portion 2712 may be configured to receive power from batteries (not shown) mounted in base portion 2712. While an electrical socket and batteries have been described as providing power to insect trap 2710, any suitable power source may be used. Base portion 2712 includes a lighting element such as one or more LEDs 2724. In some embodiments, LEDs 2724 include at least one that emits ultraviolet (UV) light and at least one that emits visible light. In some embodiments, LEDs 2724 include at least one that emits UV light and at least one that emits blue light to better attract a wide variety of insect species. In some embodiments, the lighting element emits a combination of wavelengths to mimic sunlight. In some embodiments, LEDs 2764 include at least one that emits IR light to better attract certain species of insects including fleas. In a front surface 2726 of base portion 2712 is at least one opening 2744, and mounted in opening 2744 may be a transparent or translucent window (not shown), which may protect LEDs 2724 from dust and insect debris, and may allow base portion 2712 to be easily cleaned. However, the window is not required. In some embodiments, at least a portion of LEDs 2724 may protrude from front surface 2726 of base portion 2712, and into trap portion 2714 when trap portion 2714 is mounted to base portion 2712. On the perimeter of front surface 2726 may be a forwardly directed rim 2732.

Trap portion 2714 includes a housing 2718 with at least one opening 2720 on its perimeter. Opening 2720 in housing 2718 may be configured to admit a wide variety of insects into insect trap 2710, or alternatively it may be configured to admit one or more specific insect species. In some embodiments, opening 2720 is configured to prevent the user's fingers from penetrating opening 2720 and inadvertently touching trapped insects or adhesive when removing and replacing trap portion 2714. In some embodiments, opening 2720 has a size and shape such that a sphere 25 mm in diameter cannot pass through opening 2720, and has a size and shape such that a sphere 1 mm in diameter can pass through any portion of opening 2720. Opening 2720 may be of uniform or of varying width, shape and orientation, and if trap portion 2714 has more than one opening 2720, they may be of identical or of differing widths, shapes and orientations. Opening 2720 may be configured to attract one or more individual insect species or a variety of insect species. In some embodiments, the inside surface (not shown) of housing 2718 has a reflective coating. Alternatively, the material of housing 2718 and the surface finish of the inside surface of housing 2718 may be configured to reflect and disperse light without a reflective coating on its inside surface. Trap portion 2714 includes a bottom plate 2734 with a top surface 2738, at least a portion of which is coated with an adhesive 2736. In some embodiments, the bottom surface (not shown) of bottom plate 2734 is planar or is planar at its perimeter and may be configured such that insects cannot crawl under insect trap 2710 when it is placed on a floor. Trap portion 2714 includes a divider 2746, comprised of transparent or translucent material and which includes a top surface 2740. In some embodiments, divider 2746 is coated on its inside surfaces with a transparent or translucent adhesive to provide additional insect trapping efficiency and capacity. Divider 2746 has at least one opening 2752 that corresponds to opening 2720 in housing 2718. Divider 2746 may be thermoformed from a transparent or translucent plastic that may allow for a low cost and disposability, although it may also be made by injection molding, and it may also be made of other transparent or translucent materials. Trap portion 2714 also includes a diffuser 2754, only half of which is shown in this view, made of transparent or translucent material with light-diffusing characteristics. Alternatively, diffuser 2754 may have a surface finish or surface features or a surface coating that provides light-diffusing characteristics to diffuser 2754. In some embodiments, diffuser 2754 is a strip of sheet material that fits into a recess in divider 2746 and conforms to the shape of the surfaces of divider 2746 that it contacts. Alternatively, diffuser 2754 may be molded or thermoformed to shape. As shown, housing 2718 and divider 2746 form a top enclosure 2748, and divider 2746 and bottom plate 2734 form a bottom enclosure 2728. As shown, housing 2718 includes at least one opening 2742 that corresponds to opening 2744 in front surface 2726 of base portion 2712. In some embodiments, opening 2742 has a transparent or translucent window (not shown). In some embodiments, housing 2718 is thermoformed from opaque sheet plastic, creating a clean and aesthetically pleasing shape while maintaining low cost and disposability. Alternatively, they may be constructed of other opaque, transparent or translucent materials such as paper, paperboard, cardboard or paper pulp. In some embodiments, housing 2718 is constructed by injection molding or by other suitable manufacturing techniques. In some embodiments, housing 2718, divider 2746 and bottom plate 2734 are joined together where they intersect or engage with an adhesive, although they may also be joined together by other commonly used packaging assembly techniques such as ultrasonic welding or high frequency (HF) welding or by any other suitable assembly method. For example, housing 2718 and/or divider 2746 and/or bottom plate 2734 and/or adhesive 2736 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2710. Alternatively, the insect attractants may be embedded or contained in a separate piece (not shown) that may mount on an inside surface of divider 2746 or on outside surface of housing 2718 or through an opening in housing 2718. Alternatively, water may be embedded or contained in the separate piece in addition to, or in place of, the one or more insect-attracting substances, as water vapor is a known mosquito attractant. Alternatively, other insect attractants such sugar solution, molasses, or honey may be embedded or contained in the separate piece in addition to, or in place of, the one or more insect-attracting substances. Alternatively, a combination of live yeast, sugar, and water, which can produce mosquito-attracting carbon dioxide, may be embedded or contained in the separate piece in addition to, or in place of, the one or more insect-attracting substances. It is desirable for such attractants to be detectable by an insect for approximately a 2-meter radius from insect trap 2710.

In some embodiments, base portion 2712 includes a circuit board 2750 having a programmable processor or chip (not shown) for executing commands, electrically connected to cord 2716, conductive prongs 2722 and LEDs 2724. For clarity, however, the electrical connections are not shown. Circuit board 2750 may also include electronic circuitry to receive ordinary household current, for example, from conductive prongs 2722 and provide power to illuminate LEDs 2724. Circuit board 2750 may include an energy stabilizer such as a full wave rectifier circuit or any other circuit that may provide steady voltage to LEDs 2724, although it may also provide a varying voltage to LEDs 2724 to provide a flickering light, which mimics movement that some insects find attractive. Circuit board 2750 may provide power to LEDs 2724 to provide both UV and/or visible and/or IR light, although it may be configured to provide power to only UV LEDs 2724 or to only visible light LEDs 2724 or to only IR LEDs 2724, or to provide variable power to produce combinations of flickering UV and/or visible and/or IR light. Circuit board 2750 may also be configured to drive a transmitter or transceiver such as a piezoelectric speaker (not shown) or other device that may be mounted in base portion 2712 to emit insect-attracting sounds or vibrations. In some embodiments, the transmitter or transceiver may emit recorded and/or generated insect sounds or vibrations to better attract insects, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2710. It is desirable for such insect-attracting sound to be undetectable by a human beyond approximately a 1-meter distance from insect trap 2710.

Circuit board 2750 may also include one or more electrical elements (not shown), such as resistors (not shown) or resistance heating elements (not shown), or one or more heat exchanging elements (not shown) (e.g., elements using the Peltier effect and/or the Thomson effect to move heat to a specific region), or a combination of electrical elements that generate and/or move heat, which may transmit through base portion 2712 and into trap portion 2714, to attract some insect species, including fleas and mosquitoes. Alternatively, LEDs 2724 may generate heat, to replace or augment the heat generated by the one or more electrical elements. In general, the heat generated may increase and maintain the temperature of at least a portion of trap portion 2714 to between approximately 30 degrees C. and 45 degrees C., and to preferably between approximately 33 degrees C. and 42 degrees C., in order to mimic the skin and body temperatures of mammals. The addition of heat may also enhance the release of insect-attracting substances, including water vapor and carbon dioxide.

As shown, rim 2732 on front surface 2726 of base portion 2712 engages with trap portion 2714 to secure it in place during use, although any other form of attachment may be substituted that allows trap portion 2714 to be securely but removably mounted on base portion 2712.

In the operation of insect trap 2710, conductive prongs 2722 (not shown) are inserted into a wall electrical socket, and LEDs 2724 emit light, represented by arrows, which transmits through opening 2744 in base portion 2712 and opening 2742 in housing 2718, into top enclosure 2748, and directly onto diffuser 2754, top surface 2740 of divider 2746 and the inside surface of housing 2718. In some embodiments, light is not manipulated in base portion 2712 and is emitted directly into trap portion 2714. Diffuser 2754 transmits the light evenly through the corresponding surfaces of divider 2746 and into bottom enclosure 2728. In some embodiments, the inside surface of housing 2718 may be configured to reflect and disperse light from LEDs 2724 through divider 2746 into bottom enclosure 2728, and evenly onto adhesive 2736 coating top surface 2738 of bottom plate 2734, although the inside surface of housing 2718 may also have ribs or other features (not shown) to more evenly distribute the light. Top surface 2740 of divider 2746 may be planar or convex or concave or be a combination of forms to more evenly distribute the light onto adhesive 2736. In some embodiments, an optical enhancer such as an anamorphic lens (not shown) or any other lens or combination of lenses configured to distribute the light (e.g., evenly, according to specific patterns, at a focal point, etc.) through divider 2746 and onto adhesive 2736, may be mounted to trap portion 2714 at or near opening 2742 in housing 2718 or to base portion 2712 at or near opening 2744, and may replace or augment the role of the reflective-coated inside surface of housing 2718. The light may be further evenly distributed by the light-diffusing properties of divider 2746, the adhesive coating the inside surface of divider 2746, or by a combination thereof. In some embodiments, the light from LEDs 2724 may directly strike top surface 2740 of divider 2746 at an oblique angle (e.g., an acute angle from approximately 0° to 90°) and be spread across top surface 2740, and may replace or augment the light-distributing role of the top surface 2740 of divider 2746 or of the lens or lenses mounted to trap portion 2714 or to base portion 2712.

Thereafter, a portion of the light entering bottom enclosure 2728 continues through opening 2752 in divider 2746 and its corresponding opening 2720 in housing 2718 and into the surrounding area where insect trap 2710 is installed. Insects and other arthropod pests are attracted to the light from diffuser 2754 and from adhesive 2736 that transmits through opening 2752 in divider 2746 and its corresponding opening 2720 in housing 2718, and hop or crawl through opening 2720 in housing 2718 and its corresponding opening 2752 in divider 2746 and onto adhesive 2736, where they may become trapped. A user may observe trapped insects by looking through opening 2720 in housing 2718 and its corresponding opening 2752 in divider 2746. When a sufficient number of insects have been trapped, the user can easily remove and discard the entire used trap portion 2714 without touching trapped insects, insect debris or adhesive, which remain out of reach inside trap portion 2714, and replace it with a new trap portion 2714. New trap portion 2714 has fresh adhesive-coated surfaces, ensuring that insect trap 2710 continues to efficiently and effectively attract and trap insects.

In some embodiments, because trap portion 2714 mounts beside, and not on top of or underneath base portion 2712, insect trap 2710 protrudes minimally from the floor and therefore intrudes minimally into the home environment. In some embodiments, insect trap 2710 may be configured such that when placed on a floor, its overall height, defined by the overall distance insect trap 2710 protrudes from the floor, is smaller than its overall length and its overall width.

It should be appreciated that a benefit of insect trap 2710 is the manipulation of light within trap portion 2714. In some embodiments, light manipulation occurs solely within trap portion 2714. Light manipulation may include reflection, refraction, polarization, dispersion and/or diffusion and is achieved by engaging with a manipulative element or surface (e.g., inside surface of housing 2718 and adhesive 2736). In some embodiments, light manipulation produces an even distribution of light on adhesive 2736. In some embodiments, light is manipulated to produce a predetermined pattern on adhesive 2736 or within trap portion 2714, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2710 of this configuration may accommodate a variety of different trap portions 2714 that may be removably mounted to base portion 2712, each trap portion 2714 being uniquely configured to attract and trap a specific species or multiple species of insects. For example, the overall size and shape of trap portion 2714, the size, shape, location and orientation of opening 2720 in housing 2718 of trap portion 2714, and the scent or scents impregnated in housing 2718, bottom plate 2734, divider 2746 or adhesive 2736, may be uniquely configured to attract and trap a specific species or multiple species of insects.

For example, in some embodiments, trap portion 2714 is approximately 20 mm to 600 mm wide, 20 mm to 600 mm long and 5 mm to 150 mm high. In some embodiments, trap portion 2714 is approximately 20 mm to 200 mm wide, 20 mm to 200 mm long and 5 mm to 80 mm high. In some embodiments, trap portion 2714 is approximately 20 mm to 130 mm wide, 20 mm to 130 mm long and 5 mm to 50 mm high.

In some embodiments, base portion 2712 is approximately 20 mm to 600 mm wide, 10 mm to 150 mm long and 10 mm to 150 mm high. In some embodiments, base portion 2712 is 20 mm to 200 mm wide, 10 mm to 100 mm long and 10 mm to 80 mm high. In some embodiments, base portion 2712 is 20 mm to 130 mm wide, 10 mm to 50 mm long and 10 mm to 50 mm high.

FIG. 140 is a front perspective view of a twenty-eighth embodiment of an insect trap, indicated generally at 2810. Insect trap 2810 includes a base portion 2812 and a removable and replaceable trap portion 2814. Trap portion 2814 is shown mounted on base portion 2812 and partially cut away in this view. Trap portion 2814 includes a front housing 2818 with at least one insect opening 2820 and a pivot opening 2822 on a front surface 2816 and a tab opening 2824 on a top surface 2826, a pivot 2828 mounted in pivot opening 2822 in front surface 2816 of front housing 2818, and a shutter 2830 mounted on pivot 2828 and located immediately behind front surface 2816 of front housing 2818. Shutter 2830 includes at least one insect opening 2832 that corresponds in size, shape and number to insect opening 2820 in front surface 2816 of front housing 2818, and a tab 2834 which protrudes through tab opening 2824 in top surface 2826 of front housing 2818. Shutter 2830 is configured to rotate about pivot 2828 and to allow tab 2834 to move freely to the left and to the right within tab opening 2824 in top surface 2826 of front housing 2818. As shown, tab 2834 has been moved to the left and insect opening 2832 in shutter 2830 is aligned with insect opening 2820 in front housing 2818, thereby exposing the interior of trap portion 2814 through insect opening 2820 and insect opening 2832. When tab 2834 is moved to the right, insect opening 2832 in shutter 2830 is not aligned with insect opening 2820 in front housing 2818, and shutter 2830 obstructs insect opening 2820. Accordingly, moving tab 2834 to the left opens trap portion 2814 and moving tab to the right closes trap portion 2814. However, it should be readily apparent that shutter 2830 may be configured in the opposite orientation, such that moving tab 2834 to the right opens trap portion 2814 and moving tab 2834 to the left closes trap portion 2814. Shutter 2830 may be made of any thin, opaque or translucent material such as sheet metal, sheet plastic or paperboard.

Tab 2834 may have words or graphics printed, molded or formed on its front surface to show the user the tab locations when shutter 2830 is in the open and closed positions. As shown, the front surface of tab 2834 has the words "open" on the left and "closed" on the right. Alternatively, words or graphics indicating "in use" and "discard" may be present on tab 2834, or any word or graphic or combination of words and/or graphics to indicate the appropriate position of tab 2834. As shown, insect opening 2820 in front housing and insect opening 2832 in shutter 2830 is configured in a radiating pattern about pivot 2828, although insect opening 2820 and insect opening 2830 may have a variety of shapes, sizes and arrangements. In some embodiments, shutter 2830 may rotate about a protrusion in front housing, thereby eliminating the need for pivot 2828. Although shutter 2830 is shown opening and closing by rotating about a pivot substantially perpendicular to front surface 2816 of front housing 2818, it may also be configured to operate by pivoting on a vertical axis or on a horizontal axis, or by sliding horizontally or vertically without a pivot, or by any combination thereof. The user may close trap portion 2814 by sliding tab 2834 before removing and replacing trap portion 2814, thereby avoiding seeing or contacting dead insects while handling trap portion 2814.

It should be appreciated that insect trap 2810 may be adapted to open and close automatically without requiring additional action by the user. FIG. 141 is a front perspective view of an example of the twenty-eighth embodiment of an insect trap, indicated generally at 2810A. Insect trap 2810A includes a base portion 2812A and a removable and replaceable trap portion 2814A. Trap portion 2814A is shown mounted on base portion 2812A and partially cut away in this view. Base portion 2812A includes a top surface 2824A. Trap portion 2814A includes a front housing 2818A with at least one insect opening 2820A and a pivot opening 2822A on a front surface 281A6, a pivot 2828A mounted in pivot opening 2822A in front surface 2816A of front housing 2818A, and a shutter 2830A mounted on pivot 2828A and located immediately behind front surface 2816A of front housing 2818A. Shutter 2830A includes at least one insect opening 2832A that corresponds in size, shape and number to insect opening 2820A in front surface 2816A of front housing 2818A, a tab 2834A which protrudes through a tab opening (not shown) in bottom surface (not shown) of front housing 2818A when trap portion 2814A is removed from base portion 2812A, and a counterweight 2826A on the back surface (not shown) of shutter 2830A adjacent to tab 2834A. Shutter 2830A is configured to rotate about pivot 2828A and to allow tab 2834A to move freely in the tab opening in the bottom surface of front housing 2818. As shown, top surface 2824A of base portion 2812A pushes tab 2834A upwards into trap portion 2814A until tab 2834A no longer protrudes from trap portion 2814A when trap portion 2814A is mounted on base portion 2812A, which rotates shutter 2830A to a position that aligns insect opening 2832A in shutter 2830A with insect opening 2820A in front housing, which exposes the interior of trap portion 2814A, thereby opening trap portion 2014A. When trap portion 2814A is removed from base portion 2812A, counterweight 2826A pushes tab 2834A down through the opening on the bottom surface of front housing 2818A and rotates shutter 2830A such that insect opening 2832A in shutter 2830A does not align with insect opening 2820A in front housing, and shutter 2830A obstructs insect opening 2820A, thereby closing trap portion 2014A, thereby preventing the user from seeing or contacting dead insects while removing and disposing of trap portion 2814A.

As shown, top surface 2824A of base portion 2812A pushes tab 2834A to rotate shutter 2830 to open trap portion 2814A, and counterweight 2826A rotates shutter 2830A to close trap portion 2814A. However, other configurations may be contemplated that automatically open and close trap portion 2814A. In some embodiments, shutter 2830A may be configured to balance such that it rotates by its own weight to close trap portion 2814A, thereby eliminating the need for counterweight 2826A. In some embodiments, a spring (not shown) may rotate shutter 2830A to close trap portion 2814A, replacing counterweight 2826A. In some embodiments, a magnet (not shown) on shutter 2830A on the opposite side from tab 2834A may be attracted to a magnet (not shown) inside base portion 2812A and rotate shutter 2830A to open trap portion 2814A, thereby replacing the role of tab 2834A. Alternatively, a piece of ferrous metal on shutter 2830A on the opposite side from tab 2834A may be attracted to an electromagnet inside base portion 2812A and rotate shutter 2830A to open trap portion 2814A, thereby replacing the role of tab 2834A and offering the added benefit of opening trap portion 2814A only when insect trap 2810A is receiving electric power.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith. In an embodiment, the first opening is configured to allow an insect to enter into the enclosure. In an embodiment, the enclosure includes a second opening, the second opening configured to allow light to emit from the enclosure. In an embodiment, within the base portion, the light is not manipulated. In an embodiment, the enclosure includes a third opening, the third opening configured to allow light to be received from base portion into the enclosure. In an embodiment, wherein the enclosure is configured to distribute the light in a predetermined pattern. In an embodiment, the enclosure includes: a front housing portion having a first internal surface; and a rear housing portion having a second internal surface, wherein the front housing portion and rear housing portion are matingly engaged with each other to form the enclosure; and wherein at least one of the first or second internal surfaces is configured to manipulate light. In an embodiment, at least one of the first or second internal surfaces includes an adhesive surface. In an embodiment, the rear housing portion has a concave surface, the concave surface configured to reflect light evenly within the enclosure. In an embodiment, light is transmitted through the adhesive surface, illuminating the adhesive surface to attract an insect to the adhesive surface. In an embodiment, the enclosure includes: a front housing portion having a first internal surface; a rear housing portion having a second internal surface; and a divider portion disposed at least partially between the front housing portion and rear housing portion, wherein the front housing portion and rear housing portion are matingly engaged with each other to form the enclosure; and wherein the divider portion divides the enclosure into a front enclosure portion and a rear enclosure portion. In an embodiment, the divider portion includes a rear surface including translucent material and includes a front surface including an adhesive surface. In an embodiment, the second internal surface of the rear housing portion includes a concave surface, the concave surface configured to reflect light onto the rear surface of the divider portion. In an embodiment, light is transmitted through the adhesive surface, illuminating the adhesive surface to attract an insect to the adhesive surface. In an embodiment, the rear surface of the divider portion is configured to receive the light from the second internal surface of the rear housing portion or directly from the lighting element. In an embodiment, the divider portion is configured to receive light at an oblique angle and spread across the divider portion. In an embodiment, the divider portion is configured to manipulate light. In an embodiment, the divider portion includes a planar or contoured shape, wherein the shape of the divider portion is configured to optimize light distribution. In an embodiment, the base portion includes a protrusion and wherein the trap portion includes a recess for receiving the protrusion, wherein when the protrusion is received by the trap portion, the base portion and trap portion are engaged. In an embodiment, the trap portion includes a protrusion and wherein the base portion includes a recess for receiving the protrusion, wherein when the protrusion is received by the base portion, the base portion and trap portion are engaged. In an embodiment, the trap portion includes a polymeric, fibrous, or carbon-based material. In an embodiment, the mounting portion includes an electrical plug having rigid conductors protruding substantially perpendicularly and directly from the rear surface of the mounting portion, wherein the conductors are insertable into an electrical power outlet. In an embodiment, the power source includes an electrical power outlet or a battery. In an embodiment, the lighting element includes a light emitting diode (LED). In an embodiment, the lighting element includes an ultraviolet (UV) LED and a blue LED. In an embodiment, the base portion includes an energy stabilizer configured to provide a constant voltage to the lighting element. In an embodiment, the energy stabilizer includes full rectifier circuit. In an embodiment, the base portion includes an opening, the opening configured to allow light to emit from the base portion to the trap portion. In an embodiment, the opening includes a transparent or translucent window. In an embodiment, the opening is proximate to the lighting element. In an embodiment, the trap portion includes an insect attractant. In an embodiment, the insect attractant is selected from the group consisting of: sorbitol, coleopteran attractants, dipteran attractants, homopteran attractants, lepidopteran, straight chain lepidopteran pheromones, eugenol, methyl eugenol, and siglure. In an embodiment, the coleopteran attractants include brevicomin, dominicalure, frontalin, grandlure, ipsdienol, ipsenol, japonilure, lineatin, megatomoic acid, multistriatin, oryctalure, sulcatol, and trunc-call. In an embodiment, the dipteran attractants include ceralure, cue-lure, latilure, medlure, moguchun, muscalure, and trimedlure. In an embodiment, the homopteran attractants include rescalure. In an embodiment, the lepidopteran attractants include disparlure. In an embodiment, the straight chain lepidopteran pheromones include codlelure, gossyplure, hexalure, litlure, looplure, orfralure, and ostramone. In an embodiment, the insect attractant is integral to the enclosure. In an embodiment, the base portion includes a transmitter. In an embodiment, the transmitter includes a piezoelectric speaker configured to emit an insect-attracting sound. In an embodiment, the insect-attracting sound includes frequencies in the range of approximately 0.2 Hz to 240 KHz. In an embodiment, the base includes a switch, the switch configured to allow a user to control a property of the trap. In an embodiment, the property is selected from the group consisting of: power, light intensity, light wavelength or frequency, light flickering, light patterns, and combinations thereof. In an embodiment, the switch includes a mechanical switch, an optical switch, an electronic switch, an electromechanical switch, or a Hall Effect sensor. In an embodiment, the enclosure includes a reflective surface. In an embodiment, the adhesive surface is proximate to the reflective surface. In an embodiment, the base portion includes a circuit configured to a varying voltage to the lighting element, wherein the lighting element provides intermittent light to the trap portion. In an embodiment, the enclosure includes an outer surface, the outer surface at least partially surrounded by sleeve that is configured to reduce the amount of light emitted by the enclosure. In an embodiment, the at least one of the first or second internal surfaces includes a textured surface, the textured surface configured to increase the surface area of the enclosure. In an embodiment, the textured surfaces include ribs extending at least a portion of the length of the first or second internal surfaces. In an embodiment, the at least one of the first or second internal surfaces include a textured surface, the textured surface configured to increase the surface area of the enclosure. In an embodiment, the textured surfaces include ribs extending at least a portion of the length of the first or second internal surfaces. In an embodiment, the trap further includes: a light conducting body located proximate to the second internal surface of the rear housing portion, the light conducting body having a front surface and a rear surface and the light conducting body configured to receive light from the base portion and distribute the light in a predetermined pattern in the enclosure. In an embodiment, the front surface of the light conducting body further includes an adhesive material. In an embodiment, the rear surface of the light reflecting body is configured to reduce the amount of light from being emitted in a predetermined direction. In an embodiment, the light conducting body is tapered, having a thicker depth at a portion proximate to the base portion and a thinner depth at an opposite end. In an embodiment, the rear surface of the light conducting body is configured to reflect light into the light conducting body. In an embodiment, light is reflected multiple times within the light conducting body before being emitted into the enclosure. In an embodiment, the rear surface includes a rear cover or a matte layer. In an embodiment, the base portion further includes an optical enhancer, the optical enhancer configured to direct the light into the trap portion in a predetermined pattern. In an embodiment, the optical enhancer includes a lens. In an embodiment, the enclosure includes an inner sleeve and the base portion includes an outer sleeve, the inner sleeve configured to align with the outer sleeve. In an embodiment, the outer sleeve includes a face plate having an opening. In an embodiment, the face plate opening corresponds to an enclosure opening, the openings providing an alignment means. In an embodiment, the inner sleeve is configured to be dropped into the outer sleeve. In an embodiment, the inner sleeve includes a tab for holding on to the inner sleeve. In an embodiment, the base portion includes a docking switch, the docking switch configured to activate the lighting element when the trap portion is correctly engaged with the base portion. In an embodiment, the trap portion includes a docking switch activator, the docking switch activator configured to activate the docking switch when the trap portion is correctly engaged with the base portion. In an embodiment, the docking switch includes a mechanical switch, an optical switch, an electronic switch, an electromechanical switch, or a Hall Effect sensor.

In an aspect, an insect trap is disclosed including: a trap portion including: an enclosure having an adhesive surface and a first opening, wherein the adhesive surface is at least partially contained within the enclosure and is configured to adhere to an insect, and a lighting element at least partially contained within the enclosure, wherein the lighting element is configured to provide light within the enclosure and wherein the lighting element is configured to communicate with and receive power from a power source; and a base portion configured to removably engage the trap portion and provide access to the power source. In an embodiment, the lighting element includes a plurality of electrical trap contacts and wherein the base portion includes a plurality of electrical base contacts, the trap contacts configured to communicate with the base contacts to provide power to the lighting element. In an embodiment, the base contacts are in communication with the power source. In an embodiment, the lighting element includes a light emitting diode (LED).

In an aspect, a removable insect trap cartridge is disclosed including: an enclosure defining the cartridge, the enclosure having an adhesive surface and a first opening, wherein the adhesive surface is at least partially contained within the enclosure and is configured to adhere to an insect, wherein the first opening is configured to allow an insect to enter the enclosure, and wherein the enclosure is configured to provide light in a predetermined pattern within the enclosure. In an embodiment, the enclosure further includes a lighting element. In an embodiment, the lighting element includes a light emitting diode (LED). In an embodiment, the lighting element includes an ultraviolet (UV) LED and a blue LED. In an embodiment, the enclosure includes: a front housing portion having a first internal surface; and a rear housing portion having a second internal surface, wherein the front housing portion and rear housing portion are matingly engaged with each other to form the enclosure; and wherein at least one of the first or second internal surfaces is configured to manipulate light. In an embodiment, at least one of the first or second internal surfaces includes an adhesive surface. In an embodiment, the rear housing portion has a concave surface, the concave surface configured to reflect light evenly within the enclosure. In an embodiment, light is transmitted through the adhesive surface, illuminating the adhesive surface to attract an insect to the adhesive surface. In an embodiment, the enclosure includes: a front housing portion having a first internal surface; a rear housing portion having a second internal surface; and a divider portion disposed at least partially between the front housing portion and rear housing portion, wherein the front housing portion and rear housing portion are matingly engaged with each other to form the enclosure; and wherein the divider portion divides the enclosure into a front enclosure portion and a rear enclosure portion. In an embodiment, the divider portion includes a rear surface having translucent material and includes a front surface having an adhesive surface. In an embodiment, the second internal surface of the rear housing portion includes a concave surface, the concave surface configured to reflect light onto the rear surface of the divider portion. In an embodiment, light is transmitted through the adhesive surface, illuminating the adhesive surface to attract an insect to the adhesive surface. In an embodiment, the rear surface of the divider portion is configured to receive the light from the second internal surface of the rear housing portion or directly from a lighting element. In an embodiment, the enclosure includes a bottom surface, the bottom surface configured to be removably received in a pluggable base. In an embodiment, wherein the enclosure includes biodegradable materials. In an embodiment, the enclosure includes an outer surface, the outer surface including a decorative element. In an embodiment, the decorative element includes a shape selected from the group consisting of: a flower, a plant, a shell, a company logo, a sports team logo, a football, a basketball, a soccer ball, a hockey puck, a football helmet or a hockey stick. In an embodiment, the trap portion includes an insect attractant. In an embodiment, the insect attractant is selected from the group consisting of: sorbitol, coleopteran attractants, dipteran attractants, homopteran attractants, lepidopteran, straight chain lepidopteran pheromones, eugenol, methyl eugenol, and siglure. In an embodiment, the insect attractant is detectable by an insect at a distance of approximately 2 meters from the cartridge. In an embodiment, the enclosure includes a textured surface, the textured surface configured to increase the surface area of the enclosure. In an embodiment, the textured surface includes ribs extending at least a portion of the length of the enclosure. In an embodiment, the cartridge further includes: a light conducting body located within the enclosure, the light conducting body configured to receive light and distribute the light in a predetermined pattern in the enclosure. In an embodiment, the enclosure includes an inner sleeve that is configured to be received into and aligned with an outer sleeve. In an embodiment, the outer sleeve includes a face plate having an opening. In an embodiment, the face plate opening corresponds to an enclosure opening, the openings providing an alignment means. In an embodiment, the inner sleeve includes a tab for holding on to the inner sleeve. In an embodiment, the cartridge includes a docking switch activator, the docking switch activator configured to activate a docking switch when the cartridge is correctly engaged with a base portion. In an embodiment, the docking switch activator includes a mechanical switch, an optical switch, an electronic switch, an electromechanical switch, or a Hall Effect sensor.

In an aspect, a method is disclosed including: providing a base portion of an insect trap; providing a first trap portion of an insect trap, wherein the first trap portion includes an opening; mounting the first trap portion to the base portion; coupling the base portion to a power source to provide power to a lighting element, wherein the lighting element is within the base portion or first trap portion and wherein the lighting element is configured to attract an insect into the first trap portion; and receiving an insect into the first trap portion through the opening. In an embodiment, the method further includes: separating the first trap portion from the base portion; and disposing of the first trap portion, wherein the insect remains in the disposed first trap portion. In an embodiment, the first trap portion is disposed without the human contact with the insect in the first trap portion. In an embodiment, the first trap portion includes an adhesive surface and wherein the insect adheres to the adhesive surface. In an embodiment, the base portion includes a docking switch, wherein the docking switch is configured to activate the lighting element when the first trap portion is correctly mounted to the base portion. In an embodiment, upon separating the first trap portion from the base portion, the lighting element is powered off. In an embodiment, upon separating the first trap portion from the base portion, the lighting element is partially shielded from emitting light. In an embodiment, the method further includes: providing a second trap portion of an insect trap, wherein the second trap portion includes an opening; and mounting the second trap portion to the base portion. In an embodiment of the fourth aspect, the first insect trap and second insect trap have different configurations.

In an aspect, a docking apparatus is disclosed including: a docking structure configured to activate in response to a docking activator, the docking activator located on a separate piece configured to engage the docking structure, wherein the docking structure is in communication with a power source and is configured to control power to a lighting element. In an embodiment, the docking activator includes a surface, a protrusion, a tab or a magnet. In an embodiment, the docking structure is configured to close when the docking activator engages with it and is configured to open when the docking activator disengages from it. In an embodiment, the docking structure is configured to activate in response to pressure from the docking activator. In an embodiment, the docking structure is configured to activate in response to displacement from the docking activator.

In an aspect, a removable insect trap cartridge is disclosed including: an enclosure defining the cartridge, the enclosure having an adhesive surface and a first opening, wherein the adhesive surface is at least partially contained within the enclosure and is configured to adhere to an insect, and a docking activator, the docking activator configured to engage a docking structure in a mounting portion.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion in a primary direction, and wherein the mounting portion is configured to communicate with and receive power from a power source; wherein the trap portion is configured to removably engage with the base portion and receive light from the base portion when engaged therewith; and wherein the enclosure includes: a front housing portion having a first internal surface; a rear housing portion having a second internal surface; and a divider portion disposed at least partially between the front housing portion and rear housing portion, the divider portion configured to be at an acute angle in relation to the primary direction of the light. In an embodiment, the acute angle is from about 0 degrees to 45 degrees from a plane in the primary direction of the light. In an embodiment, the divider portion includes a rear surface including translucent material and includes a front surface including an adhesive surface. In an embodiment, the rear surface of the divider portion is configured to receive the light from the second internal surface of the rear housing portion or directly from the lighting element. In an embodiment, the divider portion is configured to receive light at an oblique angle and spread across the divider portion. In an embodiment, the divider portion is configured to manipulate light. In an embodiment, the second internal surface of the rear housing portion includes a concave surface, the concave surface configured to reflect light onto the rear surface of the divider portion. In an embodiment, light is transmitted through the adhesive surface, illuminating the adhesive surface to attract an insect to the adhesive surface. In an embodiment, the divider portion includes a planar or contoured shape, wherein the shape of the divider portion is configured to optimize light distribution.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith; wherein the base portion includes a snap protrusion and wherein the trap portion includes a snap recess for receiving the snap protrusion, wherein when the snap protrusion is received by the trap portion, the base portion and trap portion are engaged in a snap fit, the snap fit configured to provide positive tactile or audible cue to a user that the trap is properly engaged. In an embodiment, the snap fit is engageable and disengageable by a force of less than about 50 Newtons. In an embodiment, the snap fit allows a user to engage or disengage the trap portion with the base portion using a single hand. In an embodiment of the second aspect, the base portion is configured to remain upright when placed on a horizontal surface. In an embodiment, the base portion includes a bottom flat surface or legs to enable base portion to remain upright.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith; wherein the enclosure includes: a front housing portion having a first internal surface; and a rear housing portion having a second internal surface, the second internal surface including a transparent, translucent or opaque adhesive coating. In an embodiment, the second internal surface further includes a reflective coating under the adhesive coating. In an embodiment, the lighting element includes an ultraviolet (UV) light emitting diode (LED) or blue LED, and wherein the lighting element transmits light directly onto the adhesive coating of the rear housing portion.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to at least partially protrude into the trap portion from the base portion and provide light to the trap portion when engaged with the trap portion, and wherein the mounting portion is configured to communicate with and receive power from a power source; wherein the trap portion is configured to removably engage with the base portion. In an embodiment, the lighting element includes a fluorescent source, incandescent source, light emitting diode (LED), or combinations thereof. In an embodiment, trap portion further includes a sleeve configured to receive the lighting element protruding into the trap portion. In an embodiment, the sleeve includes a transparent, translucent, or opaque sleeve. In an embodiment, the sleeve includes an opening and a tapered section, the opening located proximate to the base portion, from which the lighting element protrudes. In an embodiment, the tapered section of the sleeve is configured to guide the lighting element into the sleeve. In an embodiment, the sleeve is constructed from a semi-rigid material sufficient to provide a protective covering for the lighting element. In an embodiment, the sleeve further includes an opaque coating, the opaque coating configured to prevent light from transmitting directly from lighting element into the trap portion. In an embodiment, trap portion further includes an opaque sleeve configured to receive the lighting element protruding into the trap portion. In an embodiment, the trap portion further includes a semi-rigid sleeve configured to receive the lighting element protruding into the trap portion and configured to guide the lighting element into the sleeve. In an embodiment, the sleeve includes plastic or metal wire mesh. In an embodiment, the sleeve is configured to prevent the lighting element from contacting the adhesive surface. In an embodiment, the lighting element is configured to emit light and wherein the sleeve is configured to transmit the emitted light into the enclosure and onto the adhesive surface. In an embodiment, the sleeve is further configured to diffuse light from lighting element.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith; and wherein the trap is configured to be placed on top of a flat surface and receive crawling insects through the first opening in the enclosure. In an embodiment, the mounting portion includes an electrical cord in communication with an electrical plug having rigid conductors protruding substantially perpendicularly and directly from the plug, wherein the conductors are insertable into an electrical power outlet. In an embodiment, the trap portion includes a bottom plate having a top surface and a bottom surface. In an embodiment, the top surface of the bottom plate includes a transparent, translucent, or opaque adhesive coating. In an embodiment, the bottom surface of the bottom plate is configured to prevent insects from crawling under the trap when the trap is placed on top of a flat surface. In an embodiment, the bottom surface is planar or planar at its perimeter. In an embodiment, the enclosure includes: a top housing portion having a first internal surface; a bottom housing portion having a second internal surface; and a divider portion disposed at least partially between the top housing portion and bottom housing portion, wherein the top housing portion and bottom housing portion are matingly engaged with each other to form the enclosure; and wherein the divider portion divides the enclosure into a top enclosure portion and a bottom enclosure portion. In an embodiment, the second internal surface includes a portion of a bottom plate and includes a reflective coating. In an embodiment, the divider portion includes a top surface and a bottom surface, and wherein the top surface is at least partially coated with a transparent or translucent adhesive. In an embodiment, the first opening in the trap portion is located in the top enclosure portion and wherein insects become trapped to the adhesive on the divider portion. In an embodiment, the lighting element emits light, which is received into the top enclosure on the first internal surface of the housing and a top surface of the divider portion. In an embodiment, the divider portion includes a divider opening that corresponds to the first opening in the housing portion. In an embodiment, the second internal surface includes a portion of a bottom plate and includes an adhesive coating. In an embodiment, insects become trapped to the adhesive coating on the bottom plate after crawling through the first opening and divider opening. In an embodiment, the trap further includes a light-diffusing member located within the top enclosure portion, the light-diffusing member having light-diffusing characteristics. In an embodiment, the light-diffusing member includes a transparent or translucent material. In an embodiment, the light-diffusing member includes surface features that aid in light-diffusion. In an embodiment, the light-diffusing member includes a flexible sheet configured to conform to inner surfaces of the top enclosure portion. In an embodiment, the light-diffusing member is configured to be received by a recess in the divider portion. In an embodiment, the light-diffusing member is configured to transmit light evenly through the divider portion and into the bottom enclosure portion.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith, and wherein the trap portion includes an insect attractant module having a removable cover. In an embodiment, the removable cover includes a pull tab and webbing and wherein the enclosure includes a tab slot for receiving the removable pull tab. In an embodiment, the insect attractant module includes a disposable cup, the disposable cup being covered by webbing until the pull tab is engaged. In an embodiment, engaging the pull tab includes pulling the pull tab at the tab slot until the webbing is separated from the cup. In embodiment, the removable cover provides an airtight seal to the insect attractant module while it is intact. In an embodiment, the insect attractant module includes a carrier material and one or more insect attractants. In an embodiment, the carrier material and insect attractant is configured to release an insect-attracting scent for a predetermined period of time. In an embodiment, the predetermined period of time includes a week, a month, or up to three months. In an embodiment, the predetermined period of time includes the life of the trap. In an embodiment, the released insect-attracting scent changes over time. In an embodiment, a first insect-attracting scent is released for a first time period and wherein a second insect-attracting scent is released for a second time period. In an embodiment, a first insect-attracting scent is released for a first time period at a first concentration and wherein the first insect-attracting scent is released for a second time period at a second concentration. In an embodiment, the carrier material is configured to release one or more masking scents, the masking scents configured to mask the insect-attractants to humans and/or non-intended animals. In an embodiment, the trap further includes a heating element, the heating element configured to warm the insect attractant module and aid in the release of insect attractants. In an embodiment, the heating element includes a circuit board located within the base portion of the trap. In an embodiment, the enclosure includes: a front housing portion having a first internal surface; a rear housing portion having a second internal surface; and a divider portion disposed at least partially between the front housing portion and rear housing portion, wherein the divider portion divides the enclosure into a front enclosure portion and a rear enclosure portion, and wherein the insect attractant module is located in the rear housing portion. In an embodiment, the removable cover includes a pull tab and webbing and wherein the divider portion includes a slot and the front enclosure includes a tab slot for receiving the removable pull tab, the pull tab extending through the divider portion slot and front enclosure tab slot. In an embodiment, the divider portion and front housing portion includes a plurality of openings that allow insect attract from insect attractant module to be emitted from the trap.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith, and wherein the trap portion includes an insect attractant module configured to automatically release an insect attractant when the trap portion is engaged with the base portion. In an embodiment, the insect attractant module includes a disposable cup, the disposable cup being covered by a penetrateable lid. In an embodiment, the base portion includes a punch configured to puncture the penetrateable lid and/or disposable cup.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith, and wherein the trap includes a transmitter configured to emit insect-attracting sounds or vibrations. In an embodiment, the base portion includes a second opening, the second opening providing a mounting surface for the transmitter. In an embodiment, the transmitter includes an electromechanical actuator or a piezoelectric speaker. In an embodiment, the transmitter is configured to cause the trap to vibrate and amplify the insect-attracting sounds or vibrations. In an embodiment, the enclosure includes: a front housing portion having a first internal surface; a rear housing portion having a second internal surface; and a divider portion disposed at least partially between the front housing portion and rear housing portion, the divider portion having a front surface proximate to the front housing portion and a rear surface proximate to the rear housing portion; wherein the divider portion divides the enclosure into a front enclosure portion and a rear enclosure portion, and wherein the transmitter is connected to the rear surface of the divider portion. In an embodiment, the trap further includes a circuit board located within the base portion of the trap, the circuit board in electrical communication with the transmitter when the trap portion and base portion are engaged. In an embodiment, the transmitter includes an electromechanical actuator or a piezoelectric speaker. In an embodiment, the insect-emitting sounds or vibrations attract mosquitoes, midges, moths, or flies. In an embodiment, the insect-emitting sounds or vibrations include an insect call, reply, courtship or copulatory songs. In an embodiment, the circuit board is configured to send electrical pulses to the transmitter and configured to receive electrical response signals from the transmitter, the response signals indicative of insect volume within the trap. In an embodiment, the electrical response signals are partially caused by the insect volume stuck to the adhesive surface and in communication with the divider portion. In an embodiment, the electrical pulses cause the divider portion to vibrate, the vibration being affected by the insect volume stuck to the adhesive surface and in communication with the divider portion. In an embodiment, upon the insect volume reaching a predetermined threshold, the circuit board is configured to provide an audible or visual indication to a user. In an embodiment, the visual indication includes a light blinking or a predetermined light color illuminated. In an embodiment, the audible indication includes a tone or chime. In an embodiment, the front housing further includes a polarizing reflective bottom surface in the front enclosure. In an embodiment, the polarizing reflective surface mimics the surface of water. In an embodiment, the polarizing reflective surface includes ridges or subfeatures.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the base portion includes an opening, the opening configured to allow light to emit from the base portion to the trap portion, wherein the trap portion is configured to removably engage with the base portion and receive light from the base portion when engaged therewith, and wherein a portion of the lighting element protrudes through the opening into the trap portion from the base portion and provides light to the trap portion when engaged with the trap portion. In an embodiment, the opening in the base portion includes a transparent or translucent window. In an embodiment, the opening in the base portion is configured to provide a mounting surface for a light detector. In an embodiment, the light detector includes a photosensor, photovoltaic cell, phototransistor, photoresistor, or photodiode. In an embodiment, the trap further includes: a circuit board located within the base portion of the trap, the circuit board in electrical communication with the lighting element and light detector when the trap portion and base portion are engaged. In an embodiment, the circuit board is configured to detect changes in the electrical properties of the light detector, the changes indicative of insect volume within the trap. In an embodiment, upon the insect volume reaching a predetermined threshold, the circuit board is configured to provide a visual indication to a user. In an embodiment, the visual indication includes a light blinking or a predetermined light color illuminated.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith; and wherein the enclosure includes: a front housing portion having a first internal surface; a rear housing portion having a second internal surface; and a divider portion disposed at least partially between the front housing portion and rear housing portion, the divider portion including text or graphics configured to provide light and dark contrast areas for attracting insects. In an embodiment, the text or graphics is applied by printing, hot stamping, silk screening, embossing, engraving, or molding. In an embodiment of the tenth aspect, the text or graphics include fluorescent pigments that appear to glow when illuminated.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith; and wherein the enclosure further includes an electroluminescent body or surface configured to receive light from the base portion and distribute the light in a predetermined pattern in the enclosure.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element includes an array of light emitting diodes (LEDs) and is configured to provide light to the trap portion, and wherein the mounting portion is configured to communicate with and receive power from a power source; wherein the trap portion is configured to removably engage with the base portion and receive light from the base portion when engaged therewith, and wherein the base portion includes a rear housing having a reflective surface, the reflective surface configured to act as a barrier in the rear direction to light emitted from the LEDs. In an embodiment, the base portion includes a transparent or translucent window, the window configured to allow light to emit from the base portion to the trap portion. In an embodiment, the window is further configured to protect the reflective surface of rear housing and LEDs from dust and debris.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element, a mounting portion and a docking switch, wherein the lighting element is configured to provide light to the trap portion and wherein the mounting portion is configured to communicate with and receive power from a power source, and; wherein the trap portion is configured to removably engage with the base portion and receive light from the base portion when engaged therewith, wherein the docking switch is configured to activate the lighting element when the trap portion is correctly engaged with the base portion and block light from the lighting element when the trap portion is not properly engaged with the base portion. In an embodiment, the base portion further including a screen, the screen configured to block at least a portion of light from the lighting element when screen is activated. In an embodiment, wherein the screen includes a liquid crystal display (LCD).

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; and a first heating element in communication with the power source, wherein the trap portion is configured to removably engage with the base portion and receive light from the base portion when engaged therewith, and wherein the first heating element provides heat to at least a portion of the trap when the trap is engaged. In an embodiment, the first heating element is located on a circuit in the base portion. In an embodiment, the circuit is configured to supply a constant or intermittent voltage to the lighting element. In an embodiment, the first heating element includes at least one of resistors, resistance heating elements, or heat exchanging elements. In an embodiment, the first heating element maintains a temperature of at least approximately 30° C. in at least a portion of the trap. In an embodiment, the first heating element maintains a temperature of between approximately 30° C. and 45° C. in at least a portion of the trap. In an embodiment, the first heating element maintains a temperature of between approximately 33° C. and 42° C. in at least a portion of the trap. In an embodiment, the lighting element includes a second heating element, the second heating element configured to assist the first heating element in providing heat to the trap. In an embodiment of the first aspect, the lighting element includes one or more light emitting diodes (LEDs), incandescent light bulbs, or combinations thereof. In an embodiment, the lighting element includes a second heating element, the second heating element configured to replace the first heating element in providing heat to the trap. In an embodiment, the lighting element includes one or more light emitting diodes (LEDs), incandescent light bulbs, or combinations thereof. In an embodiment, the enclosure includes: a front housing portion having a first internal surface; and a rear housing portion having a second internal surface, wherein the front housing portion and rear housing portion are matingly engaged with each other to form the enclosure; and wherein at least one of the first or second internal surfaces is configured to manipulate light, and wherein the base portion includes: an opening, the opening configured to allow light to emit from the base portion to the enclosure such that the light diverges over substantially the second internal surface. In an embodiment, the opening is proximate to the lighting element and the light diverges in a predetermined pattern over the second internal surface. In an embodiment, the enclosure includes: a front housing portion having a first internal surface; a rear housing portion having a second internal surface; and a divider portion disposed at least partially between the front housing portion and rear housing portion, wherein the front housing portion and rear housing portion are matingly engaged with each other to form the enclosure; and wherein the divider portion divides the enclosure into a front enclosure portion and a rear enclosure portion, and wherein the base portion includes: an opening, the opening configured to allow light to emit from the base portion to the enclosure such that the light diverges over substantially the second internal surface. In an embodiment, the opening is proximate to the lighting element and the light diverges in a predetermined pattern over the second internal surface. In an embodiment, the trap portion includes an insect attractant. In an embodiment, the first heating element enhances the release of the insect attractant. In an embodiment, the insect attractant is selected from the group consisting of: water, water vapor, sugar, sugar solution, molasses, honey, yeast, insect-attracting scents, pheromones, and combinations thereof. In an embodiment, the first heating element enhances the release of water vapor. In an embodiment, the first heating element enhances the release of carbon dioxide.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith, and wherein the trap portion includes an insect attractant module having a removable cover and one or more insect attractants, wherein at least one of the insect attracts includes water, water vapor, sugar, sugar solution, molasses, honey, yeast, insect-attracting scents, pheromones, and combinations thereof. In an embodiment, the removable cover includes a pull tab and webbing and wherein the enclosure includes a tab slot for receiving the removable pull tab. In an embodiment, the insect attractant module includes a container, the container being covered by webbing until the pull tab is engaged. In an embodiment, the insect attractant module further includes a carrier material inside the container. In an embodiment, the carrier material includes a solid, a liquid, a gel, or combinations thereof. In an embodiment, at least one insect attractant is embedded in the carrier material. In an embodiment, water or water vapor is embedded in the carrier material. In an embodiment, at least one insect attractant is located in the container. In an embodiment, the insect attractant is configured to release an insect-attracting scent for a predetermined period of time. In an embodiment, the predetermined period of time includes a week, a month, or up to three months. In an embodiment, the predetermined period of time includes the life of the trap. In an embodiment, the released insect-attracting scent changes over time. In an embodiment, a first insect-attracting scent is released for a first time period and wherein a second insect-attracting scent is released for a second time period. In an embodiment, a first insect-attracting scent is released for a first time period at a first concentration and wherein the first insect-attracting scent is released for a second time period at a second concentration. In an embodiment, the insect attractant module is configured to release one or more masking scents, the masking scents configured to mask the insect-attractants to humans and/or non-intended animals. In an embodiment, the trap further includes a heating element, the heating element configured to warm the insect attractant module and aid in the release of insect attractants. In an embodiment, the heating element includes a circuit component located within the base portion of the trap. In an embodiment, the heating element maintains a temperature of at least approximately 30° C. in at least a portion of the trap. In an embodiment, the heating element maintains a temperature of between approximately 30° C. and 45° C. in at least a portion of the trap. In an embodiment, the heating element maintains a temperature of between approximately 33° C. and 42° C. in at least a portion of the trap.

Insect traps disclosed herein may attract and trap insects effectively and efficiently. They may be less costly than existing traps. They may be small enough to fit wherever needed, and be conveniently movable from one location to another. They may protrude minimally when mounted on a wall. The removable and replaceable trap portions may be attractive in appearance, but also be inexpensive and disposable, and may be easy for the user to maintain without touching trapped insects or adhesive.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter, which is broadly contemplated by the present disclosure. It is further understood that the scope of the present disclosure fully encompasses other embodiments and that the scope of the present disclosure is accordingly limited by nothing other than the appended claim.

What is claimed is:

1. An insect trap, comprising:
a trap portion comprising an enclosure having an opening through which an insect may fly or crawl into the trap portion and an adhesive surface;
a base portion directly connected to electrically conductive prongs insertable into an electrical socket, the base portion further comprising an upstanding enclosure having a heater disposed such that the vertical axis of the heater is parallel with the vertical axis of the upstanding enclosure; and a light disposed near the bottom of the upstanding enclosure; and
wherein the trap portion removably engages the base portion and the heater is located behind the adhesive surface and heats the adhesive surface when the trap portion engages the base portion.

2. The insect trap of claim 1, wherein the heater comprises one or more resistive heating wires.

3. The insect trap of claim 2, wherein the one or more resistive heating wires are attached to a surface of the upstanding enclosure.

4. The insect trap of claim 2, wherein the one or more resistive heating wires are arranged in a concentric pattern, a vertical pattern, a horizontal pattern or an oblique pattern.

5. The insect trap of claim 2, wherein the one or more resistive heating wires are connected to one or more electrical busses.

6. The insect trap of claim 2, wherein the one or more resistive heating wires comprises an electrically conductive polymer.

7. The insect trap of claim 1, wherein the heater comprises a layer of metal oxide disposed on a surface of the upstanding enclosure.

8. The insect trap of claim 1, wherein the heater is connected to a circuit board in the base portion.

9. The insect trap of claim 8, wherein the light is connected to the circuit board.

10. The insect trap of claim 8, wherein the light comprises one or more light emitting diodes.

11. The insect trap of claim 8, wherein illumination from the light passes through an opening in the base portion.

12. The insect trap of claim 11, wherein the light illuminates the interior of the upstanding enclosure.

13. The insect trap of claim 12, wherein the upstanding enclosure comprises a rear housing and a window.

14. The insect trap of claim 13, wherein the illumination from the light illuminates the window.

15. The insect trap of claim 14, wherein illumination from the window passes through the adhesive surface.

16. The insect trap of claim 15, wherein the enclosure of the trap portion further comprises a plate onto which the adhesive surface is coated.

* * * * *